(12) United States Patent
Sheldon-Coulson et al.

(10) Patent No.: US 10,087,909 B2
(45) Date of Patent: Oct. 2, 2018

(54) INERTIAL WAVE ENERGY CONVERTER

(71) Applicants: Garth Alexander Sheldon-Coulson, Moorpark, CA (US); Brian Lee Moffat, Simi Valley, CA (US); Daniel William Place, Los Angeles, CA (US); Rabeh Bassam Shalhoub, Simi Valley, CA (US)

(72) Inventors: Garth Alexander Sheldon-Coulson, Moorpark, CA (US); Brian Lee Moffat, Simi Valley, CA (US); Daniel William Place, Los Angeles, CA (US); Rabeh Bassam Shalhoub, Simi Valley, CA (US)

( * ) Notice: Subject to any disclaimer, the term of this patent is extended or adjusted under 35 U.S.C. 154(b) by 0 days.

(21) Appl. No.: 15/700,122

(22) Filed: Sep. 9, 2017

(65) Prior Publication Data
US 2018/0073483 A1    Mar. 15, 2018

Related U.S. Application Data

(60) Provisional application No. 62/536,221, filed on Jul. 24, 2017, provisional application No. 62/533,058, filed on Jul. 16, 2017, provisional application No. 62/506,636, filed on May 16, 2017, provisional application No. 62/506,015, filed on May 15, 2017, provisional application No. 62/482,693, filed on Apr. 7, 2017, provisional application No. 62/452,388, filed on Jan. 31, 2017, provisional application No. 62/441,457, filed on Jan. 2, 2017, provisional
(Continued)

(51) Int. Cl.
| | | |
|---|---|---|
| F03B 13/20 | (2006.01) | |
| F03B 13/26 | (2006.01) | |
| F16H 19/06 | (2006.01) | |
| H02K 7/18 | (2006.01) | |
| F03B 13/16 | (2006.01) | |
| F03B 13/12 | (2006.01) | |
| F03B 13/22 | (2006.01) | |
| F03B 13/14 | (2006.01) | |
| F16H 41/00 | (2006.01) | |
| F16H 39/00 | (2006.01) | |

(52) U.S. Cl.
CPC .............. *F03B 13/20* (2013.01); *F03B 13/12* (2013.01); *F03B 13/14* (2013.01); *F03B 13/16* (2013.01); *F03B 13/22* (2013.01); *F03B 13/26* (2013.01); *F03B 13/264* (2013.01); *F16H 19/06* (2013.01); *H02K 7/1853* (2013.01); *F16H 39/00* (2013.01); *F16H 41/00* (2013.01)

(58) Field of Classification Search
CPC .......... F03B 13/20; F03B 13/12; F03B 13/14; F03B 13/22; F03B 13/26; F03B 13/264; F03B 13/16; F16H 19/06; F16H 39/00; F16H 41/00; H02K 7/1853
USPC ..................... 60/398, 496–507; 290/42, 53
See application file for complete search history.

(56) References Cited

U.S. PATENT DOCUMENTS

| | | | | |
|---|---|---|---|---|
| 4,017,924 A | * | 4/1977 | Higgs | ....................... B63C 7/26 |
| | | | | 114/349 |
| 6,109,029 A | * | 8/2000 | Vowles | ................... B01D 61/10 |
| | | | | 270/42 |

(Continued)

*Primary Examiner* — Hoang Nguyen
(74) *Attorney, Agent, or Firm* — Fulwider Patton LLP

(57) ABSTRACT

A wave energy converter generates power from a wave-induced separation of a positively buoyant flotation module and a submerged negatively buoyant mass, using a rotating pulley to drive a power-take-off system.

30 Claims, 188 Drawing Sheets

Related U.S. Application Data application No. 62/436,479, filed on Dec. 20, 2016, provisional application No. 62/435,895, filed on Dec. 19, 2016, provisional application No. 62/430,354, filed on Dec. 6, 2016, provisional application No. 62/426,328, filed on Nov. 25, 2016, provisional application No. 62/393,056, filed on Sep. 11, 2016.

(56) References Cited

U.S. PATENT DOCUMENTS

| | | | |
|---|---|---|---|
| 6,392,314 B1* | 5/2002 | Dick | F03B 13/148 |
| | | | 290/53 |
| 7,188,471 B2* | 3/2007 | Walters | F03B 13/1875 |
| | | | 290/53 |
| 7,986,054 B2* | 7/2011 | Douglas | F03B 17/062 |
| | | | 290/54 |
| 8,276,377 B2* | 10/2012 | Patton | F03B 13/1865 |
| | | | 290/42 |
| 8,938,957 B2* | 1/2015 | Frich | F03B 13/1845 |
| | | | 290/53 |
| 2008/0053084 A1* | 3/2008 | Stansby | F03B 13/1865 |
| | | | 60/501 |
| 2009/0309366 A1* | 12/2009 | Moore | B63B 35/44 |
| | | | 290/53 |
| 2012/0235413 A1* | 9/2012 | Piccinini | F03B 13/1865 |
| | | | 290/53 |
| 2013/0091838 A1* | 4/2013 | Lee | F03B 13/186 |
| | | | 60/506 |
| 2013/0234442 A1* | 9/2013 | Garrido Garcia | F03B 13/20 |
| | | | 290/54 |

* cited by examiner

INERTIAL WAVE ENERGY CONVERTER

CROSS-REFERENCES TO RELATED APPLICATIONS

This application claims priority from U.S. Ser. No. 62/536,221, filed Jul. 24, 2017; U.S. Ser. No. 62/533,058, filed Jul. 16, 2017; U.S. Ser. No. 62/506,636, filed May 16, 2017; U.S. Ser. No. 62/506,015, filed May 15, 2017; U.S. Ser. No. 62/482,693, filed Apr. 7, 2017; U.S. Ser. No. 62/452,388, filed Jan. 31, 2017; U.S. Ser. No. 62/441,457, filed Jan. 2, 2017; U.S. Ser. No. 62/436,479, filed Dec. 20, 2016; U.S. Ser. No. 62/435,895, filed Dec. 19, 2016; U.S. Ser. No. 62/430,354, filed Dec. 6, 2016; U.S. Ser. No. 62/426,328, filed Nov. 25, 2016; and U.S. Ser. No. 62/393,056, filed Sep. 11, 2016, the contents of which are each fully incorporated herein by reference in their entirety.

BACKGROUND

The attempts to recover useful energy from the motion of waves on a body of water are well documented. Proposed devices for converting the reciprocating action of buoyant objects on the surface of a body of water into electrical power are replete in the prior art. The reason for this is clear, as the oceans and seas will be able to provide a constant, renewable, natural, pollution-free source of energy if its energy can be harnessed in an economical and reliable manner. However, solving this latter problem has been challenging and the few existing operational wave to energy converters share several major shortcomings.

Many systems of the prior art require an anchor or attachment to either the shore or the ocean floor. This requirement limits the location of these converters and the depth of the water in which they may be deployed. It would be advantageous to exploit the waves traveling across the surfaces of the deep water regions of the ocean where large waves are abundant.

The amounts of energy that can be extracted from devices of the prior art are meager compared with the expense of fabricating, operating, and maintaining these devices. In order to extract large amounts of energy from the waves in the sea, the scale of the effort, in terms of numbers and sizes of devices, will need to be dramatically increased. However, the prior art lacks an effective manner or technology with which to accomplish this goal.

The present invention overcomes the shortcomings of the prior art and accomplishes the foregoing objects in a safe, cost-effective, efficient and reliable manner.

SUMMARY OF THE INVENTION

Disclosed is a novel ocean wave energy converter ("converter") designed to cost-effectively achieve a high energy conversion efficiency. Moreover, the converter of the present invention exhibits a range of features designed to ensure survival during storms, the longevity of mechanical components, and a low cost of manufacture. The converter of the present disclosure will be characterized by a minimal environmental impact, as well as an ability to optimize system behavior and performance with respect to changing wave conditions.

Operation

Basic Operation

The principle of operation of the disclosed converter is the harnessing of (principally vertical) motion differentials between a buoyant "flotation module" and a submerged, suspended, and (in a preferred embodiment) water-filled "inertial mass." As such, the disclosed converter can be described as being of a "single-mode" and "heave-mode" design. Power is developed and made available for extraction when wave-induced changes in the surface water level (i.e., wave "heave") contribute to the buoyant vertical acceleration of the flotation module, e.g., driving it upward and away from the submerged and less-easily accelerated inertial mass. The motion differential between the two bodies can enable a power-take-off system (e.g., an electrical power-take-off system, mechanical-electrical power-take-off system, or an hydraulic-electrical power-take-off system) to be actuated and power (e.g., electrical power) to be generated.

During the operation of the converter, the flotation module rises and falls on passing waves, and the separation distance between the flotation module and the inertial mass periodically increases and decreases. When the separation distance increases, the portion of the flexible connector that is attached to the inertial mass experiences a downward movement relative to the flotation module, or, what is the same thing, the flotation module experiences an upward movement relative to the portion of the flexible connector that is attached to the inertial mass. The converter generates power by opposing this relative movement of the flexible connector using the at least one power-take-off system mounted at or upon the flotation module.

As a corollary of the power-take-off system's opposition to wave-induced separation of the flotation module and the inertial mass, an increased tension is created in the flexible connector. An upward lifting force is accordingly transmitted to, and/or shared with, the inertial mass, causing the inertial mass to be periodically accelerated upward, in the direction of the water's surface. Subsequently, when the lifting force abates, the net effective gravitational force acting upon the inertial mass accelerates it back downward in the direction of the seafloor. This mechanical cycle repeats when the flotation module subsequently again "catches" the falling inertial mass with an upward lifting force, and so on. Reciprocating and at least somewhat phase-shifted (i.e., out of phase) movements of the flotation module and inertial mass can develop such that large amounts of power may be generated and/or converted.

Dynamic Suspension

In the course of operation, e.g. over the course of several wave cycles, the inertial mass is "juggled," or dynamically suspended and oscillated, in at least one operational separation distance range owing to the aforementioned periodic cycle of upward lifting and downward gravitationally-induced falling. By "operational separation distance range" we mean the range defined by the minimum and maximum separation distances attained between the flotation module and inertial mass during a defined period of operation. The dynamic suspension of the inertial mass in an operational separation distance range is accomplished through the periodic conversion of kinetic energy from passing waves into kinetic energy and gravitational potential energy imparted to the inertial mass, mediated by the power-take-off system.

During normal operation, if the periodic application of a lifting force to the inertial mass were to cease (whether because of a cessation of waves, or because of a cessation of the countertorque applied by the power-take-off system to the pulley controlling the operational length of a flexible connector connecting the flotation module to the inertial mass, or for some other reason), then the inertial mass would, in some embodiments, tend to fall downward under gravity, and achieve a separation distance outside, and greater than, the aforementioned operational separation distance range; at least unless arrested by a brake or some other mechanism to the same effect, and/or until caught by a tether, and/or until it reaches a parked depth or parked separation distance. Accordingly, during normal operation, some embodiments of the converter preferably operate "out of equilibrium"; the operational separation distance range preferably does not include, and can be significantly spaced from, a resting, or parked, separation distance.

By resting, or parked, separation distance, we mean the separation distance between the flotation module and the inertial mass that would come to pass in the event that no waves were present and the power-take-off system were configured to impart no countertorque to the pulley/capstan, so that the inertial mass assumed a position of static equilibrium. And similarly for the resting, or parked, depth of the inertial mass.

At the start of operation, i.e. from a resting or inactive configuration (e.g. wherein the inertial mass is approximately at a parked separation distance or a parked depth), the inertial mass can be "lifted" or "bootstrapped" to an operational depth range through the application of a countertorque by the power-take-off system in the presence of waves.

Owing to the stochastic nature of waves, it has been determined that in a majority of cases it is preferable to lift and dynamically suspend the inertial mass so that the operational separation distance range is spaced some distance from a resting, or parked, separation distance. Or what is close to the same thing, it is preferable to lift and dynamically suspend the inertial mass in an operational depth range spaced some distance from (i.e., vertically above) a resting, or parked, depth in the body of water. Preferably, to minimize the probability of snap loads, the larger bound of the operational separation distance range (i.e. the deeper bound in the body of water), and accordingly the deeper bound of the operational depth range, should be spaced from the inertial mass's resting, or parked, separation distance, by a distance of at least the significant wave height in typical operational conditions.

In some embodiments, the inertial mass is controlled so as to cause it to oscillate within an operational separation distance range (or, an operational depth range) spaced from a resting, or parked, separation distance (or, spaced from a resting, or parked, depth) by a distance of at least 1.5 times the significant wave height. In some embodiments, the inertial mass is controlled so as to cause it to oscillate within an operational separation distance range (or, an operational depth range) spaced from resting, or parked, separation distance (or, spaced from the resting, or parked, depth) by a distance of at least 5 meters.

Depth Regulation and Control System

The depth of the inertial mass, and its separation distance from the flotation module, can be regulated by a countertorque control system that can respond adaptively to the vertical position (i.e., depth in the body of water, and/or separation distance from the flotation module) of the inertial mass, and/or to other operational statistics of the converter. Such a control system can use, apply, and/or create variations in the (instantaneous and/or averaged over a period of time) countertorque applied, and/or resistance to separation applied, by the power-take-off assembly. This can help keep the converter within an optimal range of operating parameters, e.g., keep the inertial mass within a desired depth range and/or a desired separation distance range. In particular, the control system can incorporate feedback control with respect to operating parameters such as the depth of the inertial mass and/or the separation distance between the inertial mass and the flotation module.

Saying the same thing again, a countertorque control system integrated into the converter can control the generator (and/or a clutch and/or hydraulic valve situated in a force-transmission pathway to the generator) to provide different levels of countertorque to the rotating shaft (and/or to a rotating pulley/capstan) at different times. Such differences in countertorque or resistance can be a function of operational parameters such as the current and/or recent depth of the inertial mass in the body of water, and/or the current and/or recent distance between the inertial mass and the flotation module. Such differences in countertorque or resistance can be created and/or provided and/or effectuated by varying the excitation of field coils in a generator; by power electronics and control circuits that reduce the load experienced by the generator or that otherwise modulate the generator's behavior (e.g., back-to-back AC/DC converters, and/or a machine-side converter, a grid-side converter and control circuits); by varying the engagement of an electromagnetic or mechanical or hydraulic clutch or valve assembly; or by other means.

In some embodiments, a mechanical brake is provided so that a stopping force, countertorque, or resistance can be applied to the shaft or pulley from which the inertial mass is suspended in addition to any application of a countertorque by the generator itself.

In some embodiments, when the separation distance between the inertial mass and flotation module risks becoming too small (e.g. the inertial mass assumes an average upward trajectory of sufficiently large magnitude and/or crosses a predetermined upper depth threshold), the countertorque control system controls a power-take-off system to decrease the average countertorque applied by the power-take-off system to a pulley/capstan; and, when the separation distance between the inertial mass and flotation module risks becoming too large (e.g. the inertial mass assumes an average downward trajectory of sufficiently large magnitude and/or crosses a predetermined lower depth threshold), the countertorque control system controls a power-take-off system to increase the average countertorque applied by the power-take-off system to a pulley/capstan. By applying such corrections, or feedback control of a similar sort, the depth and/or separation distance of the inertial mass can be stabilized, which in turn enables regulation and optimization of the overall power-take-off system.

"Input signals" used by the control system can include direct measurements of the approximate depth of the inertial mass, e.g., as measured by downward-pointed sonar mounted on the flotation module, and/or indirect or proxy measurements of the same, e.g., as derived from measurements of the translation of the flexible connector and/or measurements of the angular position of a pulley or rotating capstan. In some embodiments, one or more rotary encoders measure the angular position of a pulley/capstan, and this information is used to control the countertorque applied by the power-take-off system.

Some embodiments of the disclosed converter dynamically regulate the vertical position (e.g., depth in the body of water, or separation distance from the flotation module) of the inertial mass in a manner that can depend at least in part on a calculated statistic of the wave energy available in the occurrent sea state. Such a control system can enable the vertical position of the inertial mass to be regulated in a manner that changes depending on wave conditions. "Input signals" used by such a control system can include signals or statistics relating to the occurrent available wave energy, e.g., the measured or forecast wave height, the measured or forecast wave period, the measured or forecast wind speed, and/or the measured vertical acceleration of the flotation module. Such information can be received by satellite communication and/or by a data network that includes multiple nearby converters.

Typical Components

Flotation Module

The buoyant flotation module is preferably horizontally broad, enabling it to experience a relatively large change in displacement, and hence a relatively large change in buoyant force, for a given change in the surface water level. This enables it to "track" the surface water level relatively closely and thus efficiently convert available wave energy to usable power. In some embodiments, the buoyant flotation module is substantially "flat," like a pancake. In some embodiments, the buoyant flotation module has a curved bottom surface that approximately, and at least partially, defines an arc of a circle with respect to at least one vertical cross section, enabling the flotation module to freely rotate in the water (as if borne on a bearing), within the plane of the vertical cross-section in which the buoyant flotation module has a curved bottom surface, to correct misalignments in the fleet angle(s) of the converter's flexible connector(s) (discussed in greater detail below). In some embodiments, the flotation module has a bottom surface that at least approximately and at least partially defines a spherical cap or spherical dome. In some embodiments, the flotation module has a bottom surface that at least approximately and at least partially defines a horizontal cylindrical segment. In some embodiments, at least one pulley/capstan is located in a recessed bottom portion of the flotation module.

Interfaces for Functional Modules on Deck

In some embodiments, a top surface of the flotation module has docking interfaces for functional modules that might contain arbitrary electrical equipment. These interfaces can include a power connection, a data connection, and a structural connection, the data connection optionally providing a documented application programming interface for controlling and/or receiving operational statistics of the converter. In some embodiments, the structural connection includes Twistlock connections suitable for securing a standard shipping container.

Concrete Structure

In some embodiments, a substantial portion of the flotation module is constructed from concrete. Concrete has the advantages of being low-cost, strong, and impervious to corrosion. In some embodiments, an outer (circumferential) and/or bottom "shell" of the flotation module is predominantly constructed from concrete, while a top deck of the flotation module is constructed from another material, such as metal.

Layered Composition of Concrete Structure

In some embodiments, a part of the flotation module is made of successively deposited layers of concrete, such as are deposited by "3D printing" or "additive manufacturing" of concrete.

Prestressing of Concrete Structure

In some embodiments, in order to ameliorate the natural brittleness and weakness in tension of concrete, a flotation module composed largely of concrete is structurally strengthened through the use of tensile members configured to "pre-stress" and/or "post-tension" the concrete, predominantly by applying a pre-stressing force in one or more radial/diametrical and/or horizontal directions. In some embodiments, pre-stressing is provided by tensile members wrapped and tensioned circumferentially around a perimeter of the flotation module, typically in a plane that is predominantly horizontal, which, when tensioned, compress the structure inward. In some embodiments, pre-stressing is provided by tensile members that extend in approximately straight lines through approximately horizontal channels provided in the flotation module, typically transiting a radial/diametrical path, which, when tensioned, again compress the structure inward.

Inertial Mass

Shape

The inertial mass preferably has relatively low drag when moved in the vertical direction. A spherical or elliptical inertial mass (i.e. an inertial mass having a spherical or elliptical "shell" enclosing one or more interior volumes of water, e.g. seawater) is suitable because it encloses a very large volume of water relative to its surface area and has a relatively low-drag hydrodynamic profile. The inertial mass is preferably suspended in a net or other means of coupling it to the flexible connector that supports its bottom portion. In some embodiments, the inertial mass is approximately spherical, elliptical, toroidal, or cubical. The inertial mass may be a solid possessing an appropriate and/or suitable density, e.g. concrete containing air-filled voids.

Construction

The inertial mass can be constructed inexpensively as a submerged, substantially hollow vessel, container, or enclosure having rigid and/or flexible walls. The hollow interior of the inertial mass can contain seawater that floods an interior of the inertial mass, e.g. upon the converter's initial deployment into a body of water. In some embodiments, the inertial mass has concrete walls. In some embodiments, the inertial mass has concrete walls composed of multiple successively deposited layers of concrete, such as might be formed by additive manufacturing, i.e. through the "3-D printing" of said concrete. In some embodiments, the inertial mass is made of plastic. In some embodiments, the inertial mass is made by roto-molding. In some embodiments, at least some of the inertial mass's walls are defined by flexible cables, sheeting, and/or fabric so that the inertial mass is compact during manufacture, transportation, and deployment yet voluminous once deployed. In some embodiments, a top portion of the inertial mass is open, so that the inertial mass takes the shape of a cup or ice cream cone. In some embodiments, the inertial mass is a vertically spaced stack of horizontal plates.

Buoyancy

The inertial mass must have an effective negative buoyancy during operation. By "effective negative buoyancy" we mean that the inertial mass has an average density selected so that when submerged and filled or flooded with water (if applicable), and when at an operational depth range, it will tend to fall and/or be pulled downward under gravity, unless lifted upward by a force applied to it through the at least one flexible connector by which it is connected to the flotation module. In some embodiments, the inertial mass's effective negative buoyancy results from its own intrinsic net weight (gravitational weight net of buoyant force) being positive. In some embodiments negative buoyancy is achieved by the combined net weight of the inertial mass and any weighted objects depending from it, and/or enclosed within it, being positive.

Although the inertial mass must have an effective negative buoyancy during operation, some embodiments use a positively or neutrally buoyant inertial mass from which depend one or more weights, chains, or other similar weighted objects that act to give the inertial mass an effective negative buoyancy during operation.

The inertial mass does not need to rest upon, be attached to, nor otherwise have direct contact with the seafloor. By using a suspended inertial mass, embodiments of the converter are deployed economically in deep offshore waters (e.g. depths of over 200 meters), where the ocean wave energy resource is at its greatest but attachment of a converter to the seafloor is economically or practically prohibitive.

Depth

Preferably, the depth at which the inertial mass is suspended is at least 50% of the depth of a wave base of the body of water, allowing the inertial mass to experience a relatively small degree of wave-induced water movement in its immediate vicinity. For example, if a prevailing wavelength of waves in the body of water is 300 meters, then a prevailing wave base can be 150 meters, and the inertial mass is preferably suspended at a depth of at least 75 meters. It is more preferable still for the inertial mass to be suspended near or below a wave base of the body of water. In various embodiments, the inertial mass is suspended at a depth of 100 meters, 150 meters, and 200 meters.

The inertial mass changes depth during operation. As discussed previously, the inertial mass is biased to a greater depth than its operational depth range, and is dynamically suspended in at least one operational depth range by inputs of energy from passing waves. The operational depth range can change through time. By controlling the instantaneous and average lifting force imparted to the inertial mass (e.g. by varying a countertorque of the power-take-off system), the control system of the lifting module can cause the average depth of the inertial mass to increase and decrease. And, the average depth of the inertial mass can be regulated and stabilized even in radically different wave conditions.

Mass

The mass of the seawater confined by the inertial mass can be substantial, e.g., many millions of kilograms. This mass of seawater is substantially "trapped" by, within, and/or against the inertial mass (e.g., by, within, and/or against its substantially impermeable walls) when the inertial mass is accelerated in a relevant direction. In other words, for the inertial mass to move and/or be accelerated in the relevant direction, a large mass of water must also move and/or be accelerated in that same direction. Hence, the inertial mass's effective mass is very great when used as a foothold, reaction point, or grapple for the flotation module to "pull against" during the latter's buoyancy-induced ascent. And, when the inertial mass falls under gravity owing to its effective negative buoyancy during operation, a large mass of water is accelerated downward and the momentum of this water contributes to the development of power when the upward lifting force imparted by the flotation module subsequently accelerates the inertial mass in the opposite direction.

Pulley/Capstan

A cable-and-pulley system is the mechanism by which buoyant work acting upon the flotation module (but resisted by the inertial mass) is converted to mechanical shaft power. At least one cable with one portion bound at the inertial mass applies a torque to a pulley and/or rotating capstan borne at the flotation module, which in turn directly or indirectly operates a generator (or performs some other useful work). The use of a cable-and-pulley system as part of a power-take-off scheme enables a direct conversion of the force of waves into rotary motion suitable to rotate a shaft.

Multiple Pulleys/Capstans

In most embodiments, multiple pulleys/capstans are mounted at the flotation module. In some embodiments, the pulleys/capstans are disposed circumferentially at a perimeter of the flotation module. In some embodiments, the pulleys/capstans are disposed at a submerged bottom portion of the flotation module. In some embodiments, the pulleys/capstans are disposed at a top central portion of the flotation module, so that the flexible connector passes through one or more apertures in the flotation module.

Mechanical Linkage of Multiple Pulleys/Capstans

In some embodiments containing multiple pulleys/capstans, the pulleys/capstans are mechanically linked so that they must rotate at approximately the same rate. In some embodiments, this helps achieve the directional rectification of the flotation module, or in other words to ensure that when the flexible connector is under tension, the bottom of the flotation module points approximately in the direction of the inertial mass (i.e. the flotation module's vertical axis is approximately collinear with a line passing through the flotation module and the inertial mass).

Ratio of Pulley Diameter to Cable Diameter

In order to obtain a device mechanical lifetime of 30 years, it has been determined that it is important to by and large load the flexible connector with no more than some small fraction of its breaking strength, preferably one-sixth or less. And, it has been determined that it is important to ensure that the ratio of the pulley diameter to the cable diameter (D/d ratio) is 40 or greater. Preferably, the D/d ratio is 50 or greater. In some embodiments, the D/d ratio is 50 or greater, or even 60 or greater, or 70 or greater. In order to achieve these ratios, several design features have had to be invented and/or combined in novel ways in our preferred embodiments, including but not limited to the "ribbon-like" flexible connector described below (i.e. multiple "strands" of a flexible connector winding onto the same pulley drum), and particular locations chosen for placement of pulley drums.

When the flexible connector is composed of a plurality of cables arranged in a ribbon-like configuration, the cable diameter refers to the diameter of any one of the constituent cables, and/or to the smallest cross-sectional dimension of the ribbon-like flexible connector, which are typically the same value.

Means of Transmission of Force from Flexible Connector to Pulley/Capstan

In some embodiments, a tension in the flexible connector is translated into a torque in the pulley/capstan through the use of traction and/or the capstan effect. In these embodiments, the cable is not directly attached to the pulley, but rather transmits a torque through it by binding against it. Friction is required. In some of such embodiments, at least one pulley/capstan is part of a traction winch assembly. In others of such embodiments, at least one pulley/capstan has a flexible connector multiply wound around it in a spiral configuration.

In some embodiments, a tension in the flexible connector is translated into a torque in the pulley/capstan through a direct attachment of part of (e.g. the end of) the flexible connector to a part of the pulley/capstan, particularly a circumferential part. Accordingly, no friction or traction is required. In embodiments that rely on a direct connection of the flexible connector to the pulley/capstan, the amount of available travel is typically more limited than in embodiments where force is transmitted by friction, since once the flexible connector fully "unwinds" from the pulley/capstan, no further rotation of the pulley/capstan can be induced.

Travel

The use of a rotary member (a pulley/capstan) as the interface structure for the flexible connector it enables the "travel" or "stroke distance" between the inertial mass and the flotation module to be large relative to converters of the prior art. In storm conditions, a wave energy converter can experience waves of 15, 20, 25, or even 30 meters in wave height. It is imperative that when the flotation module of a wave energy converter rises 30 meters on a storm wave, it does not encounter any mechanical "hard stops" imposed by the mechanical design of the converter, i.e. sudden limits to further separation of the inertial mass and flotation module. This would quickly contribute to the destruction of the device.

Flexible Connector

A flexible connector passes between the flotation module and inertial mass. In embodiments having a restoring weight, i.e., a relatively small weight that reduces the ability of the flexible connector to become slack, a flexible connector also passes between the flotation module and the restoring weight. In some cases, these are one and the same flexible connector; in other cases, the flexible connector passing to the inertial mass is distinct from the flexible connector passing to the restoring weight.

Ribbon-Like Flexible Connector

In some embodiments, the flexible connector is "ribbon-like" (sometimes referred to simply as a "ribbon"). In these embodiments, the flexible connector includes a plurality of separate "strands," each of which might be, for instance, an independent segment of wire rope. The separate strands are arranged to form a flat connector having a combined tensile strength approximately equal to the sum of the tensile strengths of the constituent strands, but collectively more suitable for transiting around a rotary member such as a pulley/capstan. In particular, the D/d ratio can be made larger, without having to resort to a pulley/capstan of enormous proportions. Similarly, the combined friction induced from a ribbon onto the pulley/capstan is approximately equal to the sum of the friction induced from the constituent strands, but collectively more suitable for rotating the pulley/capstan.

Junction of Subconnectors

When a ribbon-like flexible connector is used, for instance to span a distance between the flotation module and the inertial mass, in some embodiments the separate strands that constitute the ribbon-like flexible connector terminate at, or otherwise affix to, a common rigid connector or "junction" located at an intermediate point along the flexible connector. At the connector/junction, the multiple strands of the ribbon each transmit a tensile load to the rigid structure of the connector/junction. From this junction then can proceed another portion of the flexible connector, perhaps a unitary wire rope, spanning a further distance of the flexible connector.

Slack Reducing Element

The converter further incorporates at least one slack-reducing element whose purpose is to ensure that when the distance between the inertial mass and flotation module decreases, any momentary slack in the at least one flexible connector is taken up rapidly, or to put it a different way, to ensure that no significant slack accumulates in the flexible connector. In some embodiments, the at least one slack-reducing element can incorporate at least one restoring weight or restoring float attached to a portion of the flexible connector opposite the portion attached to the inertial mass, configured to draw the flexible connector back over the rotating capstan or pulley when the separation distance between flotation module and inertial mass decreases. In some embodiments, at least one slack-reducing element is at least one generator or motor, configured to "rewind" the at least one flexible connector. In some embodiments, the at least one slack-reducing element can include at least one slack-reducing motor separate from the at least one main generator. In some embodiments, the at least one slack-reducing element can include a hydraulic accumulator that stores energy in the form of a compressed gas to rewind the flexible connector.

Effective Weight of Restoring Weight

In most embodiments having a restoring weight, the net (wet) weight of the restoring weight is smaller, usually significantly smaller, than the net (wet) weight of the inertial mass. In some embodiments, the net (wet) weight of the restoring weight is one ninth the net (wet) weight of the inertial mass.

Power-Take-Off System

Hydraulic

In some embodiments, a hydraulic system is used to transmit mechanical power from a rotating pulley/capstan to an electrical generator.

In some hydraulic embodiments, at least one pulley/capstan rotates due to a torque applied by a flexible connector. The rotating pulley/capstan is connected to a crankshaft, camshaft, or other similar mechanical structure (hereafter, "crankshaft"). The crankshaft is connected to an assembly of hydraulic cylinders. The rotation of the pulley/capstan causes the hydraulic cylinders to pump hydraulic fluid at high pressure. The high pressure hydraulic fluid is routed to a hydraulic motor or turbine (such as a Pelton wheel). The hydraulic motor or turbine drives an electrical generator.

In some hydraulic embodiments, the pulley/crankshaft assembly described above is repeated multiple times, so that there are multiple pulleys/capstans, each with its own mechanical assembly such as a crankshaft for transforming rotational motion into linear motion in an assembly of cylinder pistons. In some hydraulic embodiments, each of the pulley/crankshaft assemblies is associated with its own hydraulic motor or turbine, and with its own electrical generator, so that there are multiple hydraulic motors/turbines, and multiple electrical generators.

In some hydraulic embodiments, a rotary piston pump, or rotary piston motor configured to be operated as a pump, is used in lieu of a crankshaft/cylinder assembly, to translate rotary motion of the pulley/capstan into pressure in the hydraulic fluid.

In some hydraulic embodiments, a hydraulic accumulator is utilized in the one or more hydraulic circuits to provide a power-buffering and power-storage function.

In some hydraulic embodiments, hydraulic fluid falling from a hydraulic turbine (such as a Pelton wheel) after striking said turbine collects in a reservoir and lubricates aforementioned crankshaft.

Mechanical

In some embodiments, a gearbox is used to convert low-rpm rotary motion of the capstan/pulley into high-rpm rotary motion for an electrical generator shaft.

Removable Module

In some embodiments, some parts of the power-take-off system are incorporated within a discrete, removable module for maintenance. In some such embodiments, a plurality of hydraulic cylinders are included in a removable module.

Buffering of Power

In some embodiments, at least one flywheel, pneumatic or hydraulic accumulator, or other mechanical energy storage system incorporated within the power-take-off system can buffer and/or smooth the mechanical inputs to the generator, so that they do not occur solely during, or are not so greatly concentrated during, the portions of the mechanical cycle when the inertial mass is being accelerated upward.

Fleet Angle Amelioration & Direction Rectification

A challenge is maintaining favorable "fleet angles" for the converter's flexible connector(s). A fleet angle can be defined as the angle of incidence of a flexible connector to the pulley sheave with which it is associated, or, more precisely the angle of incidence of a flexible connector to a pulley's plane of rotation (a plane normal to a pulley's axis of rotation), relative to the optimal or nominal design angle. Too large of a fleet angle can cause mechanical stresses and failure modes such as abrasion of the flexible connector and/or wear of the mechanical components of the power-take-off system.

We have devised two classes of improvement to provide for consistently satisfactory fleet angles.

Direction Rectifying Flotation Module

A first class of improvements involves the use of a "direction rectifying flotation module." A direction rectifying flotation module is one whose shape and center of mass are selected to allow the flotation module to rotate relatively freely in the water, at least when the flotation module's orientation is within certain angular limits. In other words, the flotation module is neutrally stable, marginally stable, or marginally unstable, again, at least when its orientation is within certain angular limits (e.g. rotated no more than 20 degrees from its nominal orientation). Stated a different way, a direction rectifying flotation module has a shape and mass distribution chosen to provide a small or zero restoring moment within certain angular bounds, so that the flotation module can be induced to rotate in the water with a relatively small force/torque, and so that waves in the water induce little if any pitch and/or roll, even if large and highly sloped.

And, the location(s) of the at least one pulley/capstan is/are chosen so that they can (collectively, if applicable) apply a torque to the flotation module to rotate it under certain circumstances, particularly at times when a large tension exists in the flexible connector, to correct for any fleet angle misalignments.

The preferred flotation module form having these properties is one wherein the bottom surface of the flotation module has a shape approximating that of an inverted "spherical dome"—i.e. has a curvature like a segment or arc of a sphere. The approximately spherical contour should extend above the nominal waterline by some distance, so that in large waves, the rising waterline encounters an outer surface profile of the flotation module that is approximately spherical. In some embodiments, the equipment and hull of the flotation module are arranged so that the center of mass of the flotation module is near the geometric center of the sphere approximately defined by the aforementioned sphere-like bottom surface of the flotation module. In some such embodiments, the center of mass is within 20% of one radius from the geometric center of the sphere approximately defined by the aforementioned sphere-like bottom surface of the flotation module.

In some embodiments, the bottom of the flotation module has a shape approximating that of a horizontal cylindrical segment.

It is to be understood that a flotation module need not have a precisely spherical or cylindrical bottom surface in order to fall within the scope of the current disclosure.

In some embodiments having a direction rectifying flotation module, at least one pulley/capstan is located at a bottom portion of the flotation module, so that a tension in the flexible connector causes a nominal vertical axis of the flotation module to rotate into closer alignment with a line passing through the flotation module and the inertial mass. The further the at least one pulley/capstan is located from the center of rotation of the flotation module, the greater will be the torque imparted to the flotation module with respect to its center of rotation, and the more effective the aligning moment will be.

In some embodiments having a direction rectifying flotation module, a plurality of pulleys/capstans are spaced from the center of the flotation module, e.g. at an outer circumference thereof, and are controlled to collectively apply a torque that rotates the flotation module into closer alignment with a line passing through the flotation module and the inertial mass.

The direction rectifying flotation module uses the fact that an appropriately shaped floating object can behave as if it is on a highly effective "ball joint", "gimbal", or bearing by using the water itself as the bearing surface. If a flotation module with a requisite "circular" shape (e.g. hemispherical, spherical, cylindrical, hemi-cylindrical) is paired with power take off units mounted at its bottom portion, or some horizontal distance from its center, e.g. at its horizontal periphery, such that these power take off units can collectively apply a net torque to the flotation module, either passively when a tension increases in the flexible connector, or under the influence of a control system or mechanical governor; then the flotation module will be consistently oriented so that its "inertial mass alignment axis" (or "vertical axis") points toward the inertial mass (at least approximately). This design strategy significantly reduces the "fleet angle problem."

In particular, we give the flotation platform a circular or arc-like cross section in at least one vertical "reduced-stability plane" (e.g. by giving it a hemispherical or hemi-cylindrical shape, or a cylindrical or hemi-cylindrical shape, or other 3D shape having a 2D circular or arc-like cross section in at least one vertical plane), and preferably we place the center of mass of the flotation module relatively close to a hydrostatic "metacenter" of a said circular or arc-like profile, i.e. relatively close to an axis around which the flotation module's center of buoyancy will tend to rotate. A flotation module with said shapes is relatively hydrostatically unstable in said at least one "reduced-stability plane." This hydrostatic instability entails that the flotation module experiences relatively little buoyant restoring moment/torque about at least one horizontal axis, no matter the wave conditions. The flotation module's tendency to pitch and/or roll due to forces from waves is significantly reduced, if not eliminated, at least in the relevant vertical plane(s). A flotation module with this sort of reduced stability or (at least partially) unstable hydrostatic profile requires relatively little torque to cause it to rotate in the water to any desired angle, at least in the relevant vertical plane or planes, at least within a predetermined range of angles. The flotation module's pitch and roll can then be controlled and regulated to help solve the fleet angle problem. In some embodiments, the flotation module's pitch and roll (i.e. its rotation) are regulated using the power take off units mounted on the flotation module, preferably some horizontal distance from the platform's lateral center. For instance, the platform's pitch and roll can be regulated by varying the tension in some flexible connectors relative to others, and/or by varying the torque or force applied by some power take off units relative to that applied by others. Owing to these differential forces/tensions, the flotation module experiences a torque, and can be rotated so that its relevant "inertial mass alignment axis" points toward the inertial mass. In some embodiments, no active control is required, because the power-takeoff pulley(s) are located at a bottom portion of the flotation module. Note that when the flotation module has the shape of a sphere or hemisphere (or other segment or section or other fraction of a sphere), the flotation module can be stable, neutrally stable, or unstable in all vertical planes.

Direction Rectifying Pulleys

In some embodiments, the fleet angle problem is addressed through the use of auxiliary "direction rectifying pulleys" that are each free to rotate about a relevant axis to ensure that the fleet angle to each direction rectifying pulley is minimized. In some embodiments containing multiple pulleys/capstans, multiple auxiliary direction rectifying pulleys are necessary to address the fleet angle problem. A cable passing over and through a direction rectifying pulley, and then onto a pulley of the power take-off system will always be presented to the pulley of the power take-off system at an approximately perfect fleet angle, thus maximizing the lifetime of both.

In embodiments having direction rectifying pulleys, there is no need for a direction rectifying flotation module. Consequently, the flotation module can be broad and flat, like a pancake, or can have other shapes providing advantageous hydrostatic, hydrodynamic, or structural characteristics.

Typically, individual direction rectifying pulleys are configured to rotate about an axis that is nearly collinear with the top groove of a power-take-off pulley with which the individual direction rectifying pulley is associated.

Tuning of Inertial Mass Effective Weight

In some embodiments, the device is configured with suspended weights, metal chains, and/or metal ropes disposed so that when the inertial mass is controlled to rise in the water column (decreasing both its depth and its separation distance to the flotation module), the inertial mass unavoidably "picks up," and supports a greater fraction of the net weight of, said suspended weights, chains, and/or ropes, than it did when it was at a greater depth. Consequently, the effective net weight of the inertial mass increases as its depth decreases; this allows for a greater magnitude of gravitational force to act on the inertial mass, especially when, in the course of its oscillations, it falls under gravity; this in turn can impart a greater momentum to the inertial mass and allow more power to be generated from a given sea state, assuming of course that the energy in the sea state does in fact support the dynamic suspension of an inertial mass having the effective net weight in question.

In some embodiments, the aforementioned suspended weights, metal chains, and/or metal ropes act on the inertial mass by depending from a bottom portion thereof. In some embodiments, the aforementioned suspended weights, metal chains, and/or metal ropes act on the inertial mass by draping against a top portion thereof. In some embodiments, the aforementioned suspended weights, metal chains, and/or metal ropes act on the inertial mass by accumulating in an interior portion or receptacle thereof.

Parked Depth

Inertial Mass Suspension Tether

In some embodiments, a tether is provided: (i) between (a) the restoring weight and (b) the inertial mass, or (ii) between (a) the restoring weight and (b) a portion of the flexible connector disposed between the flotation module and the inertial mass, or (iii) between (a) a portion of the flexible connector disposed between the restoring weight and the flotation module and (b) the inertial mass, or (iv) between (a) a portion of the flexible connector disposed between the restoring weight and the flotation module and (b) a portion of the flexible connector disposed between the flotation module and the inertial mass. Accordingly, the flexible connector "loops back on itself" and provides for a means of arresting the fall of the inertial mass even in the absence of waves and/or in the event that the power-take-off unit ceases applying a lifting force to the inertial mass.

Equilibrium Parked Depth

In some embodiments, when the inertial mass falls downward, moving outside of an operational separation distance range in which it previously oscillated, the device is configured so that weights and/or metal chains and/or metal ropes (and/or segments of metal chains and/or metal ropes) that previously depended from the inertial mass (at least predominantly), and that previously added their net or wet weight to that of the inertial mass, are instead "picked up" by, and shift their gravitational weight to (at least predominantly) one or more of the following: (i) a flexible connector containing, or depending from, the restoring weight, or (ii) a flexible connector depending directly from the flotation module. Accordingly, the effective net weight of the inertial mass decreases as its depth increases; and in some embodiments, the effective net weight of the restoring weight concomitantly increases as the depth of the inertial mass increases.

A result of this shifting of weight can be that the inertial mass's gravitational descent can slow and can ultimately cease, especially if weight is effectively added to the restoring weight, and hence acts against the inertial mass's gravitational descent.

Consequently, the inertial mass can experience a "soft landing" and attain a static equilibrium, or "parked," depth even in the absence of "hard stops" or hard mechanical constrains on its descent.

Valvular Inertial Mass

A valvular inertial mass can enable some embodiments of the disclosed converter to reliably and passively assume a "safe mode" configuration in the event of a systems failure and/or upon receipt of a "go to safe mode" command from an operator or control system. In its "safe mode" configuration, the inertial mass can allow significant passage of water through its interior, e.g., along its vertical axis, e.g., across a horizontal plane. An inertial mass in "safe mode" can have an effective mass significantly smaller than its normal (standard operational) effective mass, and hence can offer significantly less resistance than its normal (standard operational) resistance to the upward acceleration of the flotation module. Such a passive "feathering" mechanism has the advantage of allowing the system to shed the energy of a storm even if its normal control systems inadvertently go offline.

Compacted Inertial Mass

A "compacted" configuration of some embodiments of the converter can enable safe and efficient transportation and deployment of the converter.

The figures and figure descriptions herein describe a number of different features of the disclosed converter. It is to be understood that these various features can be combined in combinations not disclosed in any single figure. That is, some embodiments of the disclosed converter can include features or aspects disclosed in a first figure as well as feature or aspects disclosed in a second figure, even though these features may not mutually co-appear in any single figure.

BRIEF DESCRIPTION OF THE DRAWINGS

FIG. 131 is a top down perspective view of an embodiment of the present invention;

FIG. 132 is sectional perspective view of the embodiment of FIG. 131;

FIG. 133 is a top down perspective view of an embodiment of the present invention;

FIG. 134 is sectional perspective view of the embodiment of FIG. 133;

FIG. 135 is a top down perspective view of an embodiment of the present invention;

FIG. 136 is a top down perspective view of the embodiment of FIG. 135;

FIG. 137 is sectional perspective view of the embodiment of FIG. 135;

FIG. 138 is a top down perspective view of an embodiment of the present invention;

FIG. 139 is a top down perspective view of an embodiment of the present invention;

FIG. 140 is a top down view of the embodiment of FIG. 139;

FIG. 141 is a side view of the embodiment of FIG. 139;

FIG. 142 is a back view of the embodiment of FIG. 139;

Figure 143:
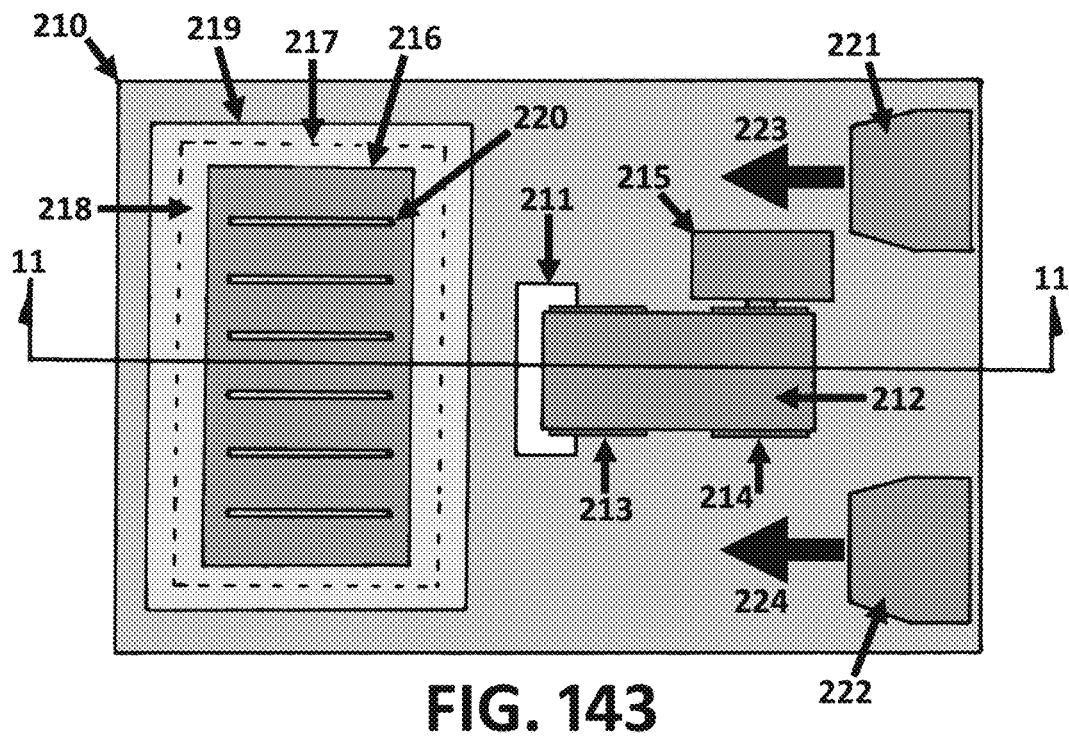
Figure 144:
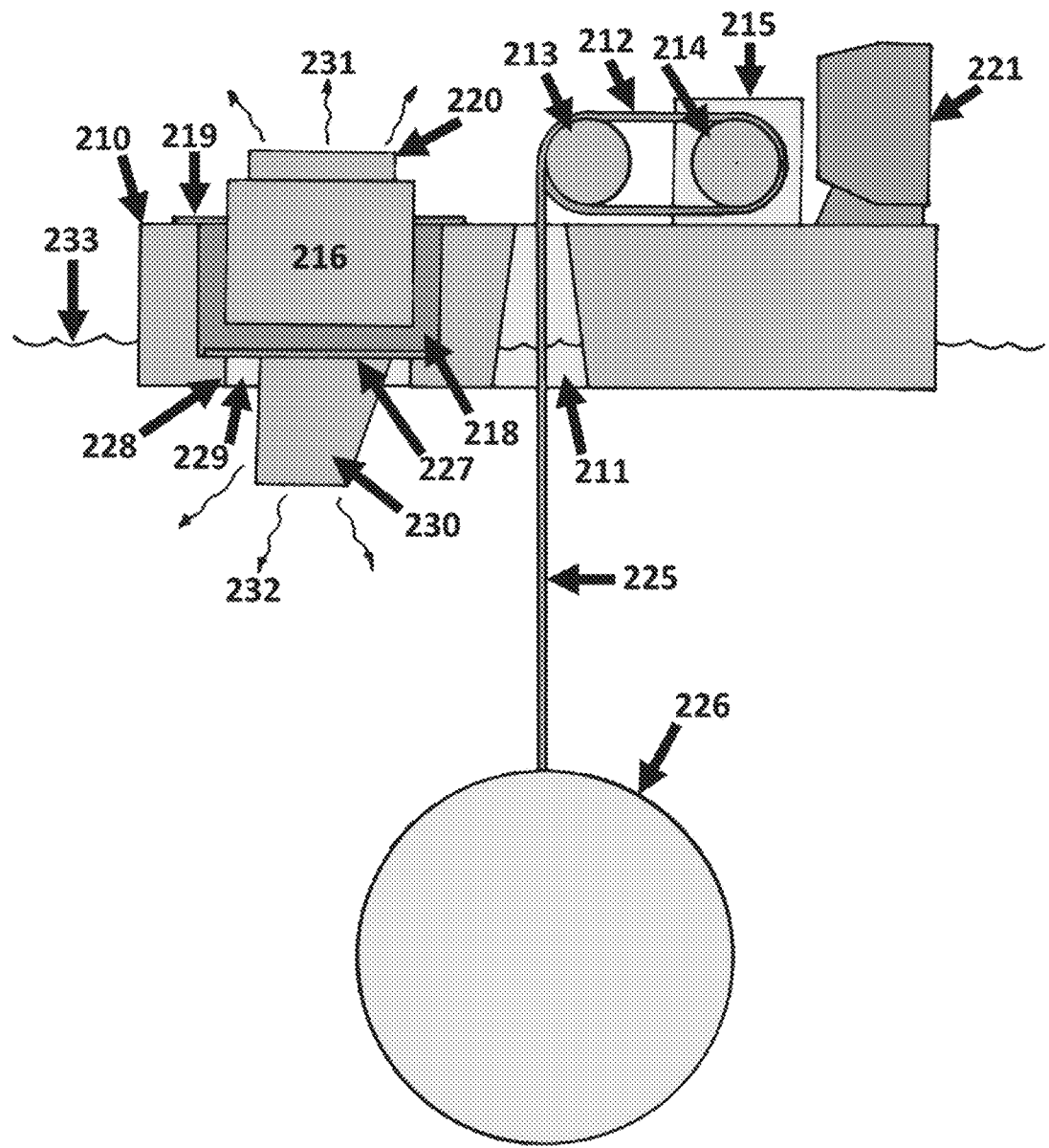
Figure 145:
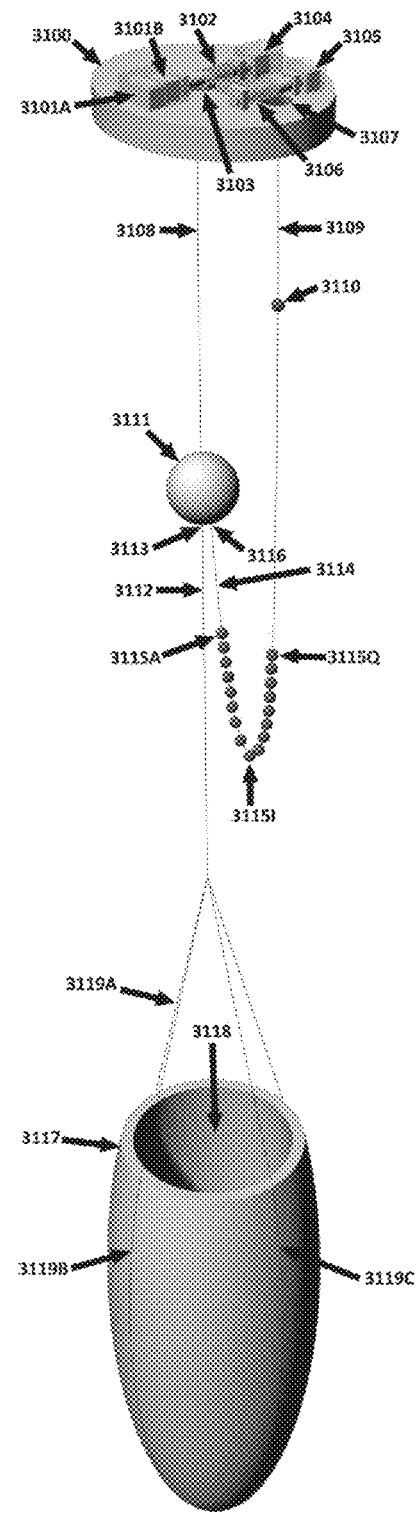
Figure 146:
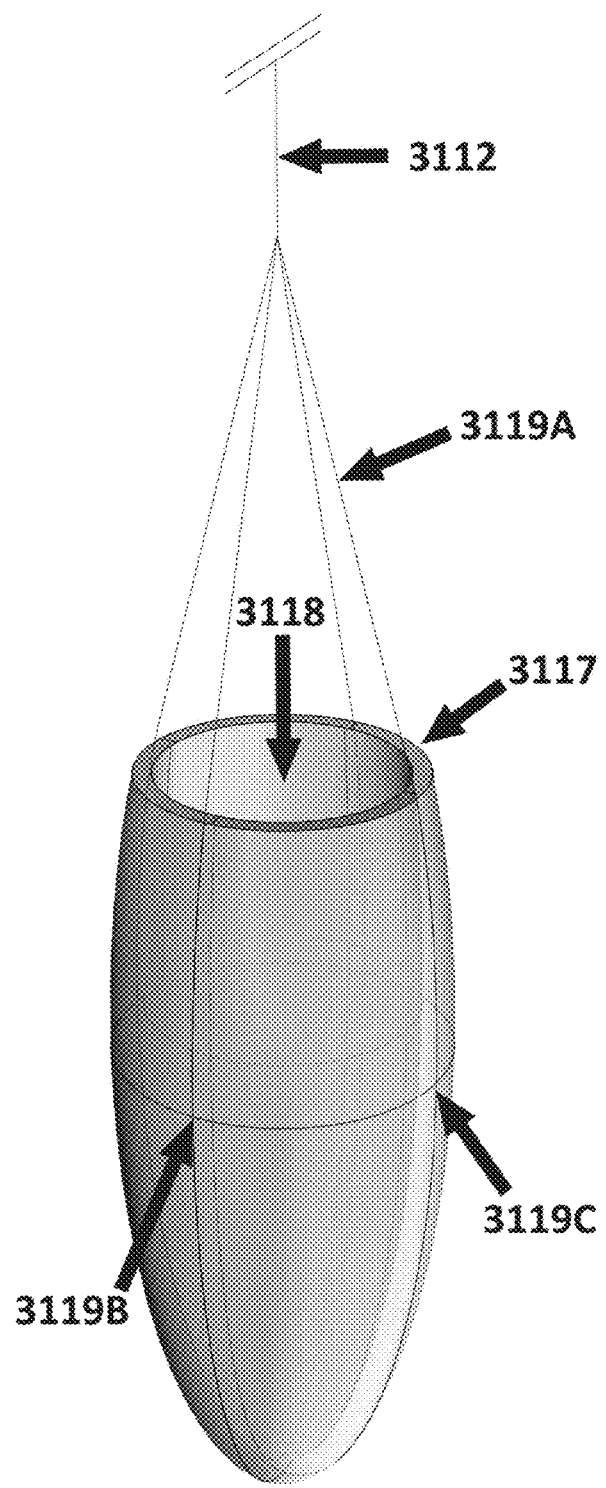
Figure 147:
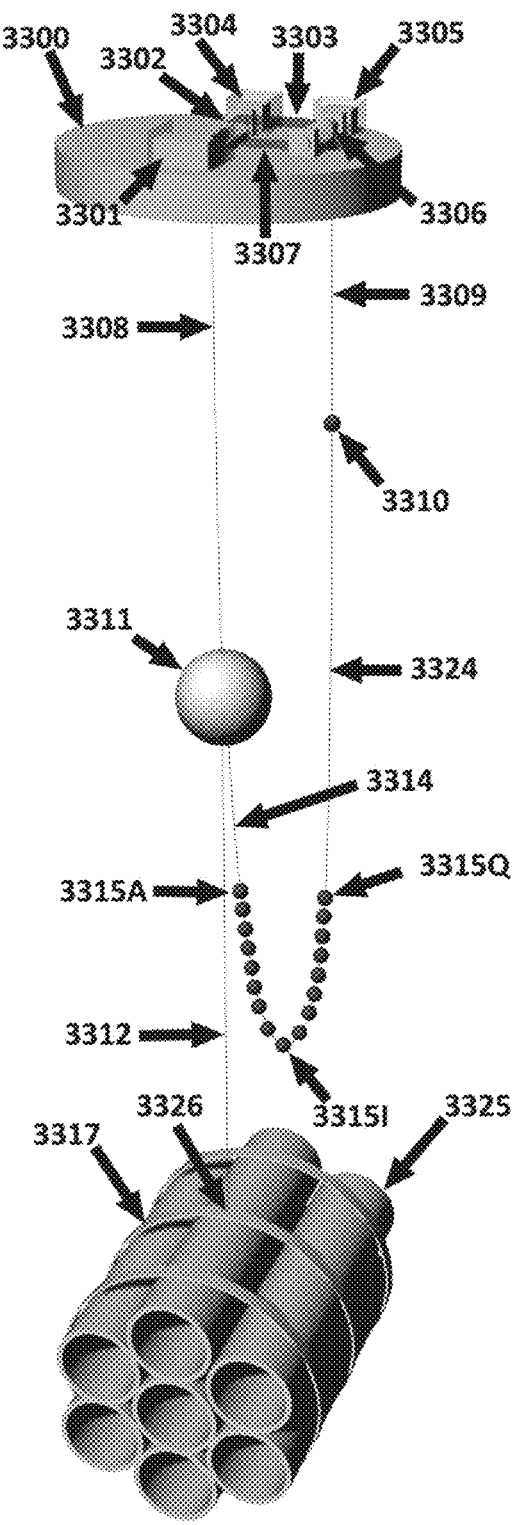
Figure 148:
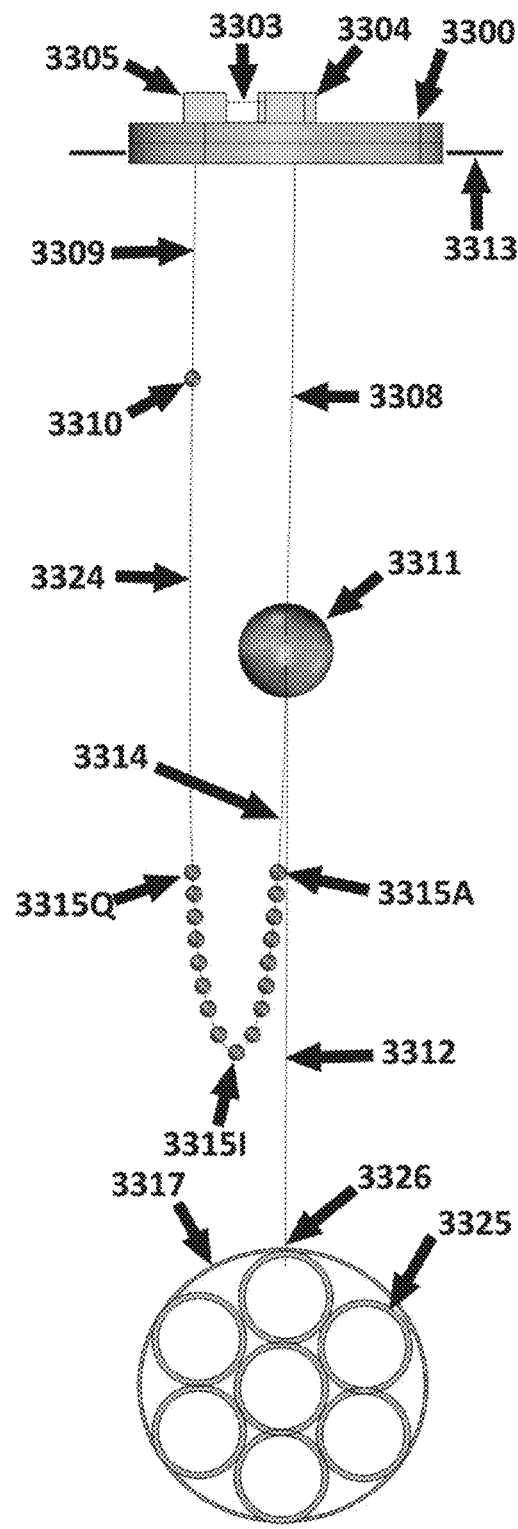
Figure 149:
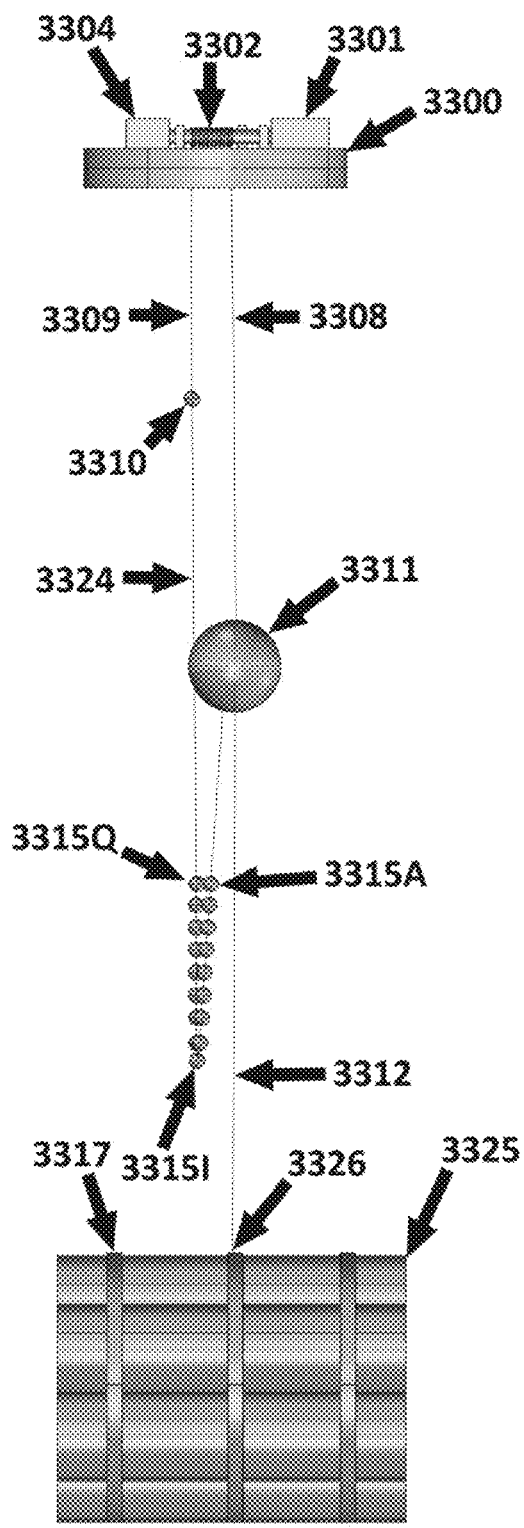
Figure 150:
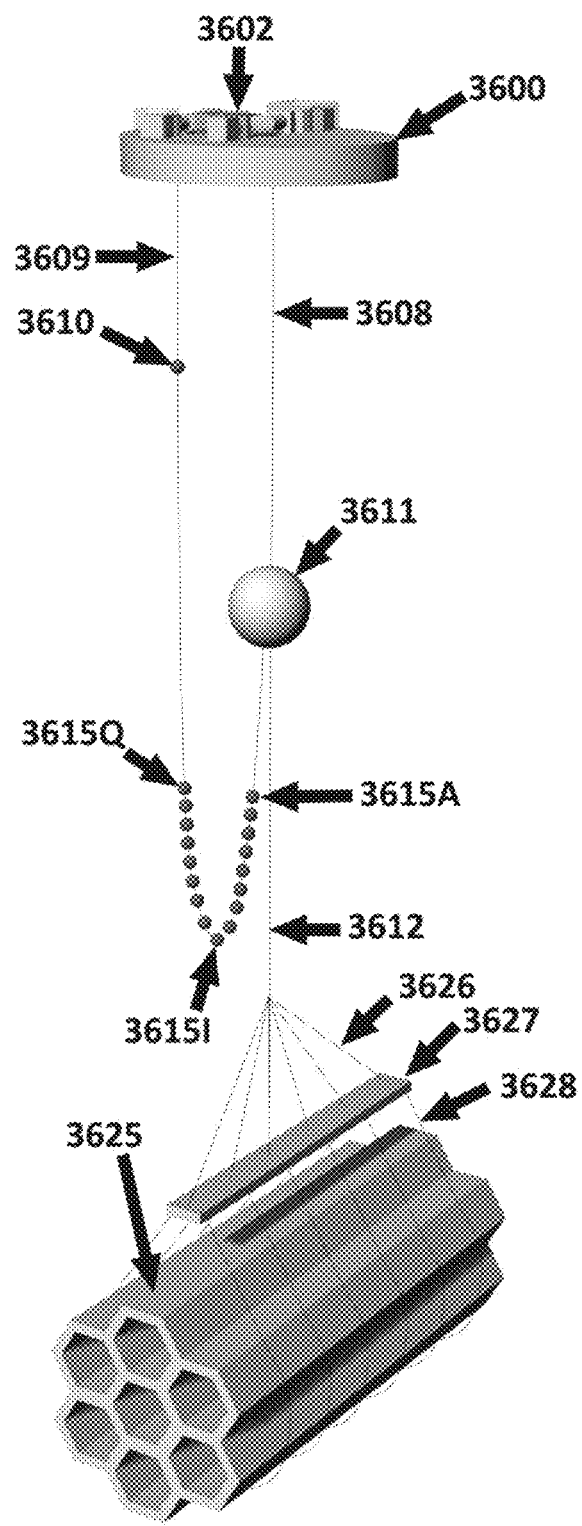
Figure 151:
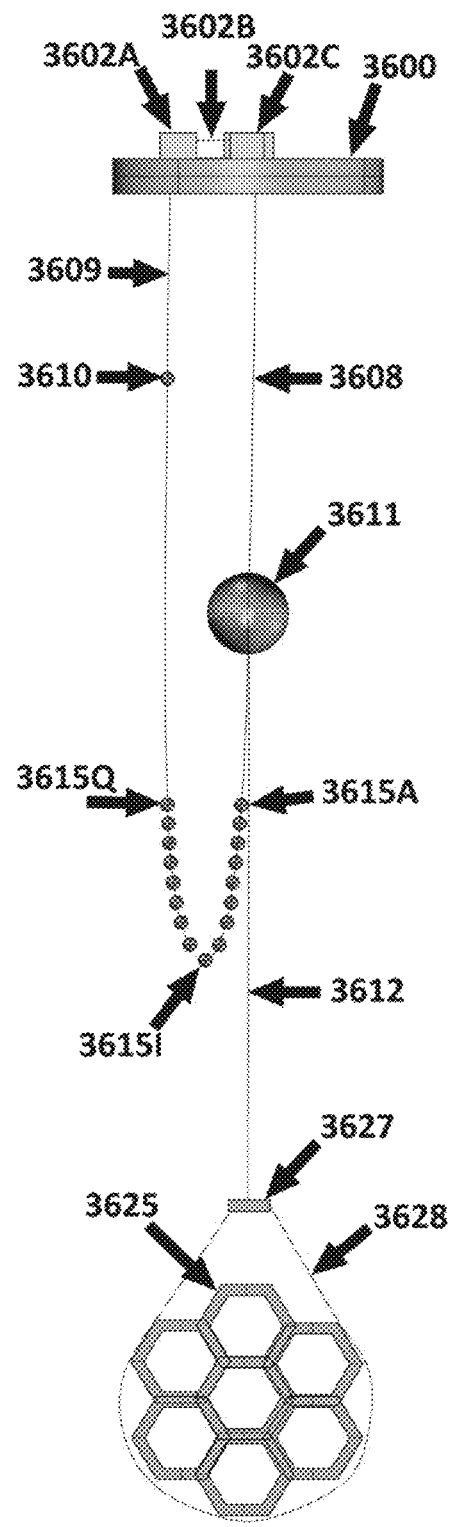
Figure 152:
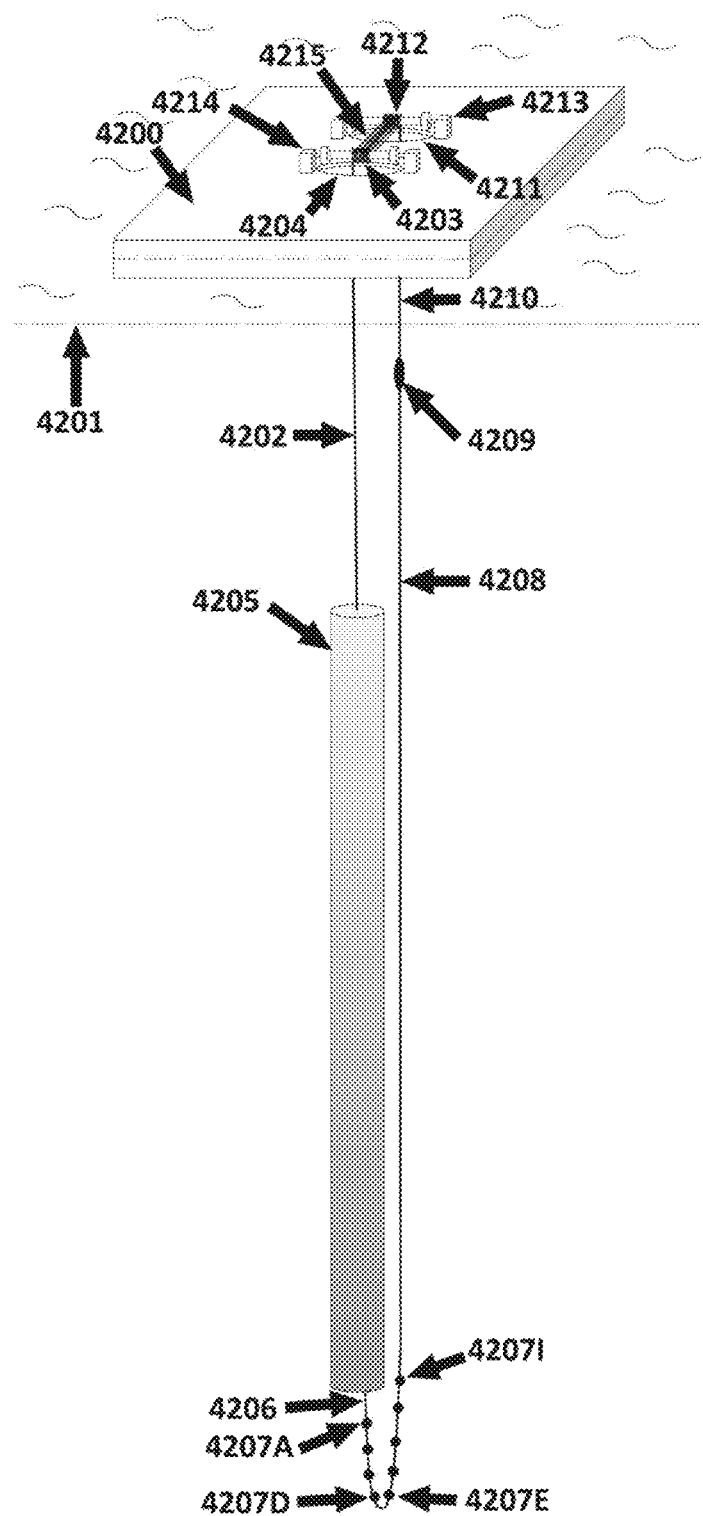
Figure 153:
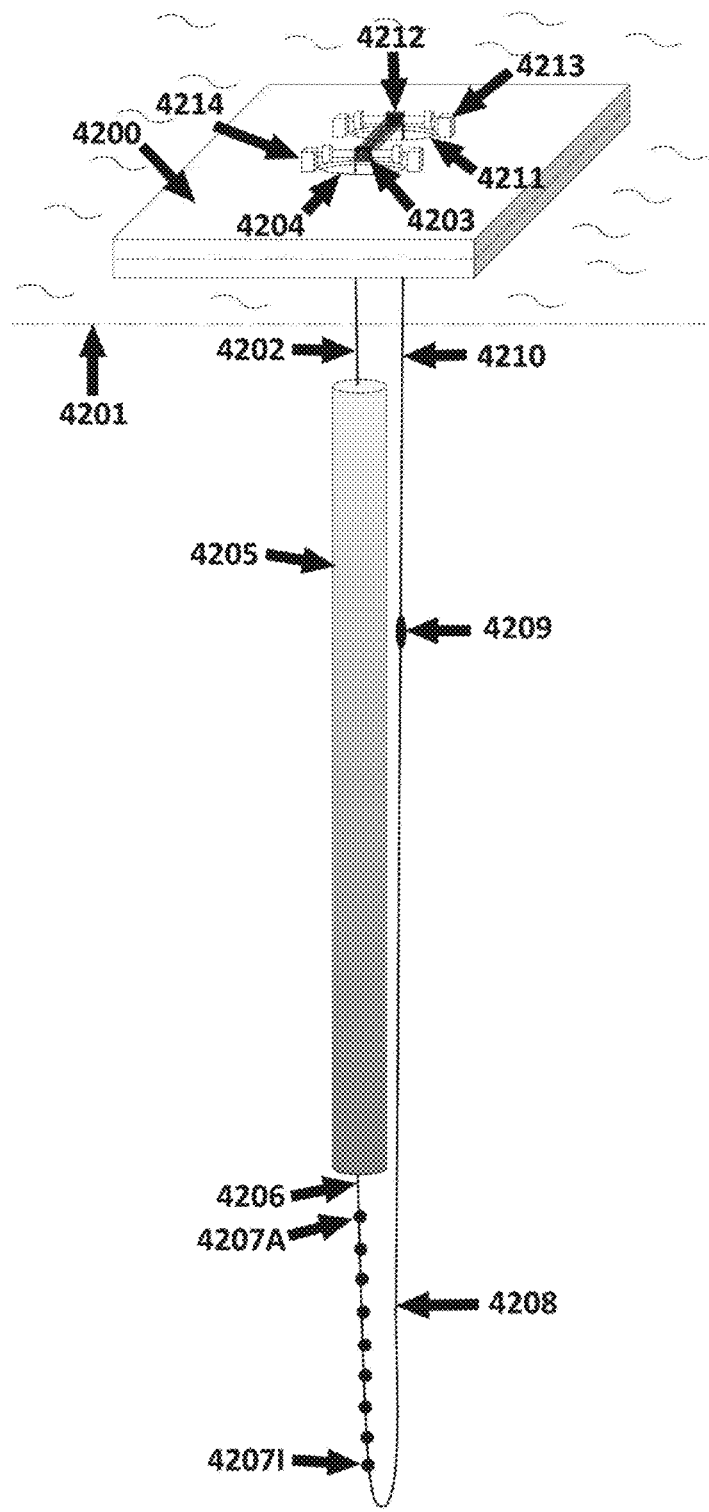
Figure 154:
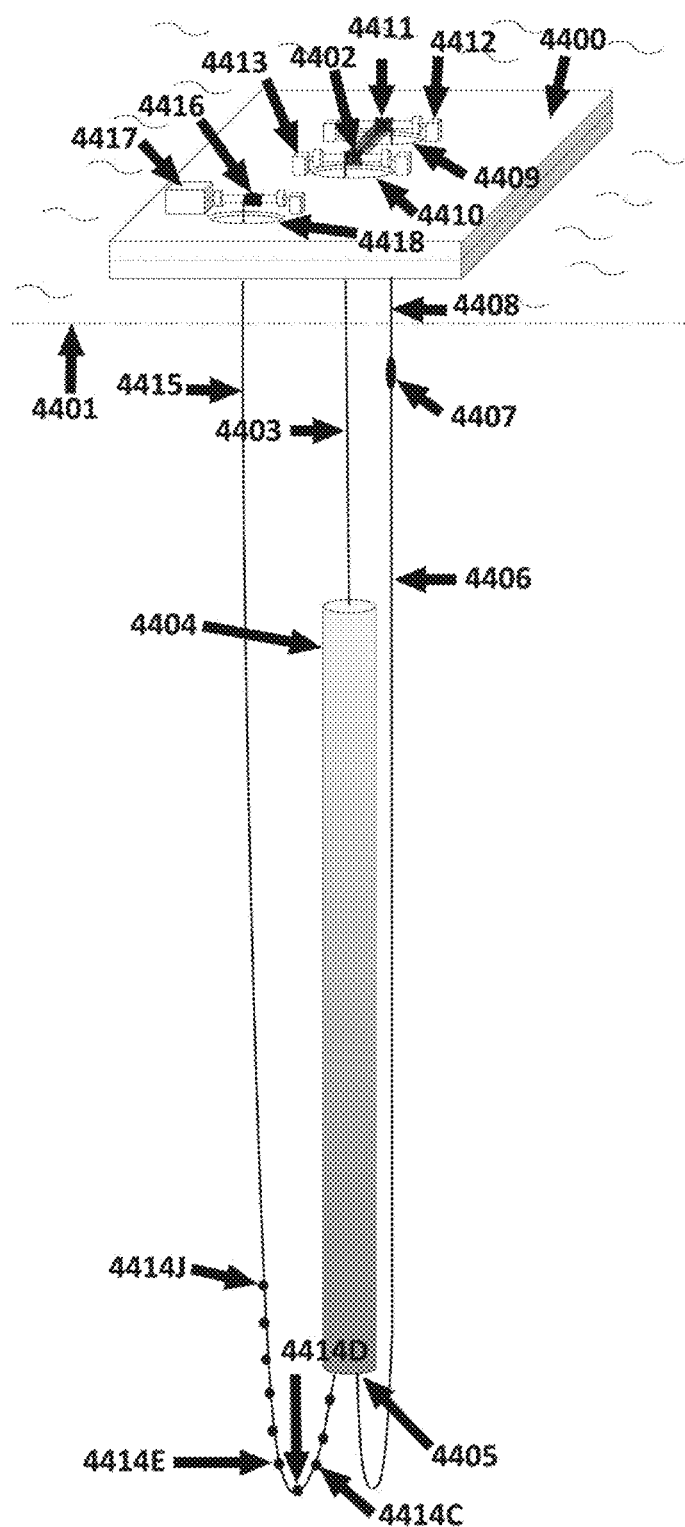
Figure 155:
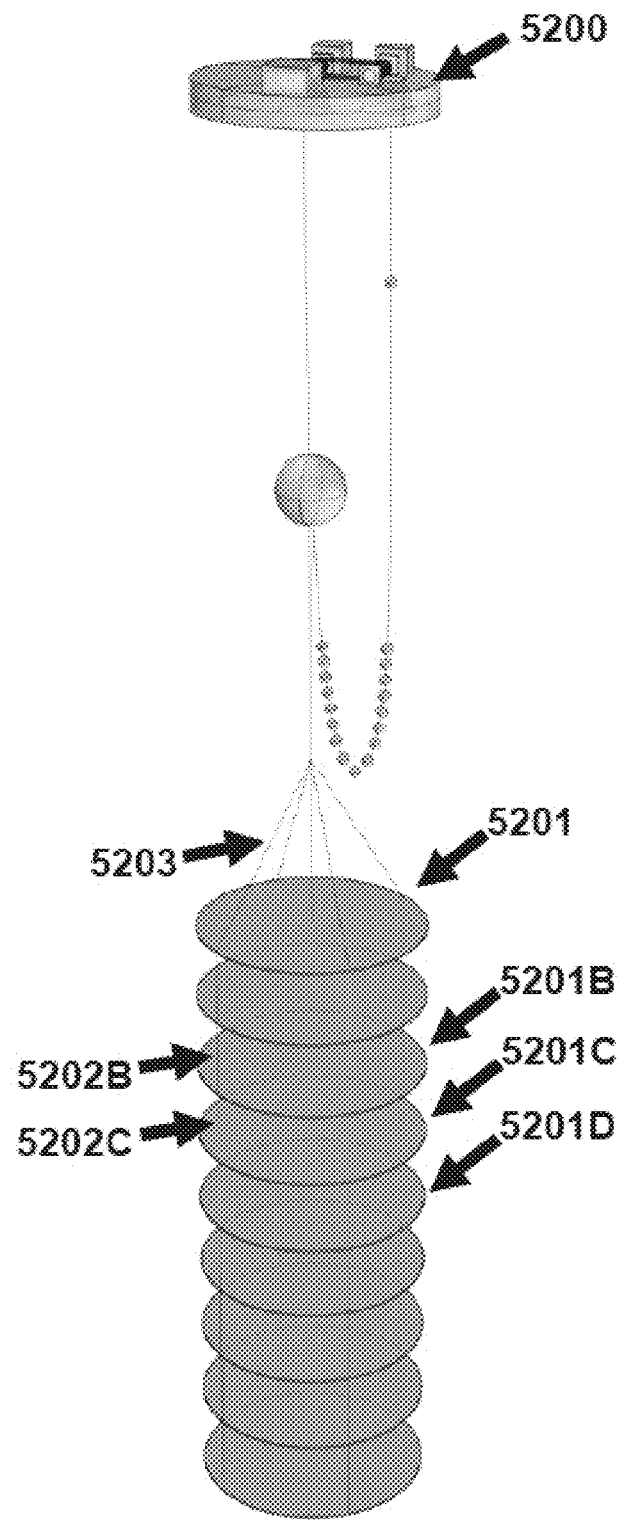
Figure 156:
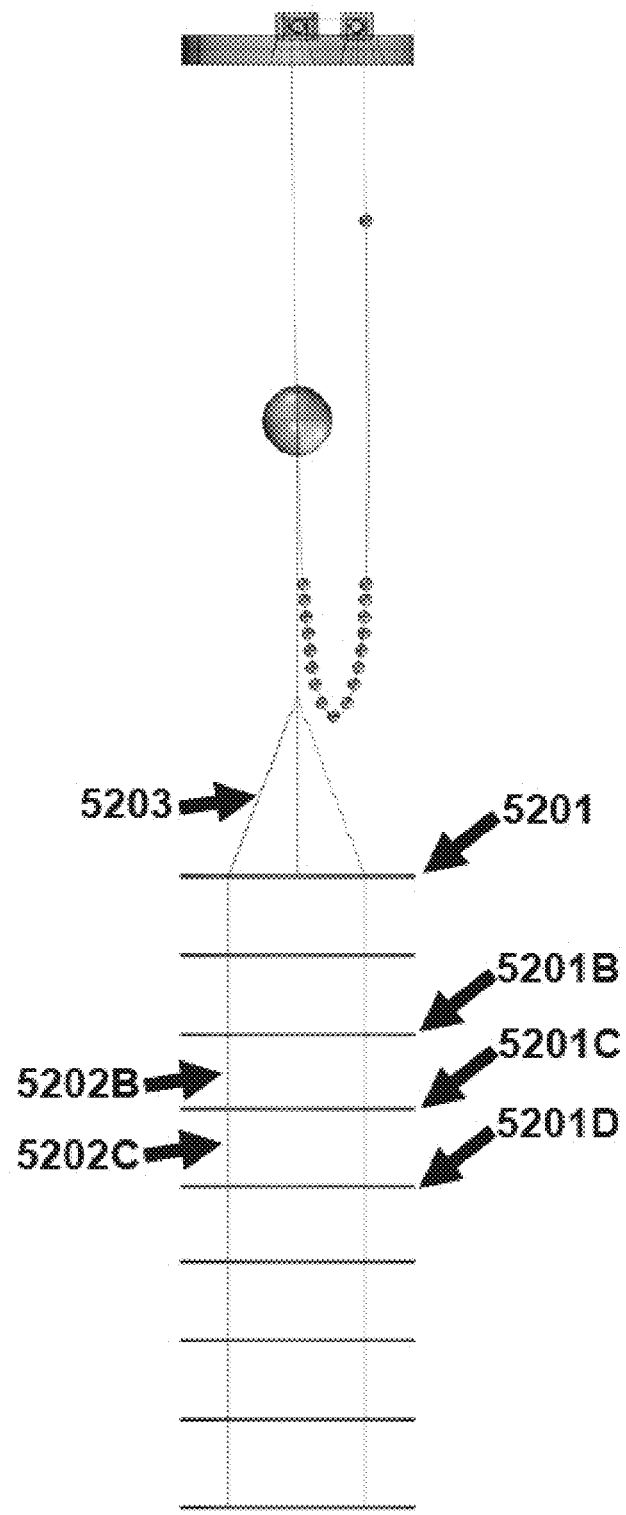
Figure 157:
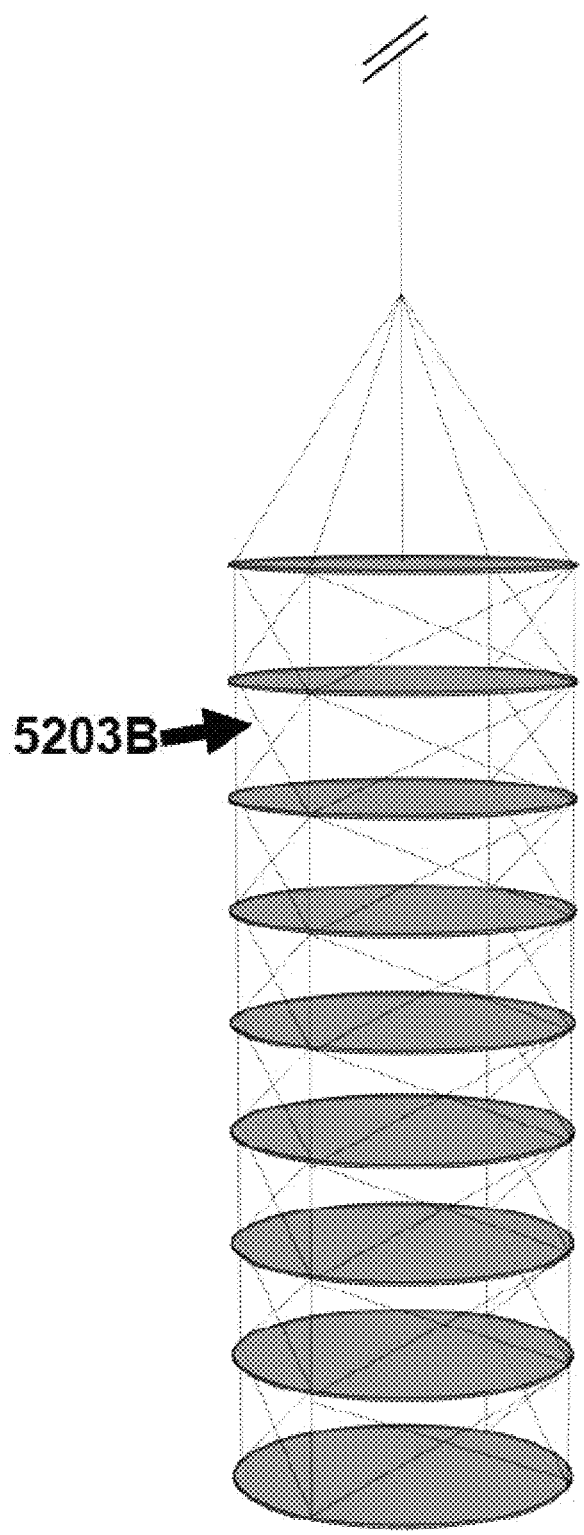
Figure 158:
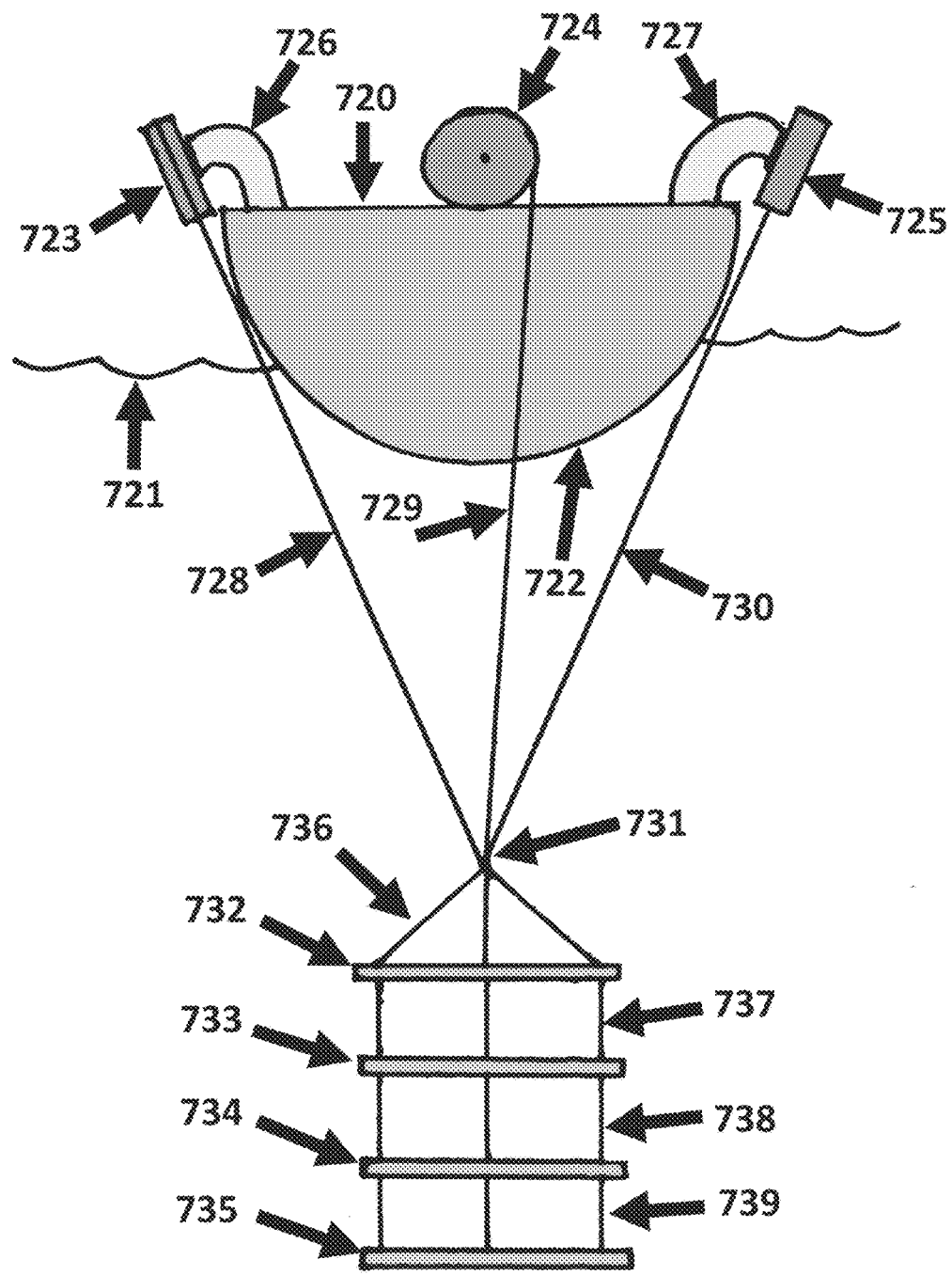
Figure 159:
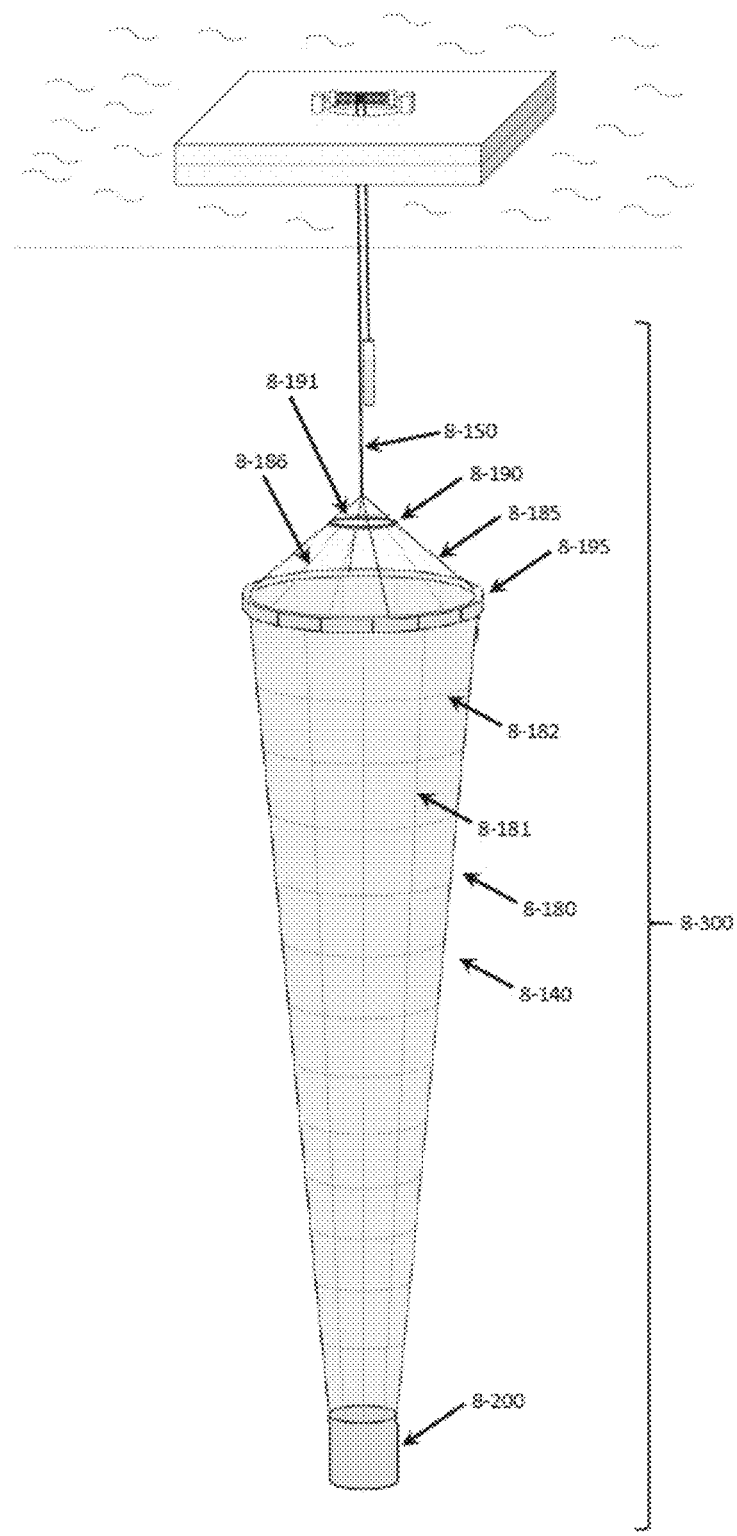
Figure 160:
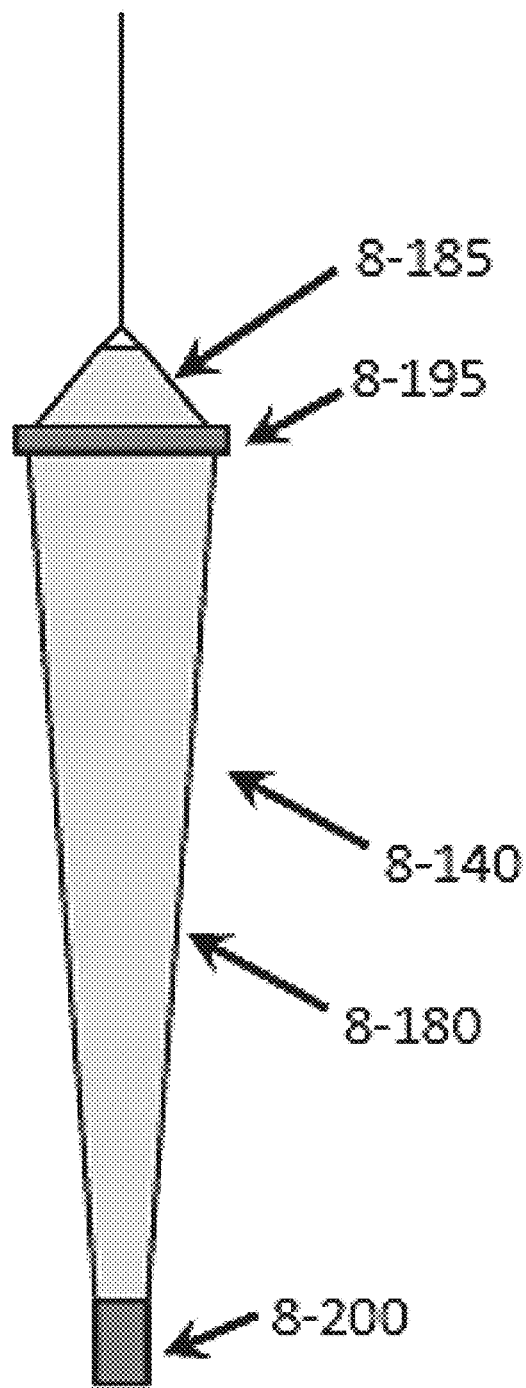
Figure 161:
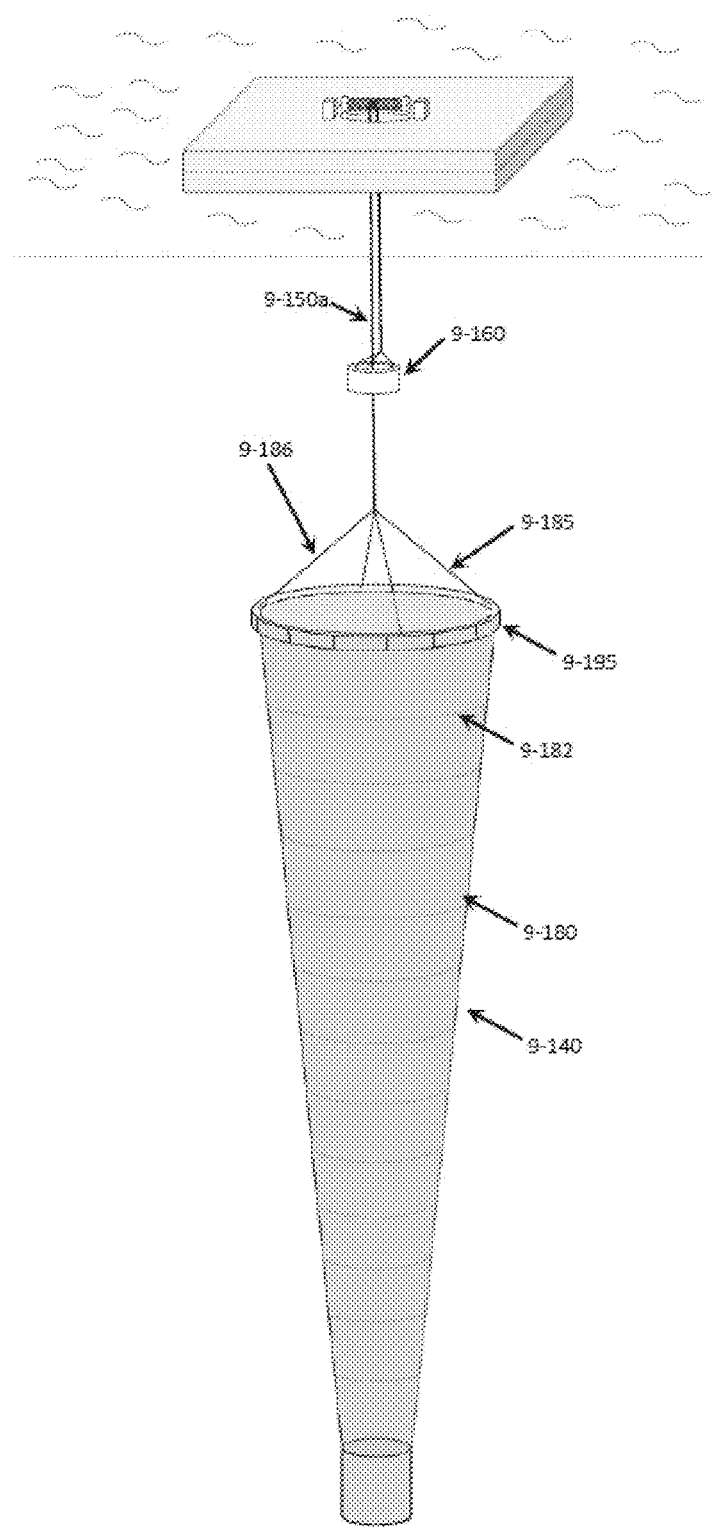
Figure 162:
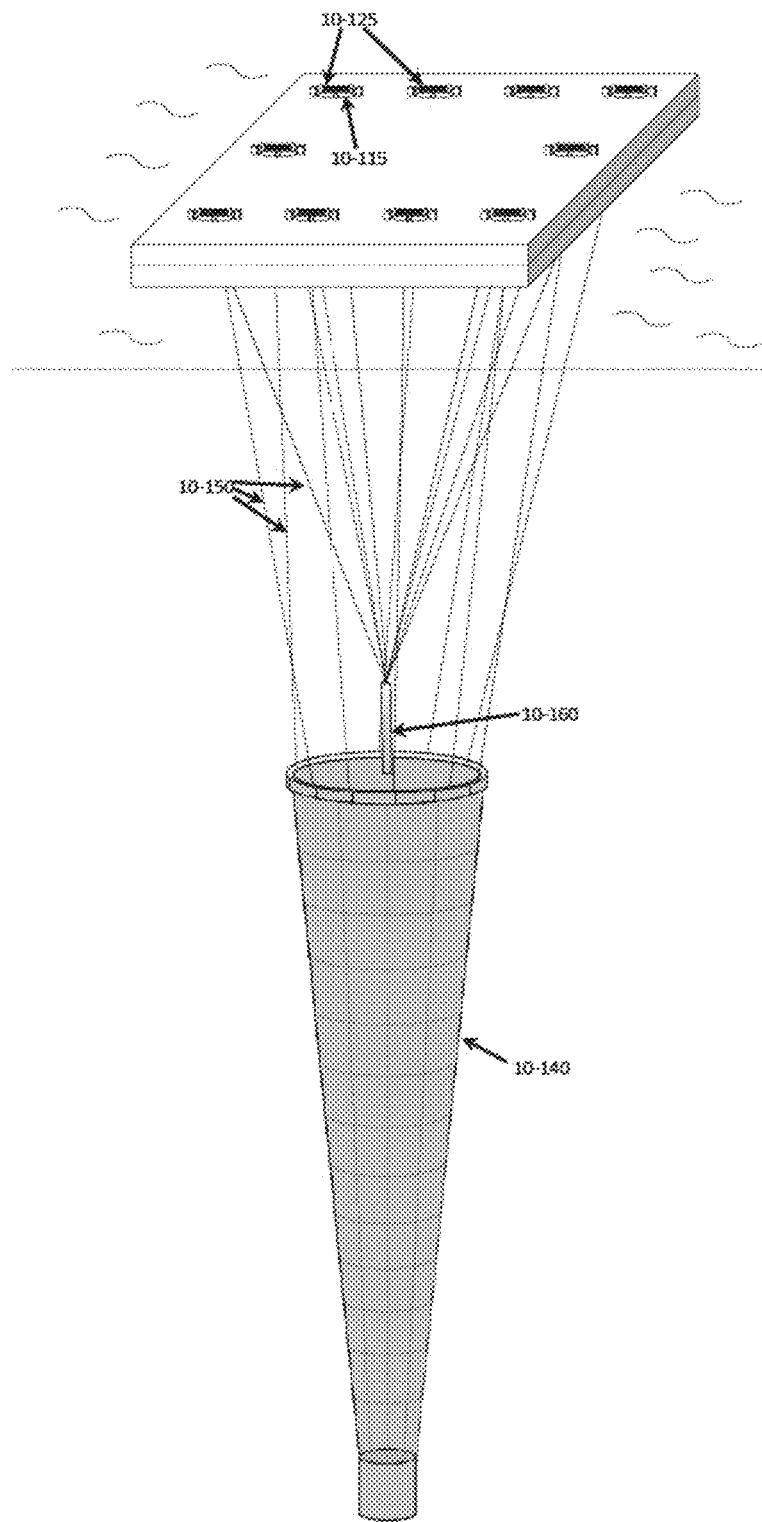
Figure 163:
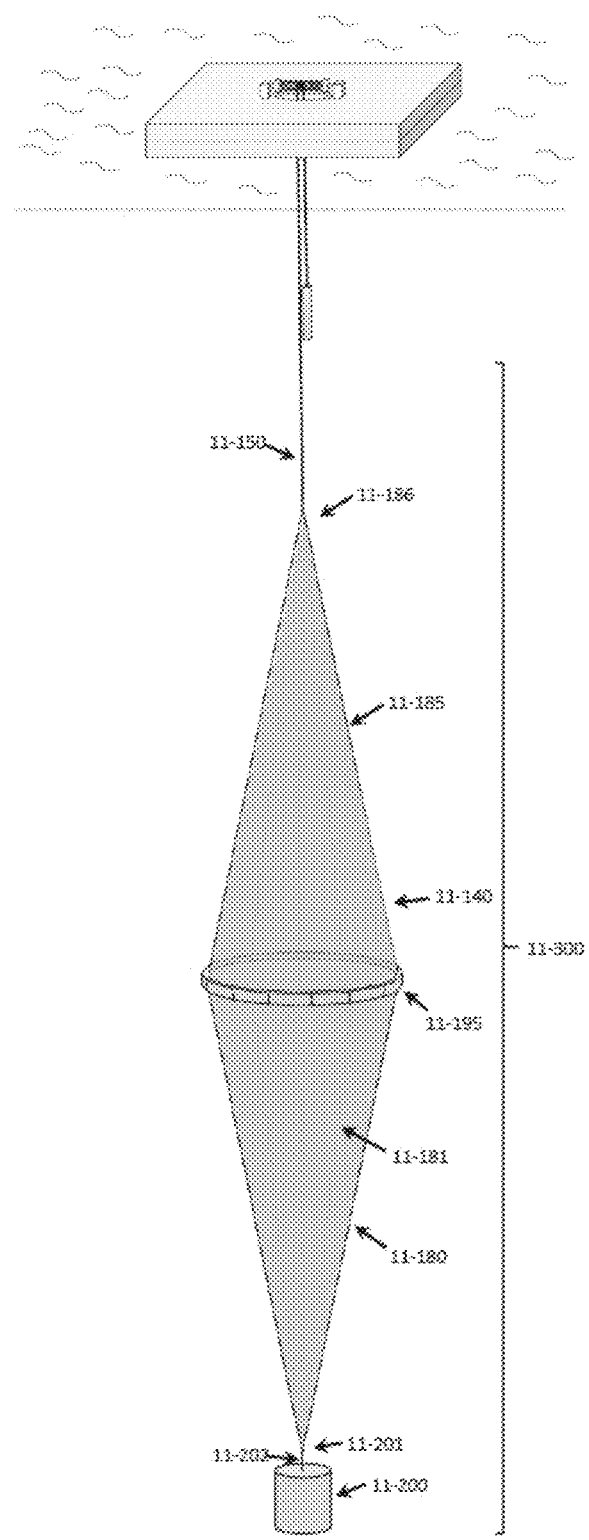
Figure 164:
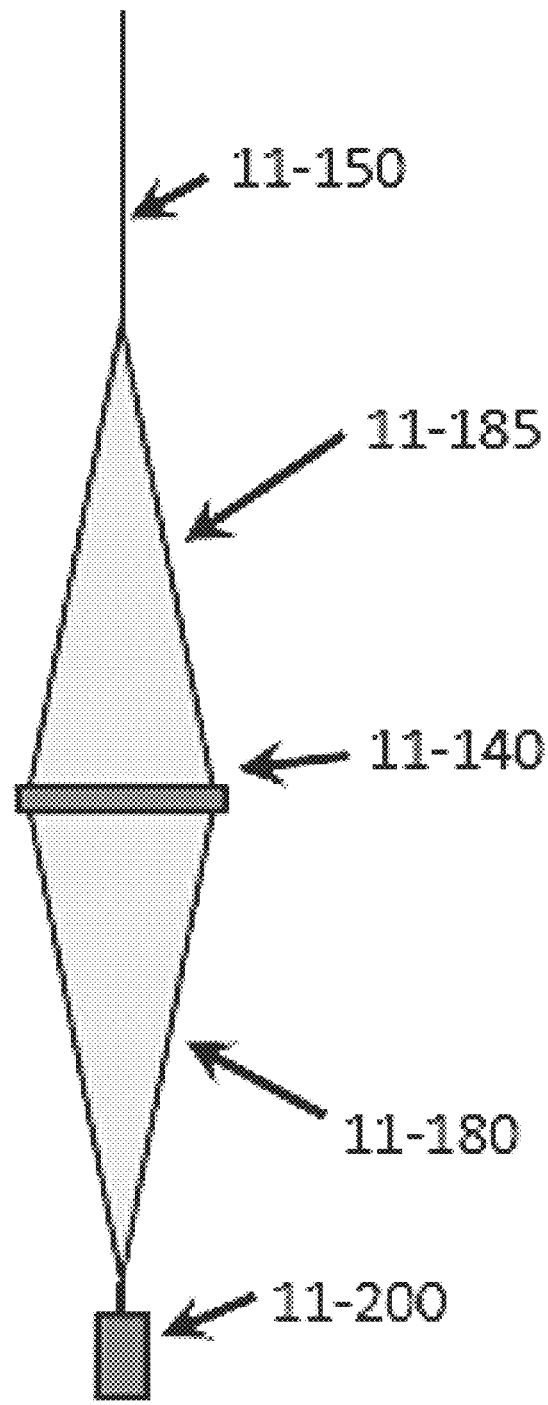
Figure 165:
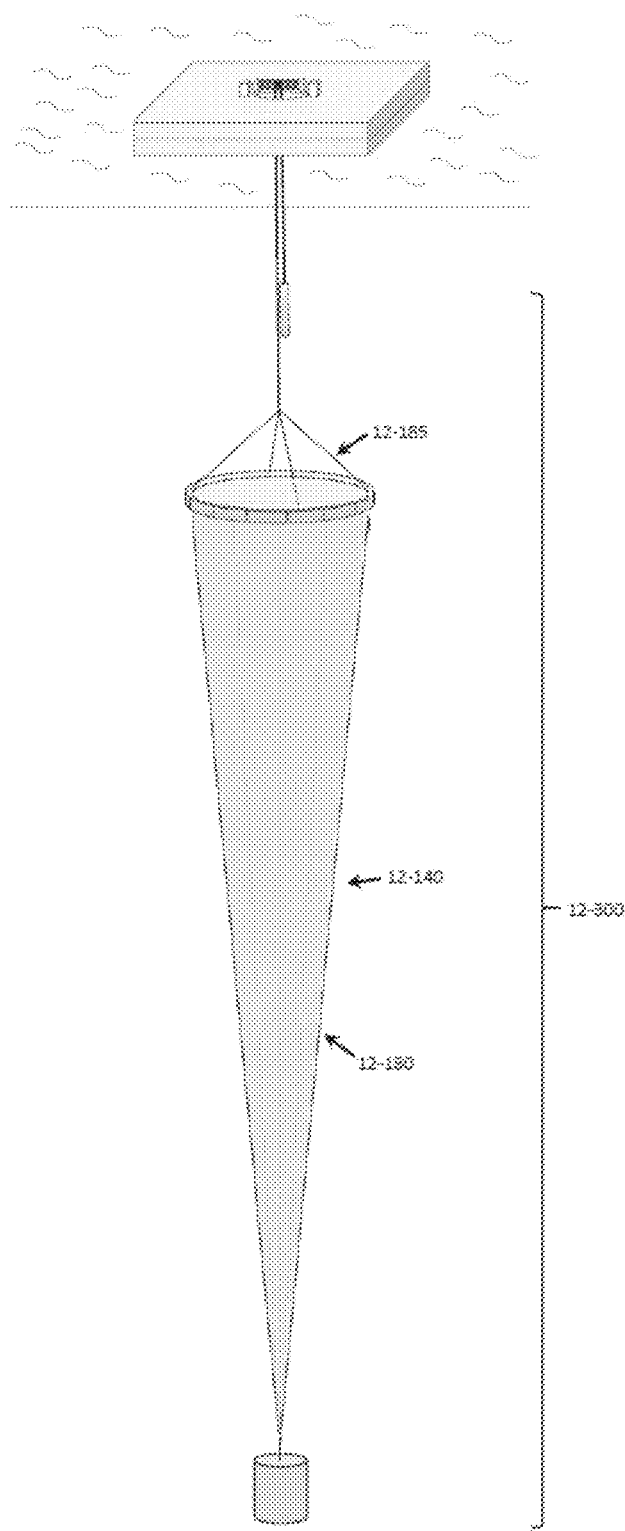
Figure 166:
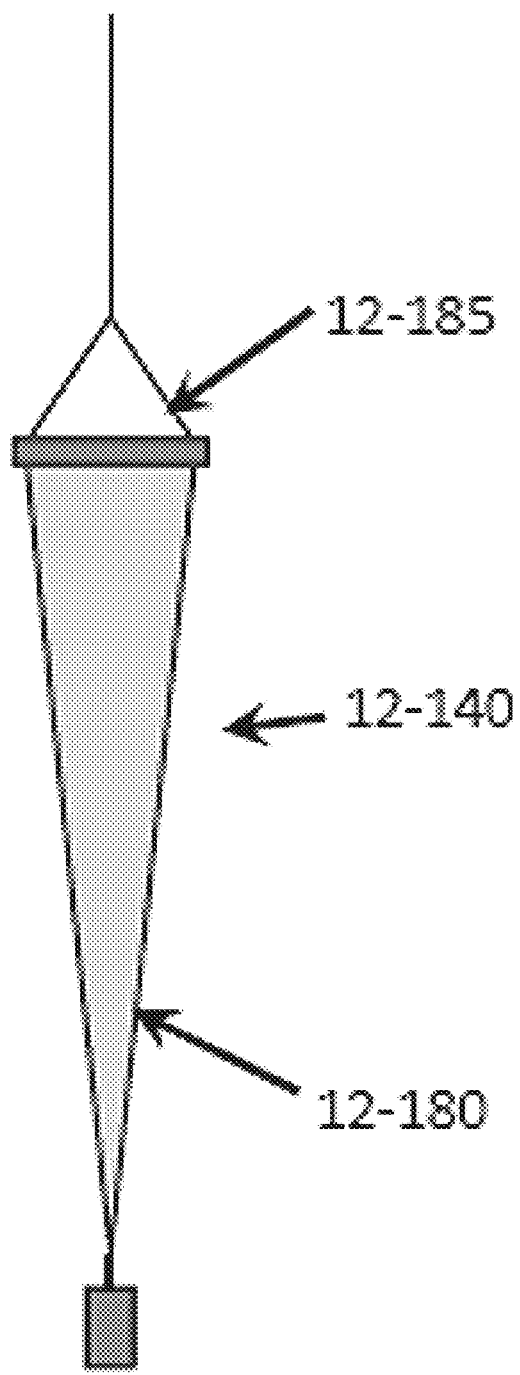
Figure 167:
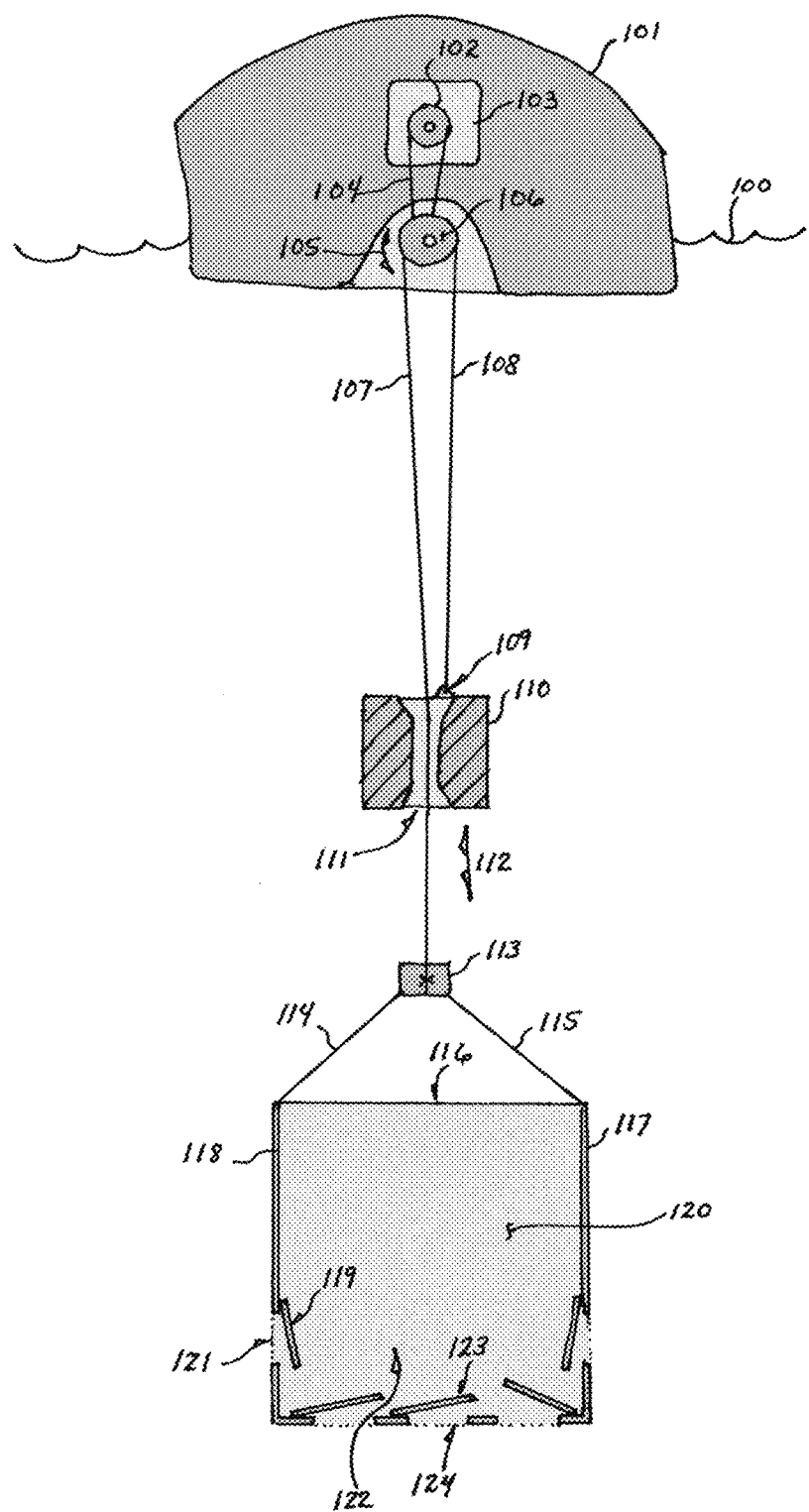
Figure 168:
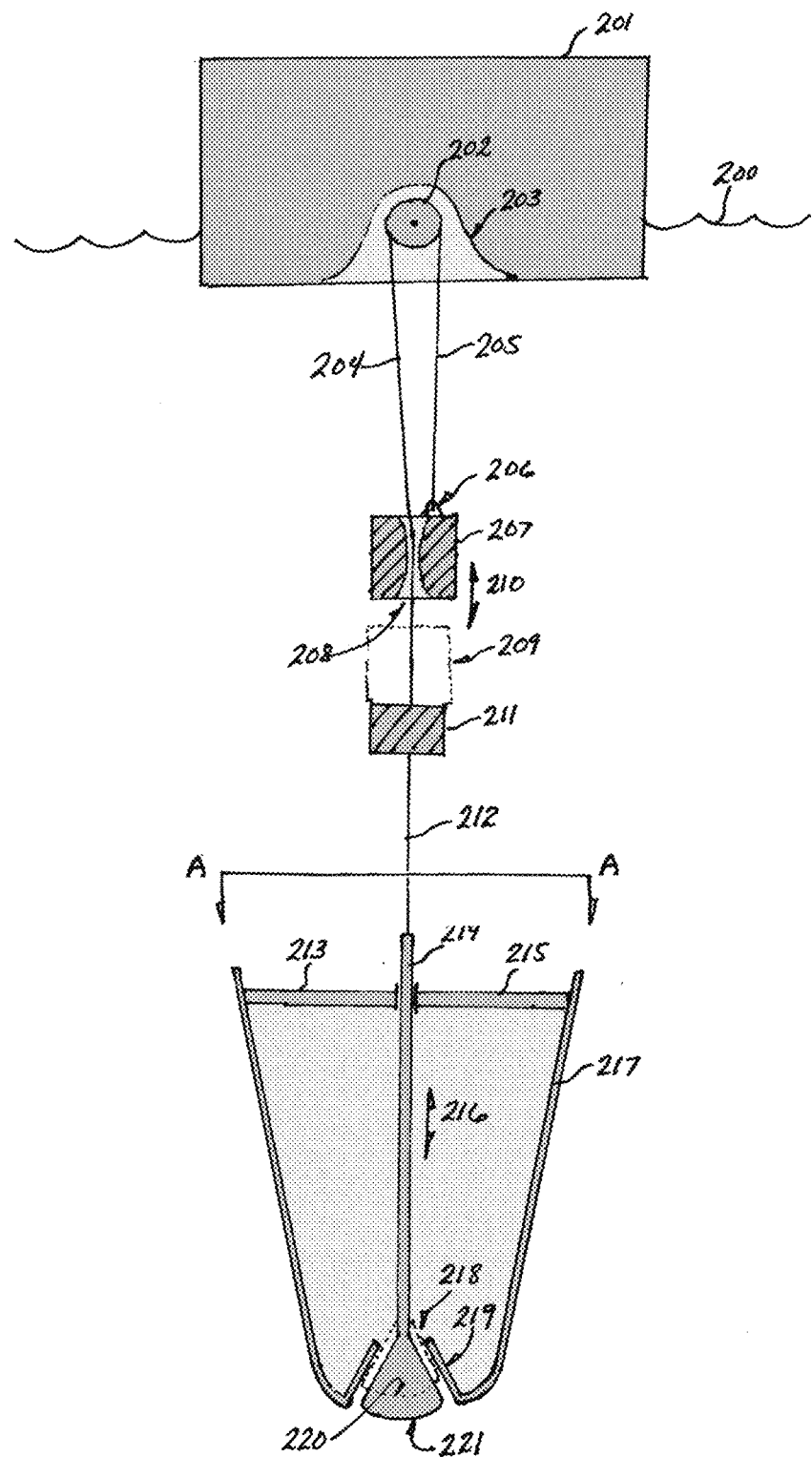
Figure 169:
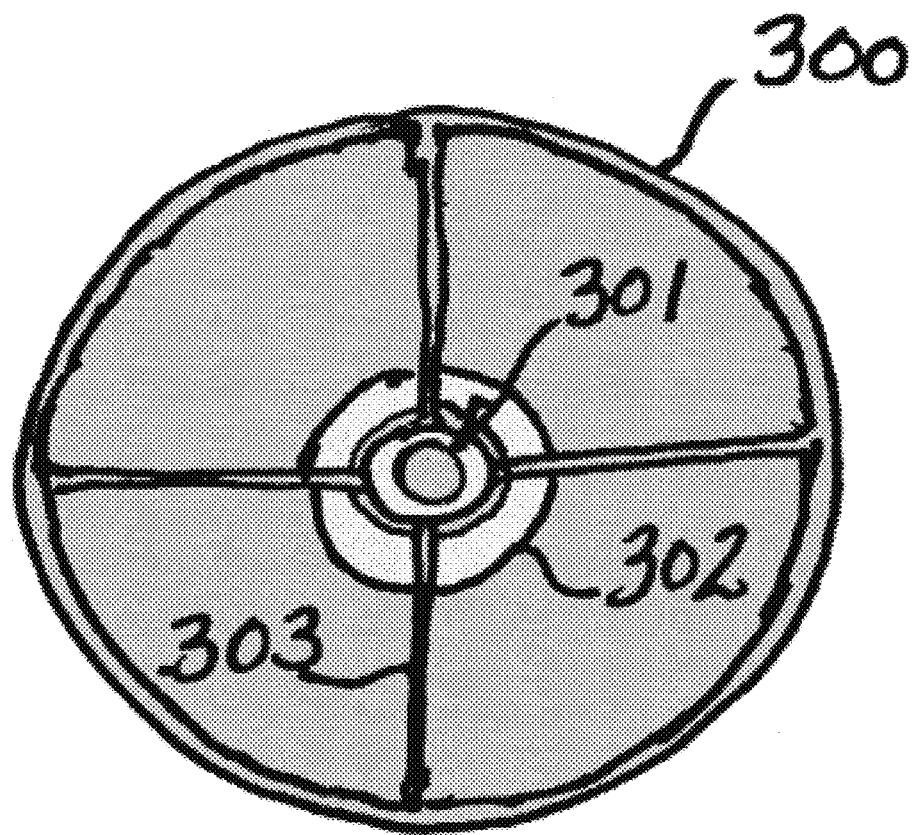
Figure 170:
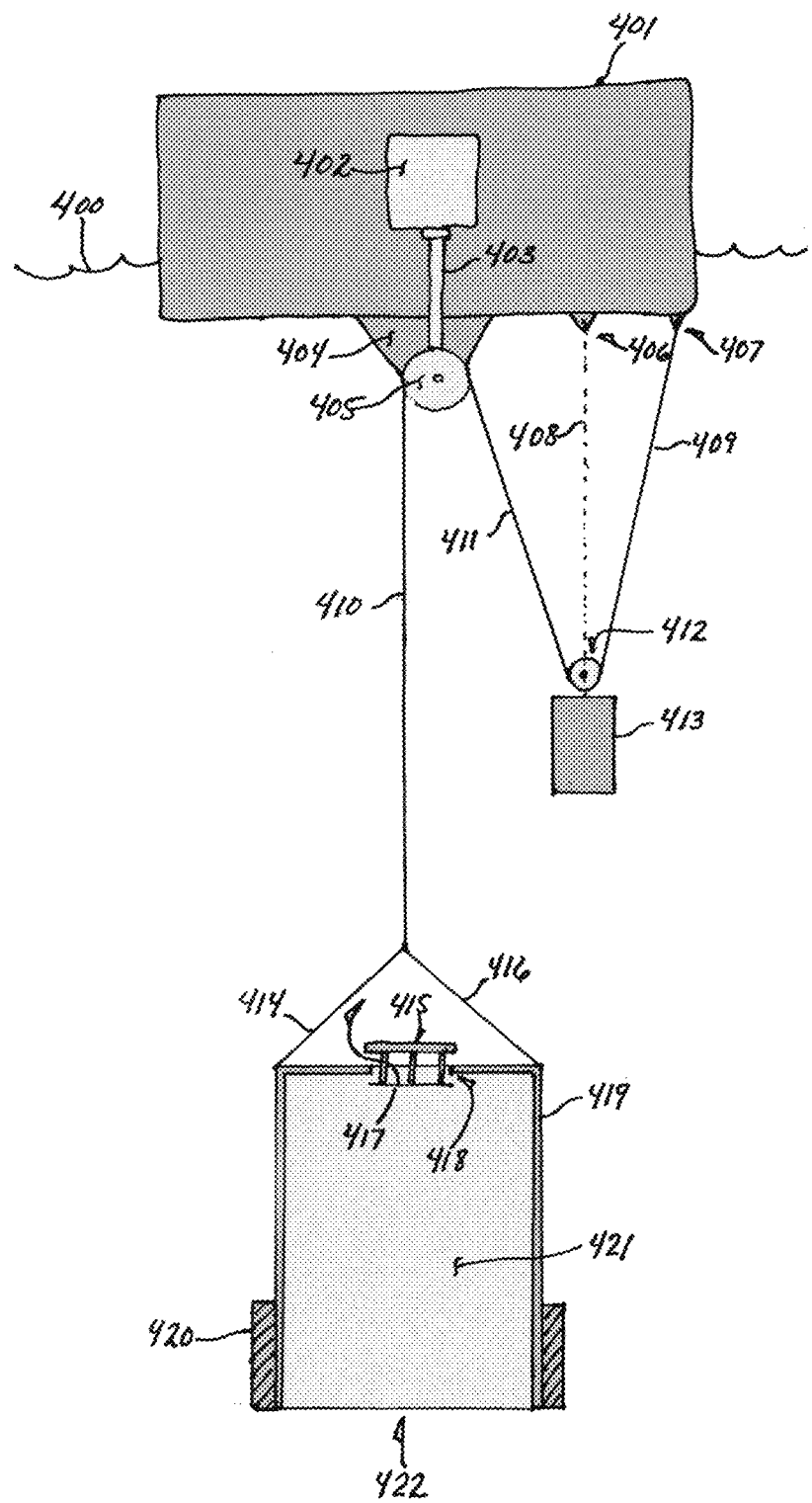
Figure 171:
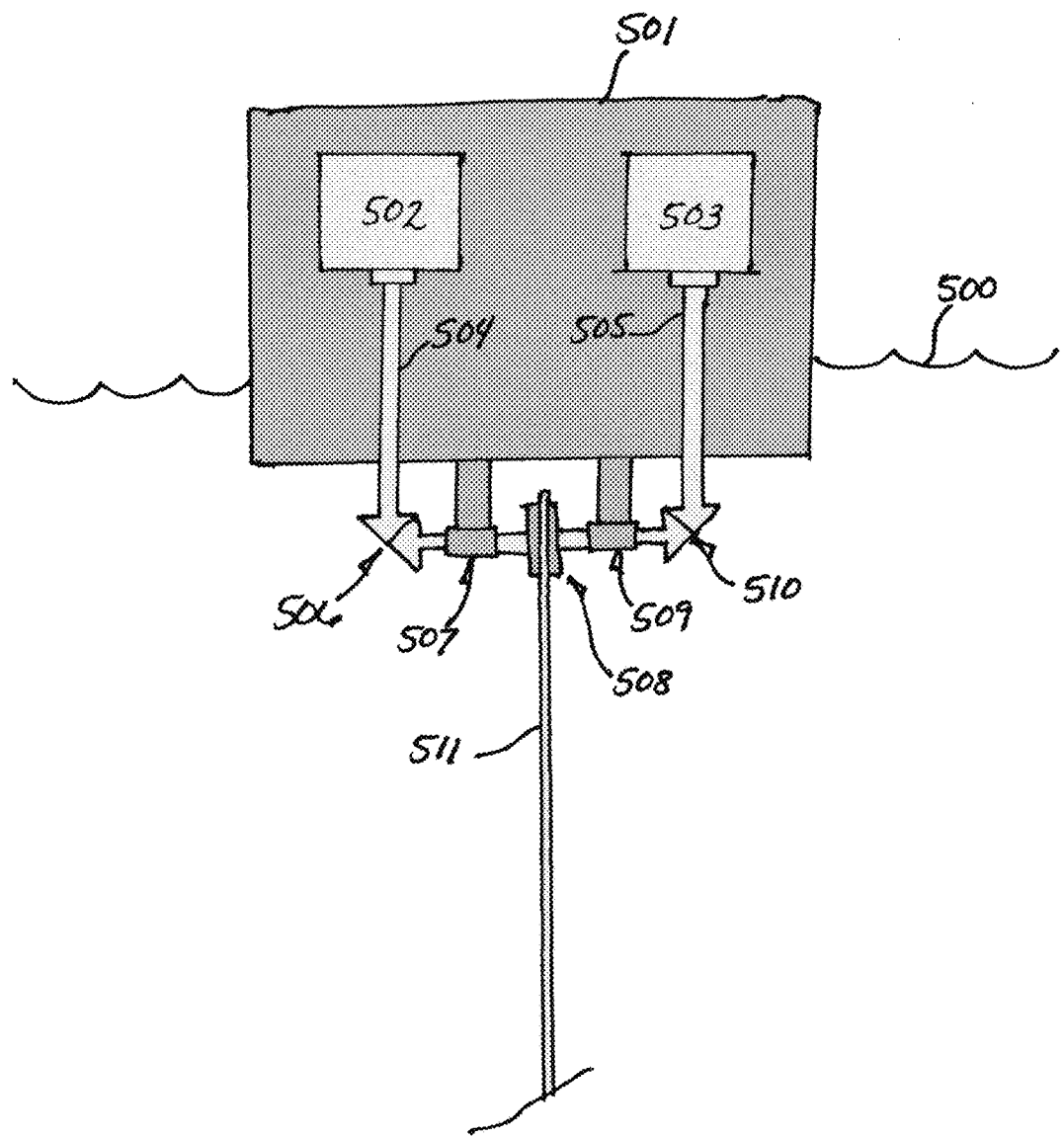
Figure 172:
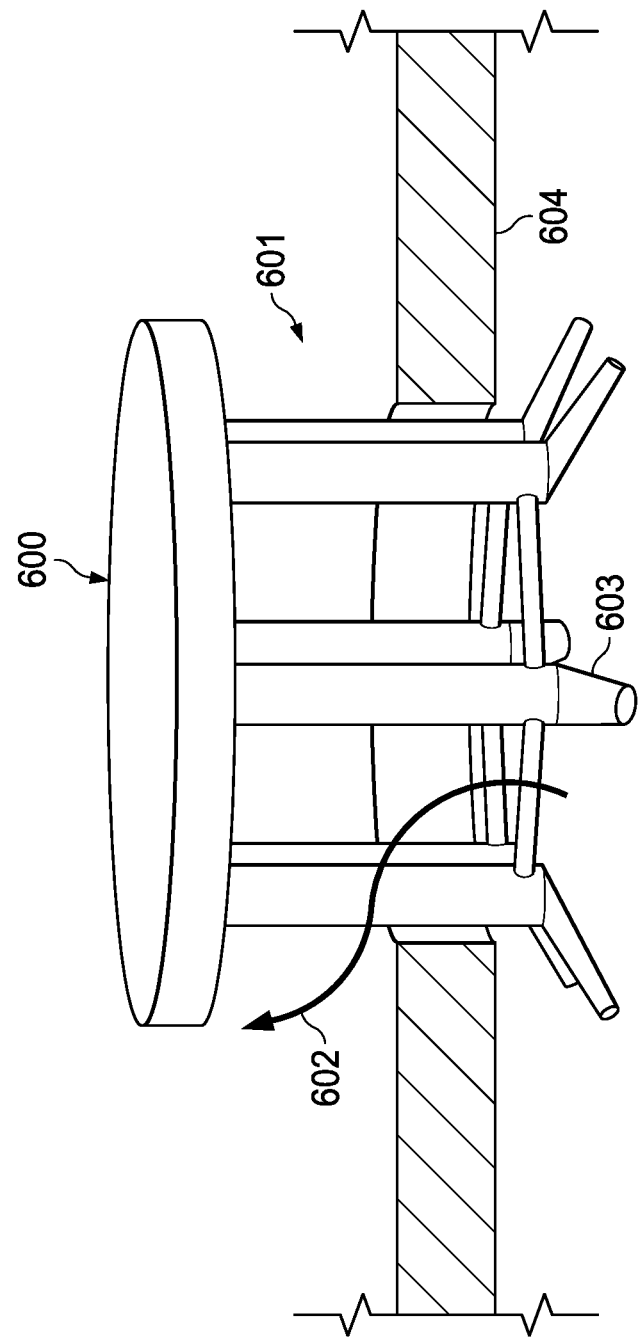
Figure 173:
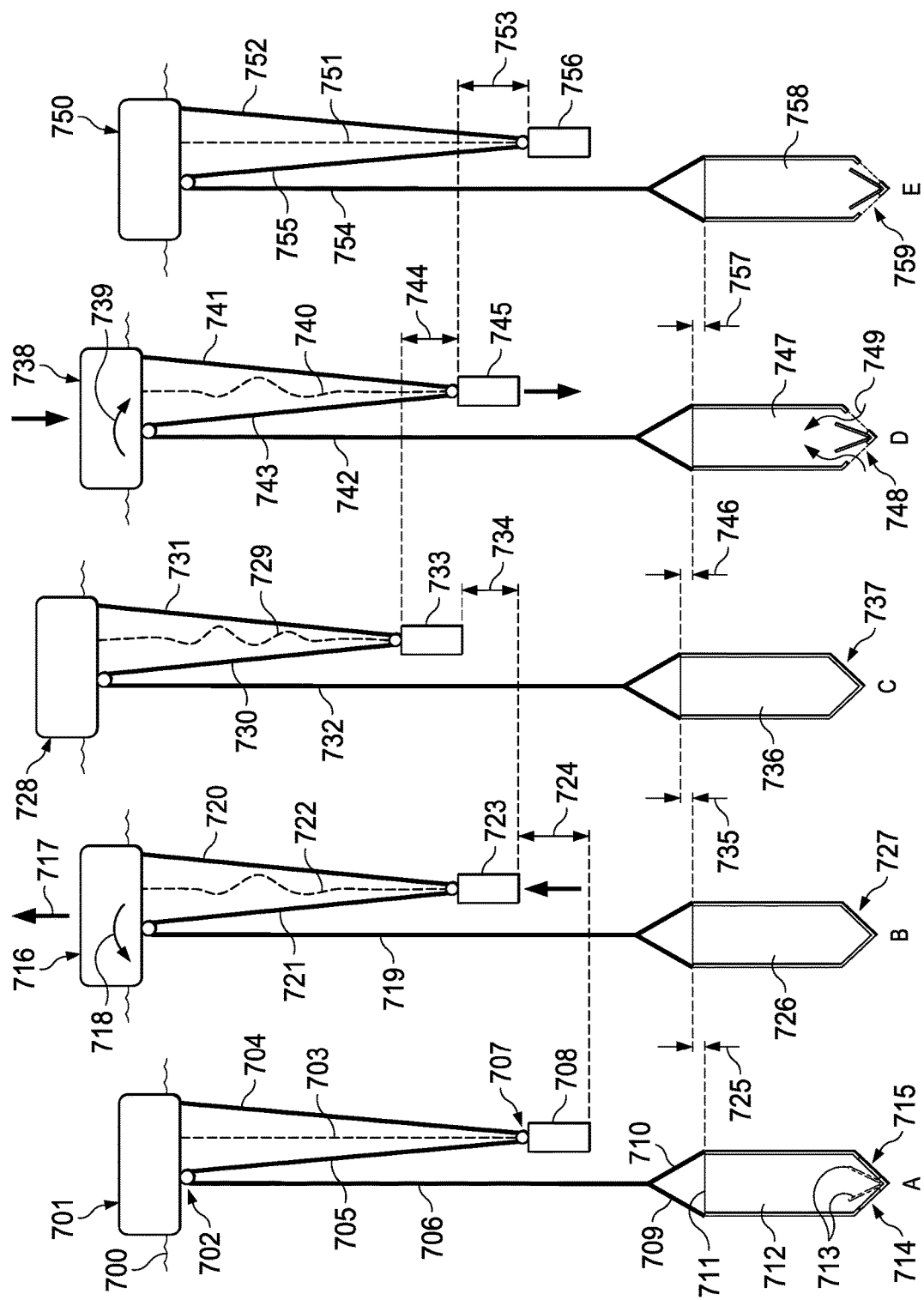
Figure 174:
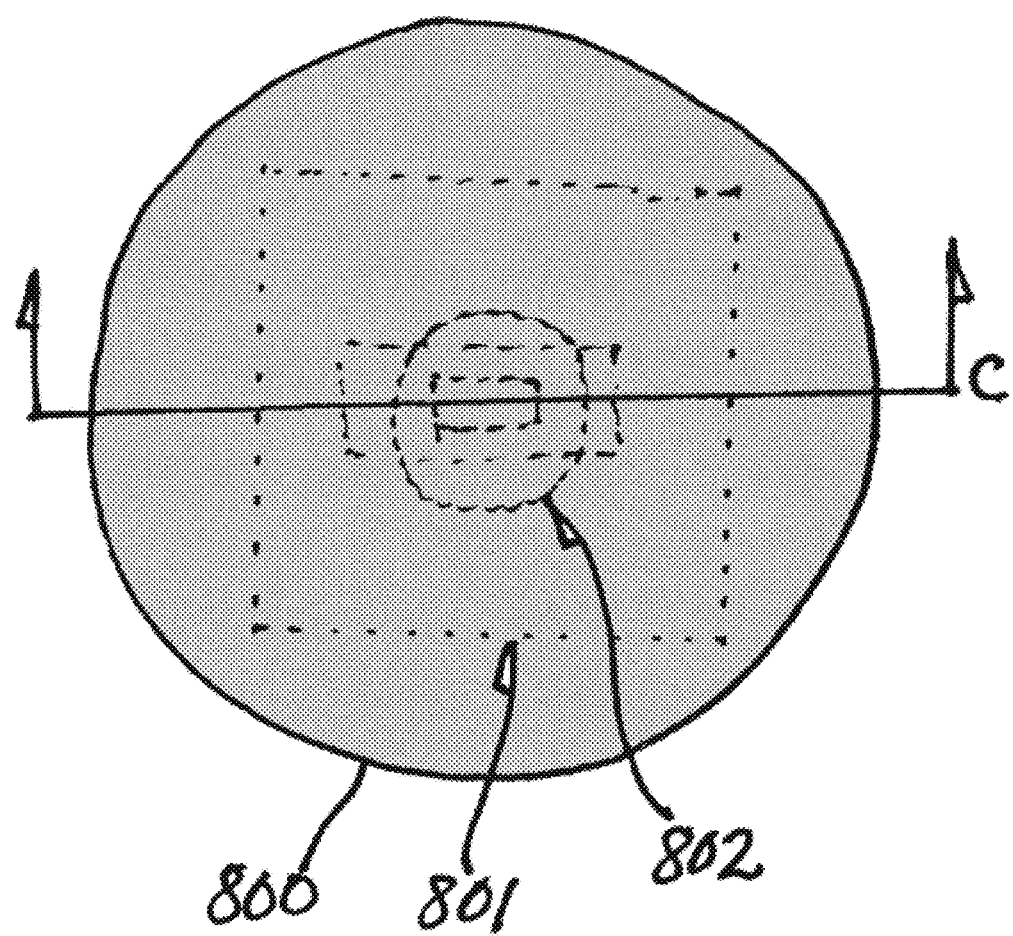
Figure 175:
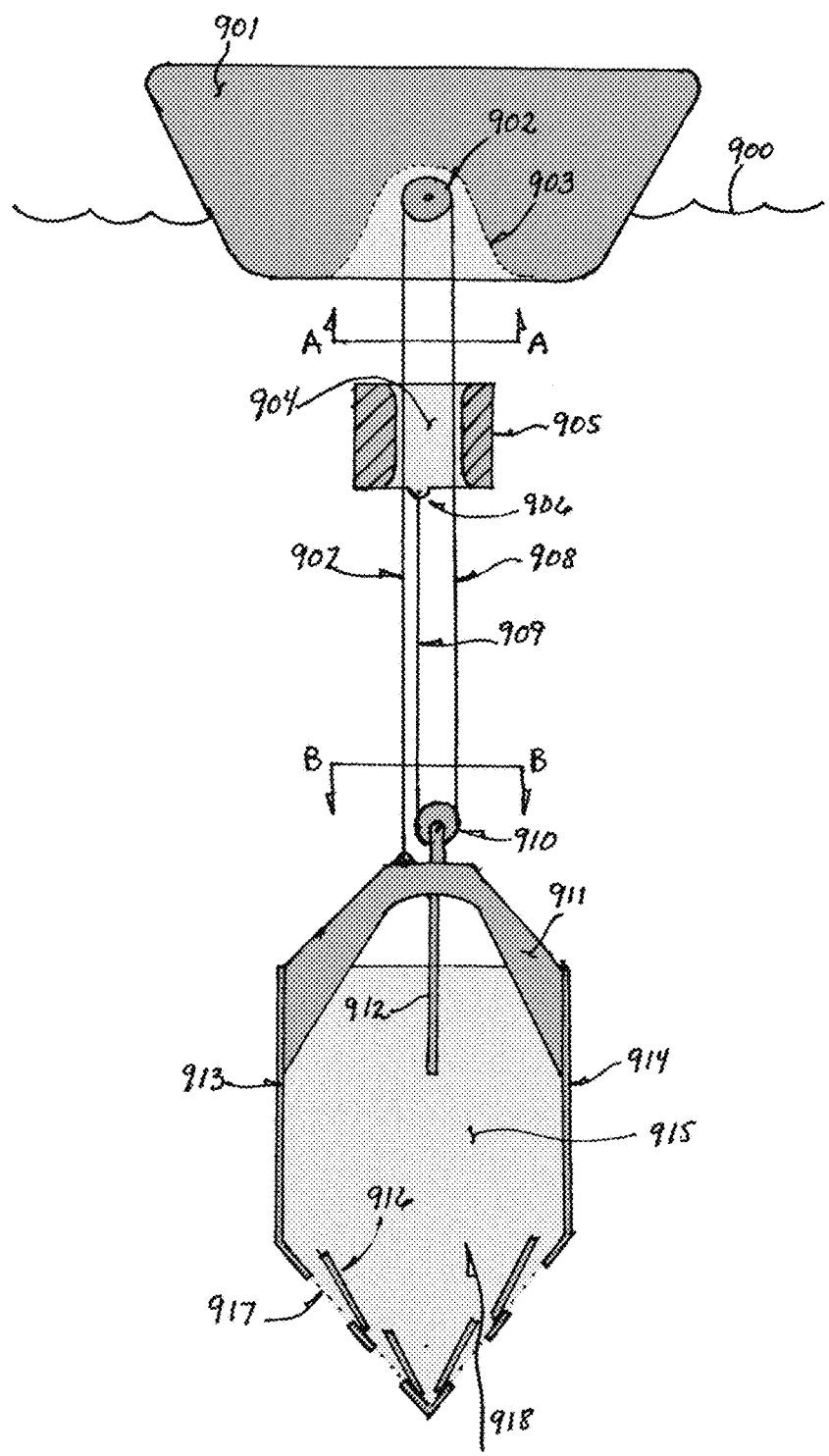
Figure 176:
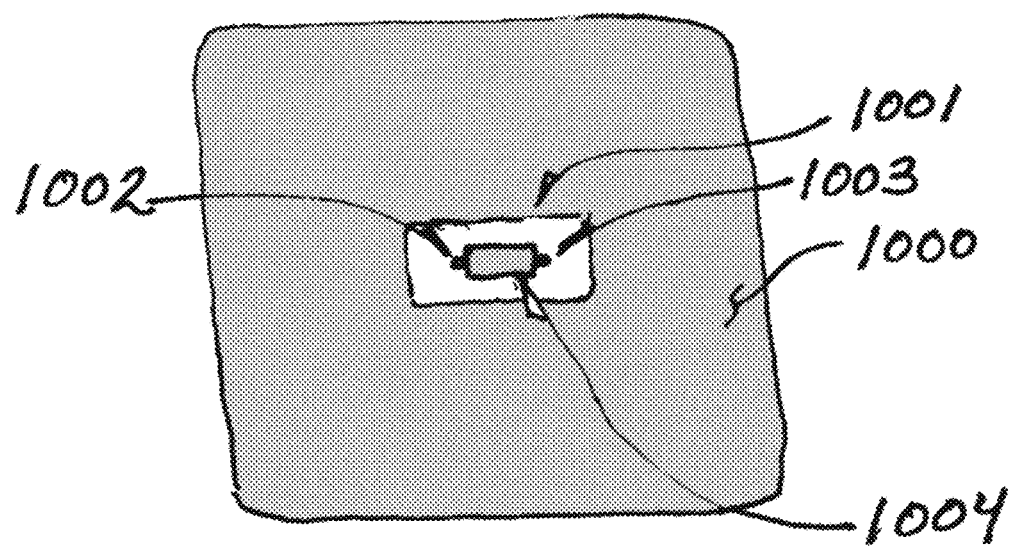
Figure 177:
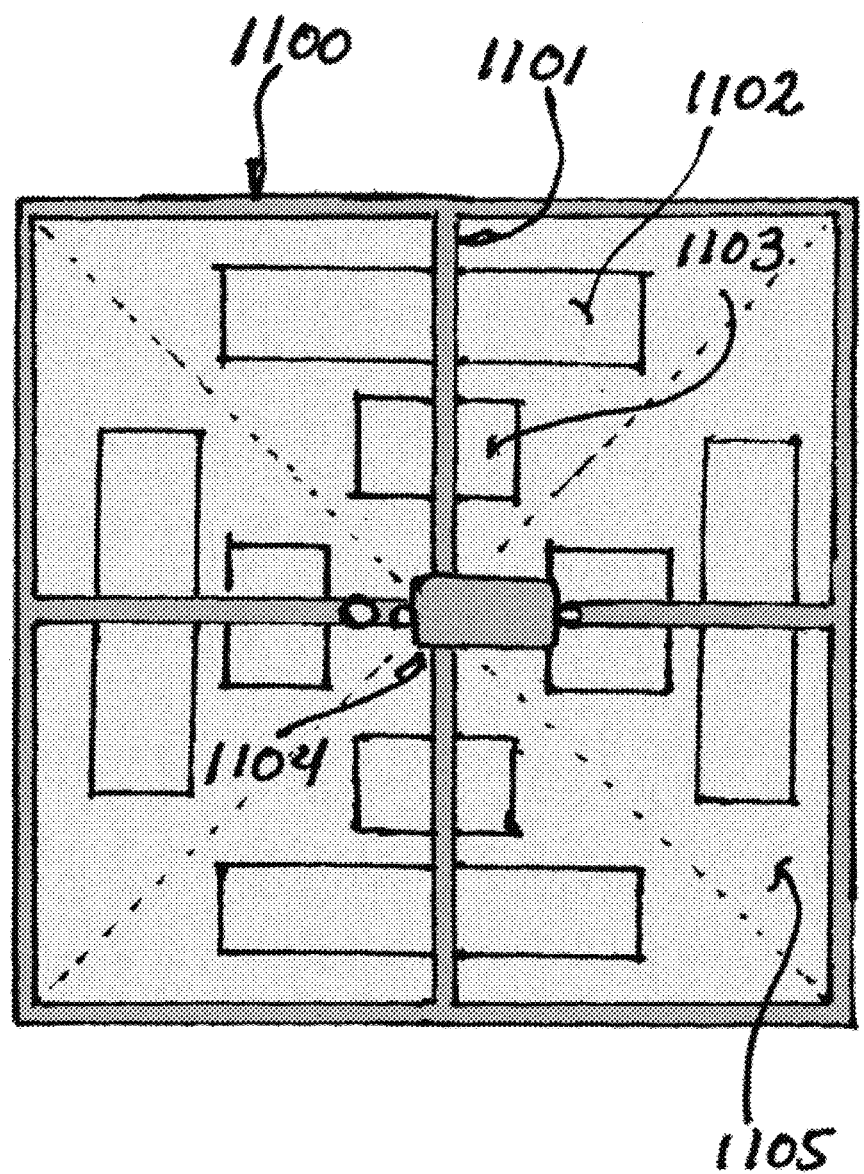
Figure 178:
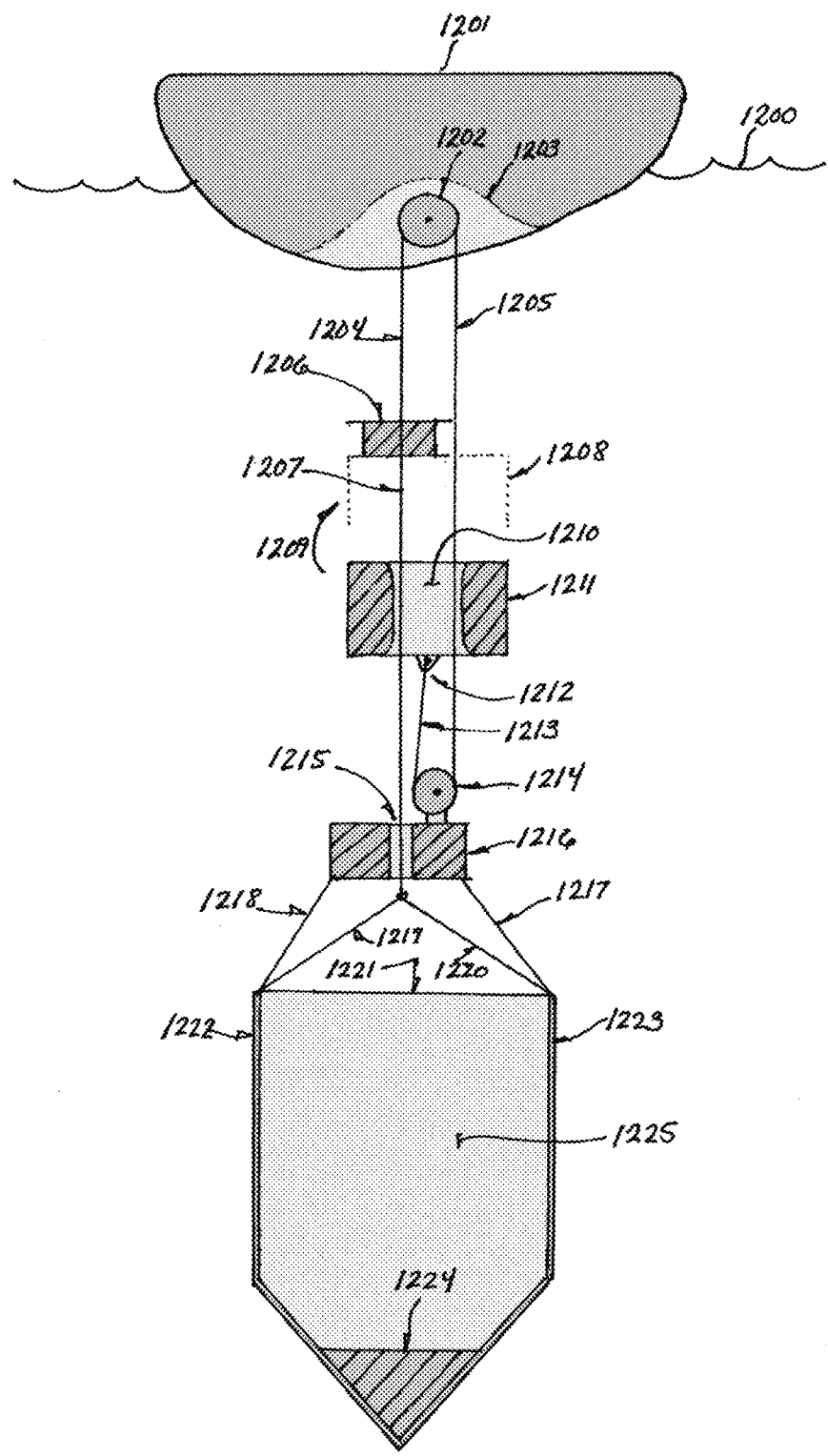
Figure 179:
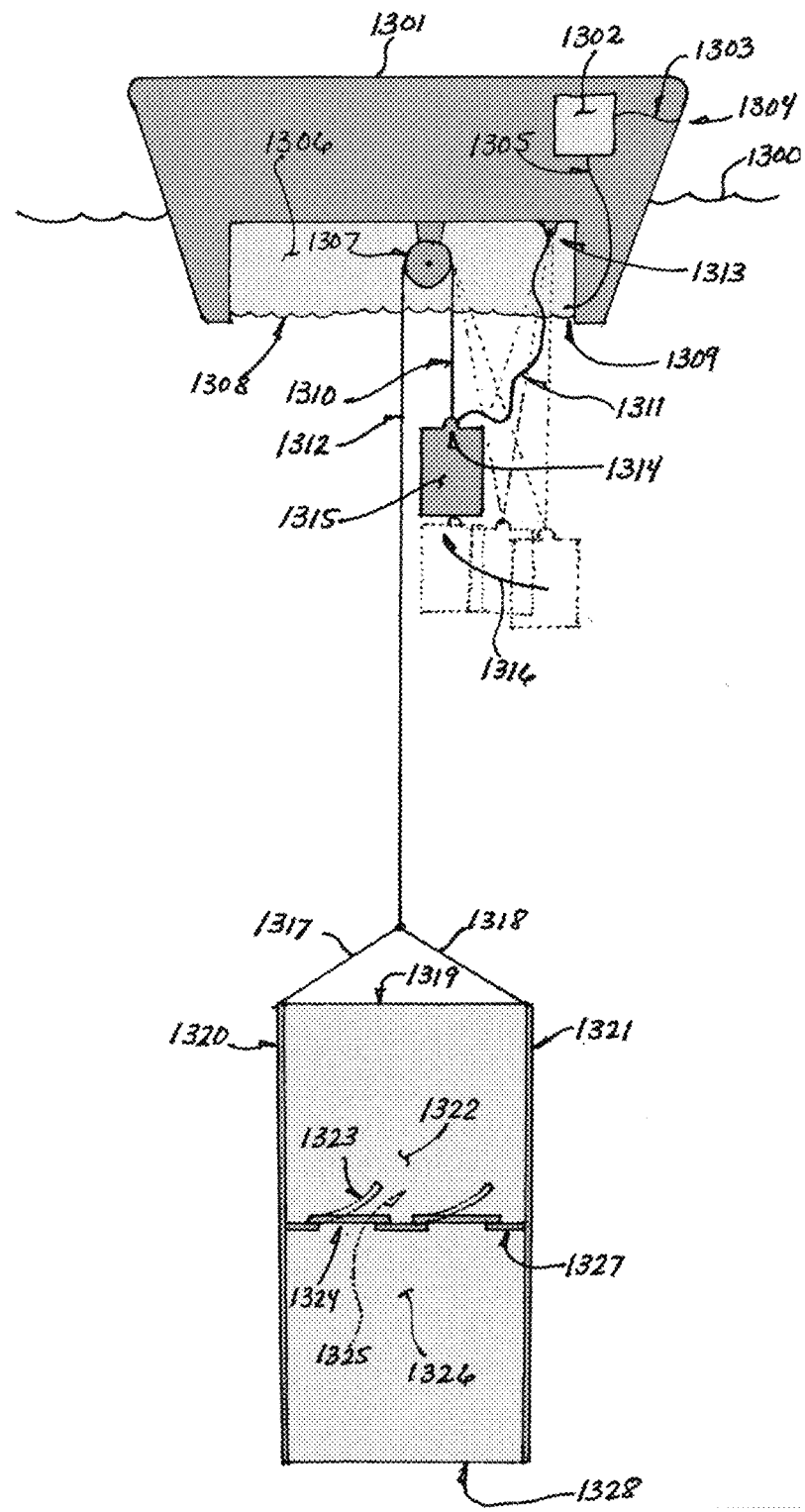
Figure 180:
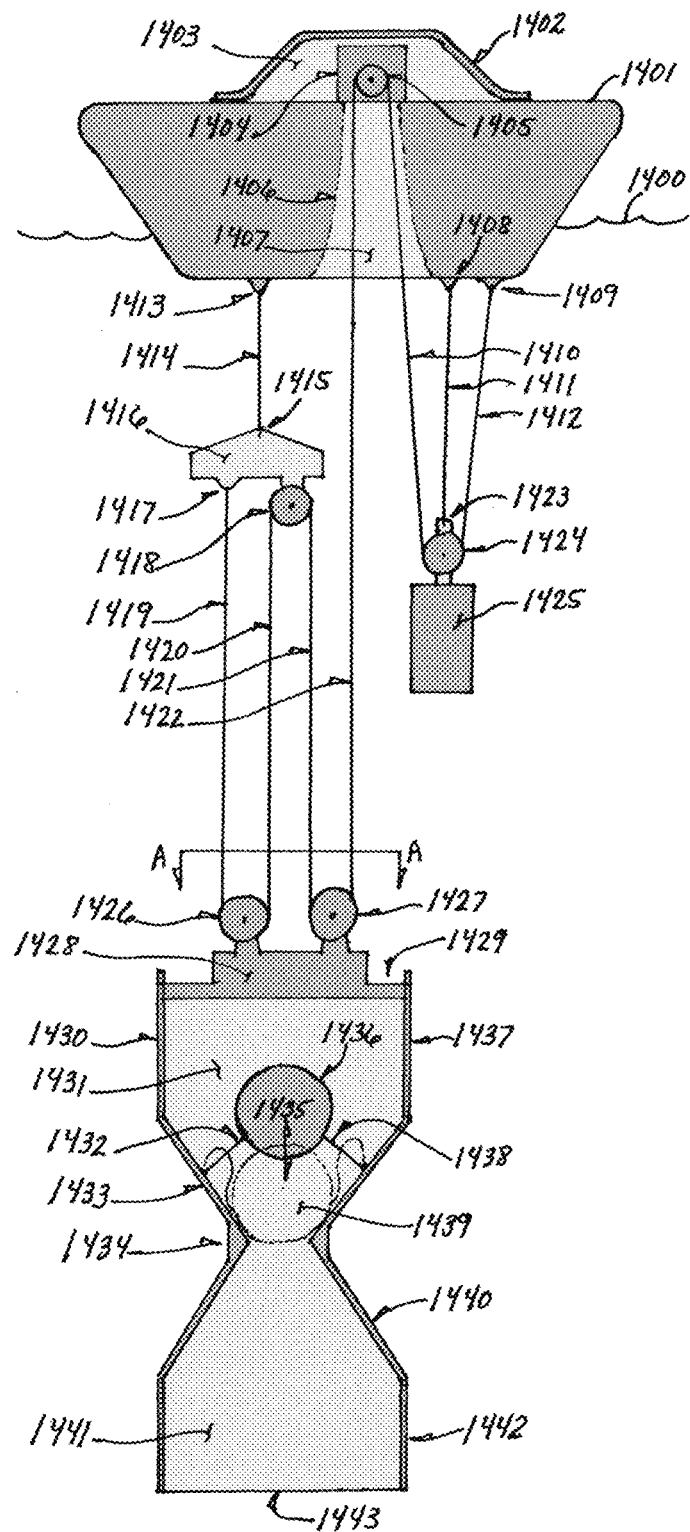
Figure 181:
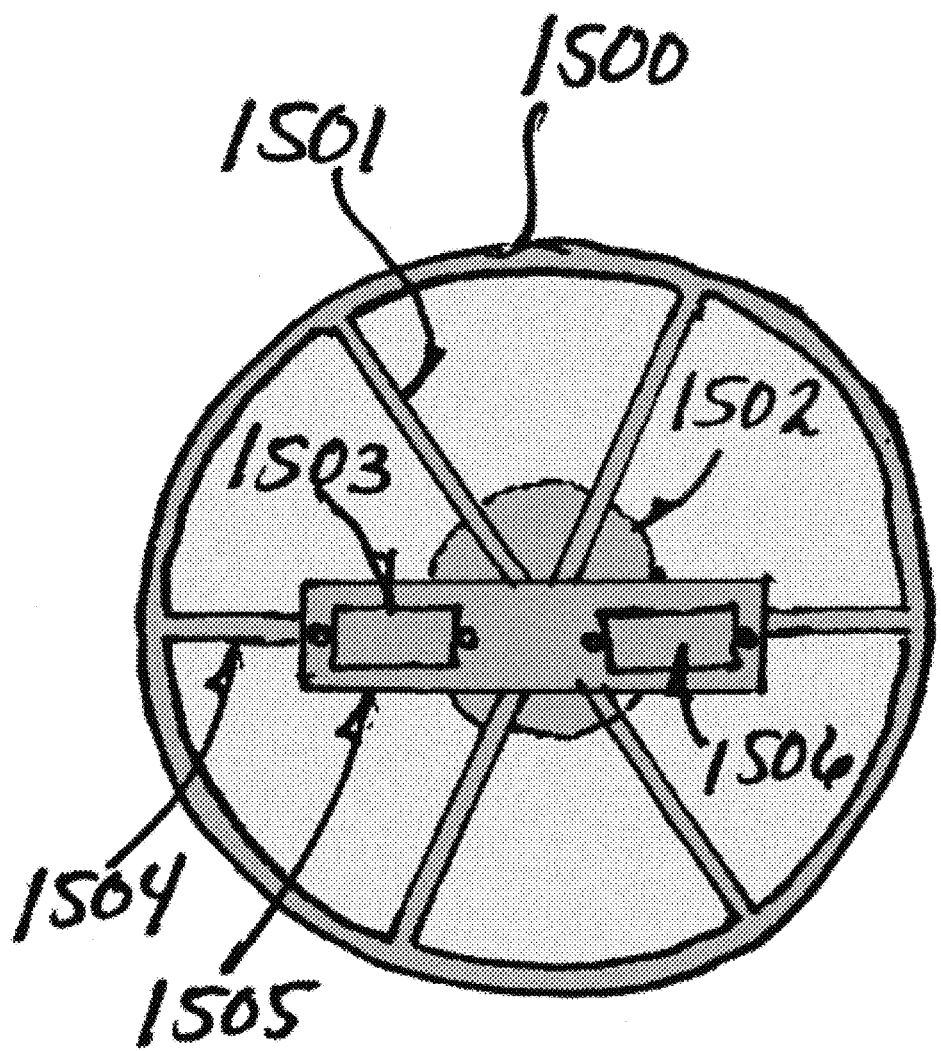
Figure 182:
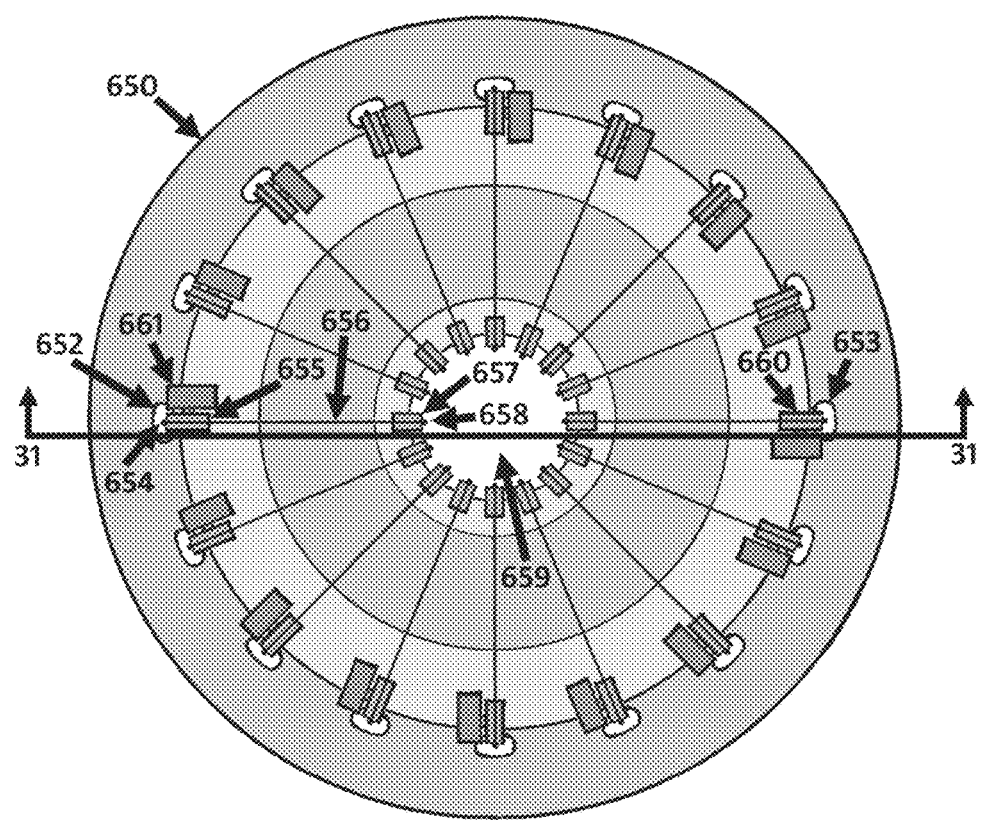
Figure 183:
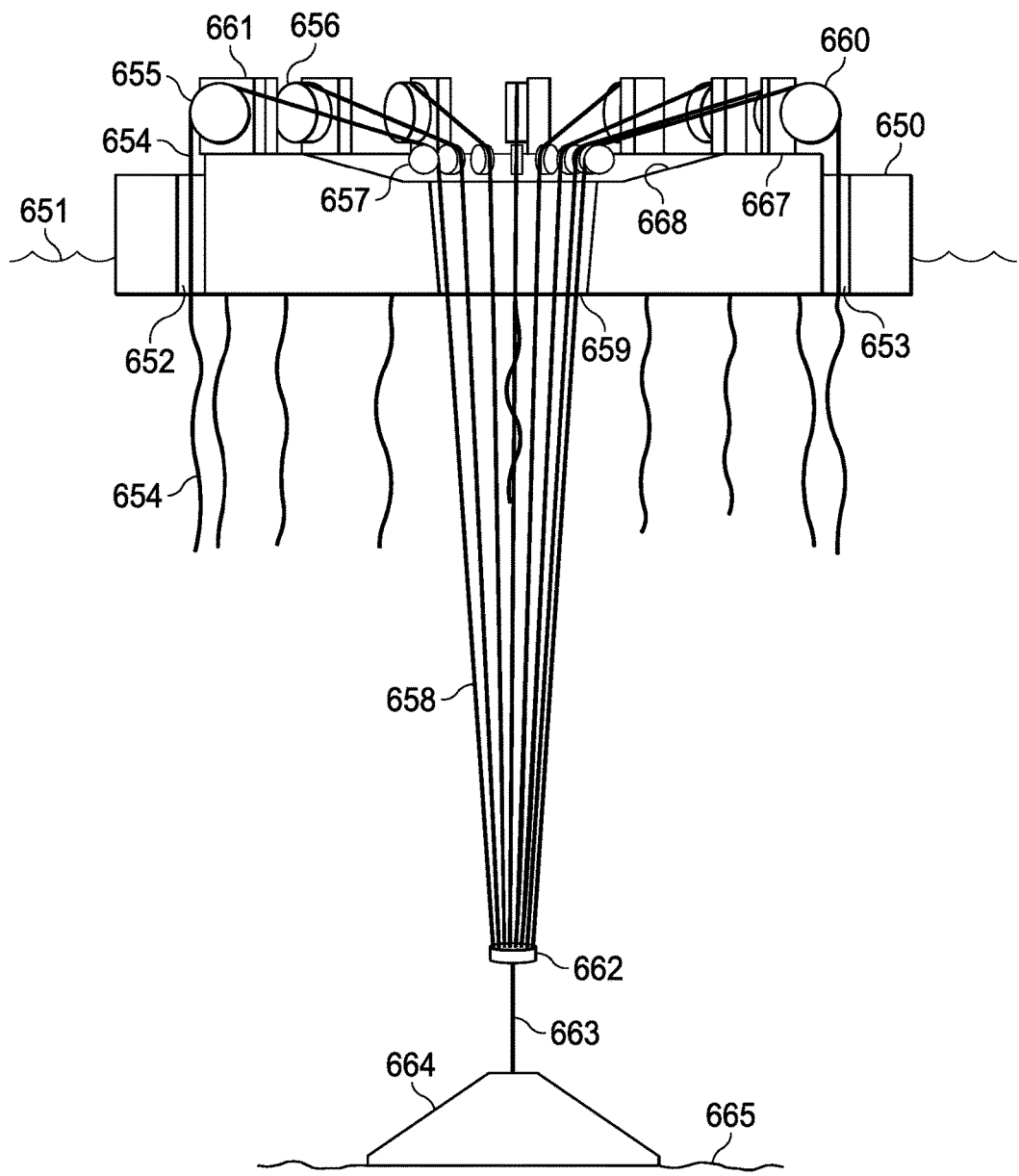
Figure 184:
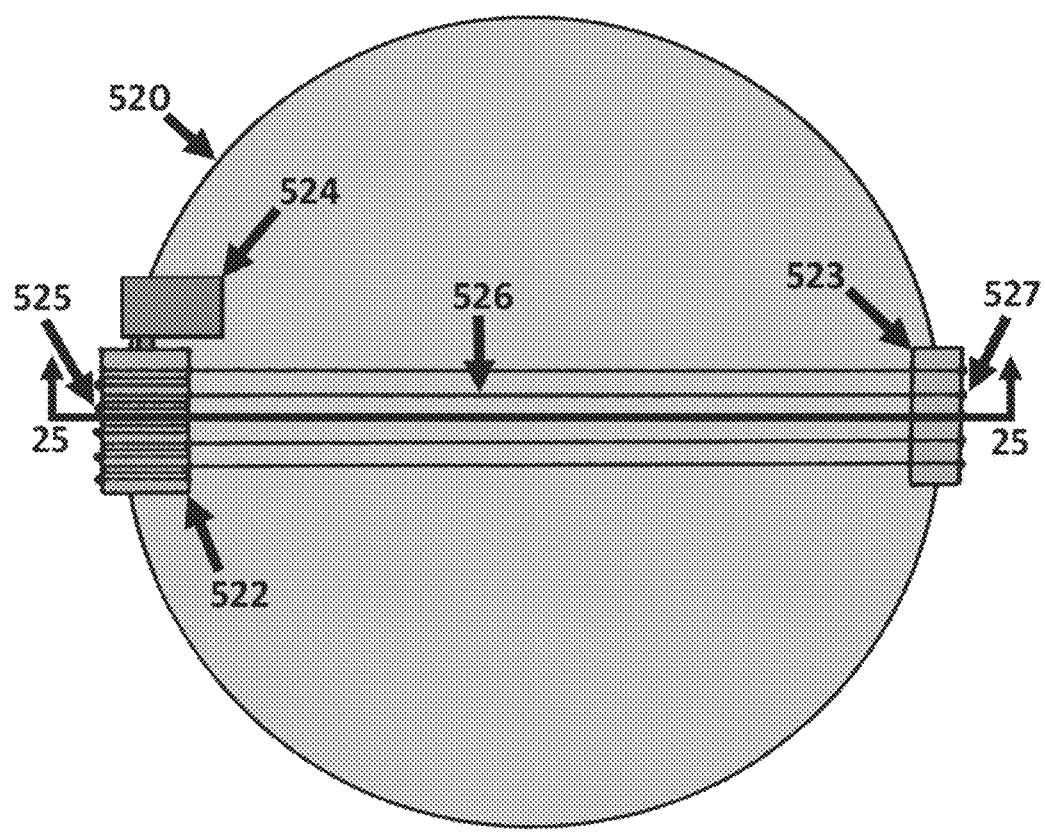
Figure 185:
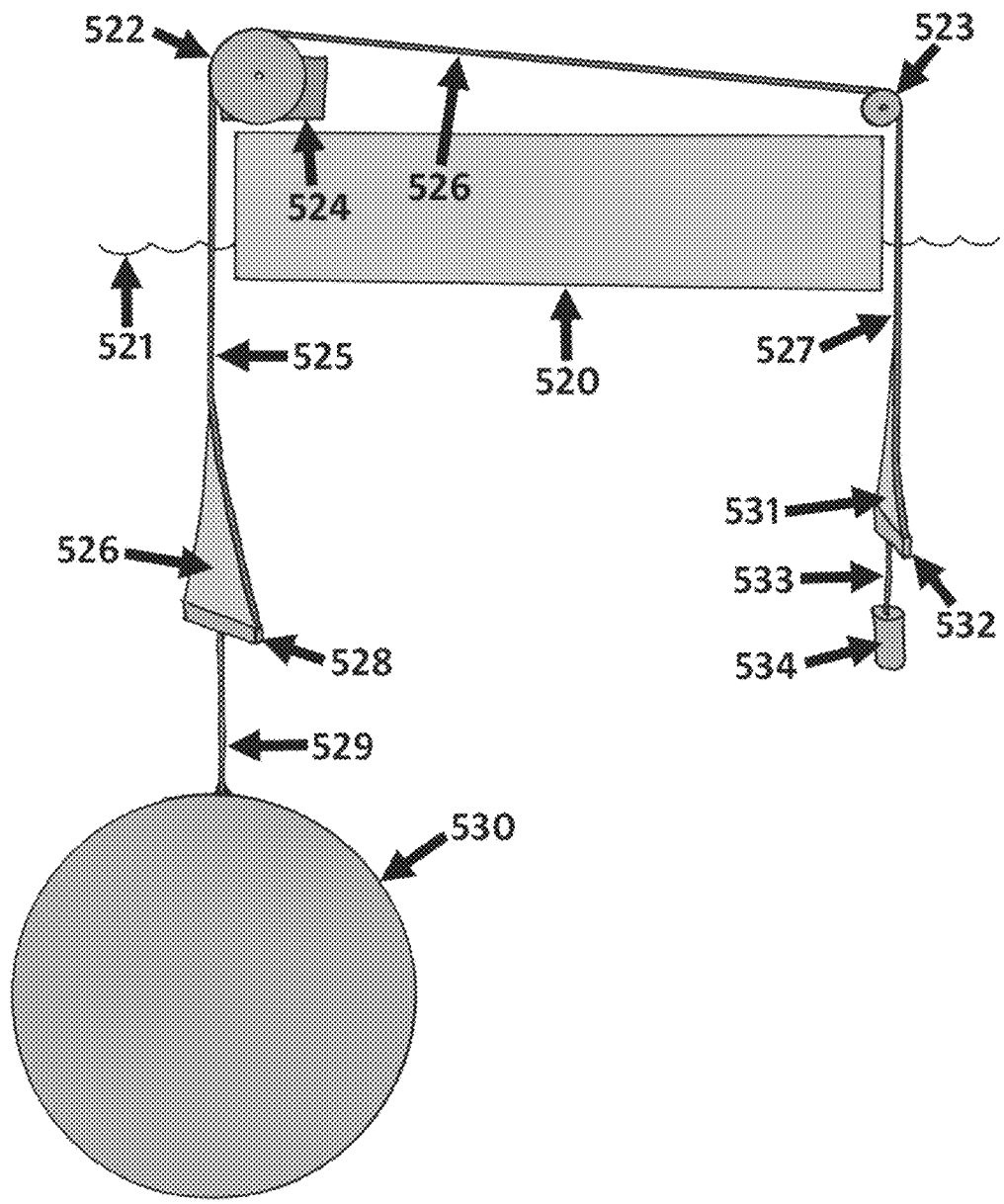
Figure 186:
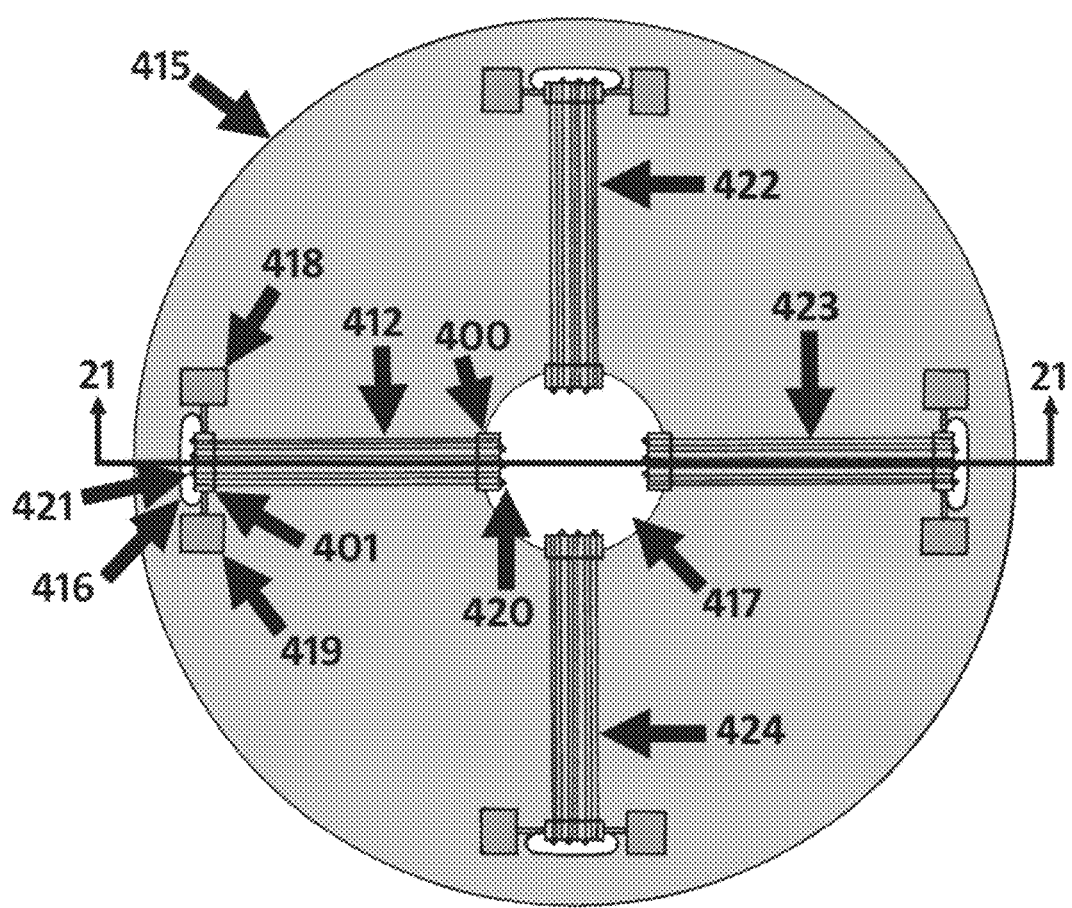
Figure 187:
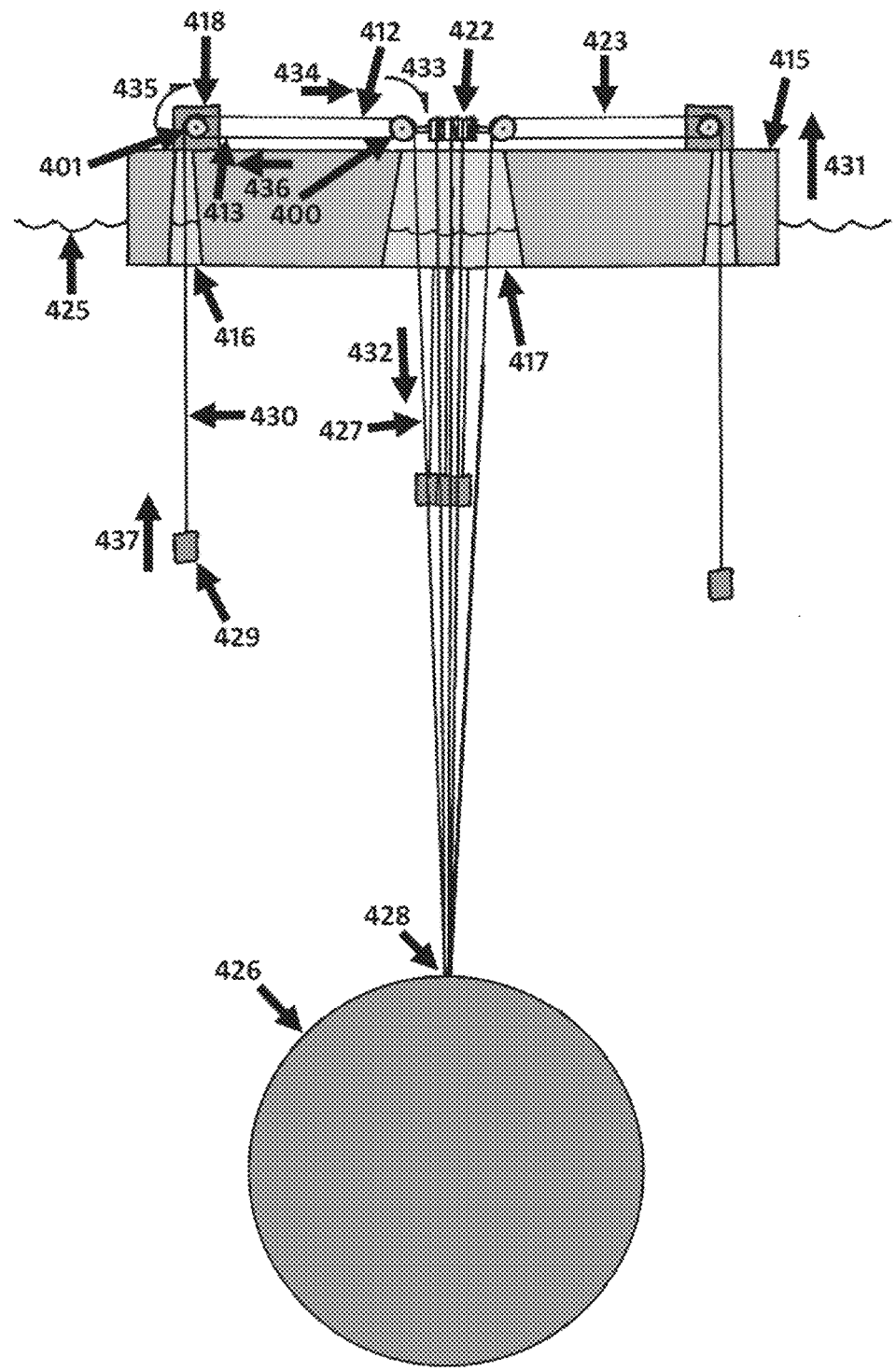
Figure 188:
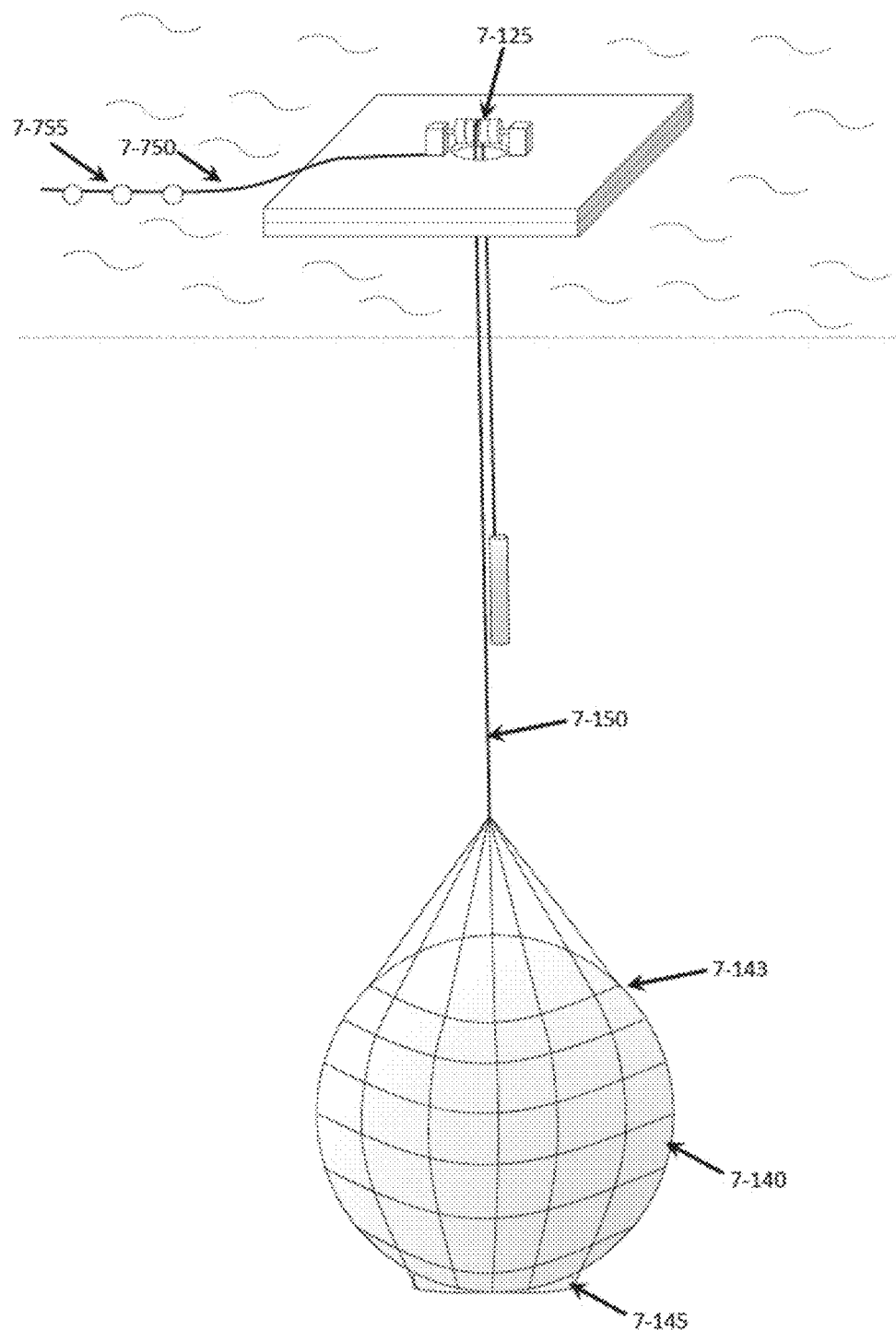

FIG. 143 is a top down view of an embodiment of the present invention;

FIG. 144 is a sectional view of the embodiment of FIG. 143;

FIG. 145 is a side perspective view of an embodiment of the present invention;

FIG. 146 is an enlarged side perspective view of the inertial mass of the embodiment of FIG. 145;

FIG. 147 is a side perspective view of an embodiment of the present invention;

FIG. 148 is an elevated side view of the embodiment of FIG. 147;

FIG. 149 is another elevated side view of the embodiment of FIG. 147;

FIG. 150 is a side perspective view of an embodiment of the present invention;

FIG. 151 is an elevated side view of the embodiment of FIG. 150;

FIG. 152 is a side perspective view of an embodiment of the present invention;

FIG. 153 is an side perspective view of the embodiment of FIG. 152;

FIG. 154 is a side perspective view of an embodiment of the present invention;

FIG. 155 is a side perspective view of an embodiment of the present invention;

FIG. 156 is an side view of the embodiment of FIG. 155;

FIG. 157 is an enlarged side perspective view of the "stacked plate" inertial mass of the embodiment of FIG. 156;

FIG. 158 is a side view of an embodiment of the present invention;

FIG. 159 is a side perspective view of an embodiment of the present invention;

FIG. 160 is an enlarged side view of the flexible inertial mass of the embodiment of FIG. 160;

FIG. 161 is a side perspective view of an embodiment of the present invention;

FIG. 162 is a side perspective view of an embodiment of the present invention;

FIG. 163 is a side perspective view of an embodiment of the present invention;

FIG. 164 is an enlarged side view of the flexible inertial mass of the embodiment of FIG. 163;

FIG. 165 is a side perspective view of an embodiment of the present invention;

FIG. 166 is an enlarged side view of the flexible inertial mass of the embodiment of FIG. 163;

FIG. 167 is a sectional side view of an embodiment of the present invention;

FIG. 168 is a sectional side view of an embodiment of the present invention;

FIG. 169 is an enlarged top down view of the inertial mass of the embodiment of FIG. 169;

FIG. 170 is a sectional side view of an embodiment of the present invention;

FIG. 171 is an enlarged sectional side view of the flotation module of the embodiment of FIG. 170;

FIG. 172 is an enlarged perspective side view of the one-way valve in the inertial mass of the embodiment of FIG. 170;

FIG. 173 shows a series of diagrams representing the operational behavior of an embodiment of the present invention;

FIG. 174 is a top down view of an embodiment of the present invention;

FIG. 175 is a sectional side view of an embodiment of FIG. 174;

FIG. 176 is an enlarged bottom up view of the flotation module of the embodiment of FIGS. 174-175;

FIG. 177 is an enlarged top down view of the inertial mass of the embodiment of FIGS. 174-175;

FIG. 178 is a side sectional view of an embodiment of the present invention;

FIG. 178 is a side sectional view of an embodiment of the present invention;

FIG. 179 is a side sectional view of an embodiment of the present invention;

FIG. 180 is a side sectional view of an embodiment of the present invention;

FIG. 181 is an enlarged top down view of the inertial mass of the embodiment of FIG. 180;

FIG. 182 is a top down view of an embodiment of the present invention;

FIG. 183 is side sectional view of the embodiment of FIG. 182;

FIG. 184 is a top down view of an embodiment of the present invention;

FIG. 185 is side sectional view of the embodiment of FIG. 184;

FIG. 186 is a top down view of a flotation module of an embodiment of the present invention;

FIG. 187 is side sectional view of the embodiment of FIG. 186; and,

FIG. 188 is a side perspective view of an embodiment of the present invention.

DETAILED DESCRIPTION OF THE PREFERRED EMBODIMENTS

Figure 1:
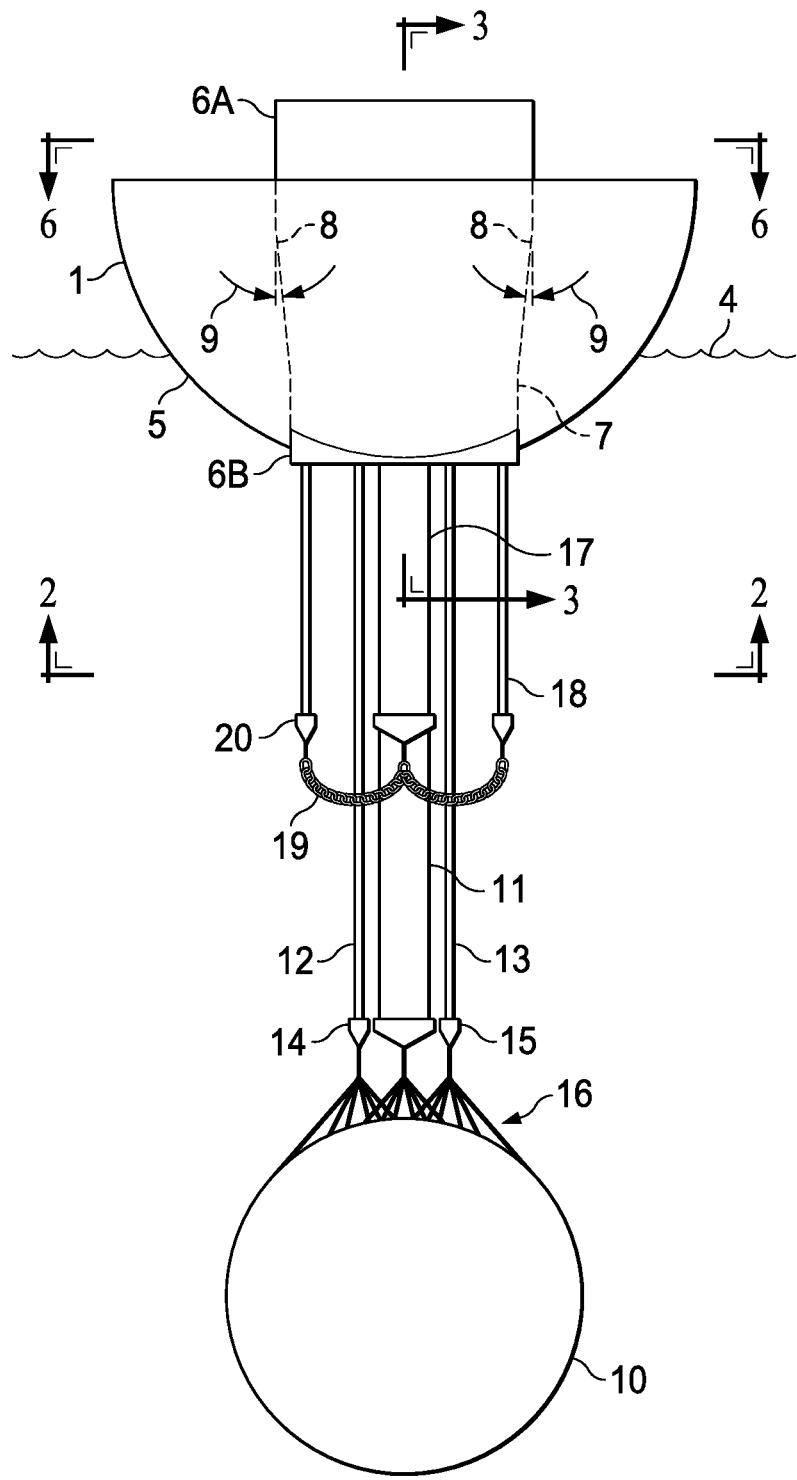
FIG. 1 is an elevated perspective view of a first preferred embodiment of the present invention.

FIG. 1 shows a side view of an embodiment of the present disclosure. A buoyant structure 1, i.e. a "buoy" or "flotation module," floats at a surface 4 of a body of water. Waves lift and let fall the structure. Housed within the buoy 1 is a "power-take-off" (or "PTO") module 6A, 6B, and 7 which contains rollers (pulleys) which interact rotatably with sets of cables, e.g. 11 and 17, organized as parallel "ribbons." An upper portion 6A of the PTO module is above the upper surface 1 of the buoy, while a lower portion 6B of the PTO module protrudes into the water. The rollers inside the lower portion 6B of the PTO module are typically fully submerged, as are the ribbons rotatably attached to them.

The constant submersion of the rollers and their respective cables provides advantages with respect to the control and prevention of corrosion within those rollers and their respective ribbons. For instance, when fully submerged a steel roller or cable can typically be adequately protected from corrosion by sea water through the imposition of an impressed current or the placement of sacrificial anodes in a connected circuit. By contrast, when only intermittently submerged, and/or periodically dry, the ability to resist corrosion in steel members can be more difficult and/or less successful.

One end, e.g. 20, of each ribbon is connected to a chain 19 or "restoring weight." The other end, e.g. 14, of each ribbon is connected to a negatively-buoyant structure 10, i.e. to an "inertial mass."

In one embodiment, the "wet weight" of the chain 19 is less than the wet weight of the inertial mass, so that in the absence of wave-induced lifting of the buoy, and an associated pulling up of the portion of the ribbons connecting the buoy to the inertial mass, the inertial mass would tend to sink under its own wet weight, overcoming the upward counter-force imposed by the chain via the ribbon.

Each of the embodiment's rollers is rotatably connected to a crankshaft (not shown) which, in turn, is connected to a set of hydraulic pistons (not shown). The resulting pressurized hydraulic fluid flows through a hydraulic generator or turbine (not shown) which is rotatably connected to a generator (not shown).

Because of its modular design and construction, the PTO module 6 and 7 may be inserted into, and/or removed from, a complementary aperture within the buoy. Narrowing bevels, e.g. 8 and 9, allow the PTO module 6 and 7 to be fully supported within the buoy without the need for, or with a comparatively small number or size of, additional fasteners.

Inertial mass 10 is connected to the distal ends of the ribbons, e.g. 15, by and through a mesh 16 composed of inter-connected flexible cables.

The inertial mass 10 is an enclosure, chamber, and/or vessel, composed of an outer cementitious wall surrounding an enclosed and/or trapped inner body of water.

The hull 5 of the buoy 1 is approximately, if not exactly, hemi-spherical. Thus, when the buoy is lifted by a wave, and the inertial mass 10 resists that rise, thereby creating a tension in the ribbon cables, e.g. 11, that connect the two, the buoy tends to rotate so as to preserve a buoy-specific longitudinal axis that is coaxial with the vertical longitudinal axis of the inertial mass, and/or which passes through the inertial mass's center of mass. In other words, the bottom of the buoy rotates to point toward the inertial mass, especially when a tension increases in the ribbon cables. This embodiment's hemi-spherical buoy hull 5, and its facility for rotation so as to preserve a common and/or constant alignment with the inertial mass 10, tends to preserve a desirable alignment of the ribbon cables with the rollers about which they rotate, i.e. a desirable fleet angle.

The use of parallel sets of relatively narrow cables, i.e. of ribbon cables, permits the use of rollers of relatively small-diameter, while providing an advantageous relationship between the diameters of the rollers and individual intra-ribbon cables. A relatively high ratio (D/d) of roller diameter (D) to cable diameter (d) tends to minimize cable wear and to promote cable longevity.

As buoy 1 is lifted by a wave, the buoyant lifting force imparted by the buoy to the ribbon cables, e.g. 11, results in an upward acceleration of the inertial mass 10. However, due to its substantial mass, this upward acceleration is relatively small, and is typically much smaller than the upward acceleration of the buoy. Therefore, the ribbon cables roll over their respective rollers so as to lengthen or pay out the portion of the cables connecting the rollers to the inertial mass. This paying out of the ribbon cables connecting the buoy to the inertial mass is complemented, and offset, by a respective shortening of the portions of the ribbon cables connecting the rollers, and the buoy, to the shared restoring weight 19.

As buoy 1 falls following the passage of wave crest, it approaches the now free-falling inertial mass 10. As a result, the ribbon cables, e.g. 11, become relatively and/or approximately slack. The relatively small wet weight of the restoring weight 19 removes the slack from the ribbon cables. Because the wet weight of the restoring weight 19 is less than the wet weight of the inertial mass 10, the restoring weight is unable to retract the inertial mass itself. However, it is sufficient (i.e. its wet weight is sufficient) to remove the slack from those portions, e.g. 11, of the ribbon cables that connect the buoy 1 to the inertial mass 10.

Through this reciprocating mechanism wherein the wave-lifted buoy pulls the buoy away from the inertial mass, thereby creating a strong tension in those portions of the ribbon cables that connect the buoy's rollers to the inertial mass, and thereby turning those rollers will substantial torque and generating electrical power as a result; and, wherein thereafter, the restoring weight removes the slack from, and again shortens those portions of the ribbon cables that connect the buoy's rollers to the inertial mass, the wave-induced power generation cycle can continue indefinitely.

Because each roller is able to "unroll" the portion of its respective ribbon cable that connects it to the inertial mass 10, if its turns in the appropriate direction and at a sufficient rate of turning, power may be extracted from the separation of the buoy 1 from its respective inertial mass 10 by coupling the turning of each roller to the turning of a generator's rotor.

A torque on each roller that imparted to each roller's respective ribbon cable a force equal in magnitude, but opposite in direction, to the corresponding force imparted to each roller's respective ribbon cable by the relative movement of the inertial mass away from the buoy, would be expected to stop each roller from turning (by resisting its turning with a torque equal and opposite to the torque imparted to it by its respective ribbon cable) and thereby to stop each ribbon cable from translating/rotating. However, any "resistive" torque imparted to a roller that is less than the torque imparted to it by the inertial mass will allow the roller to turn, and allow the ribbon cable connecting that roller to the inertial mass to actuate the roller.

By using a generator or power-take-off system (such as a hydraulic power take off system that increases a pressure in a fluid to impel said fluid against a hydrokinetic turbine coupled to a generator) to impose the oppositional torque to each roller, and especially to impose a changing and/or variable degree and/or magnitude of oppositional torque to each roller so that the amount of resistive roller torque remains proportional to, and, at most, only slightly less than, the amount of pulling torque imparted to each roller by the inertial mass, copious amounts of electrical power may be generated.

Through this mechanism, and by means of this device, and the related embodiments herein described and disclosed, the energy of waves at the surface of a body of water may be converted, at least in part, to electrical power, and/or to some other useful form of energy and/or work, e.g. the compression of air, the desalination of water, the propulsion of the buoyant structure, the synthesis of a chemical fuel, etc.

Figure 2:
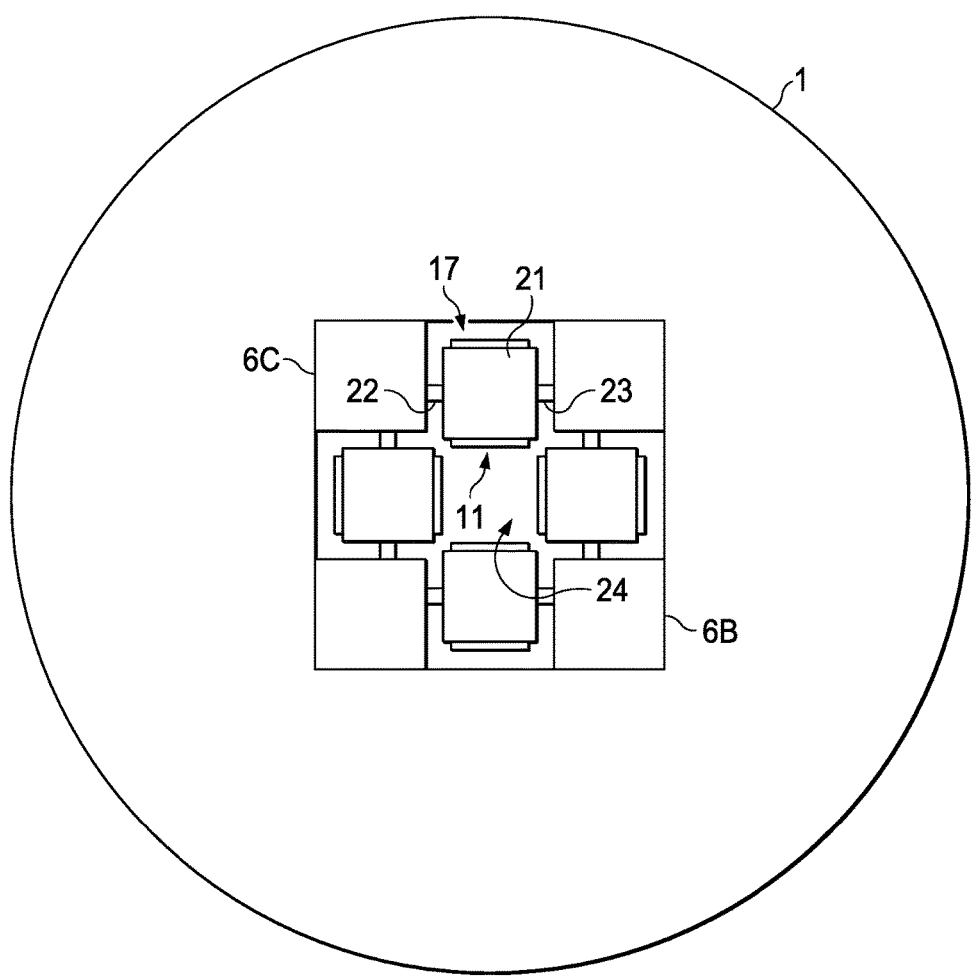
FIG. 2 is a top-down view of the embodiment of FIG. 1.
Figure 3:
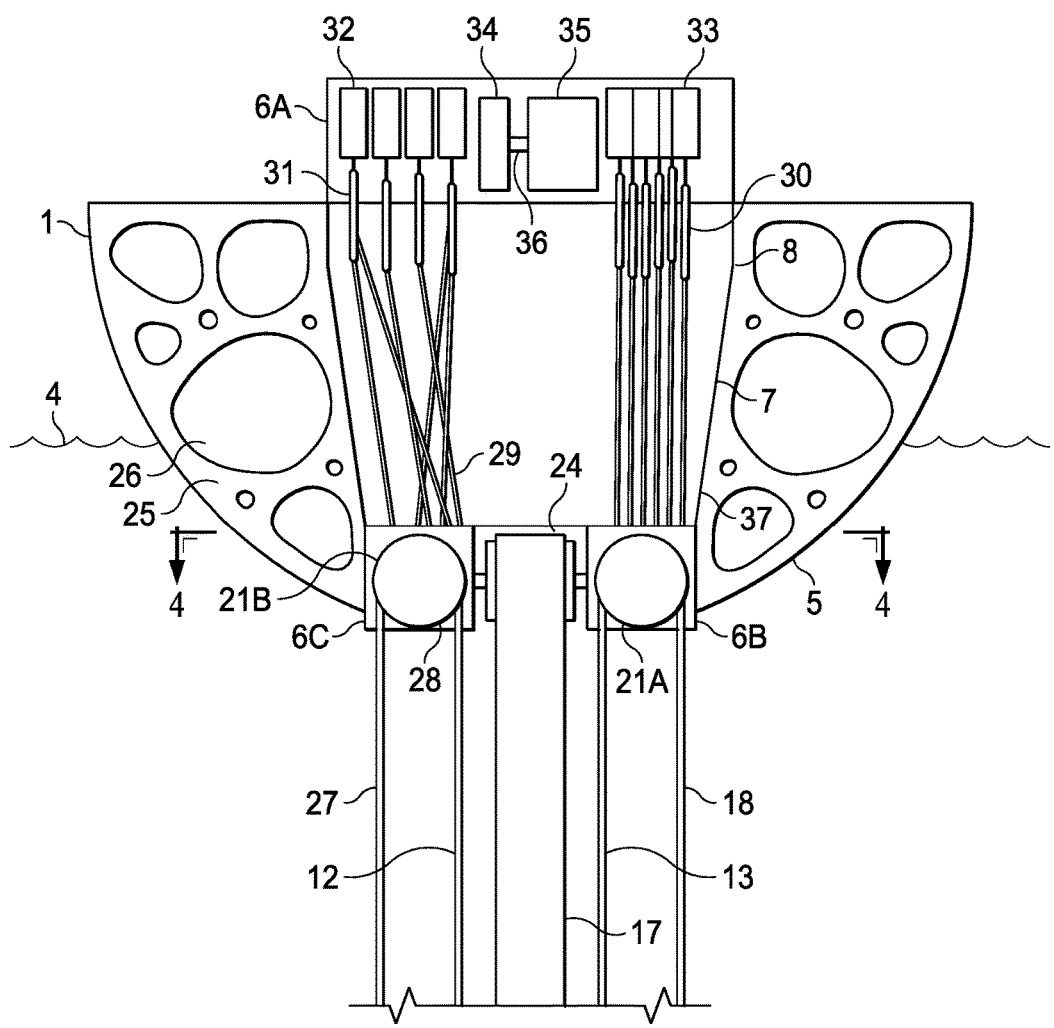
FIG. 3 is a sectional view of the embodiment of FIG. 1.
Figure 6:
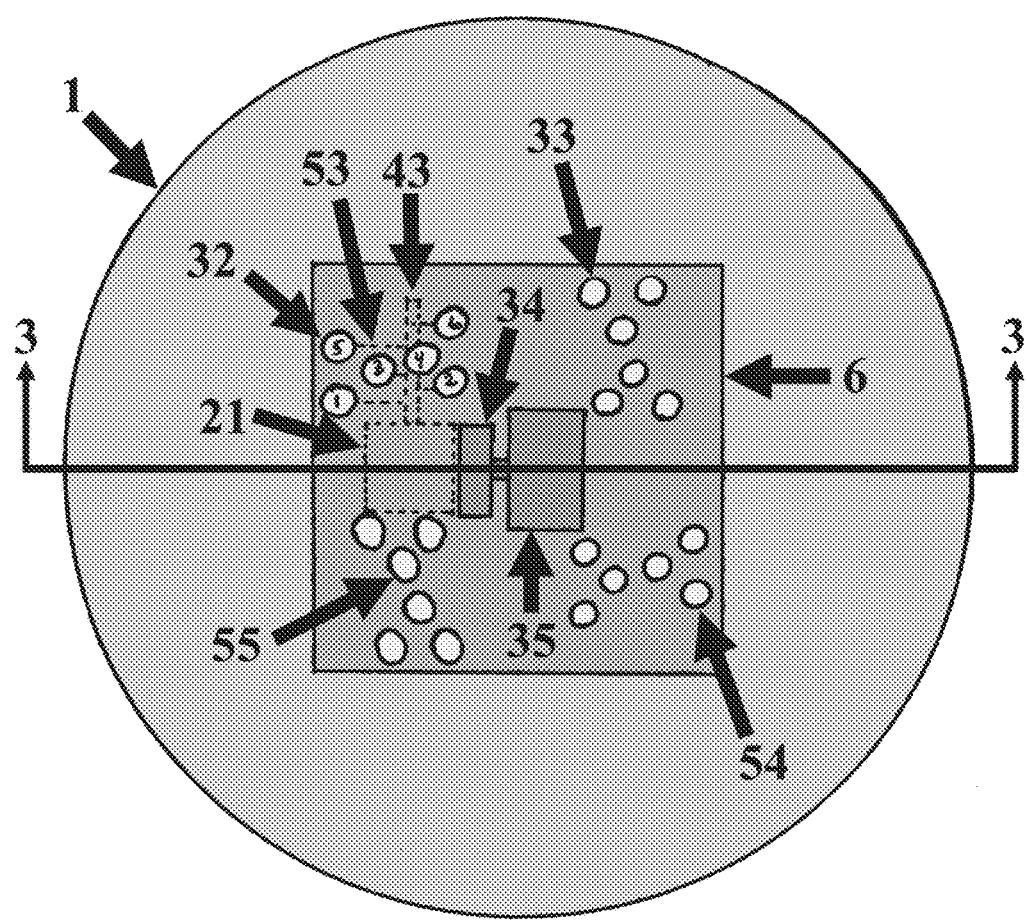
FIG. 6 is a sectional view of the embodiment of FIG. 1.

Cross-sectional views are available in FIGS. 2, 3, and 6, of views taken along lines 2, 3, and 6, respectively.

In another embodiment similar to the one illustrated in FIG. 1, the wet weight of the chain is equal to that of the inertial mass. And, in yet another embodiment similar to the one illustrated in FIG. 1, the wet weight of the chain is greater than that of the inertial mass.

In another embodiment similar to the one illustrated in FIG. 1, the wet weight of the inertial mass 10 is zero, i.e. the inertial mass is neutrally buoyant. E.g. the wet weight of the net 16 surrounding the inertial mass 10 is sufficient to cause the inertial mass to sink under the influence of gravity.

In another embodiment similar to the one illustrated in FIG. 1, the restoring weight 19 is replaced with a flexible linked set of negatively-buoyant weights. And, in yet another embodiment similar to the one illustrated in FIG. 1, the single shared restoring weight 19 is replaced with individual, separate weights, and/or sets of weights, that are each attached to a single, particular ribbon end, e.g. 20.

In another embodiment similar to the one illustrated in FIG. 1, the inertial mass 10 encloses and/or contains an additional weight or set of weights to increase its wet weight. And, in other embodiments similar to the one illustrated in FIG. 1, the inertial mass 10 is constructed of steel, plastic, metal, stone, water-infused aerogel, and/or other substances, and/or mixtures of substances.

Buoyant structure 1 is a floating object which supports, and holds at the surface 4 of a body of water, a PTO module 6 and 7. Through its support of the PTO module, it also indirectly suspends the ribbon cables, e.g. 11, that depend from the module, and the inertial mass 10 that depends from the cables. The buoyant structure of this, and of the other embodiments described in this disclosure, functionally constitute, and might equivalently be referred to as, a "buoy," "flotation and/or buoyant module," "floating and/or buoyant platform," and/or "float." Regardless of the label used in its description, a principal purpose and/or function of buoyant structure 1 is to hold the embodiment at or adjacent to the surface 4 of a body of water and transmit a periodic lifting force to the inertial mass.

Each "ribbon cable," e.g. 11, is a set of individual cables, chains, ropes, and/or other flexible connectors or linkages, which are organized as a bundle, preferable in a "flat" configuration in which the individual cables within a bundle are arrayed in a planar pattern. Such a flat configuration may facilitate the passage of each such ribbon cable over and/or around its respective roller, e.g. each individual cable passing over and/or around its own approximately circumferential grooves within the surface of its respective roller, especially grooves following a spiraling contour along the surface of the roller. The ribbon cable of this, and of the other embodiments described in this disclosure, functionally constitute, and might equivalently be referred to as, a "cable," "ribbon," "belt," "strap," and/or flexible connector.

The flexible connectors, and/or ribbons, and/or ribbon cables, of this and of the other embodiments described in this disclosure, may be composed and/or fabricated of: chains, ropes, steel cables, belts, roller chains, linkages, synthetic cables, gear belts, v-belts, synchronous timing belts, drive belts, pulley belts, and/or any other flexible relatively long, and relatively narrow, cord.

In some embodiments of the present disclosure, the ribbon cables, e.g. 11, are actually integral flat flexible connectors and/or belts. These types of belts are sometimes referred to as, and/or composed and/or fabricated of: "belts," "timing belts," "v-belts," "synchronous timing belts," "drive belts," "pulley belts," and/or any other flexible relatively long, and relatively flat, fabric or polymer or composite member.

The "wet weight" of a restoring weight or an inertial mass refers to the weight of the restoring weight or inertial mass, less the weight of the water that it displaces. In other words, the "wet weight" of an object is the "net" weight of the object when submerged, and represents or is proportional to the degree to which it will tend to sink within a body of water.

FIG. 2 shows a "bottom-up" view of the buoy 1 of the embodiment illustrated and discussed in relation to FIG. 1. The PTO module 6B-6C extends through the bottom of the buoy's hull. And, exposed to the body of water at the bottom of the PTO module are four rollers, e.g. 21. Supported by the top surface of, and thereby rotatably connected to, each roller, e.g. 21, is a ribbon cable, e.g. 17. Each roller spins about a shaft, e.g. 22-23, or axle, that extends through a vertical wall of the PTO module, thus penetrating the walls that separate the interior of the PTO module from the water on which the buoy 1 floats.

FIG. 3 shows a cross-sectional view of the embodiment illustrated and discussed in relation to FIGS. 1 and 2, and taken across section line 3 in FIG. 1. This illustration omits the inertial mass connected to the distal ends of the ribbon cables, e.g. 12 and 13. It also omits the restoring weight, i.e. the chain, connected to the ends of the outermost ribbon-cable portions, e.g. 17, 18, and 27.

A buoy 1 has a hemi-spherical hull 5, which promotes its turning of its longitudinal axis with respect to its nominal vertical orientation so as to keep its longitudinal axis, and the ribbon cables connecting it to the submerged inertial mass (10 in FIG. 1) aligned, i.e. so as to minimize the degree to which, and the duration during which, the vertical axis of the buoy fails to pass through the inertial mass' approximate center of mass, or, put differently, the bottom of the buoy fails to point at the inertial mass.

The buoy is composed, at least in part, of a cementitious material, e.g. cement or concrete, and has been fabricated through a 3D-printing process. This process has resulted in the creation of a cementitious buoy 1 that contains approximately spherical voids, e.g. 26, as well as a strong and/or reinforced aperture in which the PTO module 6A, 6B, 6C, 7, and 8, has been placed, and is seated. The reduction in the module's cross-sectional area, e.g. at inflection point 8, allows the PTO module to enter the aperture in the buoy from above, but not to pass through the buoy.

The bottom-most portion of the PTO module 6B and 6C contains walls that separate the interior space within the module from the water below the buoy. However, those walls also create a cross- or x-shaped space at the bottom end of the module that is open to the water. Four rollers, e.g. 21A and 28, are positioned within this cross-shaped space and are typically fully-submerged during the embodiment's operation.

A ribbon cable, e.g. 13/18, engages each roller, and is thereby rotatably connected to each respective roller. In some embodiments, constituent cables of the ribbon cable each wind multiple times around their respective rollers. In some embodiments, these constituent cables are each fixedly attached to its respective roller at at least one location on said roller. As the buoy is lifted by a wave, the buoyant lifting force imparted by the buoy 1 to the ribbon cables results in an upward acceleration of the inertial mass (10 in FIG. 1). However, due to its substantial mass, the upward acceleration of the inertial mass is significantly smaller than the maximum possible upward acceleration of the buoy 1. This lack of complementary motion between the buoy and the attached inertial mass results in, and indeed requires, that the ribbon cable portions, e.g. 12, lengthen so as to preserve the connection between the buoy and the inertial mass.

The forceful paying out of the portion of each ribbon cable, e.g. 13, that connects the buoy to the inertial mass, results in a turning of the respective rollers, e.g. 21A, and a corresponding shortening of the other respective portion of each ribbon cable, e.g. 18 to which the shared restoring weight (19 in FIG. 1) is attached, is accomplished through a turning of each respective roller, e.g. 28, about its axle or shaft.

The axle or shaft of each roller penetrates the wall of the PTO module 6B and 6C is connected to a respective crankshaft. As each roller turns, its corresponding crankshaft turns.

Each crankshaft contains a number of "crank axles" or "crank throws," i.e. short axles radially displaced from the primary crankshaft, such that when the crankshaft turns, each crank axle moves along an approximately circular path. The rotational axis of each crank axle is not coaxial with the rotational axis of its respective crankshaft.

Each crank axle is rotatably connected to a "driving rod," e.g. 29. Each driving rod is an approximately straight, rigid rod, bar, strut, or other elongate structural element, one end of which engages with its respective crank axle. The other end of each driving rod is rotatably or hingably connected to one end of a "connecting rod," e.g. 31. And, the other end of each connecting rod, is hingably or rotatably connected to the "piston rod" of a hydraulic cylinder or piston, e.g. 32.

As each roller turns, and its respective crankshaft rotates, the set of interconnected driving rods, connecting rods, and piston rods, connected to each of its crank axles, move so as to drive the respective pistons back and forth within their respective hydraulic cylinders, e.g. 32. This results in the pressurization and pumping of hydraulic fluid.

In the embodiment illustrated in FIG. 3, the hydraulic fluid pressurized by the plurality of hydraulic pistons is pooled and/or combined. The resulting pressurized flow of hydraulic fluid is input to, and turns, a turbine 34. The turbine 34 is rotatably connected to a generator 35 which generates electrical power in response to the turning of the rollers.

In another embodiment similar to the one illustrated in FIG. 3, the buoy is constructed of another material, e.g. steel, and/or is constructed of a mixture of materials. Any buoyant structure, regardless of the materials of which it is made, or the method by which it is fabricated, falls within the scope of the invention herein disclosed. The creation of a buoyant structure of sufficient buoyancy and strength to serve as the buoy in an embodiment of this disclosure may be accomplished by a number of methods, and with a number of materials.

The scope of the present disclosure is not limited by the method, design, and/or materials, by and/or through which an embodiment's buoy is fabricated.

In the embodiment illustrated in FIG. 3, each strand of each ribbon cable is wound about its respective roller over an extent of approximately 180 degrees (i.e. half a turn). In other embodiments similar to the one illustrated in FIG. 3, each strand of each ribbon cable is wound about its respective roller approximately 540 degrees (i.e. 1.5 turns), 900 degrees (i.e. 2.5 turns), and so on.

Each strand of each ribbon cable in an embodiment of the present disclosure may be wound around its respective roller by any number of turns.

In some embodiments of the present disclosure similar to the one illustrated in FIG. 3, the surfaces over which the ribbon cables are wound, and/or against which they interact with the rollers, are approximately flat. In other embodiments, the rollers contain circumferential grooves. And, in other embodiments, the rollers contain spiral grooves. The present disclosure includes embodiments with rollers characterized by any circumferential surface configuration, shape, attribute, and/or quality.

Figure 4:
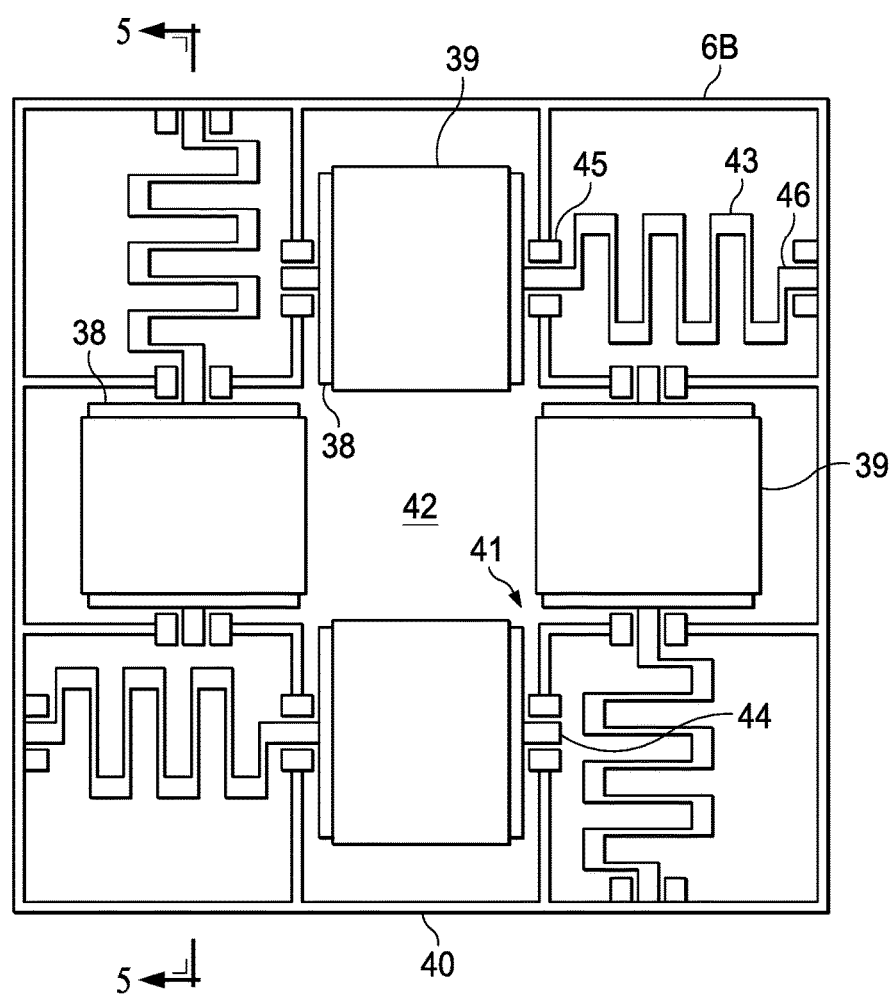
FIG. 4 is a sectional view of the embodiment of FIG. 3.

FIG. 4 shows a cross-sectional view of the embodiment illustrated and discussed in relation to FIGS. 1-3, and taken across section line 4 in FIG. 3 This illustration omits the inertial mass and the restoring weight connected to the ends of the ribbon cables.

The walls, e.g. 40 and 41, of the PTO module 6B create a "plus-" or "cross-shaped" enclosure in which are positioned four rollers, e.g. 38, and which is open to the body of water 42 below. These walls, e.g. 41, also isolate portions of the PTO module's interior, keeping those portions separate from the surrounding water. Where the shaft of each roller passes through the wall of the PTO module to interface with the respective crankshaft, a bearing and seal can be provided to limit water ingress and provide for smooth rotation.

Each roller, e.g. 38, is rotatably connected to a ribbon cable, e.g. 39. As the ribbon cable is pulled up and down by the inertial mass (10 in FIG. 1) and restoring weight (19 in FIG. 1), the cable rolls over its respective roller e.g. 38, thereby turning the roller.

Each roller, e.g. 38, spins and/or turns about an axle or shaft, e.g. 44 and 43. While the portions of the roller axles adjacent to the rollers is immersed in the water 42, the distal portions of each axle pass through the PTO module's walls, e.g. on or within bearings 45. A portion of each roller's axle includes a crankshaft, e.g. 46, that contains a number of "crank axles" or "crank throws" e.g. 43. As each crankshaft rotates about its longitudinal axis, which is coaxial with its axis of rotation, each crank axle rotates about the crankshaft's axis of rotation, but at a substantial radial distance from that axis of rotation. Each crank axle's axis of rotation is not coaxial with its respective radial axis of symmetry.

Figure 5:
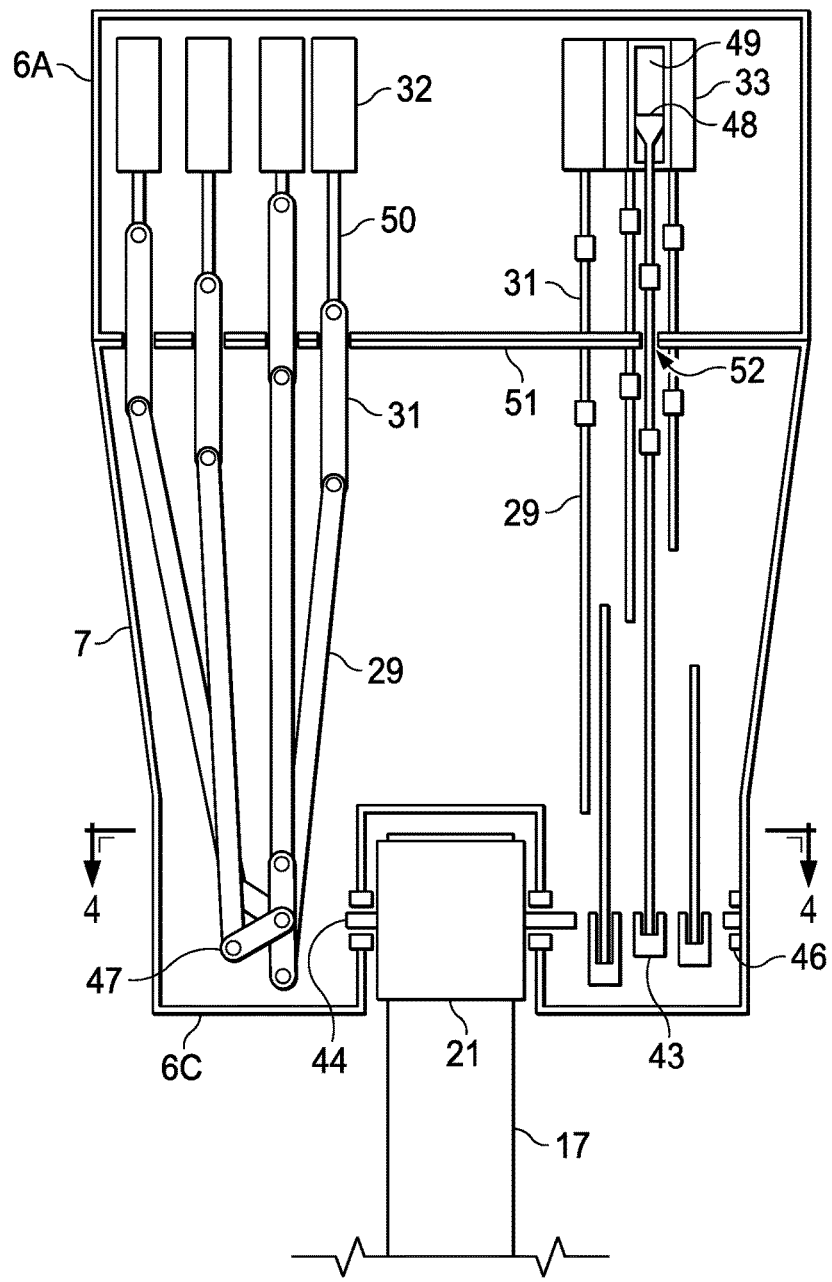
FIG. 5 is an enlarged, sectional view of the power-take-off module of FIG. 4.

FIG. 5 shows a cross-sectional view of the PTO module of the embodiment illustrated and discussed in relation to FIGS. 1-4, and taken across section line 5 in FIG. 4. This illustration omits the buoy, the inertial mass, and the restoring weight, as well as all but one of the rollers.

As ribbon cable 17 is pulled up and down by the attached inertial mass (10 in FIG. 1) and restoring weight (19 in FIG. 1) it causes the roller 21 to rotate. The rotation of roller 21 causes a corresponding rotation of its respective crankshaft 43 (only a portion of which is within the sectional view). The rotation of the crankshaft 43 causes the rotation of the crankshaft's plurality of crank axles, e.g. 43. The rotation of the crankshaft's crank axles causes the rotatably connected driving rods, e.g. 29, to rotate and/or oscillate within their planes of rotation. The oscillations of the driving rods causes the respective rotatably connected connecting rods, e.g. 31, to oscillate. However, in this embodiment, the connecting rods are only able to oscillate along their longitudinal axes, i.e. to oscillate back-and-forth along an approximately constant longitudinal path. The linear oscillations of the connecting rods cause the respective piston rods, e.g. 50, to which they are rotatably connected, to oscillate linearly, and to drive back and forth their respective piston heads, e.g. 48. The linear oscillations of the piston heads pressurizes and pumps hydraulic fluid (and/or another fluid, e.g. air or water) through a fluid circuit that results in the spinning of a turbine or hydraulic motor and the consequent spinning of a generator rotor and a generation of electrical power.

FIG. 5 includes a longitudinal view of a second crankshaft 47 (only 4 of six crank axles which are within the sectional view. Note that each crank axle is rotatably connected to a driving rod, e.g. 29, which, in turn, is rotatably connected to a connecting rod, e.g. 31, which, in turn, is rotatably connected to a piston rod, e.g. 50, and thereby by an hydraulic piston, e.g. 32.

Note that the connecting rods, e.g. 31, spans the walls 51 that separate the PTO module 6A and 7 into upper 6A and lower 7 portions and/or sections. The end of each connecting rod, e.g. 31, that connects the connecting rod to its respective driving rod, e.g. 29, remains within the lower section 7 of the PTO module. While the other end of each connecting rod, e.g. 31, that connects the connecting rod to its respective piston rod, e.g. 50, remains within the upper section 6A of the PTO module. This division, and/or segregation, of the PTO module into upper and lower sections, facilitates the removal, and/or replacement, of that portion of the PTO module containing the hydraulic cylinders. This means that in the event that one or more hydraulic cylinders require maintenance, repair, and/or replacement, then as an alternative to having a technician climb inside the PTO module and execute the needed work therein, and, as an alternative to removing and/or replacing the entire PTO module, it will be possible to instead remove and replace only the upper section, e.g. after disconnecting the connecting rods from their respective piston rods.

FIG. 6 is a top-down cross-sectional view of the embodiment illustrated and discussed in relation to FIGS. 1-5, and taken across section line 6 in FIG. 1. The sectional view primarily provides a view of the embodiment without the upper wall of the PTO module, thereby allowing an inspection of the associated hydraulic pistons, turbine, and generator therein.

Hemi-spherical buoy 1 contains at its center PTO module 6. Visible in the illustration of FIG. 6 is the contents of the upper section of the PTO module 6. A plurality of hydraulic pistons, e.g. 32, are positioned within the module. Indicated in dashed lines are the positions of one of the four rollers 21, and its respective crankshaft 43, located in the lower section of the PTO module, but obscured from direct view by the adjacent pair of walls that separate the upper and lower sections of the PTO module.

Each hydraulic piston, e.g. piston 5, has been positioned and/or aligned with the plane, e.g. 53, in which its corresponding and/or respective driving rod rotates and/or pivots and/or oscillates in response to a turning of its respective crankshaft, e.g. 43. The relative positions, and/or distribution, of the hydraulic cylinders illustrated in FIG. 6 allows for a maximally, or near maximally, separation of the cylinders from one another. This facilitates access to the cylinders, and accommodates their replacement (or upgrade) with cylinders of larger diameter at a future time.

The hydraulic fluid pressurized by the hydraulic cylinders is directed into a turbine 34, and the rotational kinetic energy thereby imparted to the turbine, is used to drive an electrical generator 35.

Figure 7:
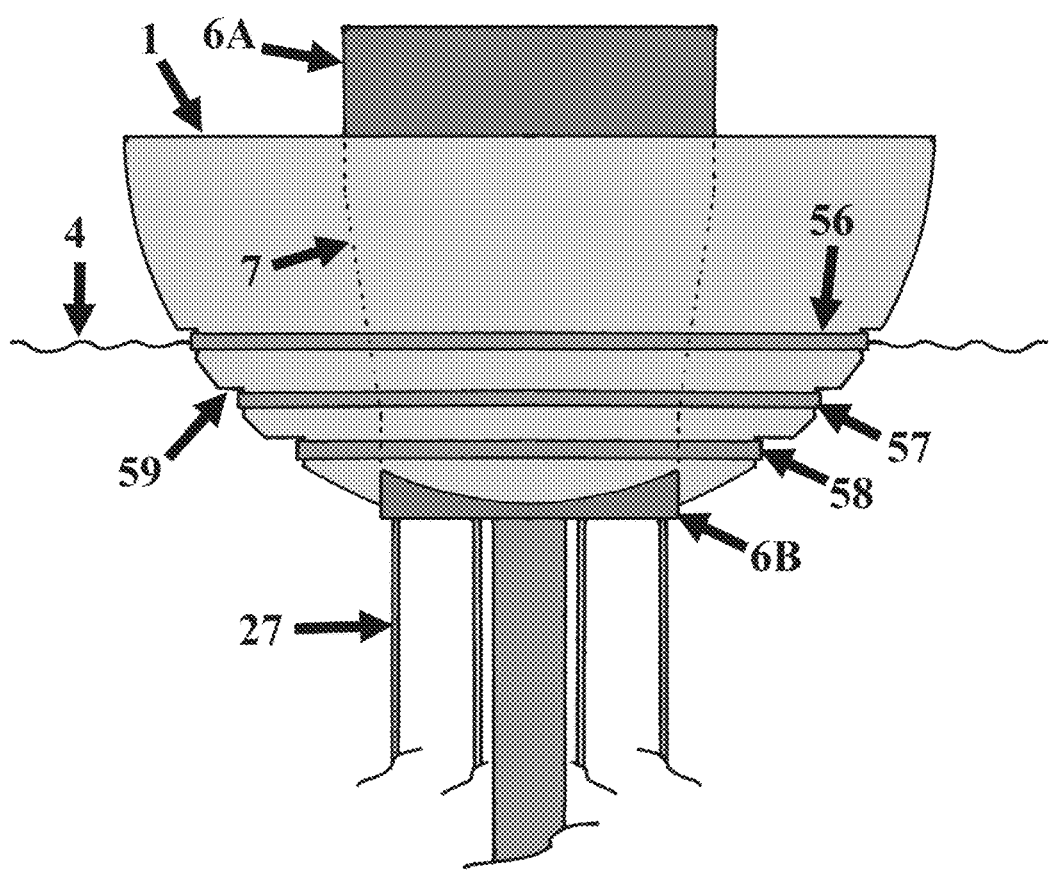
FIG. 7 is an enlarged, elevated perspective view the flotation module of FIG. 1 including post-tensioning bands.

FIG. 7 is a side view of an embodiment similar to the one illustrated and discussed in relation to FIGS. 1-6. This illustration omits the inertial mass, and the restoring weight. Unlike the embodiment illustrated in FIGS. 1-6, this embodiment's buoy has been provided with additional radial strength through the inclusion of post-tensioning bands 56-58. These bands help to counter the radial and outward forces exerted on the buoy by the PTO module 6A-6B, and 7, at its center. Post-tensioning bands 56-58 can be steel cables and/or synthetic rope cables.

Figure 8:
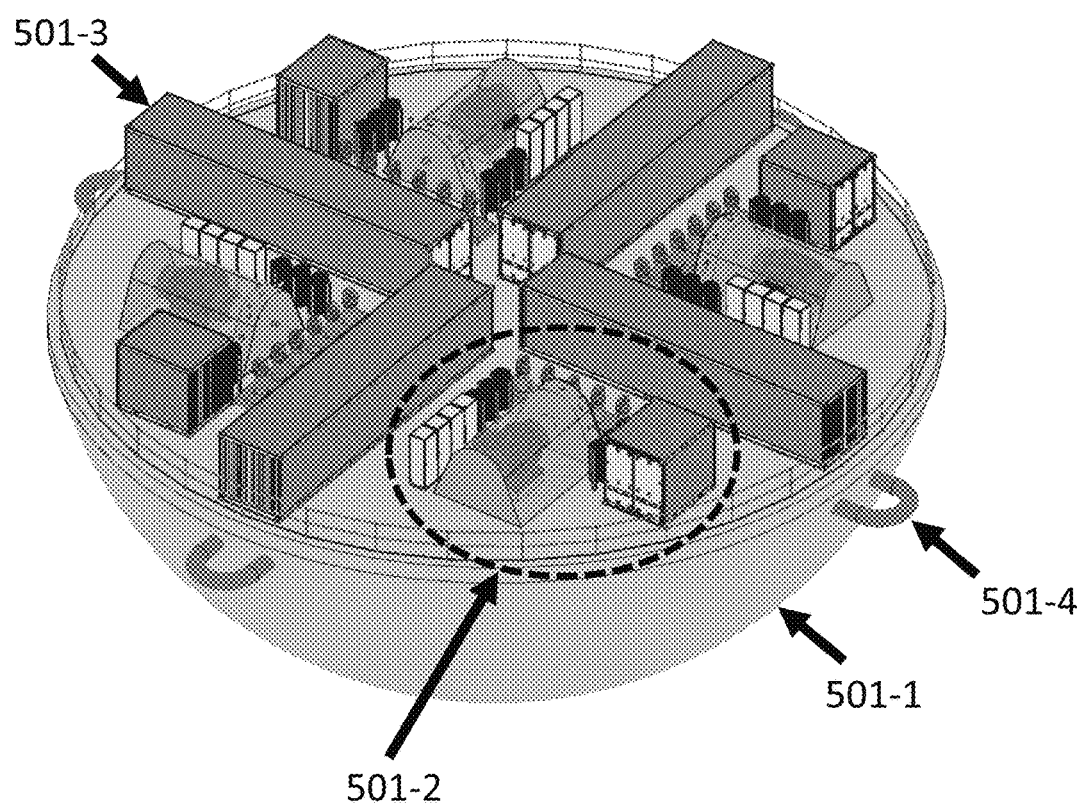
FIG. 8 is a perspective top down view of the flotation module of a second preferred embodiment of the present invention.

FIG. 8 shows a perspective view of an embodiment of the current disclosure.

Floatation module 501-1 is shown to contain four PTO systems 501-2, four payloads 501-3, and attachment points 501-4.

Payloads 501-3 are installed into existing mounts/sockets built into floatation module 501-1. Payloads 501-3 are provided electrical power and status data from floatation module 501-1 via the mounts/sockets they are installed into, e.g. using a data API. The data interface also allows the payloads 501-3 to provide status data and/or computational instructions back to floatation module 501-1 (e.g. to computer systems that form part of the control system of the converter).

Attachment points 501-4 can be used for towing, mooring, or mating other lines, cables, chains, or bodies to floatation module 501-1. Attachment points 501-4 can also have electrical interfaces which allow power to be transmitted off or received onto flotation module 501-1.

Figure 9:
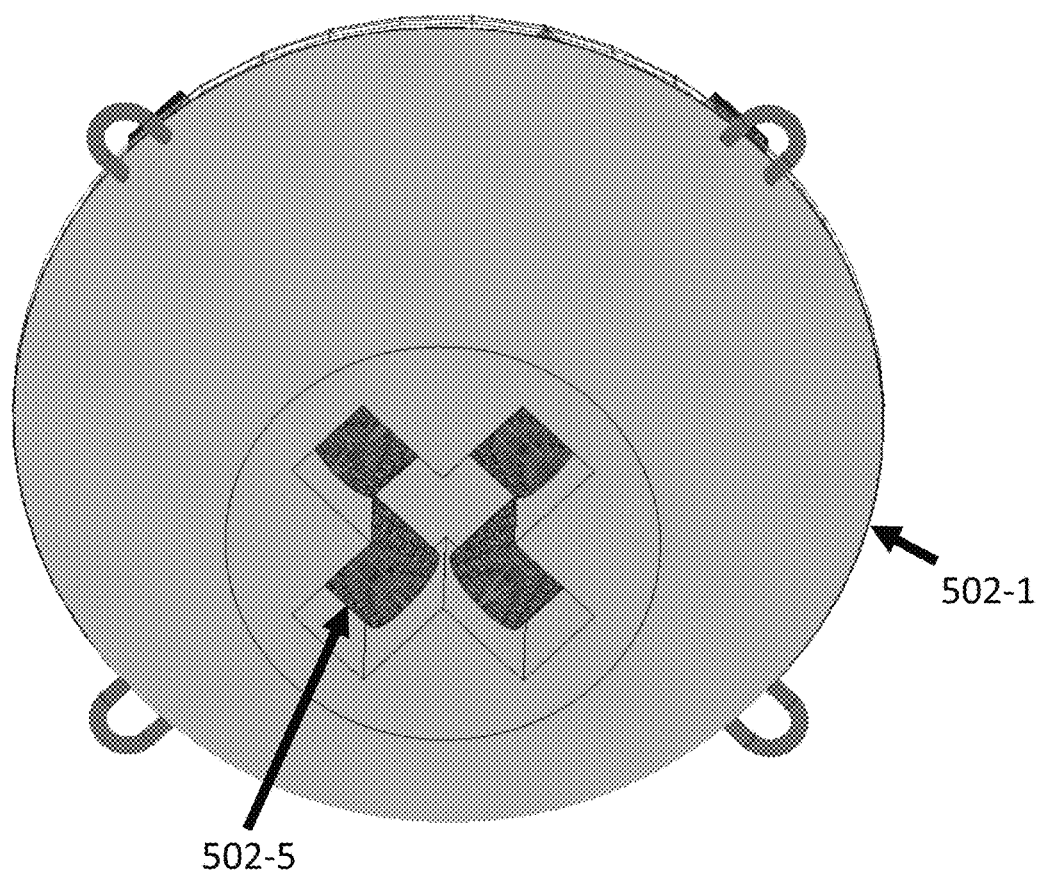
FIG. 9 is a perspective bottom up view of the flotation module of FIG. 8.

FIG. 9 shows a perspective view of the same embodiment of the current disclosure shown in FIG. 8.

Floatation module 502-1 is shown containing four pulleys/capstans (or "drums") 502-5. Drums 502-5 are recessed in and located near the center and bottom of flotation module 502-1. Drums 502-5 can contain grooves/tracks for cables/ropes (a flexible connector) to be constrained within, e.g. one or more spiral grooves. Four drums 502-5 are shown, however more or fewer could be utilized. Motion of the floatation module 502-1 due to displacement of the surface of a body of water it is floating in can cause drums 502-5 to rotate, e.g. when the inertial mass to which the cables/ropes are attached moves in the opposite direction.

Flotation module 502-1 has an approximately hemispherical bottom hull contour to minimize its hydrostatic stability and enable the bottommost portion of the flotation module to rotate freely to point toward the inertial mass when a tension is applied to the drums 502-5.

Figure 10:
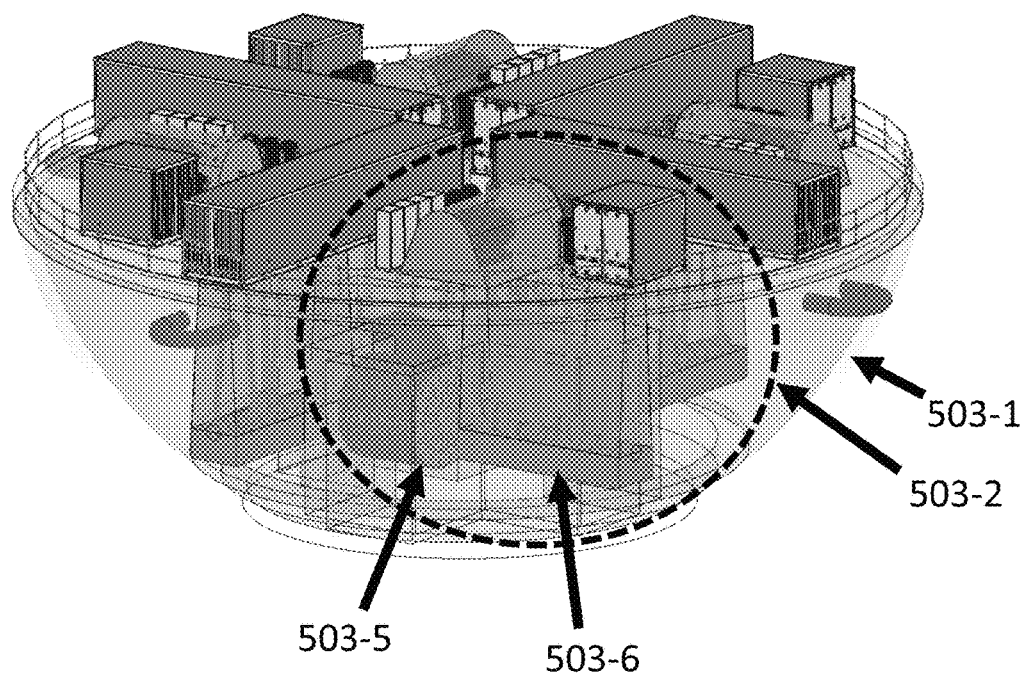
FIG. 10 is a perspective top down view of the flotation module of the embodiment of FIG. 8 using partial transparency of the buoy walls to facilitate examination of the power-take-off assemblies therein.

FIG. 10 shows a perspective view of the same embodiment of the current disclosure shown in FIG. 8.

Flotation module 503-1 is shown with its shell transparent so internal components can be seen. PTO system 503-2 is shown to include drum 503-5. Connected to drum 503-5 is crankshaft-driven piston assembly 503-6. Assembly 503-6 can be manufactured as an integral unit suitable for installing in the flotation module as unit, e.g. by lowering it into place using a crane. The embodiment shown contains four PTO systems 503-2, however more or fewer could be utilized. The PTO systems are arranged in a circular pattern around a horizontal center of the buoy, each interfacing with one of the drums at a bottom portion of the buoy. In this embodiment, the PTO systems do not share a common mechanical apparatus or hydraulic circuit. In other embodiments, the multiple PTO systems are mechanically linked (so that the drums connected to each are constrained to rotate at the same rate) and/or the multiple PTO systems are hydraulically linked (so that fluid pumped by different PTO systems intermingles).

Figure 11:
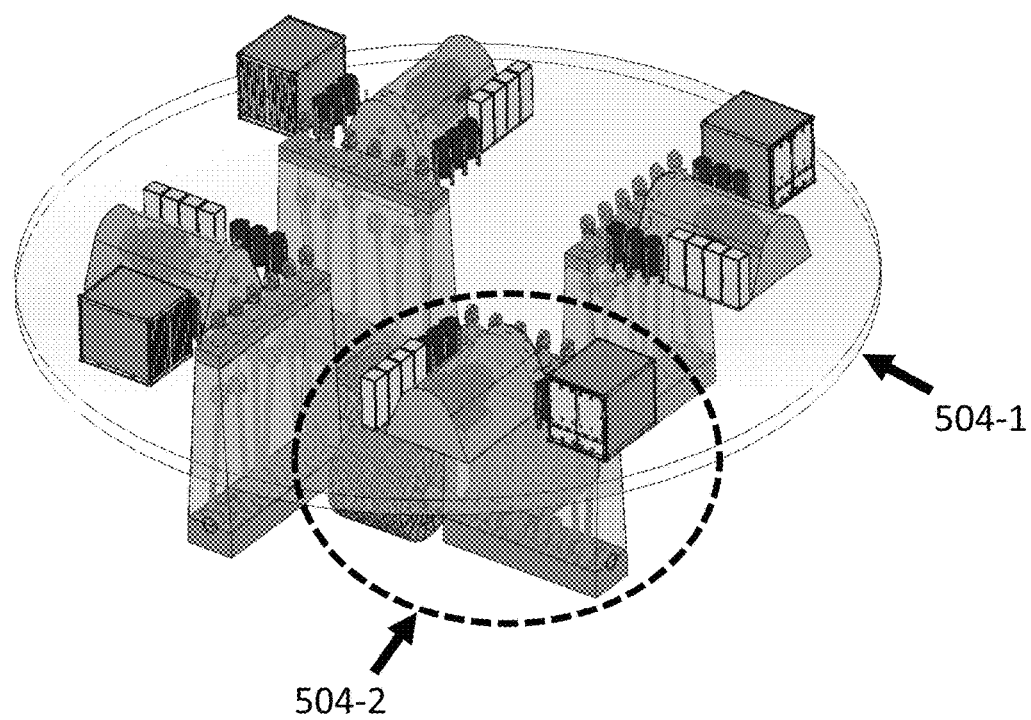
FIG. 11 is a perspective top down view of the power-take-off assemblies of the flotation module of FIG. 10.

FIG. 11 shows a perspective view of the same embodiment of the current disclosure shown in FIG. 8.

Floatation module 504-1 is shown with its upper surface transparent and all other components except the PTO systems 504-2 hidden so internal components can be seen. FIG. 11 shows the orientation of the four PTO systems 504-2 relative to each other.

Figure 12:
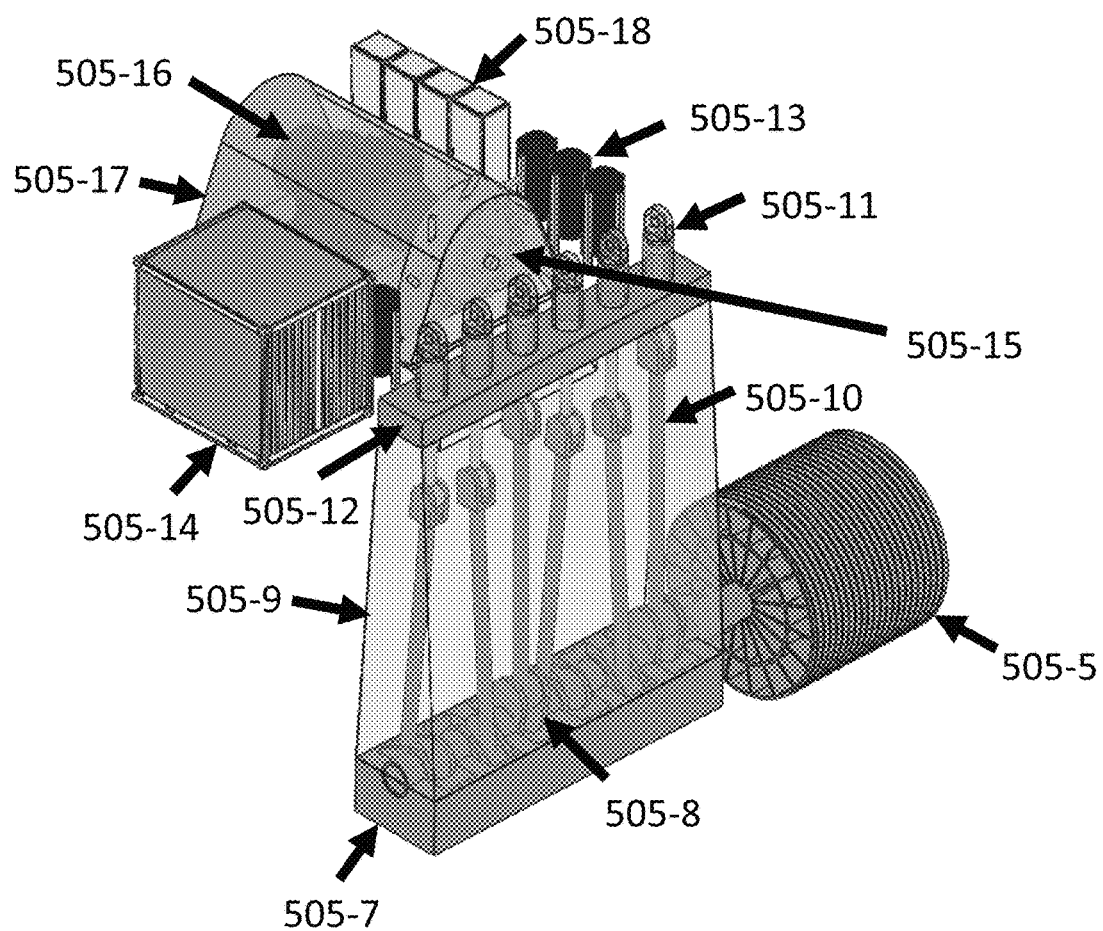
FIG. 12 is a perspective top down view of one of the four power-take-off assemblies of the flotation module of FIGS. 8-10.

FIG. 12 shows a perspective view of the same embodiment of the current disclosure shown in FIG. 8.

FIG. 12 shows detail of PTO system 504-2. Drum 505-5 is rigidly connected to crankshaft 505-8. Rotative motion of drum 505-5 can cause crankshaft 505-8 to rotate within crankcase/fluid reservoir 505-7. Piston connecting rods 505-10 are connected to throws on crankshaft 505-8 and to the rods of pistons 505-11. This linkage assembly is enclosed by crankcase cover 505-9. Six pistons 505-11 are utilized in this embodiment, however more or fewer could be utilized. Rotative motion of crankshaft 505-8 causes the rods of pistons 505-11 to linearly reciprocate. Pistons 505-11 are mounted in piston mount structure 505-12, which is an integral component to the crankshaft-driven piston assembly 503-6. Valving contained in the hydraulic control and filtration container 505-14 allows the reciprocating motion of the rods in pistons 505-11 to draw fluid from crankcase/fluid reservoir 505-7 and be pumped at high pressure to hydraulic turbine 505-15. Accumulators 505-13 maintain fluid pressure and flowrate to turbine 505-15 even if pistons 505-11 stop pumping fluid for a period of time. High pressure fluid driven into hydraulic turbine 505-15 causes turbine 505-15 to rotate. Turbine 505-15 has a shaft which is rigidly connected to the driveshaft of electric generator 505-16. Rotative motion of turbine 505-15 causes the electric generator 505-16 driveshaft to spin, producing electricity. Generator 505-16 is contained within generator housing 505-17.

Electricity produced by generator 505-16 passes through electrical conditioning equipment 505-18, which can condition, rectify, convert, step, and/or distribute the electricity as required.

Figure 13:
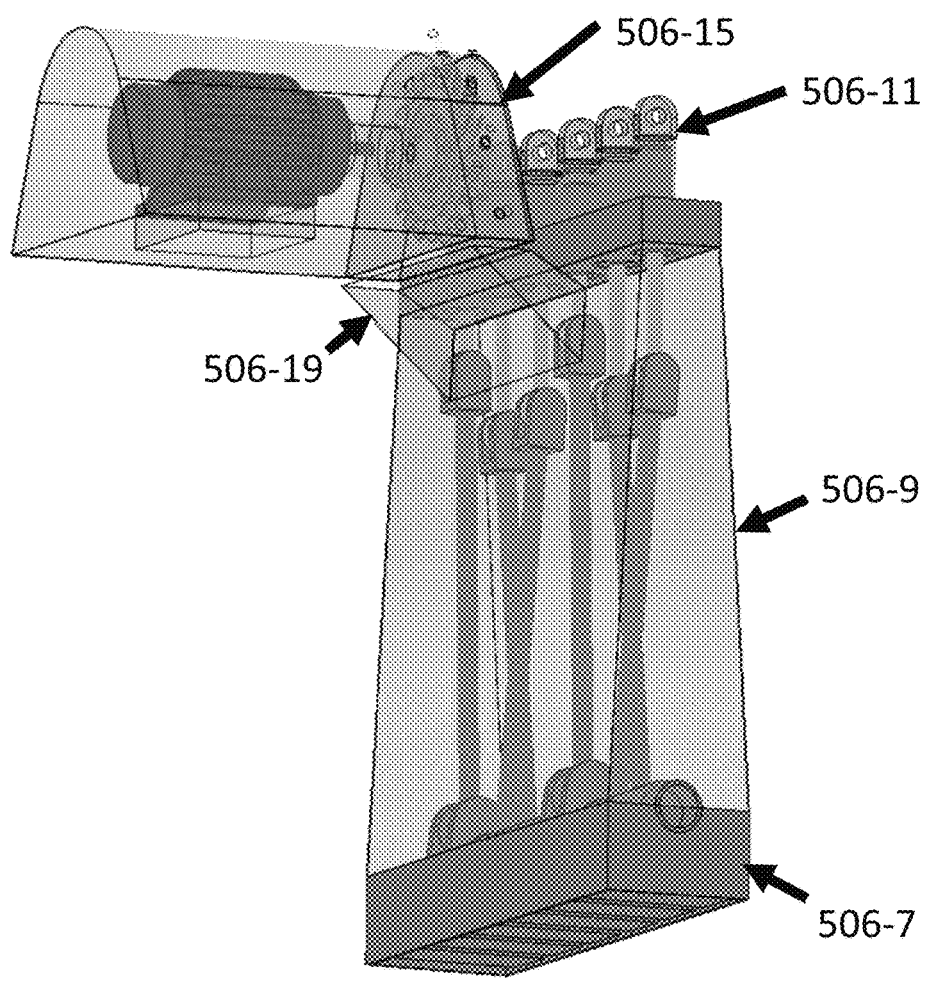
FIG. 13 is a perspective bottom up view of a portion of one of the four power-take-off assemblies of the flotation module of FIGS. 8-10.

FIG. 13 shows a perspective view of the same embodiment of the current disclosure shown in FIG. 8.

FIG. 13 shows a different view of PTO system 504-2. As described for FIG. 12, the reciprocating motion of the rods of pistons 506-11 draws fluid from crankcase/fluid reservoir 506-7 and pumps it at high pressure into hydraulic turbine 506-15, causing it to rotate. Fluid that has already driven turbine 506-15 returns to crankcase/fluid reservoir 506-7 via fluid return chute 506-19 and through a wall aperture in crankcase cover 506-9.

Figure 14:
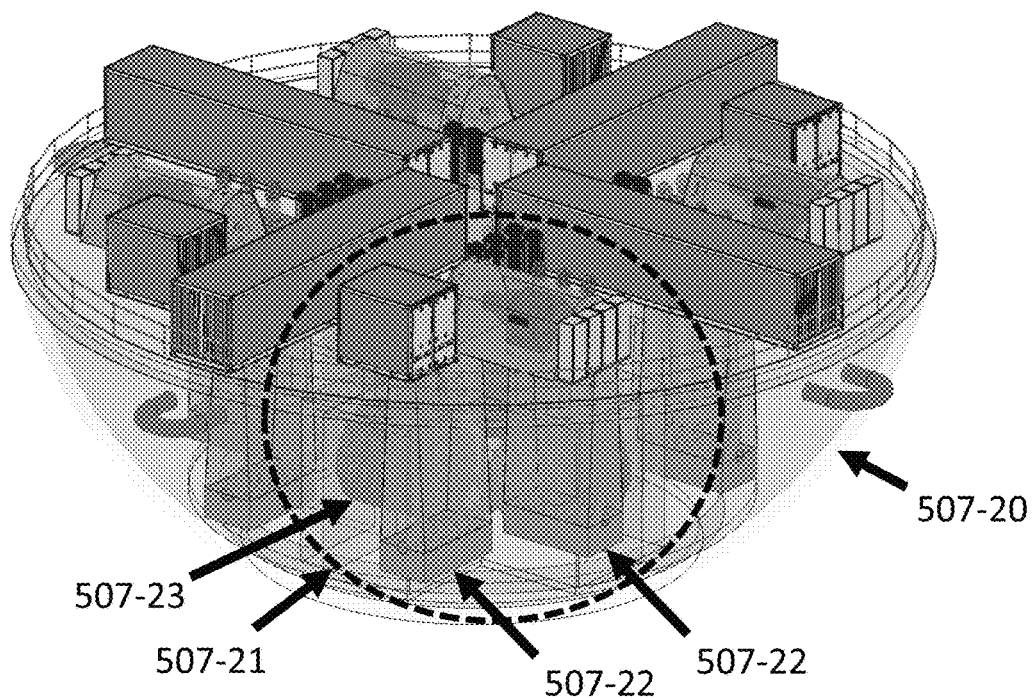
FIG. 14 is a perspective top down view of the flotation module of the embodiment of FIG. 8 incorporating an alternate power-take-off design.

FIG. 14 shows a perspective view of the same embodiment of the current disclosure shown in FIG. 8.

Floatation module 507-20 is shown with its shell transparent so internal components can be seen. PTO system 507-21 is shown to include two instances of crankshaft-driven piston assembly 507-22. Floatation module 507-20 features four PTO systems 507-21, thus eight crankshaft-driven piston assemblies 507-22 are utilized. Twice as many crankshaft-driven piston assemblies 507-22 can be utilized because each drum 507-23 is attached to two crankshaft-driven piston assemblies 507-22. This is the primary differentiation between this figure and FIG. 10, where each drum 503-5 is attached one crankshaft-driven piston assembly 503-6. Details of the single drum/dual crankshaft-driven piston assembly PTO system arrangement are shown in subsequent figures.

Figure 15:
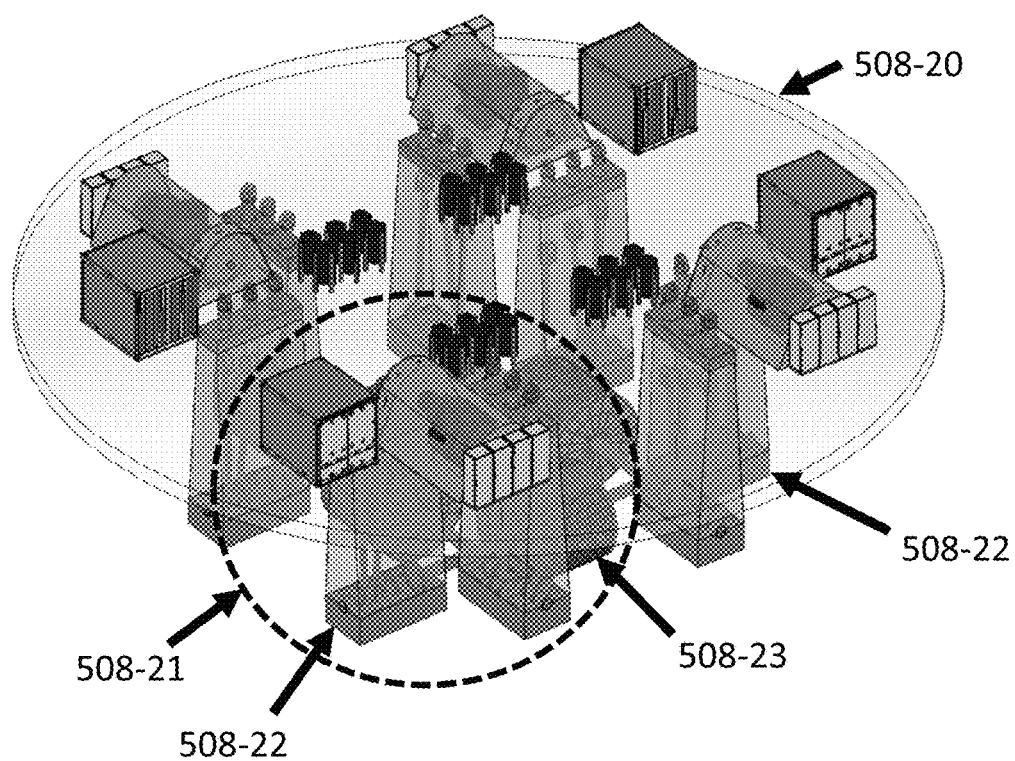
FIG. 15 is a perspective top down view of the power-take-off of the flotation module of FIG. 14.

FIG. 15 shows a perspective view of an embodiment of the current disclosure.

Floatation module 508-20 is shown with its upper surface transparent and all other components except the PTO systems 508-21 hidden so internal components can be seen. PTO system 508-21 is shown to include drum 508-23. Drum 508-23 is shown to connect to two instances of crankshaft-driven piston assembly 508-22. In this way, four drums 508-23 are used in floatation module 508-20, connected to eight crankshaft-driven piston assemblies 508-22.

Figure 16:
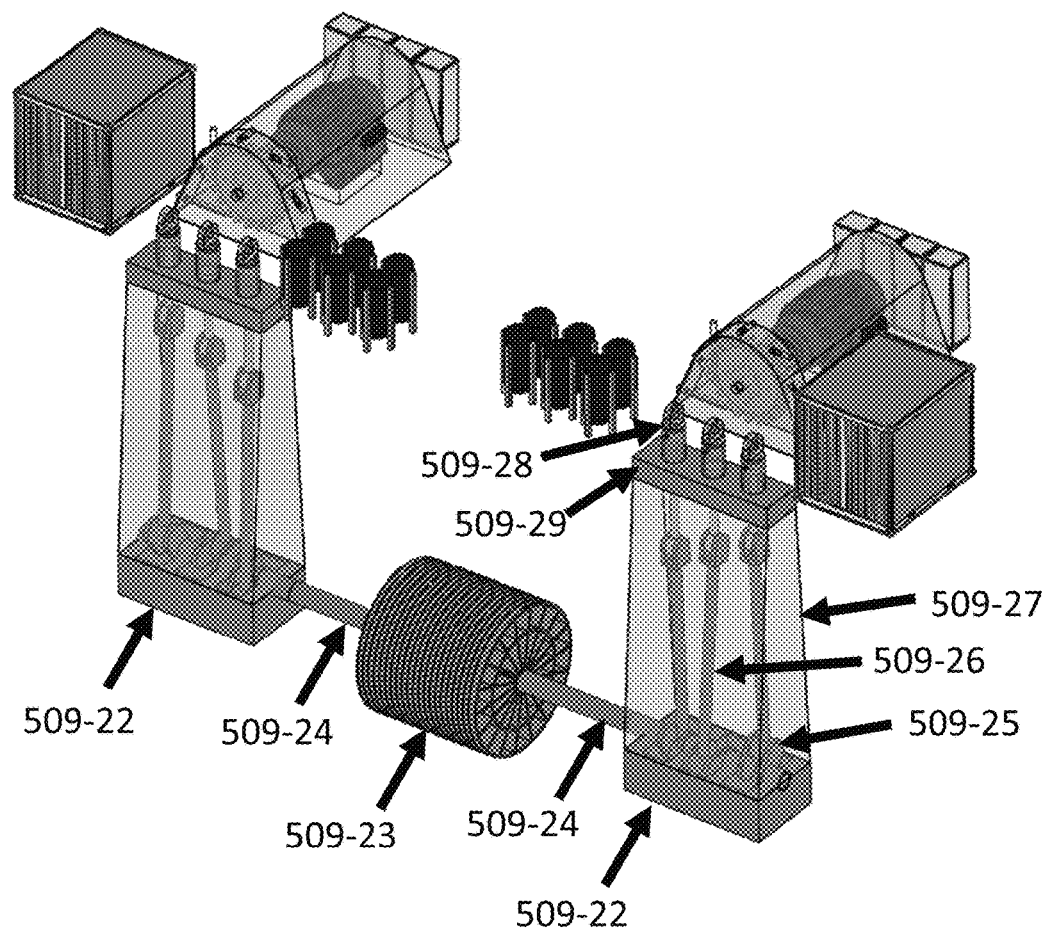
FIG. 16 is a perspective top down view of one of the four power-take-off assemblies of the flotation module of FIG. 14.

FIG. 16 shows a perspective view of an embodiment of the current disclosure.

FIG. 16 shows detail of PTO system 508-21. Most of the components are identical in form and function to FIG. 12 so only components which are different are described here. Drum 509-23 is rigidly connected to two crankshafts 509-25 via driveshafts 509-24. Rotative motion of drum 509-23 can cause crankshafts 509-25 to rotate within crankcases/fluid reservoirs 509-22. Piston connecting rods 509-26 are connected to throws on crankshaft 509-25 and to the rods of pistons 509-28. This linkage assembly is enclosed by crankcase cover 509-27. Rotative motion of crankshaft 509-25 causes the rods of pistons 509-28 to linearly reciprocate. Pistons 509-28 are mounted in piston mount structure 509-29, which is an integral component to the crankshaft-driven piston assembly 508-22. Three pistons 509-28 are utilized per crankshaft-driven piston assembly 508-22 in this embodiment, however more or fewer could be utilized. The fluid pumping action and power generation process utilized in this embodiment is identical to that described in FIG. 12.

Figure 17:
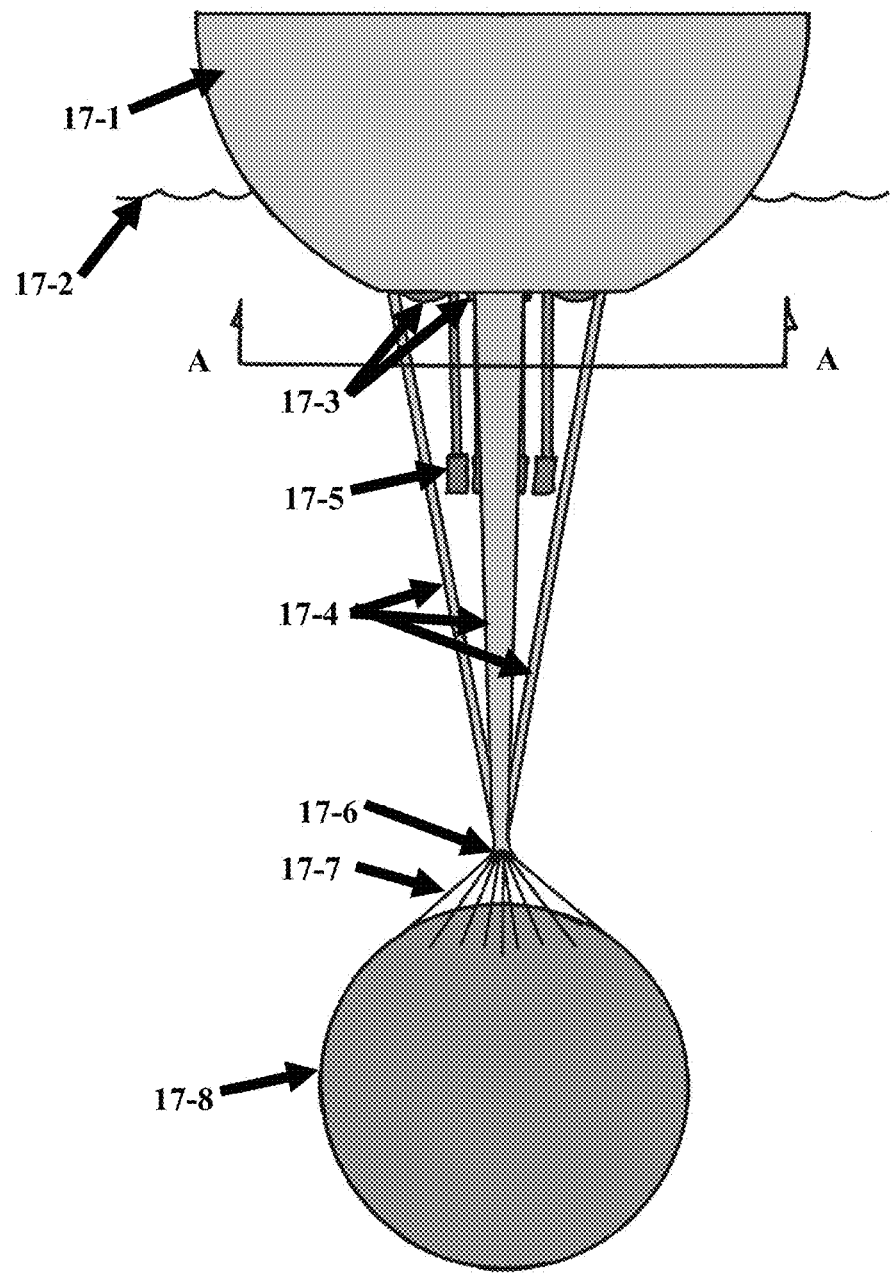
FIG. 17 is an elevated perspective view of a third preferred embodiment of the present invention.

FIG. 17 shows a side view of an embodiment of the current disclosure.

Floatation module 17-1 is floating on the surface of body of water 17-2. The shape of floatation module 17-1 is shown to be nearly hemispherical. Floatation module 17-1 is shown to contain multiple pulleys/rollers/sheaves ("drums") 17-3, which are inset to its outer mold line ("OML") near the bottom of the flotation module 17-1. Drums 17-3 may rotate about their cylindrical axis. Passing over and around drums 17-3 are flexible connectors 17-4. Each flexible connector 17-4 is comprised of a linear array of individual ropes/cables/chains, etc. (smaller flexible connectors), forming a "ribbon." One side of flexible connectors 17-4 attaches to restoring weights 17-5, which act to keep the flexible connector in tension. Restoring weights 17-5 have a net weight in water which is positive, meaning that they will sink if not attached to anything. Restoring weights 17-5 may be individual weights constructed of concrete, metal, or another material or may also be chains, rope or another flexible component which has a positive net weight in water, particularly chains or ropes of a thicker gauge than those of the ribbon. Flexible connectors 17-4 are commonly attached to confluence 17-6. Confluence 17-6 may be a shackle, swivel, or any one of a multitude of various mechanical hardware. Additional flexible connectors 17-7 are attached to the bottom of confluence 17-6. Additional flexible connectors 17-7 radiate from confluence point 17-6 and support inertial mass ("IM") 17-8. They can interface to IM 17-8 by directly attaching, forming a net to surround it, or by other means. Additional flexible connectors 17-7 may be individual ropes, chains, etc. or may be comprised of multiple flexible connector strands, as is the case for flexible connectors 17-4. IM 17-8 may be constructed of concrete, metal, plastic, or any material strong enough to support internal voids which are filled with water. IM 17-8 has a net weight in water which is positive, giving it the tendency to sink if not restrained. Note that the net weight of restoring weights 17-5 is a small fraction of the net weight of IM 17-8. The shape of floatation module 17-1 and its distribution of weight allows it to easily pitch and roll on the surface such that its vertical axis aligns itself with a line drawn between itself and the IM 17-8 in cases where IM 17-8 is not directly below floatation module 17-1.

Figure 18:
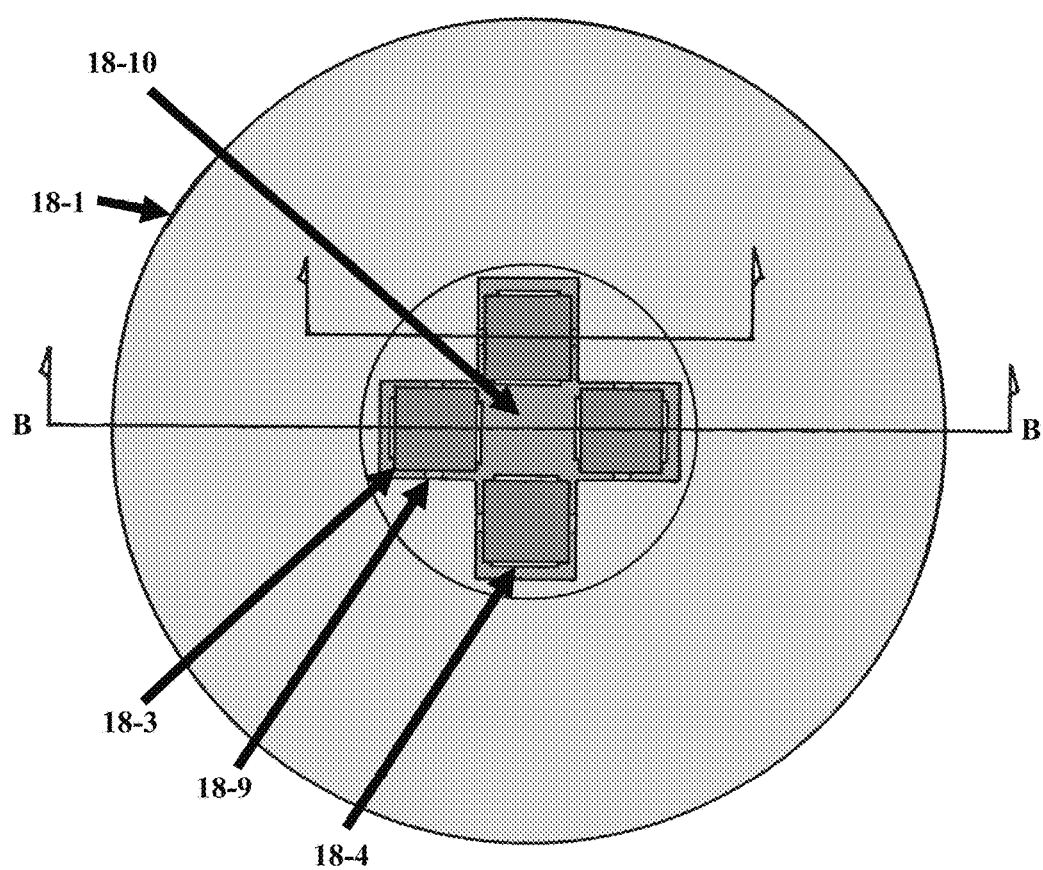
FIG. 18 is a sectional view of the embodiment of FIG. 17.

FIG. 18 shows section cut A-A from FIG. 17.

The bottom of flotation module 18-1 is shown in this figure. Void 18-10 is shown to be the space in which drums 18-3 are inset into the OML of flotation module 18-1. Four drums 18-3 are shown, however more or fewer could be utilized. Drums 18-3 are supported along their cylindrical axis by shaft 18-9. Shafts 18-9 interface to floatation module 18-1 and allow drums 18-3 to rotate. Flexible connector ribbons 18-4 are shown in cross section and are shown to be conformal to drums 18-3. In some embodiments, the constituent strands of flexible connector ribbons 18-4 are each multiply wound around the associated one of drums 18-3.

Figure 19:
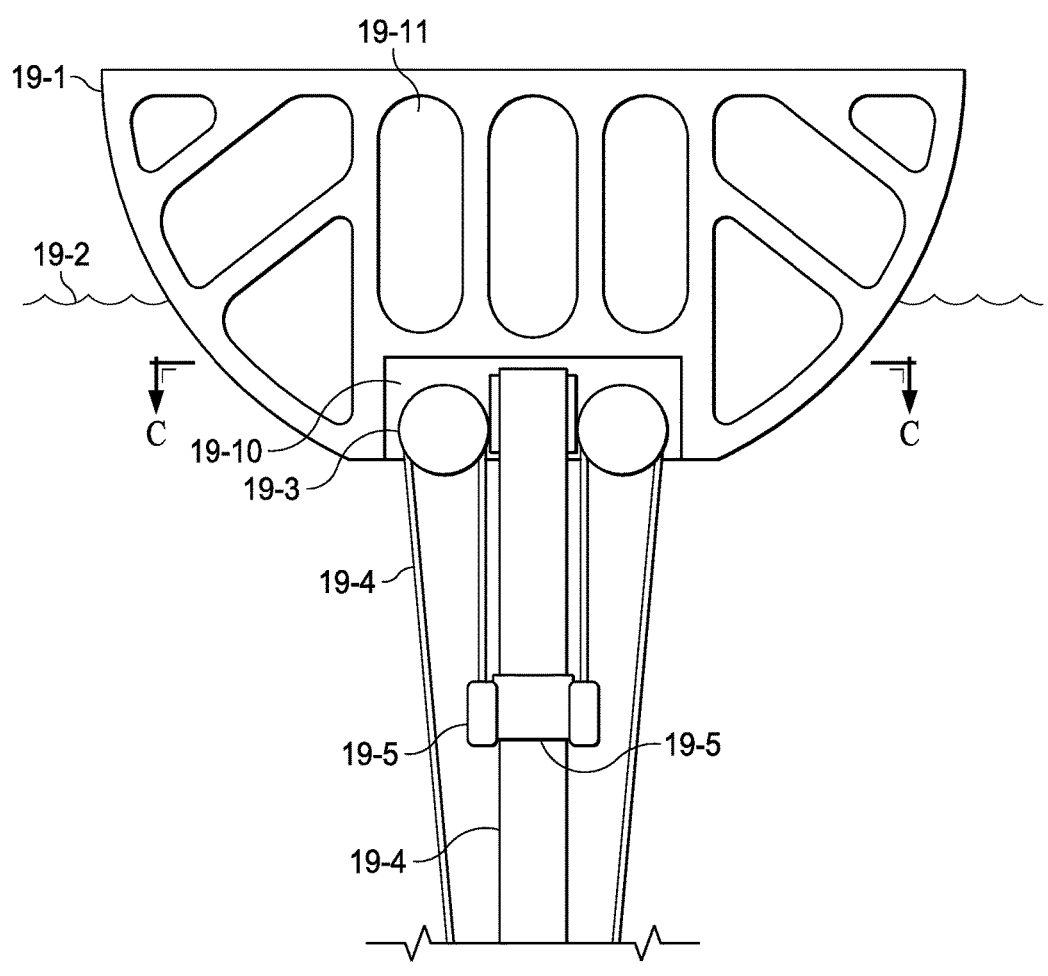
FIG. 19 is a sectional view of the embodiment of FIG. 18.

FIG. 19 shows section cut B-B from FIG. 18.

A cross section of flotation module 19-1 floating on body of water ("ocean") 19-2 is shown in this figure. Voids 19-11 are shown to exist in the physical structure of flotation module 19-1. The purpose of voids 19-11 is to minimize the weight of the flotation module 19-1 while leaving sufficient structure to manage and distribute the forces experienced by flotation module 19-1. Void 19-10 is shown to be the space in which drums 19-3 are inset into the OML of floatation module 19-1. Flexible connectors 19-4 can be seen to be of a ribbon form factor and passing on, around, and over drums 19-3. Restoring weights 19-5 are connected to the ends of flexible connectors 19-4 located closest to the central axis of flotation module 19-1.

Figure 20:
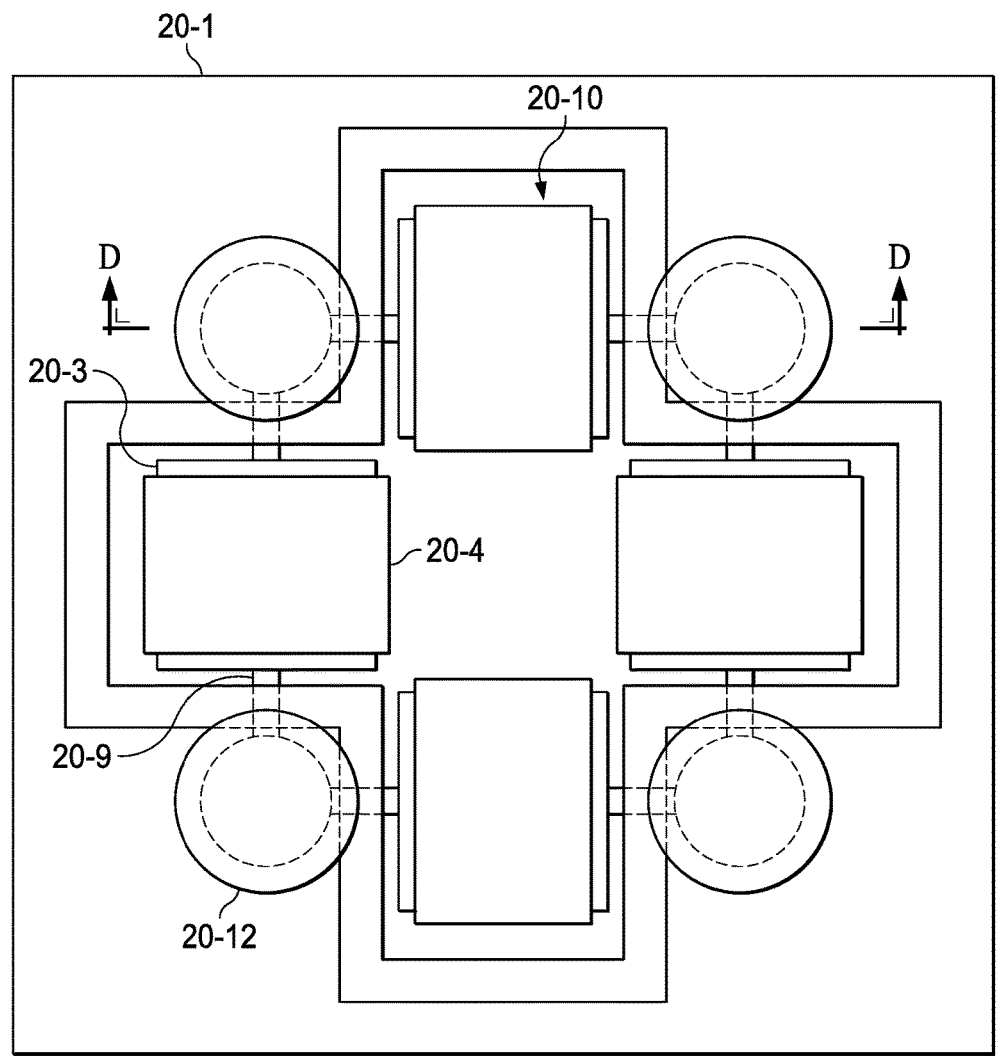
FIG. 20 is a sectional view of the embodiment of FIG. 19.

FIG. 20 shows section cut C-C from FIG. 19.

A horizontal cross section of flotation module 20-1 is shown in this figure, focusing on the components in and near void 20-10. Void 20-10 is again shown to contain drums 20-3, around which ribbon shaped flexible connectors 20-4 are wrapped. Drums 20-3 are shown to be supported by shaft 20-9, both sides of which interface to flotation module 20-1 and allow drums 20-3 to rotate. One side of shaft 20-9 can interface to gearbox/generator module 20-12. One gearbox/generator module is shown per shaft 20-9, however a gearbox/generator module 20-12 could be utilized on both sides of shaft 20-9. Rotative motion of drum 20-3 causes shafting within gearbox/generator module 20-12 to rotate, subsequently increasing the drum shaft 20-9 RPM and feeding higher RPM rotative motion into a generator within module 20-12 to produce electricity.

Figure 21:
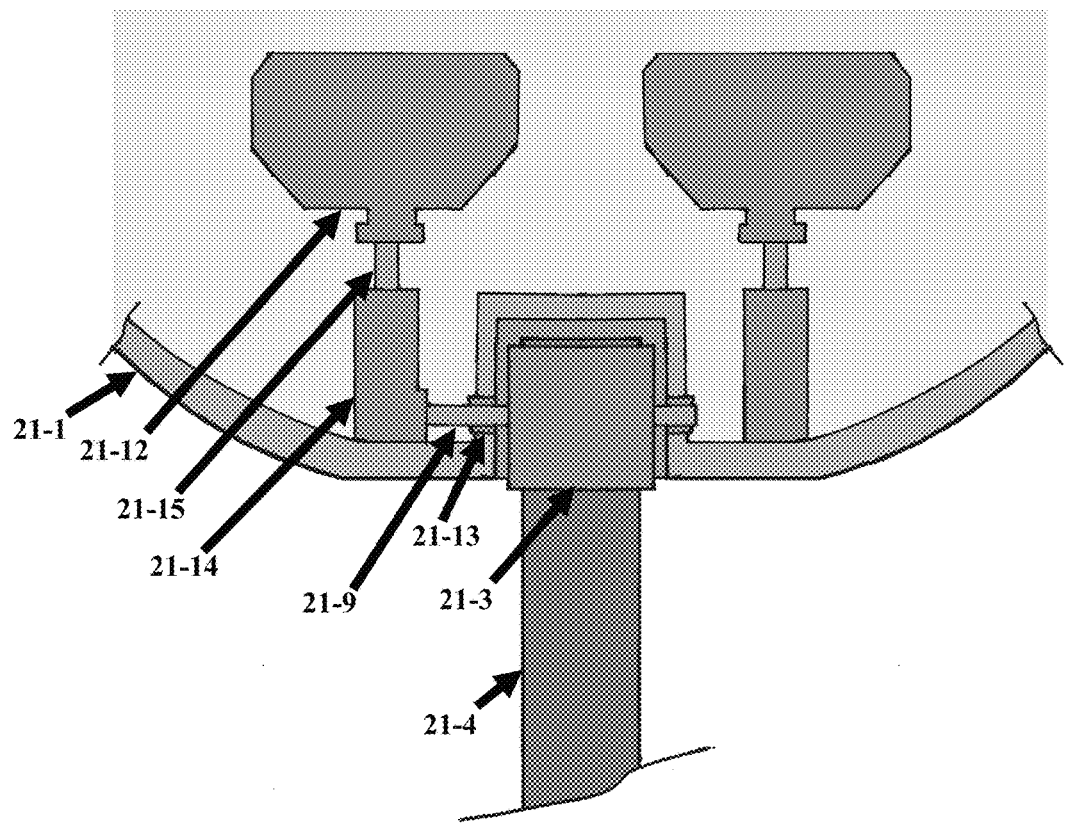
FIG. 21 is a sectional view of the embodiment of FIG. 20.

FIG. 21 shows section cut D-D from FIG. 20.

A vertical cross section of flotation module 21-1 is shown in this figure, focusing on one of the drums 21-3, and the hardware to which it interfaces. Drum shaft 21-9 extends into the internal structure of flotation module 21-9 and is supported on bearings 21-13 which can also act as a seal against the outside seawater. One side of drum shaft 21-9 can interface to a right-angled gearbox 21-14, which allows the power-take-off drivetrain to be vertically oriented. Output shaft 21-15 extends from right-angled gearbox 21-14 and interfaces to gearbox/generator module 21-12. Rotation of drum 21-3 ultimately results in rotation of internal shafting of gearbox/generator module 21-12, resulting in the production of electricity (as described for FIG. 20).

Upward motion of the flotation module 21-1 due to vertical displacement of the water surface 19-2, e.g due to wave action, can cause increasing separating between floatation module 19-2 and IM 17-8. IM 17-8 tends not to be influenced directly by the waves due to its being below the wave base, where the water is relatively still compared to the surface. As the flotation module 21-1 oscillates on the ocean surface 19-2, the oscillatory separation between the flotation module 21-1 and the IM 17-8 causes drums 21-3 to rotate. This occurs because flexible connectors 21-4 pass over and around drums 21-3 in a fashion where they cannot slip relative to the surface of the drum. When the separation between the flotation module 21-1 and IM 17-8 decreases, e.g. the floatation module 21-1 moves from the peak of a wave to the trough while IM 17-8 continues to rise, slack is not developed in the flexible connectors 21-4 because the restoring weights 19-5 pull tension on the flexible connectors 21-4.

Power can be taken off of the rotative motion of the drums 21-3 by applying a countertorque using the generator contained in gearbox/generator module 21-12. Note that a generator is used in this figure to apply countertorque to drums 21-3, and a generator is used to increase shaft RPM, but a hydraulic pump with variable pressure or other system could be utilized.

Figure 22:
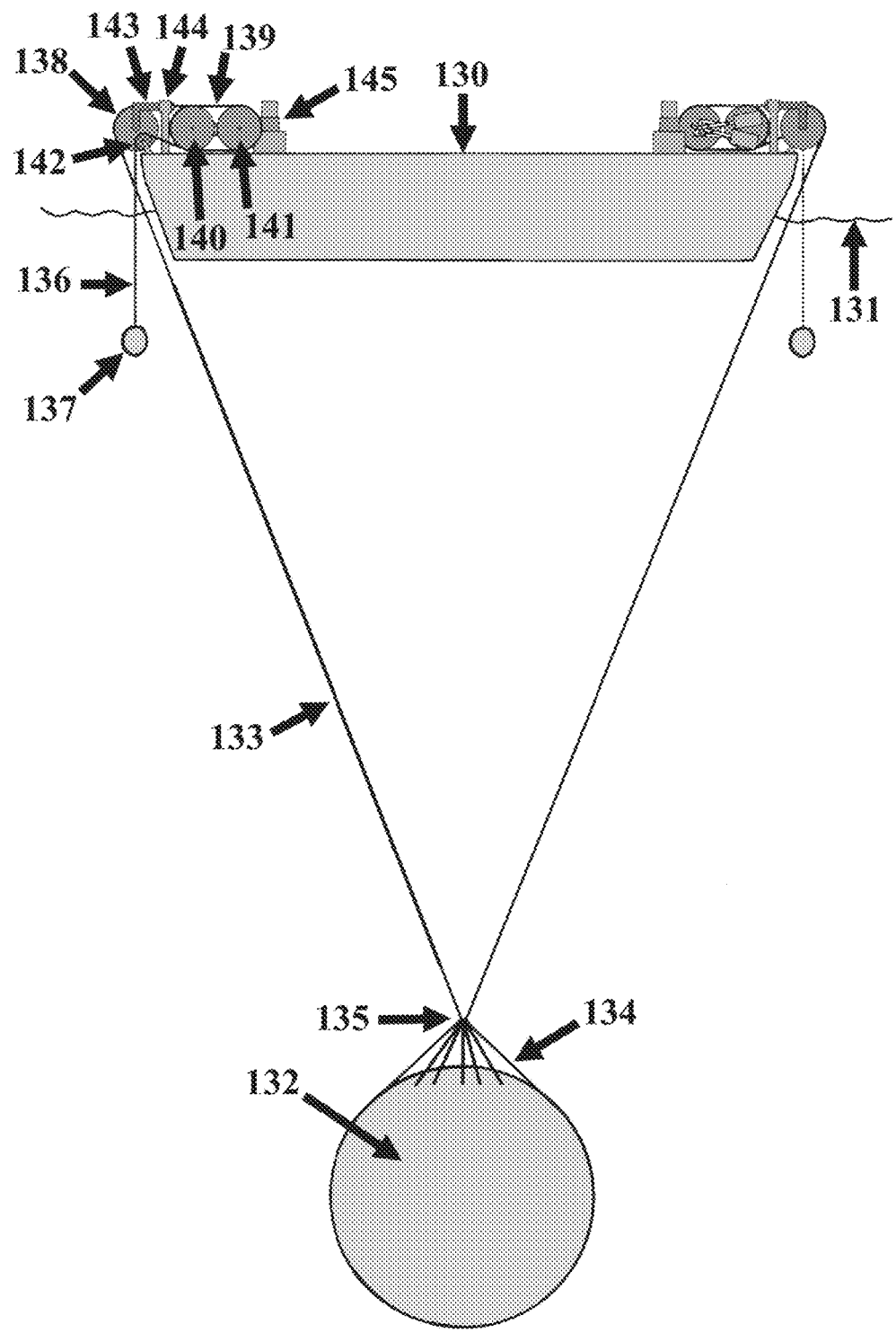
FIG. 22 is an elevated perspective view of a fourth preferred embodiment of the present invention.

FIG. 22 shows a side view of an embodiment of the present disclosure. A flotation module, or buoy, 130 floats adjacent to a surface 131 of a body of water, and is lifted and allowed to fall in response to passing waves across that surface 131.

Buoy 130 is connected to a submerged inertial mass 132 that is approximately spherical. The inertial mass 132 is connected to a pair of cables, e.g. 133, at a point or portion on a net 134 within which the inertial mass is constrained. The cables, e.g. 133, and the net 134 of the inertial mass 132, are joined at an approximately small, single connection point 135.

Each cable, e.g. 133, rotatably connects to the buoy at a "directional rectifying pulley," e.g. 138, over and/or about which is able to travel with minimal, if any, resistance and/or resistive torque. In other words, each directional rectifying pulley is not shafted to a power-take-off unit. Each directional rectifying buoy 138 is mounted to a hollow connecting arm, e.g. 143, which is able to rotate about its longitudinal axis within a bearing 144. Each cable, e.g. 133, passes around its respective directional rectifying pulley, e.g. 138, and through its respective hollow connecting arm, e.g. 143, in approximate alignment with the longitudinal and rotation axis of that hollow connecting arm.

Thus, as the buoy 130 moves in response to wave action at the surface, and the inertial mass 132 moves in response to the pulling of the buoy, and/or any currents which it obstructs, and, as the inertial mass moves away from the vertical radial and longitudinal axis of the buoy (i.e. an axis passing through the center of the buoy and normal to its upper deck or wall), the directional rectifying pulleys, e.g. 138, are able to rotate about the axes of rotation of their respective hollow connecting arms, e.g. 143, so that their respective cables, e.g. 133, are able to move over and around them while remaining in each pulley's respective plane of rotation (i.e. within a plane normal to each pulley's axis of rotation).

In this way, the directional rectifying pulleys reduce the wear and damage to their respective cables that would be expected to result from their respective cables' movements around them at excessive "fleet angles," i.e. the angular extent to which a cable enters the groove of a pulley outside of the plane of the pulley's rotation. In other words, the directional rectifying pulleys reduce the wear and damage to their respective cables that would be expected to result from their respective cables' movements over the circumferential "edges" of the pulleys.

When the buoy 130 is lifted by a wave, it pulls the connected inertial mass 132 upward. However, the substantial mass of the inertial mass 132 means that it responds to the upward buoyant forces imparted to it by the buoy with a smaller upward acceleration. This discrepancy in the relatively rapid upward acceleration of the wave on which the buoy 130 floats, and the relatively "sluggish" upward acceleration of the inertial mass to which the buoy 130 is connected, creates a tension in the cables, e.g. 133, that connect the two, to the extent that a power-take-off system resists the separation.

If the portions of the cables between the buoy and the inertial mass are unable to lengthen, then the wave-induced tension in the cables, e.g. 133, may result in the level of the water around the buoy, i.e. in its waterline, rising, potentially overtopping the buoy. It may also result in the cables breaking. However, if the force required to translate the cables and actuate the power-take-off system is no more than the force imparted to them by the relatively slowly accelerating inertial mass, then those portions, e.g. 133, of the cables between the buoy and the inertial mass will lengthen, simultaneously shortening the portions, e.g. 136, of the cables between the buoy and the restoring weights, e.g. 137.

As the portions of the cables, e.g. 133, connecting the buoy to the inertial mass lengthen, that lengthening causes the turning of the pulleys, e.g. 138, 140, and 141. The turning of the directional rectifying pulleys, e.g. 138, aligns the cables so that they enter the power-generating pulleys, e.g. 140, within the plane of rotation of those power generating pulleys, e.g. 140.

One end of the cables, e.g. 133, are connected to a common junction, connector, and/or point, 135, that connects them to the inertial mass 132. Those cables, e.g. 133, then pass around and/or over a respective directional rectifying pulley, e.g. 138. The "aligned" cables then pass over and around the power-generating pulleys, e.g. 140 and 141. In the illustrated embodiment, each cable passes over and around a pair of rollers, e.g. 140 and 141, that work together as a "traction winch." By passing over and around a pair of rollers, e.g. 140 and 141, each respective cable, e.g. 139, is able to frictionally engage with the surfaces of the rollers to a degree that tends to minimize slipping and sliding of the cable.

Through the use of a pair of rollers, circumferential grooves in the surfaces of each roller, can allow a respective cable, and/or set of ribbon cables, to pass over and around the rollers without migrating to either side, as would typically occur in relation to a turning spirally-grooved roller.

After passing over and around the rollers of a traction winch for a certain number of turns, each respective cable travels over and around another pulley, e.g. 142, and then back into the body of water, where it is connected to one or more restoring weights, e.g. 137.

At least one roller, e.g. 141, is connected to a crankshaft (not shown) such that as the rollers of the traction winches, e.g. 140-141, are turned in response to the torque imparted to them by their respective cables (i.e. when the buoy is being lifted away from the inertial mass), the crankshaft is rotated which drives a corresponding set of driving rods and connecting rods, which, in turn, drive and/or oscillate the pistons of a set of hydraulic cylinders.

The oscillation of the hydraulic pistons pressurizes hydraulic fluid which then passes into a power take off (PTO) assembly 145 that includes a hydraulic "accumulator" (that buffers the pressure and potential energy of the hydraulic fluid), a hydraulic turbine, and a generator.

This device uses the tension imparted to a pair of cables during the wave-induced separation of the buoy from its connected inertial mass, to turn a pair of traction winches when then pressurize hydraulic fluid and cause a generator to generate electrical power.

Through the appropriate regulation and/or control of the amount of torque imparted to the traction winches by their respective PTOs, the amount of upward kinetic and gravitational potential energy imparted to the inertial mass by the buoy, can be controlled and/or regulated. Through an appropriate regulation of the amount of upward kinetic and gravitational potential energy imparted to the inertial mass by the buoy, the average depth of the inertial mass can be changed, adjusted, and/or controlled (when the waves are sufficiently energetic to permit the buoy to impart sufficient energy to the inertial mass).

While different embodiments of the current disclosure may be optimized so as to generate electrical (or other) power from respective inertial masses, each typically and/or preferentially positioned at an embodiment-specific average optimal depth, even a single specific embodiment may change the average depth of its inertial mass in order to adapt and/or optimize its power generation to changing wave conditions, to reduce wear on a particular portion of the cables connecting its buoy to that inertial mass, to avoid a unfavorable current at a particular depth, etc. Typically, most embodiments would be expected to benefit from the positioning of their inertial masses such that the average depths of those inertial masses are approximately near or below the wave base characteristic of the wave climate driving those embodiments at any particular time.

While the illustrated embodiment (primarily for the sake of graphical clarity) illustrates two cables and two respective PTOs, other embodiments will have more than cables and PTOs.

While the illustrated embodiment utilizes two cables, other embodiments will use multi-stranded ribbon cables. Those embodiments will also use directional rectifying pulleys, and traction-winch rollers, containing sufficient grooves and/or width to accommodate the greater number of parallel strands and/or cables within each respective ribbon cable.

While the illustrated embodiment has its cables passing over and/or around the traction-winch roller pairs for approximately 2.5 turns, other embodiments use fewer turns, and others still use more than 2.5 turns. The number of turns is arbitrary and does not limit the scope of this disclosure.

Figure 23:
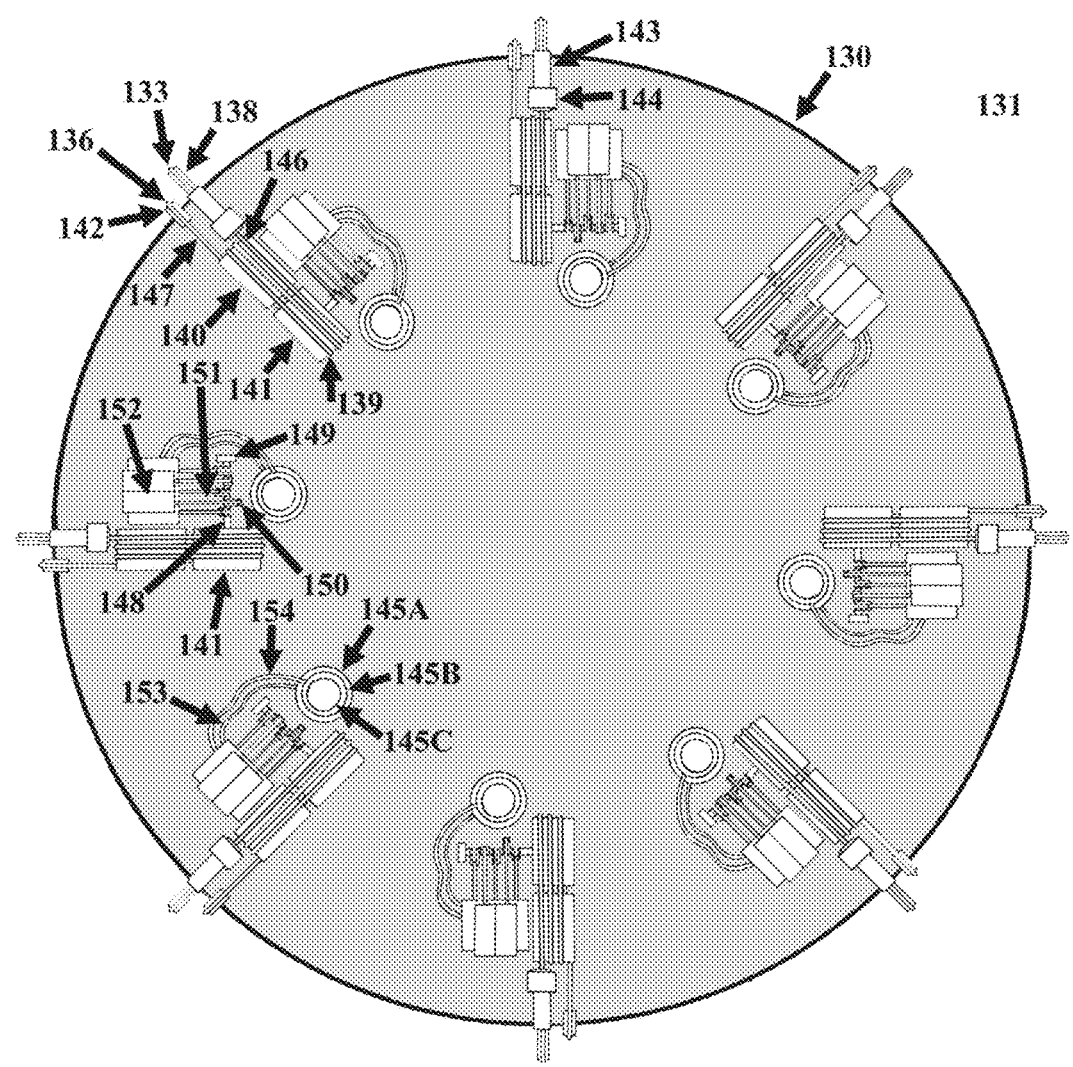
FIG. 23 is a top down view of the embodiment of FIG. 22.

FIG. 23 shows a top-down view of an embodiment 130 similar to the one illustrated in FIG. 22. The only difference between the embodiments illustrated in FIGS. 22 and 23 is that the embodiment illustrated in FIG. 23 has eight cables, traction winches, and PTOs, whereas (for the sake of graphical clarity) the embodiment illustrated in FIG. 22 was limited to two cables, traction winches, and PTOs.

Eight cables, e.g. 133 connect the buoy to the submerged inertial mass (132 in FIG. 22). Each cable, e.g. 133, passes over and around a directional rectifying pulley, e.g. 138, and then passes through the hollow connecting arm, e.g. 143, that hold each respective directional rectifying pulley and allows it to rotate, by means of a respective bearing, e.g. 144, about the longitudinal and/or rotational axis of its respective hollow connecting arm, e.g. 143.

Each cable, e.g. 146, exits the hollow connecting arm, e.g. 143, and passes onto, around, and over a pair of cooperating traction winch rollers, e.g. 140-141. The cable, e.g. 139, may travel over and around each pair of rollers, e.g. 140-141, any embodiment-specific number of times and/or turns. After which the cable, e.g. 147, travels to, over, and around, a pulley, e.g. 142, that facilitates its return to the body of water wherein its distal end is connected to a restoring weight (e.g. 137 in FIG. 22).

As the traction winches, e.g. 140-141, are spun in concert with relative downward movement of the portions, e.g. 133, of the cables connecting the buoy to the inertial mass, a crankshaft, e.g. 148, attached to one of the traction-winch rollers, e.g. 141, is likewise rotated. Each crankshaft contains five crank axles, e.g. 150. The rotation of the crankshafts, e.g. 148, causes the respective crank axles to be rotated as well. The rotation of each crank axle results in the oscillation of a respective, and rotatably connected, driving rod, e.g. 151, which, in turn, causes the oscillation of a respective, and rotatably connected, hydraulic piston rod, which pressurizes hydraulic fluid within the hydraulic cylinders, e.g. 152.

The pressurized hydraulic fluid is combined and the combined flow passes through a tube, e.g. 153, to and into a hydraulic accumulator, e.g. 145A. Pressurized hydraulic fluid from the accumulator drives a turbine, e.g. 145B, which in turn spins the rotor of a generator 145C, thereby generating electrical power. After the hydraulic fluid has imparted its energy to the turbine, it is collected and thereafter flows back to the pistons, e.g. 152, through tubes, e.g. 154.

While the illustrated embodiment uses each traction winch's crankshaft to drive and/or oscillate five hydraulic pistons, the number of hydraulic pistons, and indeed the number of cables and PTOs is arbitrary, and all such variations of the illustrated embodiment are included within the scope of this disclosure.

While the illustrated embodiment passes each cable around each traction winch approximately 2.5 times, the number of turns is arbitrary and does not limit the scope of this disclosure.

In one embodiment, the shortening of those portions, e.g. 133, of the cables that connect the buoy to the inertial mass causes the rollers of the traction winches to turn in the reverse direction (to the direction turned when generating maximal power), and that reversed roller rotation causes the crankshafts to also turn in the opposite direction, thereby causing the hydraulic cylinders to be pumped regardless of the direction of the movement of the cables, and the rotational directions of the traction-winch rollers.

In another embodiment, the shortening of those portions, e.g. 133, of the cables that connect the buoy to the inertial mass likewise cause the rollers of the traction winches to turn in the reverse direction (to the direction turned when generating maximal power). However, in these embodiments, the crankshafts are connected to their respective traction winch rollers by means of one-way clutches (or their functional equivalents). This allows the traction-winch rollers to spin in their reverse directions without engaging their respective crankshafts, and without causing the hydraulic cylinders to be pumped.

Figure 24:
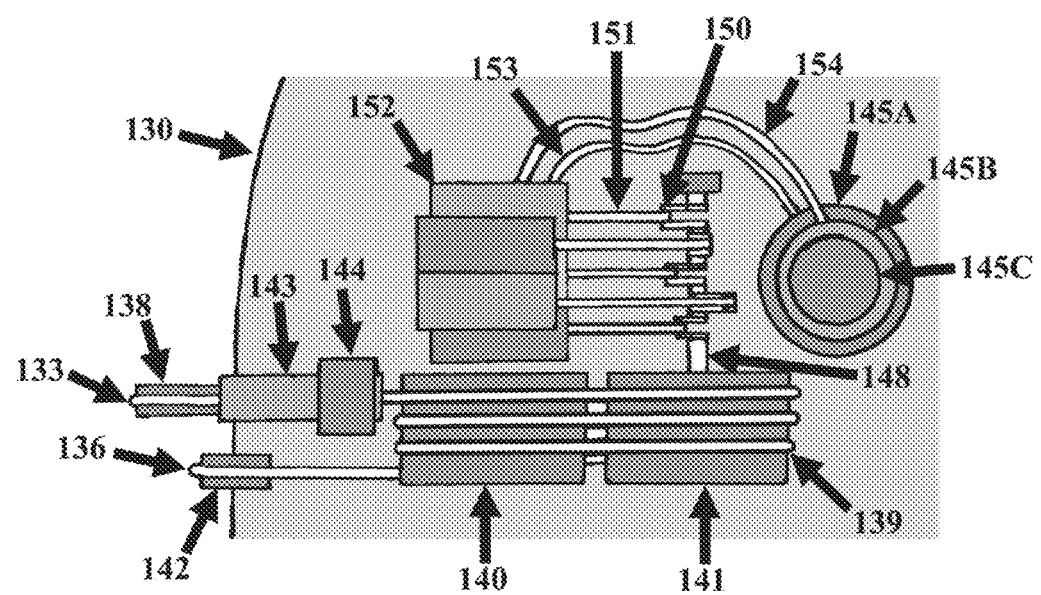
FIG. 24 is an enlarged, top down view of a power-take-off assembly of the embodiment of FIGS. 22-23.

FIG. 24 is a close-up top-down view of one of the pulley, traction winch, and PTO assemblies that characterizes the embodiments illustrated and discussed in relation to FIGS. 22 and 23. All of the specified and/or labelled components are the same as those already discussed in relation to FIGS. 22 and 23.

Figure 25:
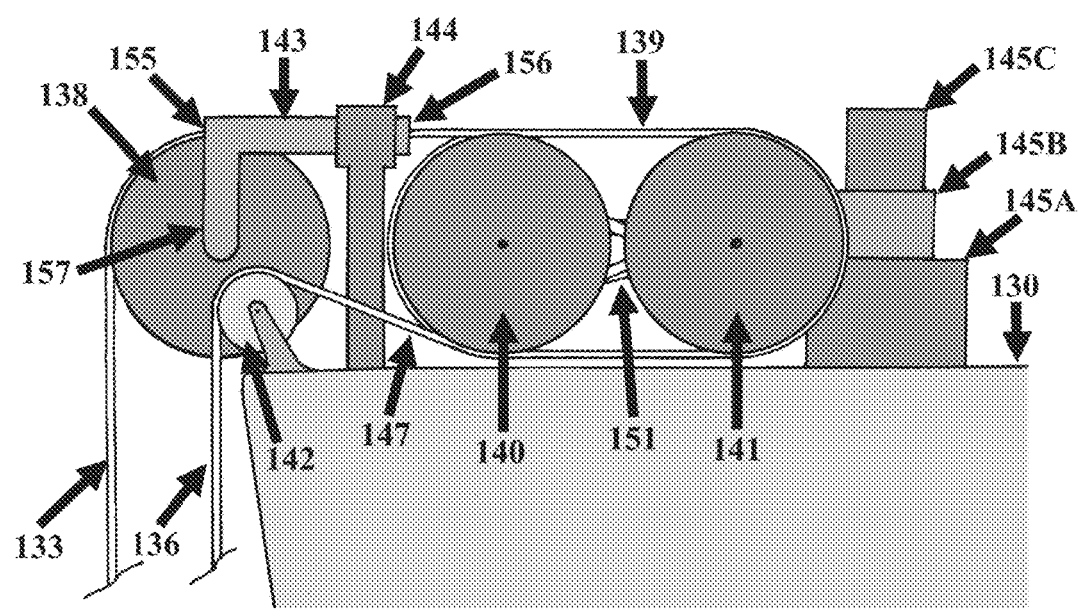
FIG. 25 is an enlarged, side view of the power-take-off assembly of FIG. 24.

FIG. 25 shows a close-up side view of one of the pulley, traction winch, and PTO assemblies that characterizes the embodiments illustrated and discussed in relation to FIGS. 22 and 23. Many of the specified and/or labelled components are the same as those already discussed in relation to FIGS. 22 and 23.

However, additional detail is provided with respect to the hollow connecting arm 143 on which the directional rectifying pulley 138 is mounted, and from the arms, e.g. 157, of which it is suspended. As the cable 133 pulls into or out of the page, i.e. normal to the plane of the pulley and its rotation, then the pulley and its hollow connecting arm rotate within bearing 144 so that the pulley's plane of rotation encompasses the cable 133.

The cable 133 enters the hollow shaft of the hollow connecting arm 143 at its outer end 155. And, the cable exits the hollow shaft of the hollow connecting arm 143 at its inner end 156. The directionally rectified cable 139 travels on to the rollers 140-141 of the traction winch in a plane normal to the axes of rotation of those rollers. By preventing the cable 133 from traveling on to, or off of, a pulley or roller outside of a plane that is normal to the rotational axis of the pulley or roller, wear on the cable is minimized, and the lifetime of the cable is maximized.

Figure 26:
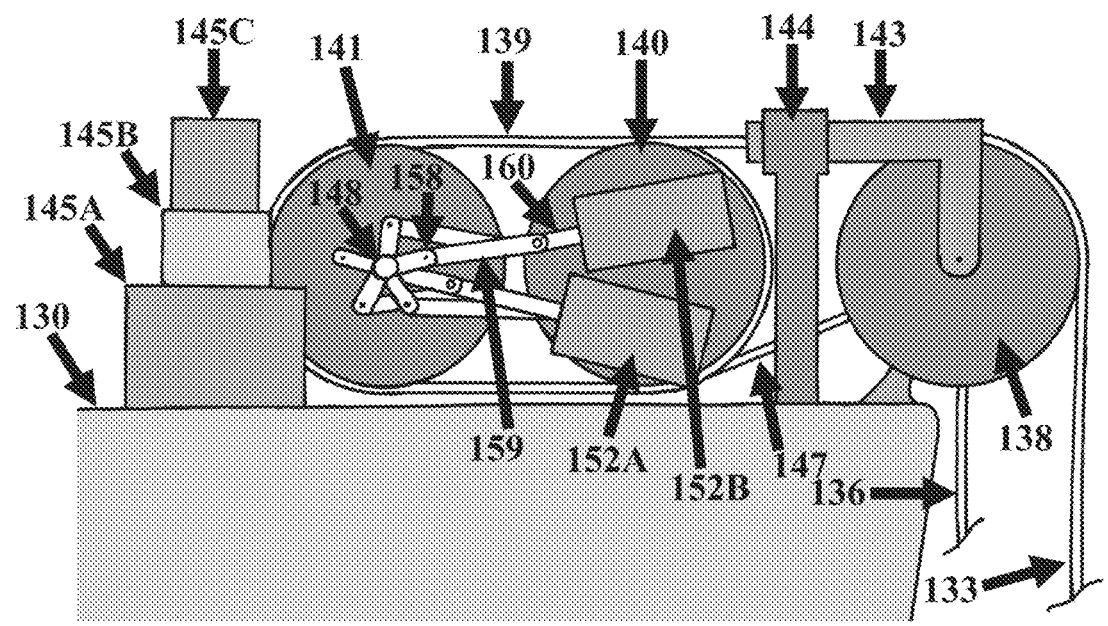
FIG. 26 is an enlarged view of the opposite side of the power-take-off assembly of FIG. 24.

FIG. 26 shows a close-up side view of one of the pulley, traction winch, and PTO assemblies that characterizes the embodiments illustrated and discussed in relation to FIGS. 22 and 23. This figure illustrates the opposite side to the side illustrated in FIG. 25. Many of the specified and/or labelled components are the same as those already discussed in relation to FIGS. 22, 23, and 25.

Unlike the illustration in FIG. 25, the perspective of this illustration reveals the crankshaft 148 connected to one 141 of the rollers of the traction winch 140-141. As roller 141 rotates in response to a movement of cable 133 toward the inertial mass (132 in FIG. 22), each crank axle, e.g. 158, rotates about the longitudinal and/or rotational axis of the crankshaft. The rotation of each crank axle, e.g. 158, causes a respective and rotatably connected driving rod, e.g. 159, to oscillate back-and-forth. The oscillations of the driving rods, e.g. 159, cause the respective and rotatably connected piston rods, e.g. 160, to oscillate back-and-forth thereby driving the piston head back and forth within the respective hydraulic cylinder, e.g. 152B.

Hydraulic fluid pressurized through the oscillations of the piston heads is pooled and fed into a hydraulic accumulator 145A. The pressure-stabilize hydraulic fluid in the accumulator 145A drives a turbine 145B, which, in turn, drives a generator 145C, thereby producing electrical power.

Figure 27:
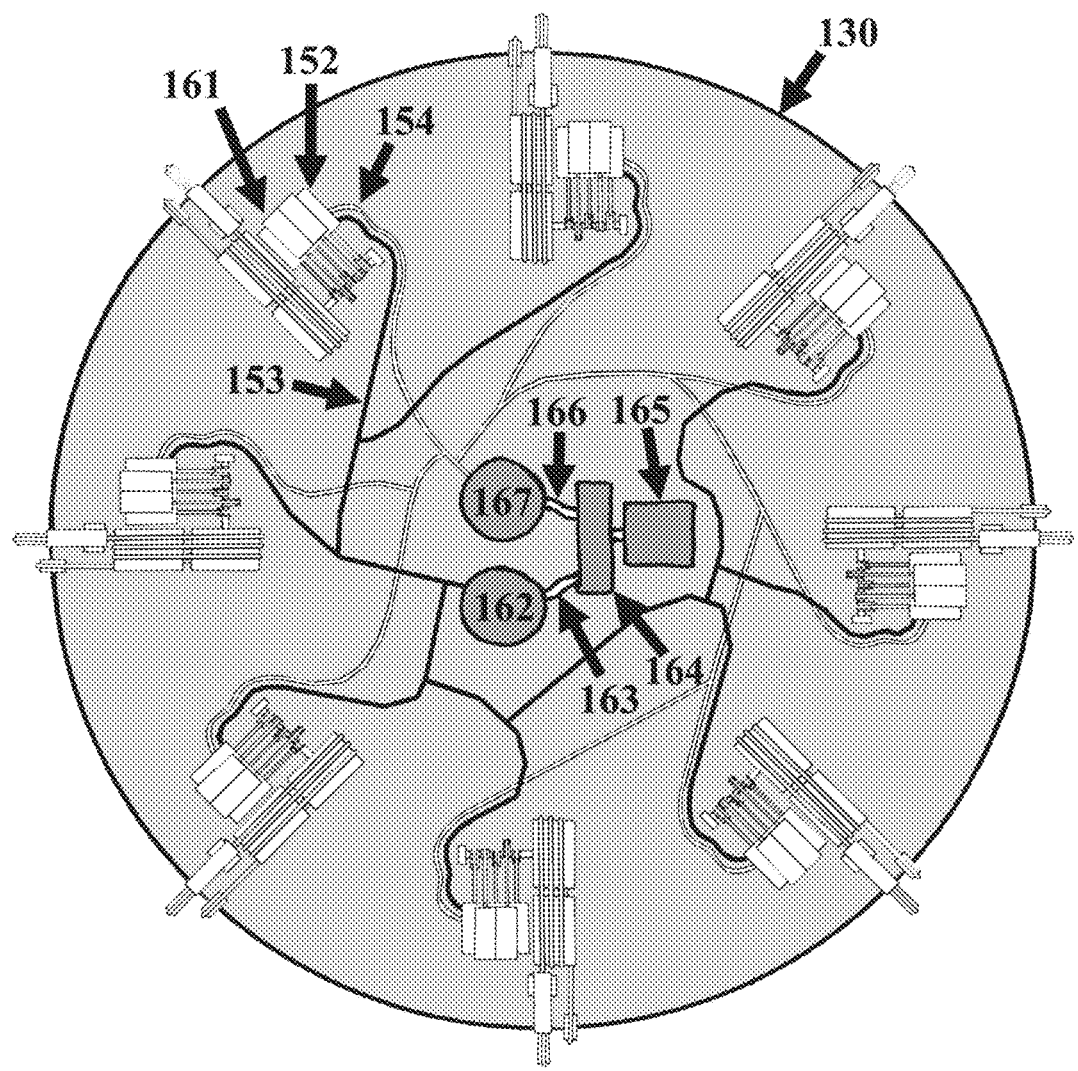
FIG. 27 is a top down view of the embodiment of FIG. 22 where a centralized power-take-off has replaced the individual power-take-offs.

FIG. 27 shows a top-down view of an embodiment 130 similar to the embodiment illustrated and discussed in relation to FIGS. 23-26. However, whereas the embodiment illustrated in FIG. 26 incorporated and associated a separate hydraulic PTO with each traction winch, the embodiment illustrated in FIG. 27 pools the pressurized hydraulic fluid generated by all of the hydraulic pistons and feeds the combined stream of pressurized fluid into a single, common, shared hydraulic tube 153, and therethrough into a single, common, shared hydraulic accumulator 162.

Pressurized hydraulic fluid from the single accumulator 162 is fed through a tube 163 into a turbine 164 thereby spinning the turbine and the rotatably connected electrical generator 165. The depressurized hydraulic fluid collected within the turbine 164 is passed through a tube 166 into a reservoir 167 and from there back to the hydraulic pistons through a common interconnected hydraulic tube 154.

Figure 28:
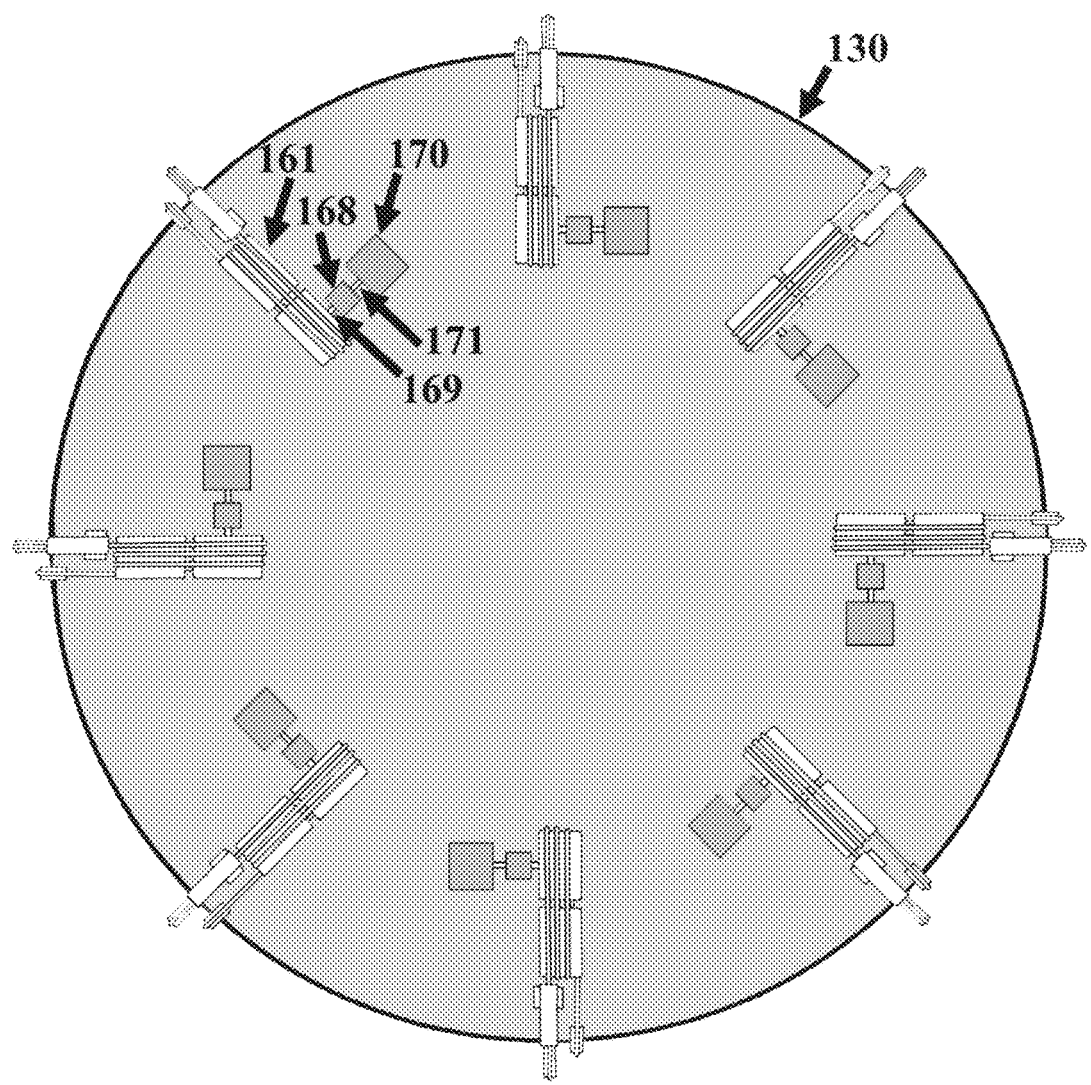
FIG. 28 is a top down view of the embodiment of FIG. 22 where the power-take-offs comprise gearboxes instead of hydraulic circuits.

FIG. 28 shows a top-down view of an embodiment 130 similar to the embodiments illustrated and discussed in relation to FIGS. 23-27. However, whereas the embodiments illustrated in FIGS. 26 and 27 incorporated and utilized hydraulic PTOs, the embodiment illustrated in FIG. 28 couples each traction winch, e.g. 161, to a gearbox 168 (by a shaft, e.g. 169). The gearbox is then rotatably connected to an electrical generator 170 (by a shaft, e.g. 171).

Figure 29:
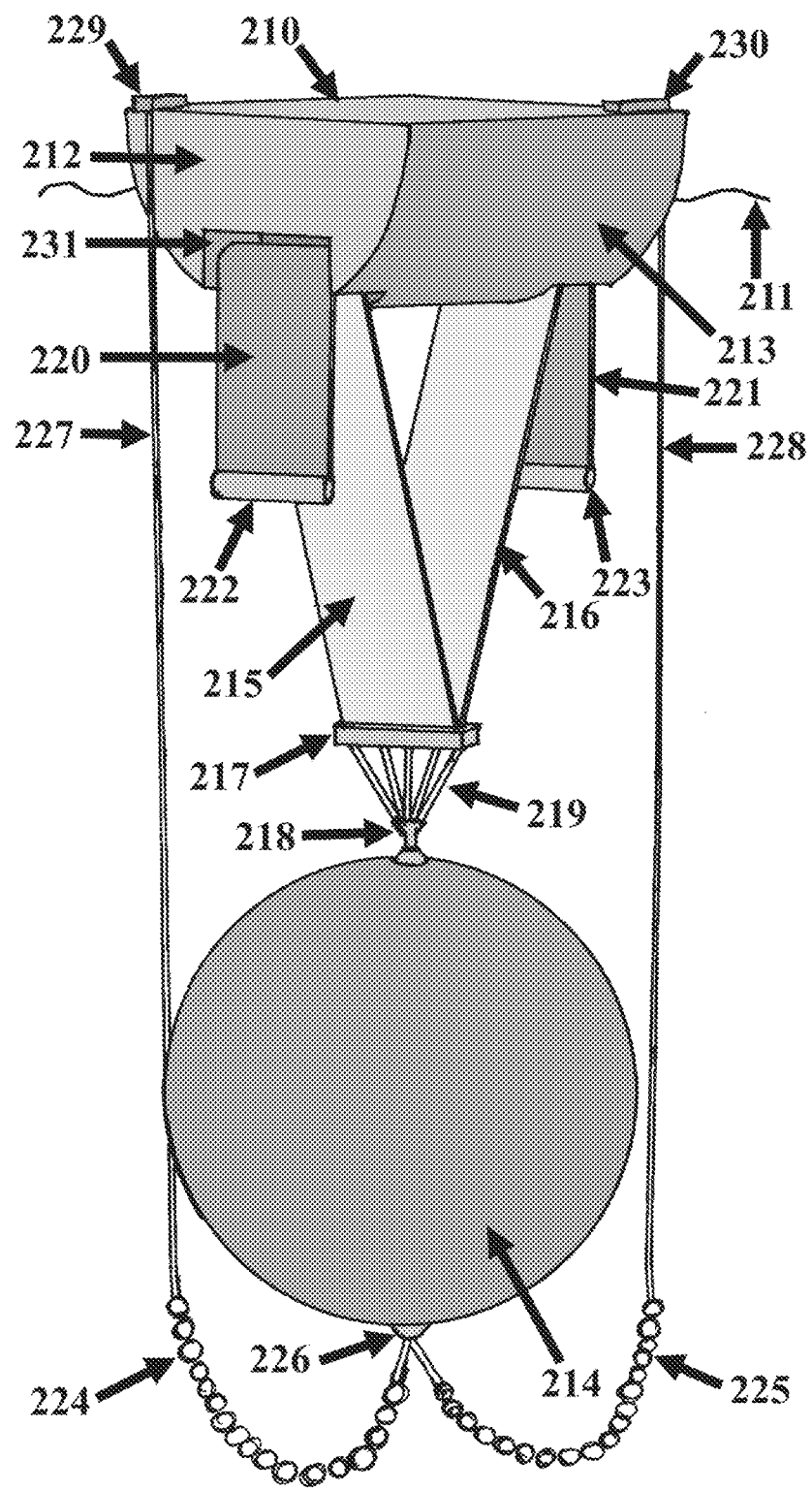
FIG. 29 is an elevated perspective view of a fifth preferred embodiment of the present invention.

FIG. 29 shows a perspective view of an embodiment of the present disclosure. A buoyant flotation structure, or buoy, 210 is connected to a submerged inertial mass 214 by two ribbon cables 215 and 216. The ribbon cables come together at a "ribbon junction bar" 217 that is connected by an array 219 of cables that are joined to a connector 218 on and/or in the wall of the inertial mass 214.

The ribbon cables 215 and 216 are connected to the buoy by a respective pair of rollers (not visible) over and around which they travel. Each roller is positioned inside a recessed space, e.g. 231, in the side of the buoy.

One opposing pair of sides, e.g. 212, of the buoy are approximately flat and vertical. The other sides, e.g. 213, of the buoy are curved and vertical sections through the buoy across section planes approximately parallel to the flat vertical sides, and approximately normal to the resting surface 211 of the body of water on which the buoy floats, have shapes that are approximately hemi-circular. Thus, this buoy is able to roll about a horizontal axis that is approximately normal to the faces of its flat vertical sides with relative ease, making it a form of direction rectifying flotation module. While it is not able to easily roll about an axis of rotation that is horizontal and normal to the faces of the flat vertical sides, e.g. 212.

Because of its hemi-cylindrical shape, the buoy 210 rolls, with relative ease, so as to keep the inertial mass' center of gravity within a plane parallel to its vertical side faces and passing through the buoy's center of mass. However, when the inertial mass moves out of that plane, i.e. toward the flat sides of the buoy, then the angles at which the ribbon cables pass onto each respective roller will change. Since the longevity of each ribbon cable is not significantly (if at all) affected by the angle at which it travels onto or off of its respective roller, so long as it does so such that its plane of symmetry (normal to its broad surface, and inclusive of its longitudinal axis) is normal to the roller's axis of rotation, the ability of the buoy to rotate in order to preserve that relationship of each ribbon cable's plane of symmetry to its respective roller's axis of rotation, promotes, and will tend to increase, the longevity of each ribbon cable.

On the end of each ribbon cable, opposite the end connected to the inertial mass 214, is a restoring weight 222 and 223, which provides sufficient downward gravitational force on each weight's respective end of its respective ribbon cable to remove any slack from the respective portion of the respective cable that is connected to the inertial mass 214. When the buoy rises on a wave, the ribbon cables 215 and 216 become tight, and turn their respective rollers as those ribbon cables lengthen, as the inertial mass resists the upward acceleration of the buoy 210.

However, after a wave crest has passed, and the buoy is falling, those ribbon cables become slack (i.e. the inertial mass 214 is still rising). The restoring weights 222 and 223 pull the ribbon cables tight and facilitate the (re)shortening of those portions of the cables 215 and 216 that were previously lengthened during the buoy's rise.

The embodiment illustrated in FIG. 29 incorporates a mechanism for adjusting the effective wet weight of the inertial mass 214. Two segments of chain 224 and 225 are connected to a connector 226 on the bottom of the inertial mass 214. However, the amount of the weight of those chain segments is partially supported by cables 227 and 228, respectively. Winches at the upper end of each "supplemental weight cable" 227 and 228 can adjust the lengths of those cables. When the cables are shortened, the ends of the chains distal to the inertial mass are raised, causing more of the weight of the chains to be supported by the buoy, and less of that weight to be supported by, and/or added to, the inertial mass.

However, when the winches at the upper end of each "supplemental weight cable" 227 and 228 lengthen those cables, then the ends of the chains distal to the inertial mass are lowered, thereby transferring a greater portion of their weight to the inertial mass.

Thus, by shortening and lengthening the supplemental weight cables, the effective wet weight of the inertial mass 214 can be increased or decreased. It tends to be advantageous to increase the wet weight of the inertial mass when the period or the amplitude of the waves buffeting the buoy increase. Likewise, it is advantageous to decrease the wet weight of the inertial mass when the period or the amplitude of the waves buffeting the buoy decrease. Through the use of the supplemental inertial-mass weights 224 and 225, and the adjustment of the lengths of the supplemental weight cables 227 and 228 that partially support them, the wet weight of the inertial mass may be "tuned" so as to optimize and/or maximize the amount of electrical power that may be generated with respect to any particular wave climate.

Any linked set of weights may be used instead of the chains illustrated in FIG. 29, and all such variants are included within the scope of the current disclosure.

Figure 30:
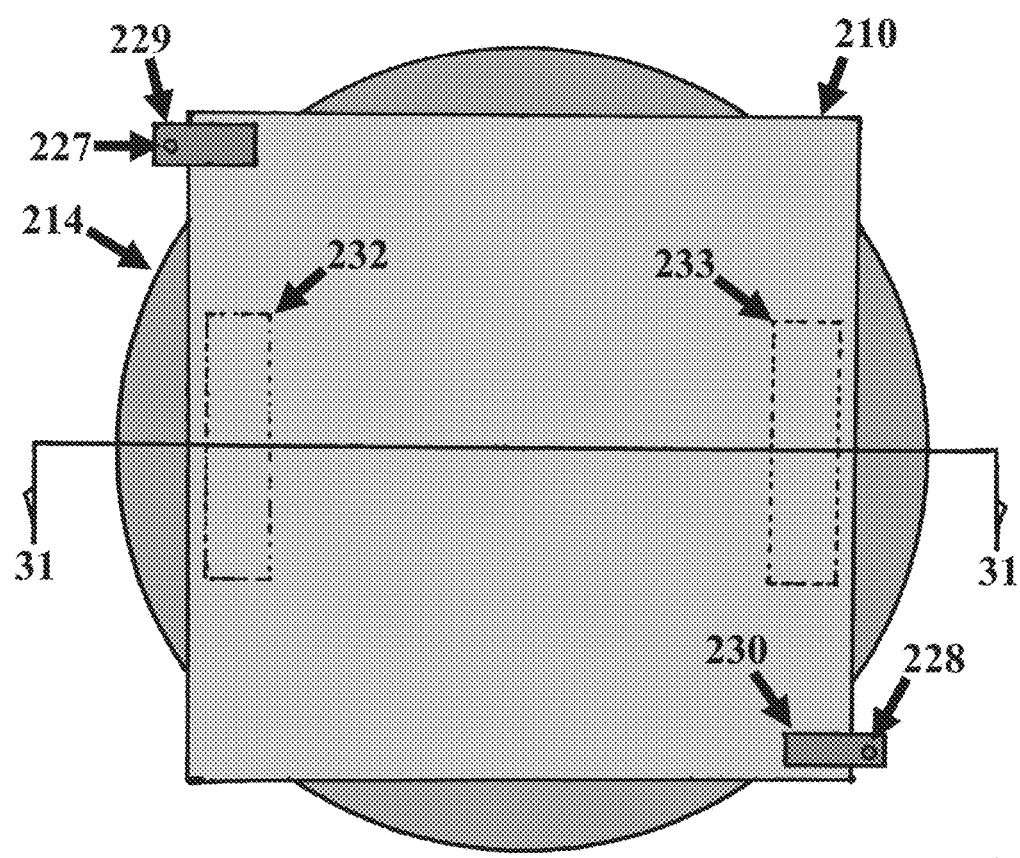
FIG. 30 is a top down view of the embodiment of FIG. 29.

FIG. 30 shows a top-down perspective of the same embodiment illustrated in FIG. 29. The buoy 210 floats above the submerged inertial mass 214. Dashed outlines indicate the relative positions of the rollers 232 and 233 that are connected at the bottom of the buoy, and typically remain submerged. Winches 229 and 230 adjust the lengths of their respective supplemental weight cables (whose positions are shown by the circular outlines 227 and 228 though not normally visible from this perspective).

Figure 31:
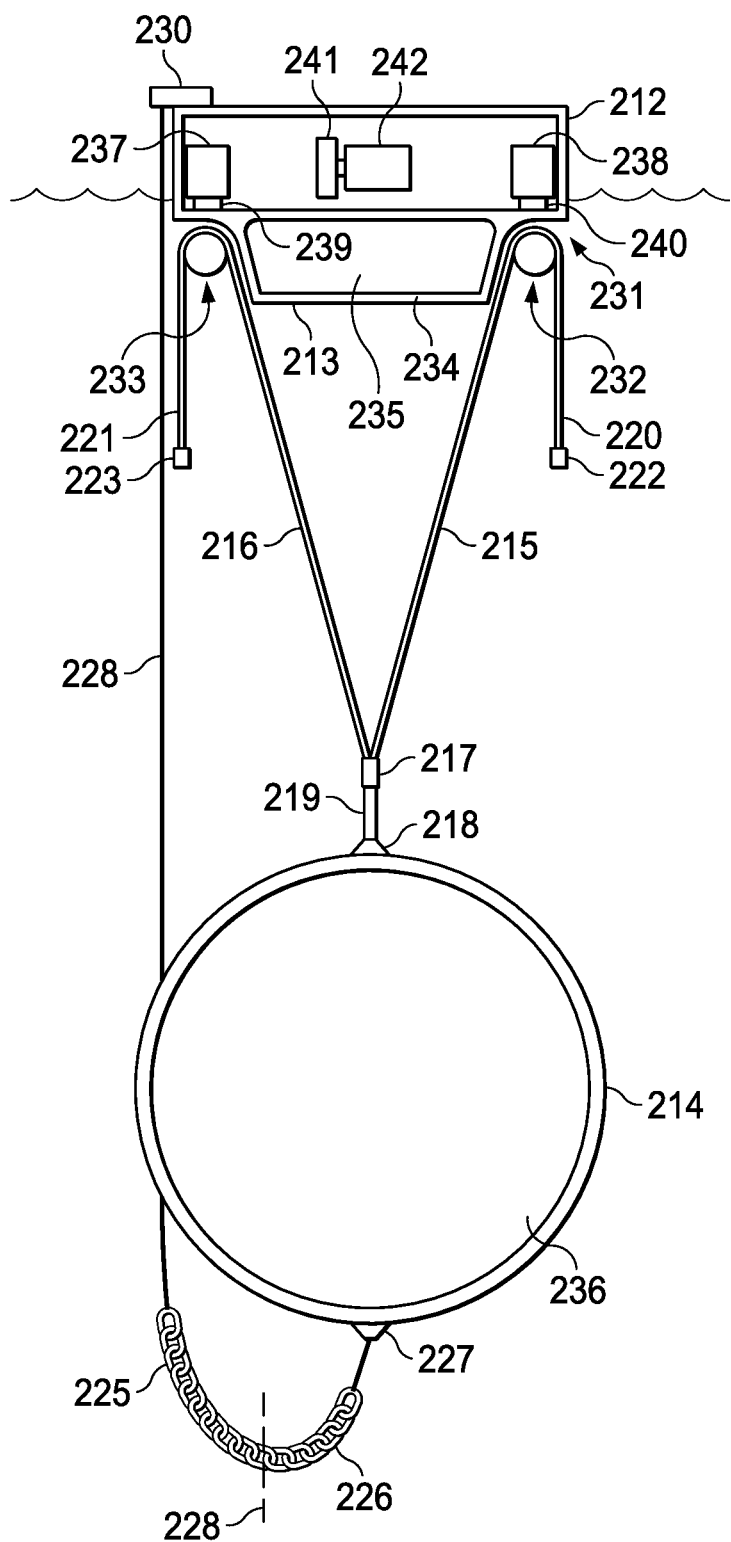
FIG. 31 is a sectional view of the embodiment of FIG. 30.

FIG. 31 shows a sectional view of the embodiments illustrated in FIGS. 29 and 30, and taken across section line 31 in FIG. 30. Many of the embodiment's components have already been discussed in relation to FIG. 29.

The buoy 212-213 is hollow, and defined by walls, e.g. 234, and voids, e.g. 235. The rollers 232 and 233 are positioned in the water outside the buoy, and are connected to the buoy's interior by shafts (not shown) that penetrate the buoy's walls. When each roller, e.g. 233, is rotated in response to a movement of its respective ribbon cable 221/216, a respective and connected crankshaft turns a respective set of driving and piston rods, housed in enclosures, e.g. 239. The rods in turn drive hydraulic pistons and pressurize hydraulic fluid that is directed into a turbine 241 which energizes an electrical generator 242.

One of the embodiment's two supplemental weights is visible within the section and is illustrated in FIG. 31. The deepest part of the chain (at 228) divides the chain, with the weight of the portion 226 of the chain adjacent to the inertial mass 214 acting to increase the effective wet weight of the inertial mass. And, the weight of the portion 225 of the chain on the opposite side of 228 being supported by the supplemental weight cable 228 and the buoy to which it is connected (via winch 230).

Inertial mass 214 is a hollow vessel containing a void 236 that is nominally filled with water.

Figure 32:
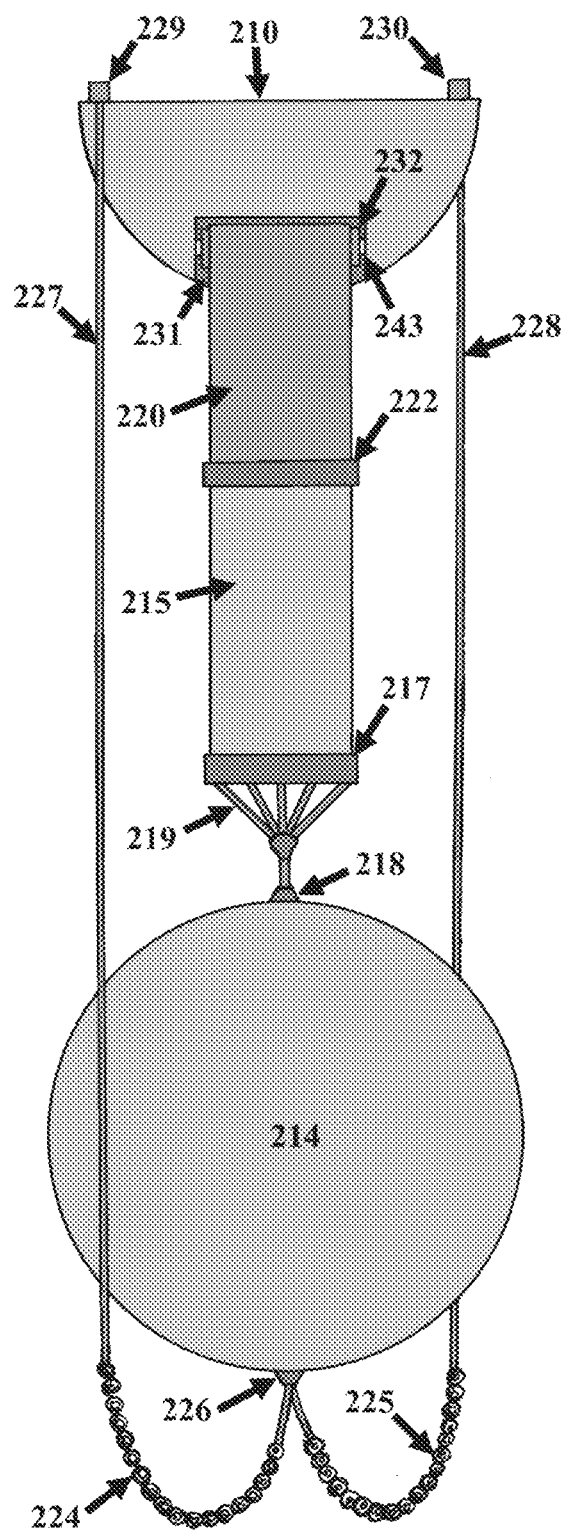
FIG. 32 is a side view of the embodiment of FIG. 29.

FIG. 32 shows a side perspective of the embodiment illustrated in FIGS. 29-31. The rollers, e.g. 232, rotate about, and are connected to the buoy, by shafts, e.g. 243. The rollers are positioned within recessed "cut outs," e.g. 231, in the buoy 210. The other components illustrated in FIG. 32 have been discussed in FIGS. 29-31.

Figure 33:
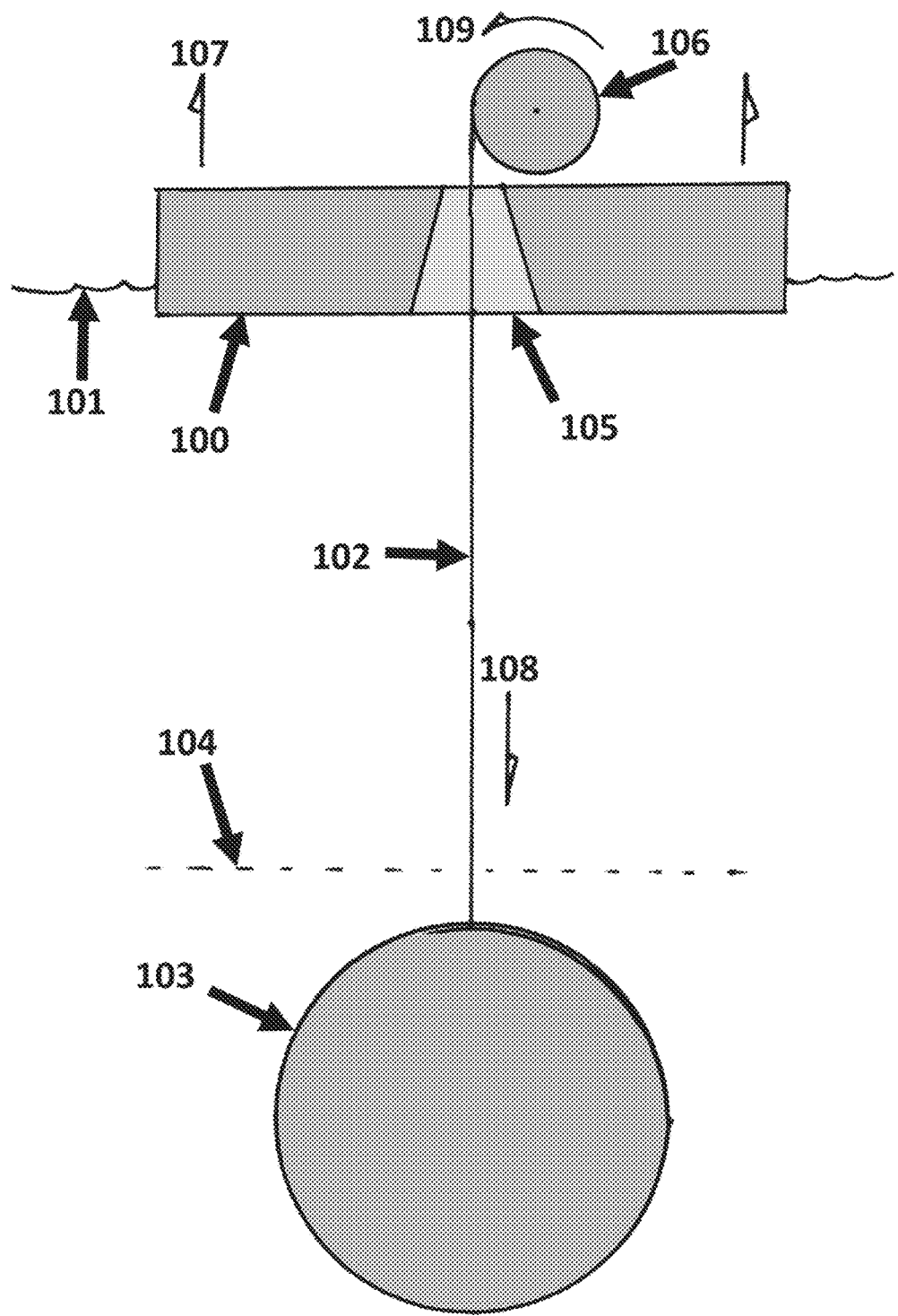
FIG. 33 is a sectional view of an embodiment of the present invention.

FIG. 33 shows a side view of an embodiment of the current disclosure. A buoy 100, floating platform, buoyant structure, buoyant chamber, and/or vessel, floats adjacent to the surface 101 of a body of water. When the water level rises, as in response to an approaching wave crest, then the buoy moves 107 up. As it does so, an inertial mass 103, and/or reaction mass, preferably positioned at a depth that places it below the wave base 104, resists the buoy's upward acceleration, creating a tension or downward pull 108 in a flexible connector 102 and/or cable that connects the inertial mass 103 to a rotatable pulley 106, gear, drum, rotatable capstan, or other rotatable mechanism, mounted on, and/or attached to, the buoy 100. When the pulley 106 rotates in response to the downward force created between the buoy and the inertial mass, then electrical power may be generated by means of a generator (not shown), driven by the pulley.

However, this wave-energy converter suffers the disadvantage that when the buoy moves laterally, as in response to the surge component of wave motion, then unless the orientation of that lateral movement is confined to, and/or parallel with, the same plane through which the pulley rotates (i.e. a vertical plane normal to the pulley's axis of rotation) then the cable will be pulled out of, and/or away from, the groove and/or other alignment feature within the pulley. This misalignment of the cable's pulling with the rotation and/or groove of the pulley can damage the cable and/or significantly reduce its lifetime.

The pulley 106 has a "plane of rotation" which is the plane containing curved arrow 109. Damage to the pulley and its respective cable are minimized when the cable 102 is pulled in a direction places it within the pulley's plane of rotation. When a lateral movement of the buoy, causes the cable 102 to be pulled such that its alignment is not normal to the horizontal plane of the buoy 100, and the resulting lateral component of the cable's orientation does not lie within the pulley's plane of rotation, then both the pulley and the cable may be damaged and/or be prematurely worn.

Figure 34:
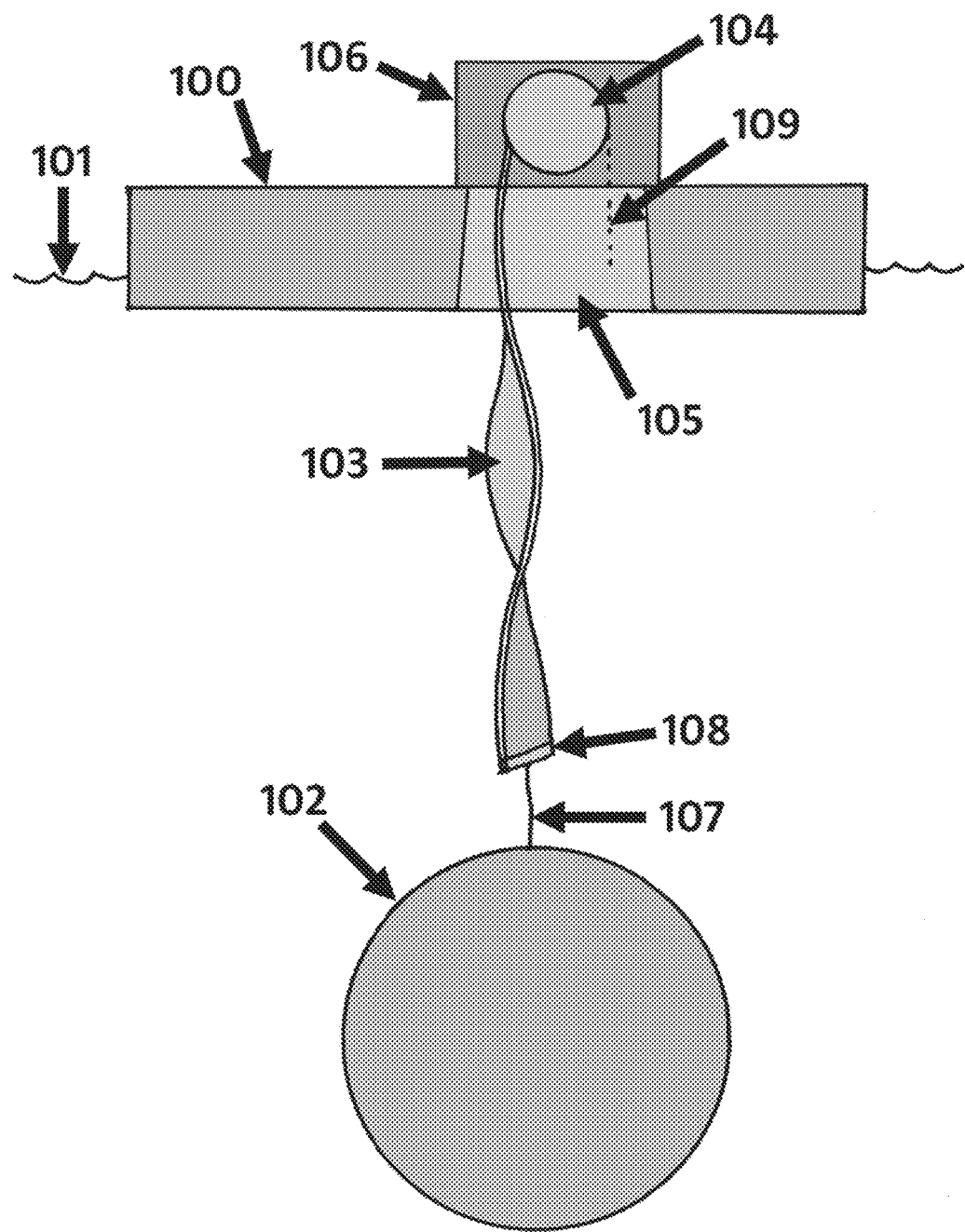
FIG. 34 is a sectional view of an embodiment of the present invention which comprises a ribbon cable.

FIG. 34 illustrates a basic embodiment of the wave energy device herein disclosed. A positively buoyant structure and/or buoy 100 floats adjacent to a surface 101 of a body of water. The buoy includes a mechanism 106 for generating useful energy (e.g. electrical) or work. That power-generation mechanism 106 obtains its power, and/or is driven or energized by the torque imparted to a pulley 104, roller, gear, wheel, capstan, or other rotatable mechanical interface, by the downward force imparted to a ribbon cable 103 by a negatively-buoyant structure 102, vessel, body, element, and/or mass, of relatively great inertia. The ribbon cable, in this case, is connected to the inertial mass 102 by means of a "ribbon junction bar" 108 and a single connecting cable 107.

As the buoy 100 rises on a wave, the inertia of the inertial mass 102 inhibits its upward acceleration thereby creating a forceful tension in the ribbon cable 103. That tension is imparted to pulley 104 as a torque. And, that torque is used to directly or indirectly drive an electrical generator (or a generator of another useful energy, product, or result). As the pulley 104 rotates under the torque, the length of the ribbon cable 103 increases.

When the buoy 100 falls following the passage of a wave crest, and the approach of a wave trough, ribbon cable 103 will tend to become slack (especially as the inertial mass will typically be rising in response to the upward force imparted to it by the buoy 100 through the ribbon cable 103). An embodiment may utilize a motor (perhaps the same motor/generator used to generate electrical power during the buoy's rise) to rewind the ribbon cable back on to the roller 104 to which one end of the ribbon cable may be attached. Alternately, an embodiment may utilize a restoring weight attached to the other end of the ribbon cable, and allow the gravitational potential energy of that restoring weight (which would have been lifted when the ribbon cable 103 was paid out during the buoy's rise and the inertial mass' resistance to that motion) to remove the slack in the ribbon cable 103, and to shorten the portion of it intermediate between the buoy and the inertial mass.

An embodiment might utilize a hollow, water-filled inertial vessel to provide the needed inertia. It might incorporate and/or enclose added weights within such an inertial vessel in order to provide it with the appropriate degree of negative buoyancy. In one embodiment, rocks are placed inside the inertial mass to increase its net weight.

Another embodiment might utilize a solid inertial mass. Such a solid inertial mass might be composed of a mixture of (typically positively buoyant) recycled plastics and (typically negatively-buoyant) recycled metals.

Many designs, materials, and structures are able to provide an inertial mass that will be compatible with the present disclosure, and all such variants are included within the scope of the present disclosure.

Figure 35:
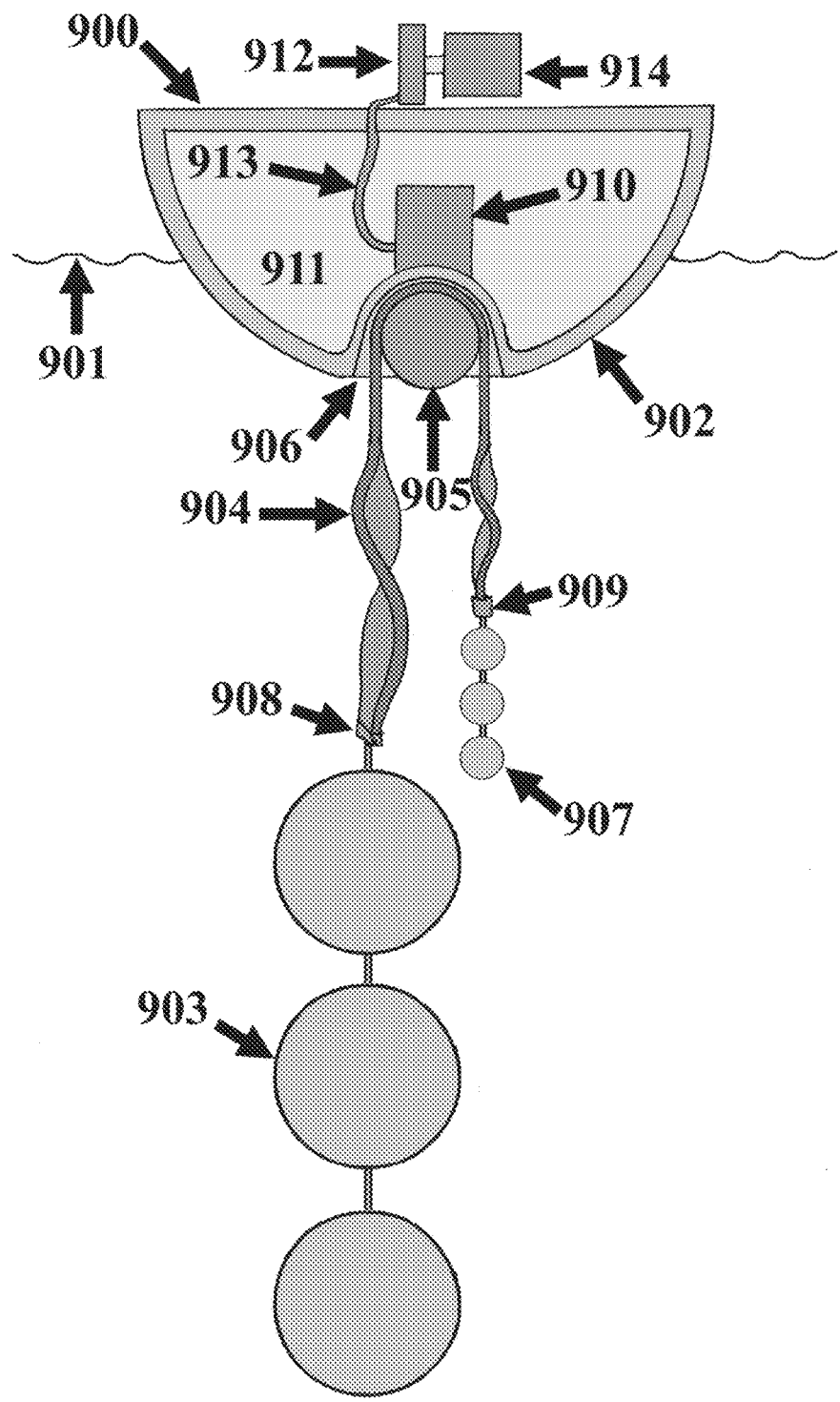
FIG. 35 is a sectional view of an embodiment of the present invention which comprises multiple inertial masses and restoring weights.

FIG. 35 shows a cross-sectional view of an embodiment that is representative of a set of features disclosed herein that are particularly advantageous. A buoy 900 has a hemispherical hull 902 and as a result tends to rotate easily away from its nominally vertical longitudinal axis so as to keep that longitudinal axis passing through the approximate center(s) of gravity of the connected set of inertial masses, e.g. 903. And, wherein, the buoy's tendency to keep its own longitudinal vertical axis coaxial with a longitudinal axis of the entire embodiment favoring the avoidance of the kind of wear and damage to the ribbon cable 904 that tends to result from the misalignment of the ribbon cable with the roller over which it passes.

Rotatably connected to buoy 900 is a roller 905 that is positioned in the water and outside of the buoy's interior. This placement of the roller, and the ribbon cable rotatably connected to it, in a condition of constant submersion facilitates the avoidance and/or prevention of corrosion on and/or within those components.

One end of the ribbon cable 904 is connected, via a ribbon junction bar 908, to a set of interconnected inertial masses, e.g. 903. The other end of the ribbon cable 904 (i.e. the end of the portion of the ribbon cable that is on the other side of the roller 905) is connected, via another ribbon junction bar 909, to a set of interconnected restoring weights, e.g. 907.

As the buoy 900 rises on a wave, it accelerates upward at a rate that the inertial masses cannot match. When the "resistive torque" imparted to the roller 905 by the connected power take off (PTO) becomes less than the "separation torque" imparted to the roller by the downward force imparted to the ribbon cable 904 by the tension created between the rising buoy and the slow-moving inertial masses, then roller 905 turns, thereby increasing the length of the ribbon cable between the roller and the inertial masses, and thereby turning its shaft and imparting an energizing torque to a crankshaft rotatably connected to the roller's shaft.

The rotation of the crankshaft (not shown), and its movably connected set of associated rods and hydraulic pistons, within enclosure 910, pressurizes hydraulic fluid which flows to a turbine 912, through a channel in the hydraulic connector 913, which turns the rotor of an electrical generator 914, thereby generating electrical power.

The hydraulic fluid discharged within the turbine flows back to the hydraulic pistons via another channel within hydraulic connector 913.

An embodiment of the present disclosure may have any number of inertial masses. It may have any number of restoring weights (or none at all). It may utilize one or more cables and/or one or more multi-stranded ribbon cables. One end of its cables or ribbon cables may be attached to one or more rollers and those cables or ribbon cables may be "rewound" in order to remove slack from the cable during the buoy's descent by a motor, e.g. electrical or hydraulic. One end of its cables or ribbon cables may be attached to one or more restoring weights, the gravitational potential energy of which will cause slack to be removed from the cables or ribbon cables. The buoys may be of any shape, geometry, design, and may be fashioned of any material or combination of materials, and be fabricated by any method, process, or device. The cables or ribbon cables may be made of any material, natural or synthetic, and be of any diameter, width, thickness, etc. The pulleys, rollers, gears, etc., may be of any number and diameter. The transmission of energy from the rollers, pulleys, gears, etc., to the generator may be by a simple direct-drive shaft, a gear box, a hydraulic fluid circuit, or any other mechanism, technology, or manner. an embodiment may utilize any number of electrical generators, or none at all (e.g. if it uses the energy extracted from the waves to desalinate water through water pressure, or if it FIG. 36 shows a top-down view of an embodiment of the current disclosure.

Flotation module 200 is shown to contain two apertures 202 and 203 which vertically pass through the entire structure of flotation module 200. Pulleys/capstans/sheaves ("drums") 206-210 can be arrayed linearly as shown, with flexible connector 204 passing alternatively above and below adjacent drums in a serpentine manner (detailed further in FIG. 37). Flexible connector 204 is a linear array of individual cables/wires/chains/etc. ("strands") arranged in a ribbon shape. This arrangement allows a relatively large tensile member to pass over a relatively small radius without causing damage to or rapidly fatiguing the tensile members' structures. Power-take-off ("PTO") modules 211 are attached to the central shafts of one or more of the drums 206-210 (in this example, both sides of drum 208). PTO modules 211 can consist of a generator, gearbox, hydraulic pump, or any number or combination of other power transfer mechanisms.

Figure 36:
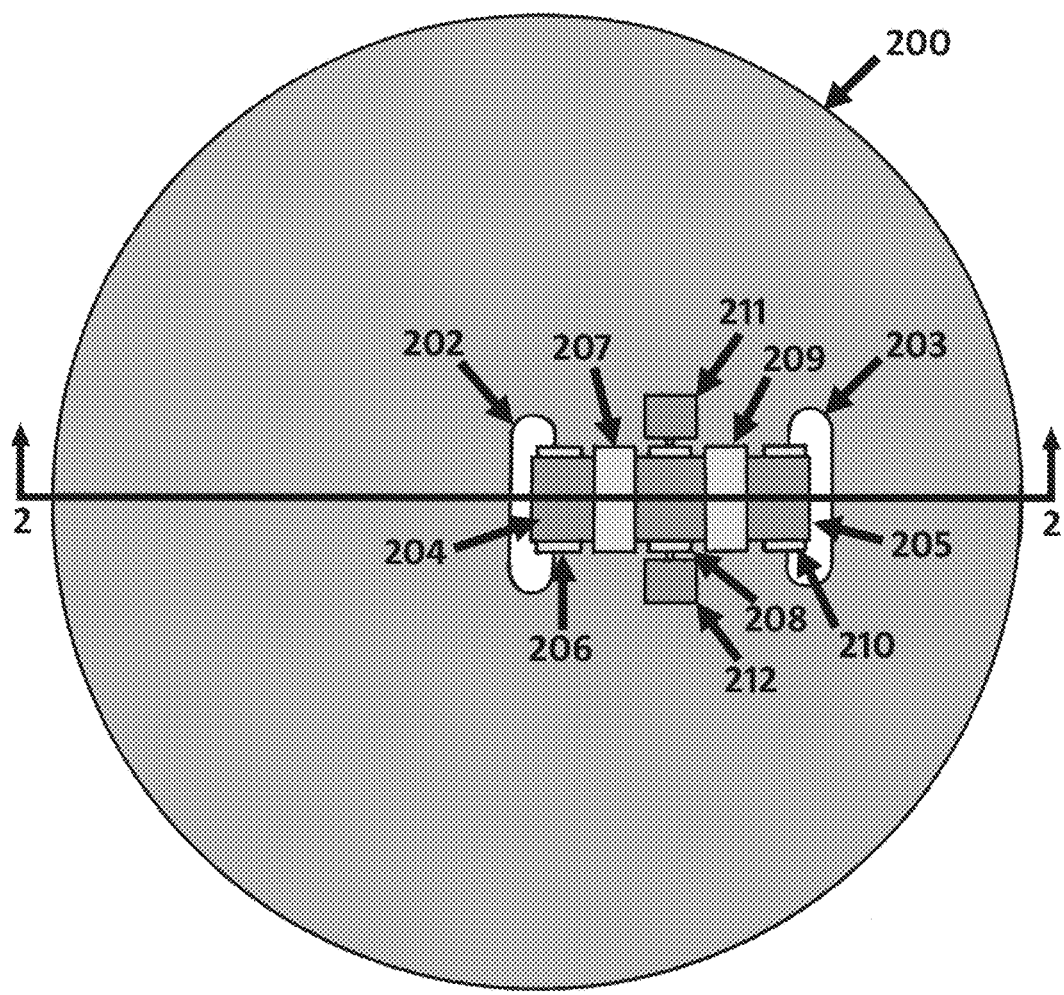
FIG. 36 is a top down view of the embodiment of the present invention.
Figure 37:
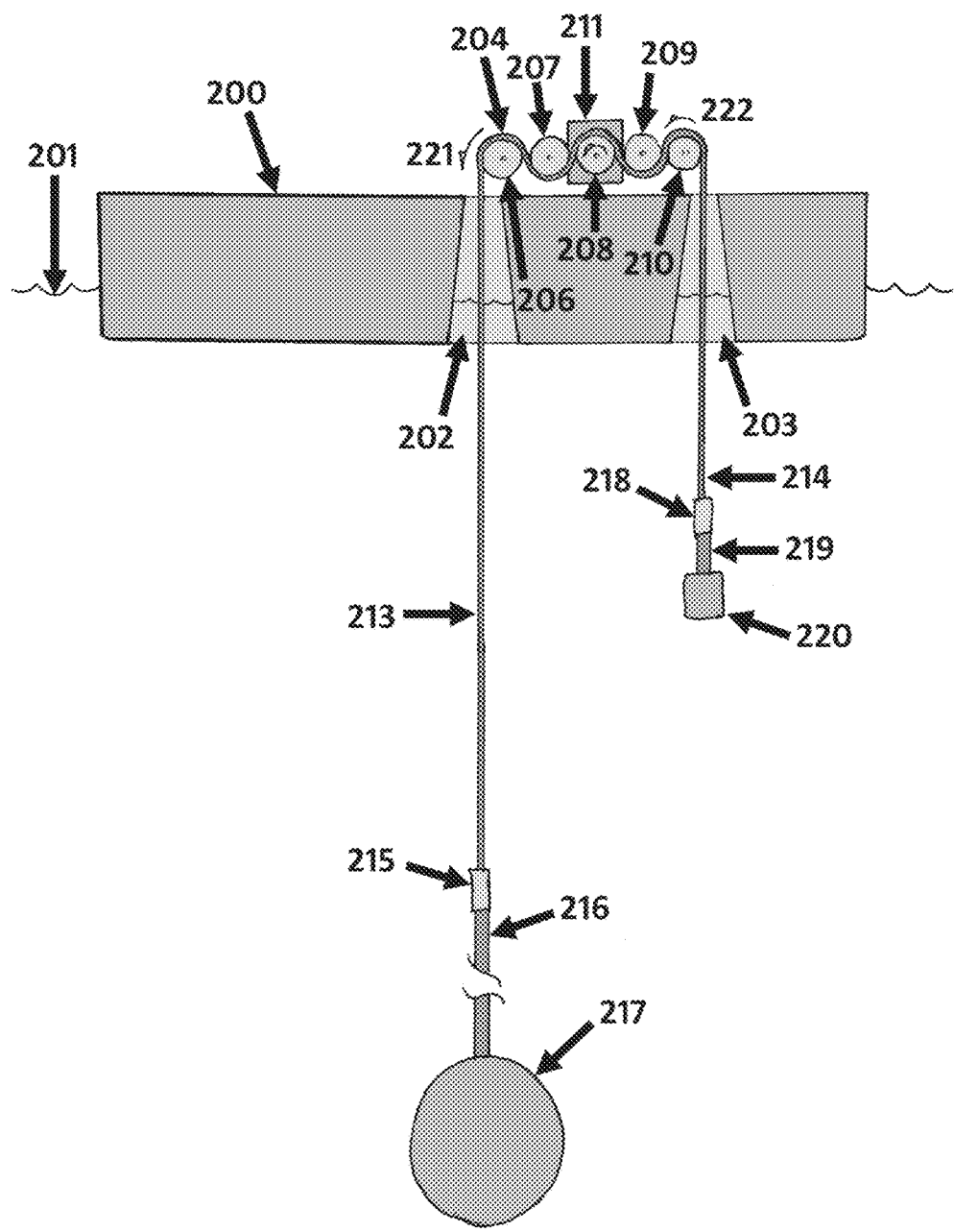
FIG. 37 is a sectional view of the embodiment of FIG. 36.

FIG. 37 shows section cut 2-2 from FIG. 36.

A vertical cross section through flotation module 200 is shown in this figure. It can be seen to be floating in body of water 201. Apertures 202 and 203 are shown to vertically pass though the structure of flotation module 200. Drums 206-210 are shown in their linear array with flexible connector 204 passing in a serpentine manner around drums 206-210. PTO module 211 is shown to be connected to drum 208 and five drums are shown to be used, however more or fewer drums and/or PTO modules could be utilized. One end of flexible connector 214 (all strands comprising the ribbon shape of flexible connector 214) is attached to ribbon junction bar 218. Mating flexible connector 219 depends from ribbon junction bar 218 and may be comprised of a single flexible connector (rope, chain, wire, etc.) or a plurality. Restoring weight 220 is shown to be attached to mating flexible connector 219. The other end of flexible connector 213 also is shown to attach to a ribbon junction bar 215 in a similar manner as the side possessing the restoring weight. One or more mating flexible connectors depend from ribbon junction bar 215 and mate to inertial mass ("IM") 217. IM 217 may consist of a structure containing water filled voids, which overall has a net weight that is positive in water. Relative motion causing increasing separation between the IM 217 and the floatation module 200 will cause drums 206-210 to rotate (221, 222). Flexible connector 204 does not slip relative to the surface of drums 206-210 because the serpentine arrangement of the flexible connector 204 through the drums multiplies the tension provided from the restoring weight 220 to provide sufficient friction between the drums 20-6-210 and flexible connector 204. The behavior of this type of flexible connector/drum arrangement is commonly exploited in traction winches.

Figure 38:
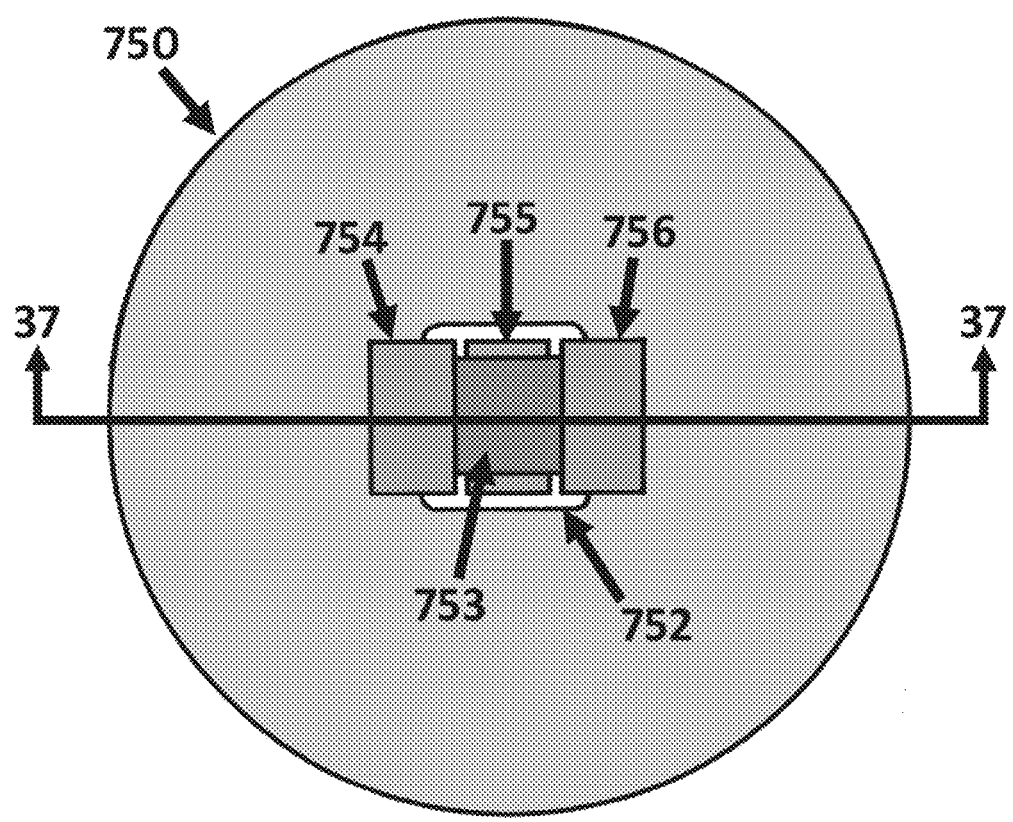
FIG. 38 is a top down view of the embodiment of the present invention.

FIG. 38 shows a top-down view of an embodiment of the current disclosure.

Floatation module 750 is shown to contain a single aperture 752 approximately in its center, extending entirely through its structure to communicate between a top and bottom surface. Flexible connector 753 is shown to be of a ribbon-shaped configuration where its sub-elements are arranged side by side. The individual strands of the ribbon-shaped flexible connector 753 can be cables, chains, wire, rope, or a multitude of other linear tensile members. Flexible connector 753 is shown to pass up and over track assembly 755 and between track assemblies 754 and 756. These track assemblies will be detailed and described in the following figure.

Figure 39:
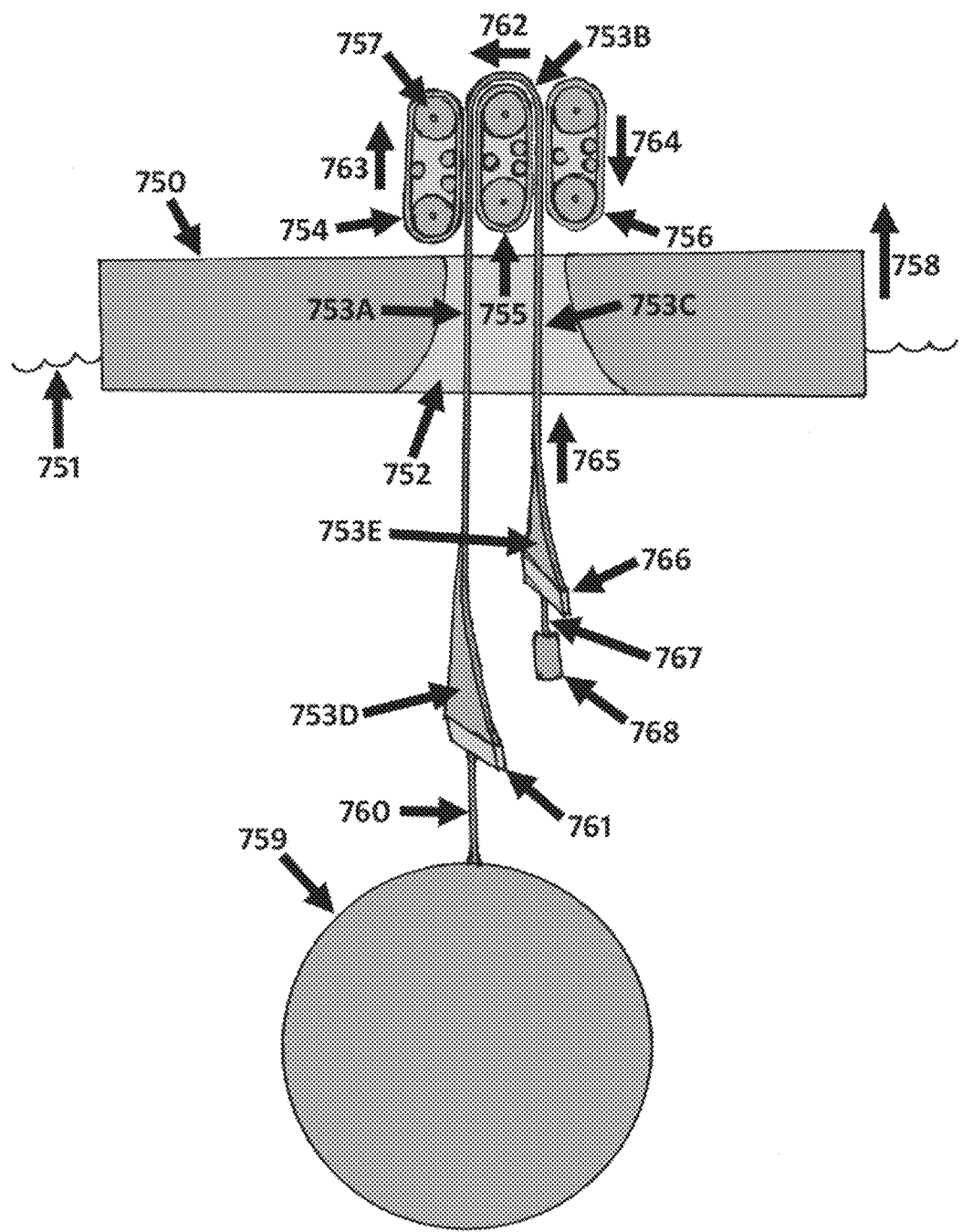
FIG. 39 is a sectional view of the embodiment of FIG. 38.

FIG. 39 shows vertical cross section 37-37.

Figure 40:
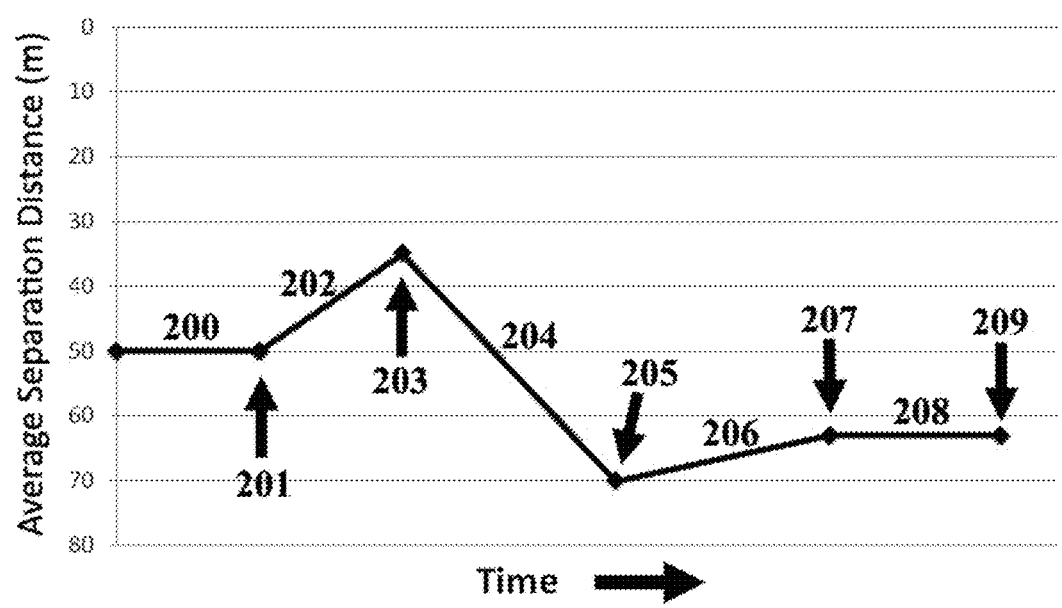
FIG. 40 shows a chart illustrating a representative pattern of change over time of the separation distance between the buoy and inertial mass of an embodiment of the present invention.
Figure 41:
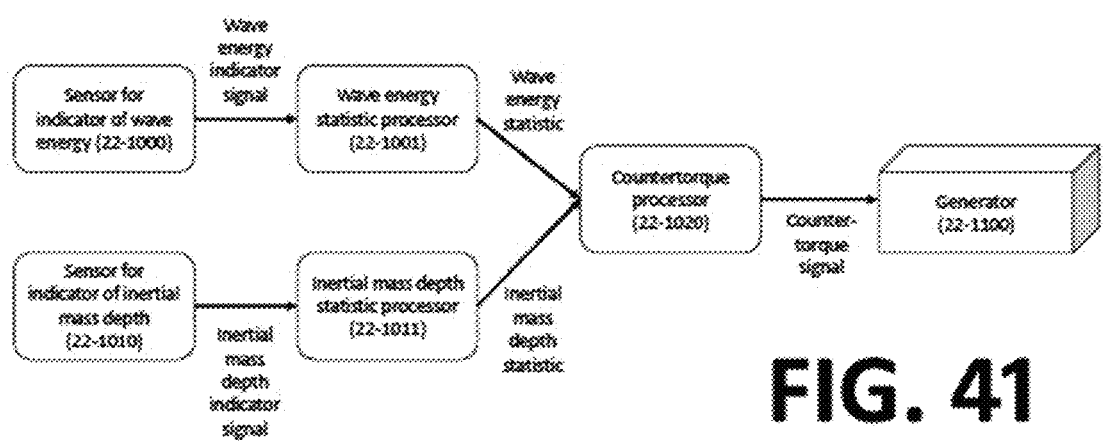
FIGS. 41-44 show a series of flow charts corresponding to control systems of the present invention.
Figure 42:
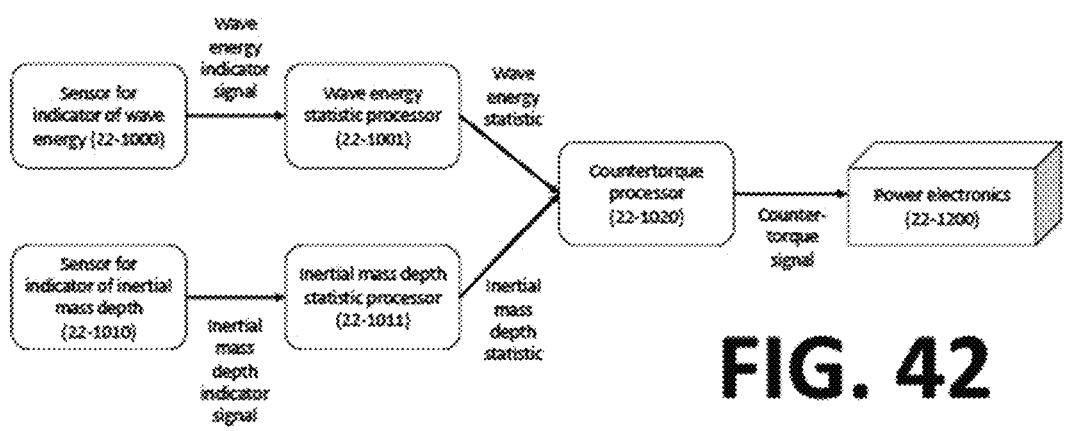
Figure 43:
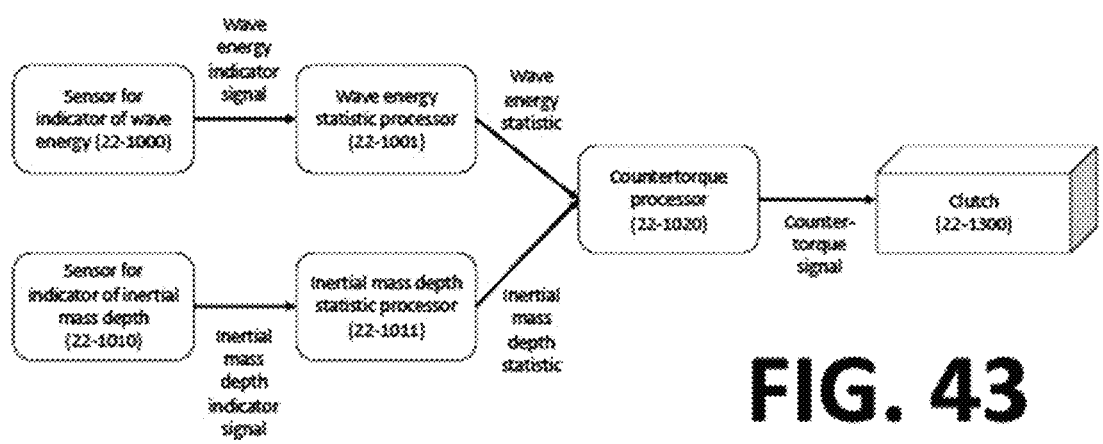
Figure 44:
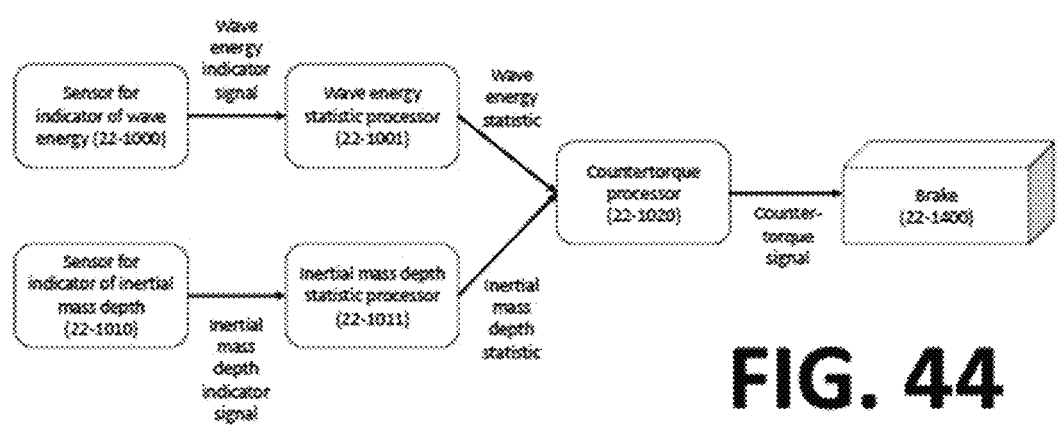

Flotation module 750 is shown in cross section floating on body of water 751 and through body aperture 752 is clearly visible. Inertial mass ("IM") 759 is shown with connecting element 760 mating it to ribbon junction bar 761. Individual strands 753D of ribbon-shaped flexible connector 753 are shown to terminate on the ribbon junction bar 761. Flexible connector 753A is shown passing up and over track assembly 755 and between track assemblies 754 and 756. Track assembly pairs 754/755 and 755/756 form two linear cable engines. These linear cable engines exert a compressive force on flexible connector 753. As flotation module 750 moves away from IM 759 due to wave action present in body of water 751, flexible connector 753 is pulled through both linear cable engines 754/755 and 755/756. This motion is shown by 765 and 762. The compressive force exerted on flexible connector 753 and the resulting friction between flexible connector 753 and the tracks of linear cable engines 754/755 and 755/756 does not allow significant relative motion between the surface of the tracks of linear cable engines 754/755 and 755/756 and the flexible connector 753. In this way, the action of pulling the flexible connector 753 through the linear cable engines 754/755 and 755/756 causes the tracks to move as shown by 762, 763, and 764. The tracks of linear cable engines 754/755 and 755/756 interface to wheels 757 such that as the tracks rotate, so do the wheels 757. One or more PTO modules (generators, pumps, etc.) can be attached to wheels 757 which comprise the track FIG. 40 shows a graph in which the line 200 illustrates the changes in the average separation distance between the flotation module (i.e., buoy) and the inertial mass of an embodiment (i.e., device) of the present disclosure that might be manifested by the device as the time average amount of upward force, and/or the average impulse, being imparted to the inertial mass by the buoy through the flexible connector connecting the two is altered through an alteration of the resistive torque applied to the pulley(s) over which the flexible connector travels.

With respect to an initial time average amount of upward force, and/or an initial average impulse, of a first amount (e.g., average_impulse_200), the average separation distance between the buoy and the inertial mass (i.e., during interval 200) is about 50 meters. This is the "average" separation distance, and the instantaneous separation distance between the buoy and the inertial mass may be oscillating with a relatively large range of distances (which oscillation can have an amplitude roughly corresponding to an amplitude of the waves).

When, at time 201, the average impulse imparted to the inertial mass by the buoy is increased to an amount (i.e., average_impulse_202) that is greater than average_impulse_200, then the average separation distance begins to decrease, and the inertial mass begins to move closer and closer to the buoy from which it is suspended. This increased impulse can be created by increasing an average counter-torque applied by the power-take-off system.

When, at time 203, the average impulse imparted to the inertial mass by the buoy is decreased to an amount (i.e., average_impulse_204) that is less than average_impulse_200, then the average separation distance begins to increase, and the inertial mass begins to move further and further away from the buoy, i.e. its average depth increases over time.

When, at time 205, the average impulse imparted to the inertial mass by the buoy is increased, this time to an amount (i.e., average_impulse_206) that is greater than average_impulse_200, but is less than average_impulse_202, then the average separation distance begins to decrease again, but this time it begins to decrease more slowly than it did during interval 202.

And, when, at time 207, the average impulse imparted to the inertial mass by the buoy is decreased to an amount (i.e., average_impulse_208) that is equal to average_impulse_200, then the average separation distance once again stabilizes. However, the new stable average separation distance is now at about 62 meters, i.e. it is stable but it is greater than the average separation distance that characterized the original stable separation distance of 50 meters.

FIGS. 41-44 show four flow-charts (subfigures A through D respectively). Each of the four flow-charts depicts a control system circuit, or a part of a control system circuit, that can be incorporated within an embodiment of the present disclosure. An embodiment of the present disclosure can have zero, one, or more than one of the disclosed circuits. An embodiment of the present disclosure can have a control system circuit that includes, but does not consist only of, one of the depicted circuits. These control system circuits can be implemented in hardware (e.g. as a programmed chip or circuit board), in software (e.g. as a program or driver), or in a combination or hybrid of the two.

A main purpose of the control system circuits depicted is to regulate the depth of the inertial mass so that in normal operation it does not sink to waters that are too deep (e.g. causing a flexible connector to experience a snap load) and so that in normal operation it does not rise to waters that are too shallow (e.g. so that it does not impact the bottom surface of the flotation module). This can be accomplished by varying the amount of resistance, countertorque, or stopping power applied to the powertrain (e.g. the pulley/capstan or shaft) when the flotation module is moving up and down due to waves. The inertial mass typically experiences a downward gravitational force due to the net weight of the "inertial mass weighted portion," (the portion of the inertial mass that has a positive net weight, whether integral with the inertial mass or depending from it) tending to cause it to sink. The average and/or cumulative balance, ratio, or equilibrium between this net downward gravitational force and any upward buoyant force transmitted to the inertial mass via the depending connector determines, in part, the depth of the inertial mass (and/or its distance from the flotation module). The more countertorque is applied by the powertrain, the more buoyant upward forces experienced by the flotation module will be transmitted through the depending connector to the inertial mass, entailing that the inertial mass will experience relatively greater upward forces when the flotation module accelerates upward, offsetting the downward gravitational force experienced by the inertial mass. The less countertorque is applied by the powertrain, the less that buoyant upward forces experienced by the flotation module will be transmitted through the depending connector to the inertial mass, entailing that the inertial mass will experience relatively lesser upward forces when the flotation module accelerates upward.

Typically, holding all else equal, the greater the amount of ambient available wave energy (e.g. the greater the average wave height holding period constant, or the shorter the wave period holding wave height constant), the smaller will be the appropriate magnitude of the countertorque, resistance, or stopping power developed, realized, and/or provided by the powertrain as a multiple of the separation velocity between inertial mass and flotation module. Conversely, holding all else equal, the smaller the amount of ambient available wave energy, the larger will be the appropriate magnitude of the countertorque, resistance, or stopping power developed, realized, and/or provided by the powertrain as a multiple of the separation velocity between inertial mass and flotation module.

Likewise, typically, holding all else equal, the deeper the inertial mass is in the body of water (or the greater the separation distance between the flotation module and the inertial mass)—especially if the inertial mass is deeper than some critical depth—the larger will be the appropriate magnitude of the countertorque, resistance, or stopping power developed, realized, and/or provided by the powertrain, so that the inertial mass can be gradually "raised" to an optimal or nominal depth range. Conversely, holding all else equal, the shallower the inertial mass is in the body of water, the smaller will be the appropriate magnitude of the countertorque, resistance, or stopping power developed, realized, and/or provided by the powertrain, so that the inertial mass can be gradually allowed to fall to an optimal or nominal depth range.

Although the rules of thumb outlined in the previous two paragraphs will likely apply in most cases, control systems may be developed (and are covered by this disclosure) wherein the rules of thumb of the previous two paragraphs do not apply, at least not in every case or at every time. In particular, machine learning and neural network circuits, which can be incorporated into the control system, may provide countertorque directives that are difficult for humans to understand in all cases, even though they accomplish highly successful regulation of the depth of the inertial mass.

Each figure in FIGS. 41 to 44 depicts a control system in which at least two sensors 22-1000 and 22-1010 record information from the environment. At least one of these at least two sensors is a sensor for an indicator of wave energy 22-1000. At least one of these at least two sensors is a sensor for an indicator of inertial mass depth 22-1010.

A sensor for an indicator of wave energy 22-1000 records, receives, or senses a physical characteristic and/or signal relevant to the computation of an indicator, predictor, correlate, measure, estimate, and/or statistic of the ambient available wave energy. For instance, a sensor for an indicator of wave energy 22-1000 can be a camera located on the side of the flotation module, having a lens directed laterally toward the horizon, so as to provide video data relevant to estimating the current wave height and period. A sensor for an indicator of wave energy 22-1000 can be an accelerometer in the flotation module that records data pertaining to the velocity and acceleration of the flotation module, data that is relevant to calculating an estimate of the occurrent wave height and period and thus the ambient available wave energy. A sensor for an indicator of wave energy 22-1000 can be a radio or satellite receiver that can receive weather data transmitted from a weather station pertaining to the wave height and period in the geographic area where the converter is located, information that is relevant to calculating an estimate of the ambient available wave energy. A sensor for an indicator of wave energy 22-1000 can be an electrical circuit that senses and records the amount of electrical power the converter is currently generating, data that is relevant to calculating an estimate of the ambient available wave energy. A sensor for an indicator of wave energy 22-1000 can be a rotary encoder operatively connected to a generator shaft so as to record the angular velocity of said shaft, data that is relevant to calculating an estimate of the ambient available wave energy. There are many other indicators, predictors, correlates, measures, and statistics of the ambient available wave energy besides the ones just listed, and accordingly a sensor for an indicator of wave energy 22-1000 can be many different types of sensor.

A sensor for an indicator of inertial mass depth 22-1010 records, receives, or senses a physical characteristic and/or signal relevant to the computation of an indicator, predictor, measure, estimate, correlate, and/or statistic of the depth in the body of water of the inertial mass, and/or an indicator, predictor, measure, estimate, correlate, and/or statistic of the vertical separation distance between the inertial mass and the flotation module. For instance, a sensor for an indicator of inertial mass depth 22-1010 can be a sonar sensor located on a bottom portion of the flotation module that emits a sonar signal toward the inertial mass to measure the distance between the flotation module and the inertial mass. A sensor for an indicator of inertial mass depth 22-1010 can be a rotary encoder operatively connected to a capstan/pulley or shaft thereof at the flotation module. By measuring the angular velocity of said shaft, such an encoder can provide data relevant to measuring the cumulative angular displacement of the pulley/capstan and/or the cumulative translation of a depending connector operatively connected thereto. This data is relevant to calculating an estimate of the depth in the body of water of the inertial mass and/or the distance between the inertial mass and the flotation module. A sensor for an indicator of inertial mass depth 22-1010 can be an audio receiver at the flotation module that senses and processes "pings" from an audio emitter on the inertial mass. The latency of such an audio signal, or the relative latencies of different types (e.g. frequencies) or audio signals, can be used to estimate the distance between the inertial mass and the flotation module. There are many other indicators, predictors, measures, correlates and statistics of the depth in the body of water of the inertial mass and/or of the vertical separation distance between the inertial mass and the flotation module besides the ones just listed. Accordingly, a sensor for an indicator of inertial mass depth 22-1010 can be many different types of sensor.

The sensor for an indicator of wave energy 22-1000 transmits a digital data packet or an analog signal, or returns a value (e.g. as part of a function call), to an associated processor 22-1001 configured to compute a statistic, feature, measure, predictor, estimate, correlate, function, or indicator of the ambient available wave energy.

The sensor for an indicator of inertial mass depth 22-1010 transmits a digital data packet or an analog signal, or returns a value (e.g. as part of a function call), to an associated processor 22-1011 configured to compute a statistic, feature, measure, predictor, correlate, estimate, function, or indicator of the depth in the body of water of the inertial mass (or the separation distance between the inertial mass and the flotation module).

Each of processors 22-1001 and 22-1011 transmits a digital data packet or an analog signal, or returns a value (e.g. as part of a function call), to a countertorque processor 22-1020 configured to calculate an appropriate amount of countertorque, resistance, stopping power, or power-take-off to be applied to the rotating shaft and/or to the pulley/capstan. The countertorque processor can compute this value as a function of, or by using as input: (1) the current or recent ambient available wave energy (or a proxy, indicator, or correlate thereof), e.g. as received as an input data or signal from the wave energy statistic processor 22-1001; and (2) the current or recent depth in the body of water of the inertial mass (or a proxy, indicator, or correlate thereof) or the current or recent separation distance between the flotation module and the inertial mass (or a proxy, indicator, or correlate thereof), e.g. as received as an input data or signal from the inertial mass depth statistic processor 22-1011.

Countertorque processor 22-1020 can be a PID control, a neural network, a lookup table, a mathematical function, a statistical or machine learning routine, or any other kind of processor capable of producing a countertorque directive (i.e. an optimal, desired, or appropriate countertorque) in approximately real time given the two inputs outlined in the previous paragraph. Countertorque processor 22-1020 can include a physics simulation engine enabling the control system to benefit from Monte Carlo simulation of various potential countertorque values.

Countertorque processor 22-1020 can send a digital data packet or an analog signal, or return a value (e.g. as part of a function call), to one or more components or control systems responsible for effectuating the countertorque directive.

In the control system depicted in subfigure A, the countertorque processor 22-1020 can send a digital data packet or an analog signal, or return a value (e.g. as part of a function call), to a generator 22-1100 (or to a generator control system). For instance, the countertorque processor can send a digital data packet containing a countertorque directive to a generator control system responsible for increasing and decreasing the excitation of generator field coils, enabling the countertorque realized by the generator to be increased and decreased. The countertorque processor can send a digital data packet containing a countertorque directive to a hydraulic valve control system responsible for opening and closing a hydraulic valve, enabling the countertorque realized by the generator to be increased and decreased.

In the control system depicted in subfigure B, the countertorque processor 22-1020 can send a digital data packet or an analog signal, or return a value (e.g. as part of a function call), to one or more power electronics subsystems or circuits 22-1200. For instance, the countertorque processor can send a digital data packet containing a countertorque directive to a control system responsible for controlling a grid-side converter, thereby varying the load experienced by the generator, thereby varying the countertorque it can develop or realize.

In the control system depicted in subfigure C, the countertorque processor 22-1020 can send a digital data packet or an analog signal, or return a value (e.g. as part of a function call), to a clutch 22-1300 disposed in the power-transmission pathway from the pulley/capstan to the generator (or a control system for said clutch). For instance, the countertorque processor can send a digital data packet containing a countertorque directive to a control system responsible for controlling the engagement of the clutch, thereby varying the countertorque or resistance transmitted to the pulley/capstan.

In the control system depicted in subfigure D, the countertorque processor 22-1020 can send a digital data packet or an analog signal, or return a value (e.g. as part of a function call), to a brake 22-1400 operatively connected to the powertrain (e.g. the pulley/capstan or the shaft) (or to a control system for said brake). For instance, the countertorque processor can send a digital data packet containing a countertorque directive to a control system responsible for controlling the engagement of the brake, thereby varying the countertorque or resistance transmitted to the pulley/capstan.

The control system depicted in FIGS. 41-44 can be active continuously (e.g. in a looping or repeating fashion); intermittently; in an interrupt-based fashion (e.g. when triggered by specified sensor values, e.g. from sensors 22-1000, 22-1010, and/or other sensors or processors); at regular time steps according to a clock cycle; and/or any combination thereof; and/or on another appropriate cycle or schedule.

In an alternate embodiment (not shown), the countertorque processor 22-1020 receives input from a sensor for an indicator of wave energy 22-1000 but not from a sensor for an indicator of inertial mass depth 22-1010. In another alternate embodiment (not shown), the countertorque processor 22-1020 receives input from a sensor for an indicator of inertial mass depth 22-1010 but not from a sensor for an indicator of wave energy 22-1000.

Figure 54:
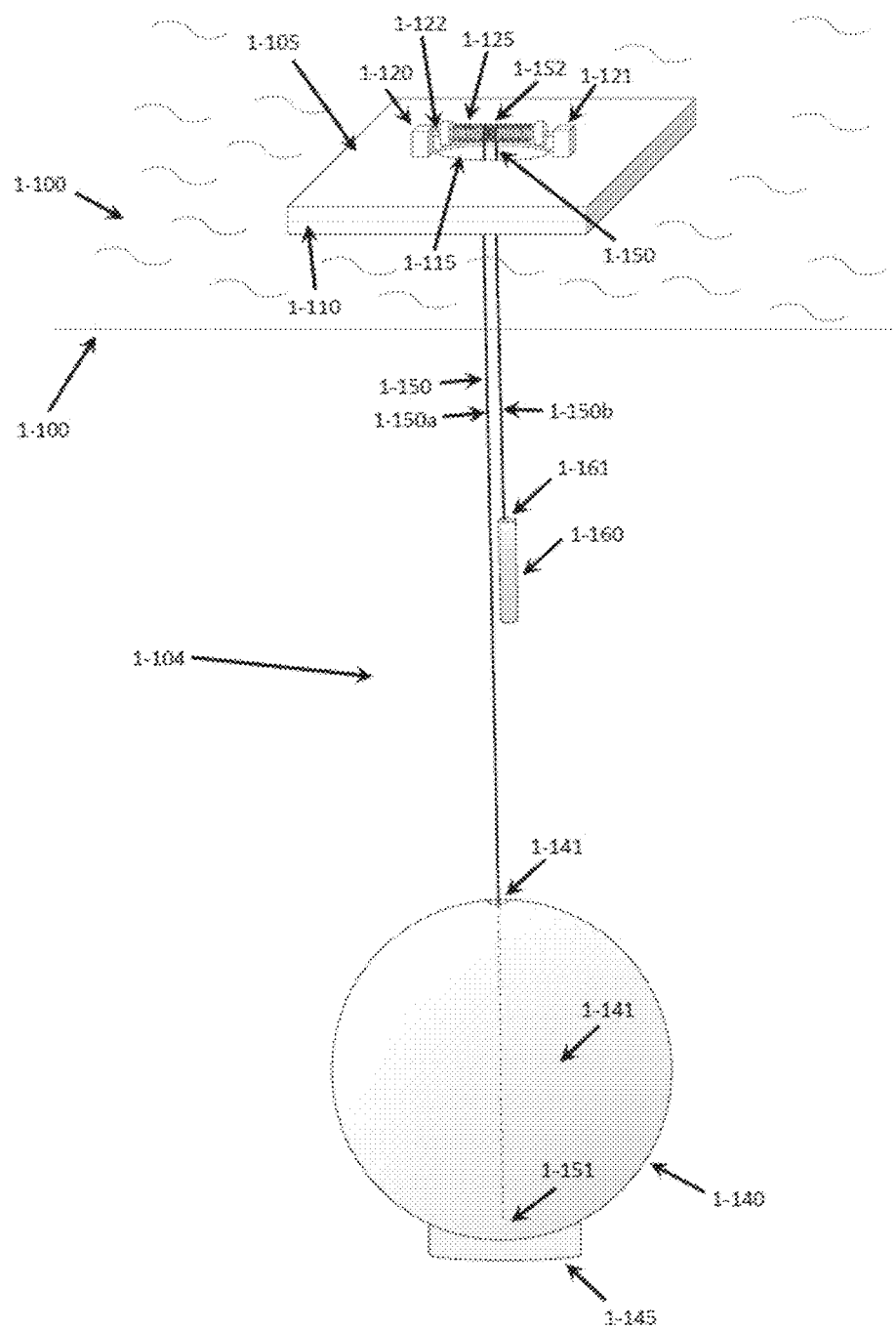
FIG. 54 is an elevated perspective view of an embodiment of the present invention.

FIGS. 45 to 48 show a temporal progression of side-view cross sections of an embodiment similar to the one shown in FIG. 54.

The progression from subfigure 45A to subfigure 48T shows the response of the converter as the water level rises, falls, and rises again, relative to the mean water level (dotted line 2-802), during the passage of a wave, e.g. from wave trough to wave trough.

The water level and device configuration shown in Subfigure 45A immediately temporally precede the water level and device configuration shown in Subfigure 45B, etc.

I.e., the subfigures are to be understood as frames of an animation.

The subfigures can be understood to "loop" under certain assumptions, i.e. subfigure 48T can be understood to immediately precede subfigure 45A, e.g., on the assumption that the device is in continual, repeating 2.5 meter waves on a 10 second period.

Subfigure 45A shows the converter in a configuration that it can assume when the water level 2A-100 is approximately at a temporal and spatial local minimum, i.e. the trough of a wave. The mean water level (i.e. the water level when the body of water is not disturbed by waves) is shown as dotted line 2-802. Subfigure 47K shows the converter in a configuration it can assume when the water level 2K-100 is approximately at a temporal and spatial local maximum, i.e. the crest of a wave. Here likewise the mean water level is shown by dotted line 2-802. Subfigures 46F and 48P show the converter in configurations it can assume when the water level (2F-100 and 2P-100 respectively) is approximately at the mean water level. I.e. the water level (2F-100 and 2P-100 respectively) and the mean water level (2-802) coincide. In 46F the water level is rising toward a crest and in 48P it is falling toward a trough.

For approximate scale (merely illustrative), the wave height/wave amplitude shown (vertical distance between the maximal water level 2K-100 and the minimal water level 2A-100) is approximately 2.5 meters and the wave period shown is approximately 10 seconds. Naturally this disclosure applies equally to a converter capable of operating in any wave conditions.

Note that, for simplicity and clarity, the slope or curvature of the water's surface is not shown, i.e. the water level is designated by a flat horizontal line. The wavelength of deep-water waves of the size shown can be 200 meters or greater, making the local curvature of the water's surface essentially negligible.

Note that horizontal dotted lines 2-800 indicate for reference the position of the top of the restoring weight from subfigure A. Horizontal dotted lines 2-801 indicate for reference the position of the top of the inertial mass from subfigure A. These reference lines allow the movement of the inertial mass and restoring weight to be more easily discernable against fixed "reference lines."

Figure 45:
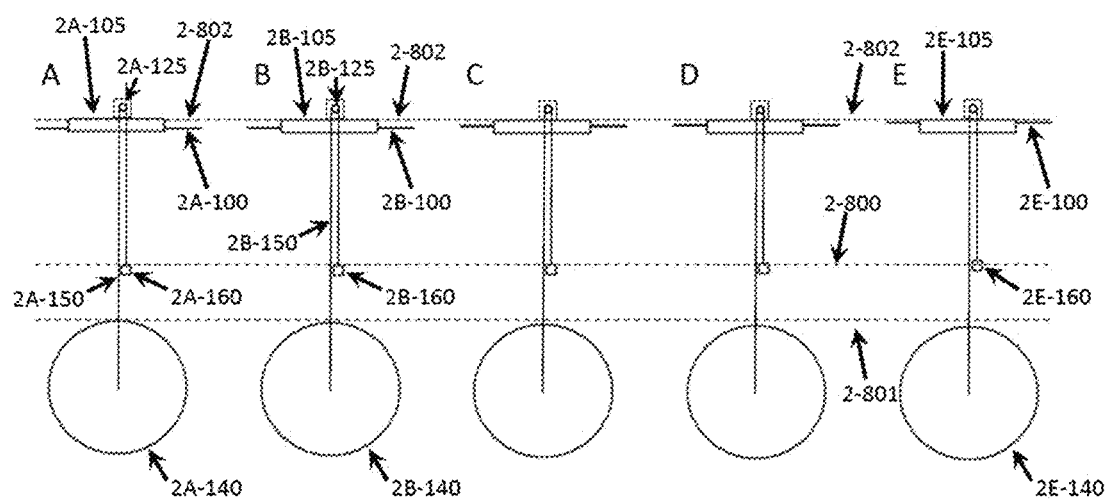
FIGS. 45-48 show a series of diagrams representing the operational behavior of an embodiment of the present invention.
Figure 46:
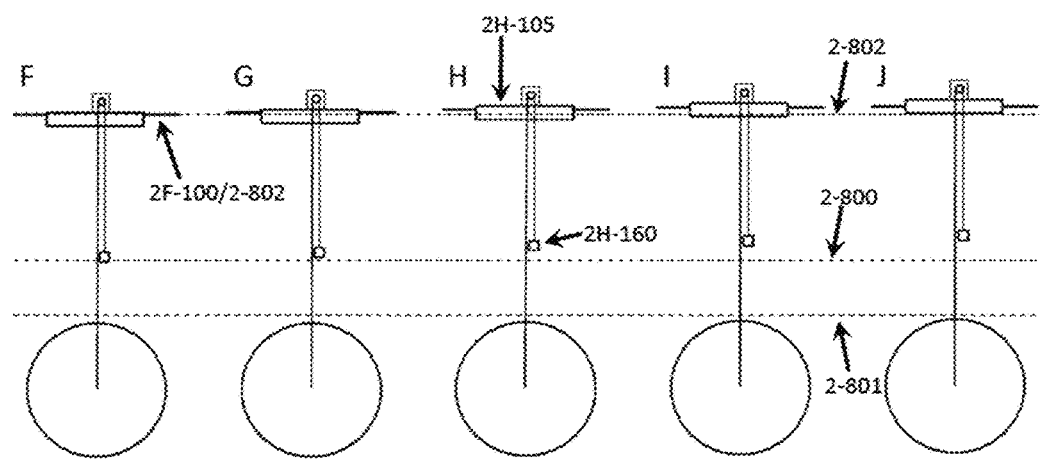
Figure 47:
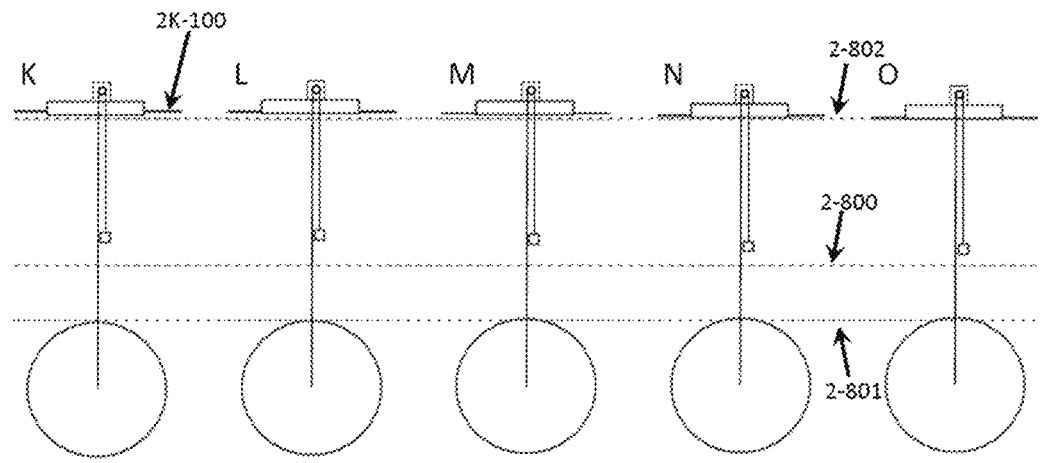
Figure 48:
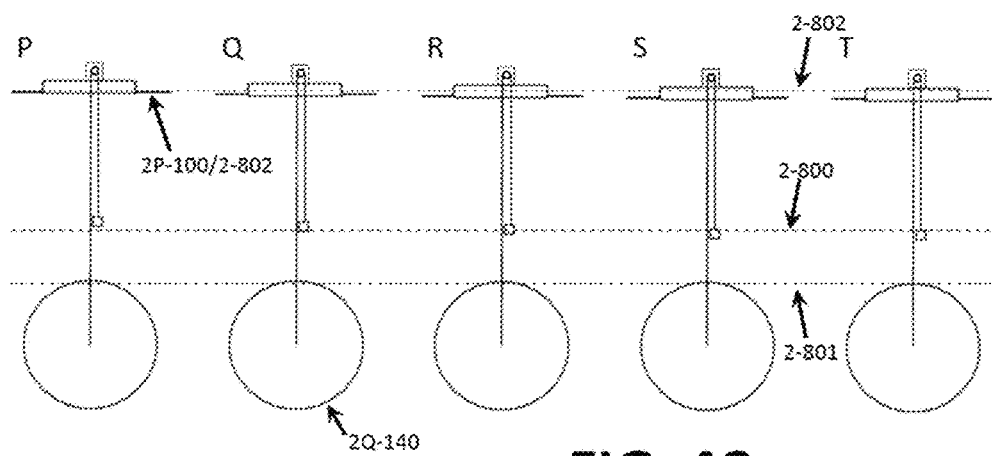

In general, the components of the embodiment of FIG. 45 are to be understood to be analogous to the components of the embodiment of FIG. 54.

In subfigure 45A, flotation module 2A-105 floats on the surface of the water 2A-100 which is approximately at a local minimum, i.e. the device is in the trough of a passing wave.

Inertial mass 2A-140 substantially encloses or "traps" a large volume of water inside a substantially rigid outer shell. It is to be understood that inertial mass 2A-140 has an internal and/or integral inertial mass weighted portion and therefore inertial mass 2A-140 has an average effective density (taking into account both its integral internal mass weighted portion and its enclosed water) similar to the average effective density of the embodiment of FIG. 54.

Inertial mass 2A-140 is operatively connected to flotation module 2A-105 and restoring weight 2A-160 via depending connector 2A-150. Depending connector 2A-150 is operatively connected to pulley/capstan 2A-125 at the flotation module, and can wind around it several times as in the embodiment of FIG. 54. A generator is operatively connected to pulley/capstan 2A-125.

Inertial mass 2A-140 has a downward momentum developed during the converter's earlier descent into the wave trough. This earlier descent corresponds to the dynamics of subfigures 2Q through 2T, where it can be seen that the inertial mass (e.g. 2Q-140) is progressively descending, i.e. has a downward momentum.

In subfigure 45B the water level 2B-100 has risen relative to 2A-100. Consequently, flotation the module 2B-105 is displacing more water in 45B than in 45A. The flotation module therefore experiences a larger buoyant force than before and can rise. As of subfigure 46H, flotation module 2B/H-105 has risen significantly. Assuming the depending connector is sufficiently inelastic and strong, then in order for flotation module 2B-105 to rise, one or both of inertial mass 2B-140 and/or restoring weight 2B-160 must also rise. Because inertial mass 2B-140 has relatively much larger effective mass (inertia) than does the restoring weight 2B-160, it is easier for restoring weight 2B-160 to be accelerated up than for inertial mass 2B-140 to be accelerated up. Consequently, restoring weight 2B-160 can rise, e.g. to and past the position indicated by 2H-160. As restoring weight 2B-160 rises, depending connector 2B-150 can operatively rotate pulley/capstan 2B-125 if there is sufficient friction between the connector and the pulley/capstan. Because the generator can exert a countertorque and/or resistance to the turning of the pulley/capstan (and must exert such a countertorque, if the device is to generate power), at least some of the buoyant force acting on the flotation module 2B-105 can be transmitted through the depending connector to the inertial mass 2B-140 (and must be so transmitted, if the device is to generate power). This can cause the inertial mass to accelerate upward, slowing its downward movement (e.g., subfigures 45A, 45B, 45C, 45D) and eventually developing an upward movement (e.g., subfigures 46G, 46H, 46I, 46J, etc.). In this way, the movements of the inertial mass will typically be reciprocal but out of phase with the movements of the flotation module. The time period during which the flotation module is rising, accelerating upward, and/or moving away from the inertial mass can be referred to as the "upstroke."

After or around the time that the flotation module has reached a crest of a wave (e.g. subfigure 47K), the flotation module begins to move downward under gravity (e.g. subfigures 47K to 48T). The time period during which the flotation module is falling, accelerating downward, and/or moving toward the inertial mass can be referred to as the "downstroke." If the mass of the restoring weight has been chosen to be relatively small, then during the downstroke, the device can and should be configured so that on average the generator resists the turning of the pulley/capstan less than it does on average during the upstroke, allowing the restoring weight to descend more easily relative to the flotation module than it would if the generator were applying and/or providing greater countertorque and/or resistance. When moving downward and/or away from the flotation module, the restoring weight will pull the depending connector after it, thereby "rewinding" the pulley/capstan, readying it for the next mechanical cycle. To provide a lower average generator resistance during the downstroke than during the upstroke, a one-way clutch can be disengaged or field coils in the generator can be de-excited, and/or some other mechanism can accomplish the same purpose. Note however that for certain (larger) sizes of restoring weight, it may be desirable not to decrease the average resistance during the downstroke relative to the upstroke, but rather to take off power, at least to some extent, during both the upstroke and the downstroke.

The "animation" of FIGS. 45-48 is provided merely as indicative illustration, and no representation is made that it accurately represents the dynamics of all embodiments disclosed in this disclosure.

Figure 49:
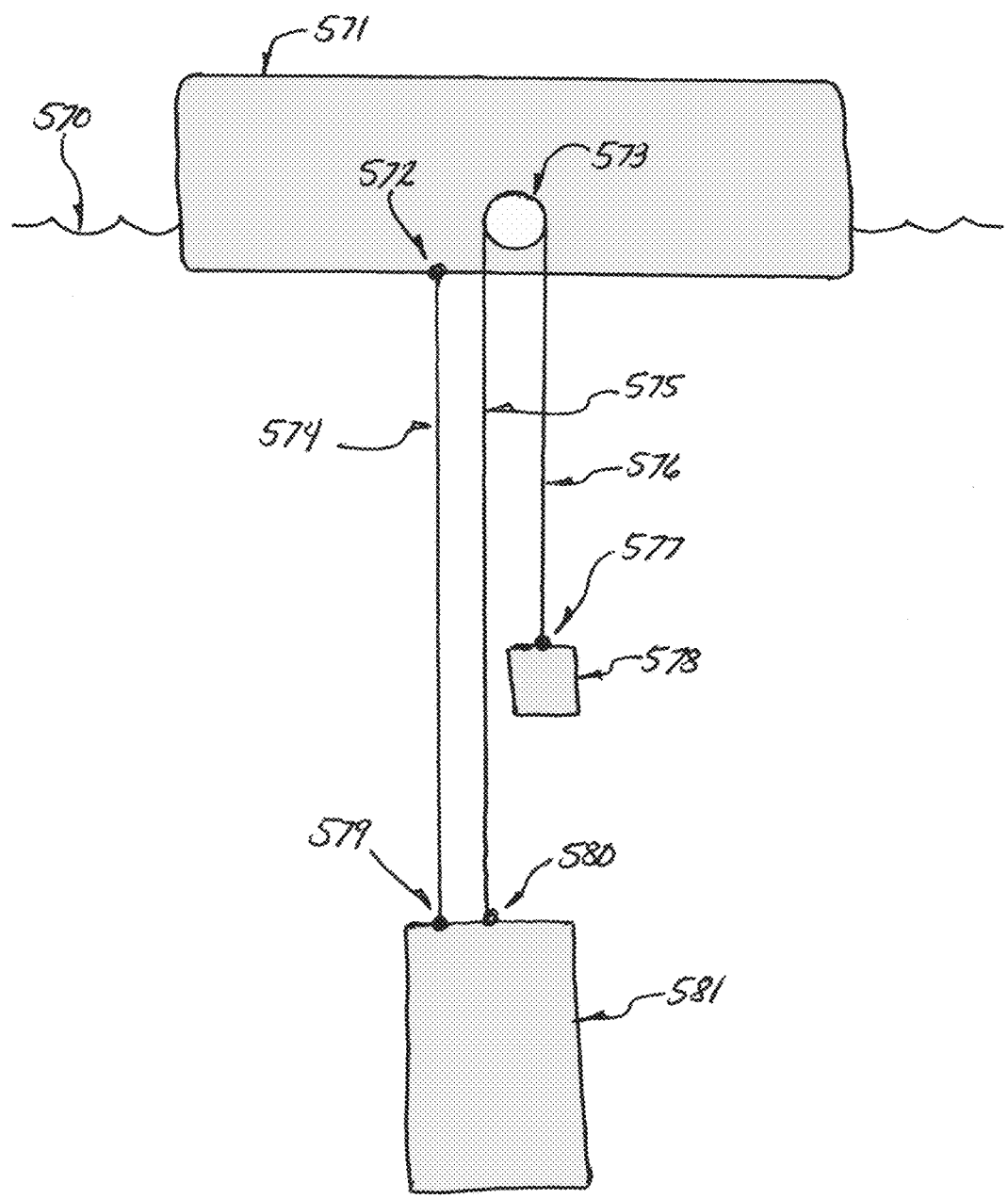
FIG. 49 is an elevated perspective view of an embodiment of the present invention.

FIG. 49 shows a cross sectional view of an embodiment of the current disclosure, namely an embodiment of an inertial wave energy converter of a simple type.

Lifting module 571 is buoyant and floats on the surface of a body of water 570. Inertial mass 581 is submerged and suspended beneath the lifting module and can contain and/or at least partially entrap a large mass of water. Restoring weight 578 is submerged and suspended beneath the lifting module and has an average density greater than water, perhaps significantly greater. Power chain 575/576 is connected to inertial mass 581 at attachment point 580 and to restoring weight 578 at attachment point 577, and passes operatively about pulley 573 which is located in/at/atop lifting module 571 and can be operatively connected to a generator. Pulley 573 can be a chainwheel or grip pulley or other pulley adapted to engage with the flexible connector and transmit a force. Inertial mass tether 574 is attached to lifting module 571 at attachment point 572 and to the inertial mass 581 at attachment point 579.

In this embodiment, inertial mass 581 can have net weight greater than that of restoring weight 578. In an equilibrium configuration, e.g. when the device is not being perturbed by waves, the tether 574 prevents the inertial mass from descending toward the seafloor.

When waves perturb the device, an upward acceleration of lifting module 571 and an associated tension in tether 579 can "launch" inertial mass 581 upward. From that point onward, if perturbation by waves is sufficiently vigorous, an active control of the generator's or power-take-off system's degree of resistance and/or the use of a brake (e.g. a disc brake) operationally connected to pulley 573 can keep inertial mass 581 oscillating relative to restoring weight 578 without tether 579 becoming taut, while power is extracted from that oscillation. In such a manner, inertial mass 581 can be "dynamically suspended."

Figure 50:
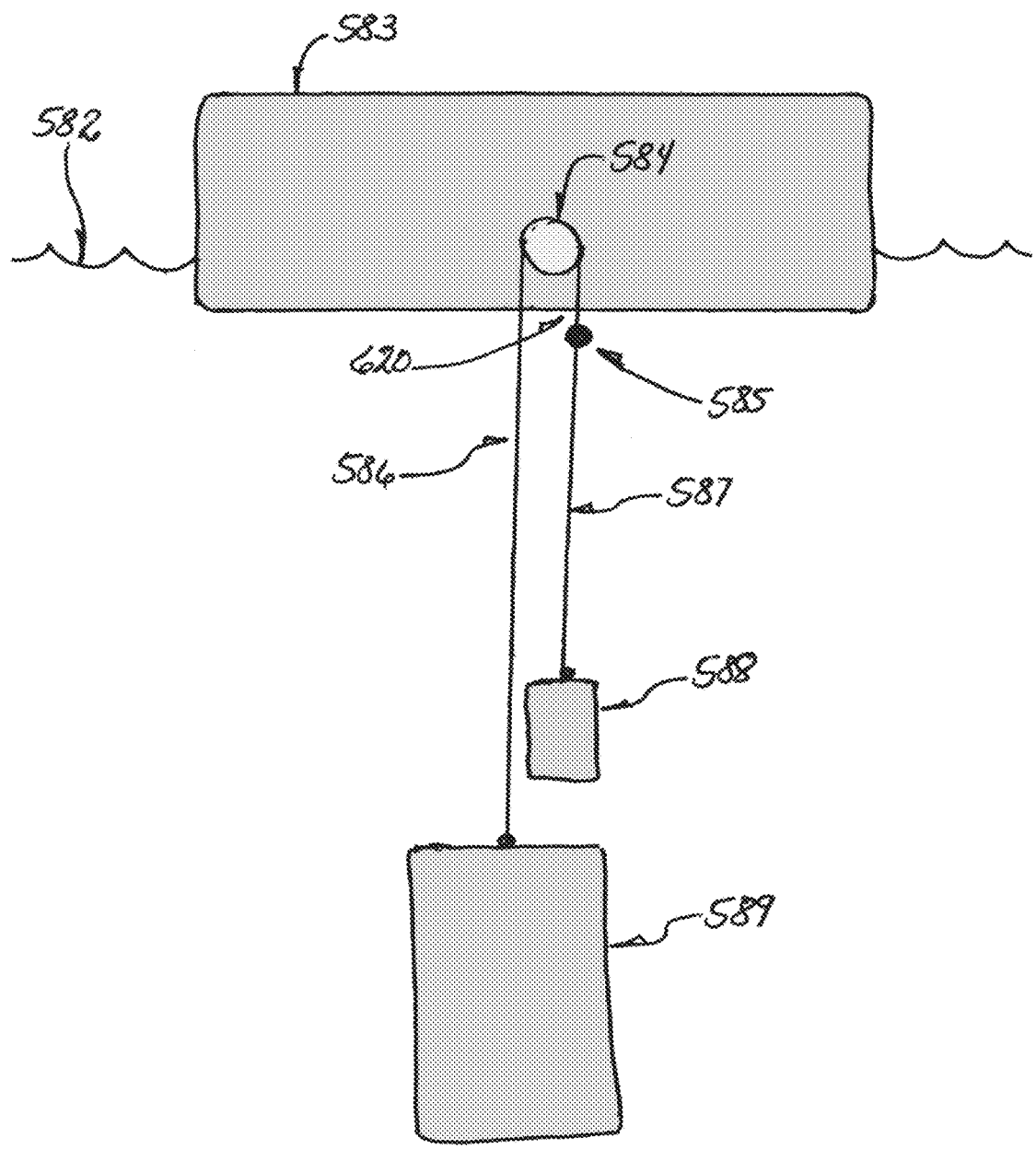
FIG. 50 is an elevated perspective view of an embodiment of the present invention.

FIG. 50 shows a cross sectional view of an embodiment of the current disclosure, namely an embodiment of an inertial wave energy converter of a simple type.

This embodiment is identical to that of FIG. 49 except that no inertial mass tether is used. Instead, stop 585 on power chain 586/587 serves the same purpose, i.e. limits the downward movement of the inertial mass 589. Stop 585 can abut and/or collide with lifting module 583 and prevent further translation of power chain 586/587 in the counter-clockwise direction i.e. stop power chain segment 587 from further translation in the upward direction.

Figure 51:
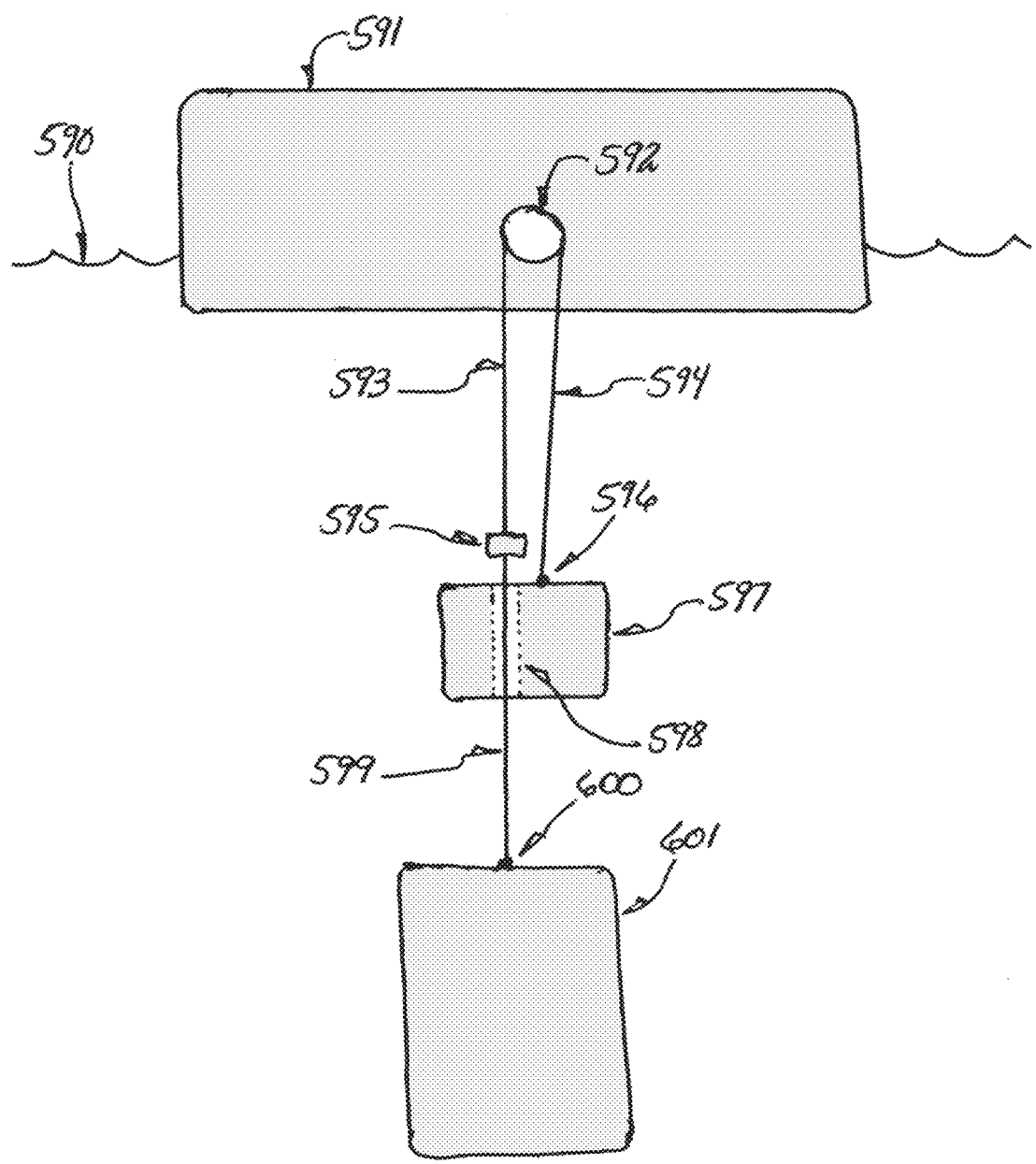
FIG. 51 is an elevated perspective view of an embodiment of the present invention.

FIG. 51 shows a cross sectional view of an embodiment of the current disclosure, namely an embodiment of an inertial wave energy converter of a simple type.

This embodiment is identical to that of FIG. 50 except that in lieu of stop 585, stop 595 is provided, and restoring weight 597 passes coaxially around power chain segment 599/593. I.e. power chain segment 599/593 passes through aperture 598 in restoring weight 597. Stop 595 is fixedly attached to power chain segment 599/593 so that when restoring weight 597 rises, it contacts stop 595 and cannot rise further. Consequently, inertial mass 601 is suspended and limited from further downward movement.

Figure 52:
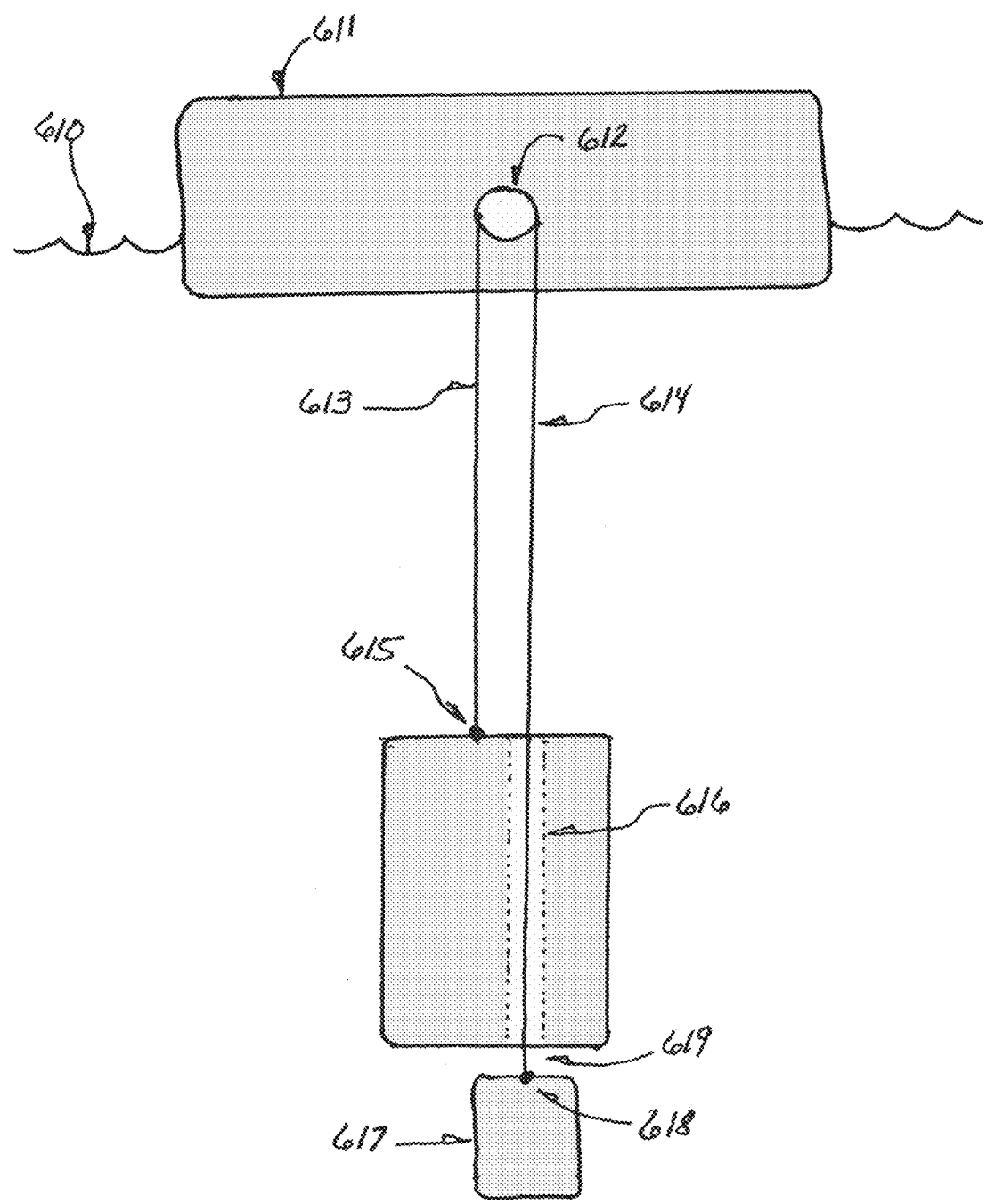
FIG. 52 is an elevated perspective view of an embodiment of the present invention.

FIG. 52 shows a cross sectional view of an embodiment of the current disclosure, namely an embodiment of an inertial wave energy converter of a simple type.

This embodiment is identical to that of FIG. 50 except that in lieu of stop 585, restoring weight 617 is positioned below the inertial mass and its segment 619 of power chain 613/614 passes through a vertical aperture 616 in the inertial mass. Consequently, when the inertial mass falls relative to the restoring weight, and/or the weight rises relative to the inertial mass, the two bodies come into contact and they are prevented/limited from moving further downward and upward respectively.

Figure 53:
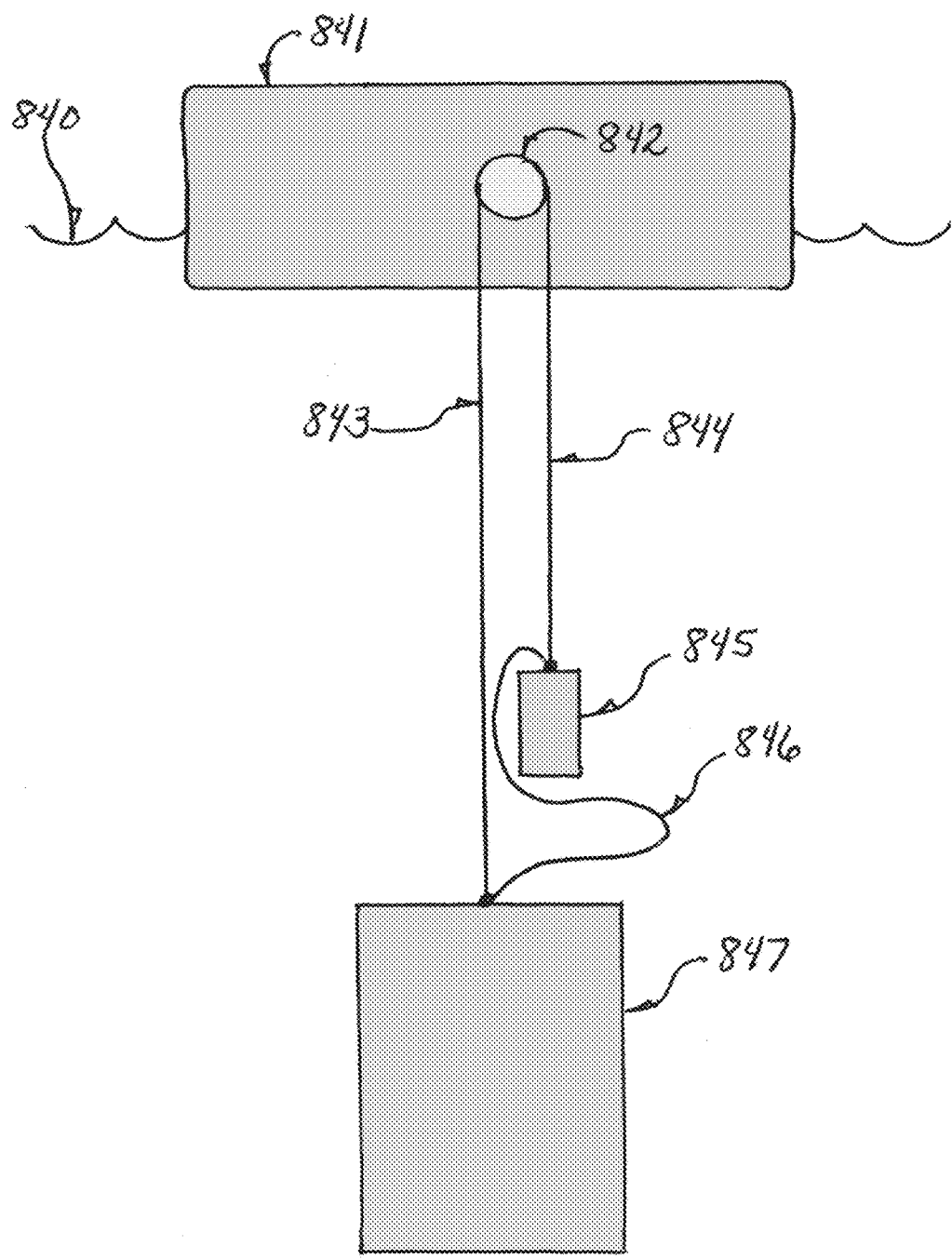
FIG. 53 is an elevated perspective view of an embodiment of the present invention.

FIG. 53 shows a cross sectional view of an embodiment of the current disclosure, namely an embodiment of an inertial wave energy converter of a simple type.

This embodiment is identical to that of FIG. 49 except that in this embodiment tether 846 restrains the downward movement of inertial mass 847, rather than tether 574. Tether 846 connects the inertial mass 847 to the restoring weight 845. When the inertial mass falls, tether 846 becomes taut and no further downward movement of the inertial mass is possible.

FIG. 54 shows a perspective view of an embodiment of the current disclosure. Converter 1-104 floats at, upon, and/or adjacent to a surface 1-100 of a body of water having waves. The converter includes a flotation module 1-105, an inertial mass 1-140, a restoring weight 1-160, and a depending connector 1-150. The inertial mass 1-140 and the restoring weight 1-160 depend from the flotation module 1-105 by the depending connector 1-150 and are suspended thereby in the body of water, i.e. beneath a surface 1-100 of the body of water. Inertial mass 1-140 and restoring weight 1-160 are fully submerged. Flotation module 1-105 is buoyantly at the surface, i.e. is partly below and partly above a surface of the body of water. The figure shows both above-surface and below-surface components of the converter, as do most perspective views in this disclosure.

Inertial mass 1-140 is substantially spherical and has a hollow, approximately spherical interior void containing and/or at least partially enclosing or confining a significant volume of seawater. For approximate scale (merely illustrative), inertial mass 1-140 can have a radius of approximately 10 meters and a hollow interior volume of approximately 4000 cubic meters.

Other embodiments of the current disclosure which are similar to the embodiment illustrated in FIG. 54 incorporate, utilize, and/or include, inertial masses (similar to 1-140) that are characterized by, and/or possess, other shapes, and are substantially non-spherical. One other embodiment includes an inertial mass that is substantially cylindrical. Another includes an inertial mass that is substantially cubical. And, the scope of the current disclosure includes embodiments possessing inertial masses of any shape, as well as including multiple linked inertial masses.

In the embodiment shown, the walls of inertial mass 1-140 almost entirely enclose an approximately spherical volume of water 1-141. The walls of inertial mass 1-140 are thin, largely rigid, and largely impermeable. The walls of inertial mass 1-140 can be made of plastic, aluminum, steel, or any other material having the appropriate rigidity and impermeability. Inertial mass 1-140 can form a rigid "shell" substantially enclosing a large mass of water 1-141. The mass of such enclosed water can be "added to" the mass of inertial mass 1-140 for the purposes of deriving inertia under acceleration, allowing one to speak of the inertial mass's "effective mass" and "effective inertia," i.e. its mass and inertia taking into account all, or any portion of, the mass of the water effectively confined or trapped within it.

Throughout this disclosure, depending on context, the term "inertial mass" can refer to an inertial mass taking into account any enclosed and/or confined water, or it can refer to an inertial mass without taking into account any enclosed and/or confined water. For example, depending on context, the phrase "the mass of inertial mass X" can refer to the mass of inertial mass X excluding the mass of any water enclosed and/or contained in inertial mass X, or it can refer to the mass of inertial mass X including the mass of any water enclosed and/or contained in inertial mass X (i.e., its "effective mass"). The context of such a reference will clarify the context-specific meaning of the reference. In the absence of a sufficiently clarifying context, such a reference should be interpreted to include any water trapped within inertial mass X. However, note that "mass" and "weight" are different concepts, particularly "wet weight," which refers to the net weight in water and is determined principally by the weight of the structure, not any contained water.

An aperture or opening 1-141 at a top portion of inertial mass 1-140 can allow depending connector 1-150 to pass through a top portion of the inertial mass. Depending connector 1-150 makes a connection to the inertial mass at a lower interior portion thereof, e.g. 1-151. By not situating the depending connector's point of connection to the inertial mass solely at an outer periphery of the inertial mass, resonant oscillating rotations (rocking) of the inertial mass can be reduced or eliminated. In other embodiments, the depending connector can connect to the inertial mass near a center of mass or a center of volume of the inertial mass, or at other sites on the inertial mass that analysis may show to be advantageous.

Inertial mass 1-140 has, contains, and/or is connected to an inertial mass weighted portion 1-145. The purpose of the inertial mass weighted portion 1-145 is to provide the inertial mass with sufficiently positive net weight, i.e. sufficiently negative buoyancy, so as to cause it to accelerate at least somewhat rapidly downward under gravity after being lifted, raised, and/or drawn upward. An inertial mass weighted portion can be the walls of the inertial mass, in which case such walls can be relatively thick and/or massive. Or, an inertial mass weighted portion can be a discrete weight depending from the inertial mass, e.g. by a flexible connector. Or, as shown here, the inertial mass weighted portion 1-145 can be a quasi-discrete weight integrated into and/or embedded within the inertial mass and/or rigidly attached thereto, e.g. at a bottom portion of the inertial mass. Other similar means of providing an inertial mass weighted portion are also covered by this disclosure. The inertial mass weighted portion can be made of concrete, iron, steel, lead, or any other material or combination of materials having an average density greater than water and a sufficiently low specific cost. For approximate scale (merely illustrative), inertial mass weighted portion 1-145 can have a density of 2400 kilograms per cubic meter and a mass of 180,000 kilograms.

Flotation module 1-105 floats at a surface 1-100 of the body of water and has a waterline 1-110 whose vertical position 1-110 on flotation module 1-105 can change at least transiently. For instance, the vertical position of waterline 1-110 on the flotation module 1-105 might at least transiently rise or fall due to the passing of waves, or due to a change in a downward force on the flotation module, at least until an equilibrium water line is re-established.

Other embodiments of the current disclosure which are similar to the embodiment illustrated in FIG. 1 incorporate, utilize, and/or include, flotation modules that have square horizontal cross sections that are approximately circular, hexagonal, and other shapes, unlike the embodiment illustrated in FIG. 1.

Flotation module 1-105 is buoyant and is preferably broad and "flat," allowing it to experience a relatively large increase in buoyant force in response to a relatively small change in displacement, i.e. in response to a relatively small change in the average vertical position of its waterline 1-110. For approximate scale (merely illustrative), flotation module 1-105 can have a height of 2 meters and can have a square horizontal cross section having lateral side lengths of 15 meters. Flotation module 1-105 can have an average density of 150 kilograms per cubic meter.

Flotation module 1-105 has a central void or aperture 1-115 communicating between its top and bottom portions. A top portion of flotation module 1-105 bears and/or supports a power-take-off assembly including a bearing-and-generator housing 1-120, a bearing housing 1-121, a shaft 1-122, and a pulley/capstan 1-125. Bearing-and-generator housing 1-120 and bearing housing 1-121 straddle central aperture 1-115, and each contains a bearing assembly allowing shaft 1-122 to be rotatably supported above central aperture 1-115. Pulley/capstan 1-125 is operatively connected to shaft 1-122 so that the rotation of pulley/capstan 1-125 about a horizontal, longitudinal axis thereof is associated with shaft 1-122 rotating about the same axis. Bearing-and-generator housing 1-120 contains an electrical generator operatively connected to shaft 1-122. Optionally, a gearbox or other similar mechanism can be provided in the power-transmission pathway from the pulley/capstan to the generator.

Bearing-and-generator housing 1-120 can contain a brake, e.g. a disc brake or a magnetic particle brake. The brake can provide the ability to apply a stopping force to the rotation of the shaft 1-122. In different circumstances, it can be useful to use the brake in addition to, or in lieu of, the generator, to apply a stopping force (i.e. countertorque) to the shaft. The brake's control system can be integrated into or communicate with that of the generator and other power-take-off components. By using both the brake and the generator, a control system having at its disposal both a brake and a generator can transmit to the inertial mass greater amounts of buoyant force (i.e. buoyant force acting upon the flotation module) than a control system having at its disposal a generator alone.

A first end of depending connector 1-150 attaches to inertial mass 1-140 at 1-151 and ascends through aperture 1-115 and is operatively connected to pulley/capstan 1-125 at 1-152. Depending connector 1-150 can be made of steel cable, metal chain, synthetic rope, or any other flexible material with sufficient tensile strength. Depending connector 1-150 can have rigid segments or sections. For approximate scale (merely illustrative), depending connector 1-150 can have a total length of 200 meters. Depending connector 1-150 can be wound around pulley/capstan 1-125 several times, i.e. its contact with the circumference of the pulley/capstan can define more than 2 times pi radians of arc. Winding the depending connector several times around the pulley/capstan can increase the friction between the depending connector and the pulley/capstan so as to provide more effective transmission of force, e.g. in accordance with the capstan equation. Another end and/or part of depending connector 1-150 can then descend through aperture 1-115 and be connected at 1-161 to restoring weight 1-160. One end of depending connector 1-150 is connected to inertial mass 1-140 and the other end is connected to restoring weight 1-160. An intermediate portion of depending connector 1-150 is operatively connected to pulley/capstan 1-125, e.g. by several windings therearound.

Restoring weight 1-160 can be negatively buoyant, i.e. can have an average density greater than that of water. It can be made of concrete, steel, iron, lead, stone, or any other material or combination of materials with a favorable specific cost (i.e. cost per unit mass or volume). For approximate scale (merely illustrative), restoring weight 1-160 can have a density of 2,400 kilograms per cubic meter and a mass of 8,000 kilograms. Restoring weight 1-160 can have a small net weight relative to the inertial mass weighted portion 1-145, so that it has only enough net weight to "rewind" the depending connector 1-150, or it can have a "large" net weight approaching or even exceeding that of the inertial mass weighted portion 1-145, so that it stores appreciable gravitational potential energy when lifted which can be "recaptured" as it descends by a bi-directional power-take-off system.

Note that "net weight" means gravitational weight net of buoyant force.

Pulley/capstan 1-125 can have a spiral groove or grooves around its exterior, and/or other circumferential guiding projections, disposed and/or used so as to guide and constrain the winding of depending connector 1-150. Here, a single long spiral groove is shown running from one end of the pulley/capstan (near 1-120) to the other (near 1-121). As pulley/capstan 1-125 rotates, the winding therearound of depending connector 1-150 is guided and limited by the spiral groove, so that adjacent winds of the depending connector do not touch each other. This has the advantage of reducing the likelihood of tangling and diving and potentially lengthening the life of the depending connector.

The relative height of the groove walls disposed along the length of the pulley/capstan might diminish toward either end of the pulley/capstan. This might allow the connector 1-150 to slip across groove walls if the extent of the connector's movement would otherwise tend to drive it one or the other end of the pulley/capstan and thereafter create a blockage (i.e. in which the connector could not move any further away from the pulley/capstan's center).

The power-take-off assembly can be configured with a control system and/or a passive or active clutch so that the degree of countertorque (i.e. resistance to shaft rotation, i.e. stopping force) applied to the shaft by the generator or power-take-off assembly can be different at different times. For instance, the power-take-off system can be configured to provide a countertorque whose magnitude is approximately proportional to the speed of shaft rotation (or the absolute value thereof). And/or, the power-take-off system can be configured to provide a countertorque whose magnitude is approximately proportional to the square of the speed of shaft rotation. And/or, the power-take-off system can be configured to provide zero countertorque when the distance between the inertial mass and flotation module is decreasing and a nonzero countertorque when the distance between the inertial mass and flotation module is increasing. And so on. A wide variety of control strategies is possible. And, any or all of such strategies can be implemented, within the power-take-off system of the same embodiment, in response to the detection of specific wave conditions, atmospheric conditions, farm electrical-grid conditions, etc.

Countertorque can be controlled using differential excitement of field coils in the generator, i.e. a circuit that sets the degree of electrical excitement in said field coils at different levels at different times, subject to a control system. And/or, countertorque can be controlled by varying the load felt by the generator, e.g. by providing power electronics and a circuit implementing field-oriented control or direct torque control in the circuit of which the generator is a part. And/or, countertorque can be controlled by providing an electromagnetic and/or mechanical clutch that transmits different amounts of shaft 1-122's torque to the generator at different times, subject to a control system. Other means of providing controllable/variable countertorque are possible.

The approximate dynamics of the embodiment can be described as follows:

When the converter is floating in water having waves, the water level adjacent to converter will periodically be at local minimum, i.e. the flotation module will periodically be in the trough of a passing wave. When from such a local minimum the water level begins to rise, e.g. due to the receding of the wave trough and/or the approach of a wave crest, the waterline 1-110 on the flotation module can rise, the displacement of the flotation module can increase, and the buoyant force acting on the flotation module can increase. This can cause the flotation module to accelerate upward and/or rise. However, the inertial mass 1-140, which is operatively connected to the flotation module by the depending connector 1-150, has significant effective inertia and will resist being accelerated upward by a force transmitted to it via the depending connector. The inertial mass 1-140's resistance to rising can be all the greater, in fact, because not only does the inertial mass have great effective inertia (and hence an inherent resistance to being drawn upward), but, when the converter is in a wave trough, the inertial mass can furthermore have a downward momentum developed during the converter's earlier descent into the wave trough under gravity. Any such downward momentum must be halted or exhausted before the inertial mass can be drawn upward. Owing to the inertial mass's resistance to rising, the distance between the flotation module and the inertial mass can increase as the flotation module rises. A significant tension can develop in at least the portion of the depending connector 1-150 connecting the flotation module to the inertial mass. This tension can create a net torque in pulley/capstan 1-125, causing it to turn in a first direction, and enabling the generator shaft to turn and the generator to generate electricity. Because of countertorque or resistance provided by the generator, the shaft does not turn freely. Some of the buoyant force acting on the flotation module will therefore be transmitted to the inertial mass via the depending connector. Accordingly, the inertial mass can develop an upward acceleration, albeit a lesser one than that developed by the flotation module or restoring weight. Once any downward momentum previously possessed by the inertial mass has been exhausted, it can furthermore develop an upward momentum.

Once the flotation module nears a wave crest, its upward movement can slow, i.e. it can develop a downward acceleration (e.g. by travelling upward at an ever slowing rate). Because the inertial mass can now have developed an upward momentum owing to an upward force transmitted to it by the depending connector, the distance between the flotation module and the inertial mass can begin to decrease. Accordingly, in the absence of the restoring weight or some other mechanism for taking up "slack" in the depending connector between the inertial mass and the flotation module, there would be a possibility for "slack" to develop in said connector. The restoring weight can "take up" this slack by causing the pulley/capstan to rotate in a second direction opposite to the first direction, essentially "rewinding" the pulley/capstan in preparation for another mechanical cycle.

Using different language for clarity/redundancy, the approximate dynamics of the converter can also be described as follows:

When waterline 1-110 rises relative to the flotation module 1-105 (e.g. because of an approaching wave crest), the displacement of flotation module 1-105 can increase and the buoyant force on flotation module 1-105 can increase. Flotation module 1-105 can therefore rise. The rising flotation module and/or the upward buoyant force thereupon can impart an upward force to the depending connector, i.e. to both segment 1-150a thereof and segment 1-150b thereof. Inertial mass 1-140 has a relatively large effective mass and can tend to resist acceleration due to this upward force, especially as it may have previously developed a downward momentum due to phase dynamics and/or the converter's descent into the most recent wave trough. Restoring weight 1-160, by contrast, has a relatively small mass and will tend to resist acceleration to lesser degree. Consequently, restoring weight 1-160 can be accelerated upward more rapidly and/or easily than inertial mass 1-140 and a net torque can be developed in pulley/capstan 1-125, causing the pulley/capstan to rotate in a first direction, turning shaft 1-122, and enabling the generator to generate electricity. Depending connector segment 1-150b can shorten and depending connector segment 1-150a can lengthen. The distance between restoring weight 1-160 and the flotation module 1-105 can decrease, while the distance between the inertial mass 1-140 and the flotation module 1-105 can increase. Depending on the amount of countertorque imparted to the pulley/capstan 1-125 by the generator, the inertial mass 1-140 can also in due course be accelerated upward and can eventually develop a significant upward momentum (even if, e.g. due to its relatively large mass, only a relatively small upward velocity).

When the crest of a wave is receding, the dynamics can reverse. The waterline 1-110 can fall relative to the flotation module 1-105. Consequently the flotation module can experience a decrease in buoyant force and can fall under gravity. The tension in depending connector 1-150 can lessen, and inertial mass 1-140 and restoring weight 1-160 can experience a net downward acceleration under gravity, i.e. their upward velocity can decrease and/or they can develop a downward velocity. Because inertial mass 1-140 has great effective mass, it can experience a slower and/or less responsive change in its vertical velocity relative to the change in vertical acceleration of the restoring weight 1-160. The restoring weight 1-160 can experience a faster and/or more responsive change in its vertical velocity. Hence, the restoring weight can take up or limit the formation of "slack" in the depending connector and, assuming the countertorque or resistance provided by the generator is of a sufficiently small magnitude, the restoring weight's descent can rotate the pulley/capstan 1-125 in a second direction, e.g. a direction opposite to the first direction in which it turned during the flotation module's earlier ascent. Thus, the restoring weight can "rewind" the depending connector and allow a mechanical cycle to be completed, returning the device to a starting configuration.

All the embodiments disclosed throughout this disclosure have similar dynamics to those described above. The dynamics will not necessarily be repeated for each figure and it is to be understood that the interested reader should refer back to the foregoing description.

Figure 55:
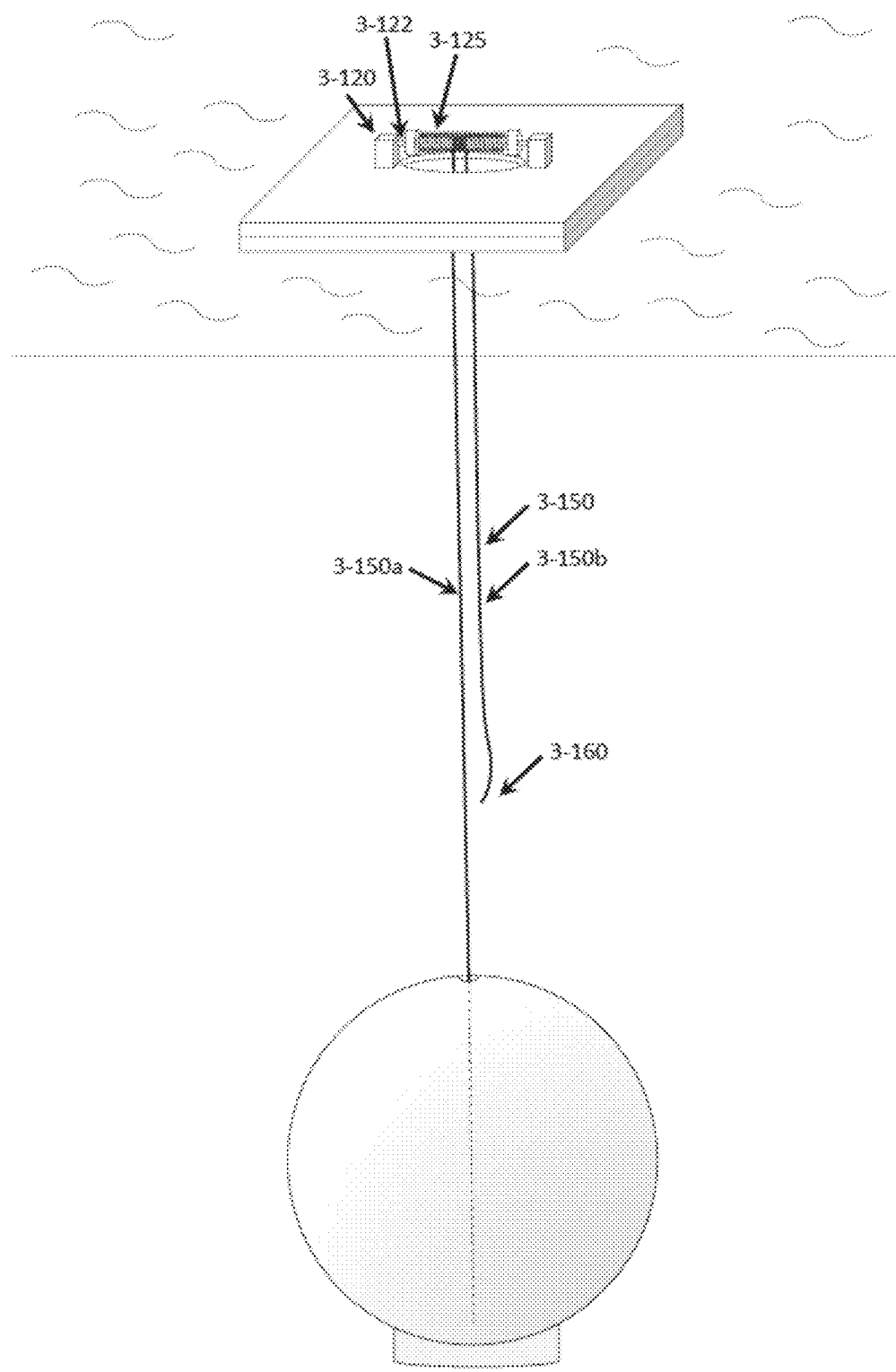
FIG. 55 is an elevated perspective view of an embodiment of the present invention.

FIG. 55 shows a perspective view of an embodiment of the current disclosure. In most respects this embodiment is identical to that of FIG. 54. There are two major differences. First, there is no restoring weight at 3-160. Instead, the depending connector 3-150, in particular depending connector segment 3-150b, terminates at a "free" or "dangling" end 3-160. Second, in this embodiment, because there is no restoring weight to "rewind" or "reset" pulley/capstan 3-125, the "rewinding" or "resetting" of the pulley/capstan must be accomplished by some other means, i.e. some other means of applying a torque to the pulley/capstan during the "downstroke" or the period when the flotation module and the inertial mass are moving close together. To this end, in the embodiment of FIG. 3, a motor is provided in housing 3-120 that applies an appropriate torque to shaft 3-122 and to pulley/capstan 3-125, allowing it to rewind the pulley/capstan as appropriate. This motor can apply a constant torque, or can be provided with a control system that applies variable torque. The motor can be the generator, i.e. the generator can function as both a motor and a generator. Or, the motor can be separate from the generator.

It is to be understood that many disclosed embodiments herein that contain a restoring weight can be modified to omit said restoring weight, instead providing a motor, or providing a generator driven as a motor, in an analogous manner to the embodiment of this FIG. 55. Variants with and without a restoring weight each have advantages and disadvantages.

Depending cable 3-150 may contain a "stop" and/or other appendage, inclusion, and/or structural feature, that will prevent the free end 3-160 of the cable from passing through the aperture in the flotation module, and/or from passing through, over, and/or past, the pulley/capstan 3-125.

Figure 56:
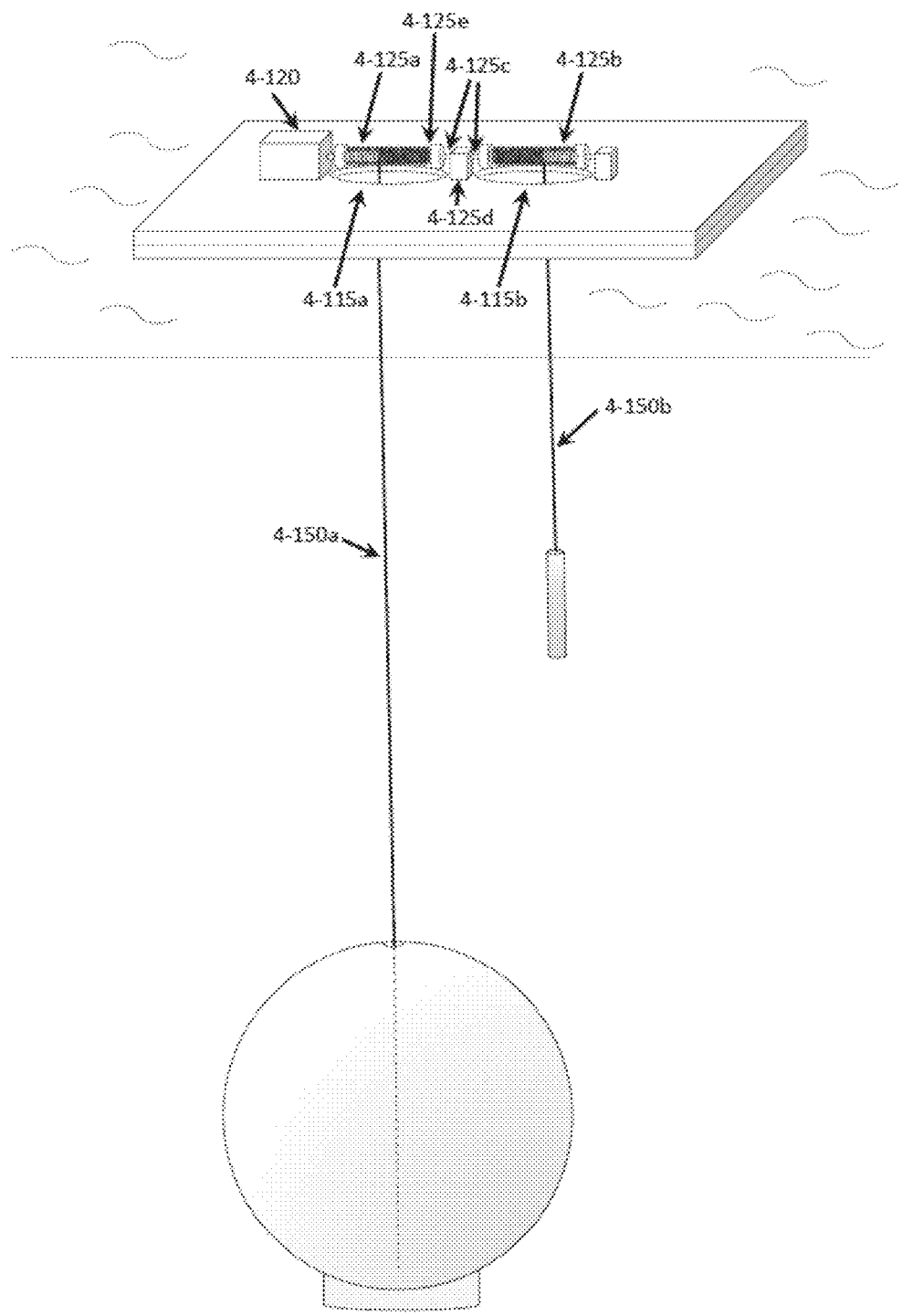
FIG. 56 is an elevated perspective view of an embodiment of the present invention.

FIG. 56 shows a perspective view of an embodiment of the current disclosure. In most respects this embodiment is identical to that of FIG. 1. There are four major differences.

First, there are two pulleys/capstans: pulley/capstan 4-125a and pulley/capstan 4-125b. Pulley/capstan 4-125a is operatively connected to pulley/capstan 4-125b by an integral/single shaft 4-125c that passes through bearing housing 4-125d, which contains a bearing that bears said shaft 4-125c. Because the two pulleys/capstans are operatively connected and/or integrated in this manner, they rotate at the same rate.

Second, there are now two depending connectors: depending connector 4-150a and depending connector 4-150b. There are also two apertures in the flotation module: aperture 4-115a and aperture 4-115b. (In another embodiment, bearing housing 4-125d is supported on a beam, strut, truss, and/or other projection, that spans the embodiment's single aperture.) The pulleys/capstans are configured so that when depending connector 4-150a unwinds from pulley/capstan 4-125a, depending connector 4-150b winds up on pulley/capstan 4-125b, and vice versa. In other words, a rotation of shaft 4-125c in a first direction is associated with one of the depending connectors winding up on its respective pulley/capstan and the other unwinding on its respective pulley/capstan. A rotation of the shaft a second, e.g. opposite, direction is associated with the reverse. The depending connectors 4-150a and 4-150b descend through apertures 4-115a and 4-115b respectively.

Third, one end of each of the depending connectors 4-150a and 4-150b is fixedly attached to its respective pulley/capstan. E.g. one end of depending connector 4-150a is attached to pulley/capstan 4-125a at 4-125e. Accordingly, the depending connectors do not rely solely on friction for an operative connection with their respective pulleys/capstans.

Fourth, generator housing 4-120 contains a flywheel that can store kinetic energy. Said flywheel is operatively positioned in the force-transmission pathway from the pulleys/capstans to the generator, smoothing the delivery of power to the generator.

Figure 57:
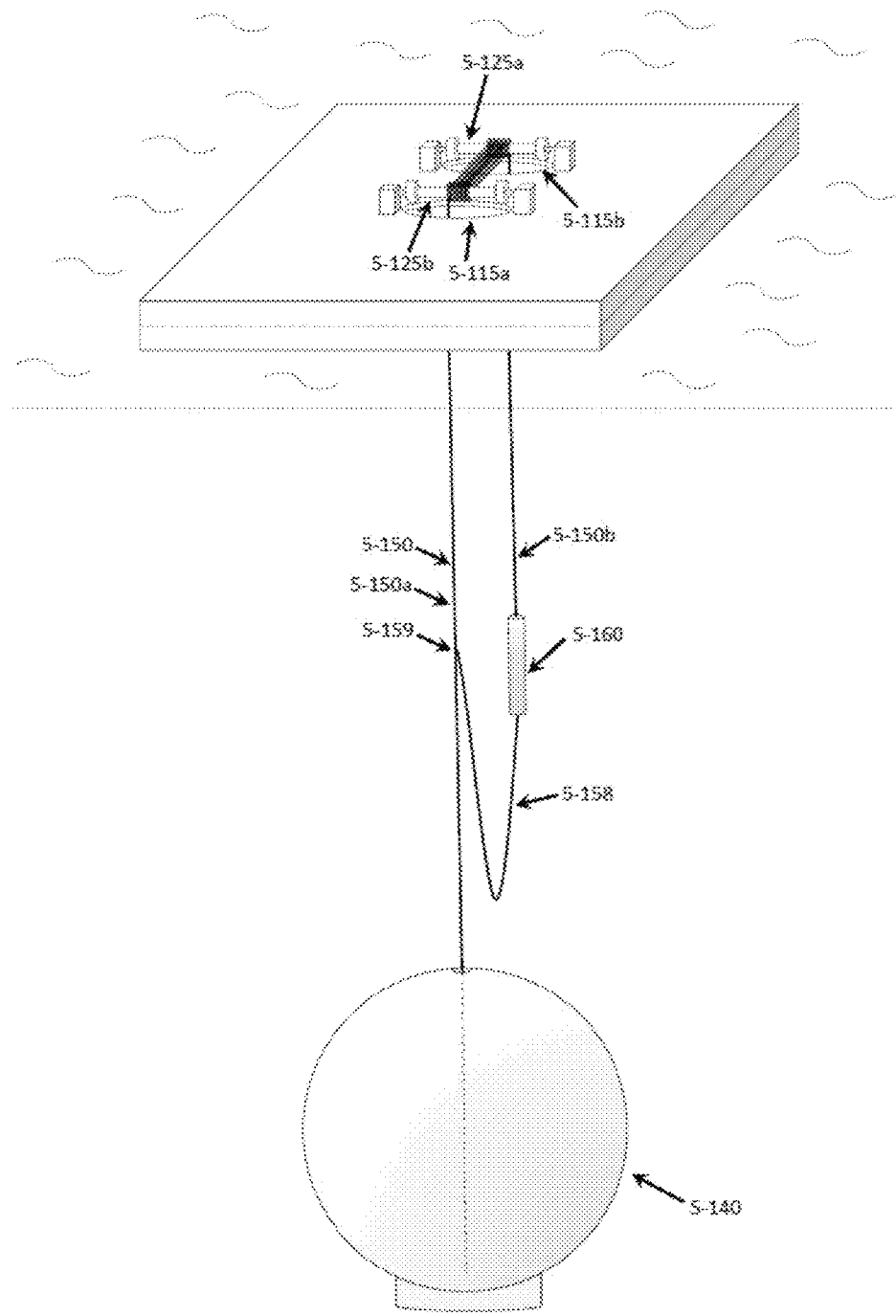
FIG. 57 is an elevated perspective view of an embodiment of the present invention.

FIG. 57 shows a perspective view of an embodiment of the current disclosure. In most respects this embodiment is identical to that of FIG. 54. There are two major differences.

First, in this embodiment, restoring weight 5-160 is connected by connector linkage 5-158 to depending connector segment 5-150a. Connector linkage 5-158 connects to depending connector segment 5-150a at connection point 5-159. The addition of connector linkage 5-158 thus creates a "closed loop" consisting in part of depending connector 5-150 and in part of connector linkage 5-158. This "closed loop" enables the device to passively enter an "inactive mode" as displayed in FIG. 6 in the event that inertial mass 5-140 descends beyond its nominal range. In this "inactive mode," the inertial mass cannot descend any further.

Second, in this embodiment there are two pulleys/capstans 5-125a and 5-125b arranged so as to be roughly parallel to one another, i.e. the longitudinal axes of the two pulleys/capstans are roughly parallel. In the illustrated embodiment, there are two apertures: 5-115a and 5-115b. (In another embodiment, there is only a single aperture.)

Depending connector 5-150 (in particular, segment 5-150a) ascends through aperture 5-115a, winds around an arc of pulley/capstan 5-125a, winds around an arc of pulley/capstan 5-125b, winds around another arc of pulley/capstan 5-125a, winds around another arc of pulley/capstan 5-125b, and so on, before descending (as segment 5-150b) to restoring weight 5-160. By providing that the depending connector can wrap around both pulleys/capstans, a potentially simpler system of grooves can be used on each capstan (e.g. simple non-spiral circumferential grooves).

Figure 58:
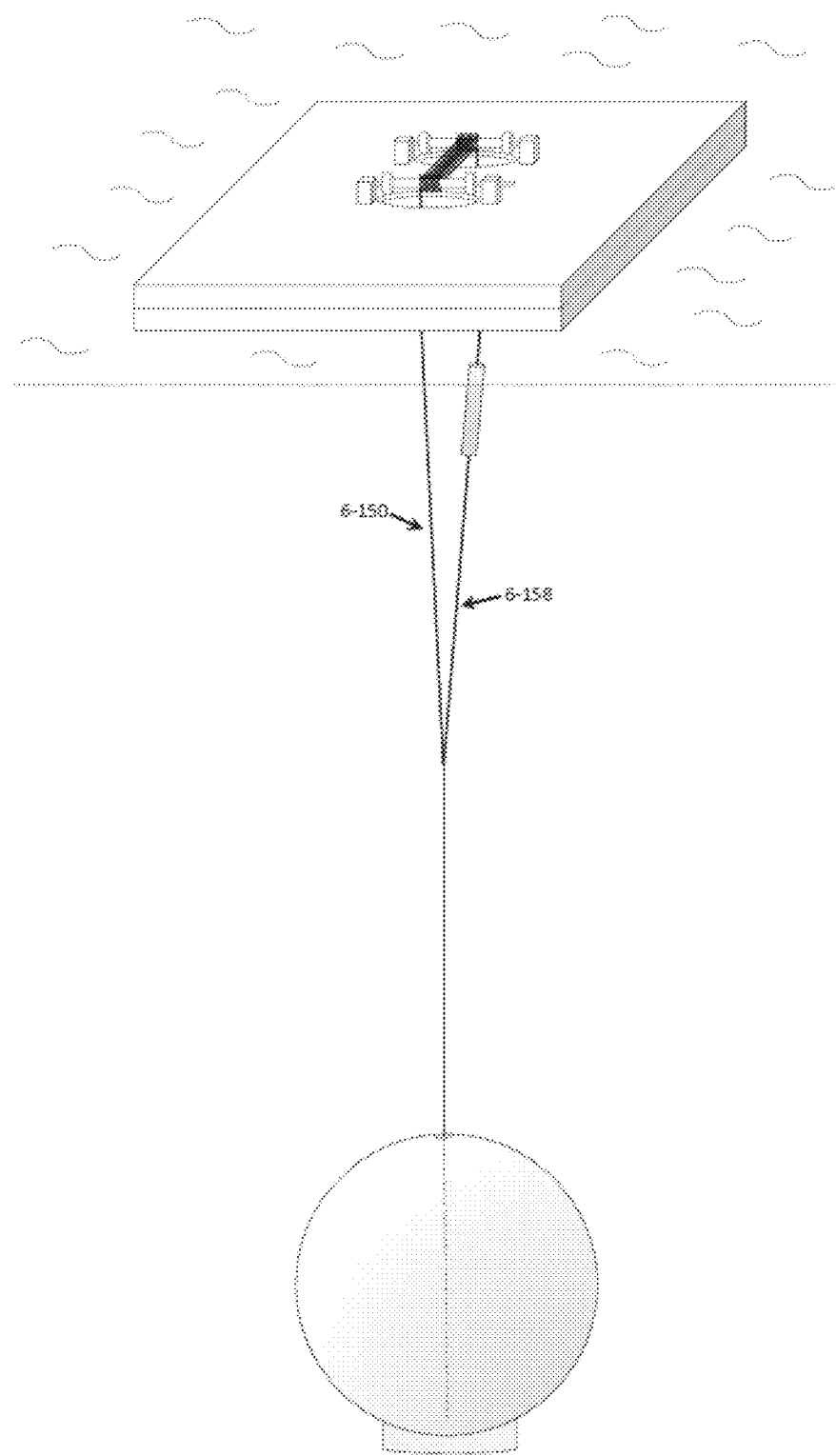
FIG. 58 is an elevated perspective view of an embodiment of the present invention.

FIG. 58 shows a perspective view of the same embodiment shown in FIG. 57.

In this view, the embodiment has entered an "inactive mode" wherein the inertial mass has descended to a maximum separation from the flotation module. The "closed loop" formed by the depending connector 6-150 and the connector linkage 6-158 is, at least at times, fully taut.

Figure 59:
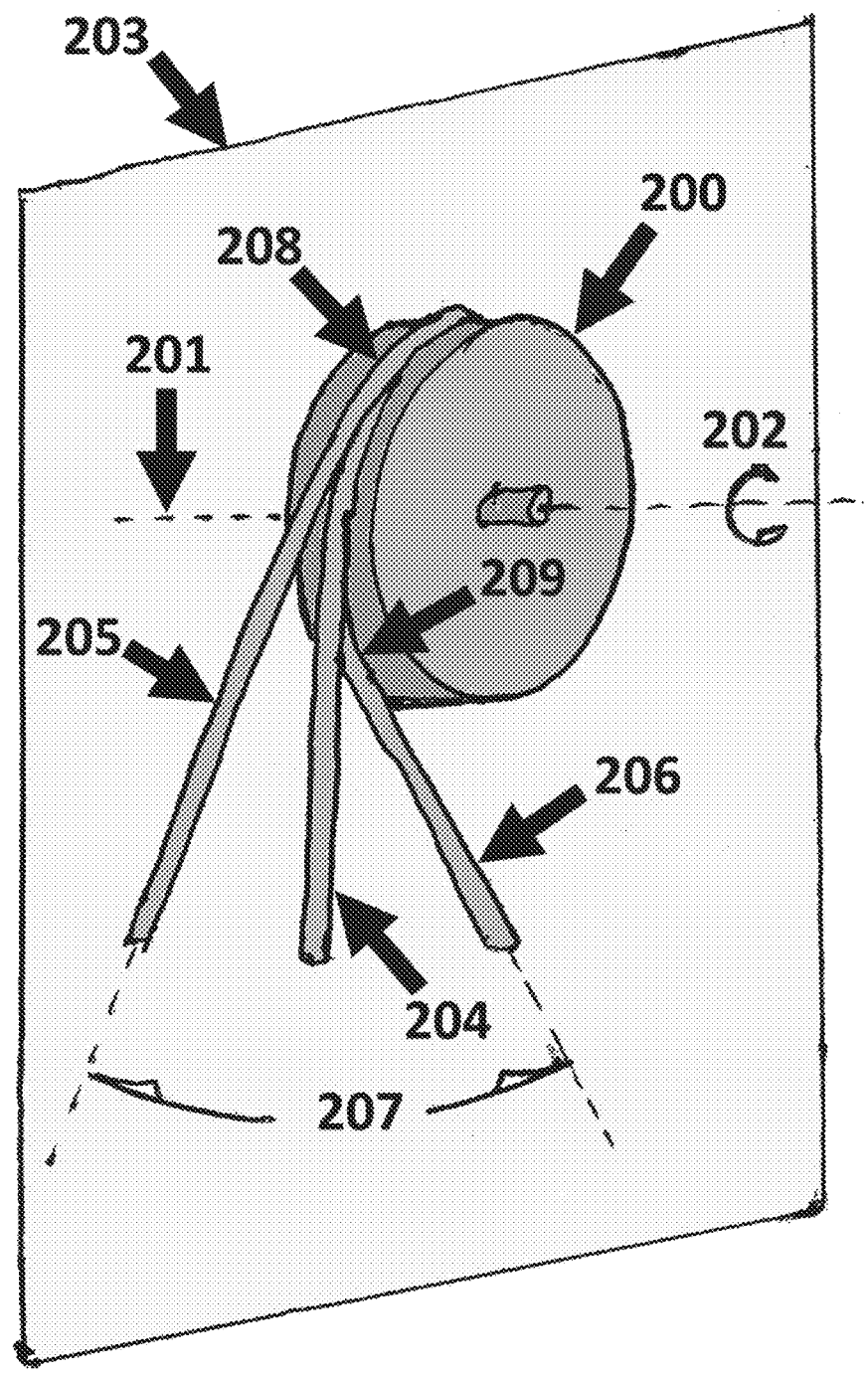
FIG. 59 is an elevated perspective view of a pulley illustrating a cable engaging the pulley.

FIG. 59 shows a perspective view of a pulley 200 that illustrates the pulling of the pulley's associated cable 208 from a range 207 of directions confined to the pulley's plane of rotation 203 turn 202 the pulley, and potentially impart rotational kinetic energy and/or torque to it, while minimizing damage to either the pulley or the cable.

Figure 60:
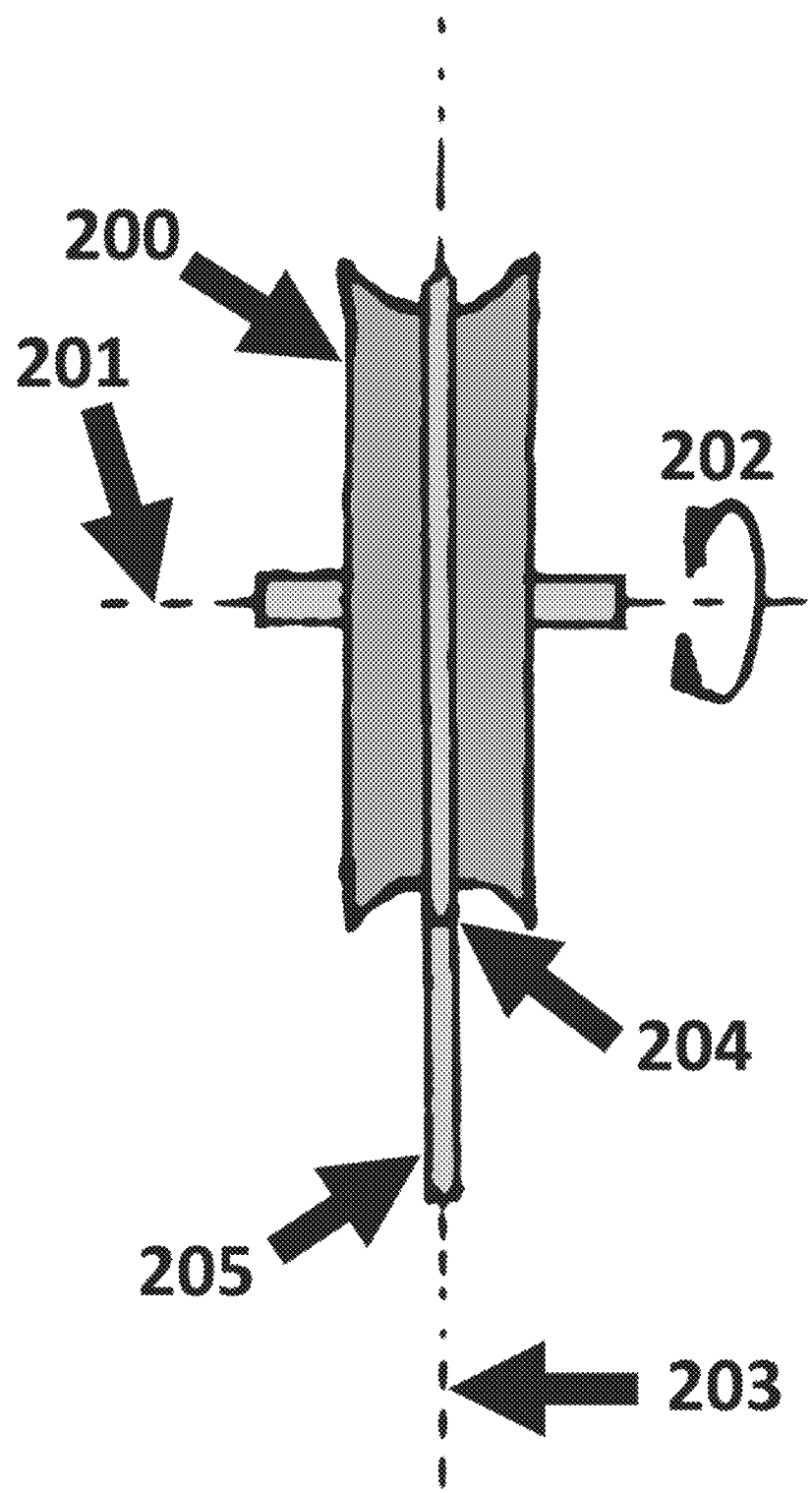
FIG. 60 is an elevated front view of the pulley in FIG. 59.

FIG. 60 shows a top-down view of the same pulley illustrated in FIG. 59. So long as the cable 204 and/or 205 is pulled from a direction that lies within the pulley's plane of rotation 203, damage to the pulley and the cable are minimized.

Figure 61:
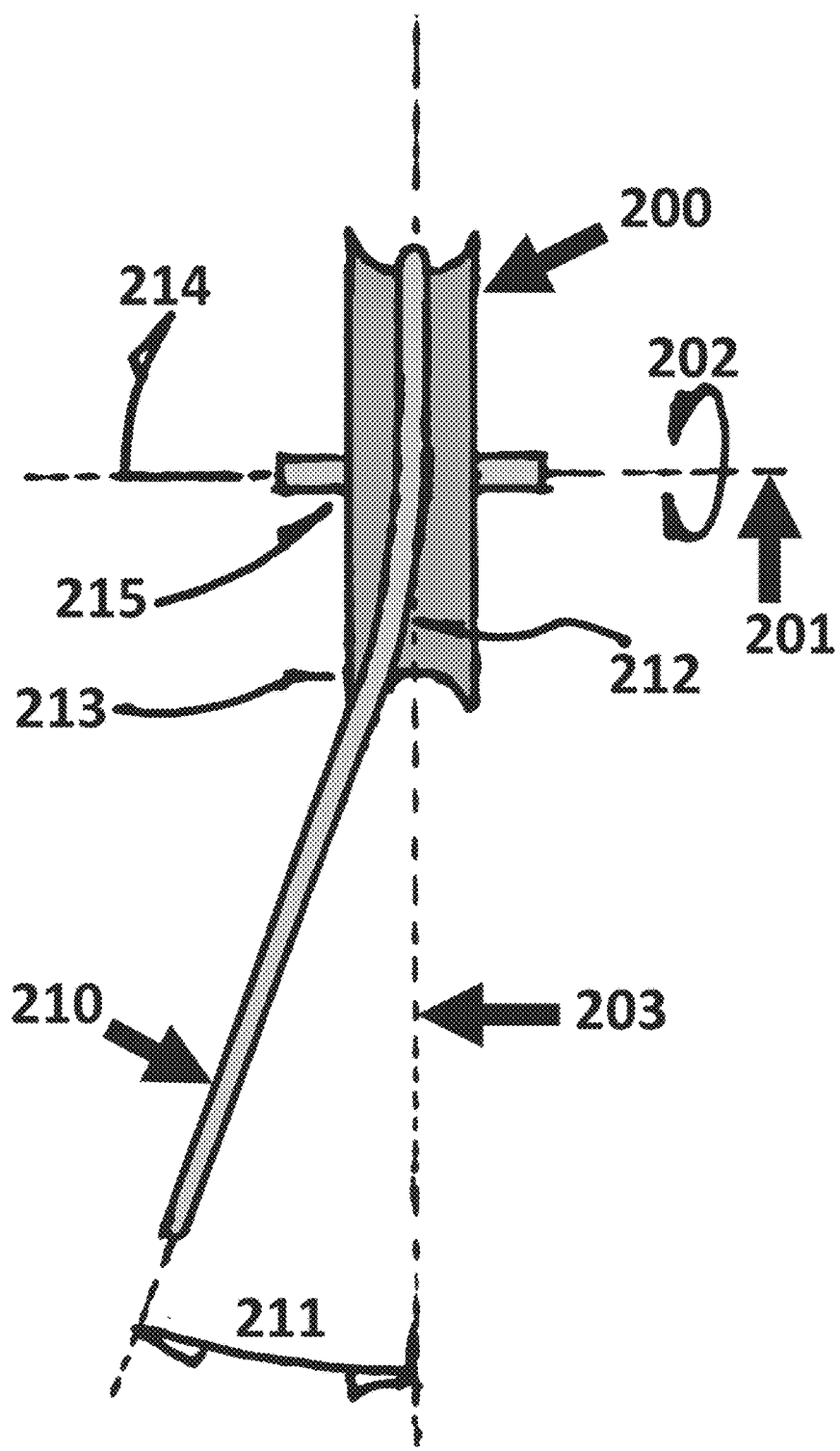
FIG. 61 is an elevated front view of the pulley in FIG. 59 in which the cable is engaging the pulley at an angle outside the plane of the pulley's rotation.

FIG. 61 shows a top-down view of the same pulley illustrated in FIGS. 59 and 60. However, in this illustration, the pulley's respective cable 210 is being pulled from a direction that is outside (e.g. by an angle of 211) the pulley's plane of rotation 203. The cable is pulled out of 212, and/or away from, the center of the pulley. This may cause the cable to be abraded (e.g. at 213) as it is pulled across the lateral edge of the pulley. The resulting torque 214 between the pulley and its shaft and/or supporting bearings may also cause damage and/or fatigue.

Figure 62:
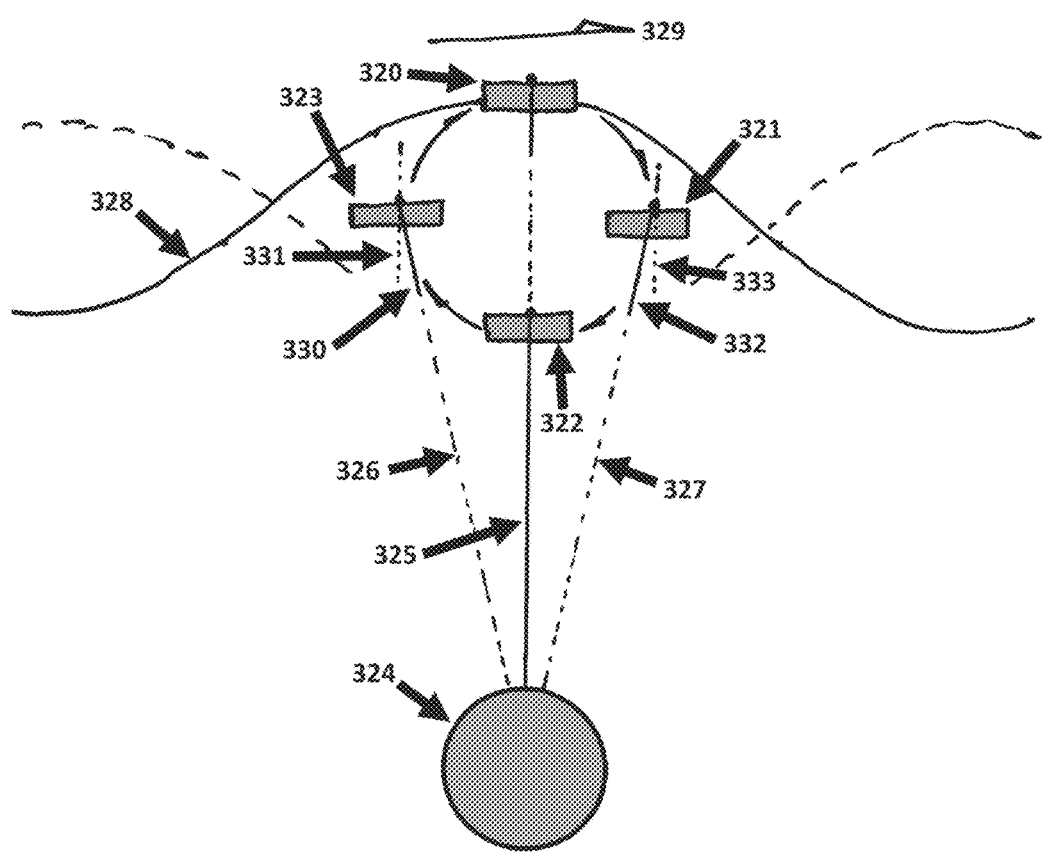
FIGS. 62-67 are diagrams illustrating the change in the orientation of a cable connecting a buoy to an inertial mass as the buoy moves in response to passing waves.

FIG. 62 shows a side cross-sectional illustration of a buoy 320 connected to a submerged inertial mass 324 by a cable 325, that is driven along a circular path by waves 328 passing through the surface 328 of a body of water on which the buoy floats. Note that the angular orientation of the cable is not coaxial with a vertical normal axis passing through the center of the buoy.

The axis passing through the center of the buoy and normal to its horizontal plane (e.g. to its upper surface) will be referred to as the buoy's "inertial mass alignment axis." Note that the buoy's inertial mass alignment axis, with respect to the illustration in FIG. 62, passes through the center of the inertial mass 324 when the buoy is at the crest 320 and the trough 322 of a wave. However, when the buoy 323 and 321 has been moved laterally away from its nominal position over the inertial mass 324, the center of the inertial mass is no longer located on, and/or coaxial with, the buoy's inertial mass alignment axis.

Figure 63:
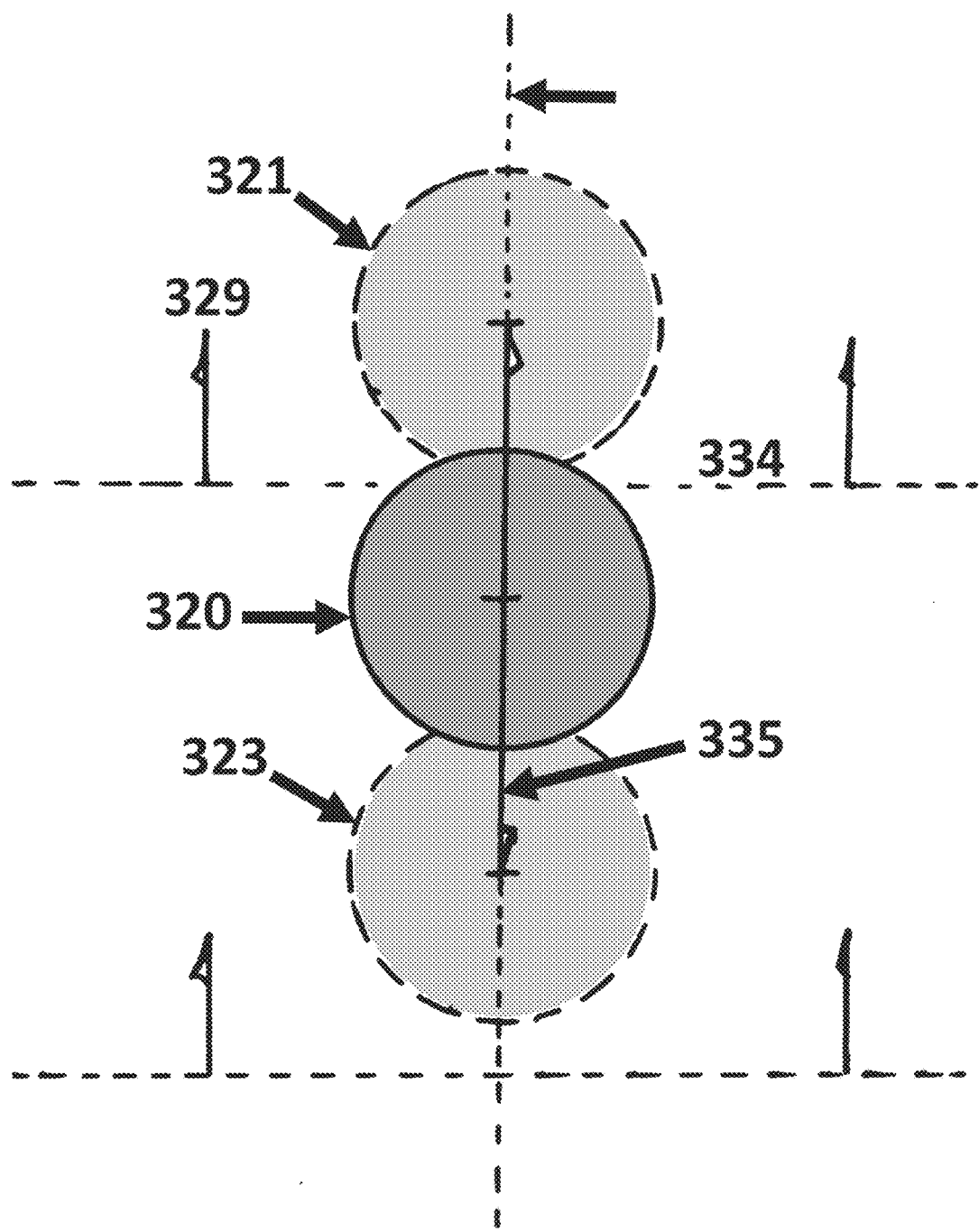

FIG. 63 shows a top-down view of the buoy illustrated in FIG. 62 and moving in response to wave motion. Note that the buoy 320 will typically move back-and-forth 335, e.g. from positions 321 to 323, in response to a wave-induced movement. The point here is that the lateral oscillations of a buoy will typically be within a vertical plane that is parallel to the direction 329 of wave motion. And, those lateral buoys oscillations will typically be within a plane that is normal to the wave front, e.g. 334.

Figure 64:
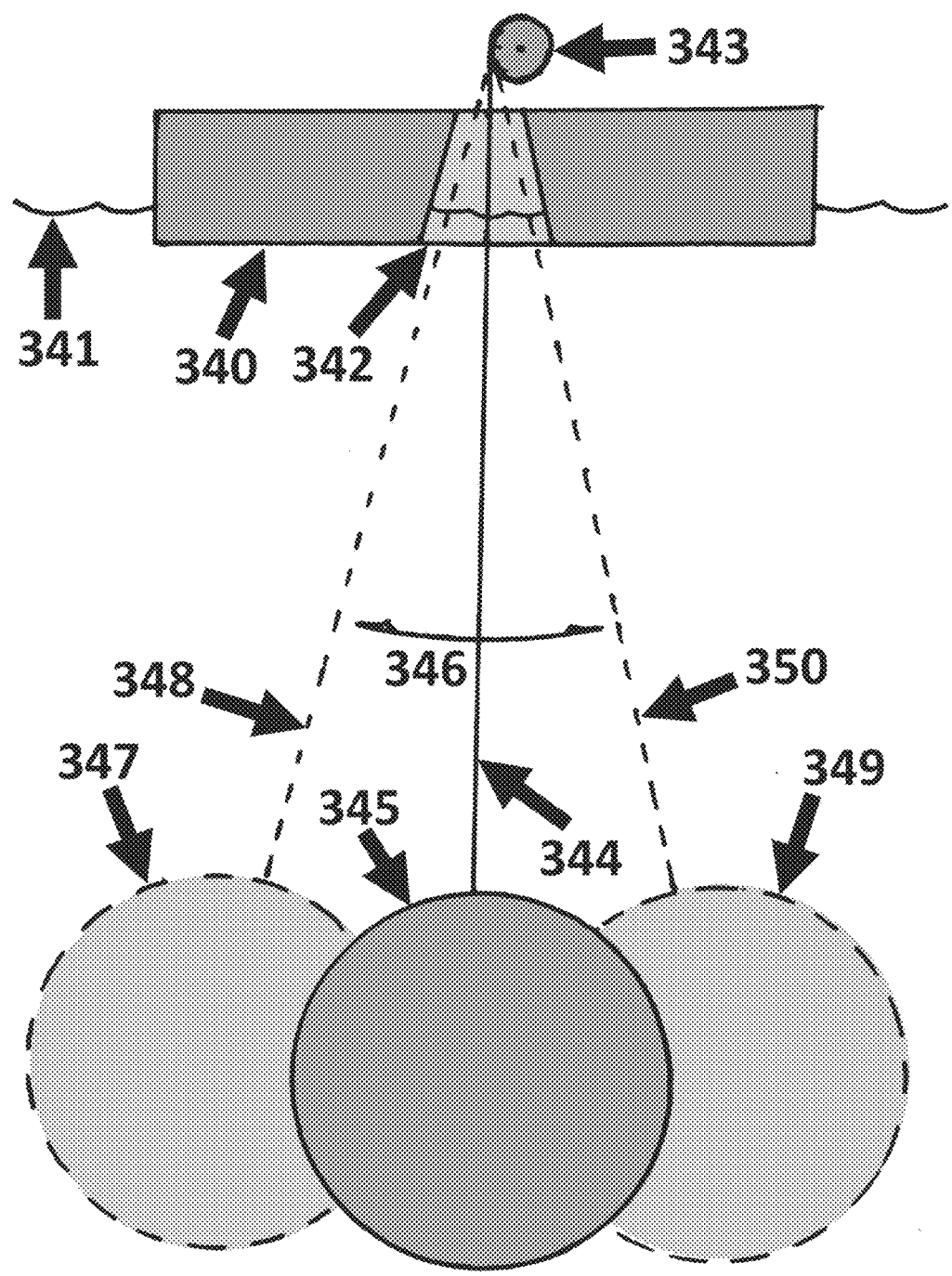

FIG. 64 illustrates that with respect to the perspective of a buoy 340, its lateral oscillations with respect to its attached inertial mass 345 will appear to be equivalent to a lateral oscillation of the inertial mass, e.g. through an angular range of 346.

In FIG. 64, the plane (i.e. the plane of the page) through which the inertial mass 345 appears to rotate is coincident with the plane of the pulley's 343 rotation.

Figure 65:
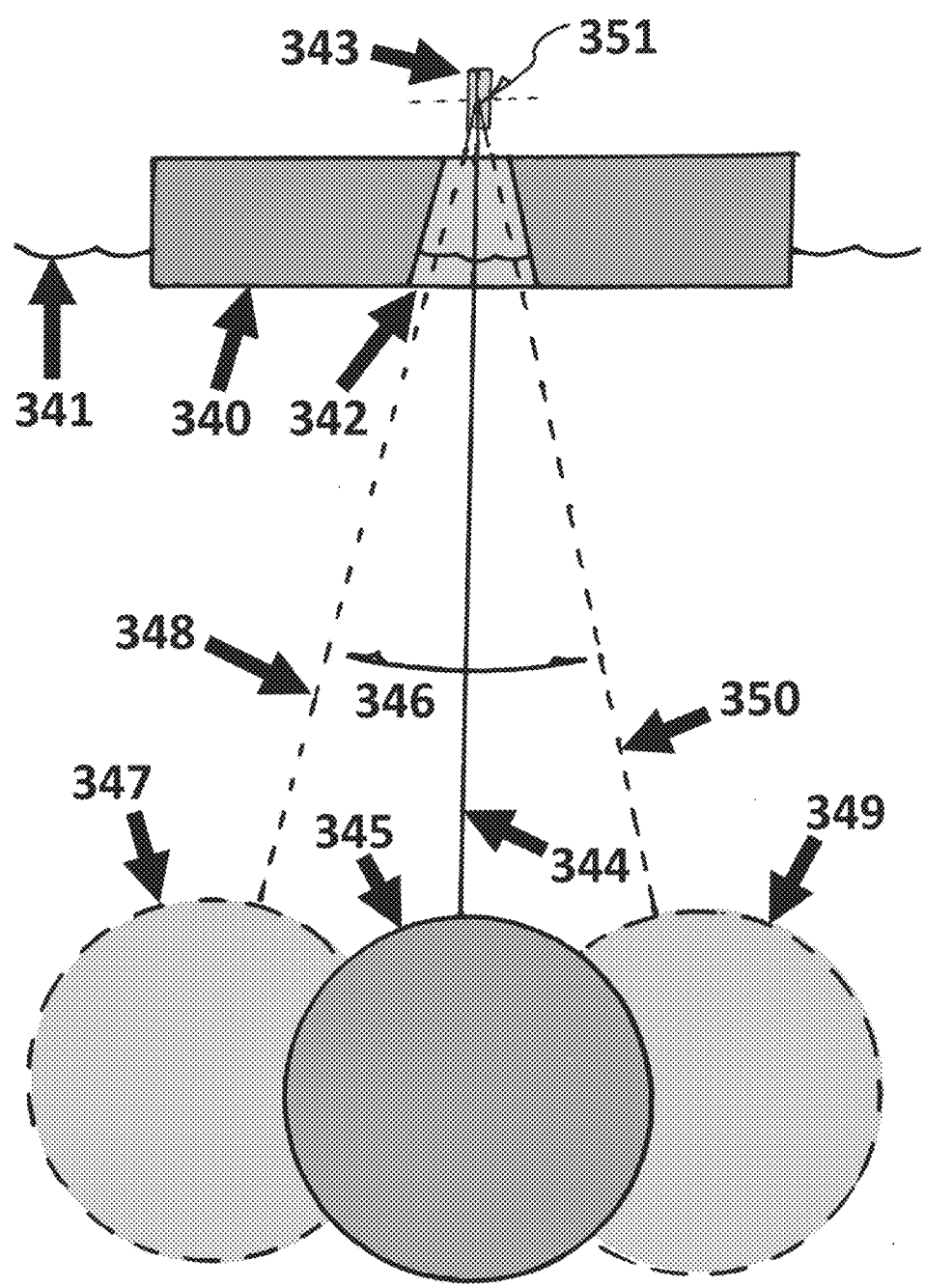

FIG. 65 illustrates that with respect to the perspective of a buoy 340, its lateral oscillations with respect to its attached inertial mass 345 will appear to be equivalent to a lateral oscillation of the inertial mass, e.g. through an angular range of 346.

However, unlike the illustration of FIG. 64, the plane (i.e. the plane of the page) through which the inertial mass 345 appears to rotate in this case is normal to the plane of the pulley's 343 rotation. This orientation of the pulley's plane of rotation with respect to the plane of rotation of the respective inertial mass is potentially problematic, and may result in damage to the cable 344 and/or to the pulley 343, as the cable is pulled out of, and/or away from, the pulley at 351.

Figure 66:
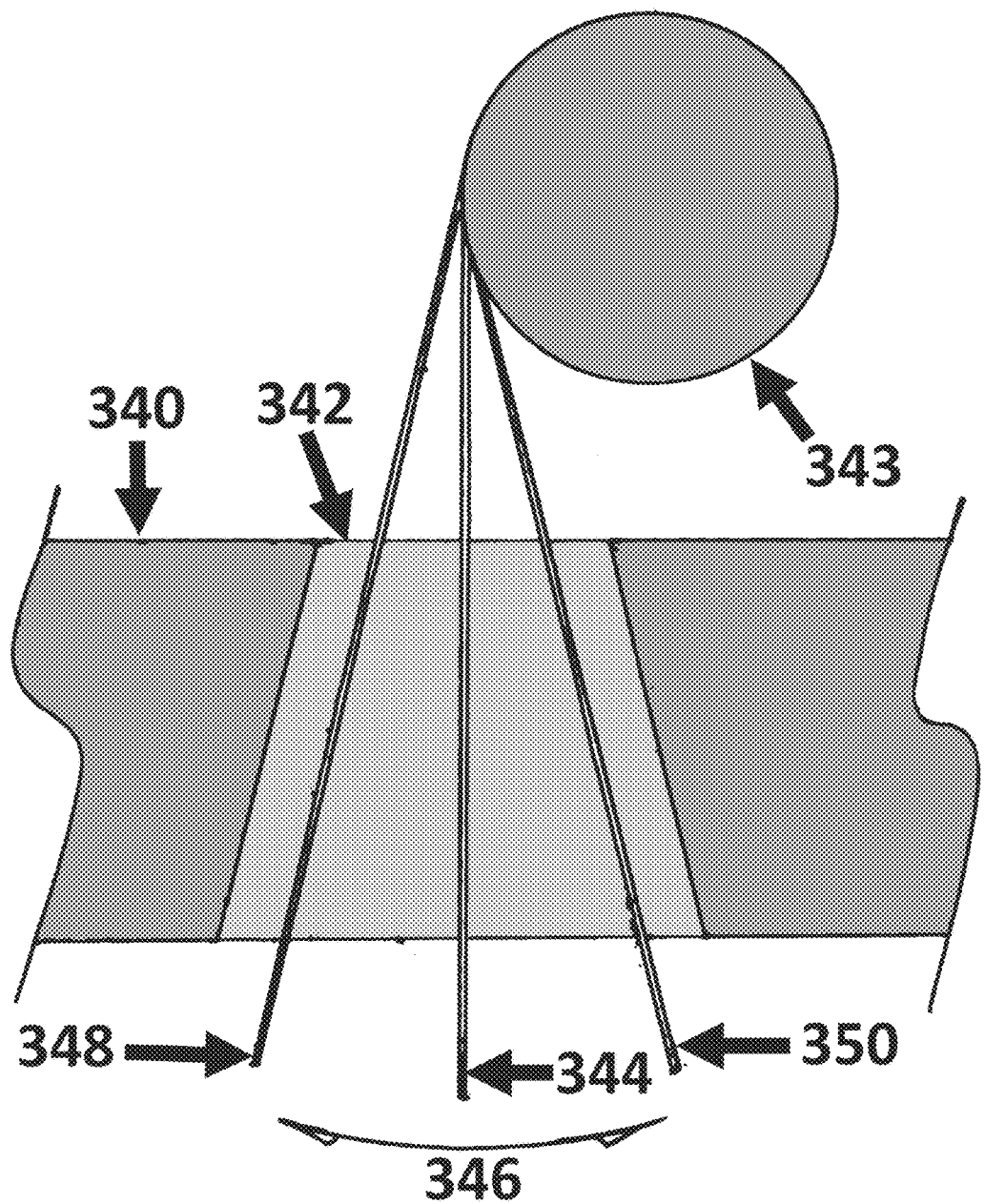
Figure 67:
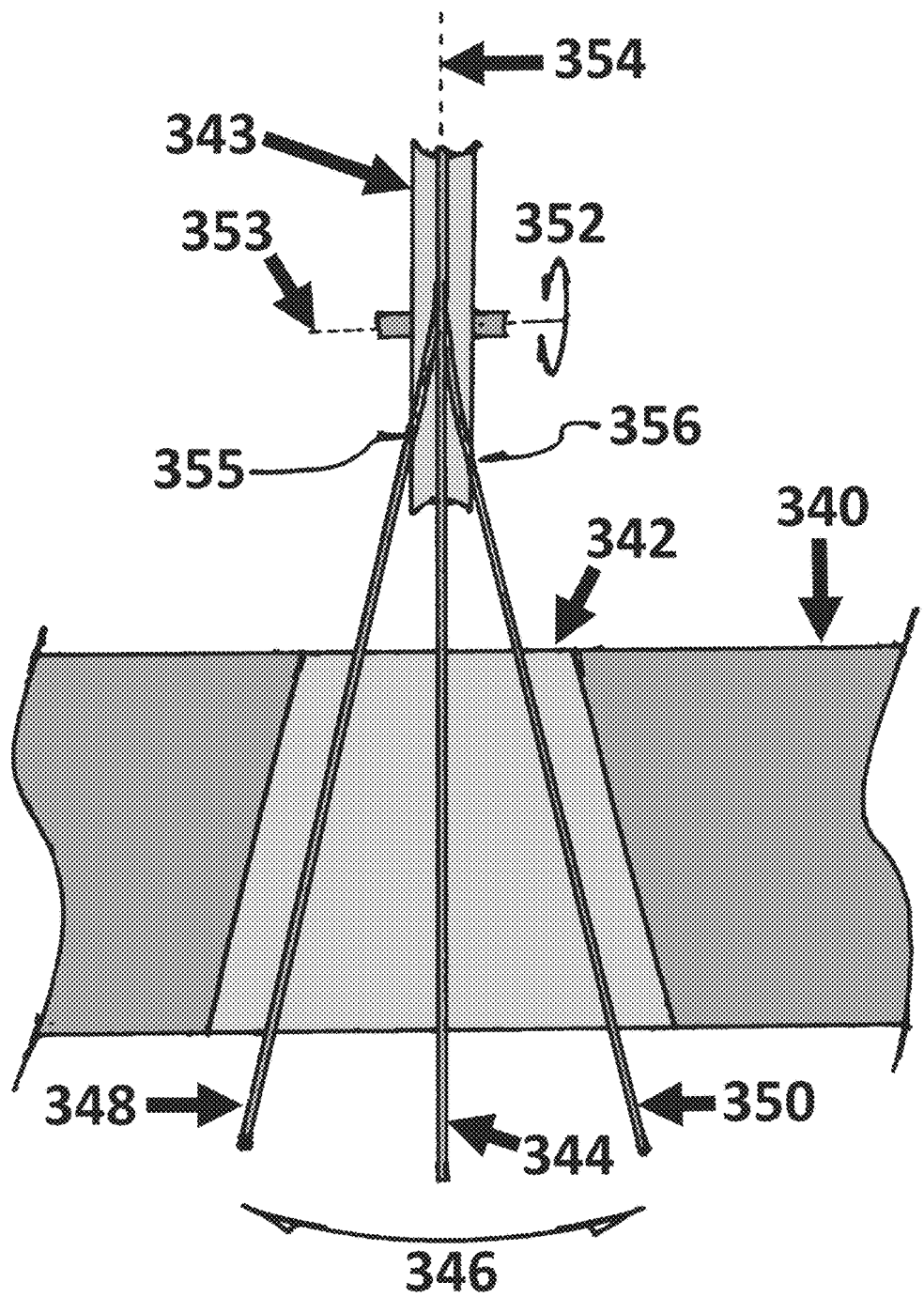

FIGS. 66 and 67 are close-up views of the pulleys and relative cable movements that were illustrated in FIGS. 64 and 65 respectively.

Figure 68:
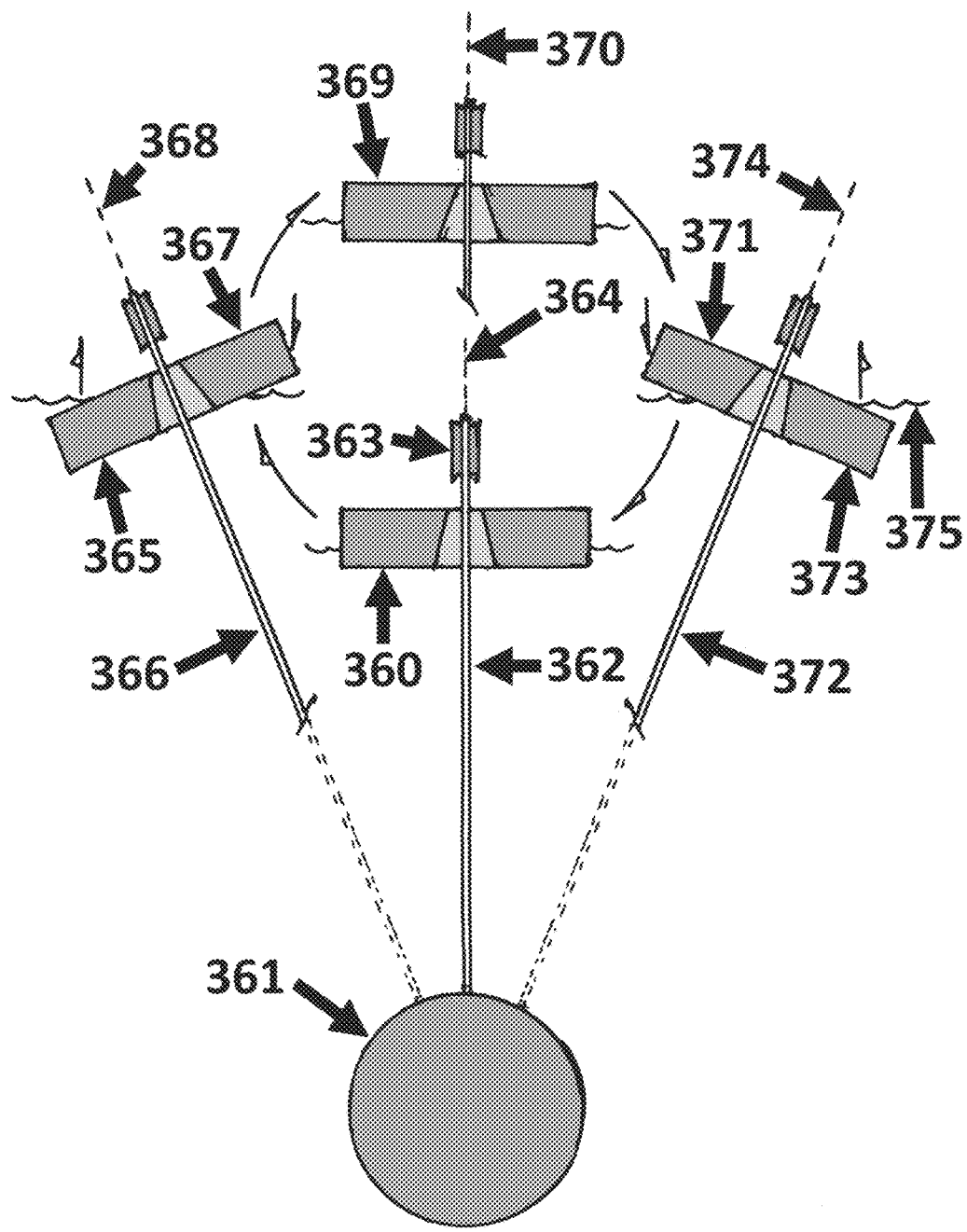
FIG. 68 is a diagram illustrating the change in the orientation of a buoy that would be required in order to maintain an optimal fleet angle between a pulley on the buoy and a cable connecting the pulley to an inertial mass as the buoy moves in response to passing waves.

FIG. 68 illustrates a buoy oscillating with wave motion. However, in this case, the buoy is rotating so as to preserve the alignment of the center of the inertial mass 361 with the buoy's inertial mass alignment axis. Such a pattern of movement by a buoy would be expected to reduce wear and/or damage to a respective cable, and a respective pulley, if it were possible to achieve. However, in this illustration, the buoy has only a single, center cable that, because it is near the buoy's center of mass and center of rotation, would presumably be unable to achieve a moment arm and torque on the buoy sufficient to rotation the buoy so as to preserve the relative orientation of the inertial mass 361 along its inertial mass alignment axis.

Also, because of the rectangular cross-section of the illustrated buoy, an attempt to rotate it by any significant degree would result in the submergence of one side, e.g. 365, and a lifting into the air of the opposing side, e.g. 367. This would tend to create a significant opposing torque that would tend to preserve a horizontal alignment of the buoy and prevent its rotation so as to maintain the relative position of the inertial mass 361 along the buoy's inertial mass alignment axis.

Figure 69:
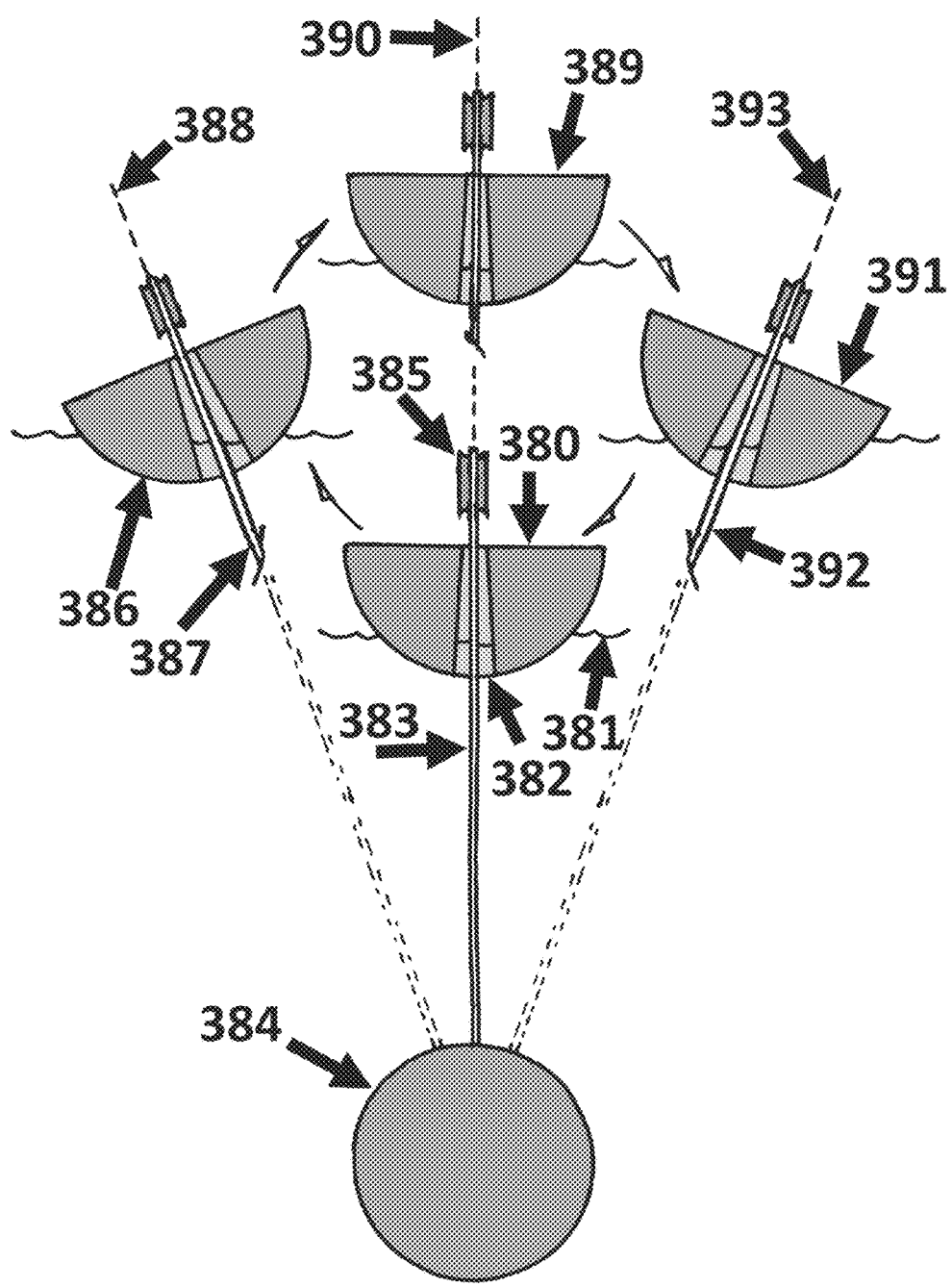
FIG. 69 is a diagram illustrating the utility of a buoy with a circular hull cross-section in maintaining a buoy orientation conducive the maintenance of an optimal fleet angle.

FIG. 69 illustrates a buoy oscillating with wave motion in a manner similar to the one illustrated in FIG. 68. However, in this illustration, the cross-sectional shape of the buoy is hemi-circular. This hull shape would be expected to allow the buoy to be rotated so as to preserve the relative position of its associated inertial mass 384 without the concomitant generation of counter-torque, since the buoyancy and center of buoyancy of the buoy are relatively unchanged due to a rotation of the buoy over a certain range of angles (and the buoy can be made easier to rotate still if its center of mass is located near its center of rotation or metacenter).

Figure 70:
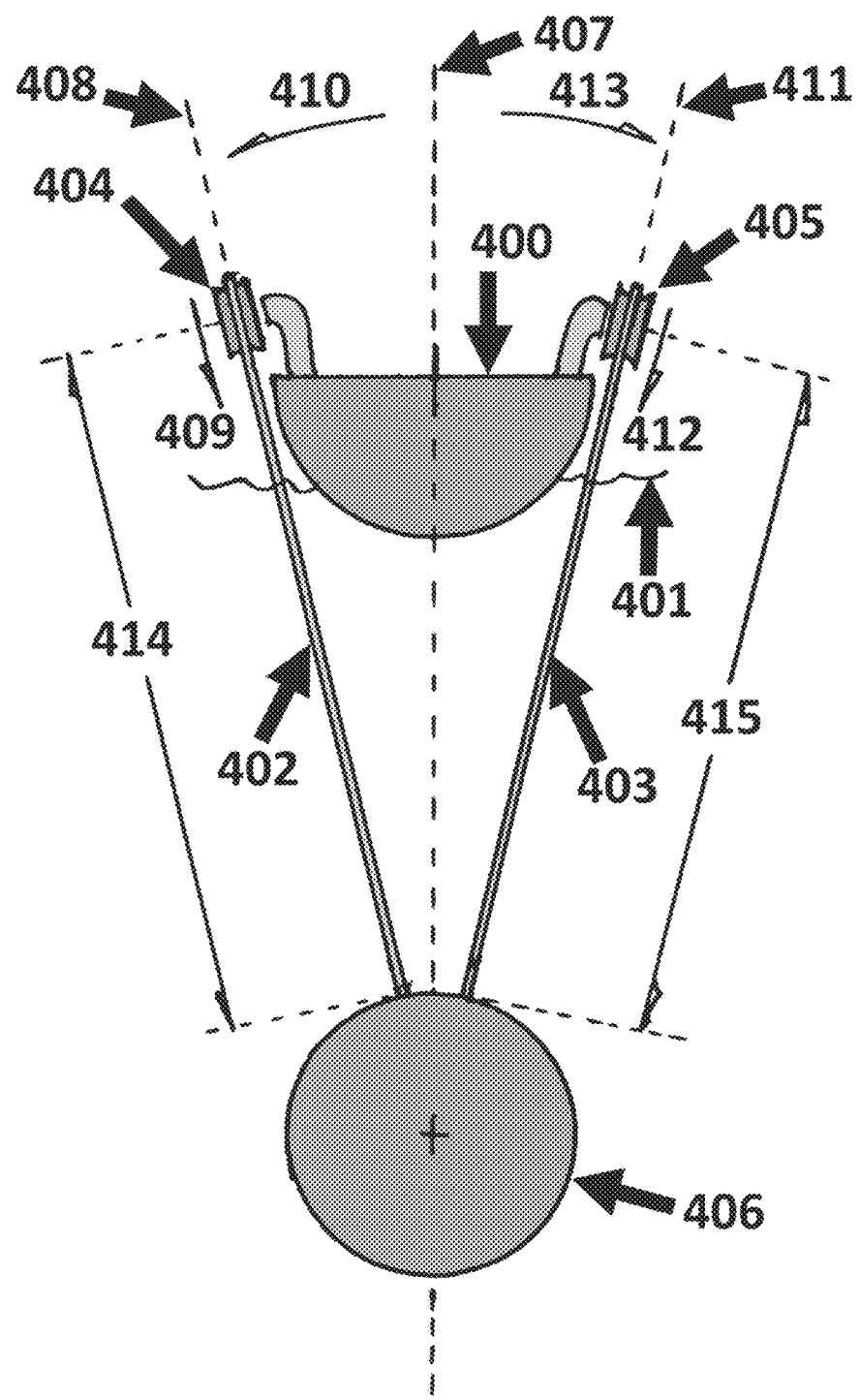
FIG. 70 is an illustration of a buoy with a circular hull cross-section and with pulleys oriented so as to promote the maintenance of an optimal fleet angle.

FIG. 70 shows a side view of an embodiment of the current disclosure. A buoy 400 is equipped with two pulleys 404 and 405 on opposite sides of the buoy. One end of cables 402 and 403 are connected to these pulleys. The other ends of the cables are connected to inertial mass 406. The cables segments 402 and 403 lengthen when the buoy is lifted by a wave, and the respective pulleys 404 and 405 are turned (e.g. thereby turning generators and generating electrical power) so as to deploy additional cable. However, in this embodiment, the torque on each pulley is regulated and/or controlled so as to continuously "point" the buoy's inertial mass alignment axis toward the center of the inertial mass 406. As a result, in most circumstances, the lengths of cable segments 402 and 403 will remain equal, i.e. even as the lengths of those cable segments increase and decrease they will remain equal.

An increase in the torque of pulley 404, while the buoy is rising, will tend to create a net relative torque 410 on the buoy. And, likewise, and/or conversely, an increase in the torque of pulley 405, while the buoy is rising, will tend to create a net relative torque 413 on the buoy. Thus, through the appropriate control of the relative torques of pulleys 404 and 405, the angular orientation of buoy 400 within the vertical plane passing through those pulleys (e.g. the plane of the page) can be altered, adjusted, and/or controlled. Thus, through the control of the differential and/or relative torques within pulleys 404 and 405 (with respect to how much resistance is offered to cables 402 and 403, respectfully, when the buoy is moving away from the inertial mass) the alignment of the buoy's inertial mass alignment axis with respect to the vertical plane passing through those pulleys can be controlled.

Figure 71:
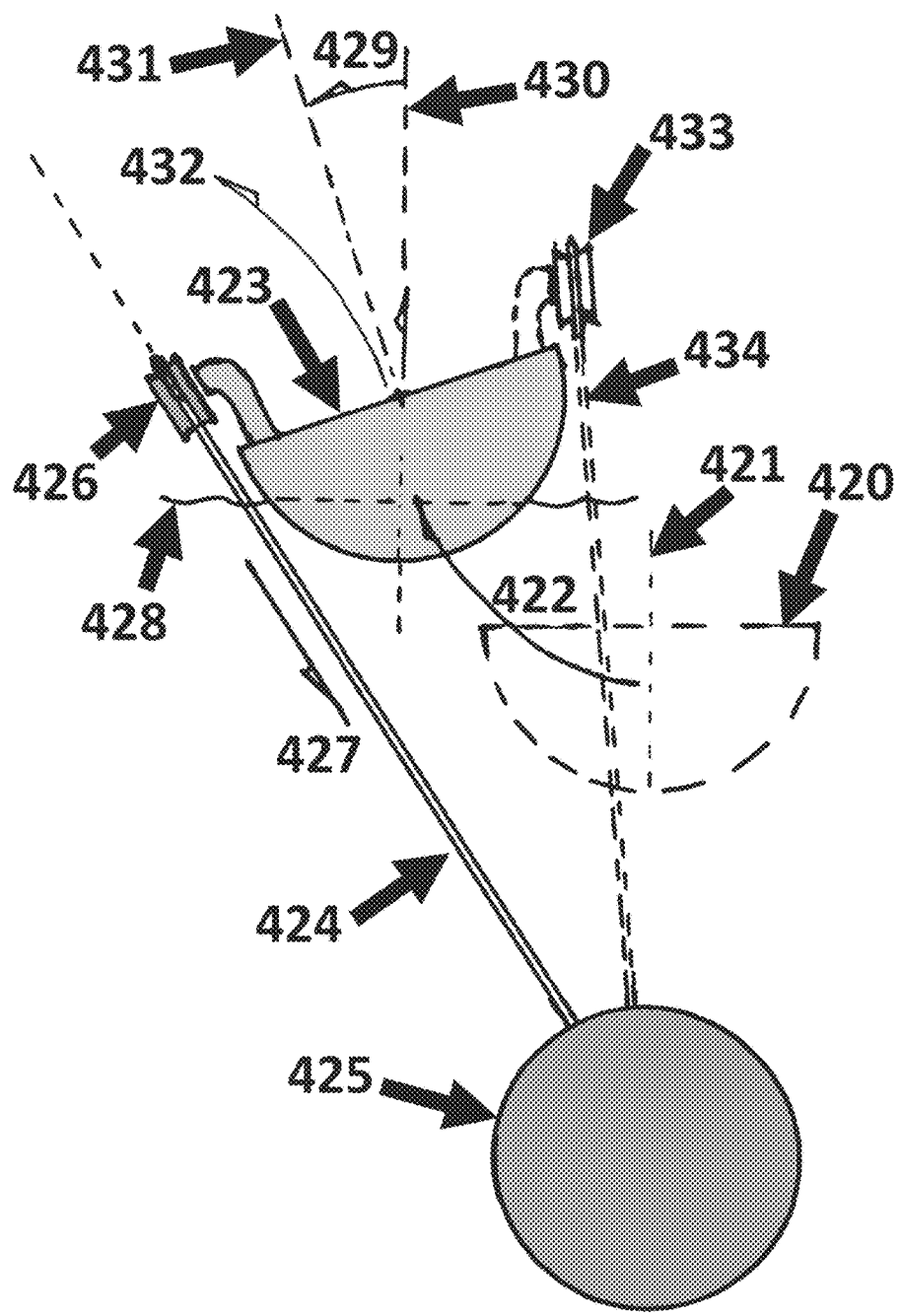
FIG. 71 is a diagram illustrating the reorientation of a buoy to maintain an optimal fleet angle.

FIG. 71 shows a side view of an embodiment of the current disclosure. This figure illustrates how, when being lifted 422 by a wave, an increase in the relative torque, and/or the relative resistance of the pulley to the lengthening of cable segment 424, can impart a torque 429 to the buoy about its center of mass and preserve the alignment of its inertial mass alignment axis with respect to the inertial mass.

Figure 72:
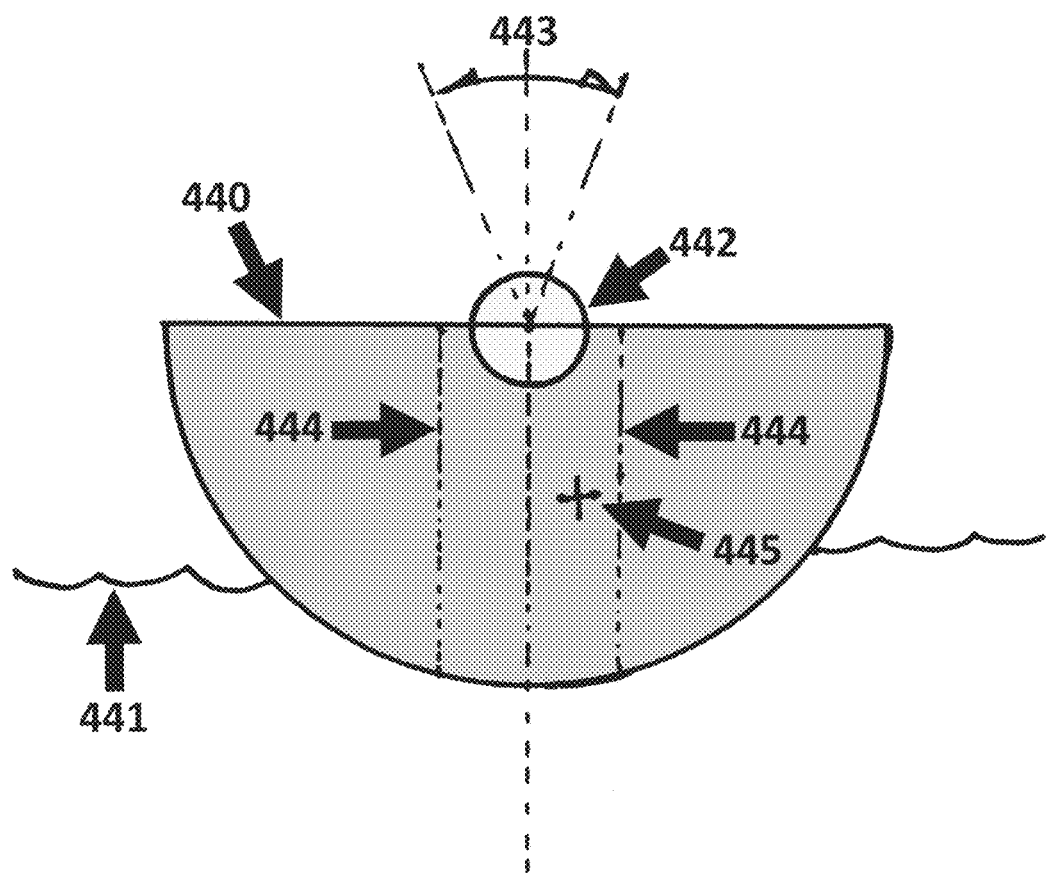
FIG. 72 is a diagram illustrating the preferred location of a buoy's center of mass so that its hull with a circular cross-section will readily reorient itself so as to promote the maintenance of an optimal fleet angle.

FIG. 72 shows a side view of a buoy of an embodiment of the current disclosure. The buoy 440 floats adjacent to the surface 441 of a body of water. The buoy has a center of gravity (COG), and/or a center of mass (COM), that is located within a certain radial distance of the center of the buoy 442. Another embodiment, has a COG and/or a COM, e.g. 445, that is located at a point within the buoy, wherein that point lies within a cylindrical space centered about, and within a radial distance 444 of, the vertical longitudinal axis of the buoy.

The utilization of a buoy with a COG and/or a COM located within a relatively small distance of the center of the spherical volume that coincides with walls of a hemispherical buoy will facilitate the angular rotation of that buoy so as to preserve the position of the buoy's respective inertial mass along the buoy's inertial mass alignment axis. Thus, an embodiment that utilizes a "well-balanced" buoy will require the application of less differential torque by means of its pulleys in order to maintain the proper relative position and/or orientation of its respective inertial mass.

Figure 73:
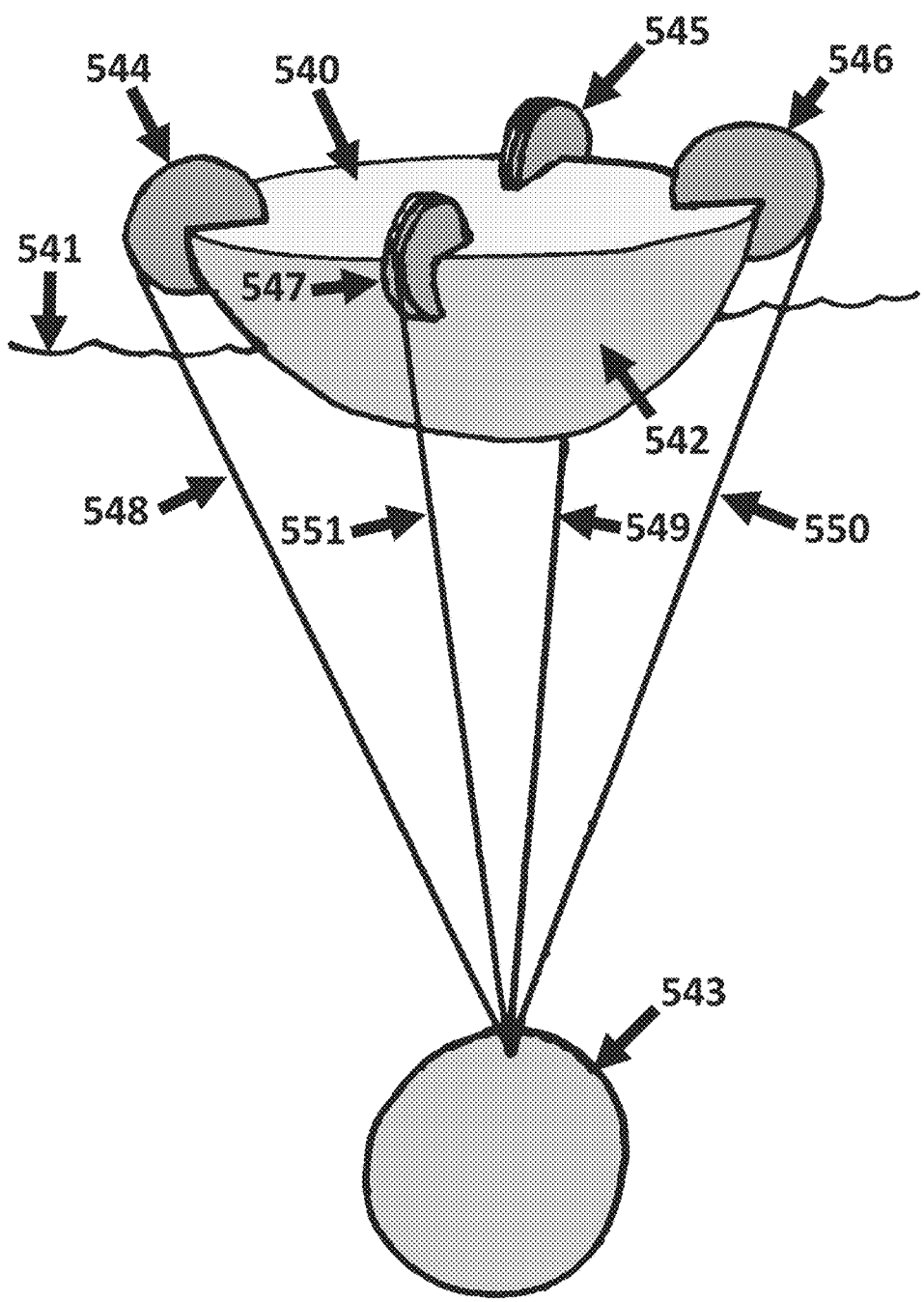
FIG. 73 is an elevated perspective view of an embodiment of the present invention.

FIG. 73 shows a perspective view of an embodiment of the current disclosure. A buoy 540 is radially symmetrical about a vertical axis through its center, and every cross-section through the buoy has an approximately hemi-circular shape with respect to a vertical plane passing through its center. Note that the pulleys 544-547 are arranged and/or aligned such that the plane of rotation of each passes through the central vertical axis of the buoy.

Whereas the embodiments illustrated in prior figures had a hemi-circular cross-sectional shape with respect to one lateral axis, and a linear and/or rectangular cross-sectional shape with respect to another lateral axis, and only used differential torques to control the angular rotation of their respective buoys with respect on just one of those axes, the embodiment illustrated in FIG. 73 is radially symmetrical, and it uses differential torques to control the angular rotation of the buoy with respect to both lateral axes, i.e. this embodiment maintains its angular orientation such that the center of the inertial mass 543 always (or at least typically) lies on (or near) the buoy's inertial mass alignment axis.

Figure 74:
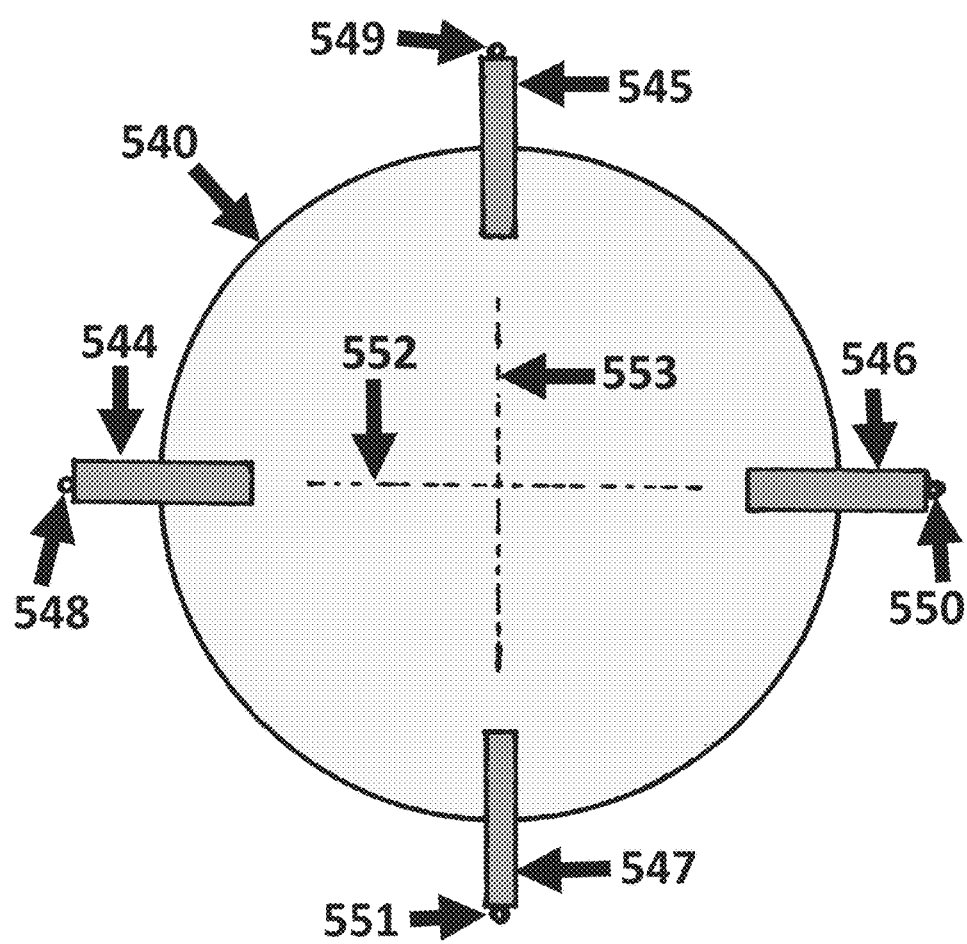
FIG. 74 is a top down view of the embodiment of FIG. 73.

FIG. 74 shows a top-down view of the embodiment of the current disclosure illustrated in FIG. 73.

Figure 75:
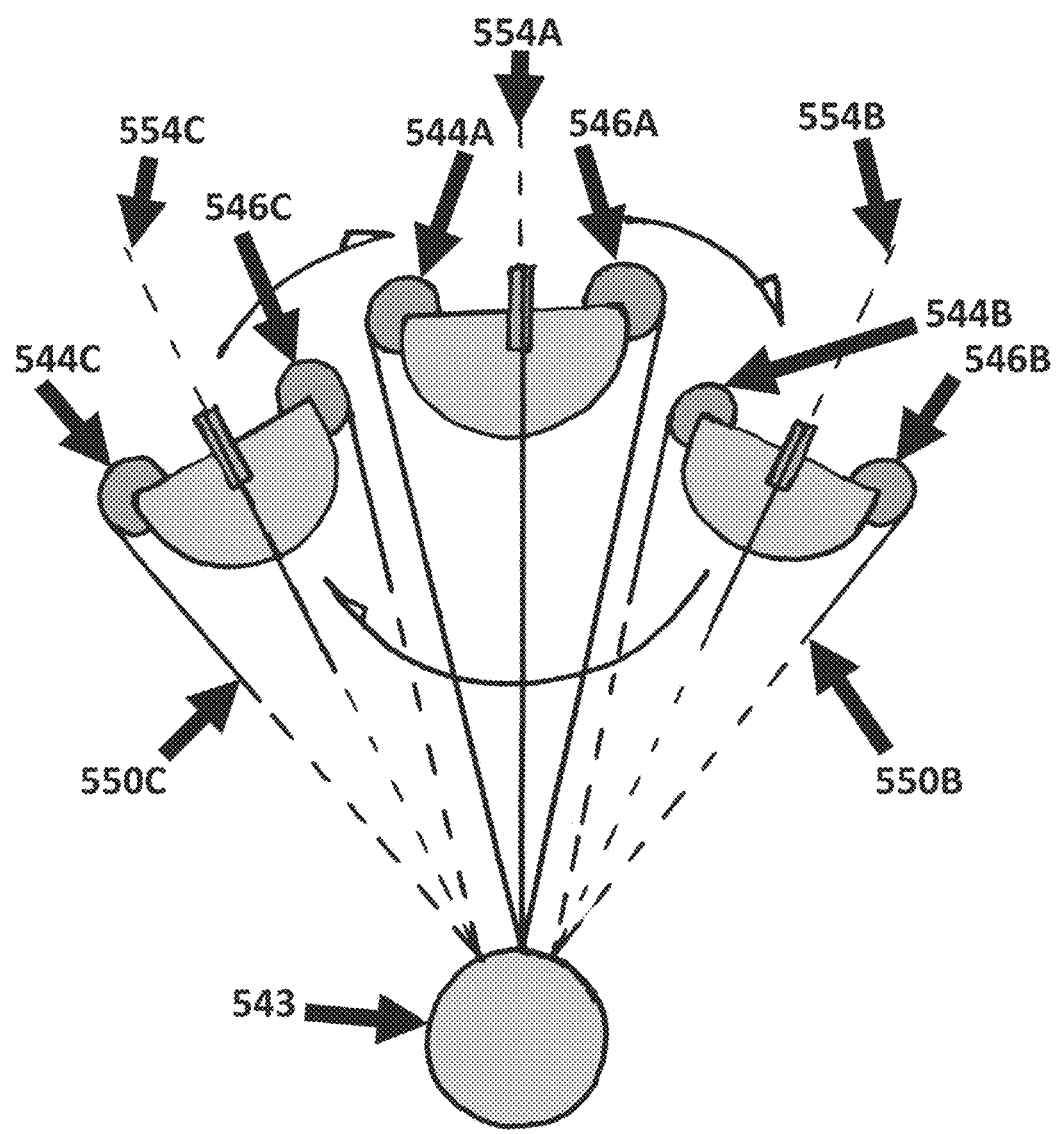
FIG. 75 is a diagram illustrating the motion of the embodiment of FIG. 73 in response to passing waves.

FIG. 75 shows a side view of the embodiment of the current disclosure illustrated in FIG. 73 as it moves responsive to a wave motion.

Figure 76:
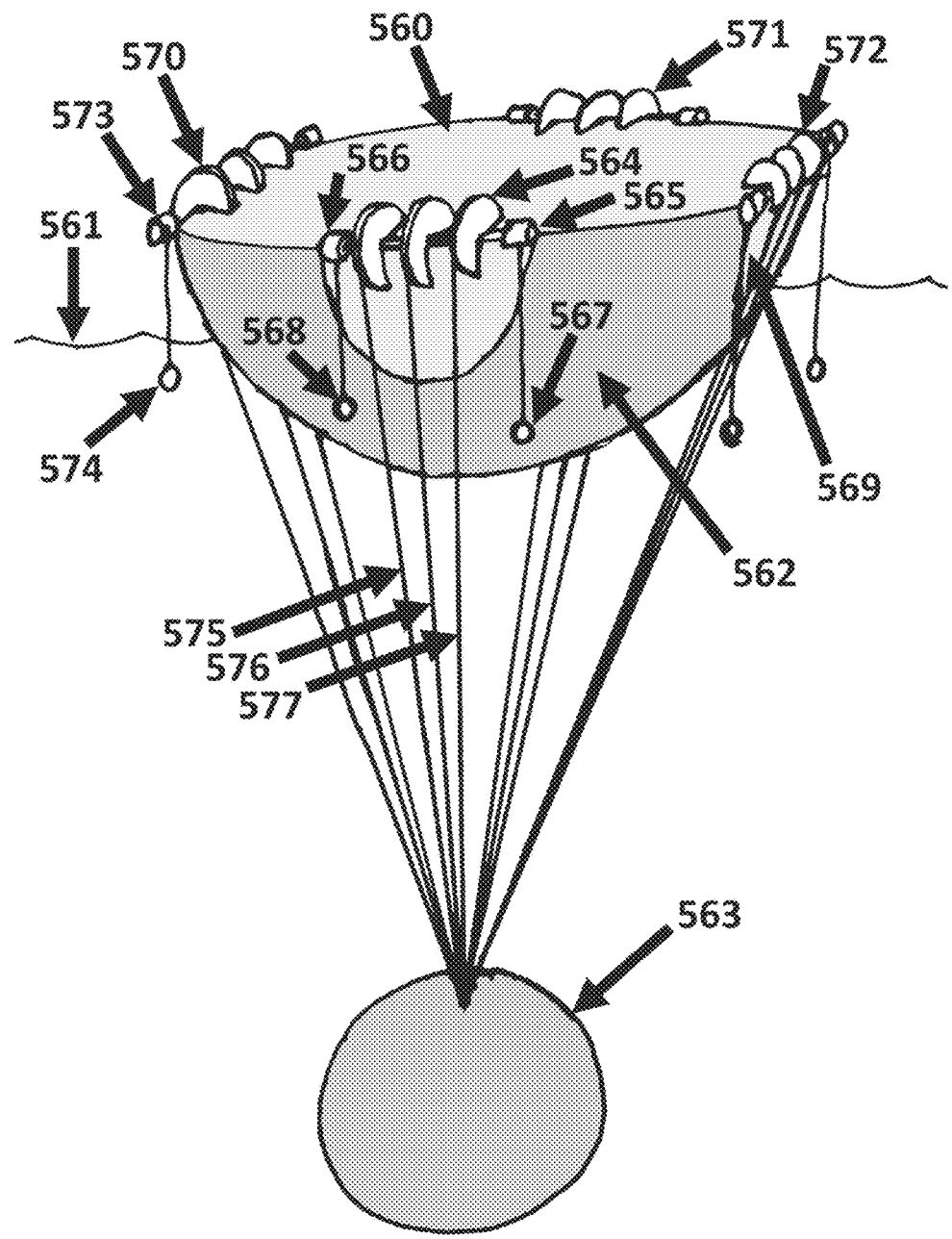
FIG. 76 is an elevated perspective view of an embodiment of the present invention.

FIG. 76 shows a perspective view of an embodiment of the current disclosure. A buoy 560 is approximately radially symmetrical about a vertical axis through its center, and every cross-section through the buoy has an approximately hemi-circular shape with respect to a vertical plane passing through its center.

Unlike the embodiment illustrated in FIGS. 73-75, this embodiment utilizes four sets of interlinked and/or coaxial pulleys. Each set of three pulleys, e.g. 564, is connected to a common shaft and therefore turn in synchrony. Each three-pulley shaft is also connected at outer ends to a pulley upon which cables to "slack-minimization" weights, e.g. 567, are connected. As each set of three interconnected pulleys resists the paying out of its respective cables, the associated and/or rotatably connected slack-minimization weights are lifted. Then, when the buoy is moving closer to the inertial mass, e.g. when moving toward the trough of a wave, the slack-minimization weights descend and their gravitational potential energy is used to rewind the pulley cables.

Figure 77:
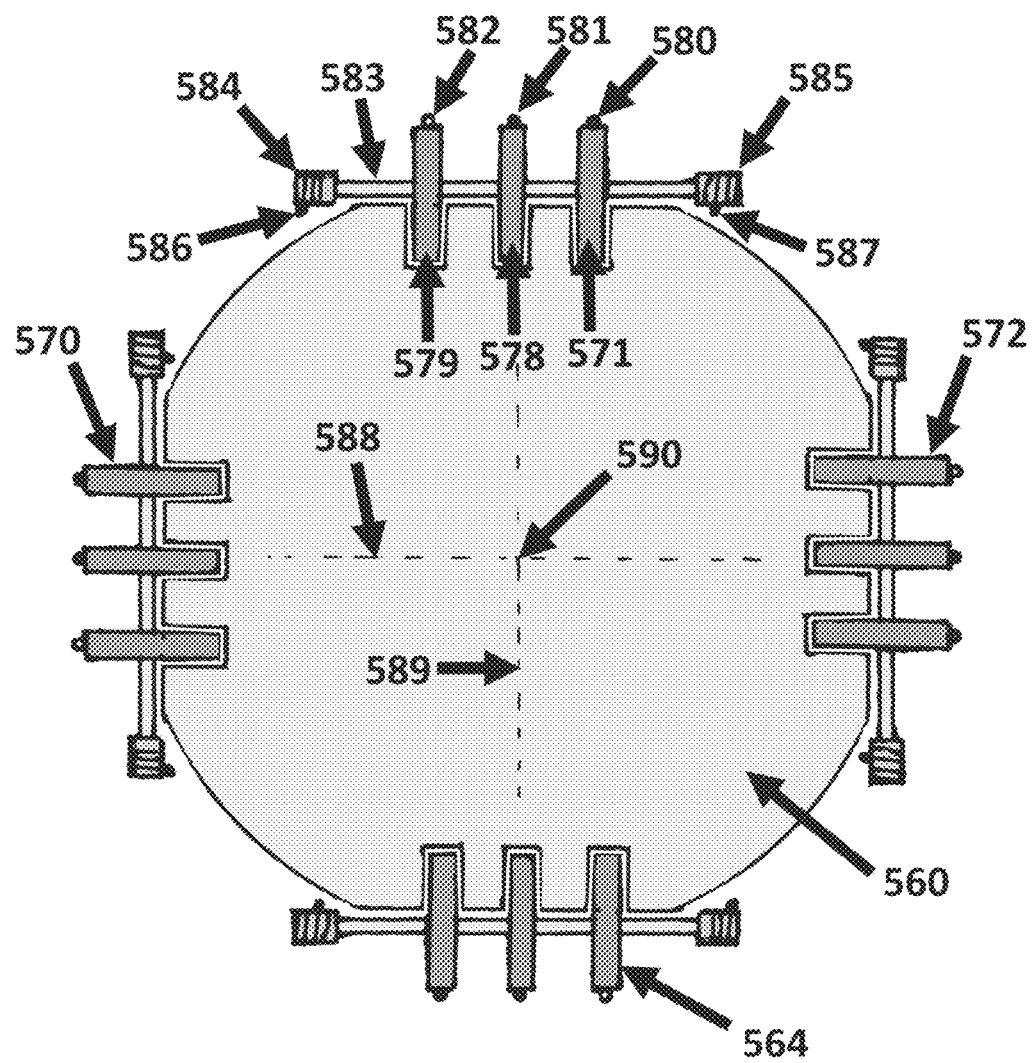
FIG. 77 is a top down view of the embodiment of FIG. 76.

FIG. 77 shows a top-down view of the embodiment of the current disclosure illustrated in FIG. 76.

Figure 78:
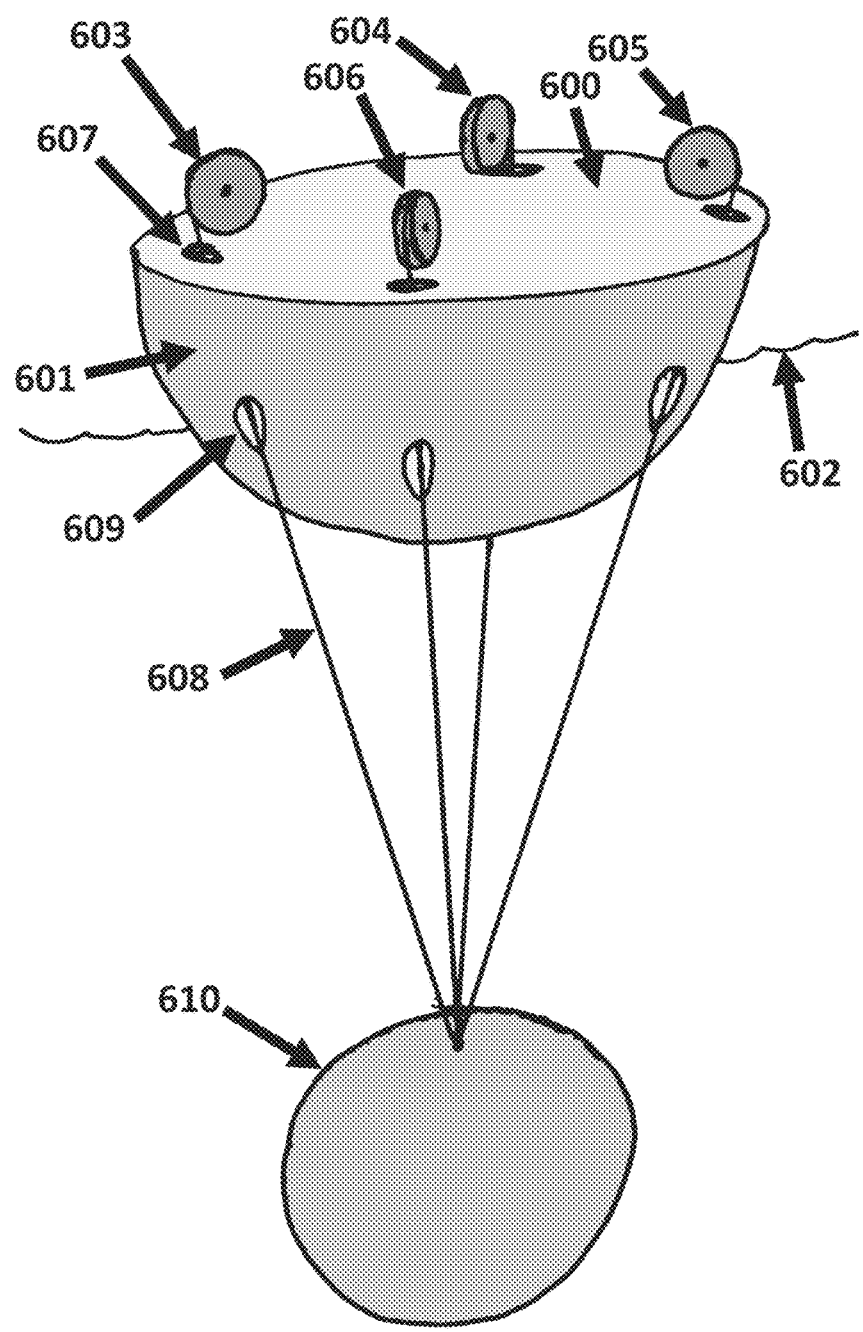
FIG. 78 is an elevated perspective view of an embodiment of the present invention.

FIG. 78 shows a perspective view of the embodiment of the current disclosure similar to the one illustrated in FIGS. 73-75. However, in this embodiment, the cables, e.g. 608, that connect the pulleys, e.g. 603, to the inertial mass 610, pass through apertures and/or channels which have openings, e.g. 607, adjacent to a pulley, and, e.g. 609, near the bottom of the buoy.

Figure 79:
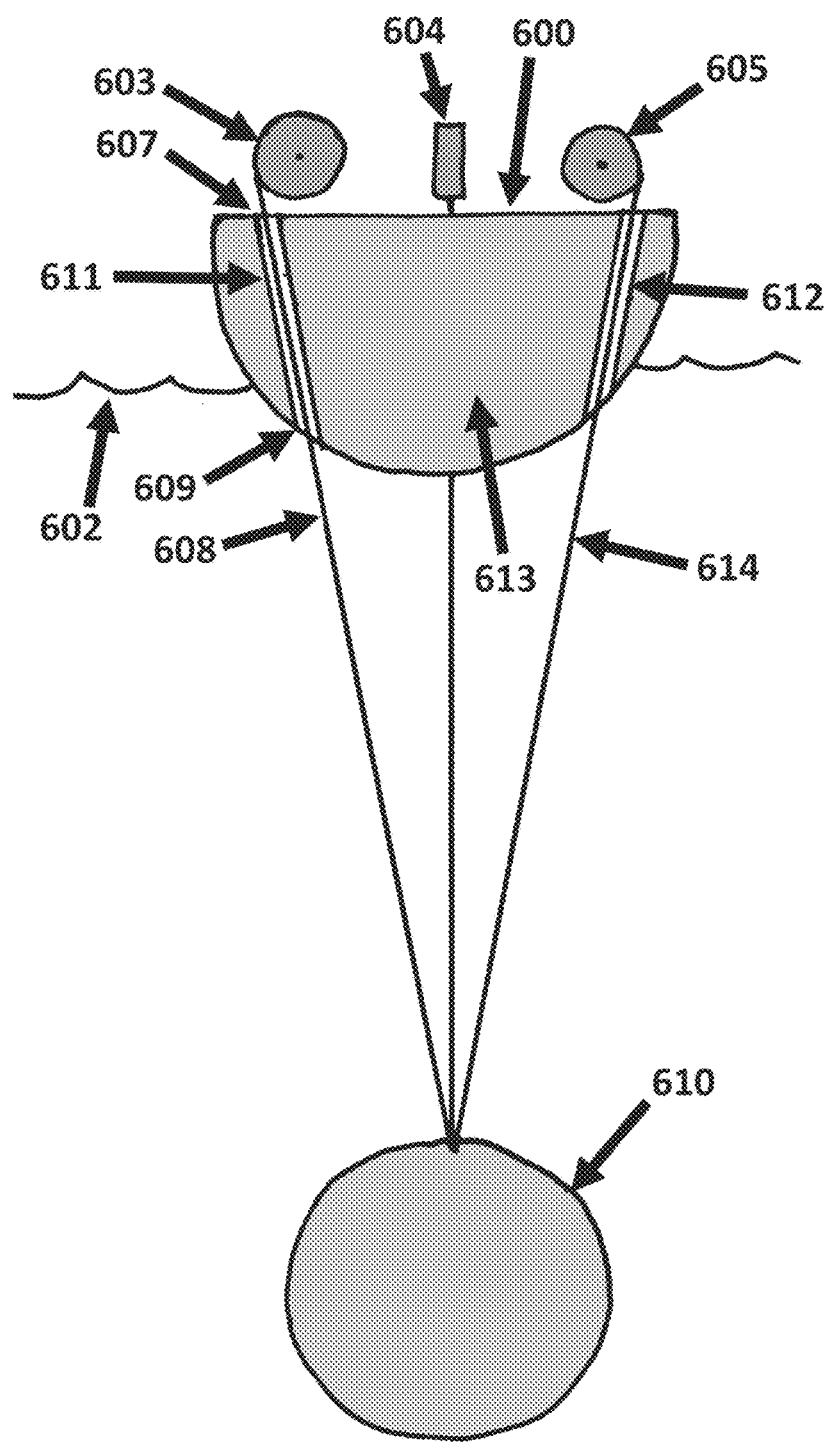
FIG. 79 is a sectional view of the embodiment of FIG. 78.

FIG. 79 shows a cross-sectional view of the embodiment of the current disclosure illustrated in FIG. 78, and taken along a vertical plane passing through the center of the buoy and through a pair of opposite pulleys.

Figure 80:
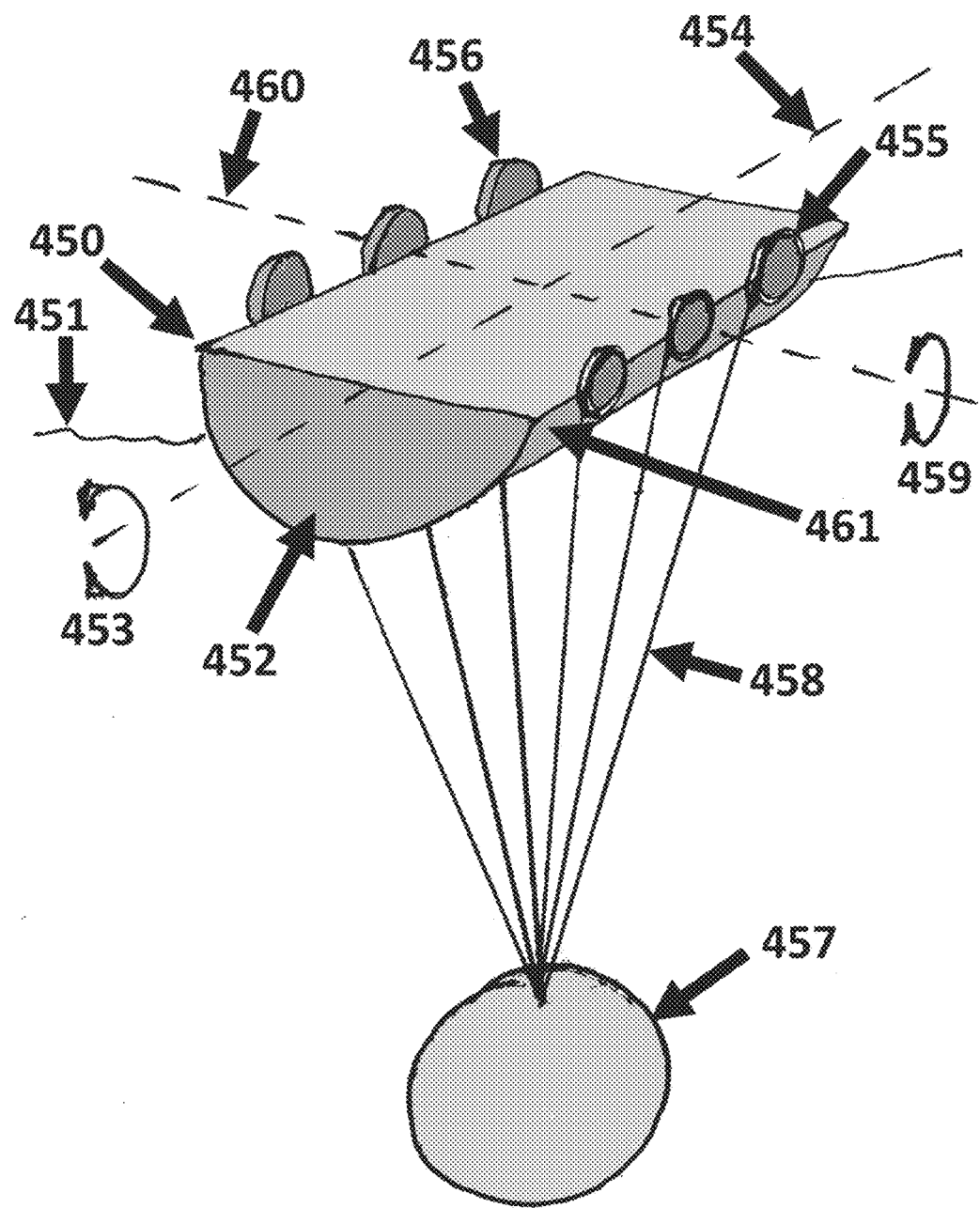
FIG. 80 is an elevated perspective view of an embodiment of the present invention.

FIG. 80 shows a perspective view of an embodiment of the current disclosure. A buoy 450 has a hemi-circular cross-section 452 with respect to one horizontal axis 454, and a linear (i.e. a cylindrical) shape with respect to the other horizontal axis 460. The hemi-circular cross-section facilitates the rotation 453 of the buoy about axis 454. However, the buoy will tend to resist rotation 459 about the other axis 460.

The embodiment utilizes pulleys, e.g. 455 and 456, which are characterized by planes of rotation that are parallel to axis 454 and normal to axis 460. Thus, as this cylindrically-shaped embodiment oscillates in response to wave motion, the buoy's axis 454 will tend to remain flat, and thus, with respect to a vertical plane passing through axis 454, the relative position of the inertial mass 457 will tend to oscillate. However, since these oscillations are within, and/or parallel to, the planes of rotation of the pulleys, those pulleys, and their respective cables, will not tend to experience excessive damage or wear.

And, through the application of appropriate torques within the pulleys, i.e. one level of torque among the pulleys, e.g. 456, on one side of the buoy and another level of torque among the pulleys, e.g. 455, on the other side of the buoy, the buoy will be rotated 453 about axis 454 so that, with respect to a vertical plane parallel to axis 460, the buoy's inertial mass alignment axis will remain aligned with the inertial mass 457.

Figure 81:
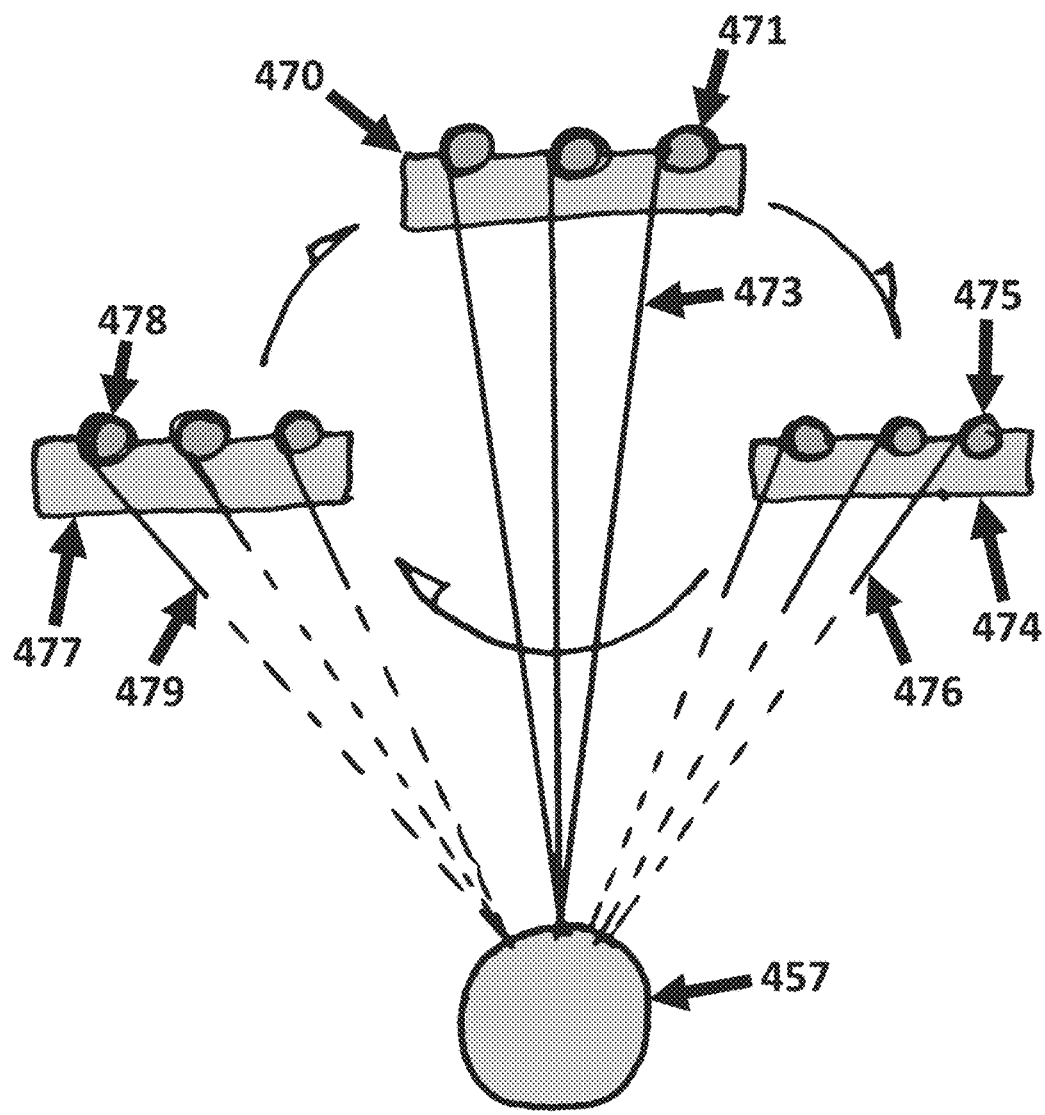
FIG. 81 is a diagram illustrating the motion of the embodiment of FIG. 80 in response to passing waves from a side perspective.

FIG. 81 shows a side view of the embodiment of the current disclosure illustrated in FIG. 80 as it oscillates with a wave. Note that with respect to this perspective, i.e. from a perspective along axis 460, the buoy's angular orientation does not change to a noticeable extent. Instead, the cables oscillate back-and-forth within the plane of rotation of each respective pulley.

Figure 82:
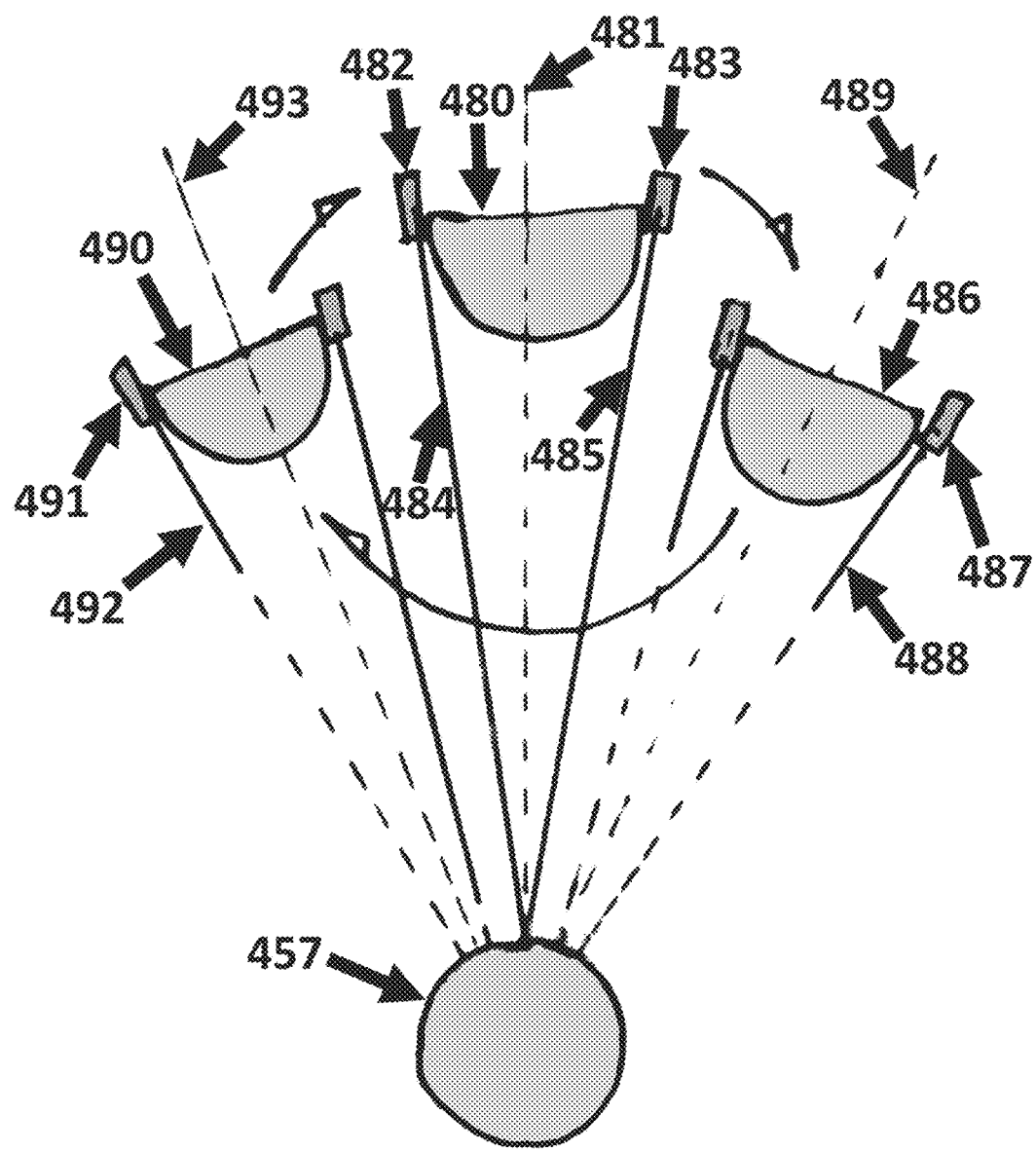
FIG. 82 is a diagram illustrating the motion of the embodiment of FIG. 80 in response to passing waves from a front perspective.

FIG. 82 shows a side view of the embodiment of the current disclosure illustrated in FIG. 80 as it oscillates with a wave. Note that with respect to this perspective, i.e. from a perspective along axis 454, the buoy's angular orientation rotates, i.e. through the imposition of differential torques across opposing pairs of pulleys. The angular orientation of the buoy (with respect to this axis and this perspective) is controlled and adjusted so as to preserve the alignment of the buoy's inertial mass alignment axis and the center of the inertial mass 457.

Figure 83:
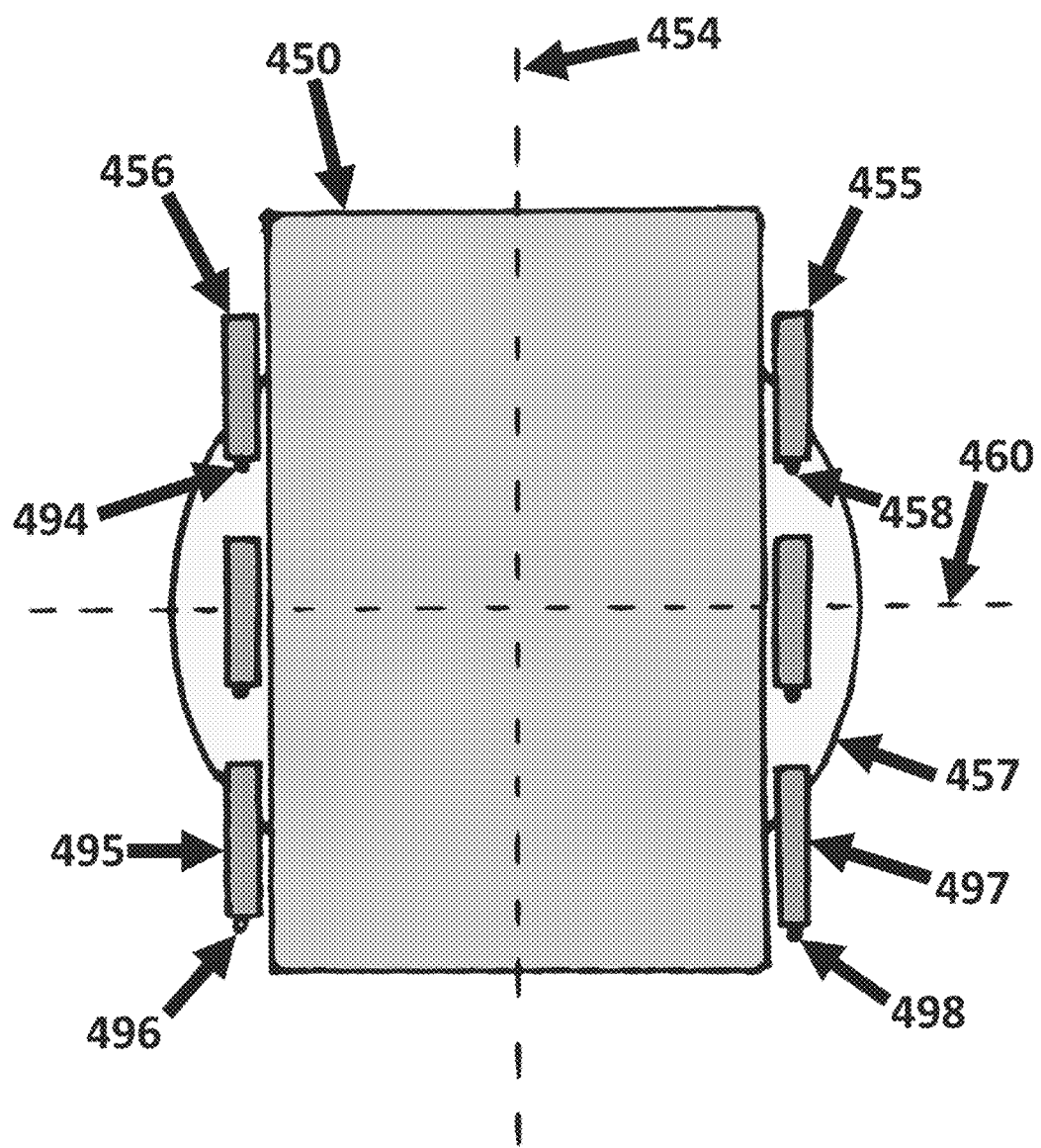
FIG. 83 is a top down view of the embodiment of FIG. 80.

FIG. 83 shows a top-down view of the embodiment of the current disclosure illustrated in FIG. 80. The buoy 450 is connected, by means of pulleys, e.g. 455-456, 495, and 497, and their respective cables, e.g. 494, to a submerged inertial mass 457.

Figure 84:
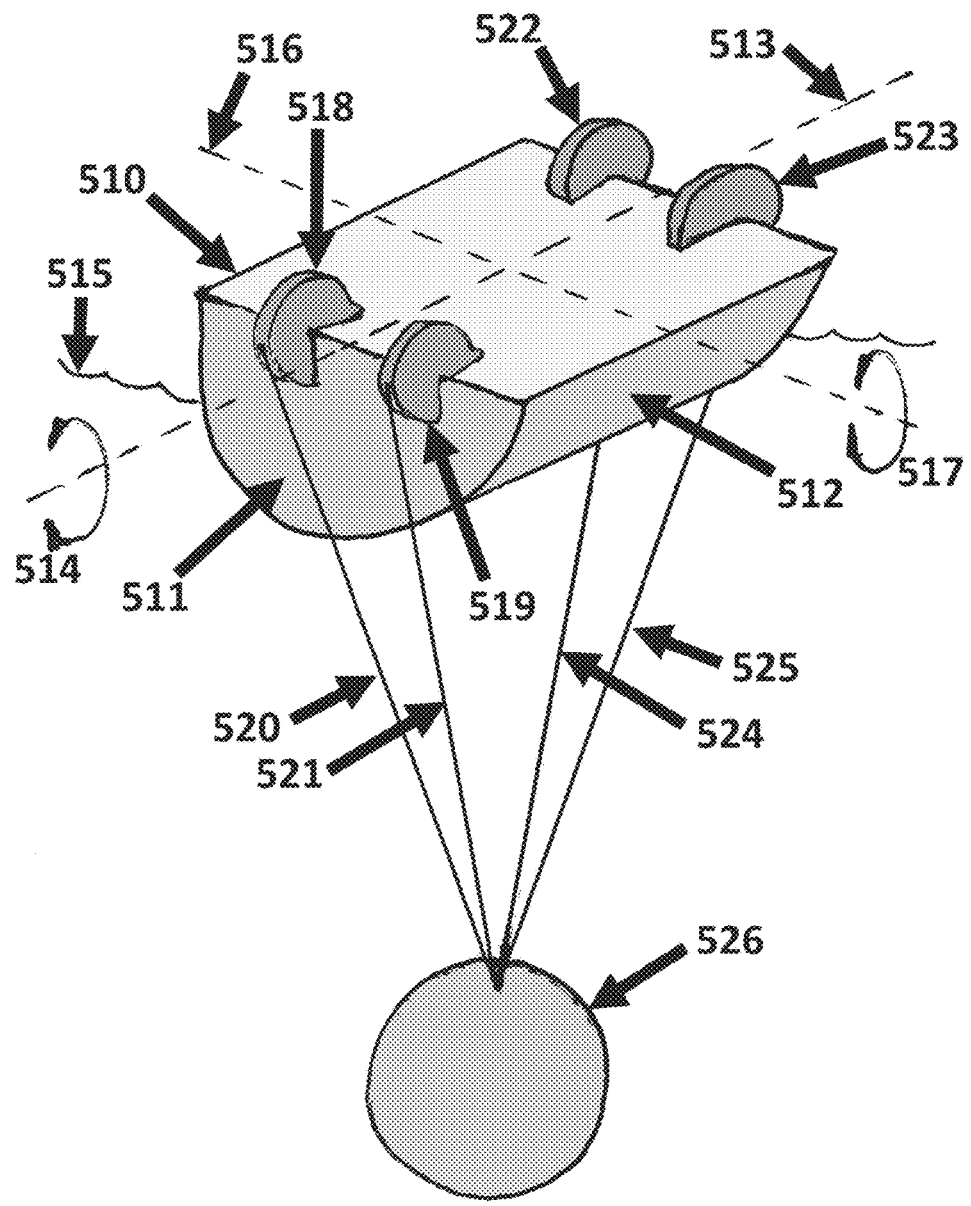
FIG. 84 is an elevated perspective view of an embodiment of the present invention.

FIG. 84 shows a perspective view of an embodiment of the current disclosure. A buoy 510 has a hemi-circular cross-sectional shape with respect to a plane normal to a lateral axis 513, and a linear (and/or cylindrical) cross-sectional shape with respect to a plane normal to a lateral axis 516. This embodiment is similar to the one illustrated in FIGS. 80-83, except that the pulleys are located along the hemi-circular sides of the buoy (instead of the along the linear sides of the buoy as in FIGS. 80-83).

Figure 85:
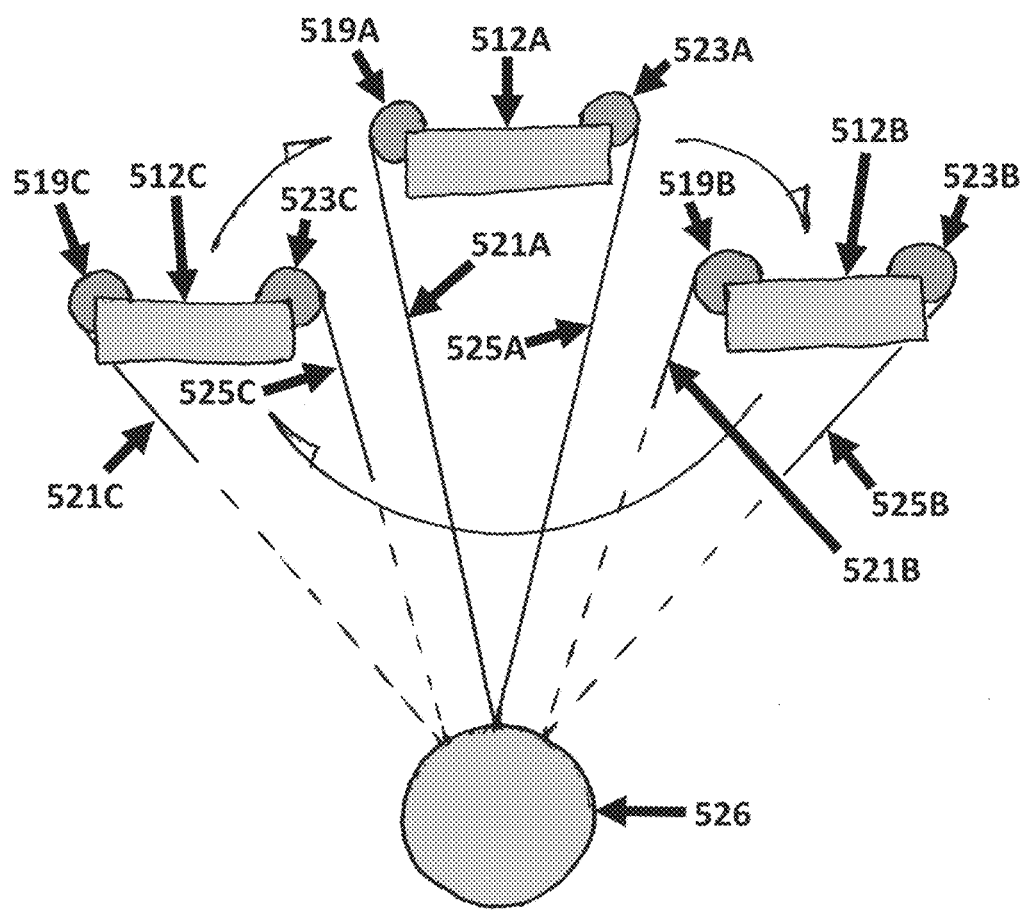
FIG. 85 is a diagram illustrating the motion of the embodiment of FIG. 84 in response to passing waves from a front perspective.

FIG. 85 shows a side view of the embodiment of the current disclosure illustrated in FIG. 84 as it oscillates with a wave. Note that with respect to this perspective, i.e. from a perspective along axis 516, the buoy's angular orientation does not change to a noticeable extent. Instead, the cables oscillate back-and-forth within the plane of rotation of each respective pulley.

Figure 86:
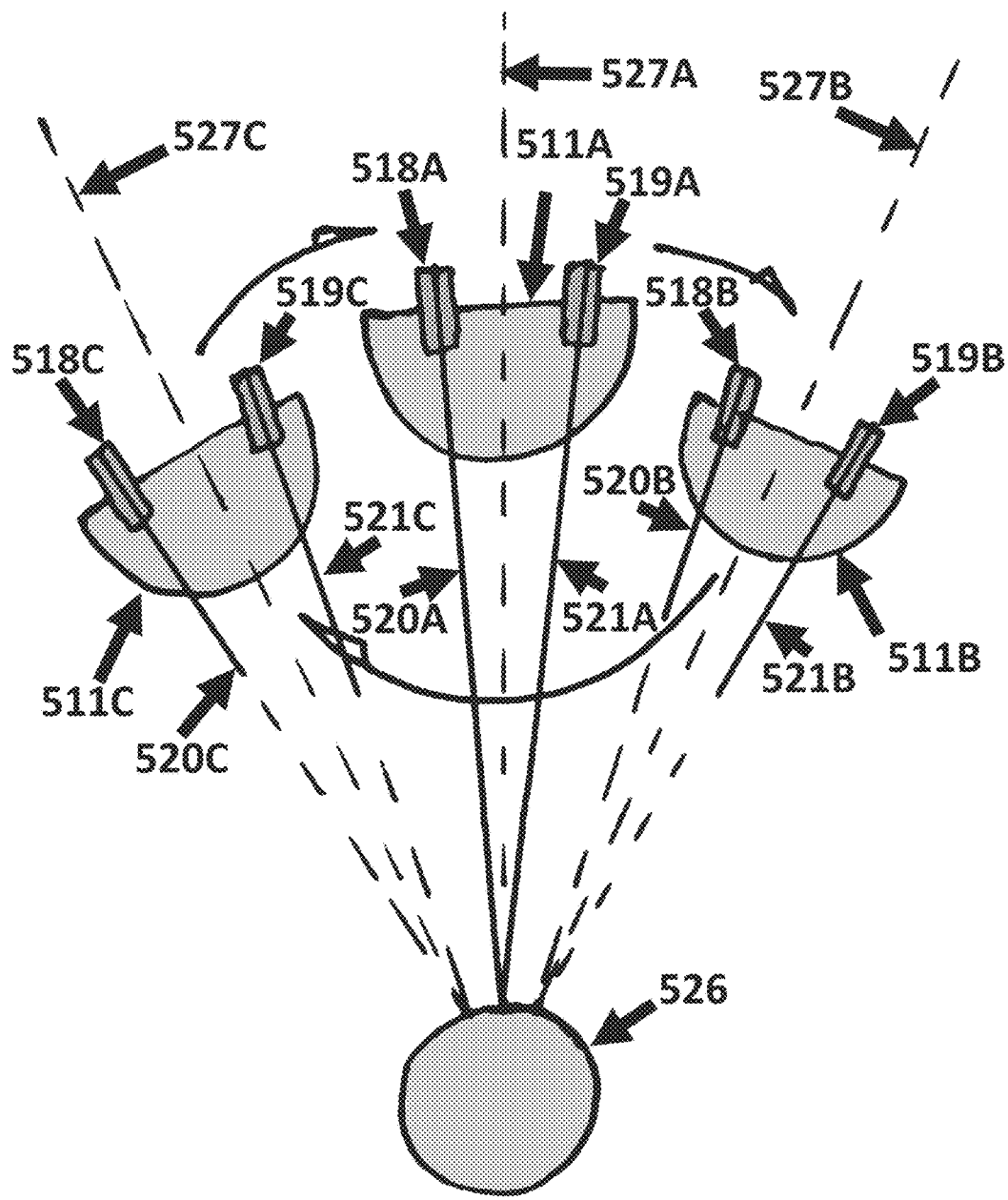
FIG. 86 is a diagram illustrating the motion of the embodiment of FIG. 84 in response to passing waves from a side perspective.

FIG. 86 shows a side view of the embodiment of the current disclosure illustrated in FIG. 84 as it oscillates with a wave. Note that with respect to this perspective, i.e. from a perspective along axis 513, the buoy's angular orientation rotates, i.e. through the imposition of differential torques across opposing pairs of pulleys, e.g. through the imposition of a greater torque to pulley 518C than to 519C, and/or through the imposition of a greater torque to pulley 519B than to 518B. The angular orientation of the buoy (with respect to this axis and this perspective) is controlled and adjusted so as to preserve the alignment of the buoy's inertial mass alignment axis and the center of the inertial mass 526.

Figure 87:
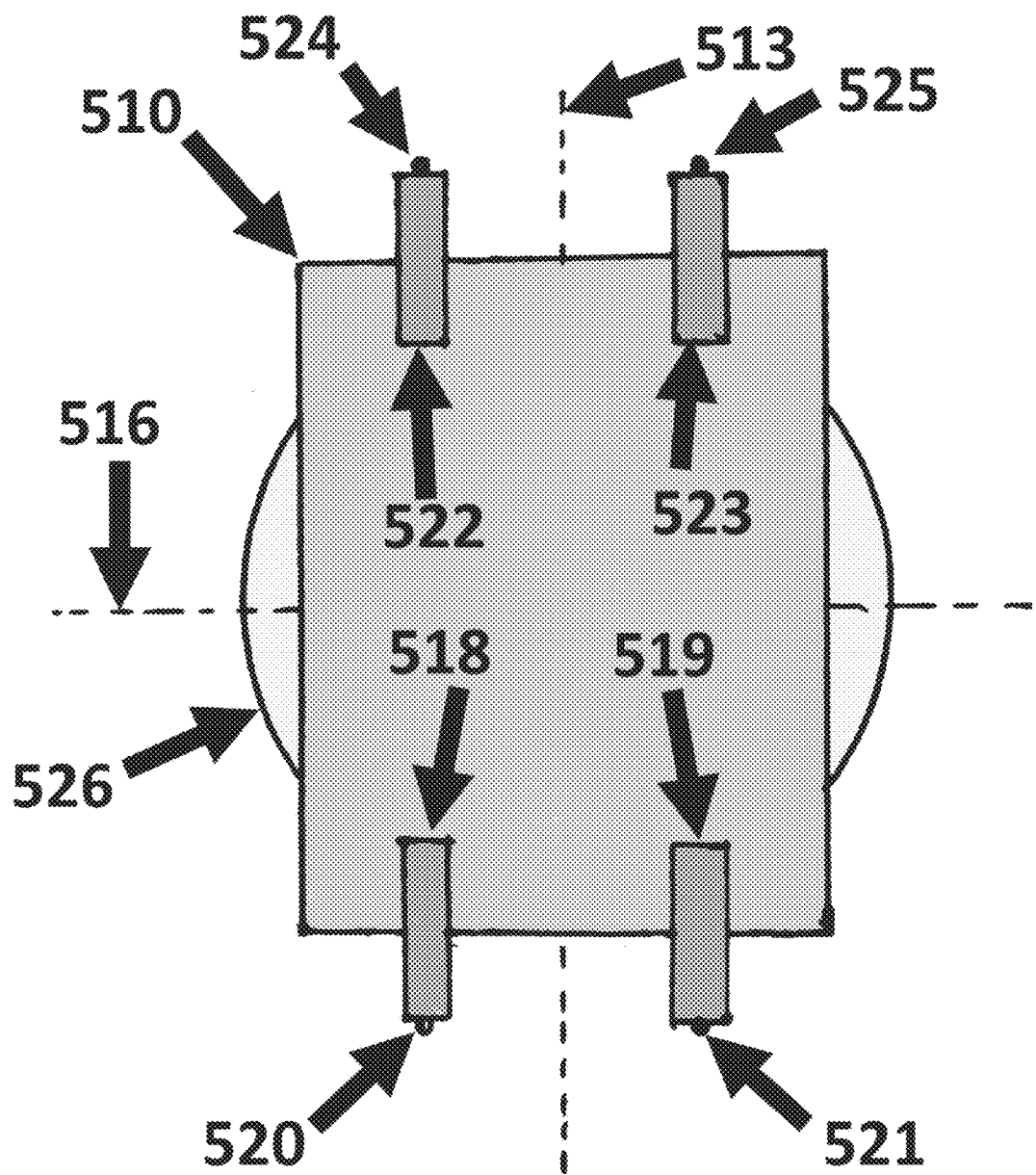
FIG. 87 is a top down view of the embodiment of FIG. 84.

FIG. 87 shows a top-down view of the embodiment of the current disclosure illustrated in FIG. 84. The buoy 510 is connected, by means of pulleys, e.g. 518-519, and 522-523, and their respective cables, e.g. 520, to a submerged inertial mass 526.

Figure 88:
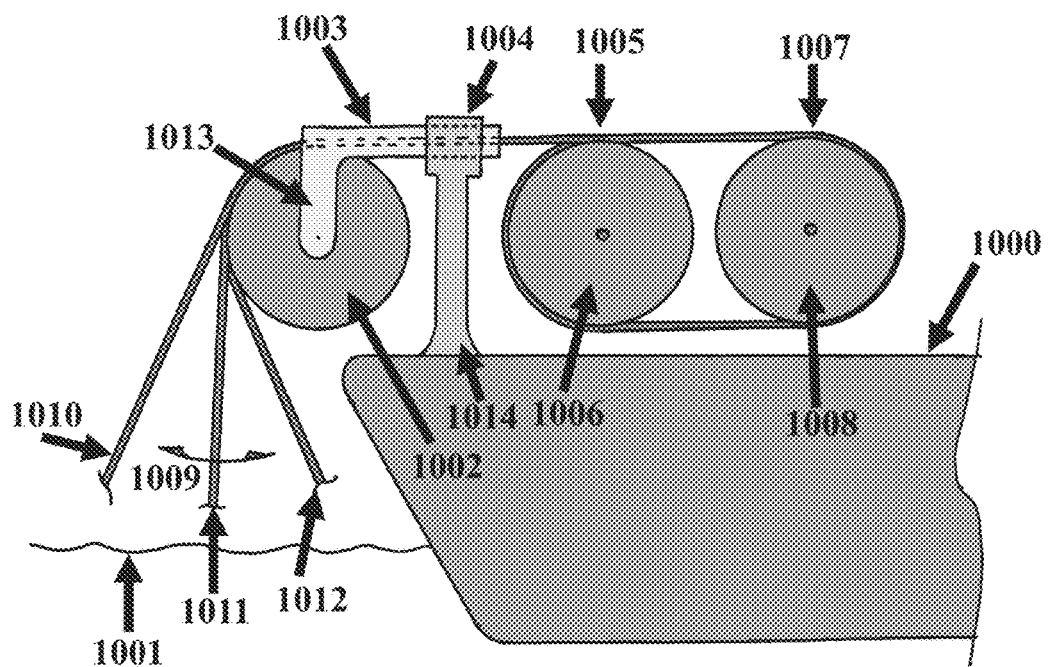
FIG. 88 is an elevated side view of a directional rectifying pulley engaging a cable.

FIG. 88 shows a side perspective of the directional rectifying pulley 1002, hollow connecting arm 1003, and traction winch 1006/1008, that characterize the embodiments illustrated in FIGS. 22-28. A directional rectifying pulley 1002 is mounted to an upper surface of a buoy 1000, and is rotatably connected to, and/or mounted on, an opposing pair of bracket arms, e.g. 1013. Those bracket arms are attached to, and/or integral with, a hollow cylindrical tube 1003. And that tube 1003 is rotatably connected to a radial bearing 1004, mounted atop a strut 1014, that allows the tube 1003 to rotate about the tube's longitudinal axis.

A cable 1010 is connected to a submerged inertial mass (not shown). If the relative position of the inertial mass moves within the plane of the figure's page, i.e. within the plane of the directional rectifying pulley's 1002 plane of rotation (which is coplanar with the page), then the cable will tend to vary its position in a manner represented by the various cable positions 1010-1012 included within the illustration. In other words, the cable will tend to move 1009 within the plane of the page.

A change in the angular position at which the cable 1010 enters the "groove" of the pulley (i.e. the open channel into which the cable will be seated as it, and the pulley, together turn about the pulley's axis of rotation) is irrelevant with respect to the wear and risk of damage to the cable. This is perhaps obvious since the pulley's rotation makes any particular angular point of cable engagement equivalent to any other such point.

Because the cable 1010 always approaches the rollers 1006 and 1008 of the traction winch from the same point, i.e. from the hollow interior of the proximate end of the hollow connecting arm 1003, it always approaches them within their respective planes of rotation.

Figure 89:
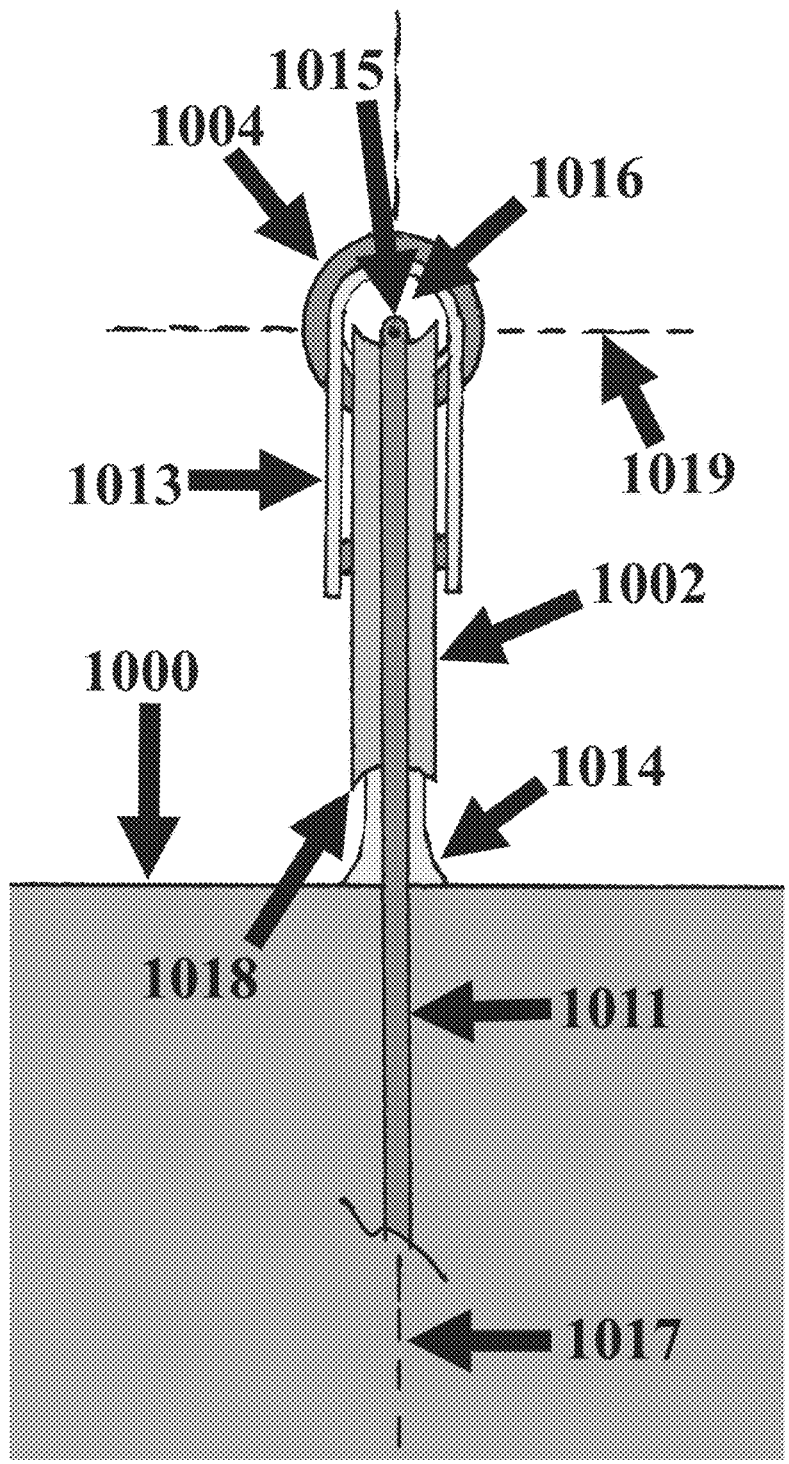
FIG. 89 is an elevated front view of the directional rectifying pulley in FIG. 88.

FIG. 89 shows the same directional rectifying pulley illustrated (from a side perspective) in FIG. 88. However, in FIG. 89, the directional rectifying pulley 1002 is illustrated from a front perspective.

The vertical and/or upright orientation of the pulley 1002 is the same as its orientation in FIG. 88. Note that the cable 1011 is aligned with a plane at 1017, and normal to the page, that is coplanar with the pulley's plane of rotation. Note that the cable passes over the top of the pulley, and then into the interior of the cylindrical hollow connecting arm, at the location specified by the intersection of the lines 1017 and 1019.

The hollow connecting arm rotates within a radial bearing 1004.

If the pulley 1002 were unable to rotate about the longitudinal axis of the hollow connecting arm, and the cable

1011 were to be pulled down, as if by an inertial mass that was resisting an upward acceleration of the buoy 1000, and also including a lateral component to the cable's direction, i.e. no longer aligned with line 1017 and the plane passing through it normal to the page, and to its pulling, then the cable might be pulled across the relatively sharp edge 1018 of the pulley causing it and/or the pulley to be damaged.

Figure 90:
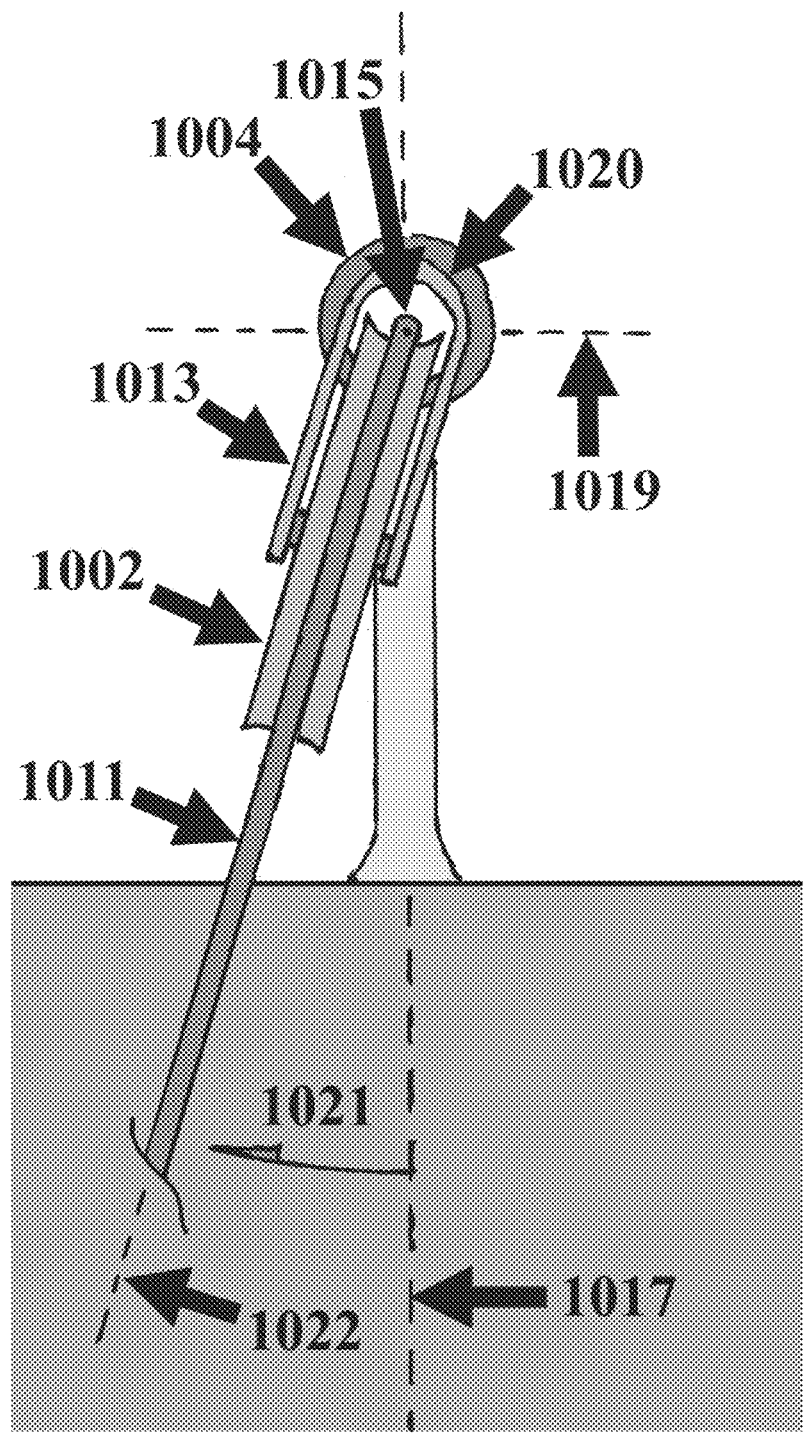
FIG. 90 is an elevated front view of the directional rectifying pulley in FIG. 88 in which the pulley's angular orientation has changed to as to maintain an optimal fleet angle.

FIG. 90 shows the same directional rectifying pulley illustrated and discussed in relation to FIGS. 88 and 90. As in FIG. 89, the directional rectifying pulley 1002 illustrated in FIG. 90 is illustrated from a front perspective.

FIG. 90 illustrates the change in angular orientation of the directional rectifying pulley 1002 in response to a "sideways" pulling of the cable 1011, i.e. a downward pulley of the cable that, at least partially, pulls the cable out of the plane normal to the page and passing through line 1017. In this case the cable has been pulled 1021 from the plane at 1017 to a plane at 1022.

In response to this sideways pulling of cable 1011, the hollow connecting arm 1020 to which the directional rectifying pulley 1002 is connected by bracket arms 1013, has rotated within radial bearing 1004 to as to assume its illustrated angular orientation in which its plane of rotation is now (and/or still) coplanar with the plane (at 1022) in which the cable is moving and/or being pulled.

Because the pulley's axis of rotation 1021 is about an axis normal to the page and passing through the planes normal to the page and intersecting the page at lines 1017 and 1019, the point 1015 at which the cable leaves the pulley and travels on to the traction winch remains unchanged.

The directional rectifying pulley herein disclosed avoids the cable damage and wear frequently attributed to "excessive fleet angle," i.e. to angles at which a cable approaches and enters a pulley that cause the cable to abrade the sharp edges of a pulley.

Figure 91:
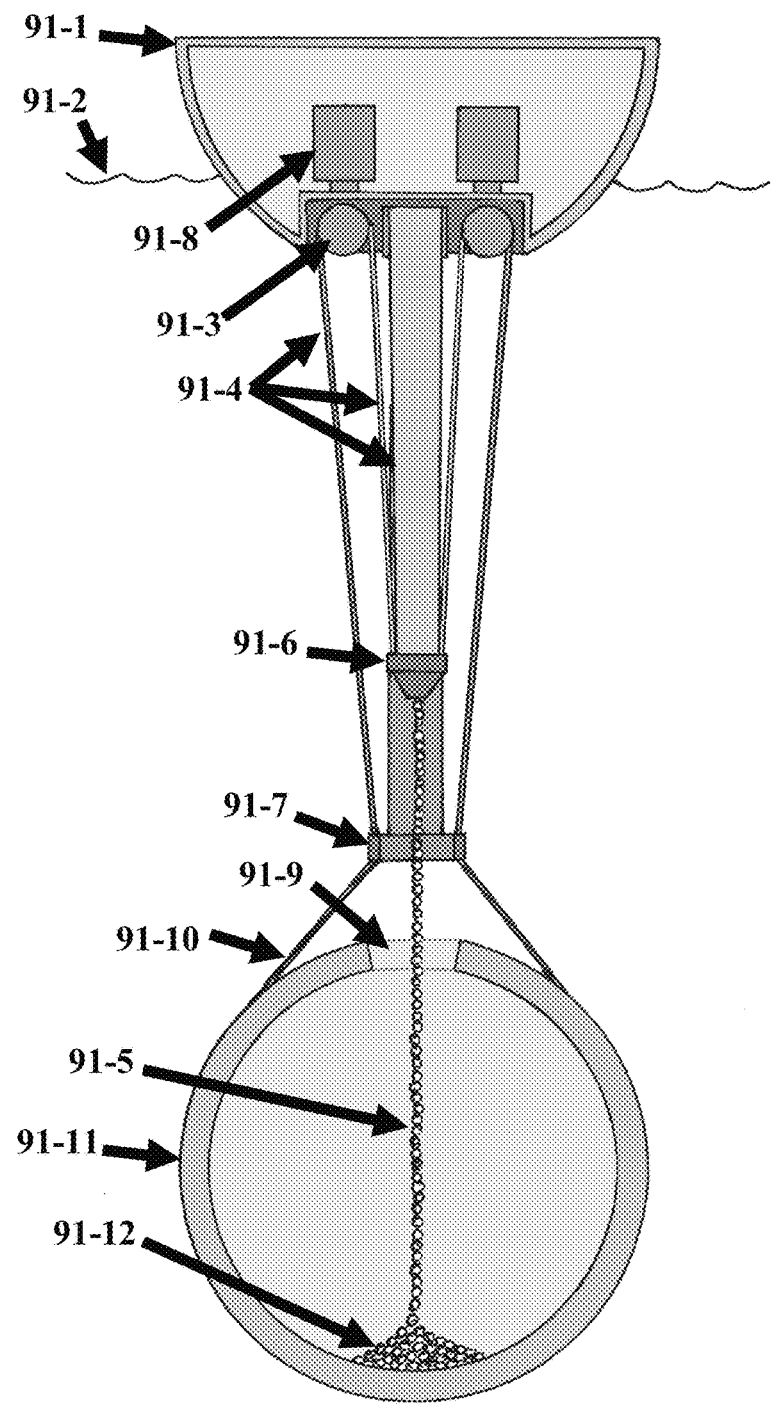
FIG. 91 is an sectional view of an embodiment of the present invention.

FIG. 91 shows a vertical cross-sectional view of an embodiment of the present disclosure. Floatation module 91-1 is a directional rectifying buoy and is shown to be floating in body of water 91-2. Pulleys/sheaves/drums 91-3 are inset into the OML of floatation module 91-1. Shafting not shown runs through the cylindrical axes of drums 91-3 and is coupled to shafting in PTO module 91-8. PTO module 91-8 may be an electrical generator, gearbox, hydraulic pump, brake, or any number of other mechanical devices or combinations thereof. The common feature of any component options comprising PTO module 91-8 is that they can provide torque opposite the direction of drums' 91-3 rotation. This countertorque provides the resistance which allows power to be extracted from the rotating drum.

Flexible connectors 91-4 consist of many individual strands of wire, cable, chain, rope, etc. arranged in a linear array such that they resemble a ribbon. Flexible connectors 91-4 pass over and around drums 91-3, but cannot slip relative to the surface of drums 91-3. This can be accomplished by wrapping the flexible connector several times on the drum and fixing its end to the drum surface. This implies that linear motion of flexible connectors 91-4 will cause rotative motion of drums 91-3. The flexible connectors located outboard of drums 91-3 transit to, and interface with, confluence structure 91-7, which is ring shaped and contains an aperture in its center. Mating connectors 91-10, which may be single elements or ribbon arrangements, transit from confluence structure 91-7 and interface to, wrap around, or otherwise mate with spherical inertial mass (IM) 91-11. IM 91-11 is shown to have a rigid outer shell with aperture 91-9 located at its top-center. IM 91-11 is filled with water and has a positive net weight in water that would cause it to sink if not restrained. Flexible connectors 91-4 located inboard of drums 91-3 transit down and are mated to ribbon spreader structure 91-6. Depending from ribbon spreader structure ("ribbon junction bar") 91-6 is a flexible linear distribution of weight 91-5 which may be chain, wire, weights hung from rope, or any of a multitude of configurations (hereafter it shall be referred to as chain for clarity). The chain 91-5 passes through the IM aperture 91-9 and some of the chain 91-5 may be resting on the bottom of the IM (91-12), adding to the net weight of the IM itself (91-11). The distribution of weight between the IM 91-11 and chain 91-5 can be such that in a situation with no forces being imparted by the environment or PTO module 91-8, that the system can find equilibrium. This happens due to the IM 91-11 falling until enough chain 91-12 (weight) is picked up off the IM's bottom 91-12 (thereby reducing the net weight of the IM) and subsequently hung from ribbon spreader structure 91-6 which increases the weight counteracting the fall of the IM. This has the advantageous feature of being a passive "off" configuration which the system can obtain in the event of a failure, or merely in calm, waveless conditions.

When the system is in operation and power is being taken off from drums 91-3, the IM 91-11 will rise in the water column and as a result, more chain 91-5 will rest on the bottom of the IM 91-12. By actively controlling countertorque applied by PTO module 91-8 to drums 91-3, different operational depths, or operational depth ranges, above the passive "off" configuration can be achieved and maintained. Doing this allows the net weight of the IM 91-11 to be varied in a simple and robust manner. This feature can be used to "tune" the system to different wave conditions, since the optimal IM weight for maximizing power take off can depend on the wave conditions (wave height, period, spectrum) the system is experiencing.

Figure 92:
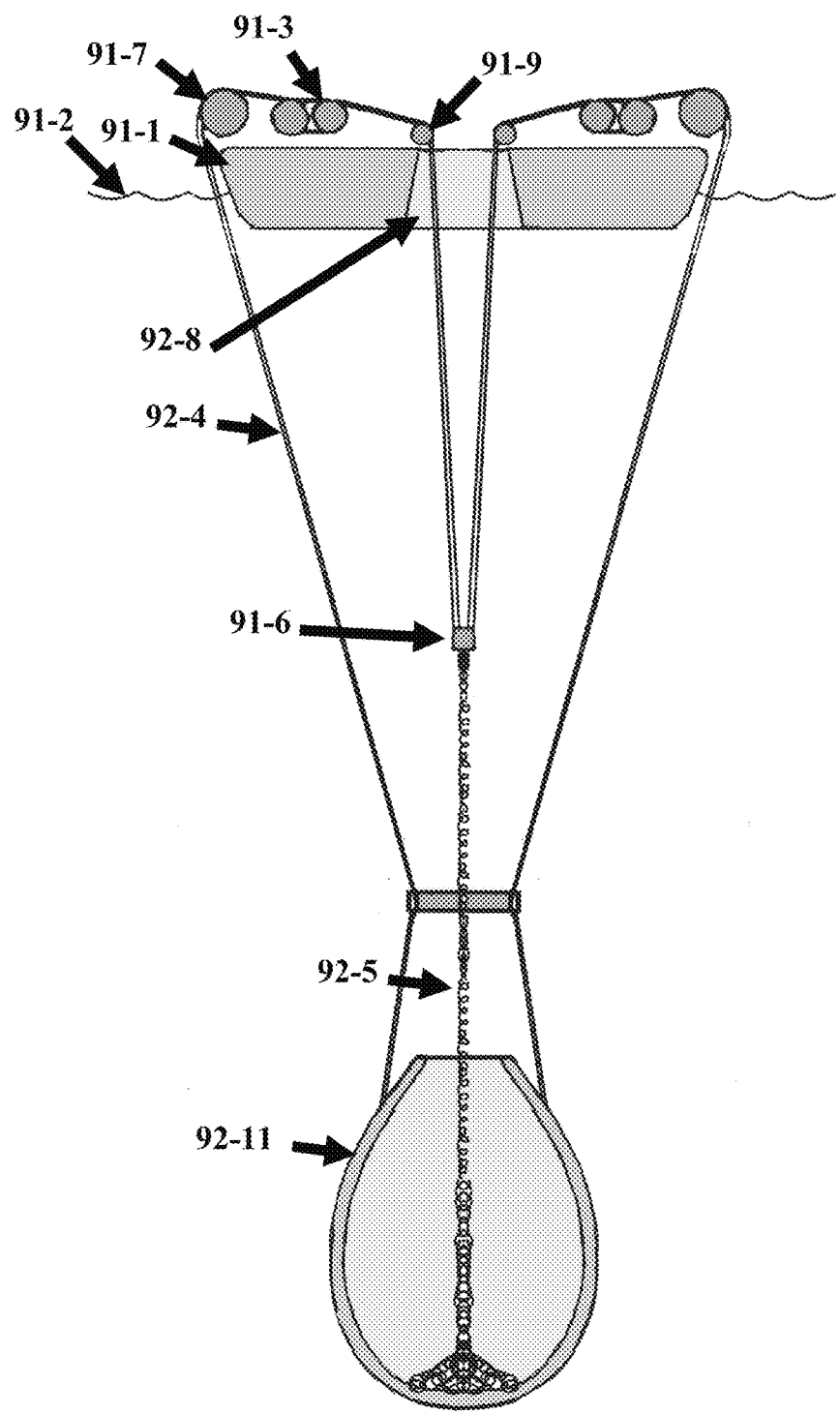
FIG. 92 is an sectional view of an embodiment of the present invention.

FIG. 92 shows a vertical cross-sectional view of an embodiment of the present disclosure. Floatation module 92-1 is shown to be floating in body of water 92-2. The principle of dynamically changing the net weight of IM 92-11 utilizing a stranded assembly of weights 92-5 and is principally the same as FIG. 91. The IM 92-11 in this embodiment is shown to have a truncated teardrop shape.

The primary difference between this embodiment and FIG. 91 is that the floatation module 91-1 is not of a directionally rectifying form. Instead, directionally rectifying pulleys 91-7 are used, which allow flexible connectors 92-4 to always feed onto the groove in pulley 91-7 without an incident angle, regardless of the angle of flotation module 91-1 or its relative position or angle to IM 92-11. Flexible connector 92-4 is shown to be constructed of a single tensile element. This may be a rope, wire, cable, chain, or other material/construction. Flexible connector 92-4 interfaces with drums 91-3 by having multiple wraps around the outside surface of each in a manner similar to a traction winch. This allows the drums 91-3 to rotate and no relative slipping to occur between their surfaces and flexible connector 92-4, even when relatively large forces are developed in flexible connector 92-4. PTO modules are implied to interface with one or more of drums 91-3, which would extract power by applying a countertorque via an electric motor, hydraulic pump, or other means. Flexible connector 92-4 is shown to pass over sheave 91-9, through aperture 92-8, and merge at confluence point 91-6 (in a similar manner to FIG. 91). Two directionally rectifying pulley/traction winch drum assemblies (91-7, 91-3, 91-9) are shown in this figure but many more could be used in parallel, arrayed in a radial fashion about aperture 92-8.

Figure 93:
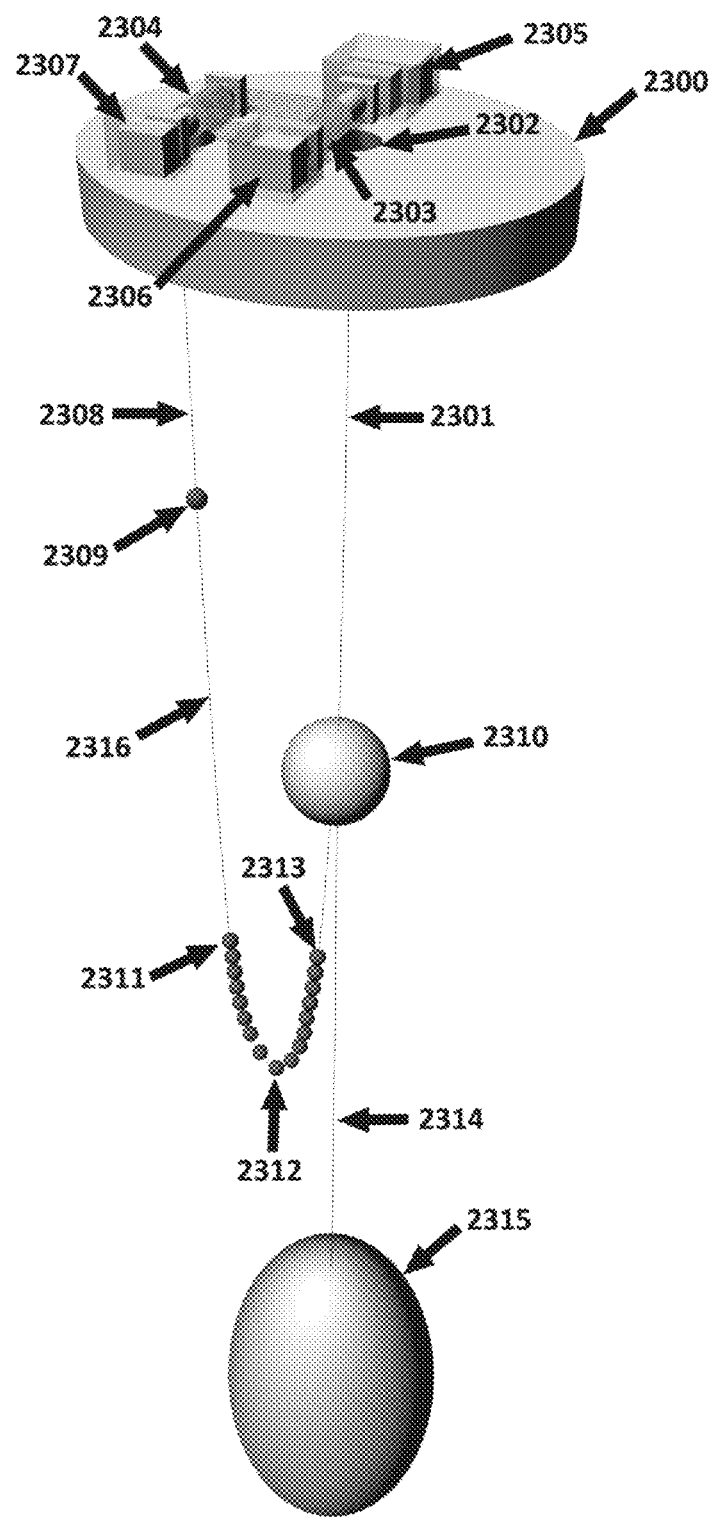
FIG. 93 is an elevated perspective view of an embodiment of the present invention.

FIG. 93 shows a perspective view of an embodiment of the present disclosure, from a vantage point above and to the side of the embodiment. The flotation module 2300 floats adjacent to the surface of a body of water (not shown). A flexible connector 2301/2308 is wound many times around a two-shaft rotating capstan 2303, which is similar to a traction winch. The flexible connector 2301 descends from the two-shaft rotating capstan 2303, through a vertical aperture 2302 near the center of flotation module 2300. One end of connector 2301 is connected to a float (i.e., a buoyant object) 2310. Another flexible connector 2314, or another portion of the same flexible connector 2301, connects the float 2310 to an "inertial mass" 2315.

In one embodiment, the inertial mass 2315 is a water-filled vessel that has a substantial mass (i.e., due largely to the water inside). Taking into account the water inside the inertial mass and also taking into account any "inertial mass weighted portion" that may be included in or be affixed to or that may depend from the inertial mass, the inertial mass in this embodiment has a greater average density than water. But, its average density will typically be not very much greater than water (e.g., it can be in the range of 1020 to 1080 kg per cubic meter, but can also be outside this range), so that its "net weight" (i.e., the gravitational weight of the vessel including the water inside, less the buoyant force upon it owing to its displacement, i.e., the gravitational weight of the vessel including the water inside less the gravitational weight of an equivalent volume of water) while appreciable in everyday terms, is far, far smaller than the net weight of a similarly sized object made of a material such as concrete or steel. Consequently, the inertial mass can have a large inertia, but impose relatively small buoyancy requirements on the flotation module.

Note that it is generally preferable to provide for lengths of flexible connector that allow the inertial mass to be situated at, near, or below a wave base of the body of water when the converter is deployed, e.g., 20 meters depth or more, and sometimes more than 40 meters depth (e.g., 50 meters, 60 meters, 70 meters, 80 meters), depending on the prevailing wave climate.

Descending from the other end of the two-shaft capstan 2304, through a more peripherally-positioned vertical aperture (beneath 2304), is another end 2308 of the same flexible connector that is wound about two-shaft capstan 2303. This flexible connector 2308 is connected to a weight 2309.

In some other embodiments of the present disclosure (not pictured), a three-shaft capstan or traction winch is used. In some embodiments, a four-shaft capstan or traction winch is used. In these embodiments, the flexible connector is wound around all capstans in an analogous manner to the manner in which it is wound around the two capstans here. The multiple capstans are positioned so that their longitudinal axes are parallel, and so that they are not coplanar, i.e., the winding of the flexible connector over a three-shaft capstan approximately traces out a triangle.

In some other embodiments of the present disclosure (not pictured), the rotating capstans (or chainwheel, or spiral capstan, as applicable) is/are fully or partially submerged in the body of water. It/they can, for instance, be affixed to a bottom, rather than a top, surface of the flotation module.

In one embodiment, the "restoring weight" 2309 is an object having a relatively small mass, but due to its having a relatively great density, it has a relatively small, but significant and positive, net weight in water. Its purpose is to help "rewind" or "reset" the flexible connector 2308, or in other words to take up slack in it.

As waves lift and let fall flotation module 2300, float 2310 and inertial mass 2315 are pulled upward, i.e., an upward force is imparted to them by a tension in flexible connector 2308. Owing to a countertorque applied by a generator to at least one of the constituent rotating capstans of the two-shaft capstan 2303 when the floatation module is being accelerated away from the inertial mass, this tension can be quite great in the portion of the flexible connector (2301/3214) connected to the inertial mass. Due to the large mass of inertial mass 2315, it experiences a relatively small degree of upward acceleration in response to this force. By contrast, restoring weight 2309 experiences a relatively large degree of upward acceleration when an equivalent force is applied to it.

As a wave recedes, and flotation module 2300 moves downward, inertial mass 2315 is able to fall under its own net weight, although there may be a delay in its assuming a downward momentum due to its relatively large mass and hence relatively large upward inertia. As the flotation module 2300 moves downward, any slack in connector 2301 is removed by the downward force imparted to flexible connector 2301, 2303, 2304, and 2308 by restoring weight 2309.

The net weight of inertial mass 2315 is, at least in part, countered and/or offset by the upward buoyant force exerted on inertial mass 2315 by float 2310. However, that float's diminution of the inertial mass's net weight is itself diminished, at least in part, by any, some, none, or all, of a string of relatively small "offset weights" 2311-2313 whose net weights are variously supported by either the float 2310 and/or by the flotation module 2300.

Any offset weights, e.g., 2313, that hang from float 2310 diminish the amount of buoyant force that the float 2310 exerts on inertia mass 2315, effectively reducing the net weight of the inertial mass 2315. Whereas any offset weights, e.g., 2311, that instead hang from flotation module 2300, do not diminish the amount of buoyant force that the float 2310 exerts on inertial mass 2315. Any offset weight, e.g., 2312, whose net weight is supported in part by the buoyancy of the float 2310 and in part by the buoyancy of the flotation module 2300 will impart a corresponding fraction of its net weight to the float 2310, and, by that degree, diminish the degree to which the float 2310 reduces the effective net weight of the inertial mass 2315.

The illustrated embodiment of FIG. 23 allows the effective net weight of the inertial mass 2315 to be adjusted, tuned, altered, and/or optimized, by directing the control system, e.g., inside power take-off 2305, to raise or lower the average depth of the inertial mass (e.g., by converting less or more, respectively, of the available wave energy to electrical power, leaving more or less, respectively, of the available wave energy to impart an upward momentum to the inertial mass), and therefore raise or lower the average depth of the float 2310.

By lowering, i.e., increasing, the average depth of float 2310, a number of offset weights, whose net weight would have otherwise been supported and/or offset by the buoyancy of float 2310, will instead have their net weight supported by the buoyancy of the flotation module 2300. This has the effect of causing a correspondingly greater amount of the buoyancy of float 2310 to reduce the effective net weight of inertial mass 2315—thereby reducing the effective net weight of the inertial mass 2315.

By raising the float 2310, i.e., reducing the average depth of float 2310, a number of offset weights, whose net weight would have otherwise been supported and/or offset by the buoyancy of flotation module 2300, instead have their net weight supported by the buoyancy of the float 2310. This has the effect of causing a correspondingly reduced amount of the buoyancy of float 2310 to reduce the effective net weight of inertial mass 2315—thereby increasing the effective net weight of the inertial mass 2315.

Module 2305 contains a generator and/or other power take-off which converts at least some of the rotational kinetic energy and/or torque manifested in capstan/shaft 2303 into electrical power. Modules 2306-2307 may contain additional power take-offs and sensors (e.g., of angular frequency, of torque, of angular displacement or velocity or rotation rate, of the shaft/capstan 2303, etc.).

Figure 94:
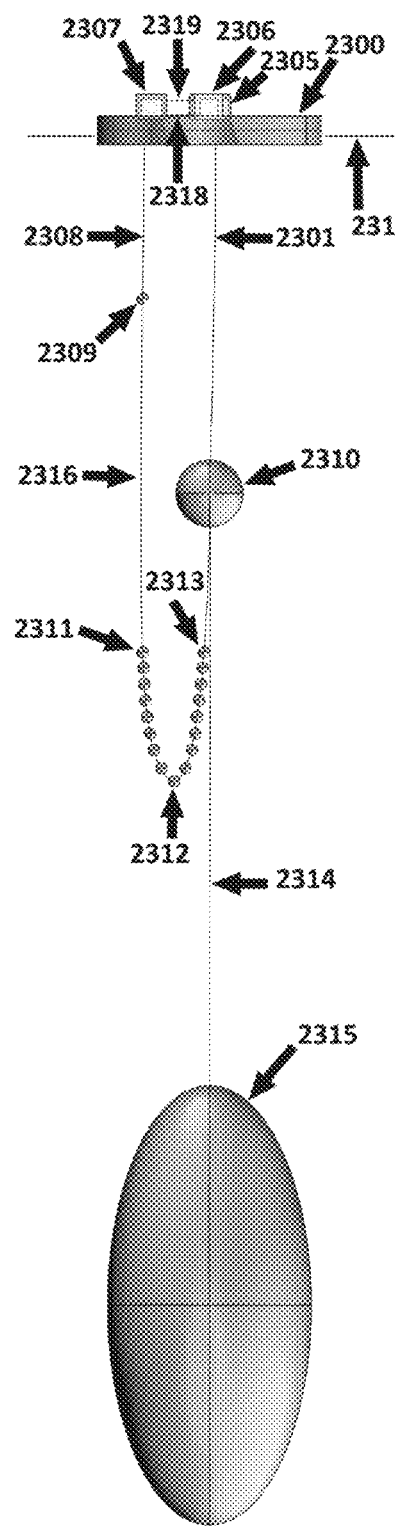
FIG. 94 is an elevated side view of the embodiment of FIG. 93.

FIG. 94 shows a side view of the same embodiment of the present disclosure that is illustrated in FIG. 93, where the walls of the flotation module 2300 have been made partially transparent for the sake of illustration. The frustoconical walls of apertures 2302 (see FIG. 93) are visible.

The portions of the flexible cable wound about the two shafts of the capstan are illustrated. Those portions of the flexible connector that are tangential to the tops of the capstan shafts are shown at 2319. Those portions tangential to the bottoms of the capstan shafts are shown at 2318.

Figure 95:
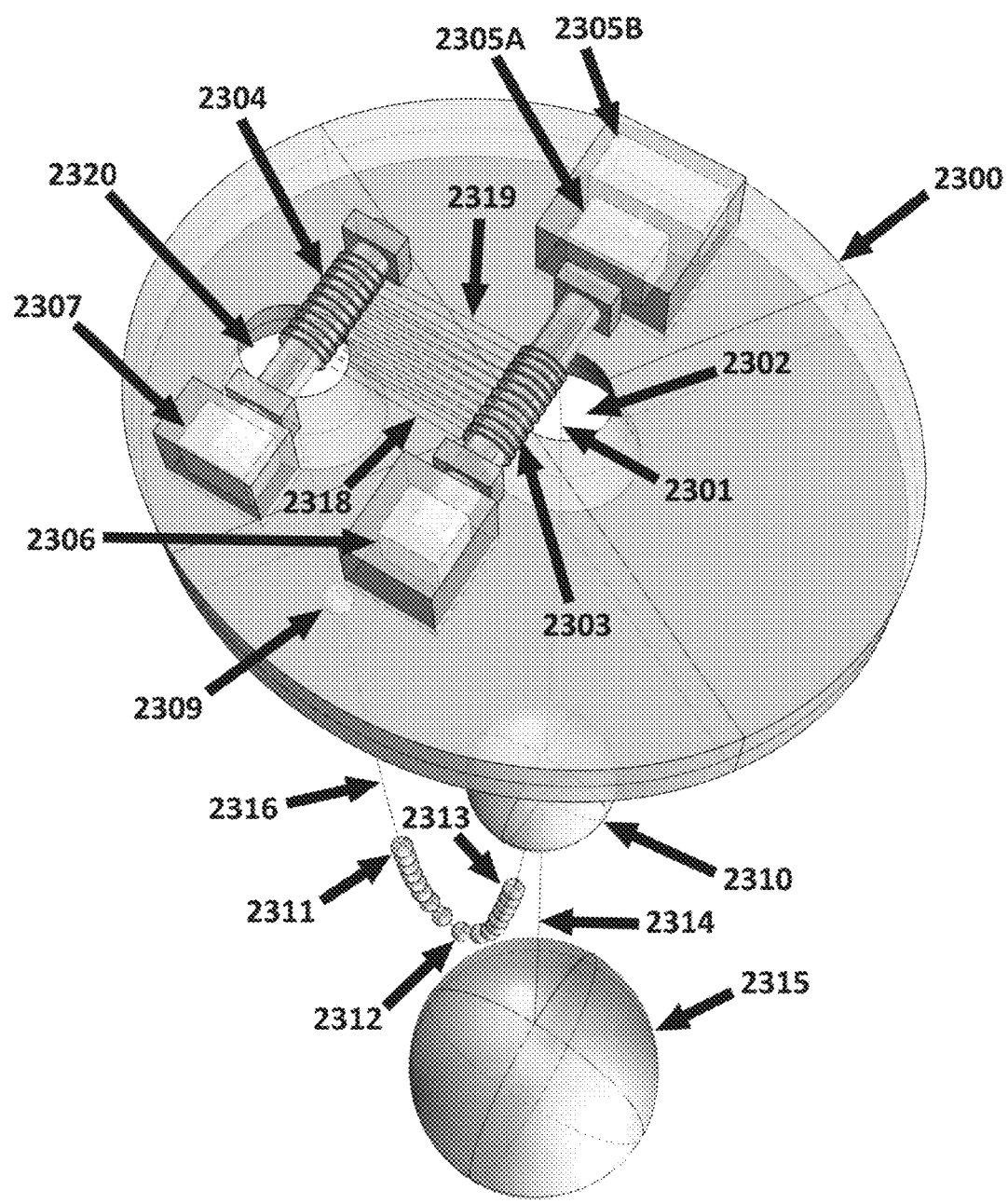
FIG. 95 is an elevated top down view of the embodiment of FIG. 93.

FIG. 95 shows a perspective top-down view of the same embodiment of the present disclosure that is illustrated in FIGS. 93 and 94.

Flexible connector 2301 descends from capstan shaft 2303 and passes through aperture 2302 where it connects to float 2310, and thereafter (perhaps indirectly through float 2310) to inertial mass 2315. After passing over and on to shaft 2303 of the capstan, flexible connector 2301 is wound 2319 and 2318 over the two capstan shafts (in a spiraling fashion) approximately nine times, after which the other end of the flexible connector descends from capstan shaft 2304 and passes through aperture 2320 where it connects to restoring weight 2309. Rotating capstan shafts 2303 and 2304 each have a series of raised ridges forming inset sheaves in which segments of connector 2301 can run.

In one embodiment, module 2305 is a power take-off and control system, including a generator and a suite of sensors (for the angular position and velocity of the capstan) and control system circuits. The resistive torque (and the electrical power) generated by a generator 2305A is controlled by a power control subassembly 2305B. 2306 is a brake that can apply a braking resistance to the capstan, e.g., without generating electrical power. The generator 2307 is operatively connected to capstan 2304.

Figure 96:
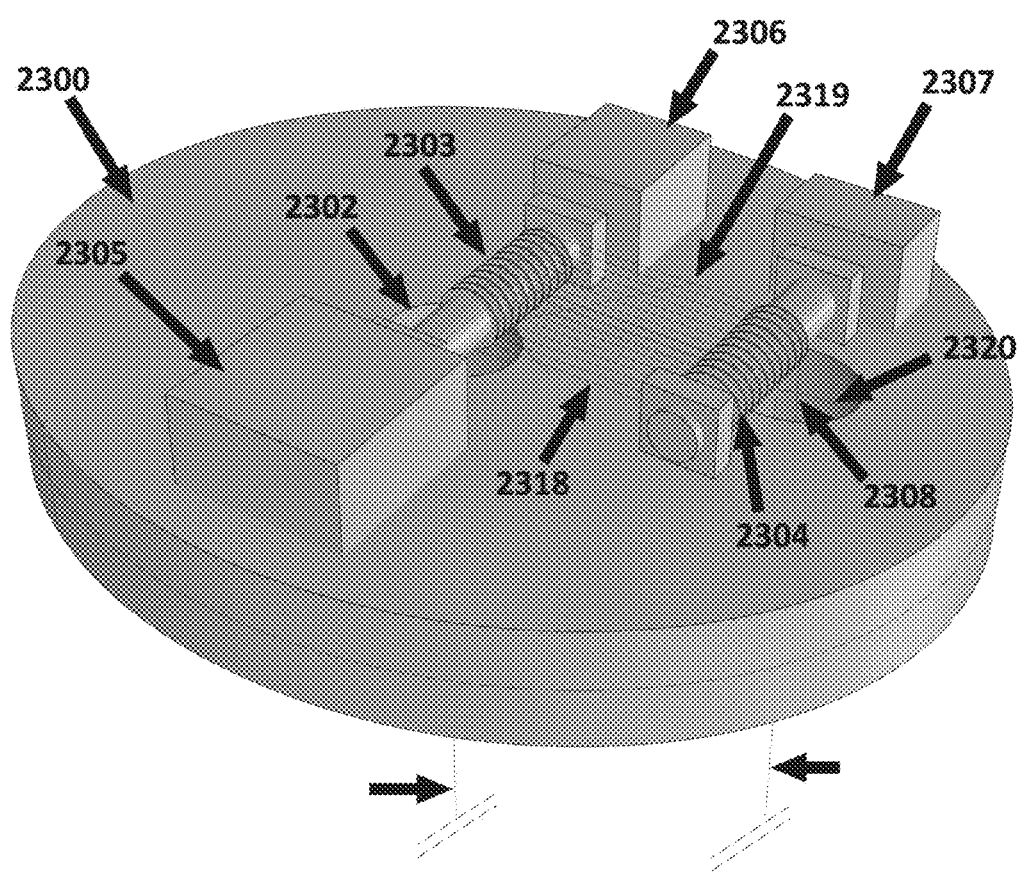
FIG. 96 is an enlarged top down view of the flotation module of the embodiment of FIG. 93.

FIG. 96 shows a perspective side view of the flotation module of the same embodiment of the present disclosure that is illustrated in FIGS. 93-95.

Figure 97:
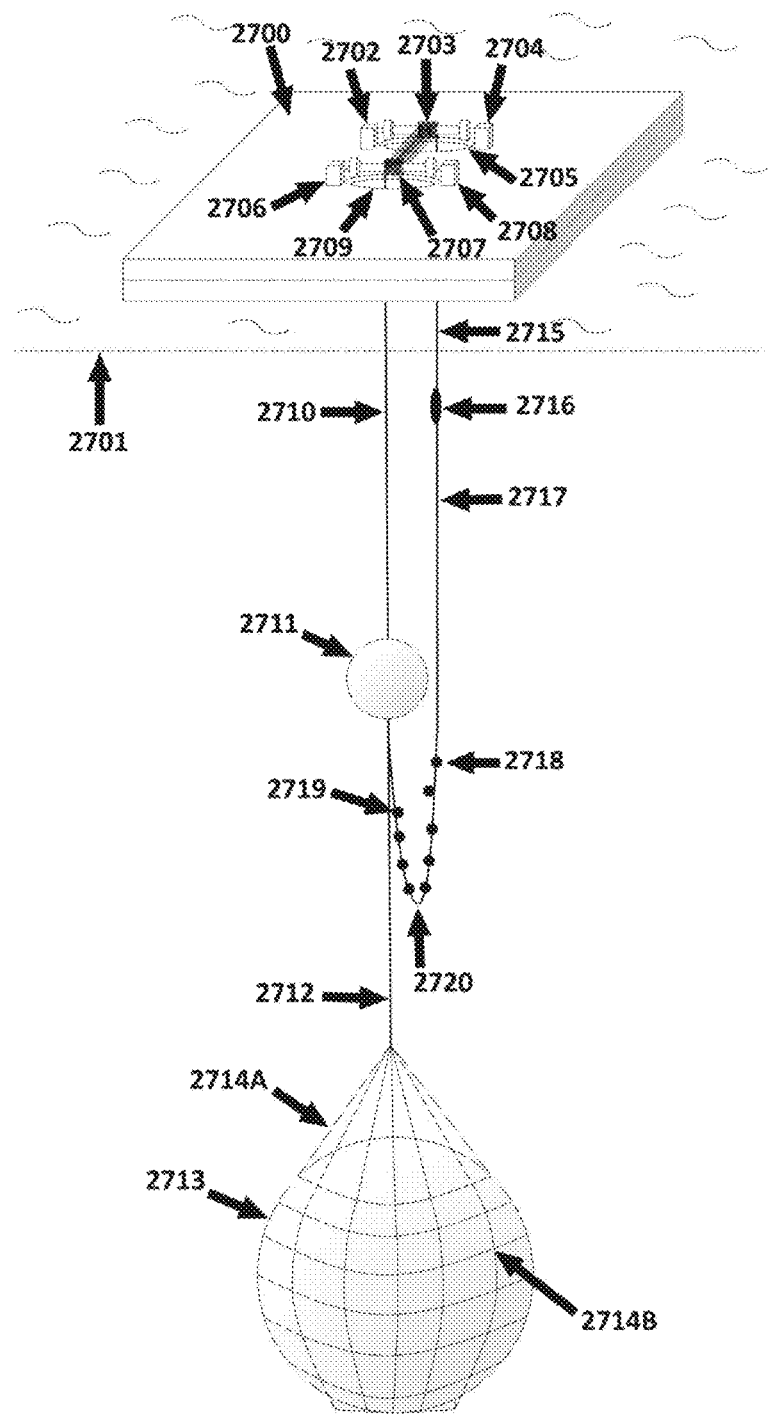
FIG. 97 is an elevated perspective view of an embodiment of the present invention.

FIG. 97 shows a perspective view of another embodiment of the present disclosure. A flotation module 2700 floats adjacent to the surface 2701 of a body of water. Descending from one shaft 2707 of a two-shaft capstan (around which a flexible connector is wound many times), through a vertical aperture 2709, is a flexible connector 2710. The deep end of connector 2710 is connected to a float (i.e., a buoyant object) 2711. Another flexible connector 2712, or another portion of the same flexible connector 2710, connects the float 2711 to an "inertial mass" 2713. The inertial mass 2713 is connected to flexible cable 2712 by a "net" 2714 (which can be a sling, or a mesh of cords that entrap the inertial mass 2713). In one embodiment, the inertial mass 2713 is a water-filled vessel that has a substantial mass (i.e., due largely to the water inside) and a relatively smaller "net mass" (i.e., the mass of the vessel less the mass of an equivalent volume of water).

Descending from the other shaft 2703 of the two-shaft capstan, through a second vertical aperture 2705, is another end 2715 of the same flexible connector that is wound about the two-shaft capstan. This flexible connector 2715 is connected to a restoring weight 2716. In one embodiment, the restoring weight 2716 is an object with a relatively small mass, but due to a relatively great density, a significant and positive net weight.

Flotation module 2700, capstan power take-off assembly 2702-2704, 2706-2708, float 2711, restoring weight 2716, offset weights 2718-2720, and inertial mass 2713, serve the same operational functions, and exhibit the same operational behaviors, as is discussed in relation to FIGS. 93-96. In FIG. 97, the offset weights 2719 to the left of inflection point 2720 in flexible connector 2717 are supported, and diminish the buoyant force imparted to inertial mass 2713, by float 2711, effectively increasing the net weight of inertial mass 2713. The offset weights 2718 to the right of inflection point 2720 in flexible connector 2717 are supported by the flotation module, and not by float 2711. For this reason, these offset weights 2718 do not diminish the buoyant force imparted to inertial mass 2713 by float 2711.

This embodiment controls and/or adjusts the effective net weight of its inertial mass 2713 by controlling the degree, duration, and/or timing, of its capstan-mediated resistance of the movements of flexible connector 2710/2715 across and/or around its shafts. By resisting more aggressively, the float 2711, inertial mass 2713, and at least some of the offset weights 2719, may be raised to a lesser depth, for example, by converting some of the kinetic energy of the waves into an upward momentum of the inertial mass, via a tension in connector 2710. By resisting less aggressively, the float 2711, inertial mass 2713, and offset weights 2719, may be lowered to a greater depth (i.e., by allowing them to fall under the gravitational force that draws them to a lower, equilibrium position). This control can be intermediated by a control system, and the degree of resistance can be modified autonomously by the converter itself (in response to sensor readings) or by external intervention, e.g., upon the receipt of encoded commands from a satellite.

This embodiment can also use a motor 2702 to raise and lower the inertial mass, even in the absence of waves. This motor can be connected to a control system and remotely controlled, e.g., by satellite.

When the average depths of the float 2711 and inertial mass 2713 are increased, fewer offset weights, e.g., 2719, indirectly increase the effective net weight of the inertial mass. When the average depths of the float 2711 and inertial mass 2713 are decreased, more offset weights, e.g., 2719, indirectly increase the effective net weight of the inertial mass. This method of controlling the effective net weight of the inertial mass might be characterized as "passive" or "coupled" as it is an indirect consequence of the direct control of the average depth of the float to which the offset weights are tethered.

Figure 98:
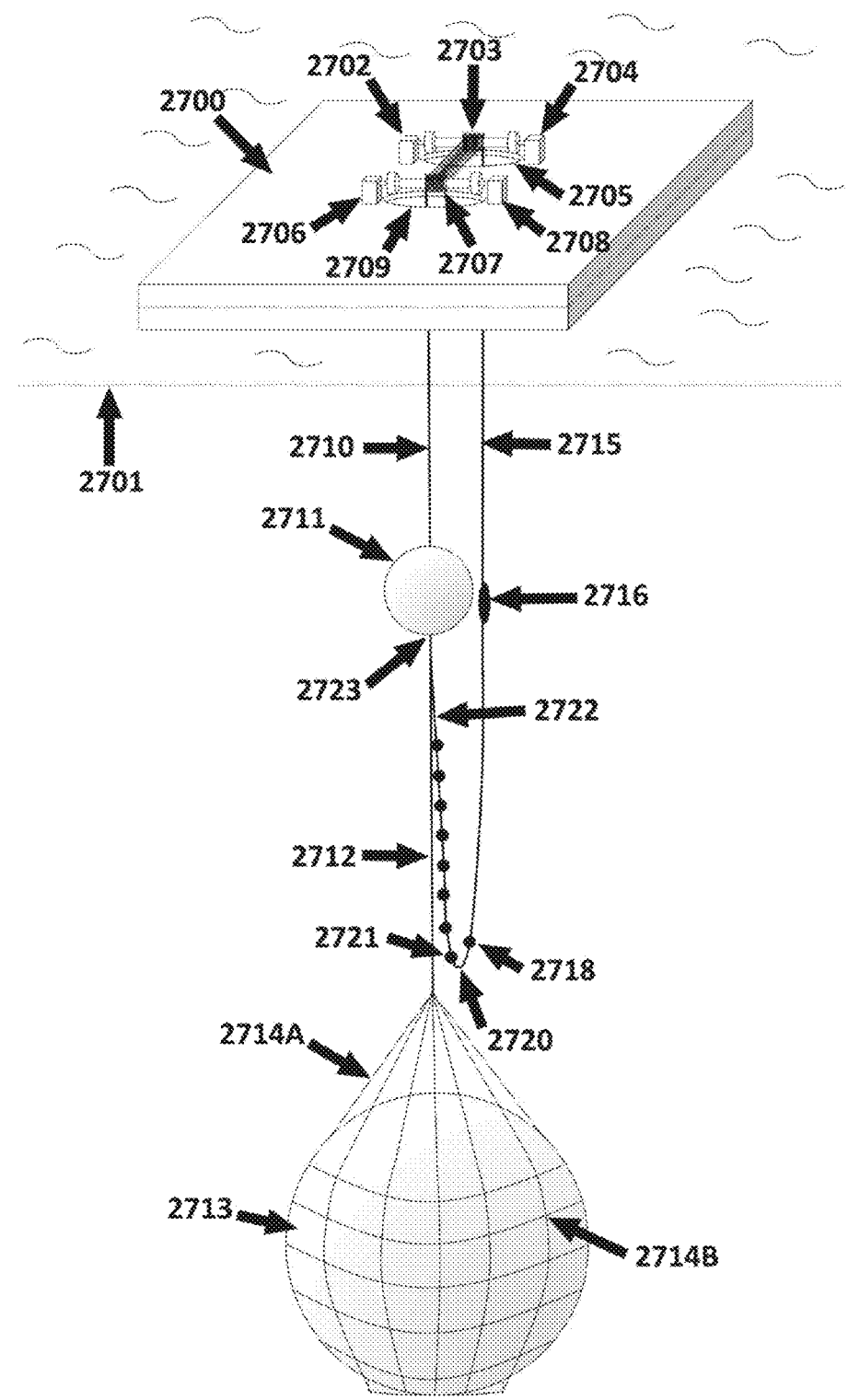
FIG. 98 is an elevated perspective view of the embodiment of FIG. 97.

FIG. 98 shows a perspective view of the same embodiment of the present disclosure as is illustrated in FIG. 97, but the average depths of the float 2711 and the inertial mass 2713 have been decreased (i.e., they have been pulled up). This has caused, relative to the configuration illustrated in FIG. 97, a greater number of offset weights 2721 to have their net weights supported by float 2711. In fact, in this illustrated device configuration, only offset weight 2718 is not being supported by float 2711. This in turn has the effect of increasing the effective net weight of inertial mass 2713 (i.e., that portion of its net weight which is not offset by the buoyant force imparted to it by float 2711).

Figure 99:
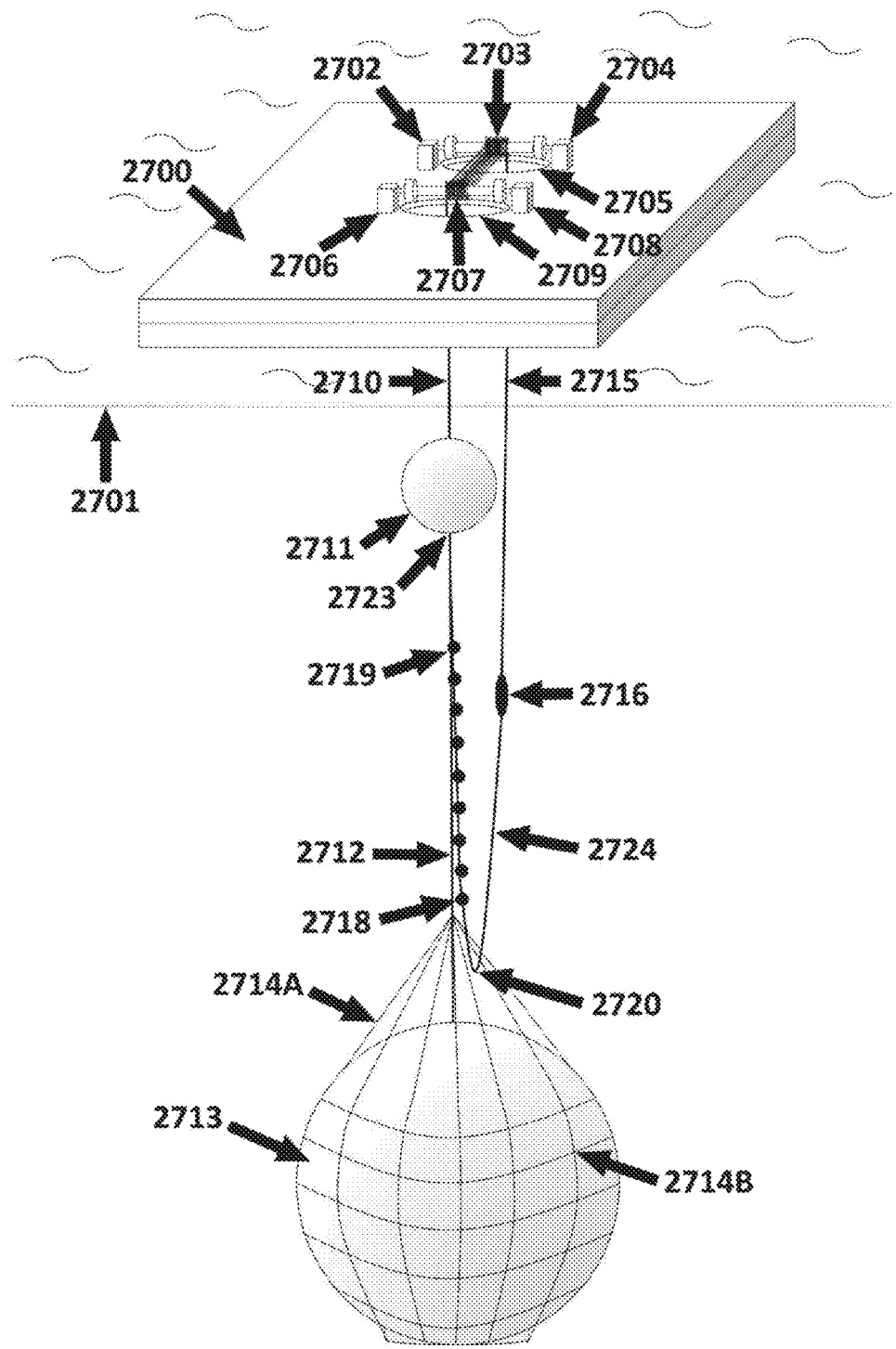
FIG. 99 is an elevated perspective view of the embodiment of FIG. 97.

FIG. 99 shows a perspective view of the same embodiment of the present disclosure as is illustrated in FIGS. 97 and 98, but the average depths of the float 2711 and the inertial mass 2713 have been further decreased (i.e., they have been pulled up even further than illustrated in FIG. 27). This has caused, relative to the configuration illustrated in FIG. 97, all of the offset weights, e.g., 2718, to have their net weights supported by float 2711. This this configuration, the effective net weight of inertial mass 2713 has been increased to the maximum possible extent.

Figure 100:
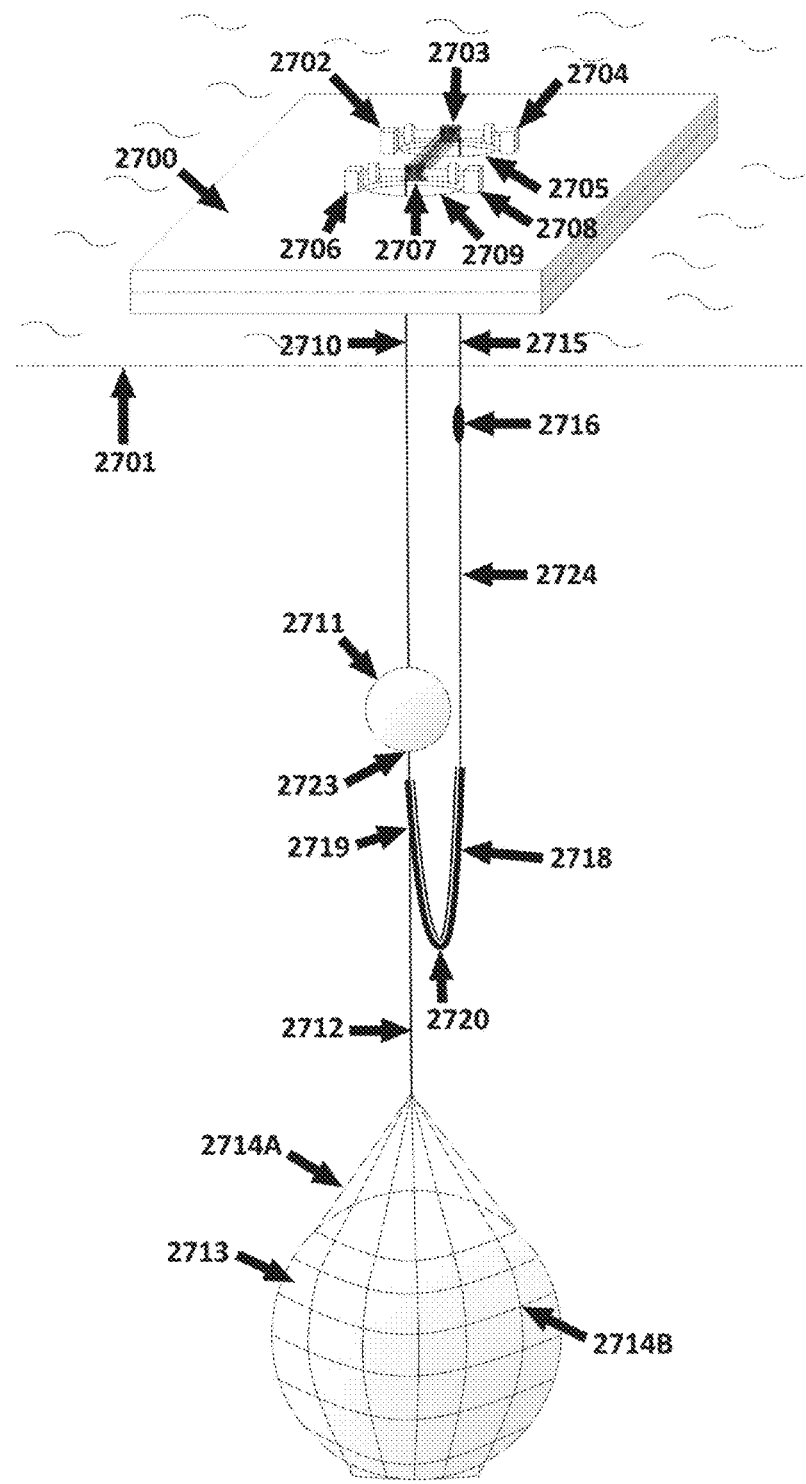
FIG. 100 is an elevated perspective view of the embodiment of FIG. 97 in which a chain has been substituted for the linked restoring weights.

FIG. 100 shows a perspective view of the what is essentially the same embodiment of the present disclosure as is illustrated in FIGS. 97-99. However, in this illustration, the string of offset weights has been replaced by a length of chain, 2718-2720, or other dense flexible elongate element, in particular, a dense flexible elongate element with a greater net weight per unit length than the flexible connector 2724. Through adjustments in the average depths of float 2711 and inertial mass 2713, the proportion of the chain's net weight that is supported by float 2711 may be altered, and the effective net weight of inertial mass 2713 may thereby be adjusted, altered, and/or controlled.

Figure 101:
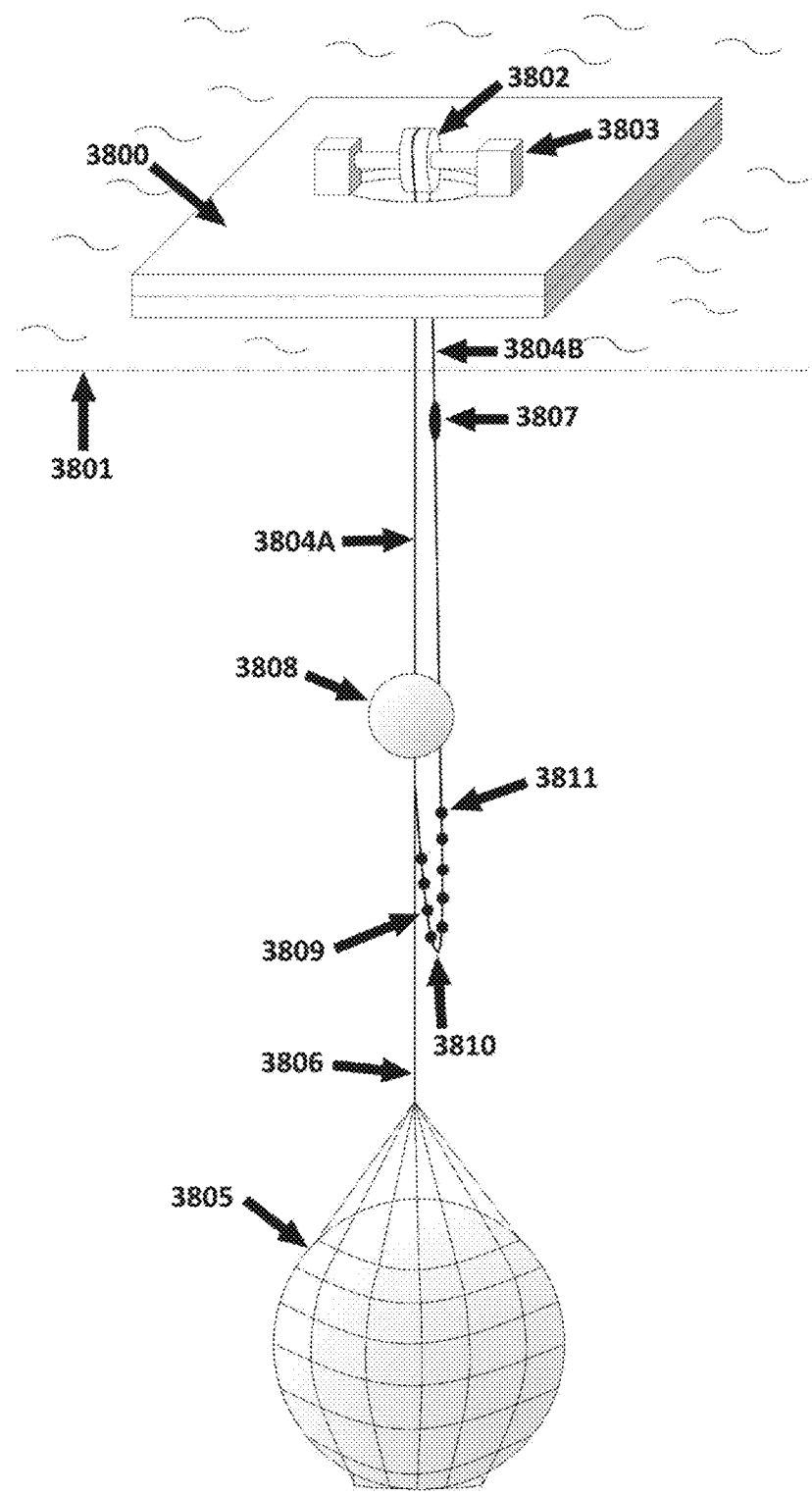
FIG. 101 is an elevated perspective view of an embodiment of the present invention.

FIG. 101 shows a perspective view of an embodiment of the present disclosure. This embodiment is similar to the one illustrated in FIGS. 97-99, but instead of utilizing and/or incorporating a capstan composed of, and/or incorporating, two shafts, the power take-off of the embodiment illustrated in FIG. 101 has a power take-off that incorporates a single pulley or chainwheel 3802 that is rotatably connected to at least one generator 3802. Unlike the embodiment illustrated in FIGS. 97-99, the embodiment illustrated in FIG. 38 has only a single aperture (under chainwheel 3802). Flexible connector 3804A/B is a chain or some other kind of line that has protuberances or other non-uniform surface features that enable it to interface with chainwheel 3802 and apply a tangentially-directed force (torque) thereto in excess of the force supplied by friction alone.

The adjustment of the disposition of the offset weights 3809-3811 is achieved through the control (e.g., the timing, duration, and/or magnitude) of the resistive torque applied to pulley 3802 by the embodiment's power take-off 3803, and associated (e.g., embedded) control system. As was discussed in relation to FIGS. 97-99, this method of controlling the effective net weight of the inertial mass 3902 might be characterized as "passive" and/or "coupled."

The embodiment configuration illustrated in FIG. 101 has the offset weights, e.g., 3809, to the left of inflection point 3810 offsetting and/or reducing the net effective buoyancy of float 3808, and thereby enhancing and/or increasing the net effective net weight of inertial mass 3805. Whereas those offset weights, e.g., 3811, to the right of inflection point 3810 do not offset nor reduce the net effective buoyancy of float 3808, and thereby do not enhance nor increase the net effective net weight of inertial mass 3805, but actually work to counteract it by virtue of creating or increasing a tension in connector segments 3804B and 3804A, and thus act upon the inertial mass 3805 by applying an upward force thereto.

Figure 102:
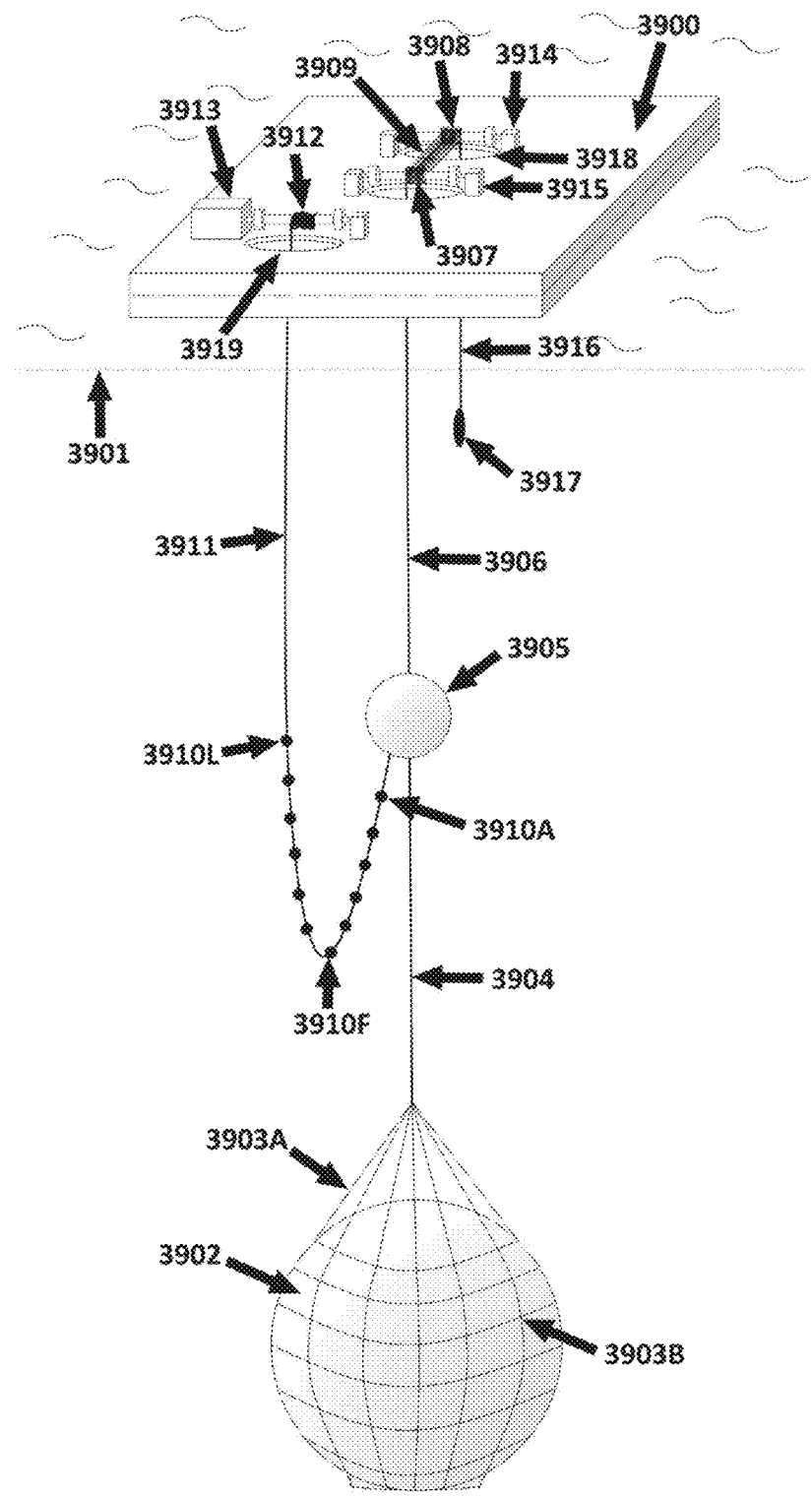
FIG. 102 is an elevated perspective view of an embodiment of the present invention.

FIG. 102 shows a perspective view of an embodiment of the present disclosure. Similar to the embodiment illustrated and discussed in relation to FIGS. 97-99, the embodiment illustrated in FIG. 102 utilizes a capstan composed of, and/or incorporating, two shafts. However, whereas the embodiment illustrated in FIGS. 97-99 controlled the effective net weight of its inertial mass indirectly through the "passive" and/or "coupled" control of the average depth of the associated float, this embodiment directly controls the depth and configuration of its offset weights 3910.

A motor 3913 releases or retracts flexible connector 3911 (through an aperture 3919) so as to shift the position of the inflection point (i.e., near offset weight 3910F) which determines which and how many offset weights, e.g., 3910A (if any), will diminish the effective buoyancy of float 3905, and therefore which and how many offset weights will indirectly increase the effective net weight of inertial mass 3902. Also, because offset weights 3910 are not tethered directly to the restoring weight 3917 (as is true of the embodiment illustrated in FIGS. 27-29), restoring weight 3917 is freely suspended from flexible connector 3916.

The embodiment configuration illustrated in FIG. 102 has offset weights 3910A-3910F being suspended by float 3905, thereby offsetting and/or reducing its net effective buoyancy, which has the consequence of enhancing and/or increasing the effective net weight of inertial mass 3902. By contrast, offset weights 3910G-3910L are suspended by flotation module 3900, and therefore do not offset nor reduce the net effective buoyancy of float 3905, and thereby do not enhance nor increase the effective net weight of inertial mass 3902.

Figure 103:
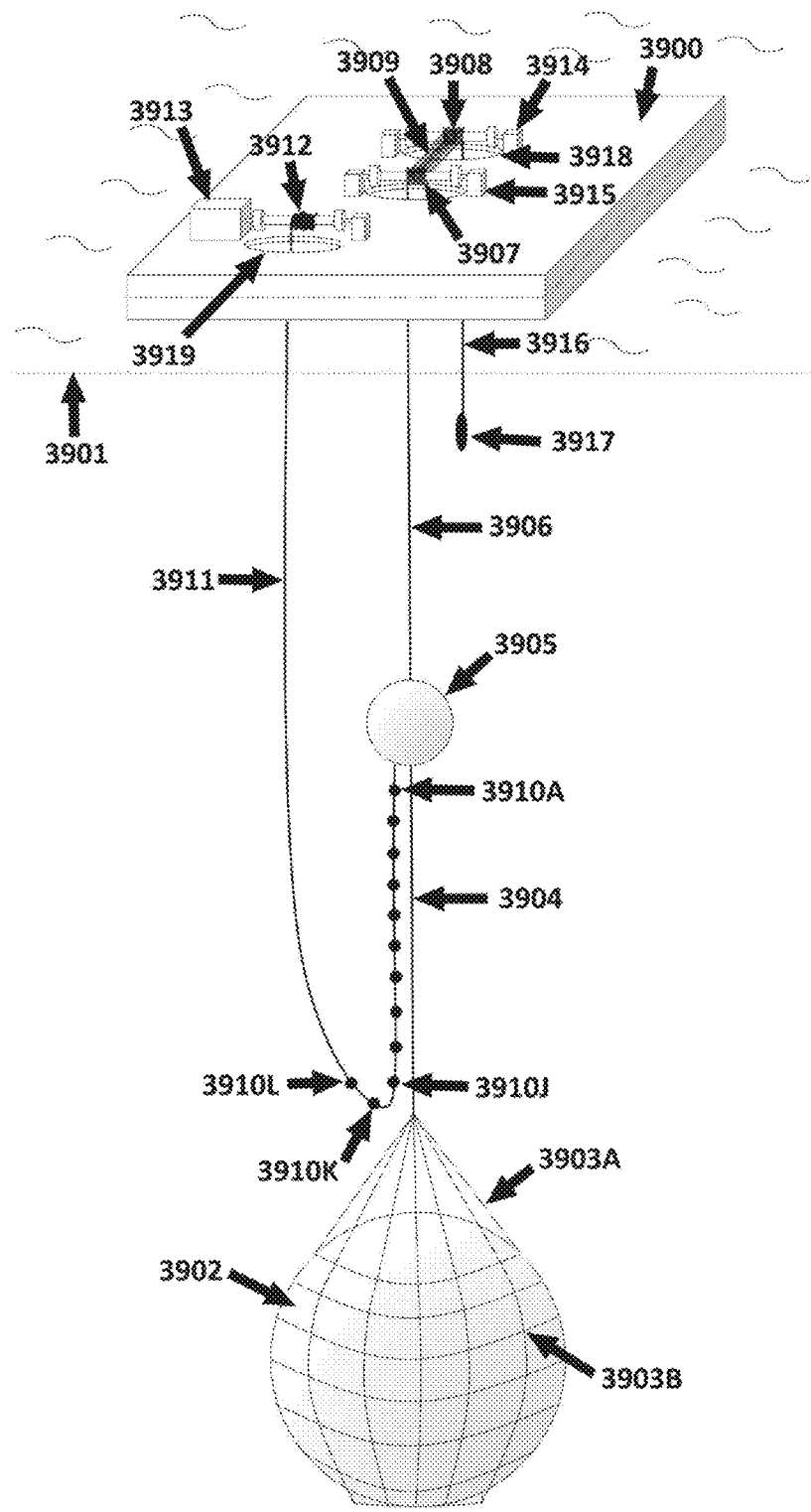
FIG. 103 is an elevated perspective view of the embodiment of FIG. 102.

FIG. 103 shows a perspective view of the same embodiment of the present disclosure as is illustrated in FIG. 102. Unlike the embodiment configuration illustrated in FIG. 102, in which the length of flexible connector 3911, relative to the average depth of float 3905, results in offset weights 3910A-F diminishing the buoyant force imparted by float 3905 to inertial mass 3902, the length of flexible connector 3911 in the embodiment configuration illustrated in FIG. 103 is greater (the motor 3913 having unspooled a portion of this connector from 3912), while the average depth of float 3905 is approximately the same. This results in an additional four offset weights (i.e., 3910G-3910J) diminishing the buoyant force imparted by float 3905 to inertial mass 3902. The addition of the net weight of the four additional offset weights to the float 3905 has the effect of diminishing the buoyant force imparted by float 3905 to inertial mass 3902, thereby increasing the effective net weight of inertial mass 3902.

Figure 104:
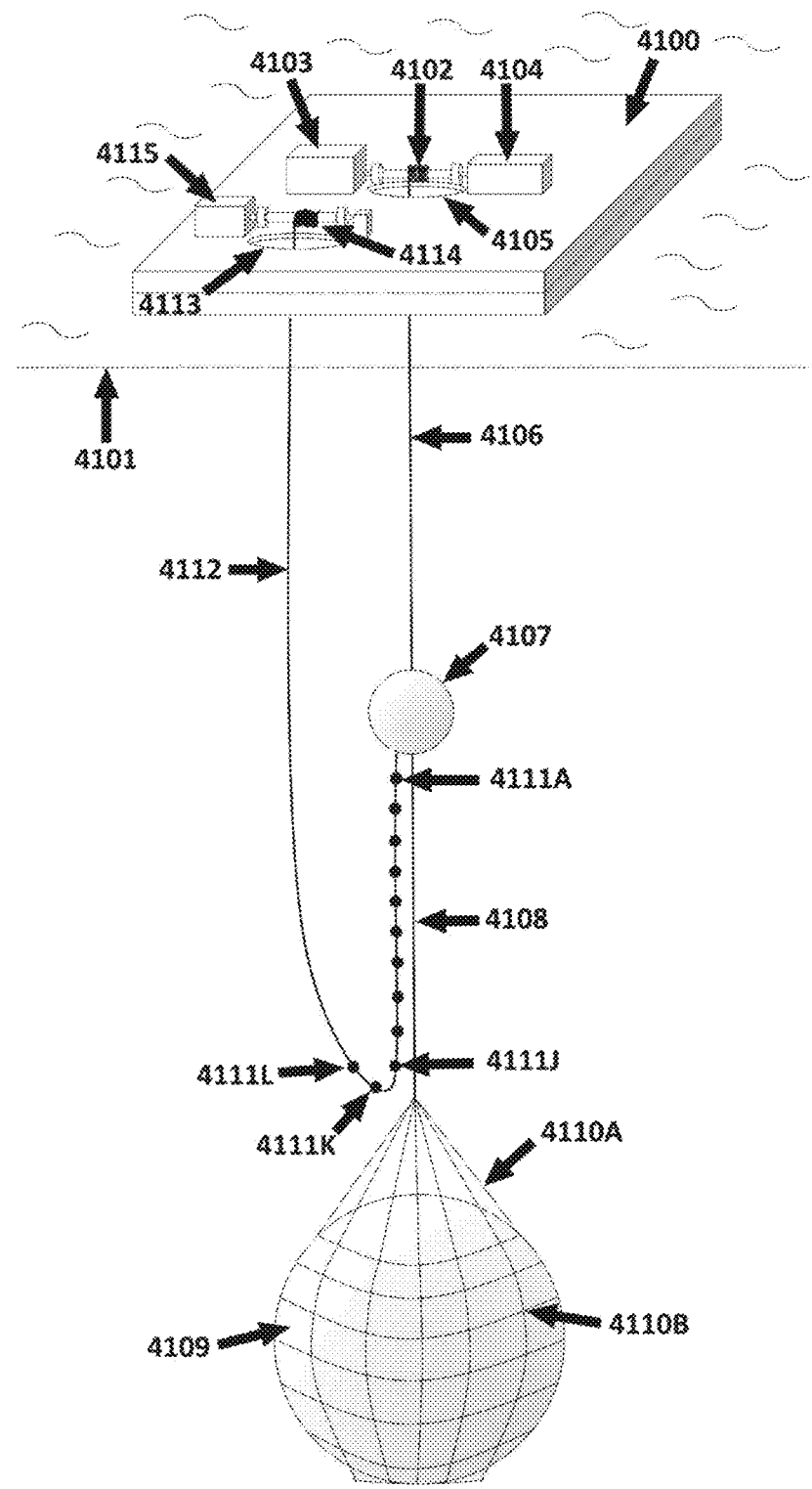
FIG. 104 is an elevated perspective view of an embodiment of the present invention.

FIG. 104 shows a perspective view of a similar embodiment of the present disclosure as is illustrated in FIG. 103, but has no restoring weight (e.g., 3917), nor a corresponding flexible connector (e.g., 3916) and aperture (e.g., 3918). Rather, converter 4100 has a flexible connector wound about shaft, pulley, and/or single-shaft capstan, 4102. One end of that connector descends through aperture 4105 where it is connected to float 4107. The other end is connected to the shaft, pulley, and/or single-shaft capstan, 4102, or is otherwise constrained or attached at the flotation module 4100.

Restoring weight 3917, in the embodiment illustrated in FIG. 103, causes the flexible connector connecting the flotation module to the float to be retracted, and will promote the removal of slack from flexible connector 3906, following the passage of a wave crest, and/or during the downward movement of the flotation module. However, the embodiment illustrated in FIG. 104 has no restoring weight. Instead, a motor 4104 applies a "rewinding" torque to shaft 4102 supplanting the function of a restoring weight. This rewinding torque can be constant or intermittent, and can be (but need not be) under the influence of (turned on and off by, or having a strength modulated by) a control system.

Figure 105:
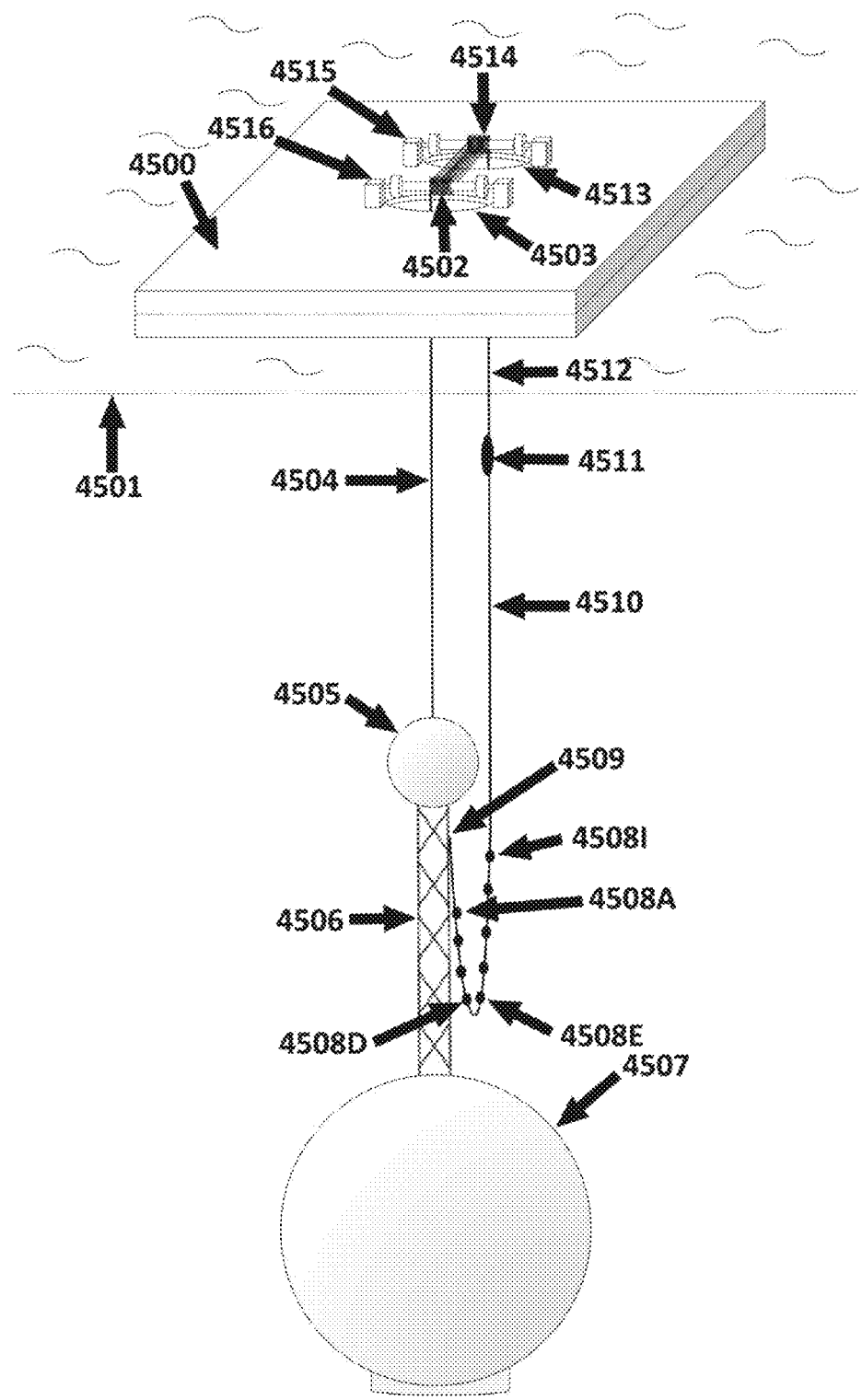
FIG. 105 is an elevated perspective view of an embodiment of the present invention.

FIG. 105 shows a perspective view of an embodiment of the present disclosure that is similar to the one illustrated and discussed in relation to FIGS. 97-99. Whereas the embodiment illustrated and discussed in relation to FIGS. 97-99 has a float 2711 and an inertial mass 2713 that are flexibly connected by a flexible connector 2712, the embodiment illustrated in FIG. 105 has a float 4505 and an inertial mass 4507 that are rigidly connected by a truss 4506.

Figure 106:
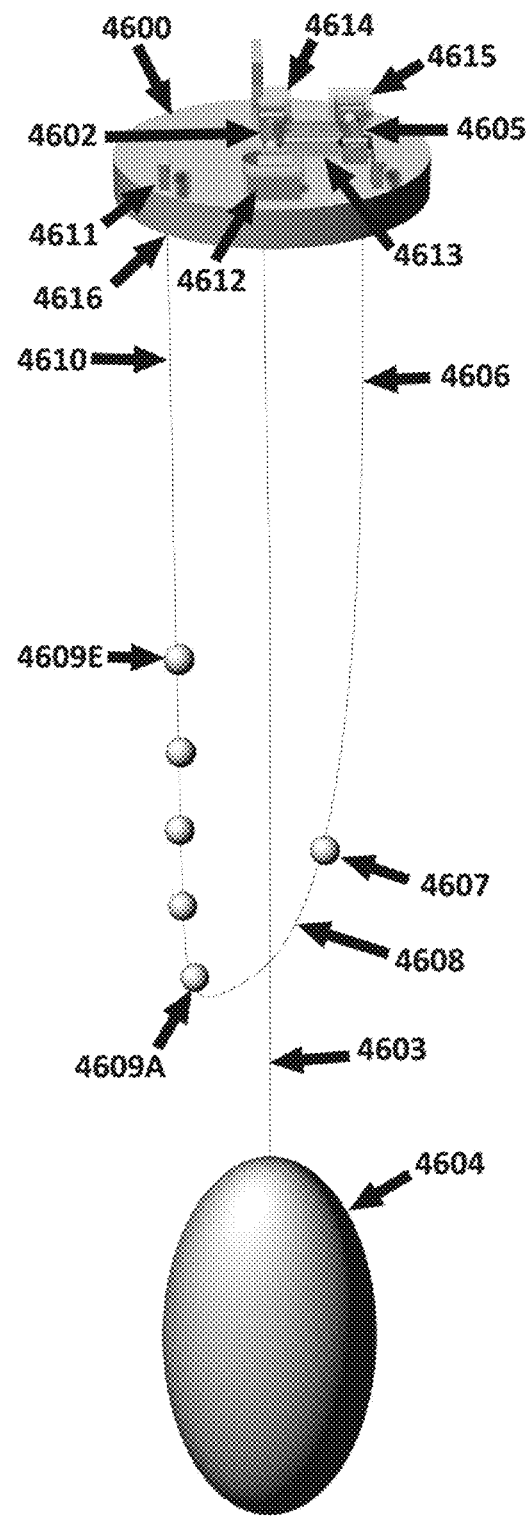
FIG. 106 is an elevated perspective view of an embodiment of the present invention.

FIG. 106 shows a perspective view of another embodiment of the present disclosure. It is similar to the embodiment illustrated and discussed in relation to FIGS. 97-99 in that it controls the effective net weight of one of its components indirectly through the "passive" and/or "coupled" control of the average depth of the associated component. However, it differs from that embodiment in that it lacks a float. And, it differs from that embodiment in that the target of its control is the restoring weight (instead of the inertial mass).

The embodiment illustrated in FIG. 106 does not control the effective net weight of its inertial mass 4604. Instead, it controls the complementary effective net weight of its restoring weight 4607. As the effective net weight of the restoring weight increases, so too does the degree to which that restoring weight promotes and/or accelerates the contraction of the separation distance between the inertial mass 4604 and the flotation module 4600, including, but not necessarily limited to, following a "power stroke" (during which the separation of the inertial mass and the flotation module increases).

It is similar to the embodiment illustrated and discussed in relation to FIGS. 102-104 in that it utilizes a capstan composed of, and/or incorporating, two shafts 4602 and 4605 to control, and extract power from, the oscillations and/or translations of the flexible connector 4603/4606 that connects the inertial mass 4604 and the restoring weight 4607 through the power take-off assembly 4602, 4605, 4612-4615. However, it differs from that embodiment in that the separation flexible connector 4610 that is connected to, and from which are suspended, the embodiment's five offset weights 4609 are statically attached and/or connected to the flotation module at 4616 (instead of to a controllable winch as in the embodiment illustrated in FIGS. 102-104).

As the average depth of the restoring weight 4607 is decreased (e.g., by the embodiment's control system and associated power take-off), more and more offset weights 4609 become suspended beneath the restoring weight (by flexible connector 4608) instead of beneath flotation module 4600 (by flexible connector 4610). As more offset weights 4609 become suspended beneath the restoring weight 4607, the effective net weight of the restoring weight increases. And, concomitantly, so too does the restoring weight's upward pull on inertial mass 4604, via the flexible connector 4603/4606 that connects them through the power take-off 4602, 4605, 4612-4615.

The inertial mass 4604 utilized by, and/or incorporated within, the embodiment illustrated in FIG. 106 is a closed, sealed, ellipsoidally-shaped vessel. In one embodiment, inertial mass 4604 is a concrete shell filled with water. In one embodiment, inertial mass 4604 is, or has a shell, composed of a hybrid mixture of concrete and closed cell or open cell (e.g., poly-urethane) foam. In one embodiment, inertial mass 4604 is a mixture of metals and plastics. In one embodiment, inertial mass 4604 was printed with reinforced concrete by a 3D printer and filled with water after its printing.

In one embodiment, restoring weight 4607 and offset weights 4609 are made of iron. In another embodiment, they include concrete. And, in another embodiment, they are made of material(s) that include plastics.

Module 4612 contains a generator and/or other power take-off which converts at least some of the rotational kinetic energy and/or torque manifested in capstan shaft 4602 into electrical power. Modules 4614 and 4615 may contain additional power take-offs, sensors (e.g., of angular frequency, of torque, of angular displacement, etc.).

Ultrasonic sensor 4611, projected outward from the converter on an arm, is directed downward toward the ocean surface and measures the approximate distance between itself and the water level, providing the device's control system with real-time readings of the approximate draft or waterline height of the device. In other embodiments, a capacitive sensor is used to measure the height of the waterline. Two other similar sensors are located around the periphery of the device.

Figure 107:
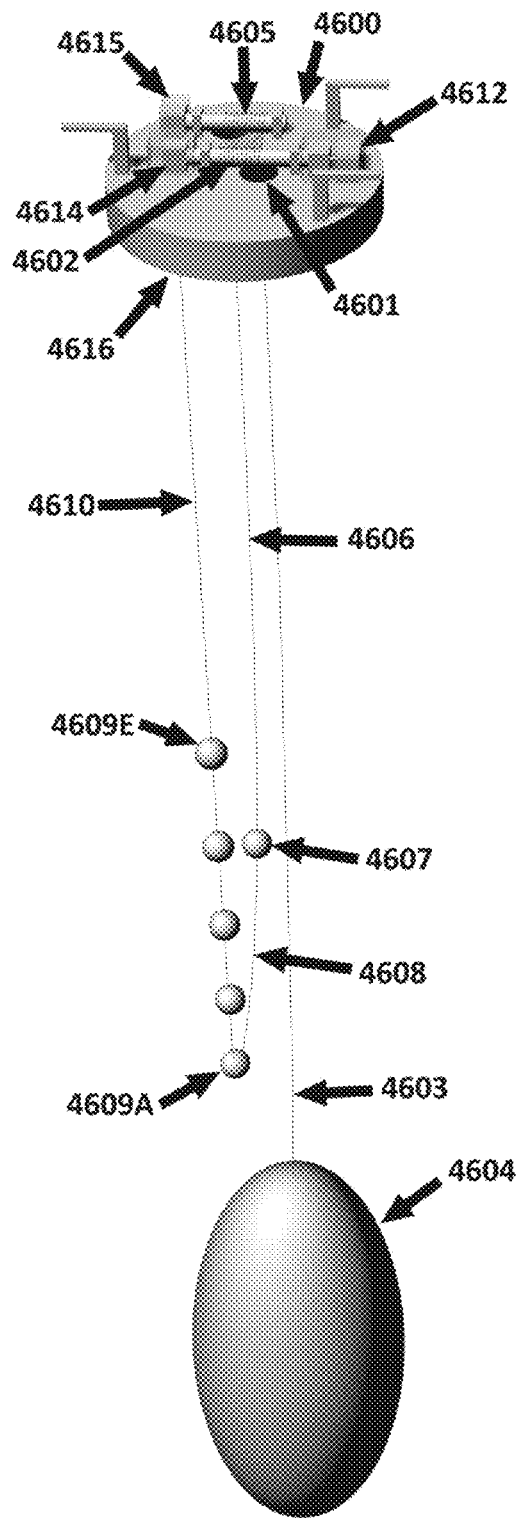
FIG. 107 is a top down perspective view of the embodiment of FIG. 106.

As shown in FIG. 107, which shows the same embodiment as FIG. 106, aperture 4601 is visible and flexible connector 4603 descends from capstan shaft 4602 through aperture 4601 where it connects to inertial mass 4604.

Figure 108:
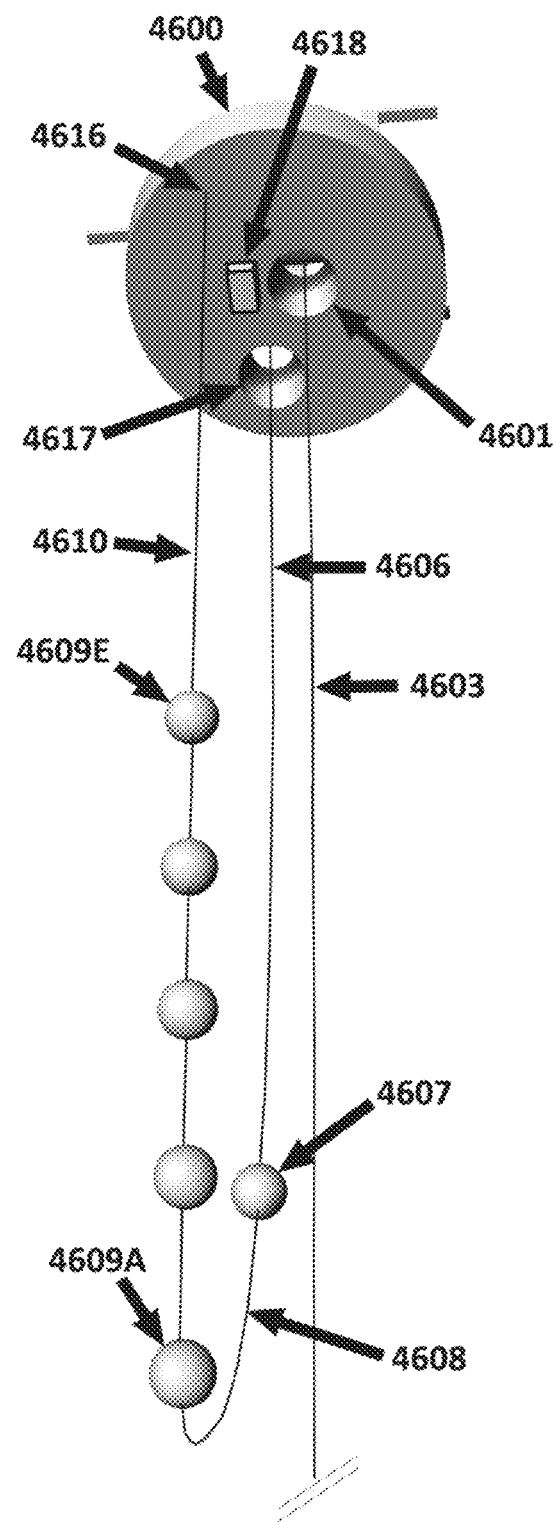
FIG. 108 is a bottom up perspective view of the embodiment of FIG. 106.

FIG. 108, which shows the same embodiment as FIG. 106, shows apertures 4601 and 4617, and flexible connector 4603 descends from capstan shaft 4602 through aperture 4601 where it connects to inertial mass 4604 (not shown). Flexible connector 4606 descends from capstan shaft 4605 through aperture 4617 where it connects to restoring weight 4607.

One end of the flexible connector 4610, to which a plurality of offset weights are attached and/or connected, is attached and/or connected to flotation module 4600 at 4616. Mounted and/or attached to a bottom surface of flotation module 4600 is a sensor that provides the embodiment's control system with measurements of the relative depth and/or distance of the inertial mass 4604 (not shown) below the flotation module 4600.

In one embodiment, the sensor 4618 is a sonar (i.e., echo-locating) sensor. In one embodiment sensor 4618 is a camera that measures the distance between two lights mounted at a known separation on the inertial mass 4604. Measurements of the relative separation of the two lights allows the distance of the inertial mass to be computed. Other embodiments utilize other kinds of sensors to determine the relative depth of the inertial mass.

Figure 109:
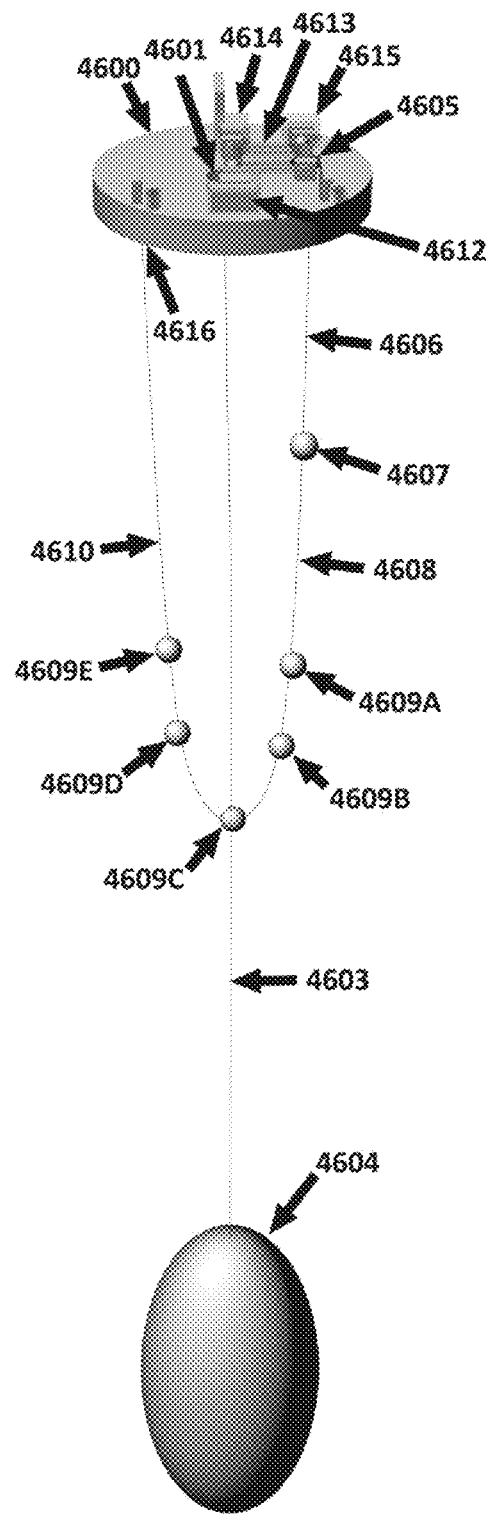
FIG. 109 is a top down perspective view of the embodiment of FIG. 106.

FIG. 109 shows a perspective view of the same embodiment of the present disclosure that is illustrated in FIGS. 106-108. In this illustration, the embodiment is in a configuration in which the relative depth of the restoring weight 4607 has been decreased (relative to its depth in the configuration illustrated in FIGS. 106-108). Because the average depth of restoring weight 4607 has been decreased (i.e., because it has been raised to a distance that positions it closer to the flotation module 4600) two offset weights 4609-A and B now add their net weights to the effective net weight of the restoring weight 4607. And, because offset weight 4609C is supported equally by restoring weight 4607 and flotation module 4600, approximately half of the net weight of offset weight 4609C adds its net weight to the effective net weight of the restoring weight 4607.

Following the increase in its effective net weight, restoring weight 4607 will pull on flexible connector 4606 more forcefully. This will, in turn, pull on flexible connector 4603 more forcefully, which tends to increase the upward acceleration of the inertial mass 4604, helping to suspend it at a lesser depth.

Figure 110:
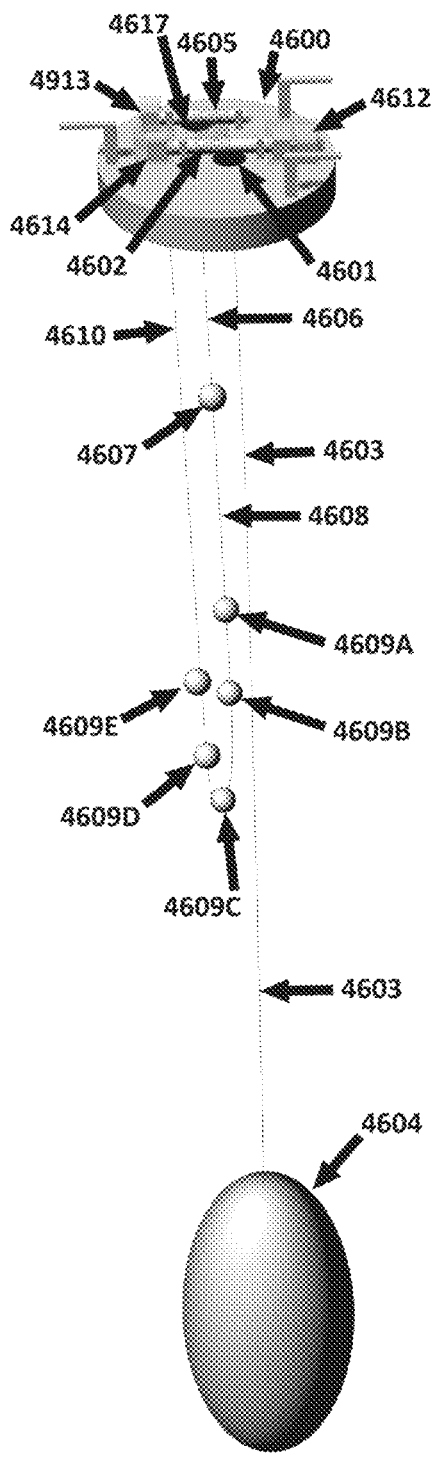
FIG. 110 is a top down perspective view of the embodiment of FIG. 106.

FIG. 110 shows another perspective view of the same embodiment of the present disclosure that is illustrated in FIGS. 108 and 109. In this illustration, and from this perspective, apertures 4601 and 4617 are visible on the upper surface of the flotation module 4600. Flexible connector 4603 descends from capstan shaft 4602 through aperture 4601 where it connects to inertial mass 4604.

Figure 111:
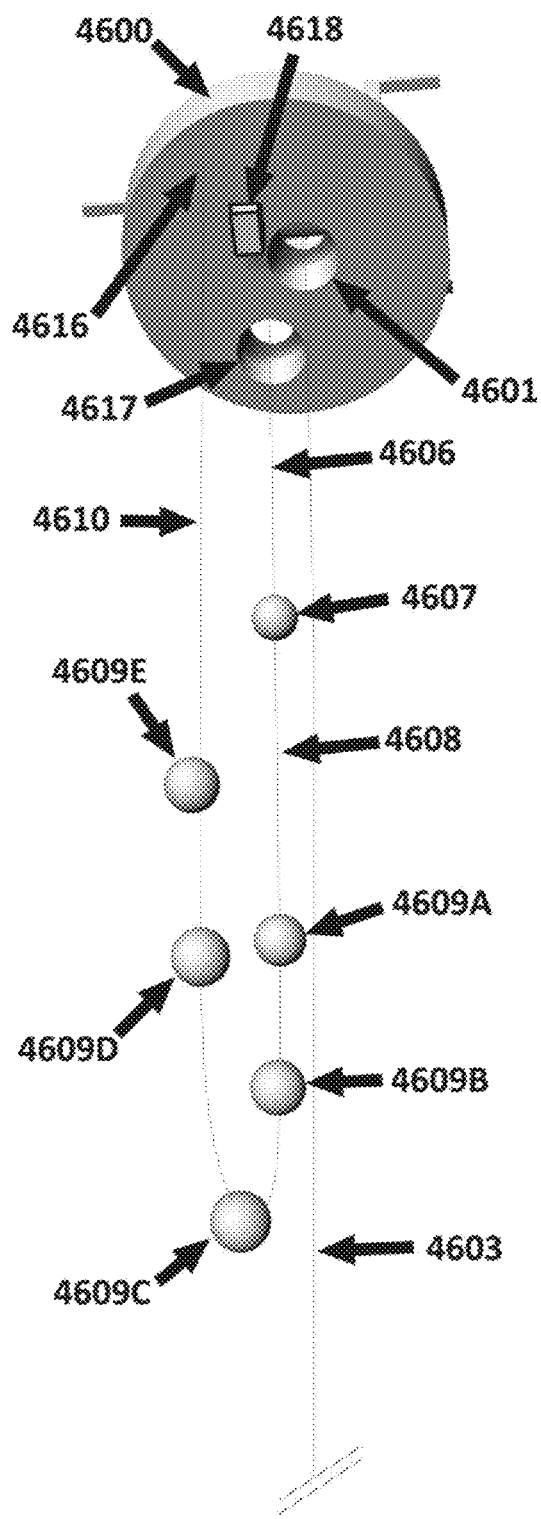
FIG. 111 is a bottom up perspective view of the embodiment of FIG. 106.

FIG. 111 shows a bottom-up perspective view of the same embodiment of the previous figure, where apertures 4601 and 4617 are visible. Flexible connector 4603 descends from capstan shaft 4602 through aperture 4601 where it connects to inertial mass 4604 (not shown). Flexible connector 4606 descends from capstan shaft 4605 through aperture 4617 where it connects to restoring weight 4607.

One end of the flexible connector 4610, to which a plurality of offset weights are attached and/or connected, is attached and/or connected to flotation module 4600 at 4616. Mounted and/or attached to a bottom surface of flotation module 4600 is a sensor that provides the embodiment's control system with measurements of the relative depth and/or distance of the inertial mass 4604 (not shown) below the flotation module 4600. In one embodiment, the sensor 4618 is a sonar (i.e., echo-locating) sensor. In one embodiment sensor 4618 is a camera that measures the distance between two lights mounted at a known separation on the inertial mass 4604. Measurements of the relative separation of the two lights allows the distance of the inertial mass to be computed. Other embodiments utilize other kinds of sensors to determine the relative depth of the inertial mass.

Figure 112:
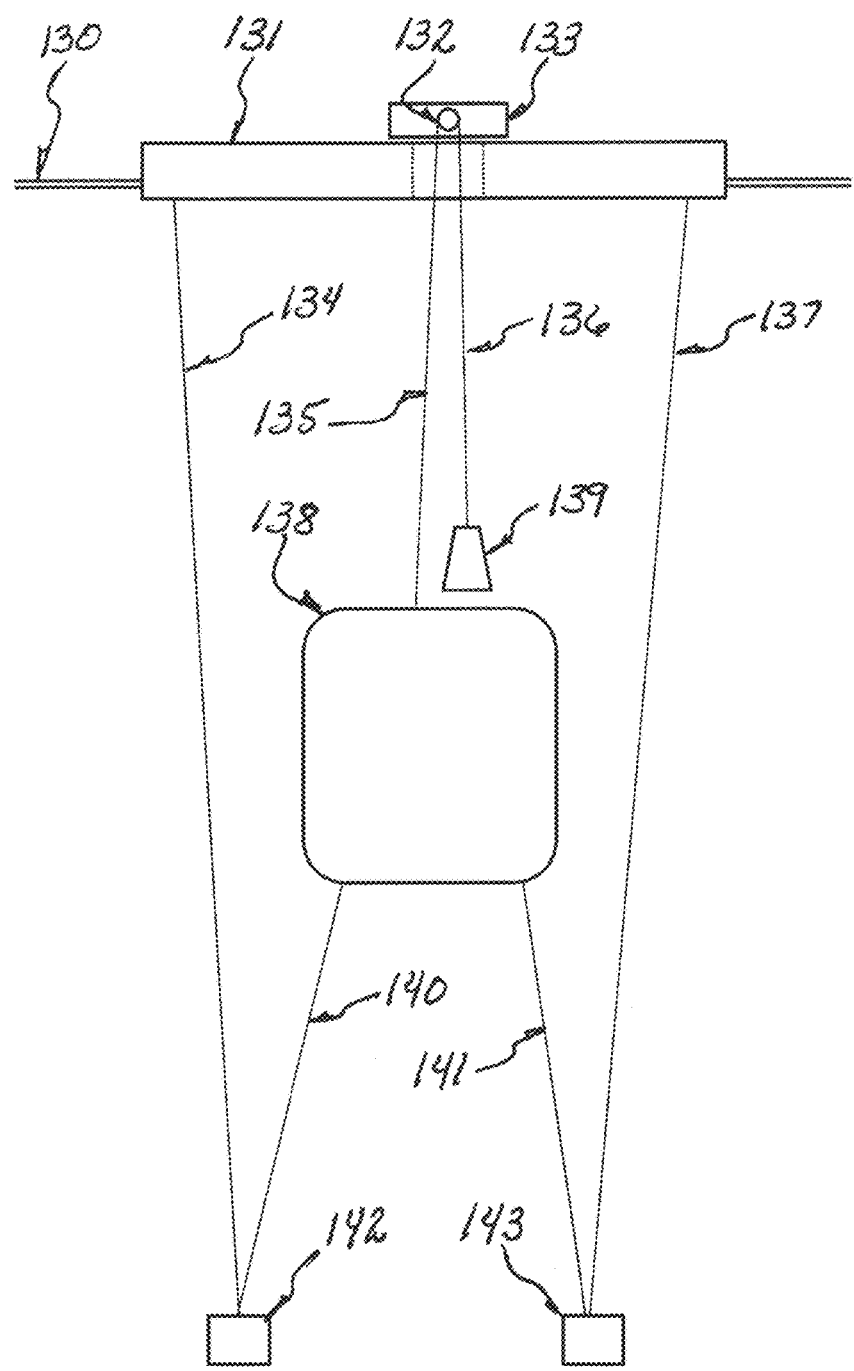
FIG. 112 is an elevated perspective view of an embodiment of the present invention.

FIG. 112 illustrates an embodiment of the current disclosure. A flotation module 131 floats adjacent to the surface 130 of a body of water. A pair of weights 142-143 are suspended below flotation module 131 by connectors 134 and 137, respectively. Suspended above weights 142-143 is an inertial mass 138, which, in one embodiment, is buoyant. Suspended from inertial mass 138 via connector 135-136 and over pulley 132 is a weight 139. As inertial mass 138 moves downward, away from flotation module 131, increasing the distance between inertial mass 138 and flotation module 131, connector segment 135 is pulled and its length is increased. Correspondingly, connector segment 136 is shortened, weight 139 is raised, and brought into closer proximity to flotation module 131. The passage of connector 136 across and/or over pulley 132 so as to add length to connector segment 135 causes pulley 132 to rotate providing the opportunity to engage, energize, and/or rotate the shaft of, generator 133 which is operably connected to pulley 132.

In its nominal configuration, e.g. while resting at the surface 130 of a body of water in the absence of waves, inertial mass, due to its buoyancy and/or the upward pull of connector segment 135 resulting from the gravitational force imparted to it by weight 139, will rise until prevented stopped by connectors 140-141. The combined weight of weights 142-143 is sufficient to counter the tendency of inertial mass 138 to rise.

When the embodiment passes over the crest of a wave, the flotation module 131 and the weights 142-143 descend, typically in a sinusoidal fashion. Because of the insufficiency of its upward buoyancy, and/or the upward force indirectly imparted to it by weight 139, weights 142-143 pull inertial mass 138 down in synchrony with them, and with flotation module 131. However, at the point in the wave's motion, and therefore in the motions of the flotation module 131, and its connected weights 142-143, where their downward acceleration switches to an upward acceleration, e.g. slowing their descent and eventually causing their ascent, the inertia of the inertial mass 138 is sufficient to cause it to continue its downward movement, despite the opposing gravitational force of weight 139, and even its own buoyancy (if any).

In other words, when the descent of the surface 130 of the body of water slows approximately midway between the receding wave crest and the approaching wave trough, the flotation module remains adjacent to, and/or floating at, the surface of that vertically decelerating surface. And, weights 142-143 are suspended from, and are gravitationally compelled to retain their nominal separation from, and/or distance below, flotation module 131. However, inertial mass 138 is not so constrained.

While inertial mass is compelled by the excessive downward gravitational force of weights 142-143 to follow weights 142-143, and, by extension, the flotation module 131 to which they are connected, as they accelerate downward (following the wave's downward acceleration), it is not compelled to decelerate with them. The only force that would oppose the otherwise unconstrained downward movement of the inertial mass 138 is connector segment 135. The magnitude of its resistance to the lengthening of connector segment 138, and therefore and/or thereby the downward movement of the inertial mass 138 relative to flotation module 131, is the result of, and/or equal to, the gravitational force and/or weight of restoring weight 139, and the resisting torque imparted to pulley 132 by generator 133.

With a sufficiently heavy restoring weight 139, and/or a sufficiently great resistive torque imparted to pulley 132 by generator 133, inertial mass 138 will be unable to change the distance by which it is separated from the flotation module 131 above. In other words, with a sufficiently heavy restoring weight 139, and/or a sufficiently great resistive torque imparted to pulley 132 by generator 133, e.g. through the attempt to extract, and/or to generate, a sufficiently great amount of electrical power, inertial mass 138 will be locked at its illustrated position relative to the flotation module 131 above, and the weights 142-143 below, through every part and/or portion of a wave cycle, and/or continuously.

However, by contrast, when a wave imparts a sufficiently great downward acceleration to the embodiment, and a sufficiently great upward acceleration to the flotation module 131 and its connected weights 142-143, then, in an embodiment with a sufficiently light restoring weight 139, and/or a sufficiently small resistive torque imparted to pulley 132 by generator 133, e.g. through the embodiment's limiting of the amount of electrical power that it will attempt to extract, and/or to generate, then the downward momentum of inertial mass 138 will be too great to arrest and/or prevent the downward movement of the inertial mass 138 relative to flotation module 131, and/or an increase of the distance separating the inertial mass 138 from the flotation module 131 above.

The embodiment illustrated in FIG. 112 is representative of a large number of related embodiments that may be derived from this representative embodiment. The numbers of variations and/or altered and/or similar embodiments that can be derived from, and/or represent relatively minor alterations to the representative embodiment illustrated in FIG. 112, include, but are not limited to, those in which:

1) Connectors 134/137 are representative of one or more connectors, and the scope of this disclosure includes embodiments possessing only one, or three or more connectors instead of the two connectors 134/137.

2) Connectors 140-141 are representative of one or more connectors connecting inertial mass 138 to weights 142-143, and the scope of this disclosure includes embodiments possessing any number of one or more connectors instead of the two connectors 140-141.

3) Weights 142-143 are representative of one or more weights, and the scope of this disclosure includes embodiments possessing only one, as well as those possessing three or more weights, instead of the two weights 142-143.

4) Inertial mass 138 is representative of one or more inertial masses, and the scope of this disclosure includes embodiments possessing two or more inertial masses instead of the single inertial mass 138.

5) Connector 135-136 is representative of one or more connectors, and the scope of this disclosure includes embodiments possessing two or more connectors instead of the single connector 135-136. The scope of this disclosure includes embodiments in which one or more of the at least one connector 135-136 is connected to, and/or attached to any portion, part, and/or surface of inertial mass 138.

6) Another embodiment does not possess a generator 133, e.g. and uses the kinetic energy of inertial mass 138 for a different useful purpose.

7) Pulley 132 is representative of one or more pulleys, and the scope of this disclosure includes embodiments possessing two or more pulleys, over which passes one or more connectors 135-136 each, instead of the single pulley 132.

8) Generator 133 is representative of one or more generators, and the scope of this disclosure includes embodiments possessing two or more generators instead of the single generator 133.

9) Flotation module 131 is representative of one or more flotation modules operably interconnected with one or more inertial masses 138 and/or one or more weights 142-143, and the scope of this disclosure includes embodiments possessing two or more flotation modules instead of the single flotation module 131.

10) Inertial mass 138 is representative of an inertial mass that is buoyant, neutrally-buoyant, or negatively buoyant, and/or characterized by any degree of buoyancy. The scope of this disclosure includes embodiments possessing inertial masses of any degree of positive, negative, or neutral buoyancy. An embodiment with a negatively buoyant inertial mass 138 will typically be associated with a restoring weight 139 that is heavier than the restoring weight 139 associated with a positively buoyant inertial mass 138, although this is not required, nor a limitation herein.

Figure 113:
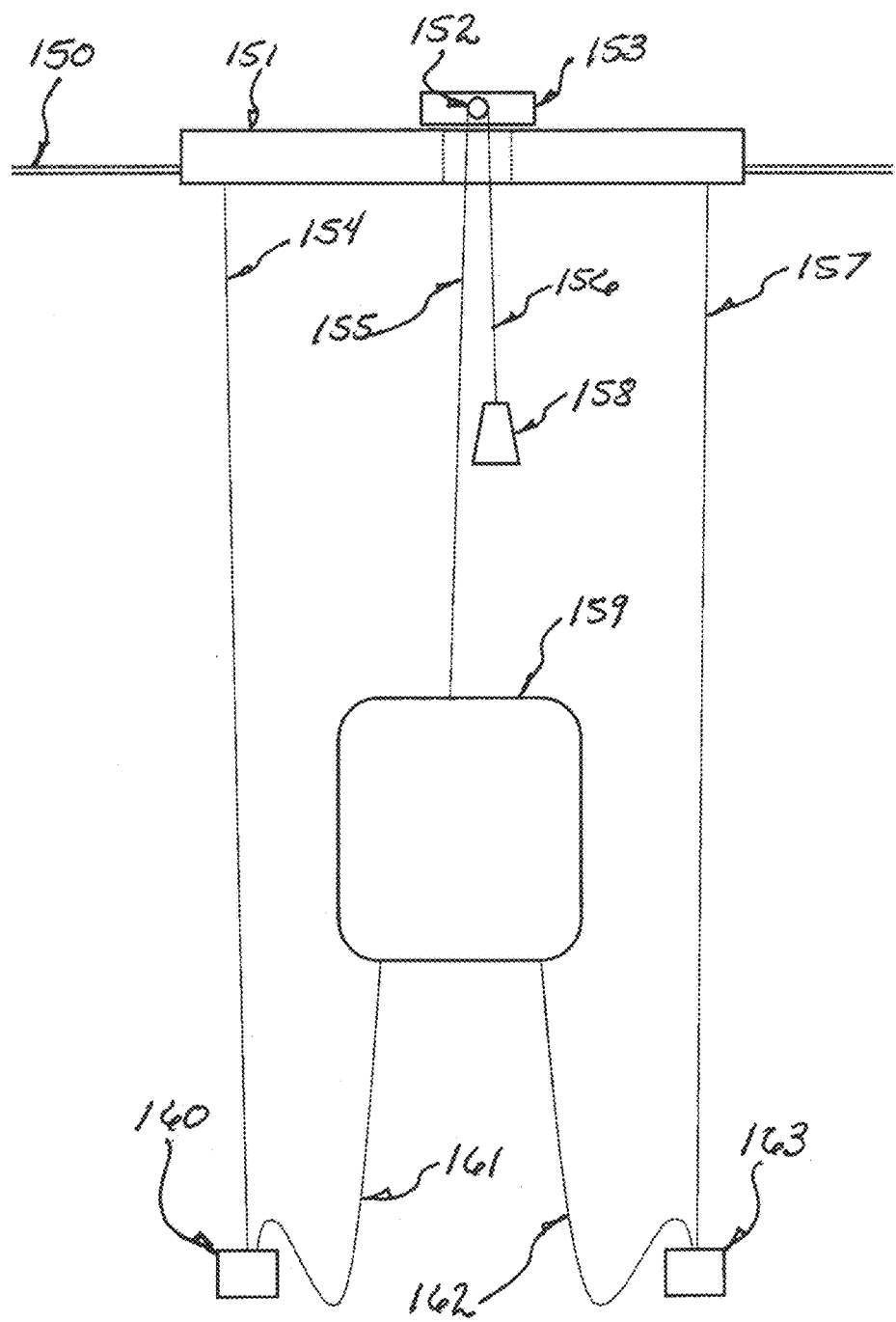
FIG. 113 is an elevated perspective view of the embodiment of FIG. 112.

FIG. 113 illustrates an embodiment of the current disclosure identical to the embodiment illustrated in FIG. 112. However, FIG. 113 illustrates the configuration and/or state of the embodiment approximately characteristic of the embodiment's passage through the wave trough, when the movement of the inertial mass is no longer constrained by connectors 161-162, i.e. those connectors are slack, and the movement of inertial mass 159 is limited only by connector 155-156, and the opposing forces imparted to inertial mass 159 therethrough by restoring weight 158.

In this state, the embodiment's inertial mass 159 is moving away from flotation module 151. Connector 155-156, and attached weight 158, are moved in concert with the downward movement of the inertial mass 159. During the time during which the inertial mass 159 moves downward relative to flotation module 151, pulley 152, and its operably connected generator 153, are able to extract electrical energy from the inertial mass' kinetic energy.

The embodiment's ability to systematically extract energy from ocean waves depends upon its ability to "reset" after it has "launched" its inertial mass downward, and extracted power from its downward movement. At some point, and in part as a result of the resistance of the opposing torque imparted to pulley 152 by generator 153, which in turn applies a counter-force to connector 155 as it moves over the pulley 152 under the influence of the downward moving inertial mass 159, the descent of inertial mass 159, relative to flotation module 151, slows, stops, and reverses. The inertial mass 159 begins to move upward relative to flotation module 151. This upward movement may be the result of any and/or all of the following: 1) the upward force applied to inertial mass 159 by connector 155 and attached restoring weight 158; and 2) an upward force manifested by any degree of positive buoyancy in inertial mass 159.

Once inertial mass 159 has resumed its nominal separation from, and/or proximity to, flotation module 151, connectors 161-162 will halt its further rising relative to weights 160 and 163, and thereby prevent any further upward movement relative to flotation module 151.

Figure 114:
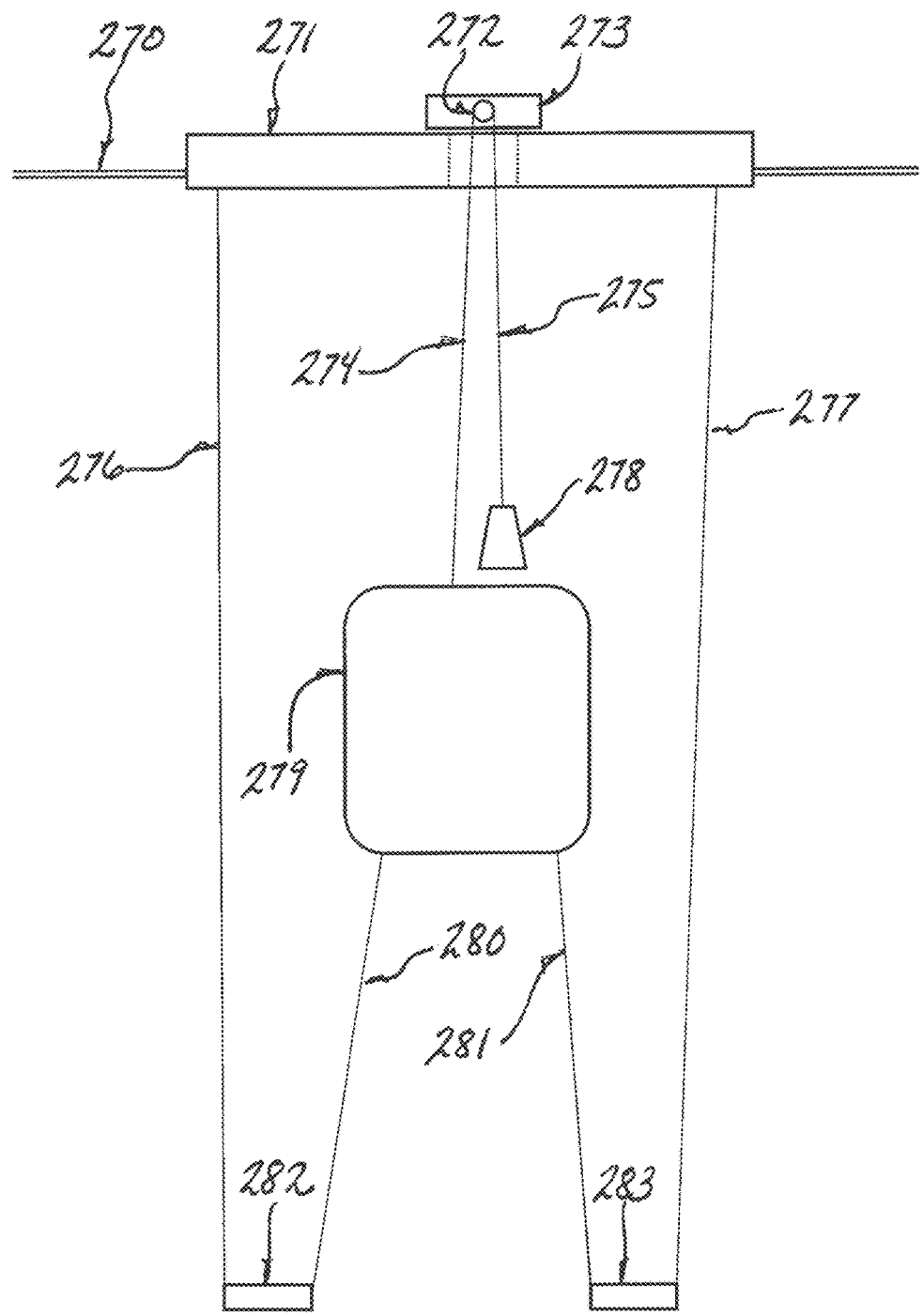
FIG. 114 is an elevated perspective view of an embodiment of the present invention.

FIG. 114 illustrates an embodiment of the current disclosure. A flotation module 271 floats adjacent to the surface 270 of a body of water. A pair of weights 282-283 are suspended beneath flotation module 271 by flexible connectors 276-277. Inertial mass 279 is suspended above weights 282-283 by flexible connectors 280-281. And, inertial mass 279 is operably connected to restoring weight 278 by connector 274-275, which passes over, and/or through, pulley 272, which is operably and/or rotatably connected to generator 273.

As the embodiment accelerates downward into the water, e.g. as when floating on a wave of which the crest is passing and the midway point between the crest and the following trough is approaching, inertial mass 279 is fully raised above weights 282-283 and accelerates downward in tandem with the weights. When flotation module 271 and the weights 282-283 accelerate upward, e.g. as when floating on a wave of which the trough is approaching, inertial mass 279 will tend to continue moving downward and will not manifest the same degree of upward acceleration. This differential rate of upward acceleration will result in an increase in the distance between the inertial mass 279 and the flotation module 271. This will result in an paying out or lengthening of connector segment 274, causing pulley 272 to be turned, causing the generator 273 to generate electrical power.

In this embodiment there are two suspended weights 282 and 283. In other embodiments there can be a single suspended weight or more than two suspended weights. In this embodiment each of 282 and 283 is a single suspended weight. In other embodiments each of 282 and 283 can be two, three, four, or more than four suspended weights interconnected by intervening flexible or rigid connectors. In this embodiment the two connectors attached to each suspended weight are attached to the suspended weight at opposite ends of the suspended weight. In other embodiments the connectors attached to each suspended weight can be attached to the same point on the suspended weight, or to different points on the suspended weight. By varying the number of weights, and/or the locations on each weight to which the connectors are attached, it is possible to vary the degree of acceleration and jerk experienced by the inertial mass as it is arrested in its rising by the suspended weight(s). In this embodiment the suspended weights are connected to the flotation module toward the periphery of the flotation module. In other embodiments the suspended weights can be connected to the flotation module at any location on the flotation module, directly or indirectly.

The embodiment illustrated in FIG. 114 is representative of a large number of related embodiments that may be derived from this representative embodiment. The numbers of variations and/or altered and/or similar embodiments that can be derived from, and/or represent relatively minor alterations to the representative embodiment illustrated in FIG. 114, include, but are not limited to, those in which:

1) Connectors 276-277 are representative of one or more connectors, and the scope of this disclosure includes embodiments possessing only one, or three or more connectors instead of the two connectors 276-277.

2) Connectors 280-281 are representative of one or more connectors connecting inertial mass 279 to weights 282-283, respectively, and the scope of this disclosure includes embodiments possessing any number of one or more connectors instead of the two connectors 282-283.

3) Weights 282-283 are representative of one or more weights, and the scope of this disclosure includes embodiments possessing only one, as well as those possessing three or more weights, instead of the two weights 282-283.

4) Inertial mass 279 is representative of one or more inertial masses, and the scope of this disclosure includes embodiments possessing two or more inertial masses instead of the single inertial mass 279.

5) Connector 274-275 is representative of one or more connectors, and the scope of this disclosure includes embodiments possessing two or more connectors instead of the single connector 274-275. The scope of this disclosure includes embodiments in which one or more of the at least one connector 274-275 is connected to, and/or attached to any portion, part, and/or surface of inertial mass 279.

6) Another embodiment does not possess a generator 273, e.g. and uses the kinetic energy of inertial mass 138 for a different useful purpose.

7) Pulley 272 is representative of one or more pulleys, and the scope of this disclosure includes embodiments possessing two or more pulleys, over which passes one or more connectors 274-275 each, instead of the single pulley 272.

8) Generator 273 is representative of one or more generators, and the scope of this disclosure includes embodiments possessing two or more generators instead of the single generator 273.

9) Weight 278 is representative of one or more weights, and the scope of this disclosure includes embodiments possessing two or more weights instead of the single weight 278.

10) Flotation module 271 is representative of one or more flotation modules operably interconnected with one or more inertial masses 279 and/or one or more weights 282-283, and the scope of this disclosure includes embodiments possessing two or more flotation modules instead of the single flotation module 271.

11) Inertial mass 279 is representative of an inertial mass that is buoyant, neutrally-buoyant, or negatively buoyant, and/or characterized by any degree of buoyancy. The scope of this disclosure includes embodiments possessing inertial masses of any degree of positive, negative, or neutral buoyancy. An embodiment with a negatively buoyant inertial mass 279 will typically be associated with a restoring weight 278 that is heavier than the restoring weight 279 associated with a positively buoyant inertial mass 279, although this is not required, nor a limitation herein.

Figure 115:
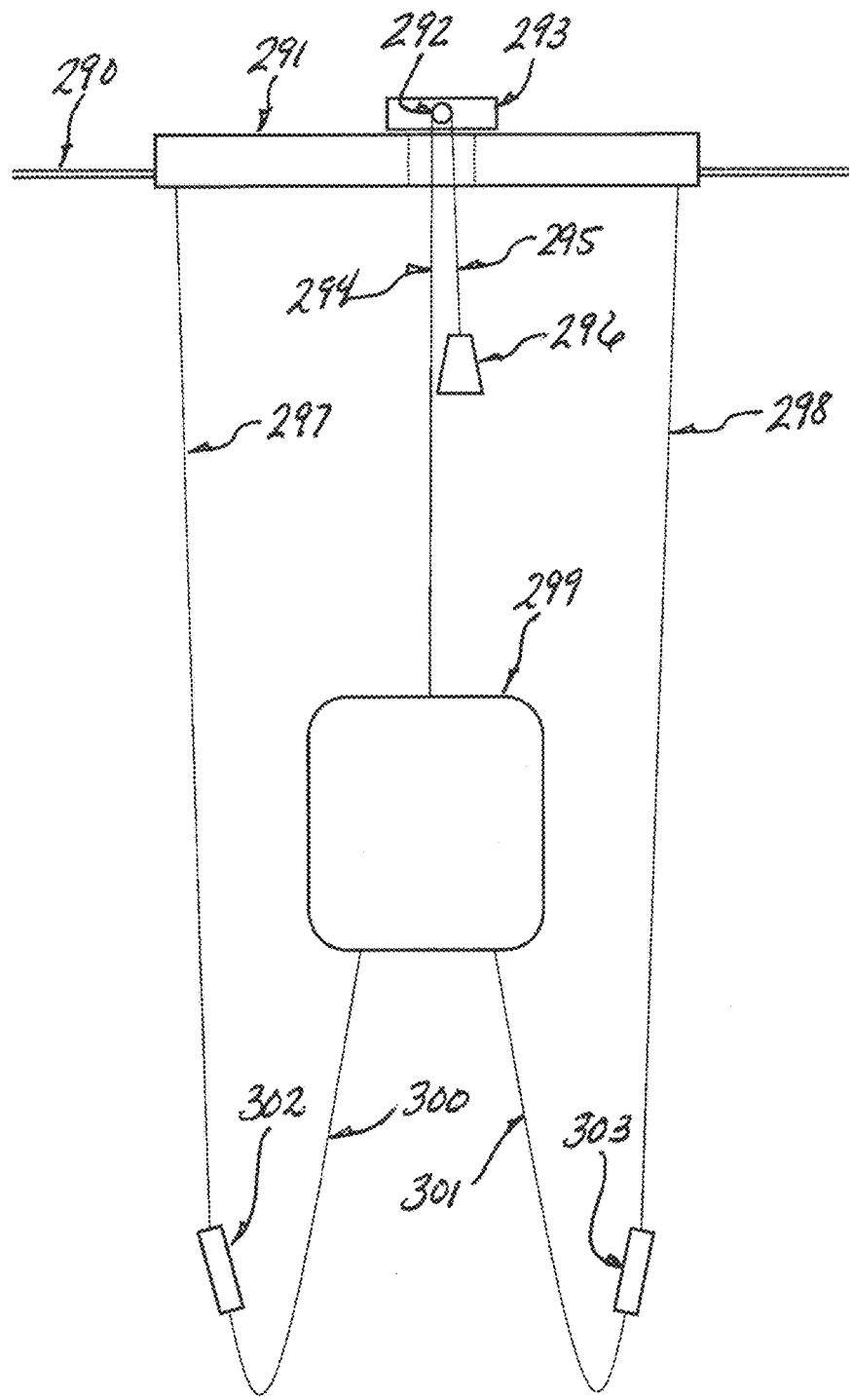
FIG. 115 is an elevated perspective view of the embodiment of FIG. 114.

FIG. 115 illustrates an embodiment of the current disclosure identical to the embodiment illustrated in FIG. 114. However, FIG. 115 illustrates the configuration and/or state of the embodiment after flotation module 291 and the weights 302-303 have begun to accelerate upward, e.g. have begun slowing their descent as the embodiment approaches a wave trough, while inertial mass 299 has continued downward, without an equal degree of upward acceleration, due to its inertia and momentum.

Note that the connectors 300-301 are slack and the vertical position, speed, and/or acceleration of inertial mass 299 is no longer significantly influenced by those connectors. Also note, that due to the energetic descent of inertial mass 299 relative to flotation module 291, connector segment 294 causes pulley 292 to rotate which causes generator 293 to generate electrical power.

This embodiment's use of weights 302-303, each of which is connected to the flotation module 291 and the inertial mass 299 at opposite ends of said weight, allows the upward movement of inertial mass 299 to be stopped and/or arrested relatively "gently" as the imposition of the opposing force of each weight, 302 and 303, is applied progressively as the weight is raised from an approximately vertical orientation to an approximately horizontal orientation.

Figure 116:
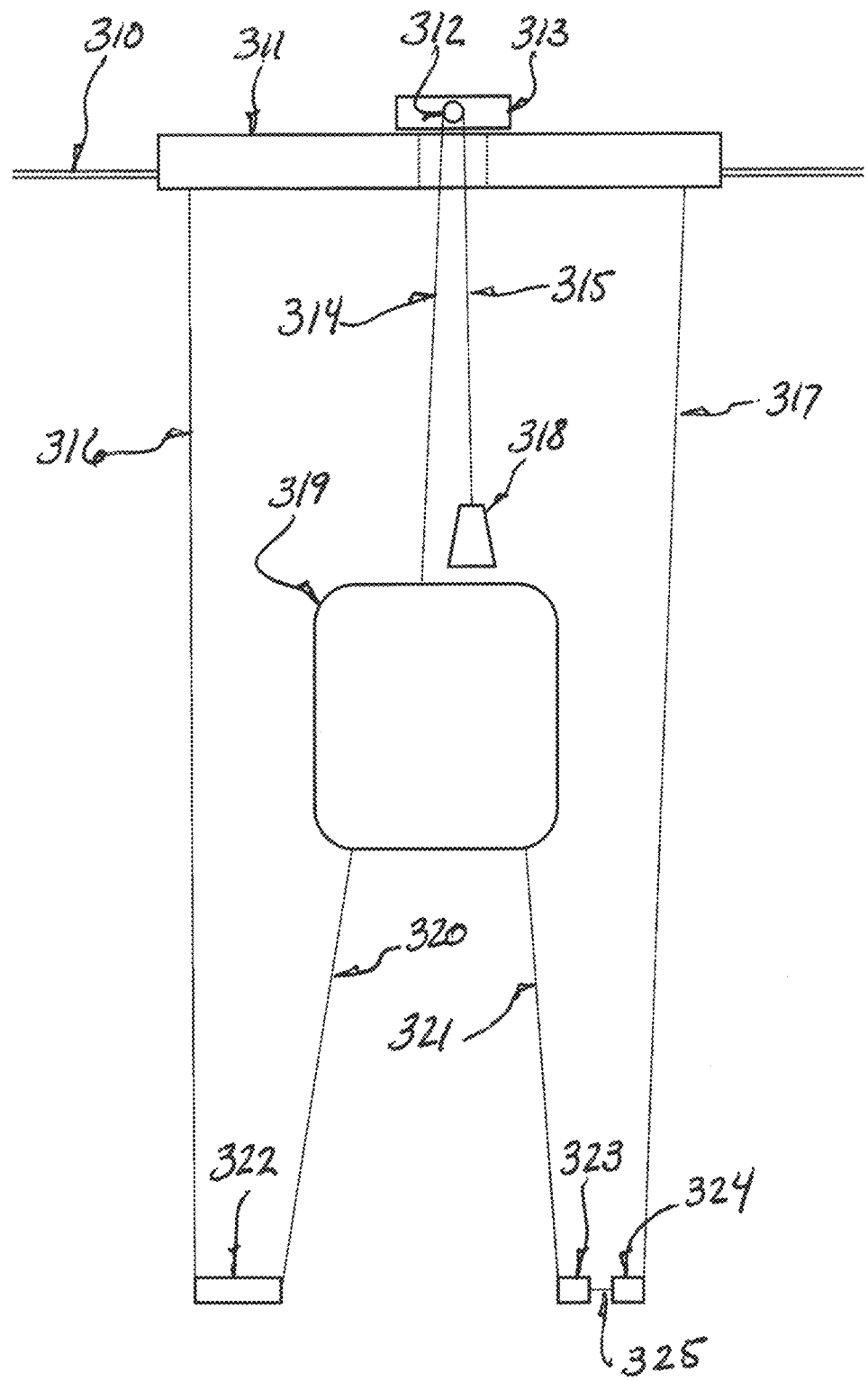
FIG. 116 is an elevated perspective view of an embodiment of the present invention.

FIG. 116 illustrates an embodiment of the current disclosure. The embodiment illustrated in FIG. 116 is similar to the one illustrated and discussed in relation to FIG. 115. However, the embodiment illustrated in FIG. 116 includes two weights 323-324 instead of the single weight 283 illustrated in FIG. 115. The behavior of the embodiment illustrated in FIG. 116 is substantially similar to the behavior of the embodiment illustrated and discussed in relation to FIG. 115. The features and discussion that are, and/or would be, redundant with respect to other embodiments discussed elsewhere will not be repeated here, but is nonetheless still relevant and is included within the scope of the present disclosure.

In one embodiment, weights 323 and 324 are connected by a flexible connector 325. In another embodiment, they are connected by a rigid connector.

The embodiment illustrated in FIG. 116 is representative of a large number of related embodiments that may be derived from this representative embodiment. The numbers of variations and/or altered and/or similar embodiments that can be derived from, and/or represent relatively minor alterations to the representative embodiment illustrated in FIG. 116, include, but are not limited to, those in which:

1) Weights 323-324 is representative of one or more weights, and the scope of this disclosure includes embodiments possessing one or more weights instead of the pair of weights 323-324. Inter-weight connector 325 is representative of one or more flexible connectors, rigid connectors, and/or any other means, device, structural member, element, and/or construction, which connects and/or attaches one or more weights, represented by weights 323-324.

2) The relevant and applicable variations discussed and/or characteristic of the embodiment illustrated and discussed in relation to FIG. 115.

Figure 117:
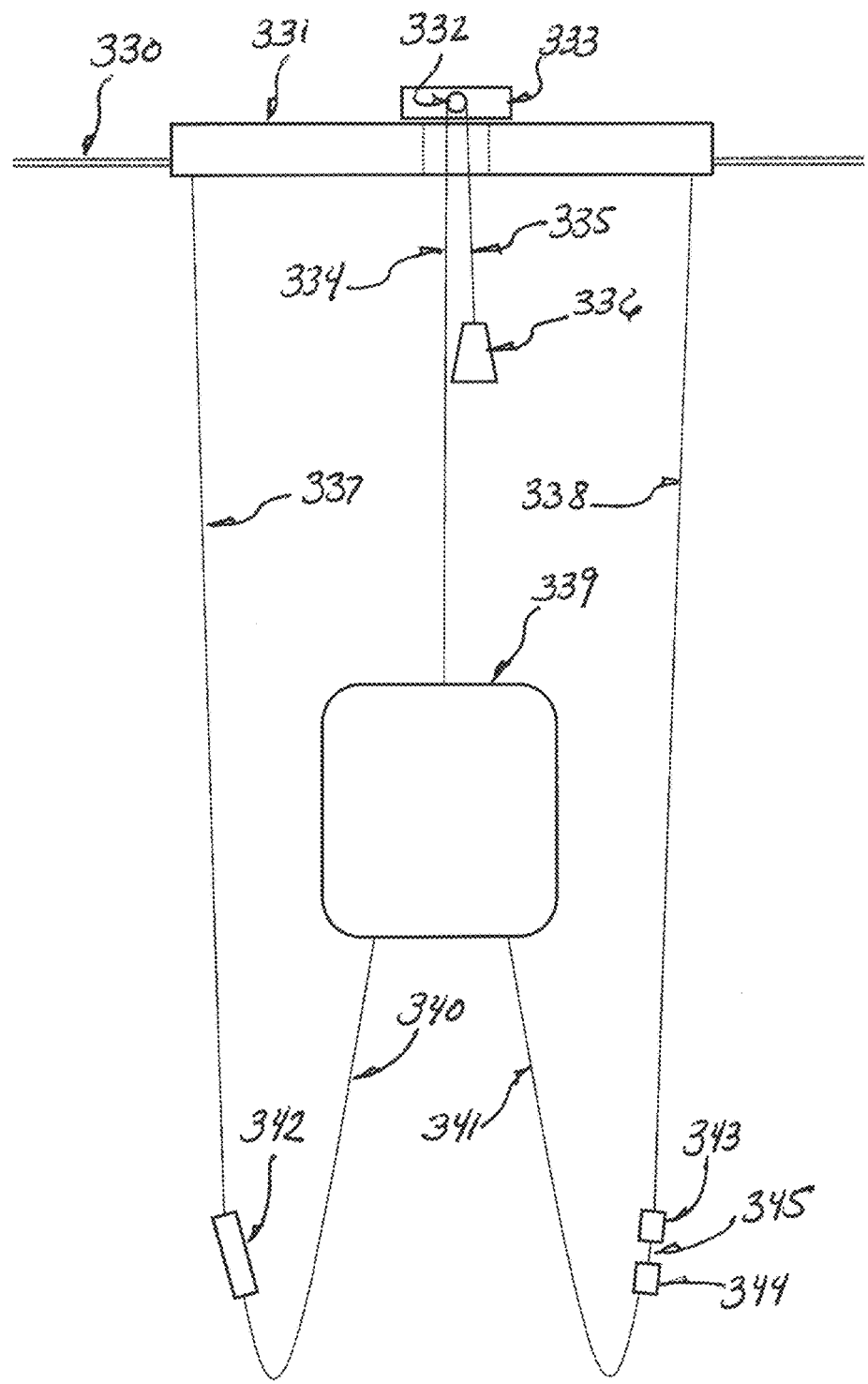
FIG. 117 is an elevated perspective view of the embodiment of FIG. 116.
Figure 118:
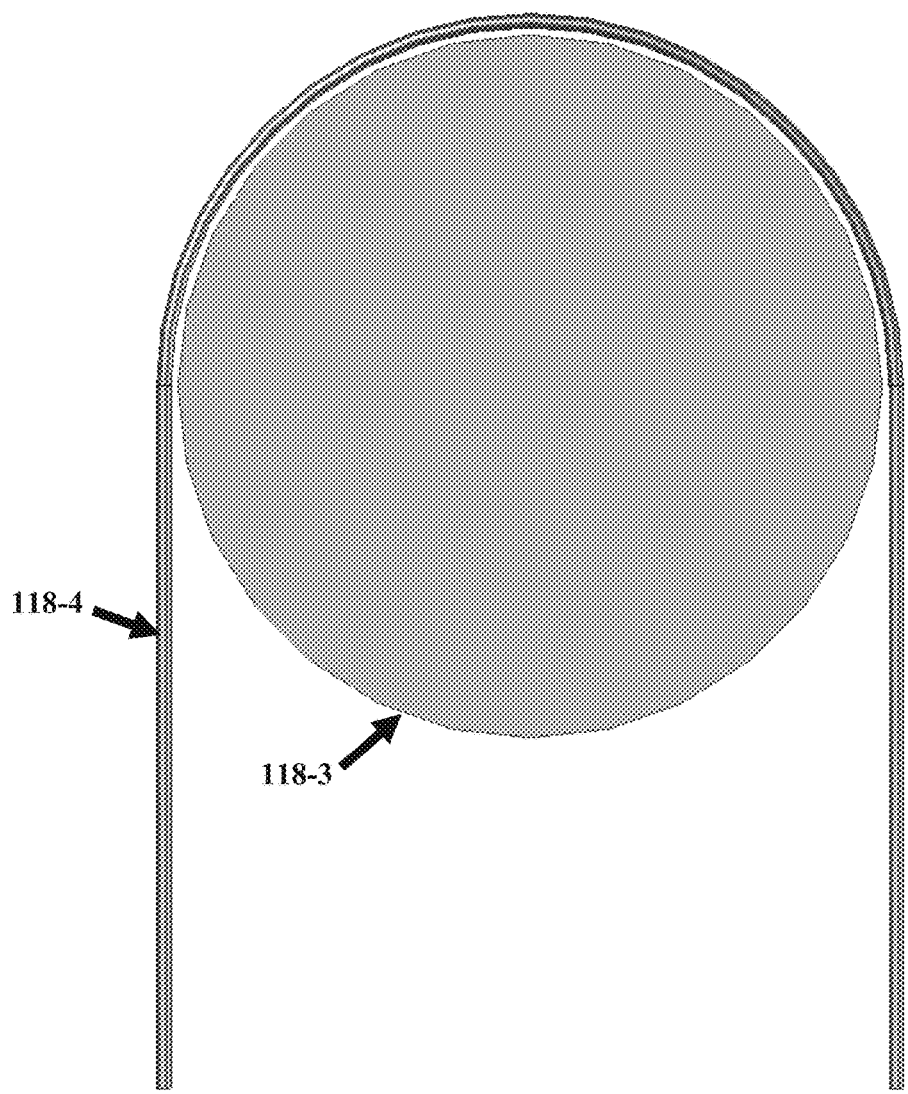
FIG. 118 is a side view illustration of a roller pulley around which a ribbon cable is engaged.

FIG. 117 illustrates an embodiment of the current disclosure. The embodiment illustrated in FIG. 117 is similar to the one illustrated and discussed in relation to FIG. 116. However, the embodiment illustrated in FIG. 117 includes two weights 343-344 instead of the single weight 303 illustrated in FIG. 115. The behavior of the embodiment illustrated in FIG. 117 is substantially similar to the behavior of the embodiment illustrated and discussed in relation to FIG. 115. In one embodiment, weights 343 and 344 are connected by a flexible connector 345. In FIG. 118 shows a vertical profile view of a stylized feature of the current disclosure. Pulley/sheave/drum 118-3 is shown in profile with flexible connector 118-4 passing up, over, and back down drum 118-3. Flexible connector 118-4 can be a wire, rope, cable, or any number of other linear tensile members. Drum 118-3 can have a groove (following a helical pattern on the drum surface about the cylindrical axis) in which flexible connector 118-4 can interface. The diameter of drum 118-3 is at least 50 times the diameter of flexible connector 118-4. This ensures that flexible connector 118-4 is not excessively bent around drum 118-3 in a way that would damage, fatigue, or otherwise impart damage to the components comprising flexible connector 118-4. This is especially important for cases where drum 118-3 is oscillating and flexible connector 118-4 does not slip relative to the surface of drum 118-3, thereby causing flexible connector 118-4 to pass back and forth repeatedly over drum 118-3. In many embodiments, the flexible connector passes multiple times around the drum (not shown).

Figure 119:
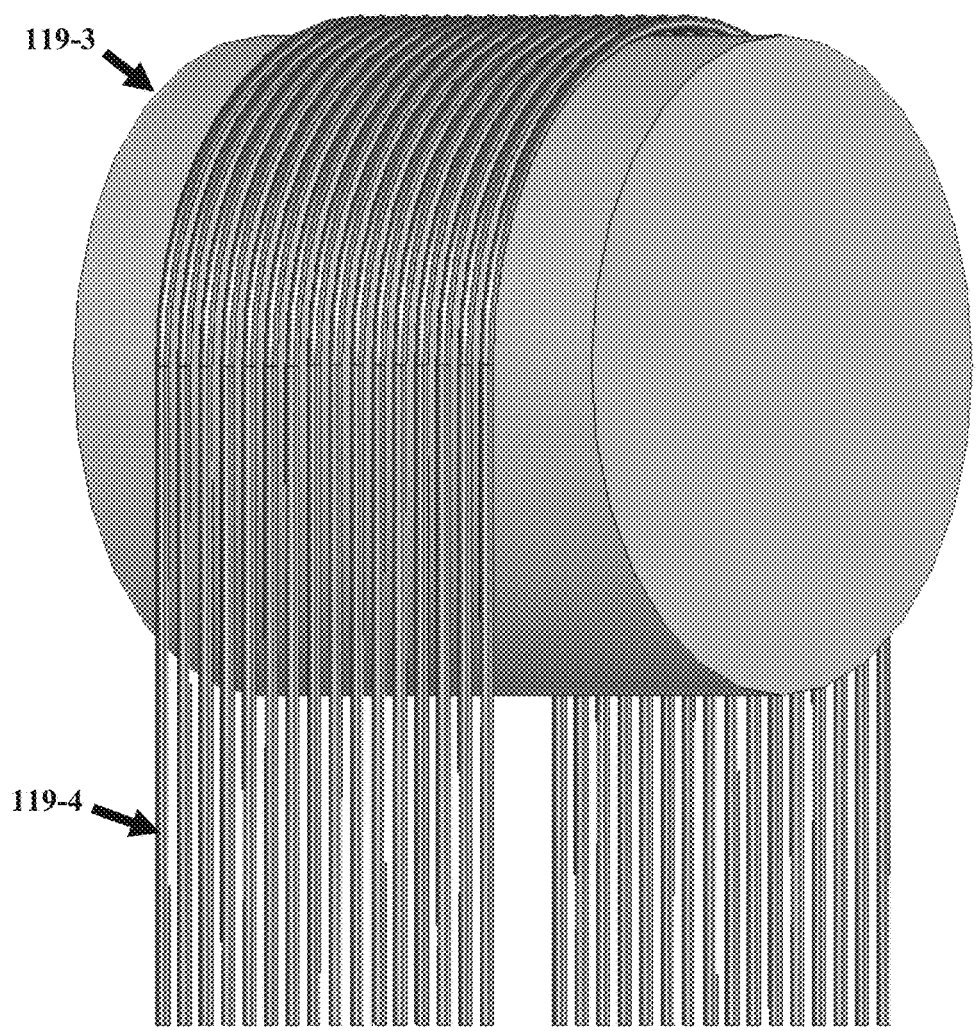
FIG. 119 is an elevated perspective view of the roller pulley of FIG. 118.

FIG. 119 shows a perspective view of FIG. 118. Multiple subconnectors of flexible connector 119-4 are shown passing up, around, and over drum 119-3. These multiple subconnectors can comprise a ribbon-like flexible connector element as described in other figures. The multiple subconnectors of flexible connector 119-4 can each pass over drum 119-3 once as shown in this figure (e.g. used to form one half of a traction winch as shown in FIG. 95). The multiple instances of flexible connector 119-4 can also each pass over and wrap several times around drum 119-3 (e.g. in a helical groove or nonhelical collection of parallel grooves, oriented with its central axis collinear with the cylindrical axis of drum 119-3), with one end of each flexible connector instance rigidly fixing itself to the surface of drum 119-3 (e.g. as shown in FIGS. 122 and 123).

Figure 120:
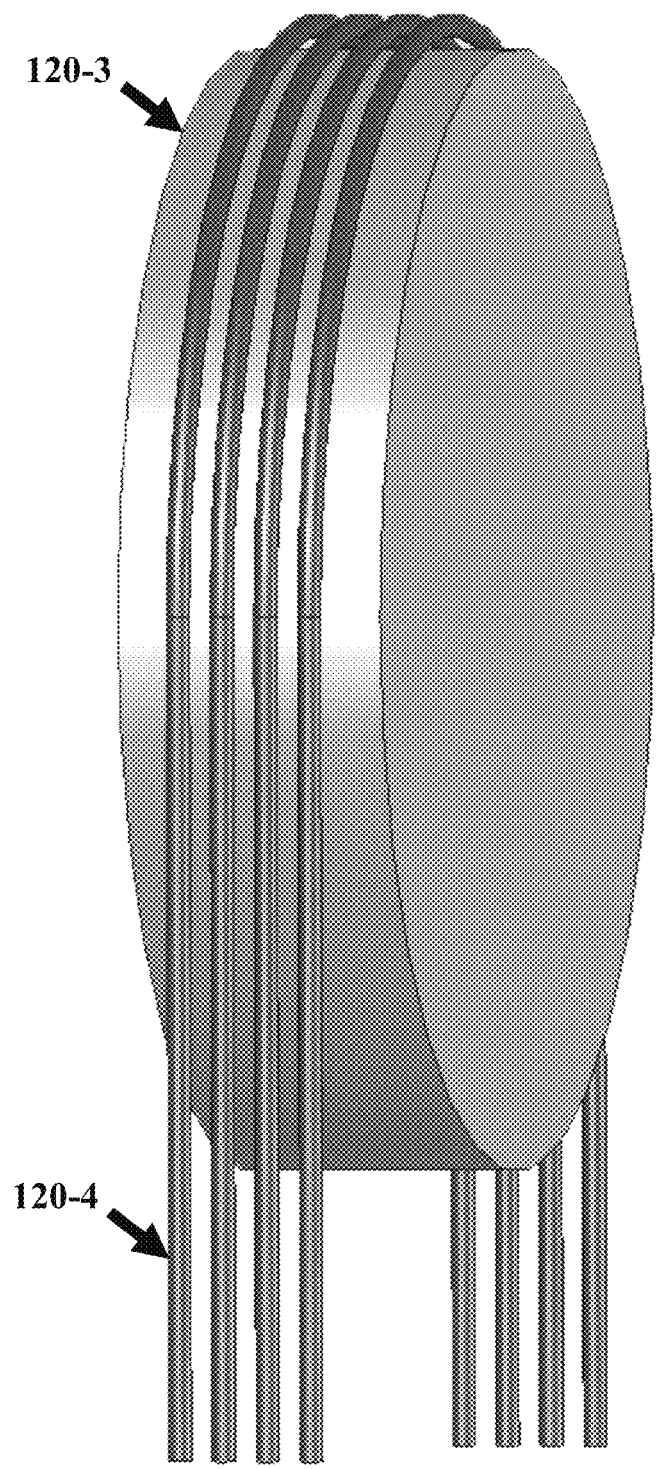
FIG. 120 is a side view illustration of a roller pulley around which a ribbon cable is engaged.

FIG. 120 shows a perspective view of a preferred feature of the current disclosure. This preferred feature is similar to the feature described in FIGS. 118 and 119, except now drum 120-3 has a shorter length and fewer instances of flexible connector 120-4 passing up, around, and over drum 120-3. A plurality of these features can be used to effect the same result as using a single feature detailed in FIGS. 118 and 119.

Figure 121:
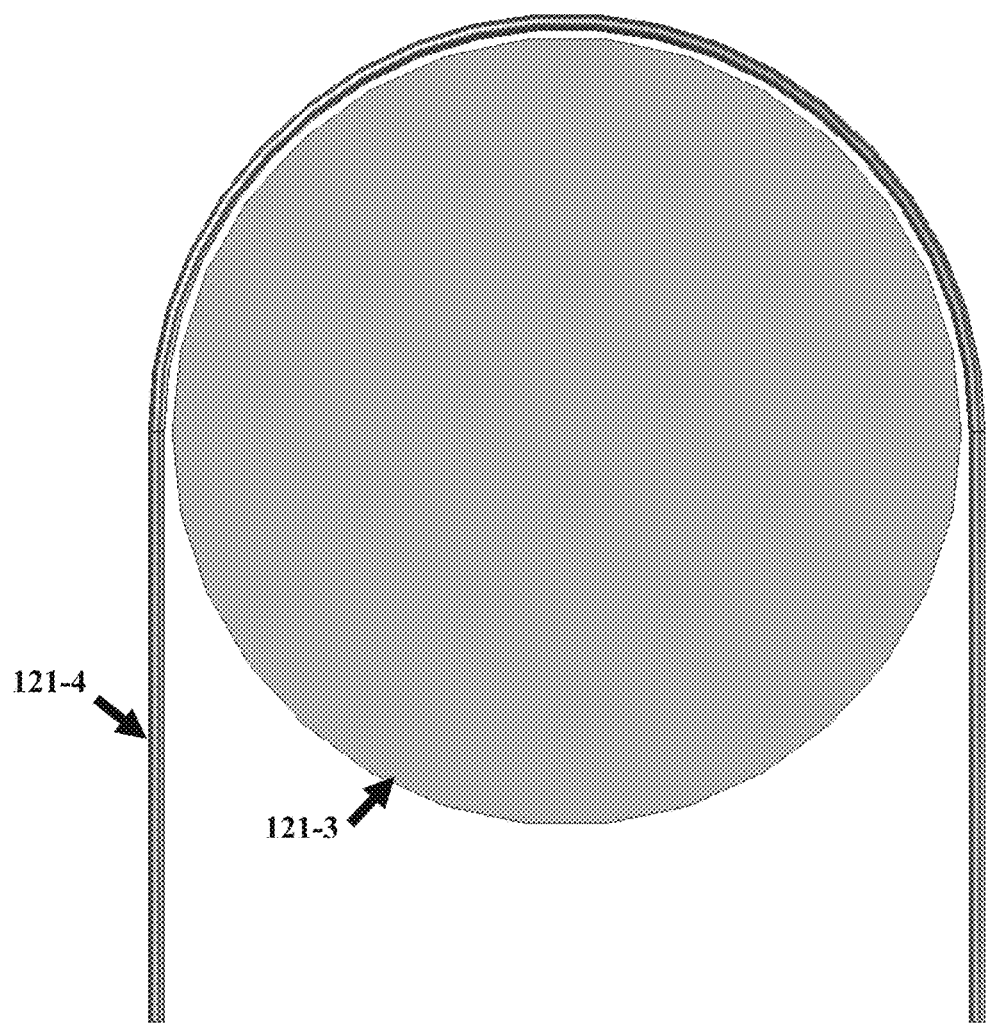
FIG. 121 is an elevated perspective view of the roller pulley of FIG. 120.

FIG. 121 shows a vertical profile view of FIG. 120. This figure illustrates the relative diameter of flexible connectors 121-4 passing around drum 121-3. The diameter of drum 121-3 should be at least 50 times larger than the diameter of flexible connectors 121-4 to resist fatigue and ensure their longevity.

Figure 122:
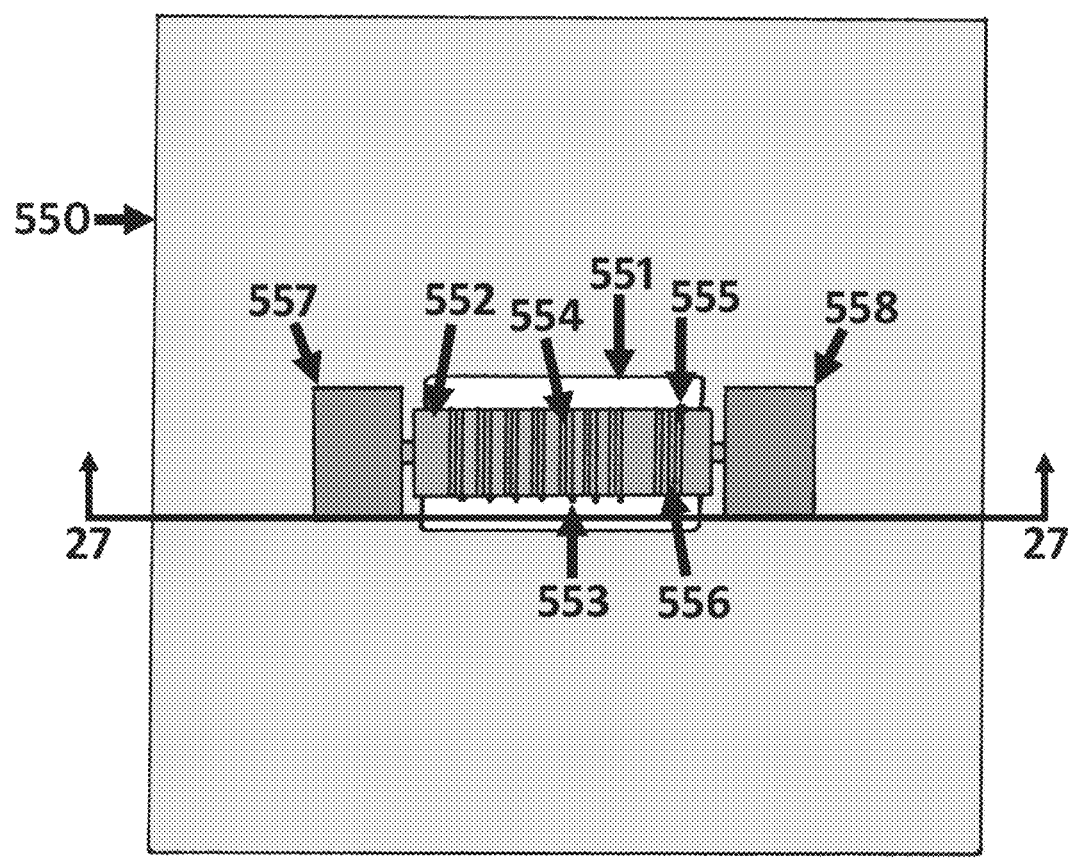
FIG. 122 is a top down perspective view of an embodiment of the present invention.
Figure 123:
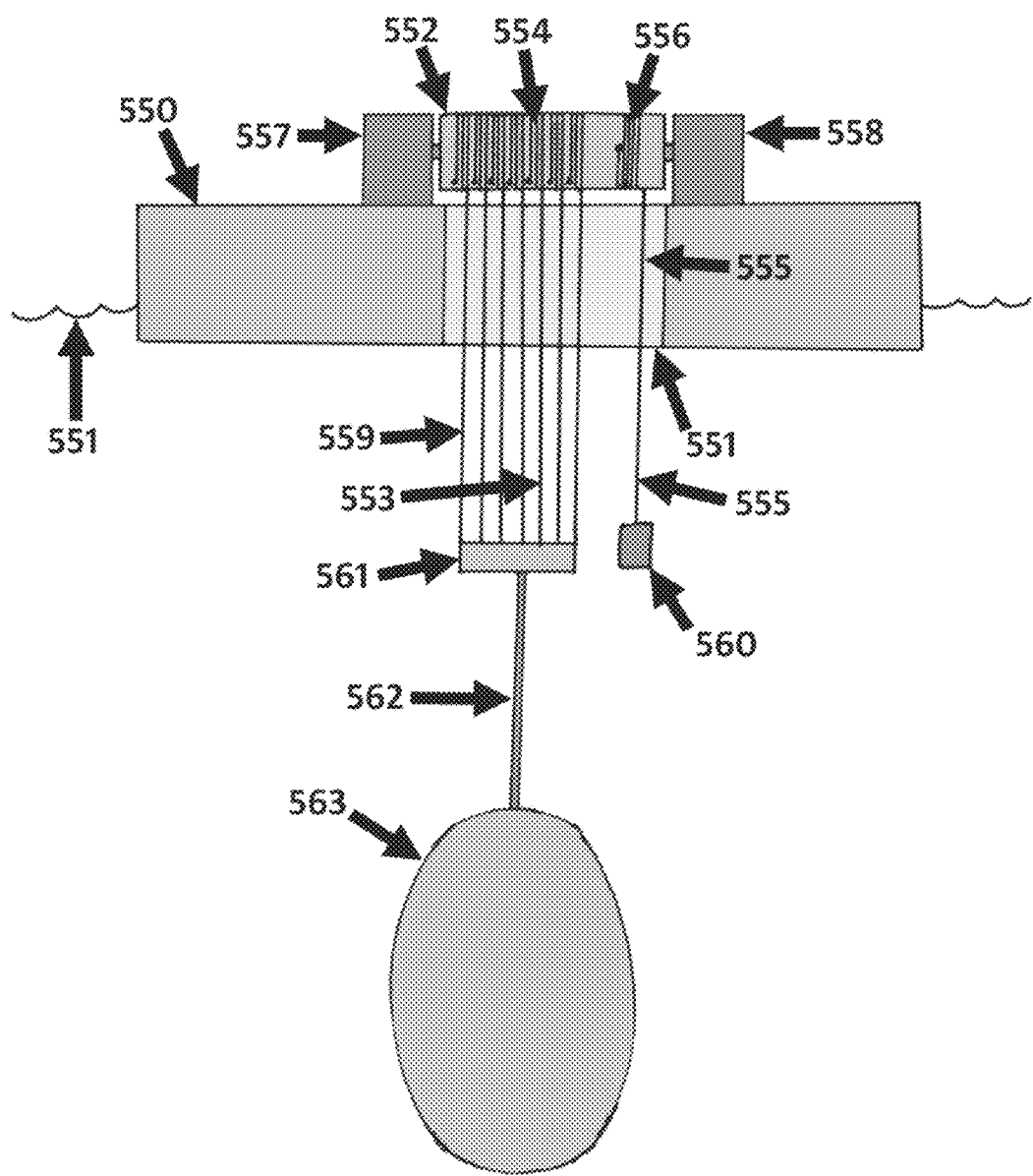
FIG. 123 is sectional perspective view of the embodiment of FIG. 122.

FIG. 122 shows a top-down perspective on an embodiment of the present disclosure. A buoy 550 has a central aperture 551 through which a plurality of cables pass into the body of water on which the buoy floats. A parallel array, or "ribbon," of cables, e.g. 553-554, are wound about a roller 552. One end, e.g. 553, of each cable in the array is affixed to the roller 552. The other end of each cable in the ribbon is connected to a submerged inertial mass (below the buoy and not visible from the illustrated perspective).

Another cable 555-556 is wound about the same roller 552. One end 555 of that cable is likewise affixed to the roller 552. And, the other end of that cable is connected to a submerged restoring weight (below the buoy and not visible from the illustrated perspective).

When the buoy rises in response to an approaching wave crest, the end of the ribbon cable wound about, and/or attached to, the roller 552, is pulled up. The other end that is connected to the inertial mass is held down. The resulting tension causes the roller 552 to rotate under the influence of a substantial torque. That torque is used to rotate the rotors of two generators, one of which is rotatably connected to each end of the roller's shaft. The rotation of the roller 552 causes the length of the ribbon cable 554 connecting the roller to the inertial mass to increase. It also causes the "counter-wound" cable 556 connecting the roller to the restoring weight to decrease, thus lifting the restoring weight and increasing its gravitational potential energy.

When the buoy falls in response to an approaching wave trough, it begins approaching (rather than moving away from) its inertial mass, and, because of this, the ribbon cable is now too long and becomes slacker, at least to a degree. At this time, the raised restoring weight causes the roller to reverse and rotate in the opposite direction, thereby rewinding onto itself the slack ribbon cable 554, and paying out the cable 556 to which the restoring weight is connected.

FIG. 123 shows a side view of the same embodiment illustrated and discussed in relation to FIG. 122. Buoy 550 floats adjacent to a surface 551 of a body of water.

Ribbon cable 553/559 connects the embodiment's roller 552 to the submerged inertial mass 563. The ribbon cable 553/559 is connected to the inertial mass 563 by means of a ribbon junction bar 561 and cable 562. Ribbon cable connects the inertial mass 563 to the roller 552 by passing through aperture 551 in the buoy 550.

Cable 555 connects the roller 552 to restoring weight 560. Cable 555 also passes through aperture 551 in order to connect the roller to the restoring weight. Cable 555 is wound around roller 552 in the opposite direction that characterizes the winding of ribbon cable 553/559 around the roller. So, when the ribbon cable shortens (as when the ribbon cable is slack and the buoy is approaching the inertial mass), the restoring weight's cable lengthens. And, when the ribbon cable lengthens (as when the buoy rises and pulls away from the inertial mass), the restoring weight's cable shortens, thereby raising the restoring weight and imparting to it gravitational potential energy.

Generators at each side of the roller are rotatably connected to its shaft and generate electrical power when the roller rotates, at least when it rotates in the direction that lengthens the ribbon cable segment 553/559 which occurs when the inertial mass pulls on that cable with substantial force thereby imparting substantial torque to the roller 552.

Figure 124:
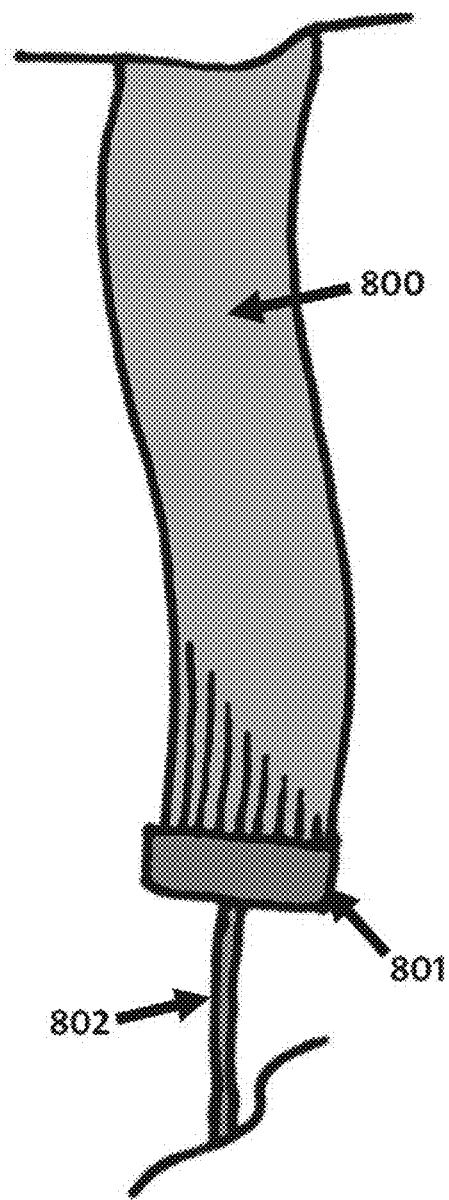
FIG. 124 is a side view illustration of a ribbon cable.

FIG. 124 illustrates a possible configuration and/or geometry of a ribbon cable 800. In this illustration, the ribbon cable is characterized by a flat and/or a rectangular shape. And, its connection to a ribbon junction bar 801 facilitates its connection to an inertial mass, e.g. by a cable 802. And, the upper end of the ribbon cable might pass over a roller and/or be connected to a restoring weight or a roller. Located on the ribbon junction bar 801 is at least one sacrificial anode (not shown) and the sacrificial anode is electrically connected to the constituent subconnectors of the ribbon through the ribbon junction bar 801 to protect them from corrosion.

Figure 125:
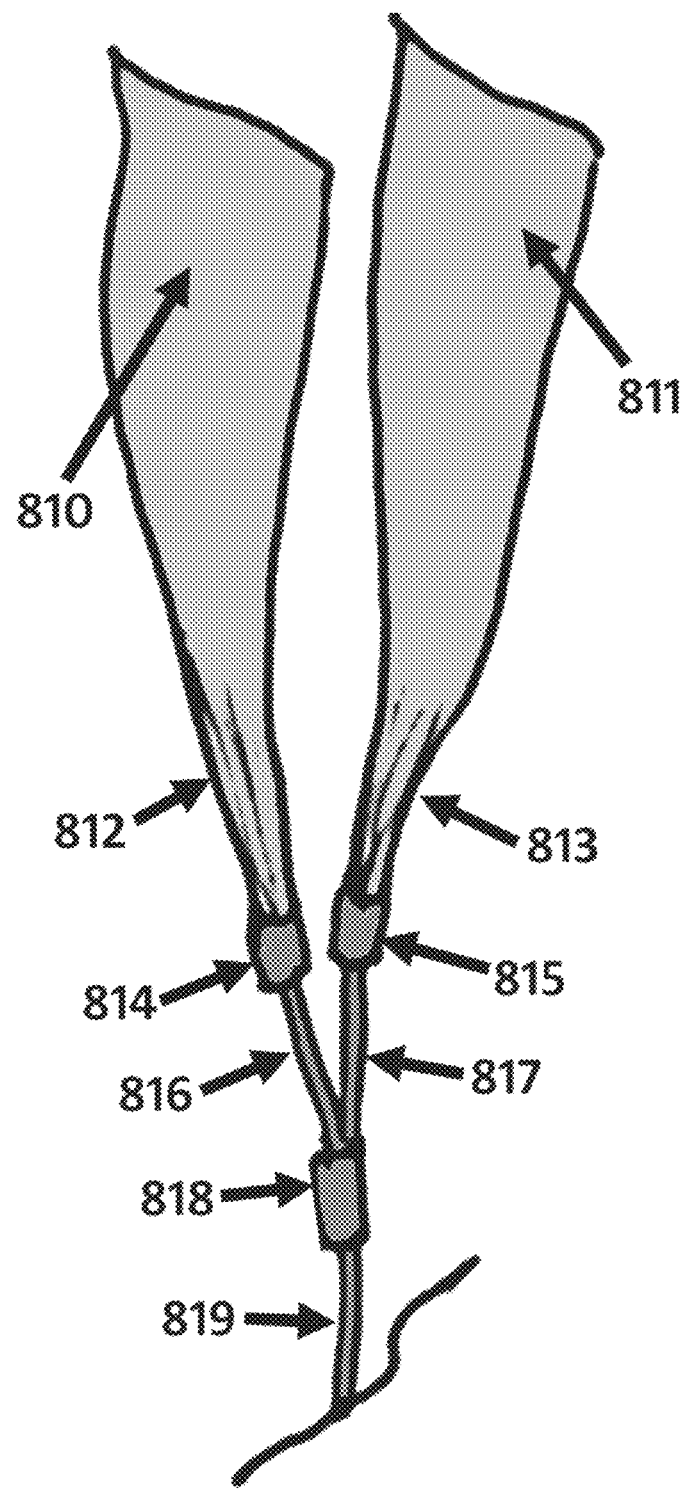
FIG. 125 is a side view illustration of a ribbon cable.

FIG. 125 illustrates a possible configuration and/or geometry of a pair of connected ribbon cables 810 and 811. These ribbon cables have approximately flat rectangular geometries at their upper ends 810 and 811. But their lower ends 812 and 813 are "bunched together" so as to morph the flat geometry of the top into an approximately tubular geometry at the bottom. The tubular collections of the cables of which the ribbons are composed are held together at bindings 814 and 815 which are connected to individual cables 816 and 817, which are in turn joined and/or bound together at connector 818. That connector 818 is connected to cable 819 which might then be connected and/or attached to an inertial mass. And, the upper ends of the constituent ribbon cables might pass over rollers and/or be connected to restoring weights or rollers.

Figure 126:
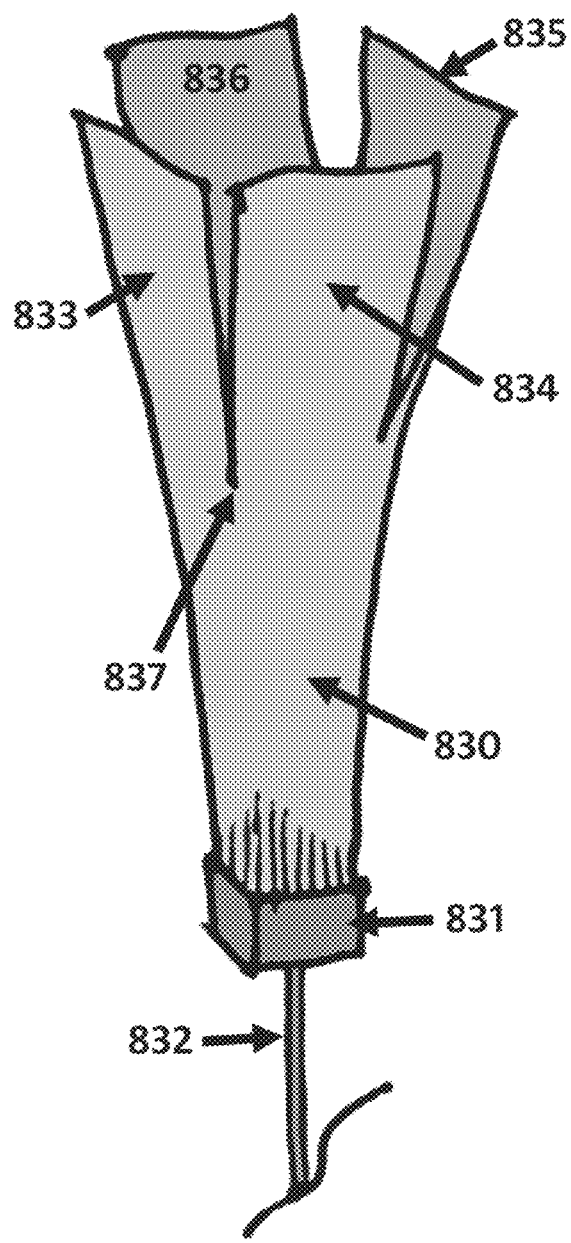
FIG. 126 is a side view illustration of a ribbon cable.

FIG. 126 illustrates a possible configuration and/or geometry of four interconnected ribbon cables 833-836. These ribbon cables have approximately flat rectangular geometries at their upper ends 833-836. But their lower ends merge to form and geometry that is approximately that of a square tube. The bottoms of the cables are connected to a square ribbon junction bar 831 which is in turn connected to a single cable 832 which might be connected to an inertial mass. And, the upper ends of the constituent ribbon cables might pass over rollers and/or be connected to restoring weights or rollers.

Figure 127:
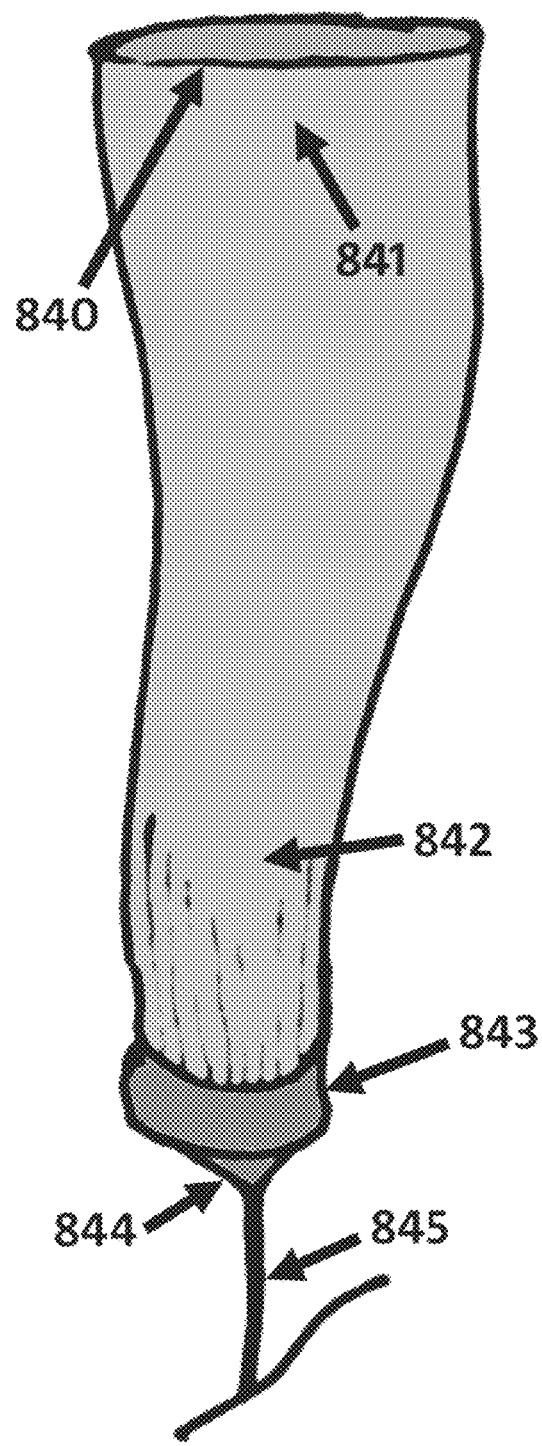
FIG. 127 is a side view illustration of a ribbon cable.

FIG. 127 illustrates a possible configuration and/or geometry of a ribbon cable 841. The ribbon cable is approximately cylindrical and at its upper end 840 the ends of the cables are arrayed in an approximately circular pattern. The tubular geometry continues down to the point at which the individual and/or constituent cables in the ribbon are connected to a circular ribbon junction bar 843. The junction bar is connected, via structure 844, to a single cable 845, which might then be connected to an inertial mass. And, the upper ends of the constituent cables might pass over pulleys and/or rollers and/or be connected to restoring weights or rollers.

Figure 128:
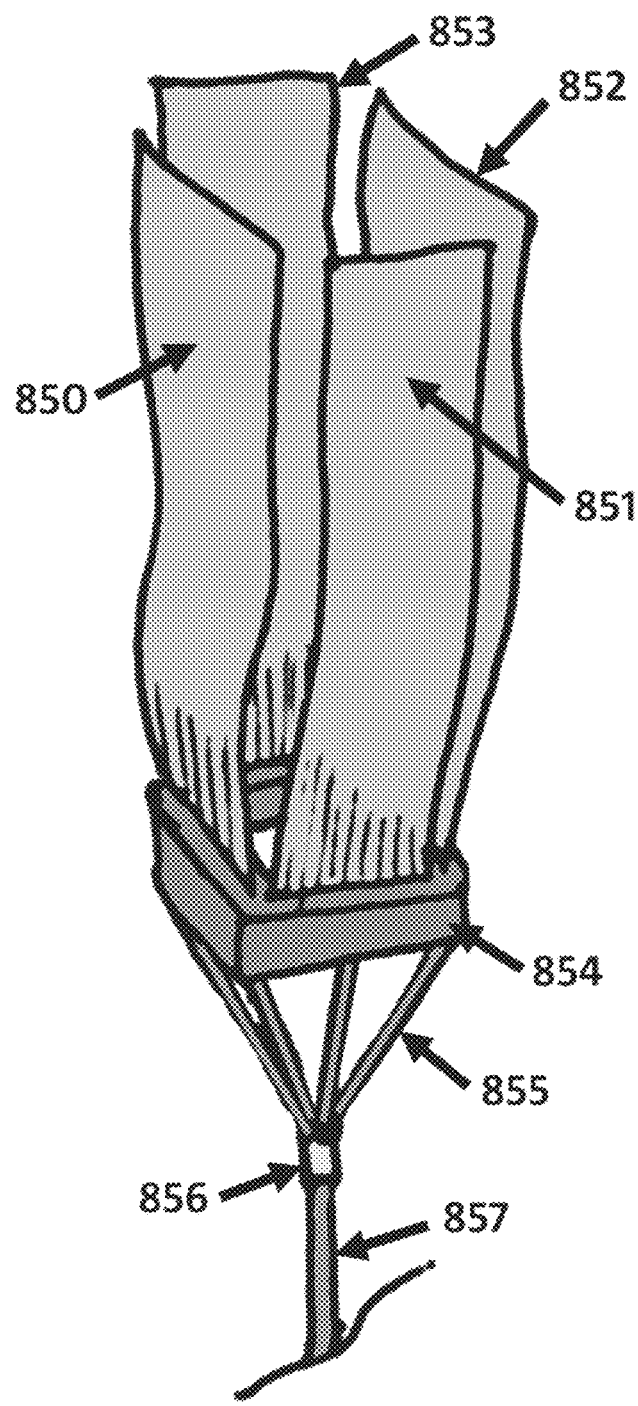
FIG. 128 is a side view illustration of a ribbon cable.

FIG. 128 illustrates a possible configuration and/or geometry of four interconnected ribbon cables 850-853. These ribbon cables have approximately flat rectangular geometries across their entire lengths. And the ribbon cables remain separate, and are attached at different portions of a square ribbon junction bar 854. That junction bar is then connected to a single cable 857 and connector 856 by a pyramidal set of cables. An inertial mass might be connected to cable 857. And, the upper ends of the constituent ribbon cables might pass over rollers and/or be connected to restoring weights or rollers.

Figure 129:
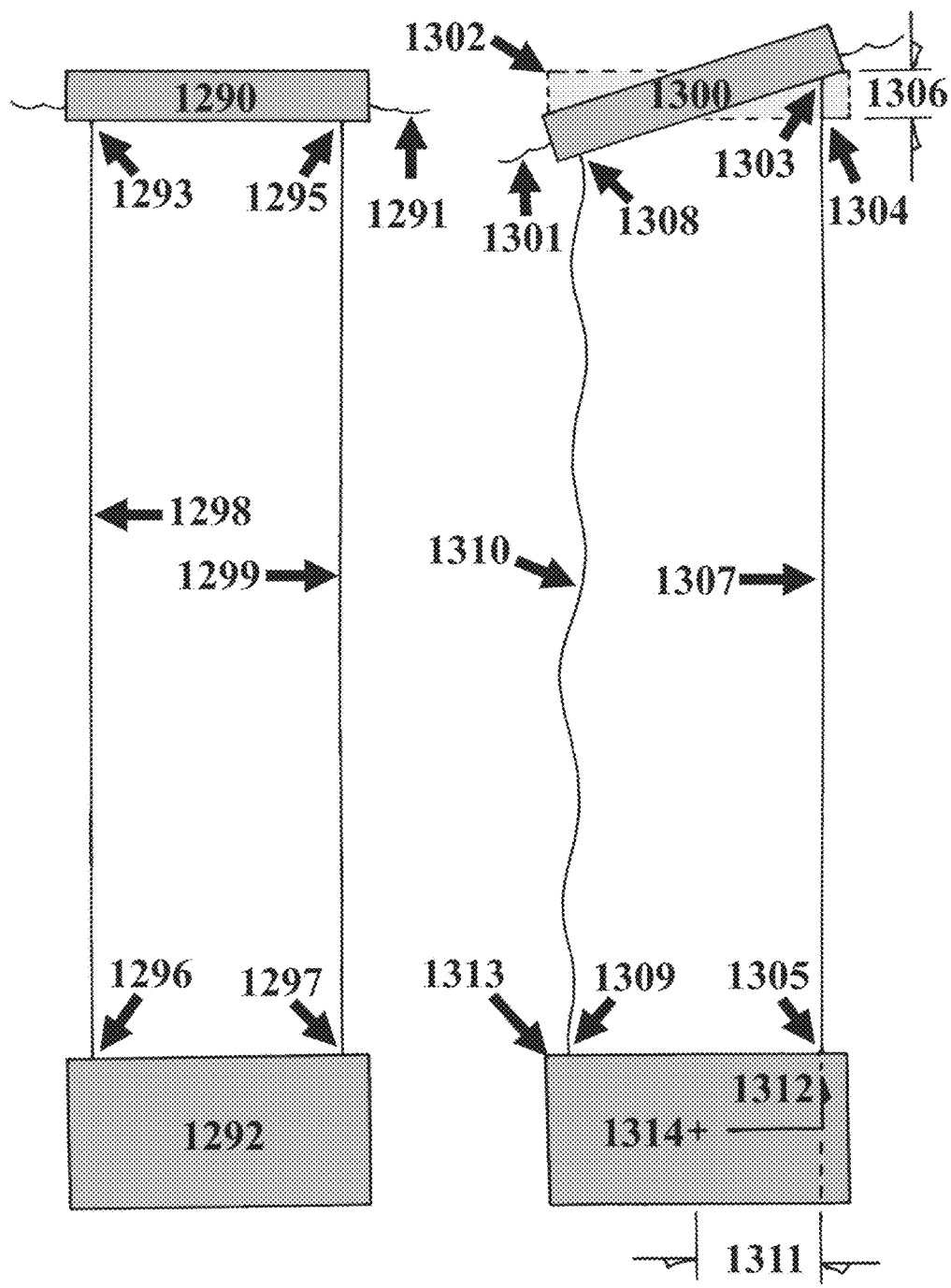
FIG. 129 is a side-by-side illustration of a buoy flexibly connected to a submerged inertial mass by a pair of vertical cables.

FIG. 129 illustrates a potential disadvantage of connecting a buoy to a submerged inertial mass by a pair of laterally separated vertical cables. The device configuration on the left side of FIG. 129 illustrates a buoy 1290 at rest at the surface 1291 of a body of water. Two vertical cables 1298-1299 connect the buoy to a submerged inertial mass 1292. The upper ends of the cables are connected to the buoy at points 1293 and 1295. The lower ends of the cables are connected to the inertial mass at points 1296 and 1297.

When the surface 1301 of the water disrupts the orientation of the buoy, e.g. by a wave, the buoy's orientation changes from its nominal horizontal orientation 1302 to a tilted one 1300. This tilting lowers one cable connection point 1308, thus decreasing the distance by which it is separated from its complementary connection point 1309 on the inertial mass. This causes this cable 1310 to become slack, imparting no upward force on the inertial mass 1313.

However, this tilting of the buoy 1300 also raises the other cable connection point, e.g. from 1304 to 1303. And, because the substantial inertia of the inertial mass 1313 inhibits its ability to match the reorientation of the buoy 1300, the cable 1307 wants to be excessively paid out by a distance of 1306. However, due to its fixed length, the depth of the end of the buoy adjacent to 1303 increases, thereby imparting to cable 1307 a substantial upward force on the inertial mass at point 1305.

The force imparted to the inertial mass 1313 at point 1305 by cable 1307 is directed along the dashed line descending from point 1305. This force is applied to inertial mass at an approximate distance of 1311 from its center of gravity 1314. This off-center force imparts to inertial mass 1313 a torque 1312 which will tend to impart a rotation to the inertial mass, thereby reducing its stability. Such a rotation is not helpful to the behavior of a point-absorbing wave energy device that extracts power from heave-induced vertical motions of its buoy.

Figure 130:
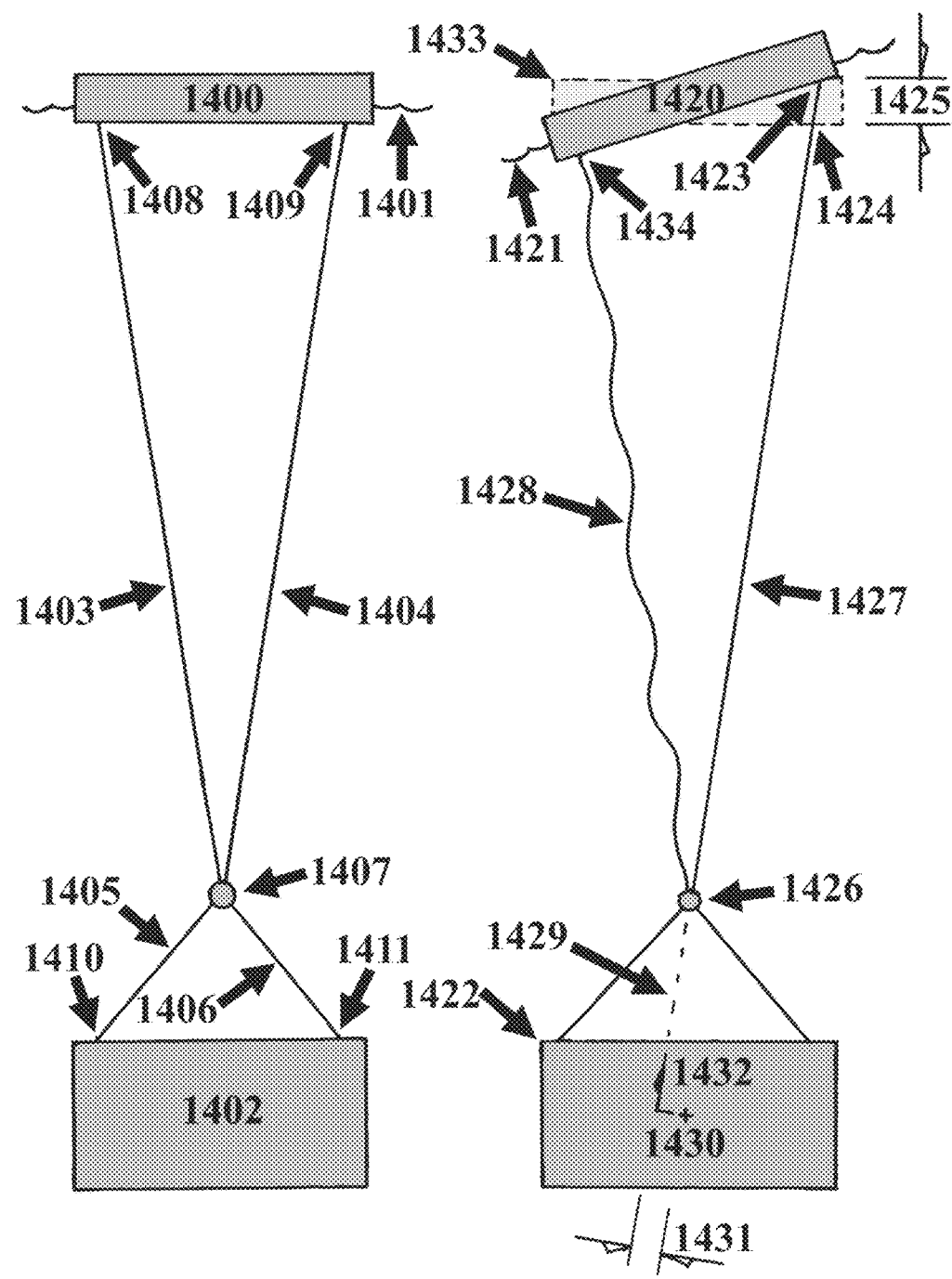
FIG. 130 is a side-by-side illustration of a buoy flexibly connected to a submerged inertial mass by a pair of vertical cables that are interconnected at a single central pick point.

FIG. 130 illustrates an alternative to the cable geometry used to connect the buoy in FIG. 129 to its inertial mass. On the left side of FIG. 130 is illustrated an alternate device configuration to the one illustrated and discussed in relation to FIG. 129. The alternate device configuration on the left side of FIG. 130 illustrates a buoy 1400 at rest at the surface 1401 of a body of water. Two cables are connected to buoy 1400 at the same relative points at which the two vertical cables of the device configuration illustrated in FIG. 129 are connected to that buoy. However, these lower ends of the two cables 1403-1404 in FIG. 130 are interconnected at a common connector 1407 or junction. Two cables 1405 and 1407 connect the inertial mass 1402 to that same common connector 1407, and are in turn connected to the inertial mass at the same relative points as are the vertical cables of FIG. 129.

When the surface 1421 of the water disrupts the orientation of the buoy, e.g. by a wave, the buoy's orientation changes from its nominal horizontal orientation 1433 to a tilted one 1420. This tilting lowers one cable connection point 1434, thus decreasing the distance by which it is separated from the common intermediary connector 1426. This causes this cable 1428 to become slack, imparting no upward force on the common connector 1426, nor to the connected inertial mass 1422.

However, this tilting of the buoy 1420 also raises the other cable connection point, e.g. from 1424 to 1423. And, because the substantial inertia of the inertial mass 1422, the inertial mass inhibits the ability of the common connector 1426 to rise in order to accommodate the raising of connection point 1423. Because of this disparity, the cable 1427 wants to be excessively paid out by a distance of 1425. However, due to its fixed length, the depth of the end of the buoy adjacent to 1424 increases, thereby imparting to cable 1427 a substantial upward force on the common connector 1426, and therethrough to the inertial mass 1422.

However, due to its geometry, the substantial upward force imparted to the common connector 1426 by cable 1427 is directed into the inertial mass along line 1429. This force path is separated from the inertial mass' center of gravity 1430 by a much smaller distance 1431 than was the case with respect to the device configuration illustrated and discussed in relation to FIG. 129. The significantly greater proximity of the force line 1429 to the center of the inertial mass 1422 means that only a relatively small portion of the one-sided upward force imparted by the stretched cable 1427 will be imparted to the inertial mass 1422 as a rotation-inducing torque. The remaining portion of that one-sided upward force will simply act on the inertial mass in an approximately vertical and upward direction which is the nominal dynamic of a point-absorbing wave energy device.

The use of a single, connection point between the buoy and the submerged inertial mass of a wave energy converter such as the one disclosed herein constitutes a part of this disclosure and is novel and an improvement to the state of the art. It is a feature imparting significant utility within the context of the design, operation, and behavior of a point-absorbing wave energy converter that leverages and exploits the inertia of a submerged mass as a counterpoint to the vertical accelerations of wave heave.

Figure 131:
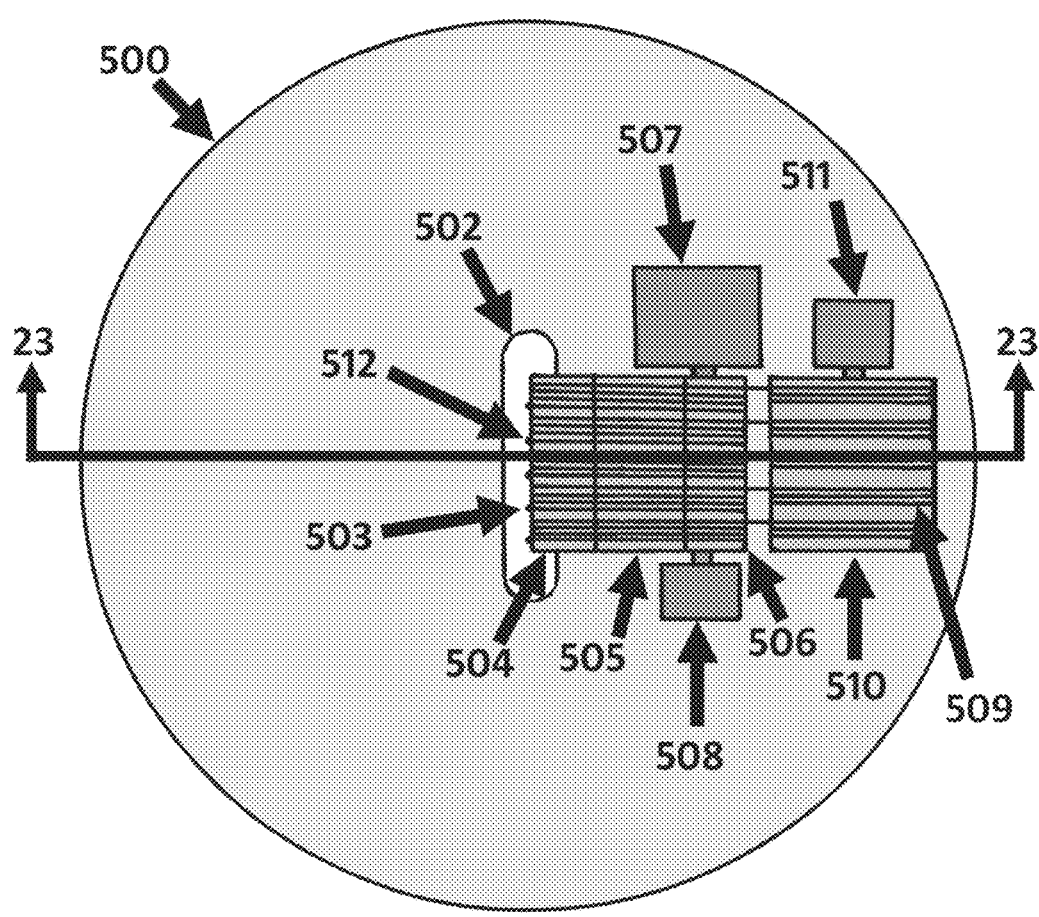

FIG. 131 shows a top-down view of an embodiment of the present disclosure. A buoy 500 floats adjacent to a surface of a body of water. The buoy 500 contains a central aperture 502. A submerged end of ribbon cable 503/512 is connected to a submerged inertial mass (not visible) below the buoy. The ribbon cable passes from the inertial mass through the aperture and onto and around a three-roller torsion winch. The torsion winch's three rollers 504-506 are arranged in an approximately pyramidal or triangular arrangement, with two rollers 504-506 being positioned near and adjacent to an upper surface of the buoy 500. A third roller 505 is positioned above the lower two and approximately between them. The longitudinal and rotational axes of the three rollers are parallel to one another.

Each strand of the ribbon cable is wound around the three cooperating rollers of the torsion winch multiple times thereby creating sufficient friction with the rolling surfaces of the rollers to permit the cable's movement to engage and turn the rollers, even when the embodiment's power-take-off (PTO) 507 resists the turning of the torsion winch's rollers.

After winding around the rollers of the torsion winch, each strand of the ribbon cable travels onto and around a roller 510 from which the ribbon cable is paid out in response to each increase in the separation of the buoy from the inertial mass, and, when driven by "rewinding motor" 511, onto which the ribbon cable is rewound in response to each decrease in the separation of the buoy from the inertial mass.

A rotary encoder 508 provides the control system with an indirect indication of the distance by which the buoy and the inertial mass are separated, and the length of the ribbon cable that connects the two.

Figure 132:
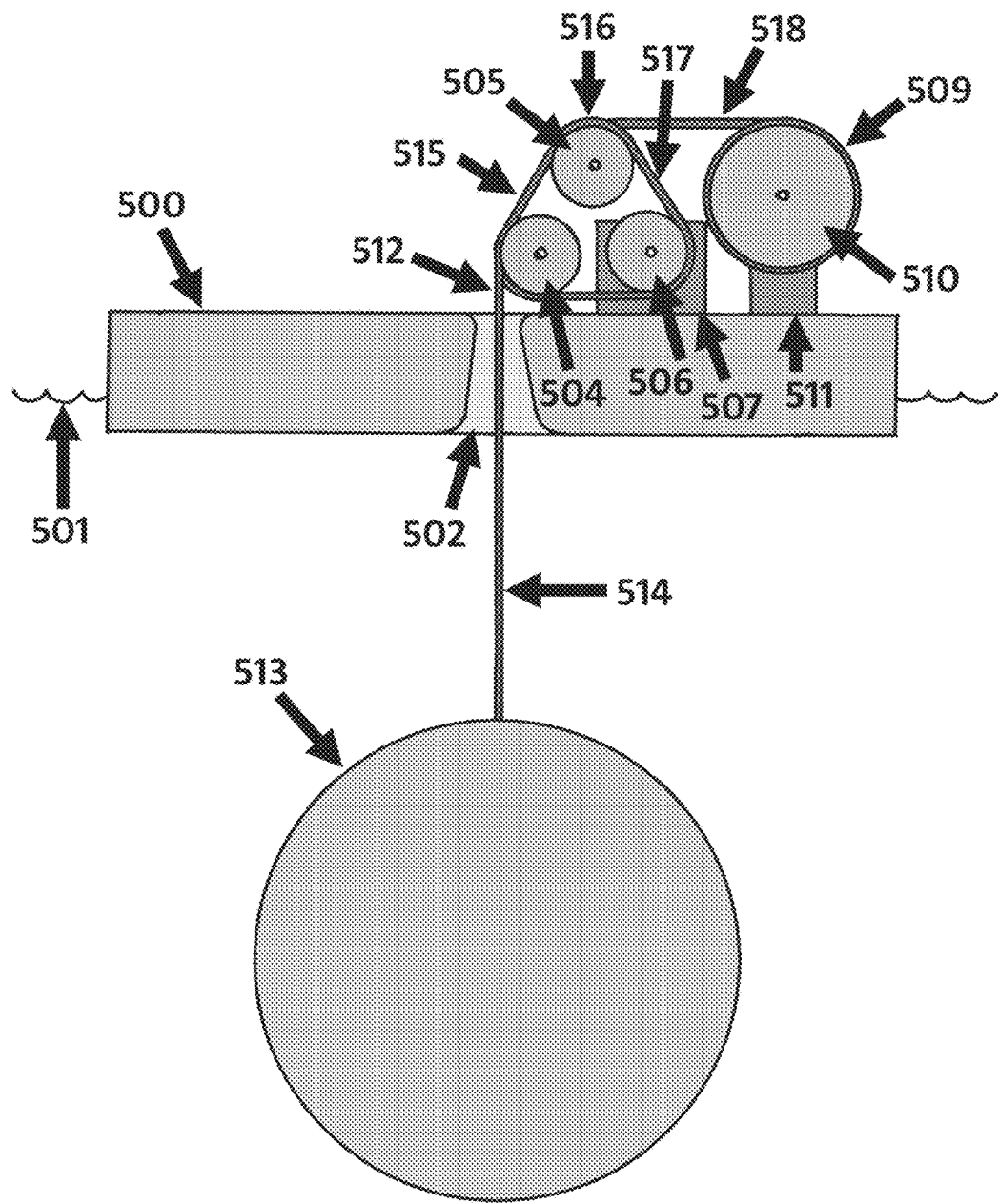

FIG. 132 is a cross-sectional view of the embodiment of the present disclosure illustrated and discussed in relation to FIG. 131, and taken across section line 23 in FIG. 131.

Buoy 500 floats adjacent to a surface 501 of a body of water. Buoy 500 is connected to a submerged inertial mass 513 by a ribbon cable 514 (shown from the side). One end of the ribbon cable is connected to the inertial mass 513, from which it travels upward and passes through an aperture or channel 502 in the buoy. The strands of the ribbon cable 512 are then wound 515-517 around the three rollers 504-506 of a torsion winch after which they travel to, and are wound 509 around, a roller 510 onto which the cable may be wound through the turning of the roller by "rewinding motor" 511.

As the buoy 500 is lifted and allowed to fall by waves at the surface 501 of the body of water, the distance between the buoy and the inertial mass will periodically and/or cyclically increase and decrease.

When the distance between the buoy and the inertial mass increases, the great inertia of the inertial mass 513 prevents it from matching the rate of upward acceleration manifested by surface of the water and by the buoy that floats on that surface. This disparity in their rates of upward acceleration exacerbates an increasing tension within the ribbon cable that joins them together. At a threshold level of tension (primarily determined by the PTO and/or by its control system) the rollers of the torsion winch "unwind" allowing cable to joining the buoy to the inertial mass to effectively get longer. As the rollers of the tension winch "unwind" under the tension responsible for the cable's unwinding, the PTO 507 extracts power from rotation of the rollers.

The tension introduced into the ribbon cable by the unequal rates of upward acceleration of the buoy and the inertial mass, and the increasing separation of the two, exerts an upward force on the inertial mass causing it to accelerate upward, albeit at a rate less than that of the buoy.

When the distance between the buoy and the inertial mass decreases, the upward velocity of the inertial mass 513 imparted to the inertial mass as a result of its subjection to the upward tension introduced to the ribbon cable suspending it when its distance from the buoy was increasing, continues, and the tension in the ribbon cable is substantially reduced, or eliminated. As the inertial mass 513 continues its upward movement due to its own momentum, gravity acts on its "wet weight" (i.e. the gravitation weight of its mass less the gravitation weight of the water that it displaces) to accelerate it downward. The ascent of the inertial mass will slow, and eventually it will begin to descend under its own wet weight.

When the distance between the buoy and the inertial mass decreases, the activation of the rewinding motor, and/or its constant exertion of a rewinding torque on the "storage roller" 510 will cause the slack ribbon cable to be rewound on to the storage roller until the slack is removed. In the case of a rewinding motor that exerts a constant rewinding torque on to the storage roller, the ribbon cable may never be slack. In these cases, the ribbon cable will tend to rewind on to the storage roller 510 whenever the downward force exerted on the cable by the inertial mass (e.g. when the distance between it and the buoy is increasing) is less than the upward/rewinding force exerted on it by the rewinding motor 511.

Figure 133:
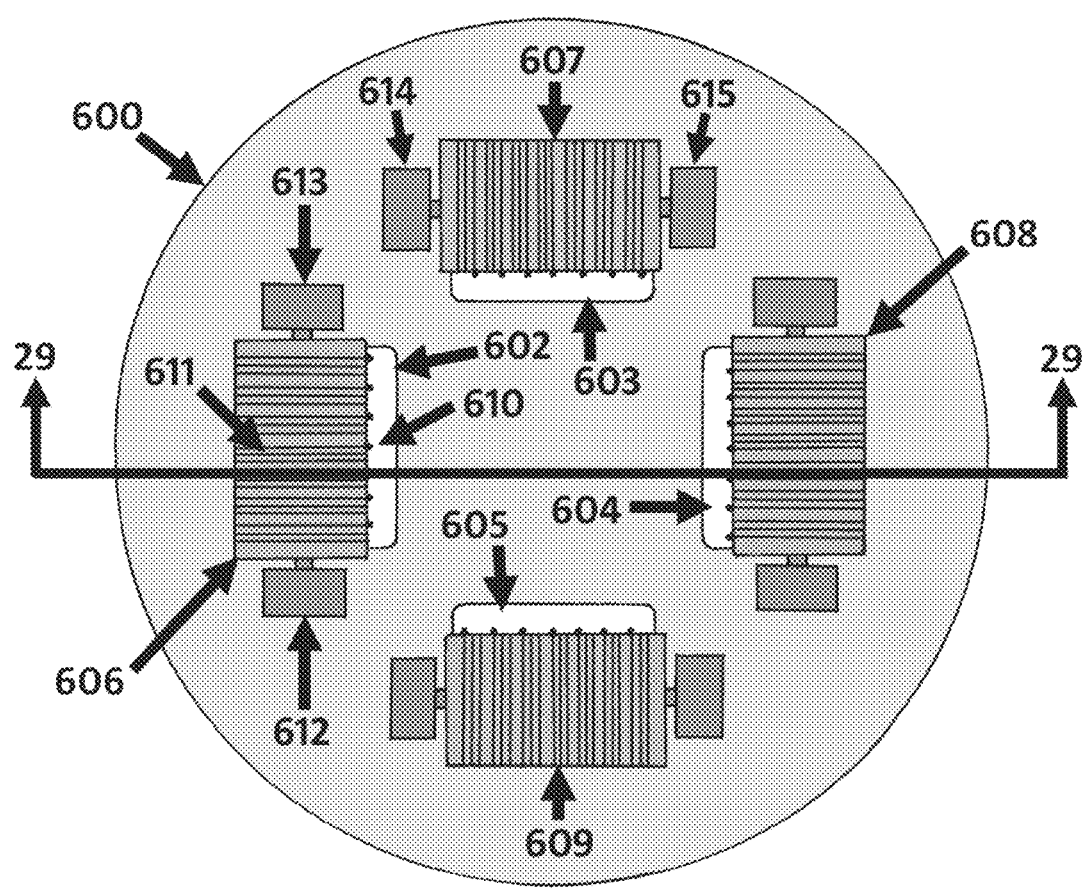

FIG. 133 shows a top-down view of an embodiment of the present disclosure. A buoy 600 floats adjacent to a surface of a body of water. The buoy 600 contains four apertures 602-605. Adjacent to each aperture is a roller 606-609, respectively. And, the shaft of each roller is rotatably connected on one side to a generator, e.g., 612 and 614, and, on the other side, to a "rewinding motor," e.g., 613 and 615.

Around each roller are wound the strands of four aperture-specific ribbon cables, e.g. 611. One end of each ribbon cable strand is affixed to the roller about which it is wound. The other end of each ribbon cable strand is connected to an inertial mass (not visible).

Figure 134:
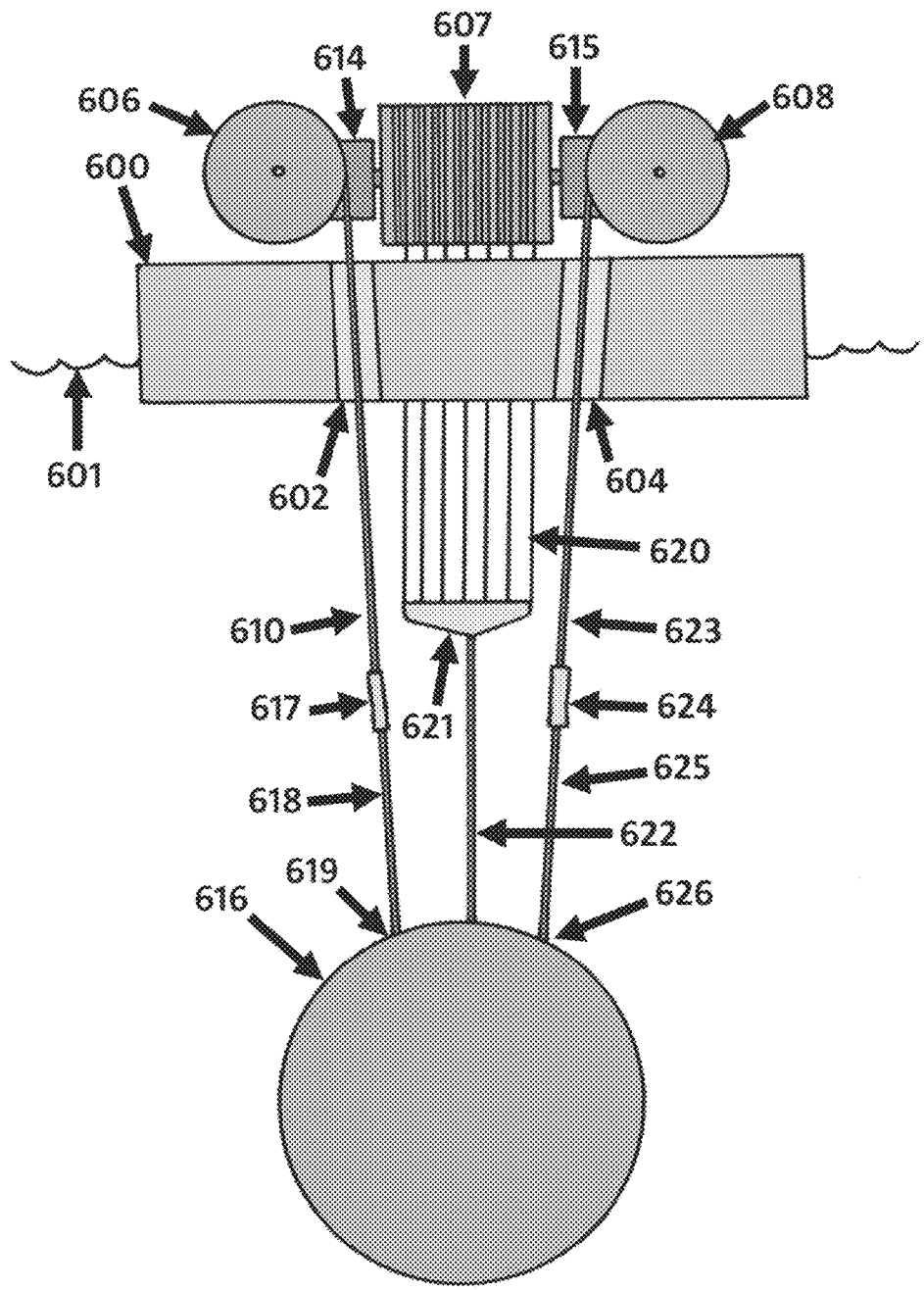

FIG. 134 shows a cross-sectional view of the embodiment of the present disclosure illustrated and discussed in relation to FIG. 133, and taken across section line 29 in FIG. 133.

Buoy 600 floats adjacent to a surface 601 of a body of water. Rotatably mounted to an upper surface of the buoy are four rollers, e.g. 606-608. And, wound about each roller are the strands of a roller-specific ribbon cable, e.g. 610 and 623. One end of each ribbon cable strand is affixed to its respective roller. The other end of each ribbon cable strand is affixed to a "ribbon junction bar," e.g., 617, 621, and 624. Each ribbon junction bar, in turn, is connected by a cable, e.g. 622, to an inertial mass 616.

Each ribbon cable, e.g., 610, connects the inertial mass 616 to a roller, e.g., 606, on the buoy 600, passing through a ribbon-specific aperture, e.g. 602, in order to do so.

Figure 135:
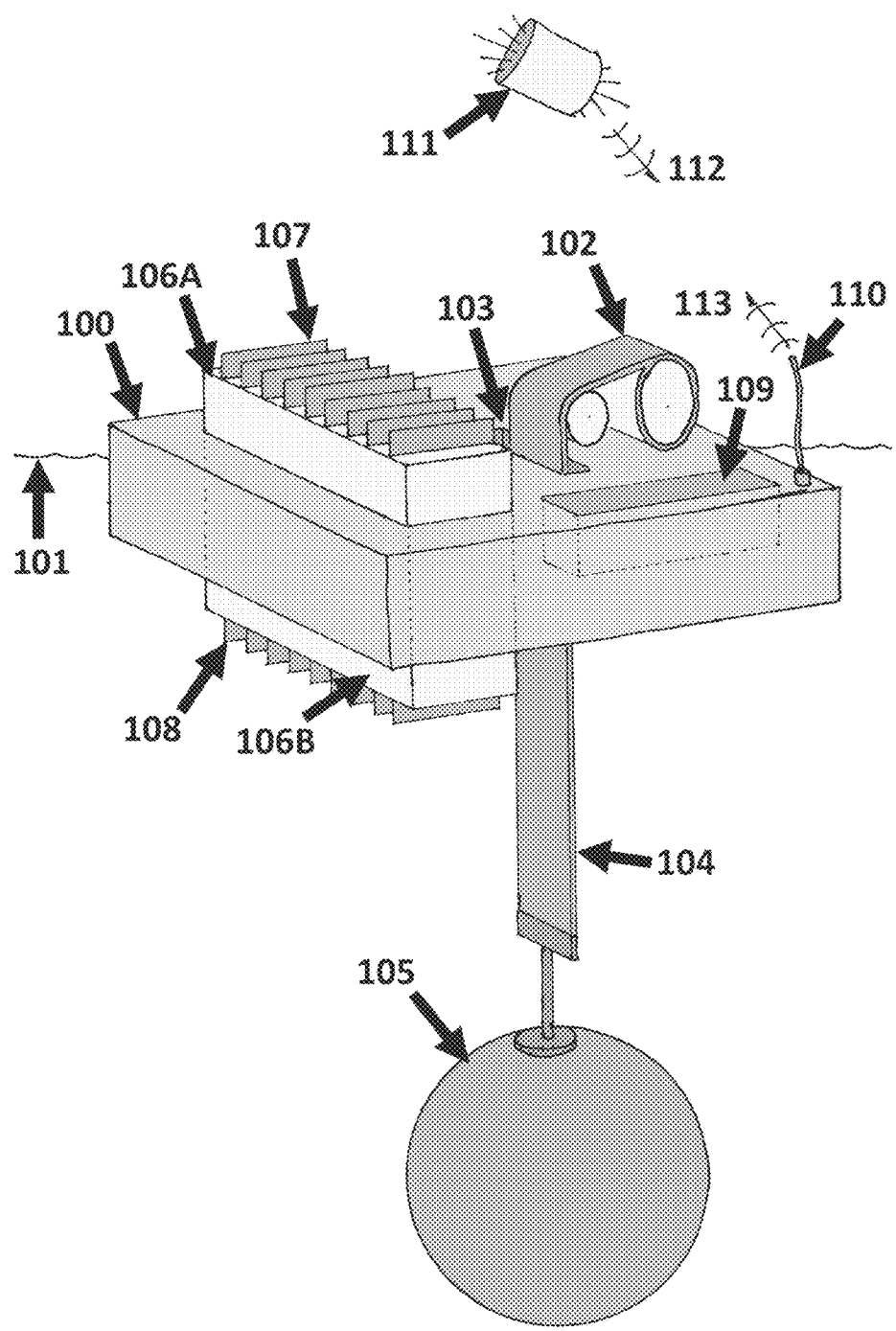

FIG. 135 shows a perspective view of an embodiment of the current disclosure. A buoy 100, flotation module, floating platform, and/or buoyant object, floats adjacent to the surface 101 of a body of water. Attached to, mounted on, and/or incorporated within, the buoy 100 is a power take-off (PTO) 102, and/or electrical power-generation assembly. A flat and/or ribbon cable 104 connects the PTO to a submerged inertial mass 105, traveling vertically through an aperture 103 in the buoy.

As the buoy is moved up and down by waves, the inertial mass 105 resists that motion, thereby causing the ribbon cable 104 to move over, around, and/or relative to, the gears, pulleys, drums, and/or cable-engagement components, of the PTO 102, thereby generating electrical power.

At least a portion of the electrical power generated by the PTO 102 is stored within batteries 109, capacitors chemical fuel (e.g. hydrogen) generators and storage mechanisms, and/or other energy storage mechanisms, systems, assemblies, and/or components.

Also attached to, mounted on, and/or incorporated within, the buoy 100 is at least one chamber 106, module, and/or container, in which are affixed a plurality of computing devices. The computing devices therein are powered and/or energized at least in part by electrical energy provided and/or supplied by batteries 109.

Heat generated by the computing devices within computing module 106 is dissipated, at least in part, across the surfaces of fins 107 attached to the top of the computing module 106A, thereby warming the air above the buoy 100, and, at least in part, across the surfaces of fins 108 attached to the bottom of the computing module 106B, thereby warming the water below the buoy 100.

The illustrated embodiment 100 receives tasks, programs, data, messages, signals, information, and/or digital values, emitted 112, issues, and/or transmitted, from at least one satellite 111, at least in part, through antenna 110, the data having, at least in part, originated from a remote computer and/or server.

The illustrated embodiment 100 transmits 113, communicates, emits, and/or issues, data, task results, messages, signals, information, status updates, and/or digital values, at least in part, from antenna 110, which are subsequently received, at least in part, by satellite 111, which may then transmit that received data to a remote computer and/or server.

Figure 136:
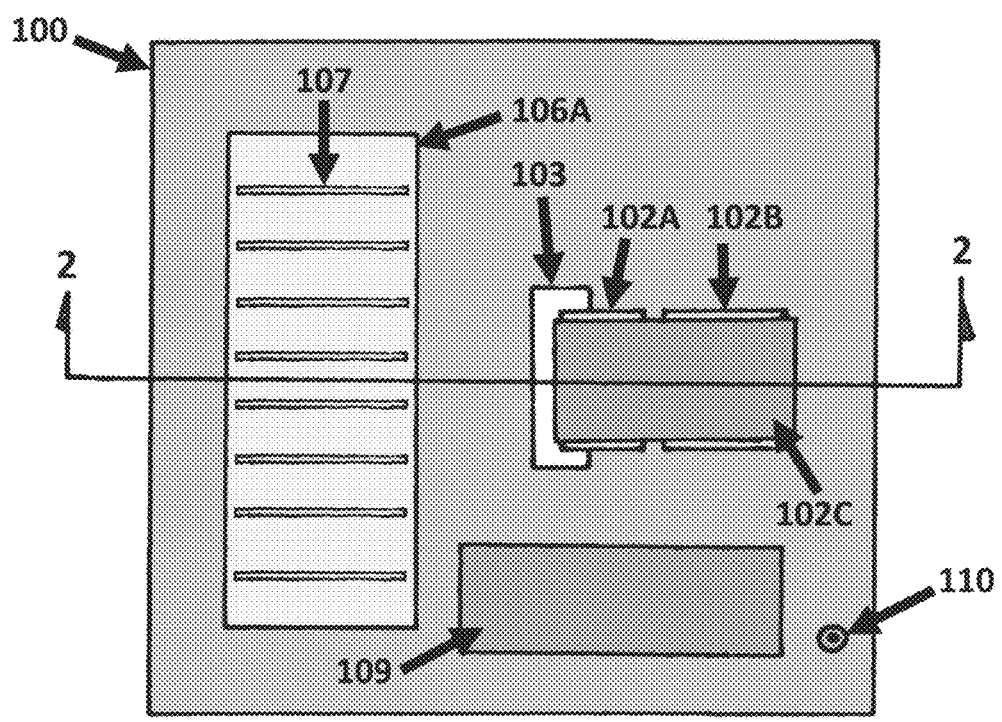

FIG. 136 shows a top-down view of the same embodiment of the current disclosure illustrated in FIG. 135. A buoy 100 floats adjacent to the surface of a body of water. Attached to, mounted on, and/or incorporated within, the buoy 100 is a power take-off (PTO) 102, and/or electrical power-generation assembly. The PTO includes at least two pulleys and/or rollers 102A and 102B, about which a ribbon cable 102C passes and/or rolls. The ribbon cable 102C connects the PTO to a submerged inertial mass, traveling vertically through an aperture 103 in the buoy.

At least a portion of the electrical power generated by the PTO 102 is stored in an enclosed bank 109, assembly, and/or set of batteries, capacitors, chemical fuel (e.g. hydrogen) generators and storage mechanisms, and/or other energy storage mechanisms. A plurality of computers, computing devices, network connectors, and/or computing resources, are stored within chamber 106A, enclosure, module, and/or container, mounted on, embedded and/or incorporated within the buoy 100. Affixed to the top of the computing module 106A are heat-dissipating and/or cooling fins 107 that facilitate the transfer of heat generated by the computing resources within the computing module 106A to the air above the buoy.

An antenna 110 receives data transmitted by a satellite, and transmits data to a satellite. In some embodiments, antenna 110 transmits data to, and receives data from, other similar devices.

Figure 137:
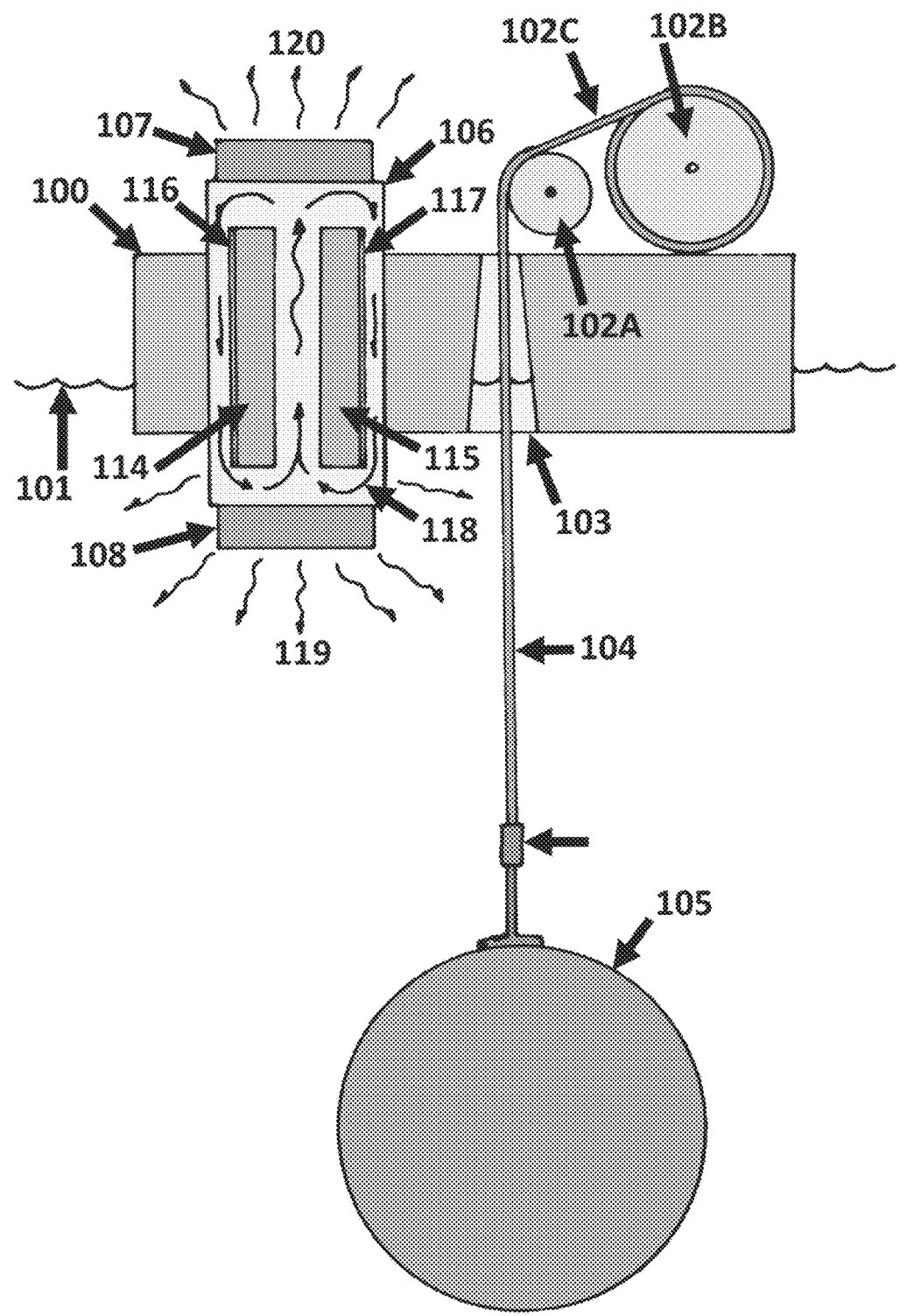

FIG. 137 shows a side view of the same embodiment of the current disclosure illustrated in FIGS. 135 and 136, and taken along a section plane "2" specified in FIG. 2. A buoy 100 floats adjacent to the surface 101 of a body of water. Attached to, mounted on, and/or incorporated within, the buoy 100 is a power take-off (PTO) 102, and/or electrical power-generation assembly. The PTO includes at least two pulleys and/or rollers 102A and 102B, about which a ribbon cable 102C passes and/or rolls. The ribbon cable 102C/104 connects the PTO to a submerged inertial mass 105, traveling vertically through an aperture 103 in and through the buoy.

A plurality of computers 114/115, computing devices, network connectors, and/or computing resources, are stored within chamber 106, enclosure, module, and/or container, mounted on, embedded and/or incorporated within the buoy 100.

In this illustrated embodiment 100, computing resources and/or computers are affixed within two vertical banks 116 and 117 and/or arrays. As they operate, and consume electrical power, they generate heat which gives rise to convective currents, e.g. 118, within the computing module 106 and/or chamber. The convective currents carry heat from the computing devices and/or circuits to upper 107 and lower 108 fins. Affixed to the top of the computing module 106 are heat-dissipating and/or cooling fins 107 that facilitate the transfer 120 of heat generated by the computing resources within the computing module 106 to the air above the buoy. Affixed to the bottom of the computing module 106 are heat-dissipating and/or cooling fins 108 that facilitate the transfer 119 of heat generated by the computing resources within the computing module 106 to the water below the buoy.

In some embodiments, the fluid within the computing chamber 106 is air. In some embodiments, the fluid within the computing chamber 106 is a liquid that does not conduct electricity to a significant degree. In some embodiments, the material within the computing chamber 106 that surrounds the computing circuits 116 and 117 is a phase-changing material that does not conduct electricity to a significant degree.

Figure 138:
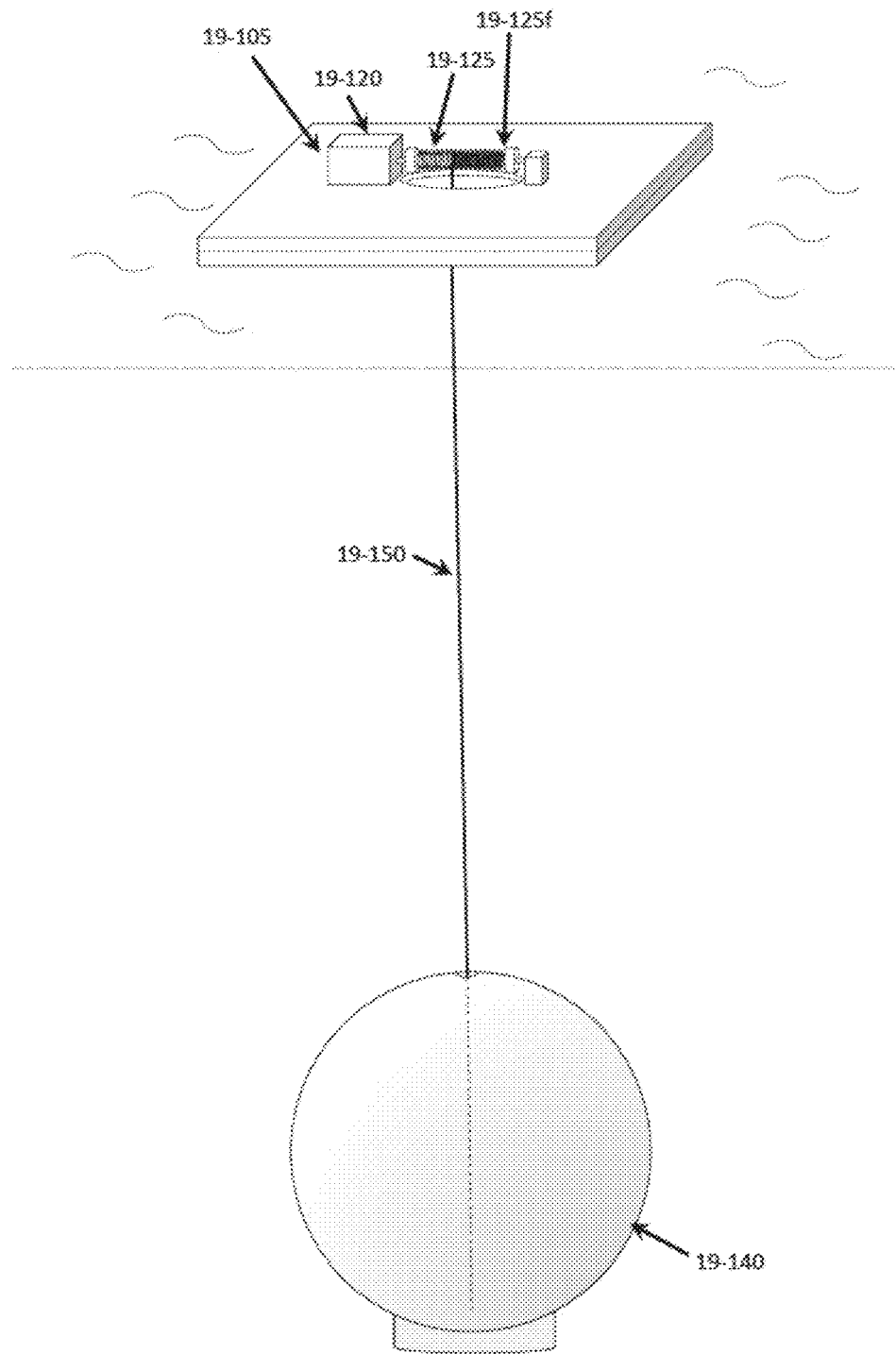

FIG. 138 shows a perspective view of an embodiment of the present disclosure. This embodiment is substantially similar to that of FIG. 55, except that an end of depending connector 3-150, i.e. an end of depending connector segment 3-150b, i.e. end 3-160, does not hang freely in the body of water, but rather depending connector 3-150/19-150 is wound around pulley/capstan 19-125 and can be attached to pulley/capstan 19-125, e.g. at 19-125f. As in FIG. 55, because the embodiment does not have a restoring weight, the embodiment requires a motor, or a generator that can function as a motor, e.g. one situated in housing 19-120. The motor or generator can serve to rotate the pulley/capstan in order to remove or take up the "slack" that could otherwise develop in depending connector 19-150 when the inertial mass 19-140 and flotation module 19-105 move toward each other.

Figure 139:
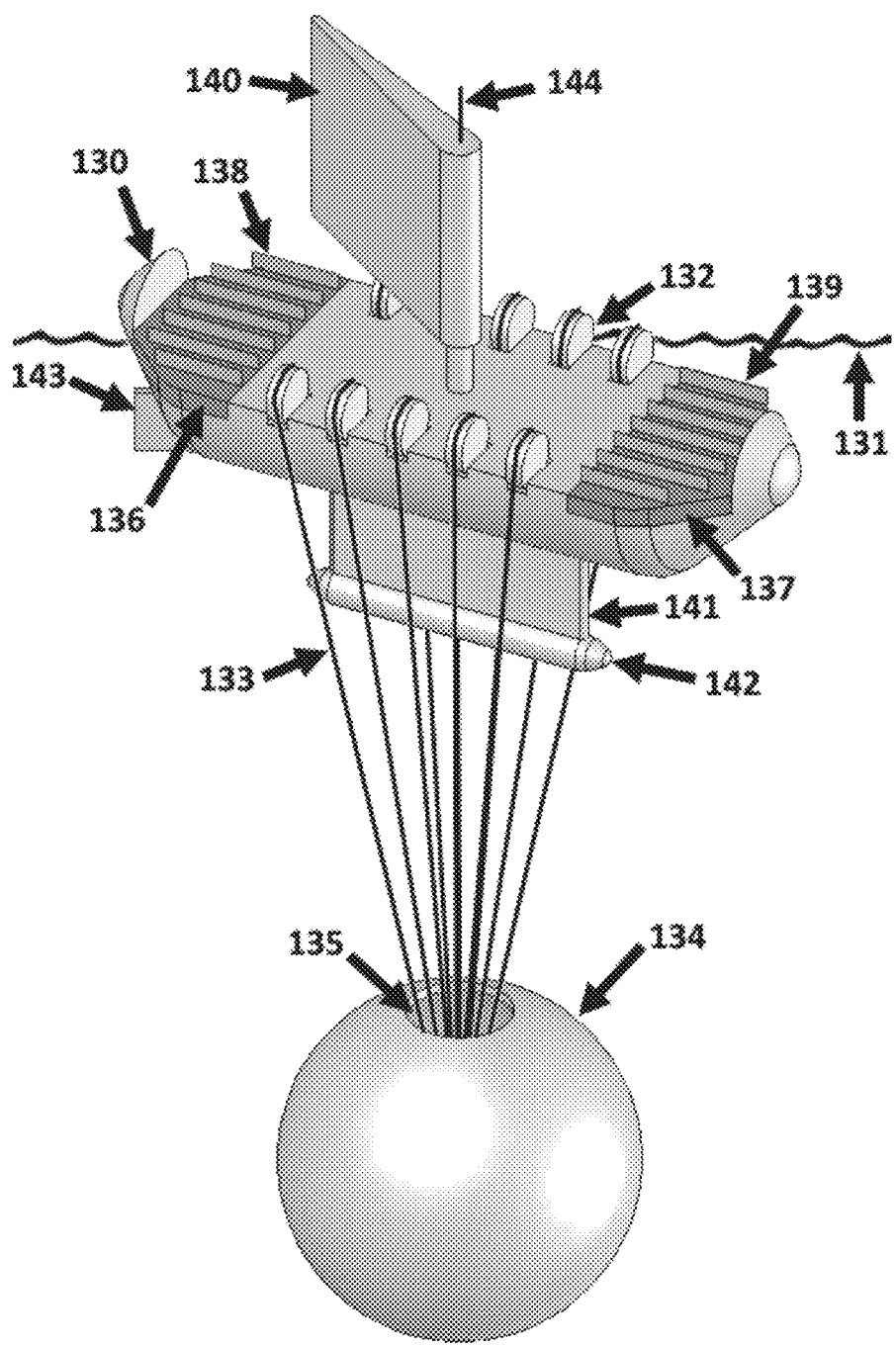

FIG. 139 shows a perspective view of an embodiment of the current disclosure. A buoy 130, flotation module, floating platform, vessel, raft, and/or buoyant object, floats adjacent to the surface 131 of a body of water. Attached to, mounted on, and/or incorporated within, the buoy 130 is a plurality of power take-offs (PTOs), e.g. 132, and/or electrical power-generation assemblies. PTO-specific cables, e.g. 133, chains, ropes, linkages, and/or flexible connectors, connect each respective PTO to the approximate center of a submerged inertial mass 134. The cables pass through a hole 135 and/or aperture in a top surface of the inertial mass 134.

Mounted on and/or in, attached and/or affixed to, and/or incorporated within, the buoy 130 are two "computing chambers and/or modules" 136 and 137. These are sealed, waterproof chambers inside of which are mounted and/or affixed computing circuits, computing devices, and/or computing resources and/or networks. The computing circuits are energized directly and/or indirectly by electrical power generated by the embodiment's PTOs in response to wave action. Thermally-conductive fins, e.g. 138 and 139, are affixed to top surfaces of the computing chambers 136 and 137. These fins expedite the transfer of heat, generated by computers within the computing chambers, to the air above and/or around the embodiment.

The illustrated embodiment 130 contains and/or incorporates a keel 141, with a weighted end 142, that enhances and/or promotes the stability of the device. The embodiment 130 also incorporates a rigid sail 140 that is able to impart thrust to the device when driven by wind. The amount of thrust being adjustable and/or able to be optimized through the rotation of the sail to an optimal angle with respect to the wind direction. A rudder 143 allows the device's control system (e.g. one or more computers that control the behavior of the device) to steer the embodiment when it is moved in response to wind passing over its rigid sail 140.

An antenna 144 mounted on, and/or affixed to, the top of the rigid sail 140 allows the device to send and receive electronic, and/or electromagnetic, transmissions, preferably encrypted. In some embodiments, this antenna exchanges digital data with a satellite through which the device can exchange data, programs, instructions, status information, and/or other digital values, with a remote computer and/or server. In some embodiments, this antenna exchanges digital data with other similar devices, e.g. allowing them to be joined and/or connected within a virtual computing network that includes and/or extends to at least a portion of the computers on the so-linked devices.

Figure 140:
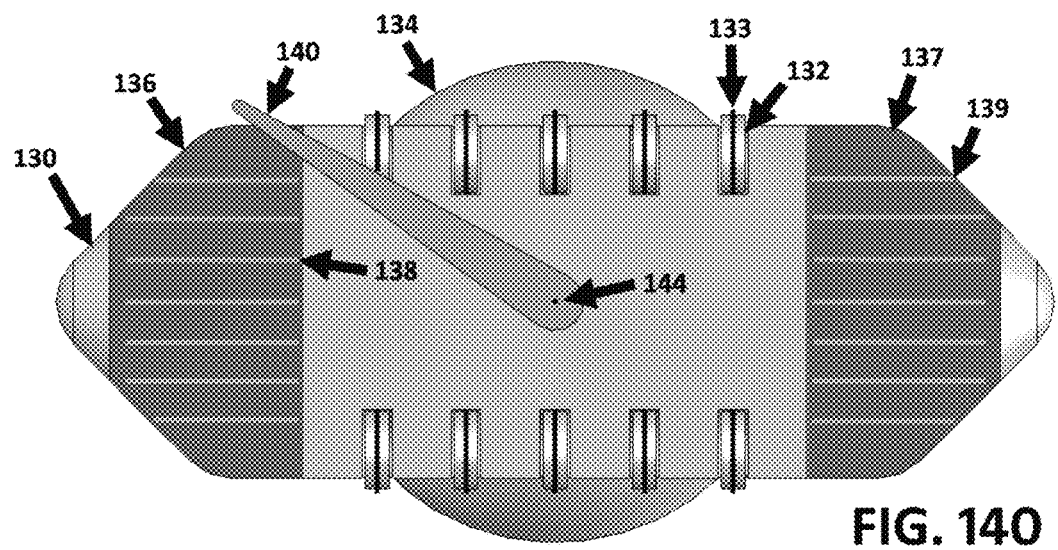

FIG. 140 shows a top-down view of the same embodiment of the current disclosure that is illustrated in FIG. 139. A buoy 130 floats adjacent to the surface of a body of water. Attached to, mounted on, and/or incorporated within, the buoy 130 is a plurality of power take-offs (PTOs), e.g. 132, and/or electrical power-generation assemblies. PTO-specific cables, e.g. 133 connect each respective PTO to the approximate center of a submerged inertial mass 134.

Mounted on and/or in, attached and/or affixed to, and/or incorporated within, the buoy 130 are two "computing chambers and/or modules" 136 and 137. These are sealed, waterproof chambers inside of which are mounted and/or affixed computing circuits, computing devices, and/or computing resources and/or networks. The computing circuits are energized directly and/or indirectly by electrical power generated by the embodiment's PTOs in response to wave action. Thermally-conductive fins, e.g. 138 and 139, are affixed to top surfaces of the computing chambers 136 and 137. These fins expedite the transfer of heat, generated by computers within the computing chambers, to the air above and/or around the embodiment.

The embodiment 130 incorporates a rigid sail 140 that is able to impart thrust to the device when driven by wind. The amount of thrust being adjustable and/or able to be optimized through the rotation of the sail to an optimal angle with respect to the wind direction.

An antenna 144 mounted on, and/or affixed to, the top of the rigid sail 140 allows the device to send and receive electronic, and/or electromagnetic, transmissions (e.g. radio).

Figure 141:
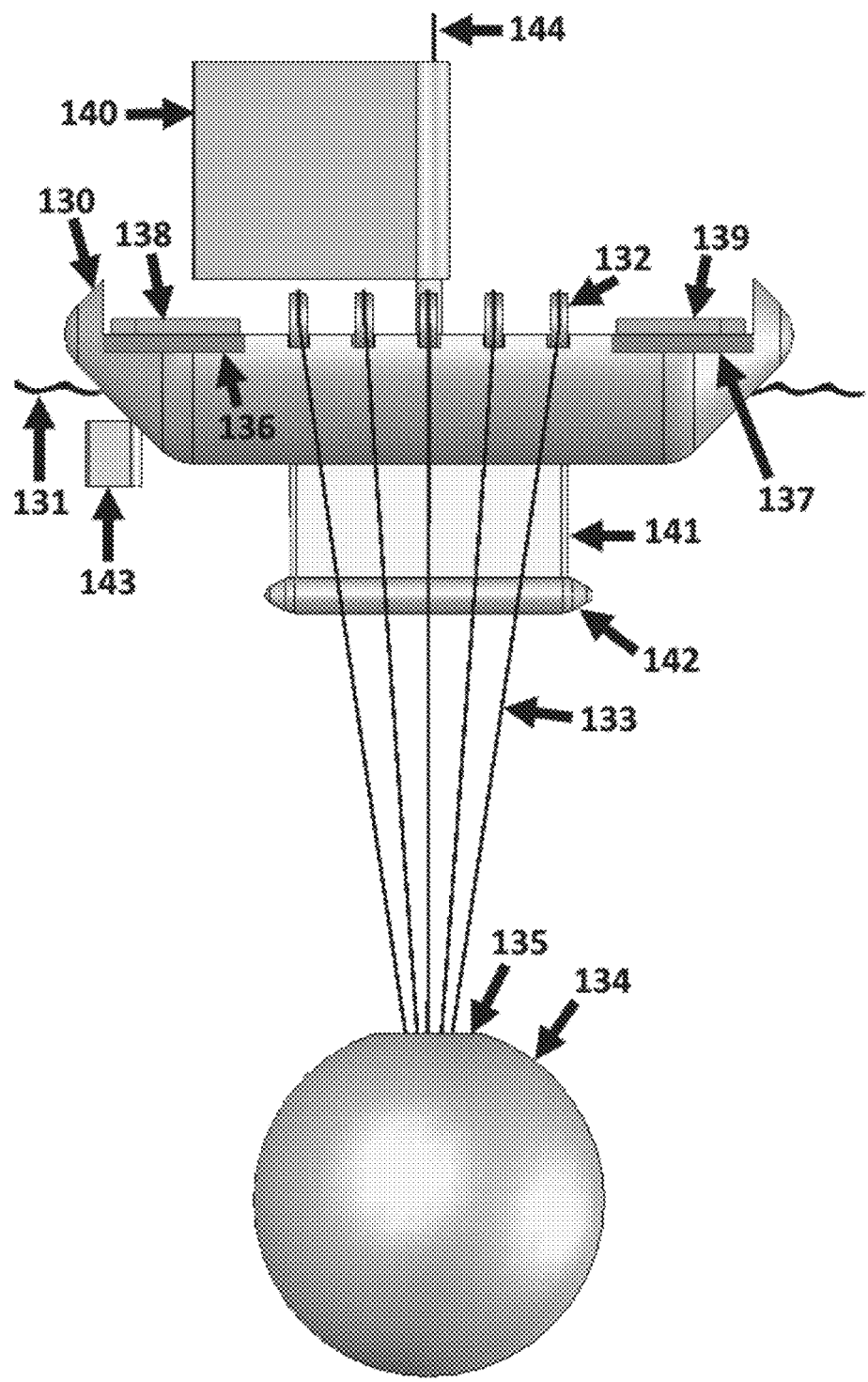

FIG. 141 shows a side view of an embodiment of the current disclosure. A buoy 130 floats adjacent to the surface 131 of a body of water. Attached to, mounted on, and/or incorporated within, the buoy 130 is a plurality of power take-offs (PTOs), e.g. 132, and/or electrical power-generation assemblies. PTO-specific cables, e.g. 133, chains, ropes, linkages, and/or flexible connectors, connect each respective PTO to the approximate center of a submerged inertial mass 134. The cables pass through a hole 135 and/or aperture in a top surface of the inertial mass 134 and connect to a mounting point located approximately at the inertial mass's 134 geometric center, which is also its center of mass.

Mounted on and/or in, attached and/or affixed to, and/or incorporated within, the buoy 130 are two "computing chambers and/or modules" 136 and 137. These are sealed, waterproof chambers inside of which are mounted and/or affixed computing circuits, computing devices, and/or computing resources and/or networks. The computing circuits are energized directly and/or indirectly by electrical power generated by the embodiment's PTOs in response to wave action. Thermally-conductive fins, e.g. 138 and 139, are affixed to top surfaces of the computing chambers 136 and 137. These fins expedite the transfer of heat, generated by computers within the computing chambers, to the air above and/or around the embodiment.

The illustrated embodiment 130 contains and/or incorporates a keel 141, with a weighted end 142, that enhances and/or promotes the stability of the device. The embodiment 130 also incorporates a rigid sail 140 that is able to impart thrust to the device when driven by wind. The amount of thrust being adjustable and/or able to be optimized through the rotation of the sail to an optimal angle with respect to the wind direction. A rudder 143 allows the device's control system (e.g. one or more computers that control the behavior of the device) to steer the embodiment when it is moved in response to wind passing over its rigid sail 140.

An antenna 144 mounted on, and/or affixed to, the top of the rigid sail 140 allows the device to send and receive electronic, and/or electromagnetic, transmissions, preferably encrypted. In some embodiments, this antenna exchanges digital data with a satellite through which the device can exchange data, programs, instructions, status information, and/or other digital values, with a remote computer and/or server. In some embodiments, this antenna exchanges digital data with other similar devices, e.g. allowing them to be joined and/or connected within a virtual computing network that includes and/or extends to at least a portion of the computers on the so-linked devices.

Figure 142:
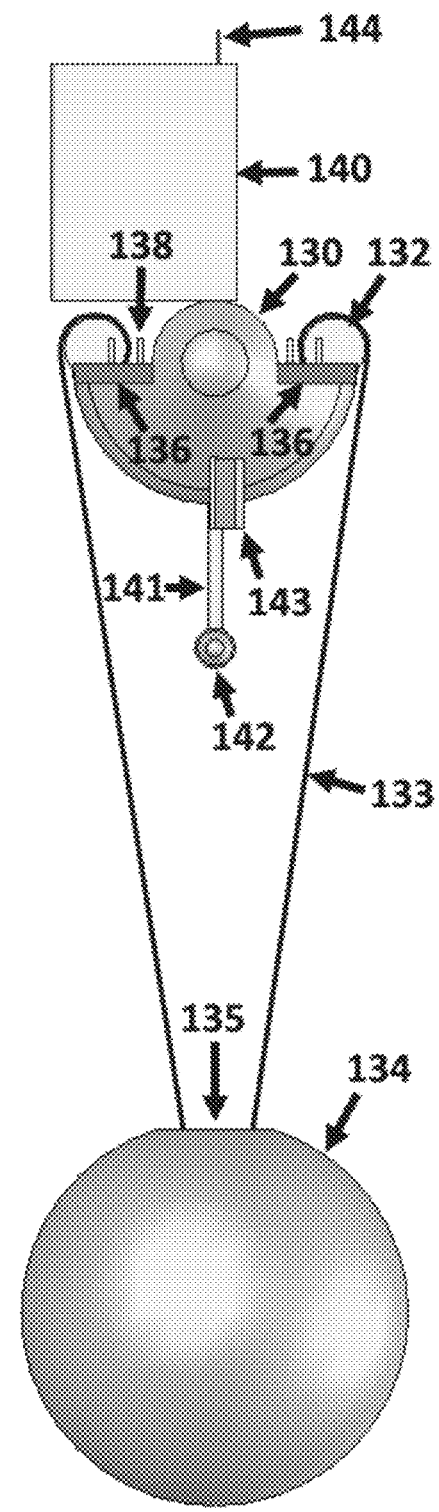

FIG. 142 shows a back and/or rear view of an embodiment of the current disclosure. A buoy 130 floats adjacent to the surface of a body of water. Attached to, mounted on, and/or incorporated within, the buoy 130 is a plurality of power take-offs (PTOs), e.g. 132, and/or electrical power-generation assemblies. PTO-specific cables, e.g. 133, chains, ropes, linkages, and/or flexible connectors, connect each respective PTO to the approximate center of a submerged inertial mass 134. The cables pass through a hole 135 and/or aperture in a top surface of the inertial mass 134.

Mounted on and/or in, attached and/or affixed to, and/or incorporated within, the buoy 130 are two "computing chambers and/or modules," e.g. 136. These are sealed, waterproof chambers inside of which are mounted and/or affixed computing circuits, computing devices, and/or computing resources and/or networks. The computing circuits are energized directly and/or indirectly by electrical power generated by the embodiment's PTOs in response to wave action. Thermally-conductive fins, e.g. 138, are affixed to top surfaces of the computing chambers, e.g. 136. These fins expedite the transfer of heat, generated by computers within the computing chambers, to the air above and/or around the embodiment.

The illustrated embodiment 130 contains and/or incorporates a keel 141, with a weighted end 142, that enhances and/or promotes the stability of the device. The embodiment 130 also incorporates a rigid sail 140 that is able to impart thrust to the device when driven by wind. The amount of thrust being adjustable and/or able to be optimized through the rotation of the sail to an optimal angle with respect to the wind direction. A rudder 143 allows the device's control system (e.g. one or more computers that control the behavior of the device) to steer the embodiment when it is moved in response to wind passing over its rigid sail 140.

An antenna 144 mounted on, and/or affixed to, the top of the rigid sail 140 allows the device to send and receive electronic, and/or electromagnetic, transmissions, preferably encrypted. In some embodiments, this antenna exchanges digital data with a satellite through which the device can exchange data, programs, instructions, status information, and/or other digital values, with a remote computer and/or server. In some embodiments, this antenna exchanges digital data with other similar devices, e.g. allowing them to be joined and/or connected within a virtual computing network that includes and/or extends to at least a portion of the computers on the so-linked devices.

FIG. 143 shows a top-down view of an embodiment of the current disclosure. A buoy 210 floats adjacent to an upper surface of a body of water. One end of a multi-stranded, laterally-distributed, cable 212, chain, rope, and/or flexible connector (a "ribbon"), passes downward through an aperture 211 in the buoy 210 where it is connected to a submerged inertial mass (not shown). Each strand of the multi-stranded cable 212 is wound around a pair of drums 213-214, pulleys, and/or rotating capstans, which increases the frictional binding between the cable and the drum. The other end of each strand of the multi-stranded cable 212 is affixed to drum 214. As waves, especially the heave, moves the buoy up and down, the cable 212 rotates the drums 213-214 which causes a shaft of generator 215, and/or power take-off (PTO), to rotate as well, thereby generating electrical power.

Within one end of buoy 210 is embedded a sealed and/or waterproof and/or water-tight "computational chamber and/or enclosure" 216. Computational chamber 216 is attached to an upper surface of buoy 210 by a flange 219. The walls, e.g. 216, of the computational chamber below the flange, and the corresponding and/or adjacent walls of the buoy, e.g. 217, are separated by a gap 218. Within the space and/or gap, the computational chamber is surrounded by, and/or bathed in, a thermally-conductive fluid. Heat-dissipating fins, e.g. 220, are attached and/or affixed to an upper surface of the computational chamber and facilitate and/or expedite the transfer of the heat trapped within the chambers to the air above and/or around the buoy.

Affixed to and/or within the computational chamber 216 is a plurality of computing devices, computing circuits, computers, and/or networked computers. At least some of those computing devices are energized, at least in part, with electrical power generated by the PTO 215. At least a portion of the heat generated by the computing devices within the computational chamber 216 is convectively transmitted to the thermally conductive upper wall of the chamber, and to the fins, e.g. 220, thereon, from which it is convectively transmitted and/or transferred to the air above the buoy.

A pair of ducted fans 221-222 mounted to an upper surface of the buoy 210 provide forward thrust with which the embodiment may propel itself across the surface of the water on which it floats. When active, the ducted fans consume a portion of the electrical power generated by the generator 215. Through the controlled variation of, and/or the creation of a differential, thrust generated by the fans, the buoy, may propel itself in any direction, and/or to any specific location (e.g. to specific geospatial coordinates) on the surface of the body of water.

FIG. 144 shows a side view of the same embodiment of the current disclosure illustrated in FIG. 143, and taken along a section plane "11" specified in FIG. 143. A buoy 210 floats adjacent to an upper surface 233 of a body of water. One end of a multi-stranded, laterally-distributed, cable 212/225, chain, rope, and/or flexible connector, passes downward through an aperture 211 in the buoy 210 where it is connected to a submerged inertial mass 226. Each strand of the multi-stranded cable 212/225 is wound around a pair of drums 213-214, pulleys, and/or rotating capstans, which increases the frictional binding between the cable and the drum. The other end of each strand of the multi-stranded cable 212 is affixed to drum 214. As waves, especially the heave, moves the buoy up and down, the cable 212 rotates the drums 213-214 which causes a shaft of generator 215, and/or power take-off (PTO), to rotate as well, thereby generating electrical power.

Within one end of buoy 210 is embedded a sealed and/or waterproof and/or water-tight "computational chamber and/or enclosure" 216. Computational chamber 216 is attached to an upper surface of buoy 210 by a flange 219. Those walls of the computational chamber 216 which are located below the flange 219, and the corresponding and/or adjacent walls of the buoy, are separated by a gap, space, and/or void 218. Within the space 218 and/or gap, the computational chamber 216 is surrounded by, and/or bathed in, a thermally-conductive fluid. A thermally-conductive plate 227 and/or wall is affixed to an upper surface of a "ledge" 228 at the base of the aperture 218 and/or space containing the thermally-conductive fluid 218. This structural configuration provides a secure surface on which to attach plate 227 while providing the downward surface of that plate with significant contact with the water below the buoy.

Heat-dissipating fins, e.g. 220, are attached and/or affixed to an upper surface of the computational chamber 216 and facilitate and/or expedite the transfer 231 of the heat trapped within the chambers to the air above and/or around the buoy. Heat-dissipating fins, e.g. 230, are also attached and/or affixed to a thermally-conductive plate 227, and/or wall, that separates the space 218 from the water 233 surrounding the buoy 210. The fins 230 allow heat conductively transmitted and/or transferred from the fluid 218 to the plate 227 to be more quickly and efficiently transmitted 232 and/or transferred to the water beneath the buoy.

Affixed to and/or within the computational chamber 216 is a plurality of computing devices, computing circuits, computers, and/or networked computers. At least some of those computing devices are energized, at least in part, with electrical power generated by the PTO 215. At least a portion of the heat generated by the computing devices within the computational chamber 216 is convectively transmitted to the thermally conductive upper wall of the chamber, and to the upper, e.g. 220, fins thereon, from which it is convectively transmitted and/or transferred to the air above the buoy.

At least a portion of the heat generated by the computing devices within the computational chamber 216 is convectively transmitted to the thermally conductive side and bottom walls of the chamber 216, and thereafter and/or therethrough to the heat-conductive fluid surrounding the chamber 216. At least a portion of the heat in the fluid 218 is transferred and/or transmitted to the plate 227, and thereafter and/or therethrough to lower fins, e.g. 230, thereon, from which it is convectively transmitted and/or transferred to the water below the buoy.

A pair of ducted fans, e.g. 221, are mounted to an upper surface of the buoy 210 and provide forward thrust with which the embodiment may propel itself across the surface 233 of the water on which it floats. When active, the ducted fans consume a portion of the electrical power generated by the generator 215. Through the controlled variation of, and/or the creation of a differential, thrust generated by the fans, and in conjunction with the directionally-stabilizing influence of the rudder-like fins 230, the buoy, may propel itself in any direction, and/or to any specific location (e.g. to specific geospatial coordinates) on the surface of the body of water.

FIG. 145 shows a perspective view of an embodiment of the present disclosure. In this embodiment, the inertial mass 3117 is an open-topped ellipsoidal vessel. The mass of the water trapped within the vessel causes the vessel to resist acceleration, while its positive net weight causes it to accelerate downward, and regain its nominal operational depth (and indeed develop a significant downward momentum), after that portion of a wave- and/or power-cycle in which it is accelerated upward.

FIG. 146 shows a perspective view of the inertial mass 3117 associated with the embodiment of the present disclosure that is illustrated in FIG. 31. The "bullet-shaped" lower end of the ellipsoidal inertial mass minimizes the degree to which drag retards the descent of the inertial mass, allowing it to achieve a greater downward momentum during its descent, which downward momentum contributes to the efficacy of the power-generation stroke when the flotation module accelerates upward. And, the inertial mass's open upper mouth 3118 facilitates the fabrication of the vessel, and reduces material costs, while not significantly diminishing the vessel's inertial properties. Note that, in this embodiment, the walls of the ellipsoidal inertial mass are curving "inward", toward its central longitudinal axis, in the region of the open upper "mouth." This allows the cords 3119 to assume a more conformal configuration relative to the side walls at 3117.

The inertial mass 3117 is connected to flexible connector 3112 by a network (i.e., a "net") of cords 3119, although other means, methods, and/or structures, such as shackles, could be used to connect the inertial mass to the connector 3112. In other embodiments, the ellipsoidal is not precisely an ellipsoid, but can be, e.g., a paraboloid.

FIG. 147 shows a perspective view of an embodiment of the present disclosure. In this embodiment, the inertial mass 3317 is composed of a bundle of laterally oriented pipes or tubes 3325. The mass of the water trapped within the pipes, and between the pipes, causes the bundle 3317 to resist vertical acceleration, while its positive net weight causes it to accelerate downward, and regain its nominal operational depth, ideally with significant downward momentum, after that portion of a wave- and/or power-cycle in which it is accelerated upward. The individual pipes are bound together into a bundle by circumferential bands 3317, and a flexible connector 3312 is connected to one such circumferential bands.

An advantage of this "open-sided" inertial mass is that it can be oriented so that water can flow laterally through it, reducing the converter's cross-sectional profile to ocean currents.

FIG. 148 shows a side view of the embodiment of FIG. 147.

FIG. 149 shows a side view, different from the one provided in FIG. 148, of the same embodiment of the present disclosure that is illustrated in FIGS. 147 and 148.

FIG. 150 shows a perspective view of an embodiment of the present disclosure. This embodiment is similar in most respects to the one illustrated and discussed in relation to FIGS. 147-149. However, in this embodiment, inertial mass 3625 is a single rigid structure 3625 that incorporates seven horizontally-oriented tubular channels and/or voids. These channels have cross-sectional shapes (with respect to section planes normal to their longitudinal axes) that are approximately hexagonal. The structure 3625 is suspended beneath and/or by a beam 3627, which in turn is suspended by, and/or connected to, flexible connector 3612. Like the embodiment of FIGS. 33-35, this embodiment has an "open-sided" inertial mass, allowing water to pass laterally through it, while being rigid and resisting vertical accelerations.

FIG. 151 shows a side view of the same embodiment. Inertial mass 3625 is seen from a side perspective that provides a view orthogonal to the longitudinal axes of the constituent hexagonally-shaped channels within the inertial mass structure 3625.

The center of mass of inertial mass 3625 is approximately beneath point 3612B, e.g., the center of mass can be at 3625C. The inertial mass can rotate in a horizontal plane around a vertical axis defined by the rigging point 3612B. Inertial mass 3625 has a greater lateral width or extent to the right 3625A of point 3625C than to the left 3625B of point 3625C. Therefore, inertial mass 3625 can respond like a weather vane when it is exposed to an ocean current. The ocean current will tend to create a greater torque at 3625A than at 3625B, causing end 3625B to face into the current and end 3625A to face away from the current. This will tend to allow the current to pass more easily through the hexagonal "holes" in the inertial mass, allowing the converter as a whole to be less susceptible to currents.

In other words, inertial mass 3625 has a greater lateral cross section on one side 3625A of its attachment point 3612B than on an opposite side 3625B, and/or has a greater lateral cross section on one side 3625A of its center of mass 3625C than on an opposite side 3625B.

FIG. 152 shows a perspective view of another embodiment of the present disclosure. In this embodiment, a series and/or string of offset weights 4207 are attached to the bottom of inertial mass 4205.

The effective net weight of inertial mass 4205 is controlled and/or adjusted through the control and/or adjustment of the average depth of the inertial mass 4205.

The number of offset weights that are supported by the inertial mass 4205, instead of by the flotation module 4200, is adjusted through the control and/or modification of the depth of the inertial mass 4205. And, the more offset weights that are supported by the inertial mass 4205, the greater the effective net weight of the inertial mass 4205. In one low-density embodiment, the inertial mass 4205 is slightly positively buoyant, having an average density lesser than the surrounding water.

In one embodiment, inertial mass 4205 has a substantially neutral average density (i.e., the same density as that of the water that is displaces). With respect to this neutral-density embodiment, the more offset weights that are supported by the inertial mass 4205, the greater the effective net weight of the inertial mass 4205.

And, in one embodiment, inertial mass 4205 has a greater average density than the water it displaces. With respect to this high-density, high-net-weight embodiment, offset weights that are supported by the flotation module 4200 are in effect increasing the effective net weight of the restoring weight, which counters the net weight of the inertial mass 4205 with respect to the movement of the flexible connector 4202/4210 that connects them through the power-take-off 4215. With respect to this high-density-inertial-mass embodiment, the effective net weight of the inertial mass 4205 is still increased in proportion to the number of offset weights directly supported by it.

In the configuration of embodiment 4200 illustrated in FIG. 152, the combined net weight of four offset weights 4207A-D act to increase the effective net weight of inertial mass 4205. While the combined net weight of five offset weights 4207E-I act to increase the effective net weight of restoring weight 4209.

When the sum of the net weight of the inertial mass 4205 and the net weights of the offset weights directly supported by it (i.e., those to the left of the deepest point of connector 4208) is approximately equal to the sum of the net weights of the offset weights directly supported by the flotation module (i.e., those to the right of the deepest point of connector 4208), then the system can be in a stable equilibrium without a tendency for the inertial mass to move up or down unless the system is perturbed by waves. This kind of stable equilibrium can provide for a "soft landing" in the event control systems fail.

The inertial mass 4205 of embodiment 4200 is cylindrical, tall, and relatively narrow. The inertial mass 4205 would be expected to operate at an average depth that would place it near, if not below, the wave base characteristic of the waves that lift, and let fall, the flotation module 4200 at the surface 4201 of the body of water on which it floats.

FIG. 153 shows a perspective view of the same embodiment of the present disclosure that is illustrated and discussed in relation to FIG. 152. The configuration of the embodiment that is illustrated in FIG. 153 differs from the one illustrated and discussed in relation to FIG. 152, in that the average depth of the inertial mass 4205 has been decreased (i.e., the inertial mass has risen), and, concomitantly, the average depth of the restoring weight 4209 has been increased. This change in the average depths of the inertial mass 4205 and the restoring weight 4209 has resulted in all nine of the offset weights 4207A-I being suspended from, and adding to the effective net weight of, inertial mass 4205 (instead of just four of the offset weights as in the configuration illustrated in FIG. 152).

Likewise, this change in the average depths of the inertial mass 4205 and the restoring weight 4209 has resulted in the effective net weight of the restoring weight 4209 not being augmented by any of the offset weights (instead of being augmented by five offset weights as in the configuration illustrated in FIG. 152). A change in the average depth of the inertial mass can be effectuated by varying the resistance or countertorque offered by generator 4214 or 4213.

FIG. 154 shows a perspective view of an embodiment of the present disclosure that is similar to the one illustrated and discussed in relation to FIGS. 152 and 153. With respect to the embodiment illustrated in FIG. 154, the string of offset weights that is present on the flexible connector 4208 that connects the restoring weight 4209 to the bottom of inertial mass 4205 in the embodiment illustrated in FIGS. 152 and 153, have been removed from that connector and transferred to a separate flexible connector 4415, one end of which is also connected to the bottom of inertial mass 4404, but the other end of which is connected to a winching mechanism 4417 and 4416 located on the flotation module 4400 adjacent to an aperture 4418 through which the flexible connector 4415 descends.

The embodiment illustrated in FIGS. 152 and 153 adjusts the effective net weight of its inertial mass by adjusting the average depth of its inertial mass and restoring weight. The number of offset weights that contributes to the effective net weight of its inertial mass is directly correlated with the average depth of that inertial mass.

By contrast, the embodiment illustrated in FIG. 154, adjusts the effective net weight of its inertial mass 4404 by adjusting the length of flexible connector and/or cable 4415. The number of offset weights 4414 that contribute to the effective net weight of the inertial mass is directly controlled through the control of the length of connector 4415. The embodiment illustrated in FIG. 154 allows the effective net weight of the inertial mass 4404 to be adjusted without adjusting or otherwise changing the average depth of the inertial mass 4404 and restoring weight 4407. Furthermore, the embodiment illustrated in FIG. 154 allows the effective net weight of the inertial mass 4404 to be adjusted without adjusting or otherwise changing the effective net weight of the restoring weight. The adjustment and/or control of the effective net weight of the inertial mass 4404 has been decoupled from any related and/or consequential change in the effective net weight of the restoring weight 4407.

FIG. 155 shows an elevated perspective view of another embodiment of the current disclosure. Here, the inertial mass has been replaced by an inertial water trapping device 5201, which can, if desired, be referred to as an inertial mass or "quasi" inertial mass. Inertial water trapping device 5201 performs the function of an inertial mass less well than most of the other inertial masses described above because it imparts a large degree of vorticity to the surrounding water as it moves through it. However, it does succeed in constraining the vertical movement of a large volume of water, and hence allows the inertia of that water to be exploited.

Inertial water trapping device 5201 consists of a series of horizontally oriented plates e.g., 5201B, 5201C, 5201D, arranged at vertical intervals. The plates are separated by some vertical distance, this distance being typically (though not necessarily) less than a diameter (or other maximal horizontal dimension) of the plates. The plates can all be of uniform size and shape, or they can be of different sizes and/or different shapes. The plates can be circular, square, triangular, etc. The plates need not be oriented exactly to the horizontal, but can be somewhat diagonal. The plates are kept apart by spacing lines and/or spacing rods. In the embodiment shown, 5202B is a flexible spacing line. 5202C is a rigid spacing rod.

By connecting the plates with spacing lines, the entire assembly is given the ability to "collapse." By connecting the plates with rigid spacing rods, greater rigidity is assured, which can result in somewhat greater power generation, since the plates cannot then deviate to the diagonal, and the structure cannot easily deform to allow flows of water to pass.

In addition to, or in lieu of, vertical rigid spacing rods, diagonally oriented rigid spacing rods can be provided, giving the inertial water trapping device the form of a linear truss or an elongate space truss, wherein horizontal plates 5201B are placed at intervals within the framework provided by the truss. Typically, only spacing rods or only spacing lines will be used; the combination of the two is shown here only for illustration.

As in many of the other inertial masses of this disclosure, inertial water trapping device 5201 is, on average (including all the water contained in the convex hull of minimum volume around it), negatively buoyant, but perhaps only slightly so.

FIG. 156 shows a side view of the same embodiment shown in FIG. 155.

FIG. 157 shows an inertial water trapping device like one of those described in the figure description to FIG. 155. The inertial water trapping device has the form of a linear truss containing horizontal plates. Diagonal spacing rods 5203B have been provided for additional structural strength.

FIG. 158 shows a perspective view of an embodiment 720 of the current disclosure. This embodiment utilizes a stacked and/or vertically-aligned set of plates 732-735.

FIG. 159 shows a perspective view of an embodiment of the current disclosure.

This embodiment is similar in most respects to the embodiment of FIG. 54, but its inertial mass is different.

Inertial mass 8-140 encloses, confines, and/or traps a large volume of water but need not have any rigid walls. It can be collapsible for manufacture, transportation, and the early stages of deployment. It can assume its full volume only upon final deployment, when the inertial mass weighted portion 8-200 pulls it into tension vertically and thereby extends its frustoconical regions, allowing it to assume a form having a large volume and enclosing a large volume of water. It is presumed that rigid circumferential ribs or "spacers" are required down the length of the cone to keep the structure "open" during operation.

Inertial mass 8-140 consists of two substantially frustoconical or conical parts: bottom section 8-180 and top section 8-185.

In some embodiments, the top-view cross section of the inertial mass can be other than a circle. In some embodiments, it is a square. In some embodiments, it is a triangle. In some embodiments it is a polygon with any number of sides. In some embodiments, the analogs of the frustoconical sections, e.g. 8-185, are frustopyramidal.

Mouth spacer 8-195 depends from depending connector 8-150 by a plurality of top section tendons e.g. 8-186. Mouth spacer 8-195 "holds apart" the vertical bottom section tendons e.g. 8-181 at their top portions and likewise "holds apart" the top section tendons e.g. 8-186 at their bottom portions, thereby defining an approximately circular mouth defining the larger base of each frustoconical section. Water can pass freely through the mouth spacer 8-195 in the vertical (i.e. axial) direction.

Mouth spacer 8-195 can be formed by a ring, as shown here, or by elongate beams crisscrossed, or by any other means of "holding apart" the relevant flexible walls and/or tendons so that they do not collapse inward under the inward component of the tension force created by inertial mass weighted portion 8-200.

A plurality of vertical bottom section tendons e.g. 8-181 depend from mouth spacer 8-195 and suspend inertial mass weighted portion 8-200. Inertial mass weighted portion 8-200 can be made of concrete, steel, iron, or any other material with density greater than water.

The vertical bottom section tendons e.g. 8-181 and the top section tendons e.g. 8-186 can be the same tendons, i.e. one of these tendons can have one end connected at top ring 8-190, pass through and/or around mouth spacer 8-195, and have a second end connected at inertial mass weighted portion 8-200.

Inertial mass weighted portion 8-200 holds vertical bottom section tendons e.g. 8-181 in tension so that they are each substantially straight. The vertical bottom section tendons e.g. 8-181 together define an approximately frustoconical shape. The tendons e.g. 8-181 are attached to inertial mass weighted portion 8-200.

Flexible sheeting or fabric forms a substantially impermeable "skin", "surface", or "wall" around the circumferential perimeter of the bottom section 8-180 and around the circumferential perimeter of the top section 8-185. The flexible sheeting or fabric can be PVC fabric, nylon fabric, thin aluminum, thin plastic, or any other similar thin sheeting or fabric. Preferably the flexible sheeting or fabric is collapsible, but this is not necessary. The flexible sheeting or fabric can interface with the tendons directly (e.g. through weaving or stitching) so that the fabric/sheeting cannot be pulled apart from the tendons, or the flexible sheeting or fabric can merely rest against the inside of the tendons. The flexible sheeting or fabric is substantially impermeable to water and allows the inertial mass to have a large "effective inertia" on account of the water effectively trapped inside it.

Horizontal bottom section rigid spacers e.g. 8-182 are provided to keep the structure open.

A top ring 8-190 or other similar means can be provided to define a top opening 8-191 which is not obstructed by fabric or sheeting.

The walls of top section 8-185 and the bottom portion of fabric walls of bottom section 8-180 have been made transparent in this figure for clarity of illustration.

Inset 8-300 shows a side cross section of the inertial mass and part of the depending connector. The lighter grey regions, e.g. 8-185 and 8-180, are regions where a substantially impermeable skin, wall, or fabric is circumferentially disposed around the frustoconical section.

FIG. 160 shows a schematic side view of the same embodiment shown in FIG. 159.

FIG. 161 shows a side view of an embodiment of the current disclosure. This embodiment is similar in most respects to the embodiment of FIG. 159. There are a few major differences.

First, there is no fabric or sheeting defining the top section 9-185 of inertial mass 9-140. Instead, the top section is "open," consisting only of tendons e.g. 9-186 which suspend the parts of the inertial mass beneath them e.g. mouth spacer 9-195. Inertial mass 9-140 thus defines a "cup" or "ice cream cone" shape, with a substantially enclosed/sealed bottom portion but an open top portion. Such an inertial mass will substantially contain, confine, and enclose a significant volume of water in the manner required. When such an inertial mass is moving downward, it can develop a partial vacuum in its bottom portion and cause the water inside to "move with it" even though such water might seem to have an "exit" at the top of the inertial mass. Thus, the inertial mass can have "effective mass" that includes the mass of the confined water. When such an inertial mass is moving upward, it can likewise have an "effective mass" that includes the mass of the water confined inside it, owing to the fact that the bottom portion of the inertial mass directly encloses said water.

In some embodiments, the inertial mass has a small opening or openings at a bottom portion thereof, provided that such small opening or openings does/do not allow substantial amounts of water to pass in a vertical, i.e. axial, direction, i.e. provided that despite the opening or openings the bottom portion of the inertial mass nonetheless encloses and/or traps a large volume of water when accelerated upward.

Second, there are no vertical bottom section tendons e.g. 8-181 in this embodiment. Instead, there are only horizontal bottom section tendons e.g. 9-182 that run circumferentially around bottom section 9-180.

Third, in this embodiment, restoring weight 9-160 is toroidal and concentrically/coaxially encloses depending connector segment 9-150*a*. This can prevent restoring weight 9-160 from "tangling" or knotting around connector segment 9-150*a* and can likewise prevent restoring weight 9-160 from developing significant pendulum-like behavior.

For approximate scale (merely indicative), inertial mass 9-140 can be 50 meters in height (i.e. length in the vertical dimension).

FIG. 162 shows a perspective view of an embodiment of the current disclosure. This embodiment is similar in most respects to the embodiment of FIG. 161. There are a few differences.

A plurality of pulleys/capstans, e.g. 10-125, are operatively connected to a plurality of depending connectors, e.g. 10-150. Each of these depending connectors is operatively connected at one end to the inertial mass 10-140 and at one end to the restoring weight 10-160. Each depending connector can have its own aperture e.g. 10-115. Each of the pulleys/capstans can interface to its own generator or can be mechanically connected to one or more shared generators.

In some embodiments, each pulley-capstan is associated with its own separate restoring weight, i.e. there are a plurality of restoring weights.

FIGS. 163-164 show a perspective view of an embodiment of the current disclosure.

This embodiment is similar in most respects to the embodiment of FIG. 160. There are a few differences.

First, top conical section 11-185 is significantly larger in the vertical dimension ("height") than its analogous frusto-conical section 8-185 in FIG. 160. Top conical section 11-185 can be the same height as, or a greater height than, bottom conical section 11-180.

Second, top conical section 11-185 has substantially impermeable walls, fabric, and/or sheeting over its entire outer circumferential surface. There is no "opening" at 11-186.

Third, the vertical tendons of bottom conical section 11-180, e.g. tendon 11-181, join together at a common point 11-201 so that inertial mass weighted portion 11-200 depends most immediately from a single connector 11-202 rather than from a plurality of tendons.

Inset 11-300 shows a side cross section of the inertial mass 11-140 and part of the depending connector. The lighter grey regions, e.g. 11-185 and 11-180, are regions where a substantially impermeable skin, wall, or fabric is disposed around the conical section, e.g. circumferentially.

FIG. 165-166 show a perspective view of an embodiment of the current disclosure.

The embodiment of this figure is similar in most respects to the embodiment of FIG. 163. However, in this embodiment, only the bottom conical section 12-180 has a circumferential shell, skin, fabric, and/or wall. The top conical section 12-185 is "open," having no circumferential shell, skin, fabric and/or wall.

Inset 12-300 shows a side cross section of the inertial mass 12-140 and part of the depending connector. The lighter grey region 12-180 is the region where a substantially impermeable skin, wall, or fabric is disposed around the conical section, e.g. circumferentially.

FIG. 167 is an illustration of an embodiment of the current disclosure. A flotation module 101 floats adjacent to the surface 100 of a body of water. A submerged inertial damping mass 117 (i.e. open-topped water-filled vessel) is suspended from a joint 113 by connectors 114-115. Joint 113 is operatively connected, via flexible connector 107, to gear 106 which rotates, in response to changes in the depth of the vessel 117 relative to flotation module 101, so as to lengthen flexible connector portion 107 and correspondingly shorten flexible connector portion 108, to which restoring mass 110 (i.e. weight) is connected at 109.

Because the mass of vessel 117, including contained water, significantly exceeds the mass of weight 110, the upward acceleration of flotation module 101, in response to an approaching wave, causes weight 110 to move 112 upward and closer to flotation module 101, while vessel 117 remains approximately stationary. The increase in the separation of flotation module 101 and vessel 117, and the consequent raising of weight 110, causes and requires the passage of at least a portion of the flexible connector portion 108 across gear 106, thereby turning 105 the gear, lengthening connector portion 107 and shortening connector portion 108. As gear 106 turns, a gear 102 and/or the shaft of the operatively connected generator 103 is turned, thereby generating power.

During the raising of flotation module 101 during a rising heave motion, and the consequent lengthening of flexible connector portion 107, the generator 103 resists the turning of its own rotor, and consequently resists the turning 105 of gear 106. However, the wave-induced raising of the surface 100 of the water coupled with the buoyancy of flotation module 101 causes a buoyant force that is sufficient to overcome the resistive torque of the generator.

As flotation module 101 falls following the passage of a wave, and the approach of a wave trough, the tension in the flexible connector 107 is transiently relieved and/or diminished.

The cycle continues, thus extracting energy from the rising side of every wave, and restoring the original device configuration during the falling toward every trough.

The buoyant force generated by flotation module 101 during its rise in response to approaching wave crests causes the generator to spin, thus generating electrical power. However, it also lifts the restoring mass above its "resting stop" (joint 113), and point of greatest relative depth, thus imparting gravitational potential energy to the restoring mass. That stored gravitational potential energy is then expended, at least in part, in the restoration of the original relative positions and/or orientations of the flexible connector 107 and the restoring and damping masses connected thereto.

FIG. 168 is an illustration of an embodiment of the current disclosure similar to the embodiment illustrated and discussed in FIG. 167.

A flotation module 201 floats adjacent to the surface 200 of a body of water. A submerged inertial damping mass 217 (i.e. open-topped water-filled vessel) is suspended from a flexible connector 204 and 212. A "stop" 211 is immovably connected to flexible connector 204 and 213, and establishes and/or defines the maximal relative depth to which a weight 207 can descend.

As flotation module 201 moves down following the passage of a wave crest, it stops pulling up against the relatively immobile inertial damping mass 217, and restoring mass 207 falls thereby removing any slack in flexible connector portions 204 and/or 205. Vessel 217 falls under the influence of gravity too. However, it may fall slowly as it has large mass, relatively low net effective weight, and at the end of the upward acceleration imparted by flotation module 201 may have had significant upward momentum. In order to facilitate its falling, plunger 221 may fall quickly, owing its relatively lesser drag, and relatively higher net effective weight. The faster falling of plunger 221 opens orifice 218, allowing water to enter the lowermost portion of the falling vessel, thereby relieving any reduction in pressure, and thus increasing the rate of the vessel's 217 falling.

Plunger 221 is attached and/or connected to spar 214 which is held in coaxial relation to the vessel 217 by a sleeve bearing in the center of strut 213 and 215. Thus, plunger 221 is able to move up and down so as to close and open, respectively, orifice 218 at the bottom of the inertial damping mass 217.

FIG. 169 is a cross-sectional view taken along line AA in FIG. 168 The outer wall 300 of vessel 217 in FIG. 168 is circular. Four cross struts, e.g. 303, rigidly position a sleeve bearing which surrounds spar 301, and 214 in FIG. 168. Orifice 218 in FIG. 2A is illustrated herein as 302.

FIG. 170 is an illustration of an embodiment of the current disclosure similar to the embodiment illustrated and discussed in FIG. 168.

In this embodiment, the weight 413 does not rise and fall approximately coaxially with the flexible connection that joins the inertial damping mass 419 to the gear 405. In this embodiment, the weight 413 is not terminally connected to the flexible connector 411, but instead utilizes a pulley wheel 412 that allows the flexible connector to lengthen and shorten while preserving weight 413's medial relation to gear 405 and flexible connector attachment point 407.

As flotation module 401 rises and falls, weight 413 rises and falls as well, with respect to its separation from flotation module 401. The maximum relative depth and/or separation of weight 413 with respect to flotation module 401 is established, defined, and/or enforced, by flexible connector 408. Weight 413 cannot descend further than the extent permitted by connector 408.

The inertial damping mass 419 is open on its bottom 422 to the surrounding water 400. It is closed on all other sides, e.g. 419. Supplemental weight 420 around the perimeter of the vessel's 419 base promotes its descent following its rising in response to the upward acceleration of flotation module 401. Sliding uni-directional orifice 415 moves down when the inertial damping mass is being pulled upward by flotation module 401, thus preventing any influx of ambient water into the vessel's interior 421, and thereby maximizing the immobility of the vessel 419 by preserving any partial vacuum that develops within 421 the vessel. Sliding uni-directional orifice 415 moves up, thereby allowing for the flow 417 of water from the vessel's interior 421 to the outside when flotation module 401 is descending, and thereby facilitating the restoration of the vessel's original, nominal depth.

FIG. 171 is a side view of the same embodiment illustrated in FIG. 170. Flotation module 501 contains two generators 502-503. Each generator, e.g. 502, is rotatably connected to a shaft, e.g. 504, which is rotatably connected to a bevel gear assembly, e.g. 506. Each bevel gear assembly, e.g. 506, is rotatably connected to a shaft that is attached and/or connected to a gear 508, and each said shaft is positionally stabilized by a sleeve bearing, e.g. 507.

When the operatively connected flexible connector 511 moves normal to the gear's axis of rotation, the gear turns. The rotational energy communicated to the gear 508 by the moving flexible connector 511, the rotatably connected shafts transmit at least a portion of that rotational energy to the generators 502 and 503.

FIG. 172 is a perspective view of the sliding uni-directional orifice 415 illustrated and discussed in FIG. 170. When not obstructed, an orifice in vessel wall 604 allows water to pass 602 freely from one side of the wall to the other. However, when water flows from above down onto orifice cap 600, then the cap at least partially obstructs the orifice thereby inhibiting or preventing the flow of water from one side of wall 604 to the other. When water flows upward and into the orifice from below, the cap is lifted and water is able to flow 602 from the inside of the vessel to the outside, thus relieving and/or diminishing any excess of pressure in the water inside the vessel.

FIG. 173 is an illustration of an embodiment of the current disclosure similar to the embodiment illustrated and discussed in FIG. 170.

FIG. 174 is a top-down perspective illustration of an embodiment of the current disclosure. This illustration shows the top of the embodiment's flotation module 800. Shown in dashed lines, indicating their presence some distance below the upper surface of the flotation module, is the relative size, orientation and/or position of the inertial damping vessel 801, and the restoring float 802.

FIG. 175 is an illustration of a cross-sectional view of the embodiment of the current disclosure illustrated and discussed in FIG. 174 and taken along line CC in FIG. 174.

The embodiment illustrated here is similar to the one illustrated and discussed in FIG. 167. However, whereas the restoring mass illustrated in the embodiment of FIG. 167 is a weight, which achieves and/or manifests its restoring force through its positive net effective weight, and its tendency to sink, the restoring mass illustrated in this embodiment is a float 905, which achieves and/or manifests its restoring force through its negative (i.e. buoyant) net effective weight.

When at rest, the float 905 rests adjacent to the bottom of flotation module 901 near to the surface 900 of the body of water in which flotation module 901 floats. However, as flotation module 901 rises in response to an approaching wave, the submerged inertial damping mass 914 resists its upward acceleration creating a tension in the flexible connector 902. This tension results in the lengthening of connector portions 902 and 908, and the corresponding shortening of flexible connector portion 909. As flotation module 901 rises, and the inertial damping mass 914 resists that rising, the float 905 descends. If it descends to the point of abutting the inertial damping mass, then the separation between flotation module 901 and the submerged inertial damping vessel 914 cannot increase further. At such a moment, and/or in such a circumstance, the flotation module may be submerged.

As flotation module 901 descends, the float 905 is free to rise thus maintaining tension in the flexible connectors 902, 908 and 909. After the float 905 reaches the base of flotation module 901, and can rise no further, the inertial damping vessel 914 is free to descend. Its flaps are free to open to allow ambient water to flow 918 into the damping vessel 914 which facilitates the flow of water out of the open top of the vessel without the creation of any regions of reduced pressure, which might impede the vessel's descent.

FIG. 176 is a bottom-up perspective illustration of a cross-sectional view of the embodiment of the current disclosure illustrated and discussed in FIGS. 174 and 175 and taken along line AA in FIG. 5B.

The gear 1004 is operatively connected to the flexible connector 1002-1003. The gear 1004 is positioned within a recessed area 1001 in the bottom of the buoy that allows the gear and its flexible connector to communicate with the body 900 of water upon which it floats.

FIG. 177 is a top-down perspective illustration of a cross-sectional view of the embodiment of the current disclosure illustrated and discussed in FIGS. 174-176 and taken along line BB in FIG. 5B.

The inertial damping vessel 1100 has supporting struts, e.g. 1101, upon and/or to which one end of flexible connector 902 is attached. Also attached is pulley 1104 about which the flexible connectors 908-909 are operatively connected. Flaps, e.g. 1102, which open inward, i.e. into the interior 1105 of the inertial damping vessel 1100, facilitate the descent of the vessel during the descent of the device.

FIG. 178 is an illustration of an embodiment of the current disclosure similar to the embodiment illustrated and discussed in FIG. 175.

Unlike the embodiment illustrated in FIG. 175, this embodiment utilizes a "stop" attached to flexible connector portion 1204 in order to limit the maximum separation between the float 1211 and the inertial damping vessel 1223, and in order to indirectly limit the minimum separation between the inertial damping vessel 1223 and flotation module 1201.

Rather than mounting and/or attaching pulley 1214 directly to the inertial damping vessel, as is characteristic of the embodiment illustrated in FIG. 175, this embodiment mounts pulley 1214 to a buoyant block 1216 and/or platform which is suspended and/or floats above the inertial damping vessel 1223 and is connected to vessel 1223 by connectors 1217-1218. Flexible connector portion 1207 passes through block 1216 via a channel 1215 where it connects to the inertial damping vessel via connectors 1219-1220.

Unlike the embodiment illustrated in FIG. 175, this embodiment utilizes an inertial damping vessel 1223 that does not possess, incorporation, nor benefit from the utilization of flaps. Instead, this embodiment's inertial damping vessel 1223 relies on an "arrow-shaped" vessel, and a weighted 1224 lower end to facilitate its sinking back to its nominal distance below flotation module 1201 following the conclusion of a "power cycle" involving the rising of flotation module 1201 in response to an approaching wave.

FIG. 179 is an illustration of an embodiment of the current disclosure similar to the embodiment illustrated and discussed in FIG. 170.

Unlike the embodiment illustrated in FIG. 170, this embodiment utilizes a "pocket" 1306 recessed into a bottom surface of flotation module 1301, similar to pocket 903 in FIG. 5B. Pocket 1306 is filled with a gas (e.g. air and/or nitrogen), an oil, or other buoyant liquid. And, that "filler" gas or liquid is supplied and/or replenished by module 1302. In some embodiments, module 1302 extracts 1304 air from the atmosphere through tube 1303 and pumps that air into pocket 1306 through tube 1305 and vent 1309. In another embodiment, module 1302 extracts nitrogen gas from the air so extracted, and pumps the nitrogen gas into pocket 1306.

Unlike the embodiment illustrated in FIG. 170, wherein restoring mass 413 is operatively connected to flexible connector portions 409 and 411 by pulley 412, the embodiment in FIG. 179 omits a connection of the restoring mass to the respective flexible connector by means of, and/or through the use of, a pulley. This embodiment instead connects the restoring weight 1315 directly to flexible connector 1310. In this embodiment, the restoring weight 1315 swings 1316 from its nominal, resting position and/or orientation beneath the point at which its limiting tether attaches to flotation module 1301, to a position beneath the point at which its flexible connector 1310 is operatively connected to gear 1307.

Unlike the embodiment illustrated in FIG. 170, this embodiment utilizes an inertial damping vessel composed of a tube 1321 sectioned and/or partitioned by a "dividing" wall 1327 normal to its longitudinal axis. When resisting the upward acceleration of flotation module 1301, flaps in the dividing wall remain closed, e.g. 1324, due to the positive and/or excessive pressure in the upper chamber 1322 of the vessel, and the negative and/or deficient pressure in the lower chamber 1326. However, when descending to its nominal depth, position, and/or distance below flotation module 1301, the positive and/or excessive pressure in the lower chamber 1326, and the negative and/or deficient pressure in the upper chamber 1322, causes the flaps in the dividing wall to open, e.g. 1323, so as to relieve that pressure differential by allowing water to flow 1325 from the lower to the upper chamber—thus facilitating and speeding the descent of the inertial damping vessel 1321.

FIG. 180 is an illustration of an embodiment of the current disclosure.

Unlike the embodiment illustrated in FIG. 170, wherein the flexible connector, operatively connecting flotation module 401 to the respective inertial damping vessel 419, causes to turn gear 405 located beneath, and/or extending below, the bottom of flotation module 401, and thereby transmits rotary energy to a pair of generators housed inside flotation module 401, the flexible connector 1422 in the embodiment illustrated in FIG. 180, and operatively connecting flotation module 1401 to the respective inertial damping vessel 1430, directly turns a gear 1405 connected to the shaft of generator 1404, and/or connected to a transmission and/or gear assembly connected to the shaft of generator 1404.

Unlike the embodiment illustrated in FIG. 170, wherein the generators are positioned within flotation module 401, the generator(s) of the embodiment illustrated in FIG. 180 are positioned outside flotation module 1401, and are protected within a housing, lid, shroud, canister, and/or pod 1402 attached, e.g. removably, to an upper surface of flotation module 1401.

Unlike the embodiment illustrated in FIG. 170, wherein the inertial damping vessel is a water-filled vessel open on one side to the surrounding water, and possessing a valve 415 in its upper side, the inertial damping vessel of the embodiment illustrated in FIG. 180 is a constricted tube 1430 with upper and lower mouths. Inside the tube is an approximately neutrally-buoyant spherical plug 1436, connected to inside surfaces of the tube by connectors 1432 and 1438. When the tube is being accelerated upward by flotation module 1401, water will flow downward through the tube and the spherical plug 1439 will block the constricted portion of the tube, causing the inertia of the water trapped in the upper and lower portions of the tube to resist flotation module's 1401 upward acceleration.

FIG. 181 shows an embodiment of the current disclosure. This embodiment further includes an electrical power cable 7-750 adapted to carry electrical power from the generator housed in the converter to a remote electrical grid, such as an onshore grid adjacent to a shoreline of the body of water. The power cable in this embodiment is suspended by floats e.g., 7-755. In other embodiments, the power cable is spliced into a subsea power cable near the seafloor. In yet other embodiments, the mechanical energy of the rotating shaft is used to power an apparatus on the converter that performs useful work such as the production of chemical fuels.

In this embodiment, pulley/capstan 7-125 is a chain wheel, gypsy wheel, and/or wildcat. Depending connector 7-150 is a chain. The angle of the arc defined by the contact between depending connector 7-150 and pulley/capstan 7-125 is less than a 2 times pi radians, i.e., depending connector 7-150 can pass around pulley/capstan 7-125 less than full one time.

FIG. 182 shows a top-down view of an embodiment of the current disclosure. Flotation module 650 floats at the surface of a body of water. Arranged in a first circular pattern is a collection of guiding pulleys e.g. 657. Guiding pulleys 657 are arranged around the circumference of aperture 659. Each guiding pulley is associated with a flexible connector e.g. 658. In some embodiments, each guiding pulley can rotate about an axis approximately collinear with the line tangent both to the top of the guiding pulley's associated power-take-off pulley e.g. 655 and to the top of the said guiding pulley itself. By being able to so rotate, each guiding pulley can remedy, at least partially, fleet angle misalignments due to flotation module pitch and roll, and direct its associated flexible connector to tis associated power-take-off pulley.

Also arranged in a circular pattern are power-take-off pulleys e.g. 655 and 660. The power-take-off pulleys can be chainwheels and/or grip pulleys. Each power-take-off pulley is associated with a generator assembly 661, which can include a gearbox and/or a hydraulic circuit for transmission of power and speed-up of rpm.

A plurality of flexible connectors e.g. 658 each passes over a guiding pulley and a power-take-off pulley. Each flexible connector is further associated with a peripheral aperture 652 which allows the said flexible connector to pass to the water beneath the flotation module near its location of interface with its associated power-take-off pulley e.g. 655. Apertures 652 each communicate from a top surface to a bottom surface of the flotation module.

FIG. 183 shows a cross-sectional view taken at 31 of FIG. 182. At one end of each flexible connector e.g. 658 is a junction ring 662 which further connects with to flexible connector 663 and seafloor anchor 664 which is affixed to the seafloor 665; each flexible connector 658 thus can communicate a tension force from the flotation module 650 to the seafloor. Although a seafloor anchor is shown in this figure, the device design disclosed in this figure is not limited to use with a seafloor anchor, and could be used instead with an inertial mass in place of seafloor anchor 664, in which case each flexible connector would communicate a tension force to the inertial mass.

FIG. 183 shows more clearly the central aperture 659 and peripheral apertures 653.

Each flexible connector e.g. 654/658 has one end linked to the junction ring 662 and another end "dangling" e.g. 654, with no discrete weight or other object attached. In some embodiments, a heavier gauge of chain or cable is used near a dangling end 654. In other embodiments, no change in gauge is used. In either case, the purpose of the dangling end is simply to provide ample "travel" as the flotation module rises on waves of appreciable height. The lengths shown are not to scale. Preferably, at least 30 meters of travel is available, meaning that the distance between (i) the power-take-off pulley 655 (and/or the bottom of aperture 652) and (ii) the bottom of dangling end 654 is at least 30 meters. In some embodiments, it is at least 40 meters or at least 50 meters.

As mentioned previously, guiding pulleys 657 can be directional rectification pulleys, meaning that they are mounted on a hinged apparatus or a hanging apparatus that enables them to pivot or rotate to correct for fleet angle misalignments, in particular, pivoting or rotating about an axis approximately collinear with the path taken by flexible connector segment 656, i.e. a line passing tangent to the top of the relevant power-take-off pulley (e.g. 655) and the top of the relevant guiding pulley e.g. 657.

Note that flotation module 650 has a sloped indentation 668.

When the flotation module 650 rises on a wave, it translates upward relative to the array of flexible connectors 658, causing said flexible connectors to apply a torque to power-take-off pulleys e.g. 655 and 660, from which electrical power can be generated by generator assembly 661.

FIG. 184 shows a top-down view of an embodiment of the present disclosure. A buoy 520 floats adjacent to a surface of a body of water. The buoy 520 contains does not contain any apertures. At one point along the upper perimeter of the buoy is a roller 522 about which is wound the strands of a ribbon cable 526. One side, e.g., 525, of each ribbon cable strand leaves the roller 522 and travels into the body of water where the end of that side of each strand of the ribbon cable is connected to an inertial mass (not visible). The other side, e.g., 526, of each ribbon cable strand leaves the roller 522 and travels to a second roller 523 over which it travels into the body of water and where at the end of each such strand side the strand is connected to a "restoring weight" (not visible).

Note that the ends of a single ribbon cable enters the body of water by traveling over opposite sides of the buoy (i.e. not through an aperture).

A generator 524 is rotated, and generates electrical power when the distance between the buoy and the inertial mass increases thereby inducing a tension within the ribbon cable in response to the generator's resistance of the roller 522 to which it is rotatably connected.

FIG. 185 shows a cross-sectional view of the embodiment of the present disclosure illustrated and discussed in relation to FIG. 184, and taken across section line 25 in FIG. 184.

Buoy 520 floats adjacent to a surface 521 of a body of water. A ribbon cable connects a negatively buoyant inertial mass 530 to a restoring weight 534 by means of ribbon junction bars 528 and 532 located at its ends 526 and 531, respectively, which are in turn connected to cables 529 and 533, respectively.

The ribbon cable travels across the top of the buoy 520. And, the strands of the ribbon cable are wound around a roller 522 that is rotatably connected to a generator 524 which is able to exert a torque on the roller, the overcoming of which results in the generation of electrical power. The strands of the ribbon cable also travel over and partially around a roller 523 which does not resist the cable's travel.

When the distance between the buoy 520 and the inertial mass 530 increases, the resistive torque imposed on the roller 524 by the generator inhibits the movement of the ribbon cable. With sufficient downward force on the ribbon cable, the roller 524 turns and the generator 524 generates electrical power. When the distance between the buoy 520 and the inertial mass 530 decreases, the weight of the restoring weight 534, pulls the ribbon cable so as to eliminate slack in the cable and reset its position in preparation for the next increase in separation between the buoy and the inertial mass.

FIG. 186 shows a top-down view of an embodiment of the present disclosure. A buoy 415 floats adjacent to a surface of a body of water. The buoy contains five apertures that facilitate the passage and movement of cables from rollers above its upper surface, to submerged objects below its hull.

Four pairs of rollers, e.g. 401 and 400, constituting four two-roller traction winches, are arranged radially about the buoy's upper surface. Around each pair of complementary and/or cooperating traction-winch rollers, e.g. 400 and 401, is a ribbon cable, e.g. 412, one end of which rises from the water through the central aperture 417, and the other end of which returns to the water through a roller-specific peripheral aperture, e.g. 421. Each strand of each ribbon cable is wound about each of its respective traction winch's rollers. The turning of the peripheral roller in each traction winch turns the rotors of a pair of respective electrical generators, e.g. 418 and 419.

FIG. 187 shows a cross-sectional view of the embodiment illustrated and discussed in relation to FIG. 186, and taken across section line 21 in FIG. 186.

One end of each ribbon cable is connected to a submerged inertial mass 426 at a connector 428. From there, each strand of each ribbon cable passes through the buoy's central aperture 417 and is wound around the pair of rollers, e.g. 400 and 401, of its respective traction winch. The other end of each strand of each ribbon cable passes through a peripheral aperture, e.g. 416, and is connected to a strand-specific restoring weight, e.g. 429.

FIG. 188 shows a perspective view of an embodiment of the current disclosure. First, this embodiment uses a net 7-143 composed of flexible tendons to substantially enclose and "hold up" inertial mass 7-140. The net 7-143 makes contact with inertial mass 7-140 at a plurality of locations around the inertial mass's perimeter, and/or exterior surface, especially (but not limited to) its bottom portion. The net can be, but is not necessarily, fixedly connected to the outer perimeter of the inertial mass, i.e. in some embodiments the net can make sliding contact with the outer surface of the inertial mass, in some embodiments it does not. An advantage of a net enclosure is that the transmission of force from the inertial mass 7-140 to the depending connector 7-150 can take place over a larger surface area of the inertial mass and therefore imposes lesser structural requirements thereupon.

Note that the inertial mass weighted portion 7-145 is still present in this embodiment, only it has been moved to a position closer to the center of the inertial mass to reduce the possibility of "snagging" on the net.

This embodiment includes an electrical power cable 7-750 adapted to carry electrical power from the generator housed in the device to a remote electrical grid, such as an onshore grid adjacent to a shoreline of the body of water. The power cable in this embodiment is suspended by floats e.g. 7-755. In other embodiments, the power cable is spliced into a subsea power cable near the seafloor.

In some embodiments, the mechanical energy of the rotating shaft can be used to power an apparatus on the device that performs useful work such as the production of chemical fuels.

In this embodiment, pulley/capstan 7-125 is a chain wheel, gypsy wheel, and/or wildcat. Depending connector 7-150 is a chain. The angle of the arc defined by the contact between depending connector 7-150 and pulley/capstan 7-125 can be less than a 2 times pi radians, i.e. depending connector 7-150 can pass around pulley/capstan 7-125 less than full one time.

We claim:

1. An inertial wave energy converter, comprising:
    a positively buoyant flotation module adapted to float on a surface of a body of water, the positively buoyant flotation module rising and falling in response to passing waves;
    a first pulley mounted rotatably at the positively buoyant flotation platform, said first pulley configured to drive a first power-take-off system;
    a flexible connector engaging the first pulley;
    a submerged negatively buoyant mass coupled to the flexible connector adjacently to a first end of the flexible connector;
    a restoring weight coupled to the flexible connector adjacently to a second end of the flexible connector;
    wherein a wet weight of the restoring weight is less than a wet weight of the submerged negatively buoyant mass to gravitationally bias the submerged negatively buoyant mass to a lower position than the restoring weight;
    wherein the submerged negatively buoyant mass is configured to continuously gravitationally descend except when lifted by periodic upward impulses applied by the first pulley via the flexible connector;
    wherein the cyclic vertical movements of the negatively buoyant mass are regulated by adjustment of a resistive torque imparted to the first pulley by the first power-take-off system to stabilize a separation distance between the positively buoyant flotation module and the submerged negatively buoyant mass in an operational separation distance range.

2. The inertial wave energy converter of claim 1, wherein the first power-take-off system powers an electrical generator.

3. The inertial wave energy converter of claim 1, wherein the first power-take-off system includes a hydraulic transmission.

4. The inertial wave energy converter of claim 3, wherein the hydraulic transmission includes hydraulic cylinders engaged with a crankshaft.

5. The inertial wave energy converter of claim 3, wherein the hydraulic transmission includes a turbine coupled to an electric generator.

6. The inertial wave energy converter of claim 4, wherein a hydraulic fluid pumped by the hydraulic cylinders lubricates the crankshaft.

7. The inertial wave energy converter of claim 1, wherein the first power-take-off system comprises a gearbox engaged with a generator.

8. The inertial wave energy converter of claim 1, wherein the first power-take-off system includes a one-way clutch to drive the first power-take-off system only when a separation distance between the positively buoyant flotation module and the submerged negatively buoyant mass increases.

9. The inertial wave energy converter of claim 1, wherein the first pulley has a spiral groove to constrain the flexible connector.

10. The inertial wave energy converter of claim 9, wherein the flexible connector is wound multiple times around the first pulley.

11. The inertial wave energy converter of claim 10, wherein a portion of said flexible connector is fixedly attached to said first pulley.

12. The inertial wave energy converter of claim 1, wherein the positively buoyant flotation module comprises concrete.

13. The inertial wave energy converter of claim 12, further comprising pre-stressing tendons to inwardly compress said positively buoyant flotation module.

14. The inertial wave energy converter of claim 1, wherein the submerged negatively buoyant mass is suspended at a depth of more than 100 meters.

15. The inertial wave energy converter of claim 1, wherein the submerged negatively buoyant mass is suspended below a wave base of the body of water.

16. The inertial wave energy converter of claim 1, wherein the submerged negatively buoyant mass comprises a plurality of tubes oriented horizontally to reduce an exposure to ocean currents.

17. The inertial wave energy converter of claim 1, wherein the submerged negatively buoyant mass comprises concrete.

18. The inertial wave energy converter of claim 1, wherein the submerged negatively buoyant mass comprises a plastic shell.

19. The inertial wave energy converter of claim 1, wherein a majority of mass of the submerged negatively buoyant mass is from enclosed water.

20. The inertial wave energy converter of claim 1, further comprising a mechanical brake to stabilize the submerged negatively buoyant mass when no waves are present.

21. The inertial wave energy converter of claim 1, further comprising a weight adjustment system for adjusting an effective weight of the submerged negatively buoyant mass.

22. The inertial wave energy converter of claim 21, wherein the weight adjustment system adjusts a quantity of counterweight opposing an ascent of the submerged negatively buoyant mass due to the periodic upward impulses.

23. The inertial wave energy converter of claim 22, wherein the quantity of counterweight is adjusted by altering a separation distance between the submerged negatively buoyant mass and the positively buoyant flotation module.

24. The inertial wave energy converter of claim 22, wherein the counterweight is a plurality of connected weights.

25. The inertial wave energy converter of claim 1, wherein the flexible connector couples to the submerged negatively buoyant mass at a single pick point.

26. The inertial wave energy converter of claim 1, wherein the restoring weight coaxially encircles the flexible connector.

27. An inertial wave energy converter, comprising:
- a positively buoyant flotation module adapted to float on a surface of a body of water, said positively buoyant flotation module moving upwardly and downwardly on passing waves;
- a pulley mounted rotatably at the positively buoyant flotation module;
- a power-take-off system configured to resist rotation of said pulley to power an electrical generator;
- an inertial mass suspended in said body of water; and
- a flexible connector having a first portion coupled to said inertial mass and a second portion engaging said pulley;
- wherein said power-take-off system comprises a crankshaft engaged with an array of hydraulic cylinders to pump hydraulic fluid to a turbine;
- wherein said power-take-off system resists rotation of said pulley with a first resistive torque;
- wherein said flexible connector applies a first driving torque to rotate said pulley in a first direction when a separation distance between said positively buoyant flotation module and said inertial mass increases, said first driving torque exceeding said first resistive torque; and
- wherein said pulley is biased to rotate in a second direction when said separation distance decreases.

28. The inertial wave energy converter of claim 27, wherein said pulley is biased to rotate in said second direction by a restoring weight, said restoring weight gravitationally energized when a separation distance between said positively buoyant flotation module and said inertial mass increases.

29. An inertial wave energy converter, comprising:
- a positively buoyant flotation module adapted to float on a surface of a body of water;
- a first pulley journaled at the positively buoyant flotation module;
- a power-take-off system configured to resist rotation of said first pulley;
- a submerged inertial mass suspended in said body of water by said positively buoyant flotation module; and
- a flexible connector having a first portion coupled to said submerged inertial mass and a second portion engaging said first pulley;
- wherein said power-take-off system resists rotation of said first pulley with a resistive torque;
- wherein said flexible connector applies a driving torque to rotate said first pulley in a first direction when a separation distance between said positively buoyant flotation module and said submerged inertial mass increases, said driving torque exceeding said resistive torque;
- wherein said first pulley rotates in a second direction when said separation distance decreases; and
- wherein a vertical resistance to acceleration of said submerged inertial mass is approximately invariant with respect to the vertical velocity of said submerged inertial mass.

30. The inertial wave energy converter of claim 28, wherein said submerged inertial mass resists vertical acceleration and horizontal acceleration approximately equally.

* * * * *